United States Patent [19]
Packard et al.
[11] Patent Number: 4,914,585
[45] Date of Patent: Apr. 3, 1990

[54] MODULAR COMPLIER WITH A CLASS INDEPENDENT PARSER AND A PLURALITY OF CLASS DEPENDENT PARSERS

[75] Inventors: Barbara B. Packard, Los Altos Hills; Glenn Stearns, Scotts Valley; Ralph T. Watson, San Jose, all of Calif.

[73] Assignee: Hewlett-Packard Company, Palo Alto, Calif.

[21] Appl. No.: 197,795

[22] Filed: May 23, 1988

[51] Int. Cl.[4] .......... G06F 9/00

[52] U.S. Cl. .......... 364/200; 364/300; 364/280; 364/280.4

[58] Field of Search .......... 364/200, 300, 900

[56] References Cited

U.S. PATENT DOCUMENTS 4,787,035 11/1988 Bourne .......... 364/300

*Primary Examiner*—Raulfe B. Zache
*Attorney, Agent, or Firm*—Alan H. Haggard

[57] ABSTRACT

A modular compiler is used to compile code for execution by an agent engine and a plurality of application programs. The modular compiler includes a class independent compiler which parses program code which is to be executed by the agent engine. The modular compiler also includes a class dependent parser for each application program. Each class dependent parser parses program code which is to be executed by its respective application program. When an application program is added to the computing system, an associated class dependent parser is added to the modular compiler. When an application program is removed from the computing system, the associated class dependent parser is removed from the modular compiler.

10 Claims, 18 Drawing Sheets

MODULAR COMPLIER WITH A CLASS INDEPENDENT PARSER AND A PLURALITY OF CLASS DEPENDENT PARSERS

BACKGROUND

The present invention relates to the use of a modular compiler to compile code to be executed by an agent engine and a plurality of application programs running on a computer.

Some commercially available application programs, for instance many popular spreadsheet and data base programs, implement command languages which allow a user to type in commands which are stored in a script file for later batch execution. These scripts allow a user to run a complicated set of commands automatically. Additionally, the user can simplify down to the execution of a script an often repeated task.

However, present implementations of command language scripts are severely limited in capability. For example, current schemes are application dependent. Each application generates its own command language script, which is only executable by that application. There is no facility for multiple applications to execute the same script. Furthermore, the script files that are generated are very difficult to understand and modify because the script files contain the commands actually executed by the application.

SUMMARY OF THE INVENTION

In accordance with the preferred embodiments of the present invention a computing system is presented which includes a plurality of applications and an agent engine. Each application program executes a series of semantic commands.

A modular compiler is used to compile code for execution by the application programs and by the agent engine. The modular compiler includes a class independent compiler which parses program code which is to be executed by the agent engine. The modular compiler also includes a class dependent parser for each application program. Each class dependent parser parses program code which is to be executed by its respective application program. When an application program is added to the computing system, an associated class dependent parser is added to the modular compiler. When an application program is removed from the computing system, the associated class dependent parser is removed from the modular compiler.

The present invention allows great versatility in allowing applications to be added or subtracted from a computing system. When a new application is to be added to a computing system, it is not necessary to rewrite a compiler to take into account commands executed by the new application. Rather, a separate class dependent parser may be added to the modular compiler for generating commands to be executed by the new application.

DESCRIPTION OF THE PREFERRED EMBODIMENT

Figure 1:
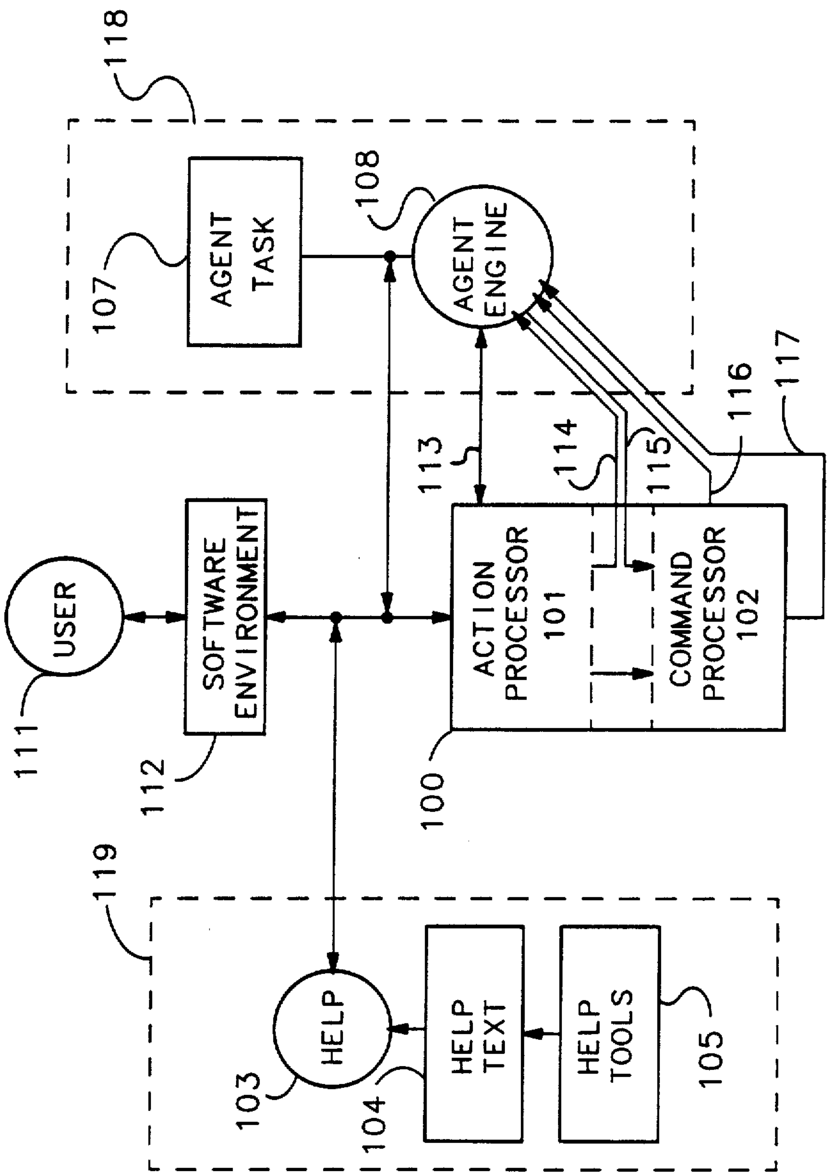
FIG. 1 is a block diagram which shows the interaction between an application, an agent environment and a help environment.

FIG. 1 is a block diagram of a computing system in accordance with a preferred embodiment of the present invention. A user 111 communicates with the computing system through a software environment 112. Software environment 112 may be, for instance, Microsoft Windows, a program sold by Microsoft Corporation, having a business address at 16011 NE 36th Way, Redmond, WA 98073-9717. Software environment 112 interacts with an application 100. Messages containing information describing user actions are sent to application 100 by software environment 112. In the preferred embodiment the messages containing user actions are standard messages sent by Microsoft Windows. Application 100 includes an action processor 101 which converts syntactic user actions to a single semantic command. For example, action processor 101 observes the clicks and movements of a mouse used by a user, and waits until a syntactically meaningful command has been generated. Action processor 101 is able to syntactically interpret the many ways a user can build a particular command. In addition to syntactic user actions, action processor 101 also processes other messages from which come to application 100. Some messages will result in a semantic command being generated; others will be dealt with entirely by action processor 101.

Application 100 also includes a command processor 102 which executes semantic commands. Command processor 102 receives semantic commands in internal form (internal form is discussed more fully below) and returns an error if a command cannot be executed.

Application 100 and software environment 112 interact with help environment 119 at the level of the interface between software environment 112 and application 100. Help environment 119 includes a help application 103, which utilizes a help text 104. Help environment 119 also includes help tools 105 which are used to generate help text 104.

Software environment 112 also interacts with an agent environment 118. Agent environment 118 includes an agent task 107 and an agent engine 108.

Agent engine 108 interacts with application 100 at five different conceptual categories, in order to perform five functions. Agent engine 108 interacts with action processor 101 through a data channel 113 for the purpose of interrogation. Agent engine 108 interacts between action processor 101 and command processor 102 through a data channel 114 for the purpose of monitoring the activities of application 100. Agent engine 108 interacts with command processor 102 through a data channel 115 for the purpose of having commands executed by application 100. Agent engine 108 interacts with command processor 102 through a data channel 116 for the purpose of handling errors in the processing of a command within application 100. Agent engine 108 interacts with command processor 102 through a data channel 117 for the purpose of recording execution of application 100 and receiving notification of the completion of a command.

In the preferred embodiment of the present invention, commands may be represented in four ways, (1) in task language form, stored as keywords and parameters, (2) in pcode form, which are binary codes in external form with additional header interpreted by agent 108; (3) in external form, which are binary data understood by application 100 and which are passed between agent 108 and application 100; and (4) in internal form, as binary commands which are executed within application 100. The four ways of representing commands are further described in Appendix A attached hereto.

Figure 2:
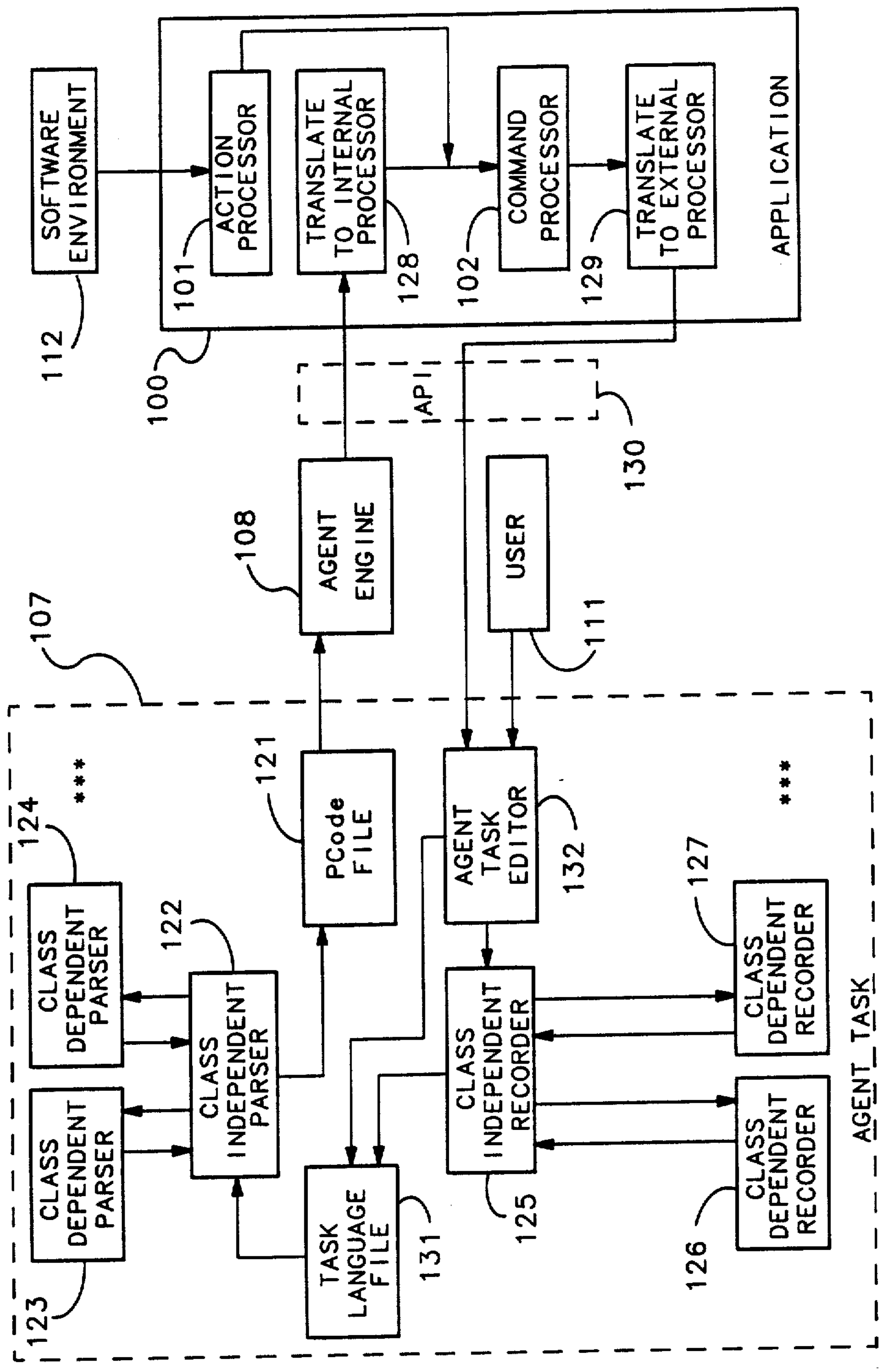
FIG. 2 is a block diagram which shows how a task language file is generated and executed in accordance with the preferred embodiment of the present invention.

FIG. 2 shows a block diagram of how the overall agent system functions. A task language file 131 is a file containing task language. Task language is the text form of commands that describe an application's functionality. Task language is comprised of class dependent commands and class independent commands. Class dependent commands are commands which are to be performed by an application. In FIG. 2, just one application, application 100 is shown; however, agent 108 may interact with many applications.

In the preferred embodiment of the present invention, data files to be operated on by applications are referenced by the use of objects. Each object contains a reference to a data file and a reference to an application. Those objects which refer to the same application are said to be members of the same class. Each application executes a different set of commands. Class dependent commands therefore differ from application to application.

Agent 108 executes class independent commands which are commands understood by agent 108. Class independent commands are executed by agent 108, not by an application.

Task language file 131 is used by a class independent parser 122 to prepare a pcode file 121. In preparing pcode file 121, independent parser 122 calls class dependent parsers 123, 124 and etc. As will be further described below, a class dependent parser is a parser which generates class dependent commands which are encapsulated in pcode form. Agent 108 extracts the commands in their external form from the pcode form and forwards these commands to the appropriate application. A class field within the pcode indicates which application is to receive a particular class dependent command. Class independent parser 122 is a parser which generates pcodes which are executed by agent 108.

Task language file 131 may be prepared by user 111 with an agent task editor 132. Alternately, task language file may be prepared by use of a class independent recorder 125 which utilizes class dependent recorders 126, 127 and etc. Generally, a recorder records the commands of applications for later playback. When the computing system is in record mode, agent task editor 132 receives input from applications, such as shown application 100, which detail what actions agent engine 108 and the applications take. Applications communicate to agent task editor 132 through an application program interface (API) 130. Agent task editor 132. forwards data to class independent recorder 125 when the computing system is in record mode, and to task language file 131 when agent task editor is being used by user 111.

Class independent recorder 125 receives the information and builds task language file 131. When class independent recorder 125 detects that agent task editor 132 is forwarding information about an action taken by an application, class independent recorder calls the class dependent recorder for that application, which then generates the task language form for that action. Class independent recorder also 108 generates the task language form for an action to be taken by agent engine 108.

When executing pcode file 121, agent engine 108 reads each pcode command and determines whether the pcode command contains a class independent command to be executed by agent 108, or a class dependent command to be executed by an application. If the pcode command contains a class independent command, agent 108 executes the command. If the pcode command contains a class dependent command, agent 108 determines by the pcode command the application which is to receive the command. Agent 108 then extracts a class dependent command in external form, embedded within the pcode. This class dependent command is then sent to the application. For instance, if the class dependent command is for application 100, the class dependent command is sent to application 100. Within application 100 a translate to internal processor 128 is used to translate the class dependent command—sent in external form—to the command's internal form.

In the interactions between agent engine 108 and application 100, API 130 is used. API 130 is a set of functions and messages for accessing agent engine 108 and other facilities.

Figure 3:
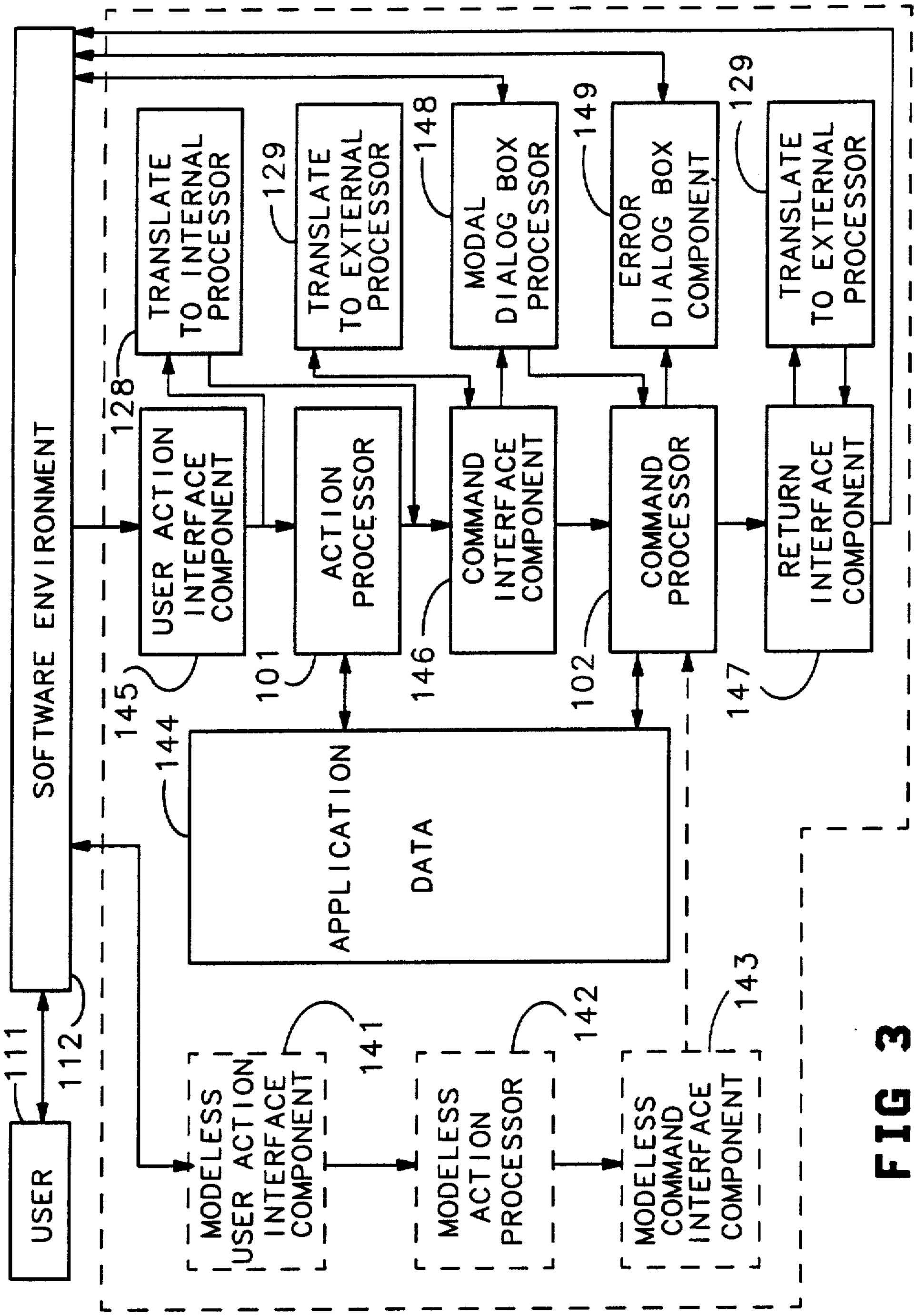
FIG. 3 is a block diagram of the application shown in FIG. 1 in accordance with a preferred embodiment of the present invention.

When the system is in record mode, translate to internal processor 128 translates commands from agent engine 108 and feeds them to command processor 102 through a command interface component 146 shown in FIG. 3. A translate to external processor 129 receives commands in internal form that have been executed by command processor 102. The commands are received through return interface component 147, shown in FIG. 3. Translate to external processor 129 translates the commands in internal form to commands in external form. The commands in external form are then transferred through API 130 to task editor 132.

FIG. 3 shows in more detail the architecture of application 100 in the preferred embodiment of the present invention. Application 100 includes a user action interface component 145 which interacts with software environment 112 and command interface component 146 which communicates with both action processor 101 and command processor 102. As shown both action processor 101 and command processor 102 access application data 144. A return interface component 147 is responsive to command processor 102 and returns control back to software environment 112. Translate to external processor 129 is shown to interact with return interface component 147. Return interface component 147 is only called when application 100 is in playback mode or record mode. These modes are more fully described below. Return interface component 147 indicates to agent engine 108 that a command has been executed by application 100 and application 100 is ready for the next command.

Also included in application 100 are a modal dialog box processor 148 and an error dialog box component 149. Both these interact with software environment 112 to control the display of dialog boxes which communicate with a user 111.

Some applications are able to operate in more than one window at a time. When this is done a modeless user action interface component, a modeless action processor, and a modeless command interface component is added for each window more than one, in which an application operates. For example, in application 100 is shown a modeless user action interface component 141, a modeless action processor 142 and a modeless command interface component 143.

Figure 4:
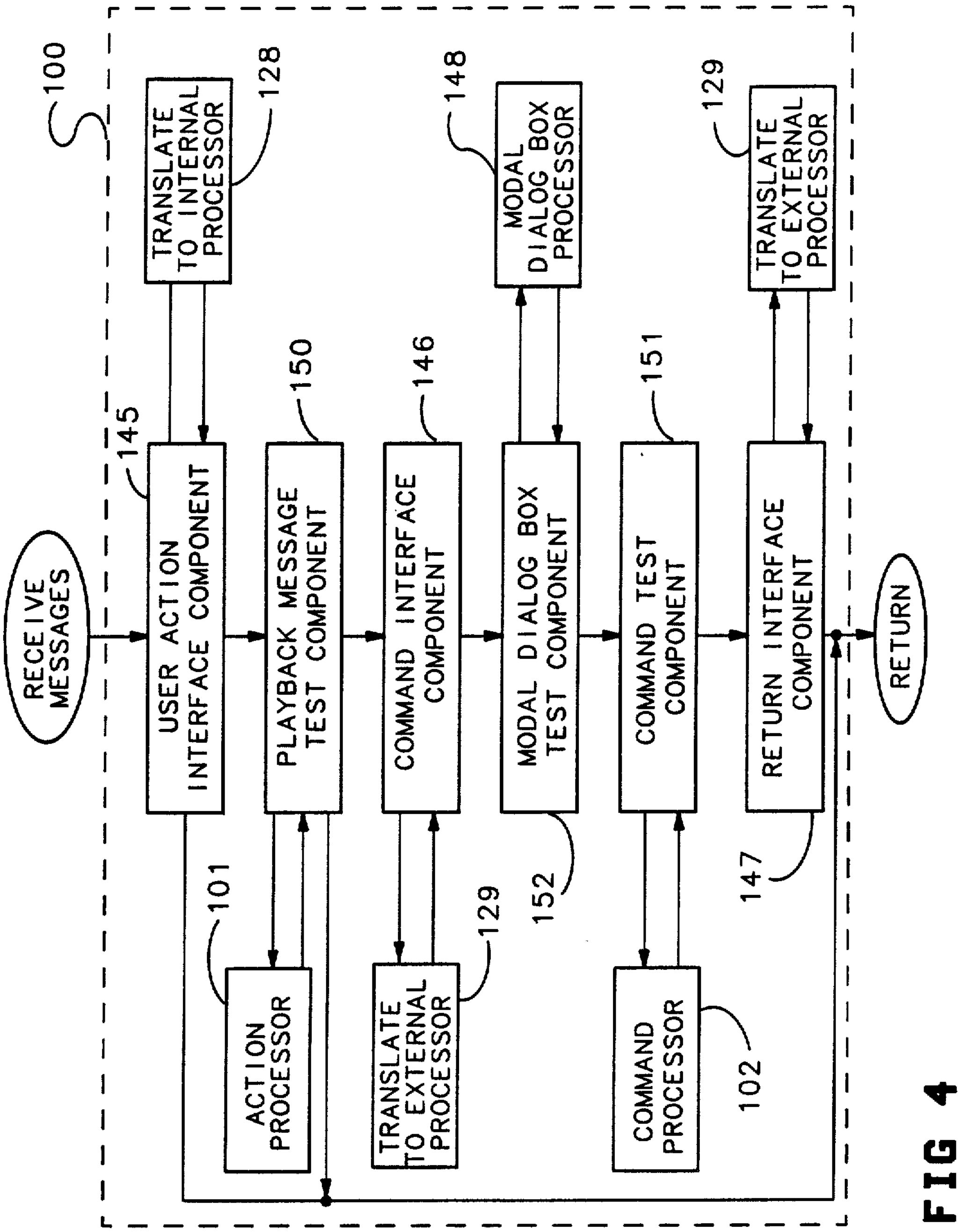
FIG. 4 is a block diagram showing data flow through the application shown in FIG. 1 in accordance with a preferred embodiment of the present invention.

FIG. 4 shows data flow within application 100. Messages to application 100 are received by user action interface component 145. For certain types of messages—e.g., messages from help application 103—user action interface 145 causes application 100 to return immediately. Otherwise the message is forwarded to a playback message test component 150.

If the message is for playback of commands which have been produced either by recording or parsing, the message is sent to translate to internal processor 128 which translates a command within the message from external form to internal form. The command is then forwarded to command interface component 146.

If the message is not a playback message the message is sent to action processor 101 to, for example, syntactically interpret a user's action which caused the generation of the message. If there is no semantic command generated by action processor 101, or produced by internal processor 128 playback message test component 150 causes application 100 to return. If there is a semantic command generated the command is forwarded to command interface component 146.

If agent 108 is monitoring execution of commands by application 100, command interface component 146 sends any data received to translate to external processor 129 which translates commands to external form and transfers the commands to agent 108. Command interface component also forwards data to a modal dialog box test component 152.

If the forwarded data contains a request for a dialog box, modal dialog box test component 152 sends the data to modal dialog box processor 148 for processing. Otherwise modal dialog box tast component 152 sends the data to command test component 151.

If the data contains a command, command test component 151 sends the command to command processor 102 for execution. Command test component 151 sends the data to return interface component 147.

If agent 108 is recording commands, return interface component 147 sends the data to translate to external processor 129 for translation to external form and transfer to agent 108 via return interface component 147. Return interface component returns until the next message is raceived.

The following discussion sets out how actions may be recorded and played back according to the preferred embodiment of the present invention.

Figure 8:
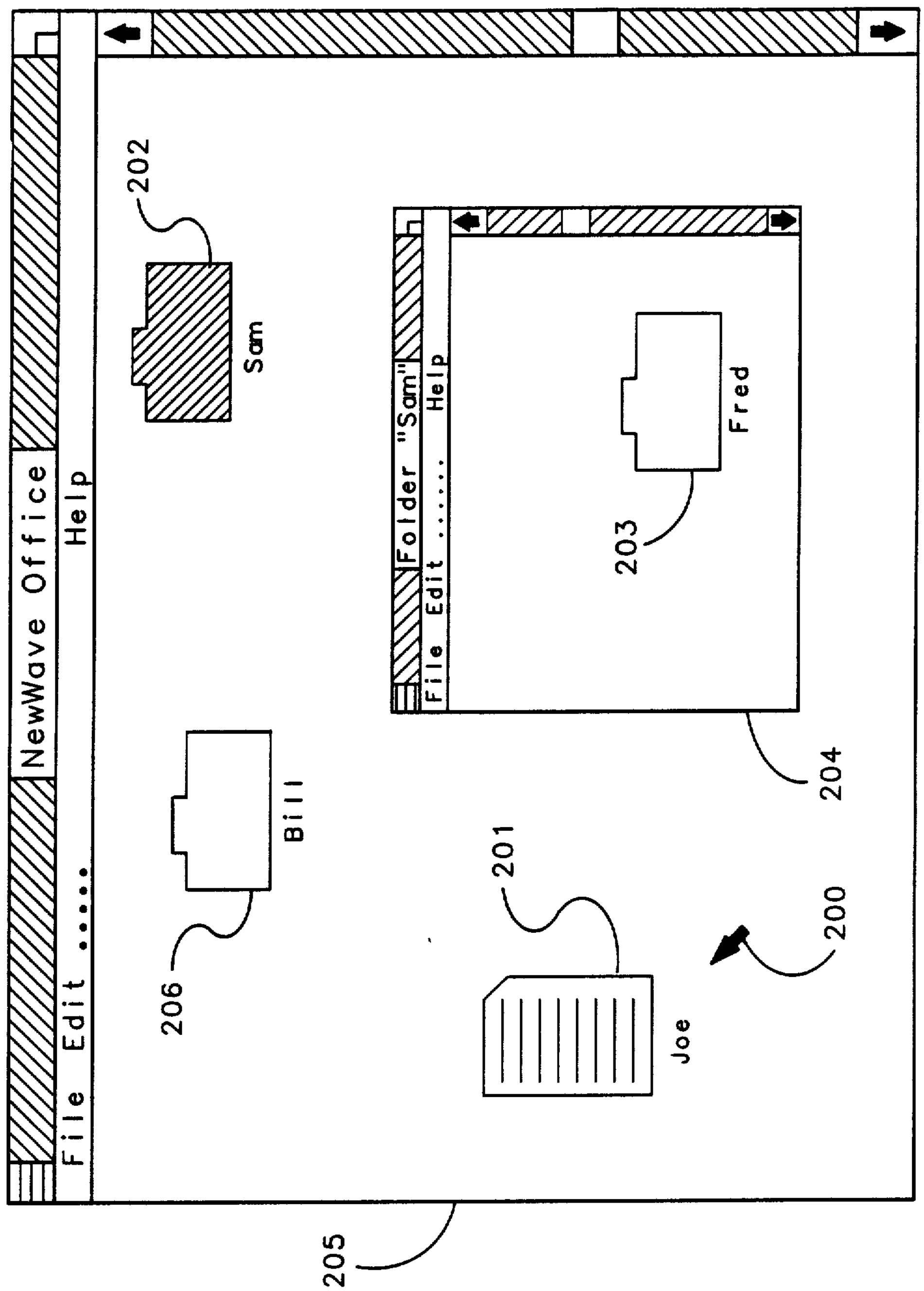
FIG. 8 through FIG. 18 show how the display on the monitor shown in FIG. 6 appears in a user session during which user actions are recorded and played back in accordance with the preferred embodiment of the present invention.

In FIG. 8 an application "NewWave Office" is running in a window 205 as shown. Within window 205 is shown a object "Joe" represented by icon 201, a folder "Bill" represented by an icon 206, and a folder "Sam" represented by an icon 202. Object "Joe" contains a reference to a text file and a reference to an application which operates on the text file. Folder "Sam" has been opened; therefore, icon 202 is shaded and a window 204 shows the contents of Folder "Sam". Within folder "Sam" is a folder "Fred" represented by an icon 203. A cursor 200 is controlled by a mouse 20 or a keyboard 19, as shown in FIG. 6.

Figure 7:
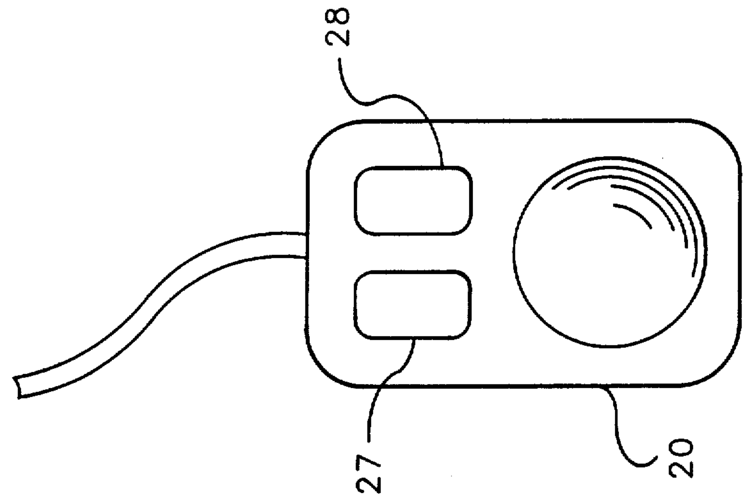
FIG. 7 shows a top view of the mouse shown in FIG. 6.
Figure 6:
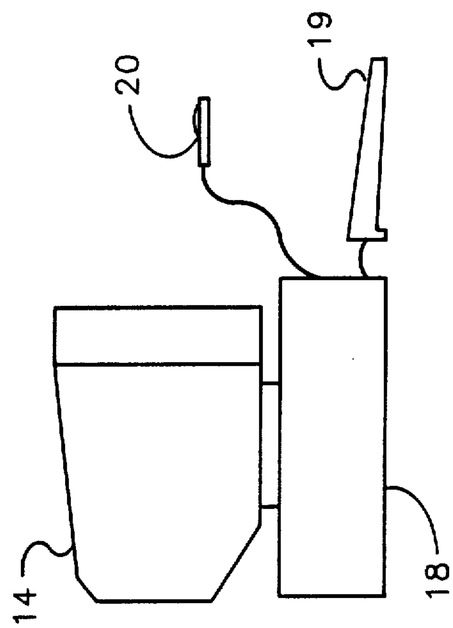
FIG. 6 shows a computer, monitor, keyboard and mouse in accordance with the preferred embodiment of the present invention.

FIG. 6 also shows a computer 18 and a monitor 14 on which window 205 is shown. FIG. 7 shows mouse 20 to include a button 27 and a button 28.

Object "Joe" may be placed in folder "Bill" by using mouse 20 to place cursor 200 over object "Joe", depressing button 27, moving cursor 200 over folder "Bill" and releasing button 27. Similarly, object "Joe" may be placed within folder "Sam" by using mouse 20 to place cursor 20 over object "Joe", depressing button 27, moving cursor 200 within window 204 and releasing button 27. Finally, object "Joe" may be placed in folder "Fred" by using mouse 20 to place cursor 20 over object "Joe", depressing button 27, moving cursor 200 over folder "Fred" and releasing button 27.

Placement of object "Joe" in folder "Fred", within folder "Sam" or in folder "Bill" may be recorded as will now be described. Each time a user moves mouse 20, a message containing a syntactic user action is received by user action interface component 145, and relayed to action processor 101 through playback message test component 150. Based on these syntactic user actions, action processor 101 generates a semantic command which is executed by command processor 102.

The following describes the recording of the placement of object "Joe" in folder "Bill". In FIG. 8, window 205 is active. Cursor 200 may be moved about freely in window 205. When user moves mouse 20, syntactic user actions are sent to action processor 101 as described above. Action processor 101 keeps track of the coordinate location of cursor 200. When button 27 is depressed, action processor 101 checks to see what exists at the present coordinate location of cursor 200. If cursor 200 is placed over object "Joe" when button 27 is depressed, action processor 101 discovers that object "Joe" is at the location of cursor 200. At this time action processor 101 generates a semantic command "Select Document 'Joe'". The semantic command is passed through playback message test component 150, through command interface component 146 through modal dialog box test component 152 through command test component 151 to command processor 102, which performs the semantic command. The semantic command is also received by Return Interface Component 147 and sent to translate to external processor 129. Translate to external processor puts the command in external form and sends it to class independent recorder 125 and thus to class dependent recorder 126 which records the command in task language form in a task language file.

Figure 9:
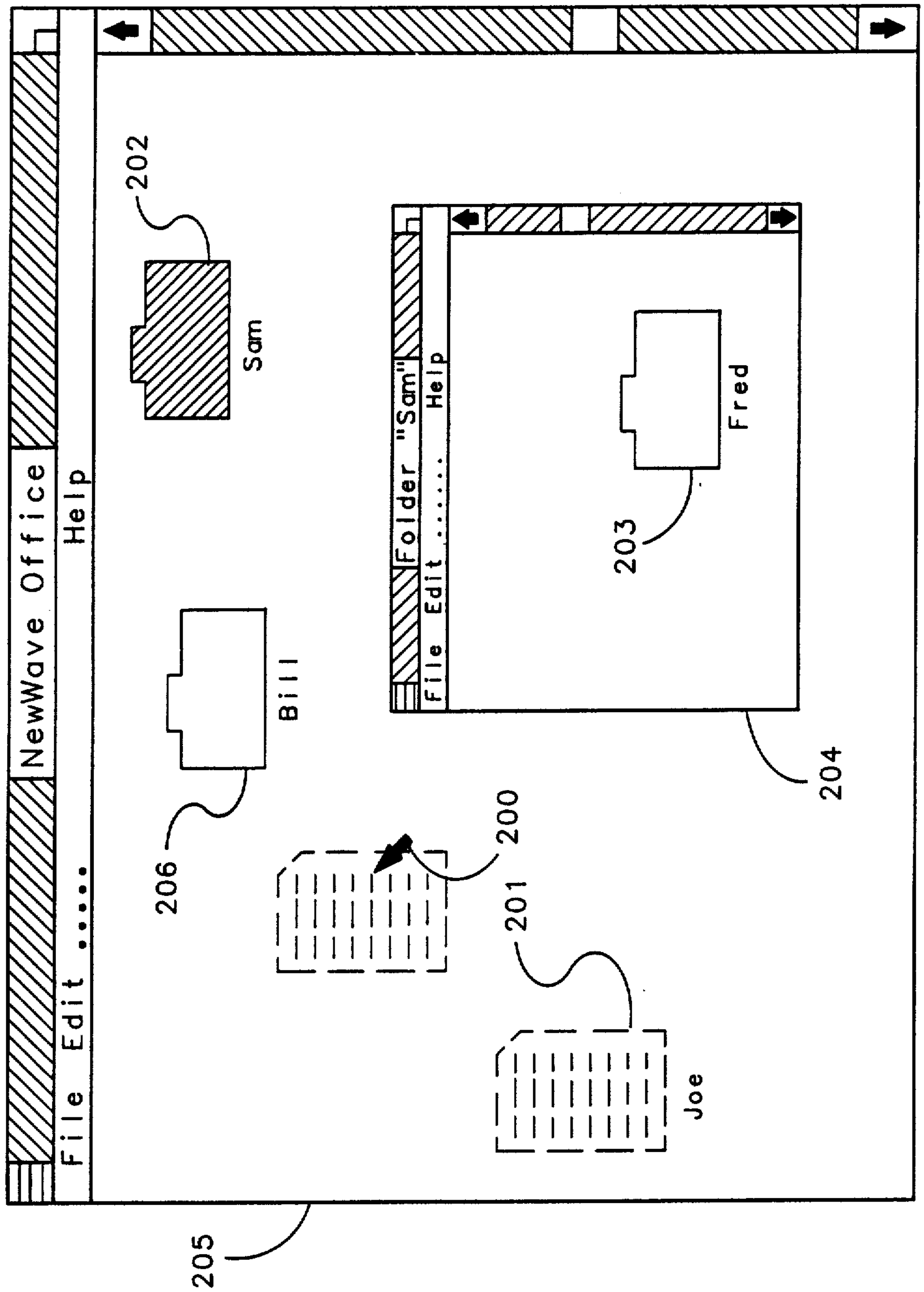
Figure 10:
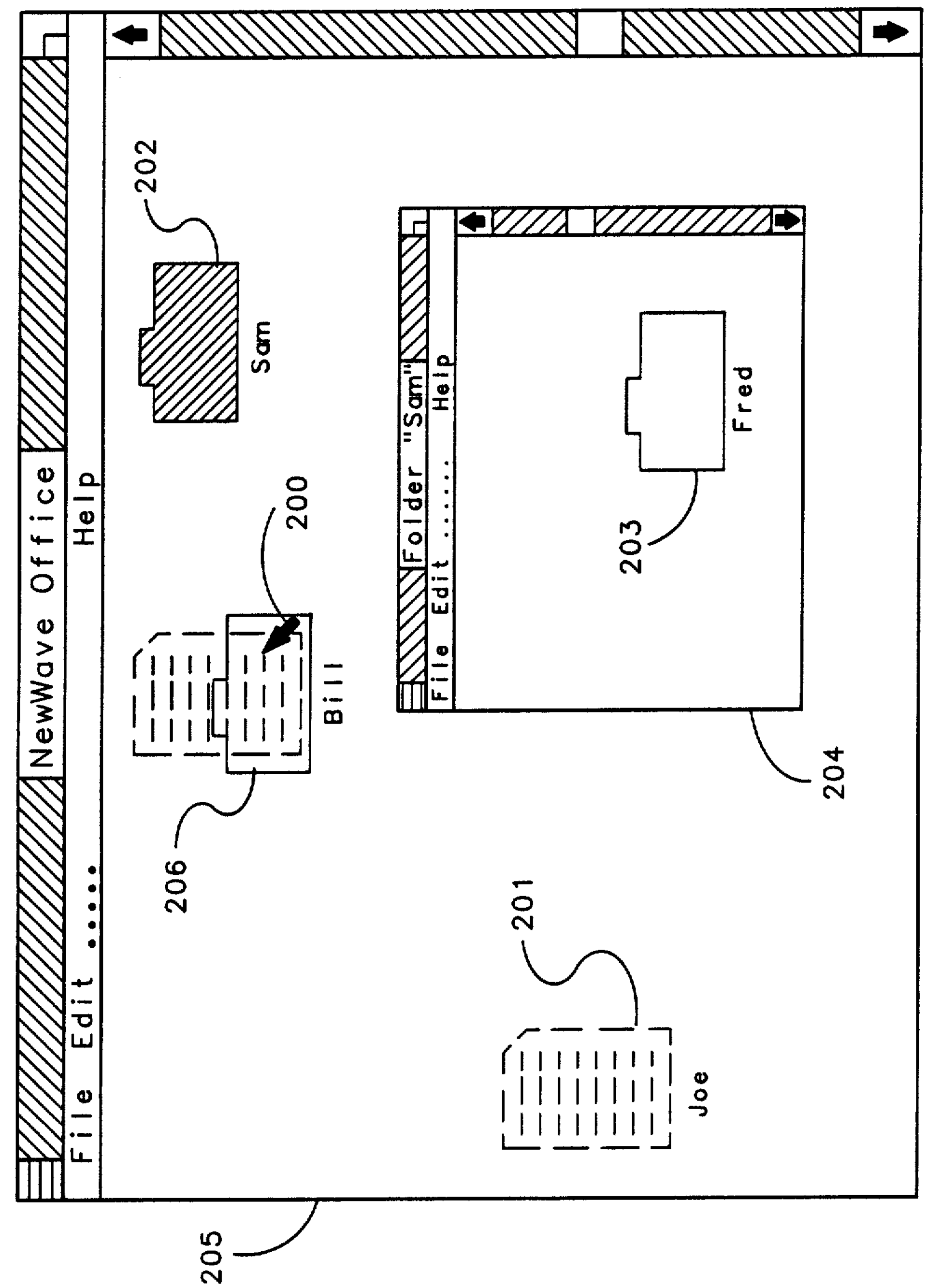

As mouse 20 is moved syntactic user actions continue to be sent to action processor 101. Action processor continues to keep track of the coordinate location of cursor 200. In FIG. 9, cursor 200 is shown to be moving a "phantom" of object "Joe". In FIG. 10, cursor 200 is shown to be placed over folder "Bill".

Figure 11:
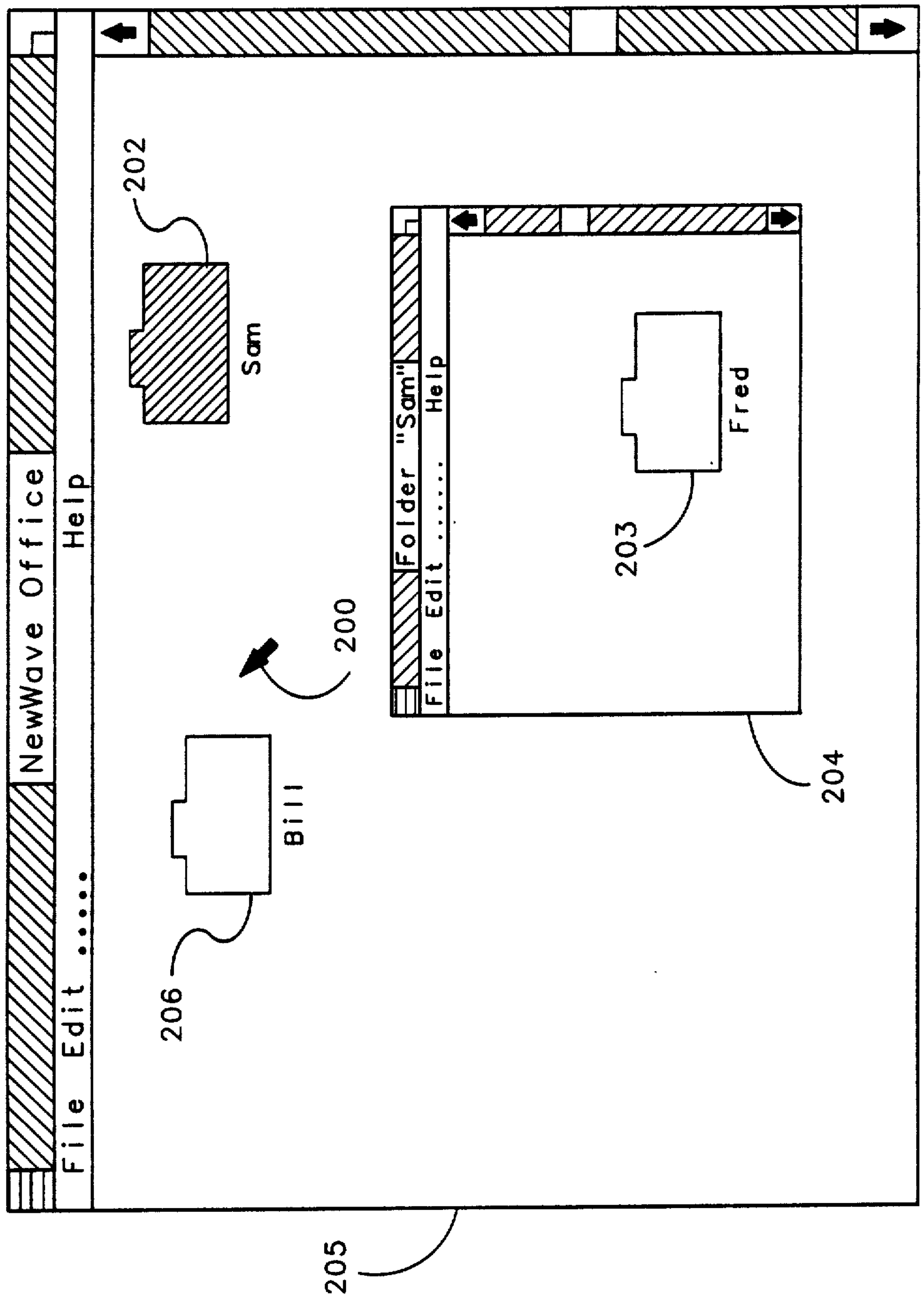
Figure 12:
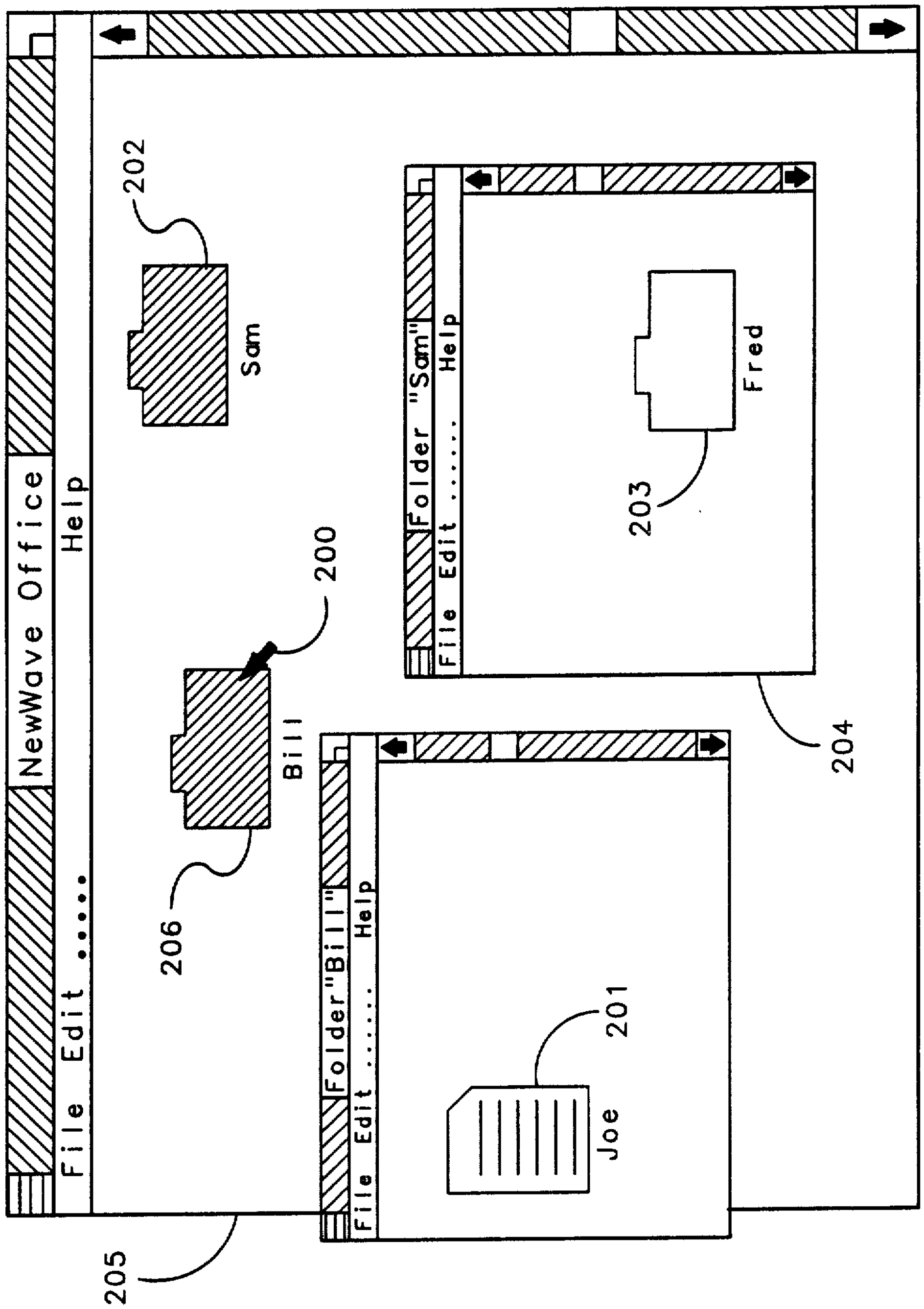

When button 27 is released, action processor 101 generates a semantic command "MOVE_TO Folder 'Bill'". The semantic command is passed to command processor 102, which causes the previously selected object "Joe" to be transferred to folder "Bill". FIG. 11.

shows the completed transfer, object "Joe" is in folder "Bill". Translate to external processor 129 puts the command in external form and sends it to class independent recorder 125 and thus to class dependent recorder 126 which records the command in a task language file. When folder "Bill" is opened, as shown in FIG. 12, object "Joe" may be seen.

In this case translate to external processor 129 did not have to get additional information about object "Joe" or folder "Bill", because application "NewWave Office" has within itself information that indicates that object "Joe" and folder "Bill" are on its desktop. Additionally, application 100 "NewWave Office" knows that folder "Bill" is closed.

Recording of the placement of object "Joe" within folder "Sam" is similar to the above. In FIG. 8, window 205 is active. Cursor 200 may be moved about freely in window 205. When button 27 is depressed, action processor 101 checks to see what exists at the present coordinate location of cursor 200. If cursor 200 is placed over object "Joe" when button 27 is depressed, action processor 101 discovers that object "Joe" is at the location of cursor 200. At this time action processor 101 generates a semantic command "Select Document 'Joe'". The semantic command is passed through playback message test component 150, through command interface component 146 through modal dialog box test component 152 through command test component 151 to command processor 102, which performs the semantic command. The semantic command is also received by Return Interface Component 147 and sent to translate to external processor 129. Translate to external processor puts the command in external form and sends it to class independent recorder 125 and thus to class dependent recorder 126 which records the command in a task language file.

Figure 13:
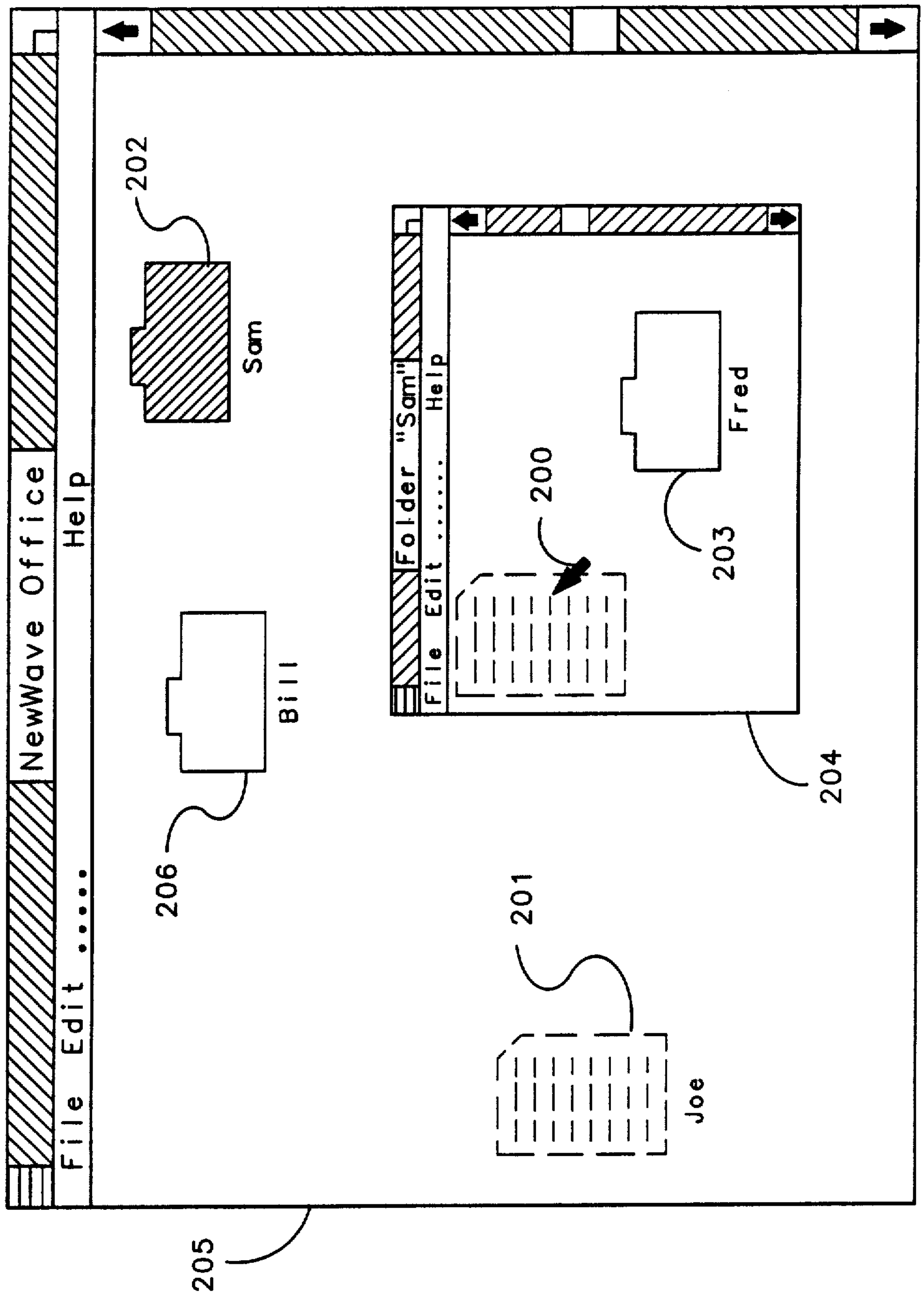

As mouse 20 is moved syntactic user actions continue to be sent to action processor 101. Action processor continues to keep track of the coordinate location of cursor 200. In FIG. 13, cursor 200 is shown to be placed within window 204. When button 27 is released, action processor 101 generates a MOVE_TO Folder "Sam" command. The semantic command is passed to command processor 102, which causes the previously selected object "Joe" to be transferred to folder "Bill". The semantic command is also received by return interface component 147 and sent to translate to external processor 129. Translate to external processor 129 sends an "API_INTERROGATE_MSG". The function of the message is API_WHO_ARE_YOU_FN". As a result of this message, translate to external processor 129 gets returned data indicating that an open window for folder "Sam" is at the location of cursor 200. Translate to external processor 129 sends another "API_INTERROGATE_MSG". The function of the message is again "API_WHATS_INSERTABLE_AT FN". Since there there is nothing within window 204 at the location of cursor 200, no additional entity is identified. For a further description of API_INTERROGATE_MSG see Appendix C.

Figure 14:
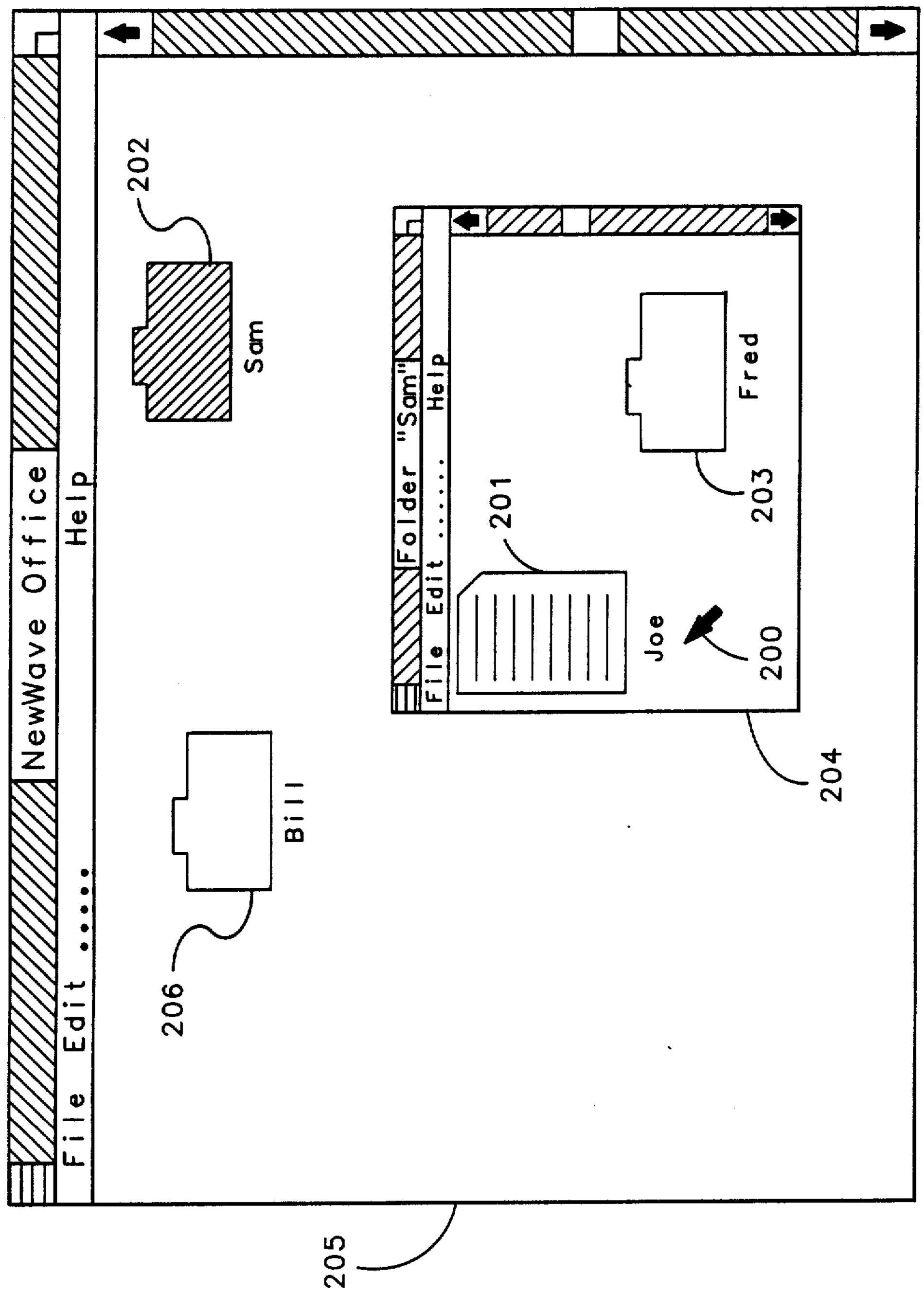

Translate to external processor puts the command in external form and sends it to class independent recorder 125 and thus to class dependent recorder 126, and the command is recorded in task language file 131. FIG. 14 shows the result of the completed transfer: object "Joe" is within window 204.

Figure 15:
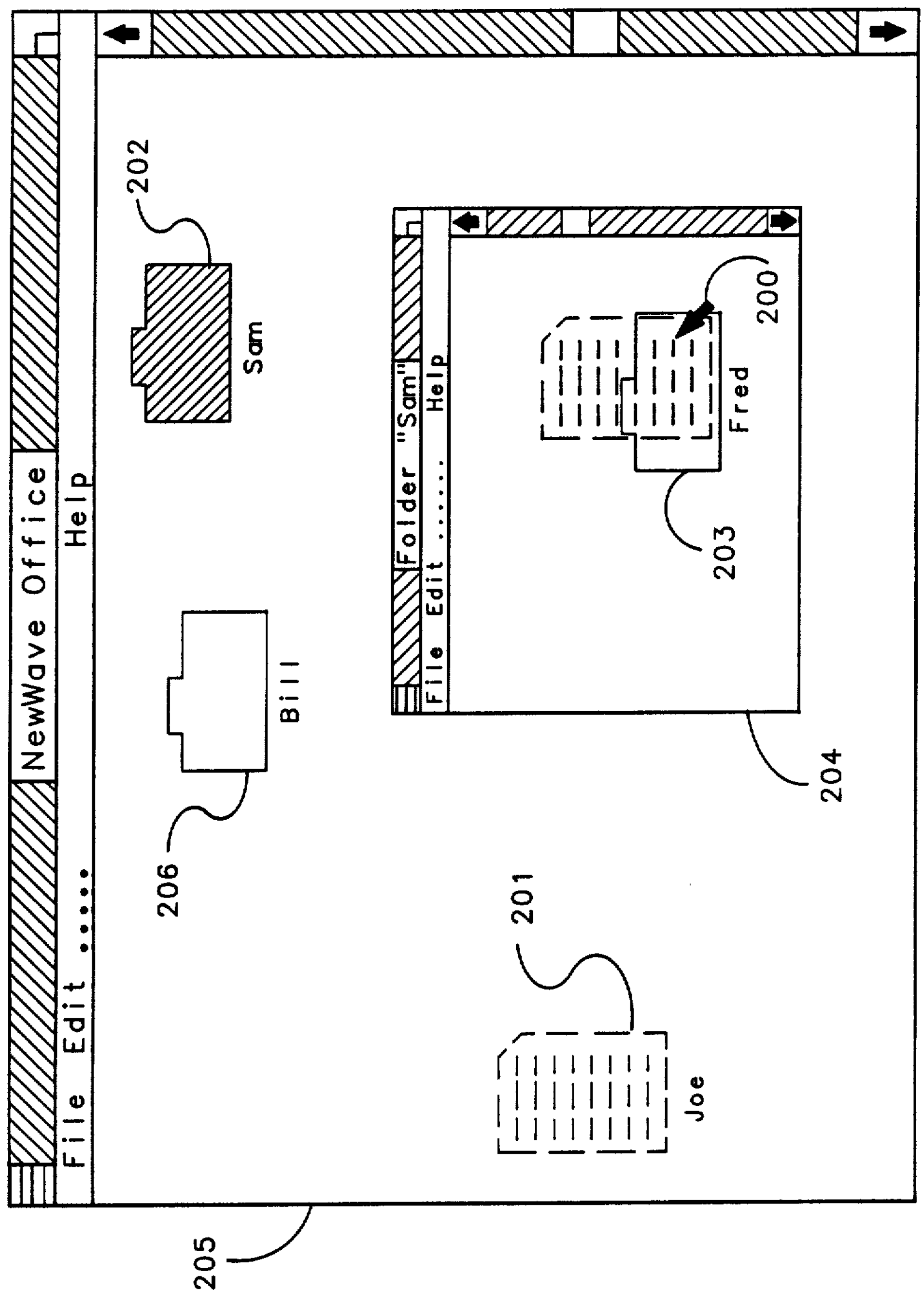

Similarly object "Joe" may be transferred to folder "Fred". In FIG. 15, cursor 200 is shown to be placed over folder "Fred" within window 204. When button 27 is released, action processor 101 generates a semantic command "MOVE_TO Folder 'Fred' WITHIN Folder 'Sam'". The semantic command is passed to command processor 102, which causes the previously selected object "Joe" to be transferred to folder "Fred" within Folder "Sam". The semantic command is also received by return interface component 147 and sent to translate to external processor 129.

Translate to external processor 129 puts the command in external form in the following manner. Translate to external processor 129 sends an "API_INTERROGATE_MSG". The function of the message is "API_WHATS_INSERTABLE_AT_FN". As a result of this message, translate to external processor 129 receives a return message indicating that folder "Fred" is at the location of cursor 200. Translate to external processor sends another "API_INTERROGATE_MSG". The function of the message is "API_WHO_ARE_YOU_FN". As a result of this message, translate to external processor 129 receives return data indicating that folder "Sam" is at the location of cursor 200.

Figure 16:
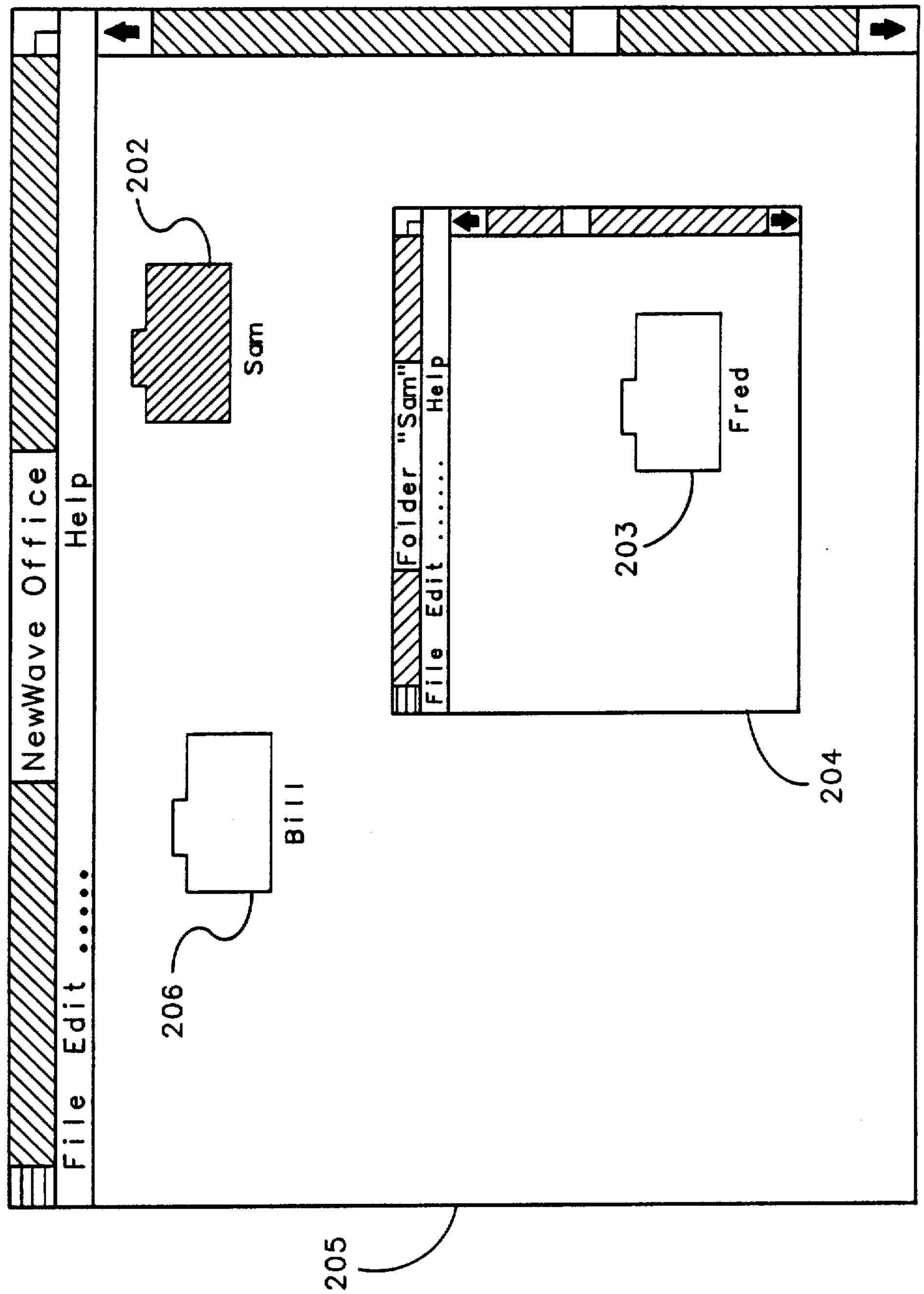
Figure 17:
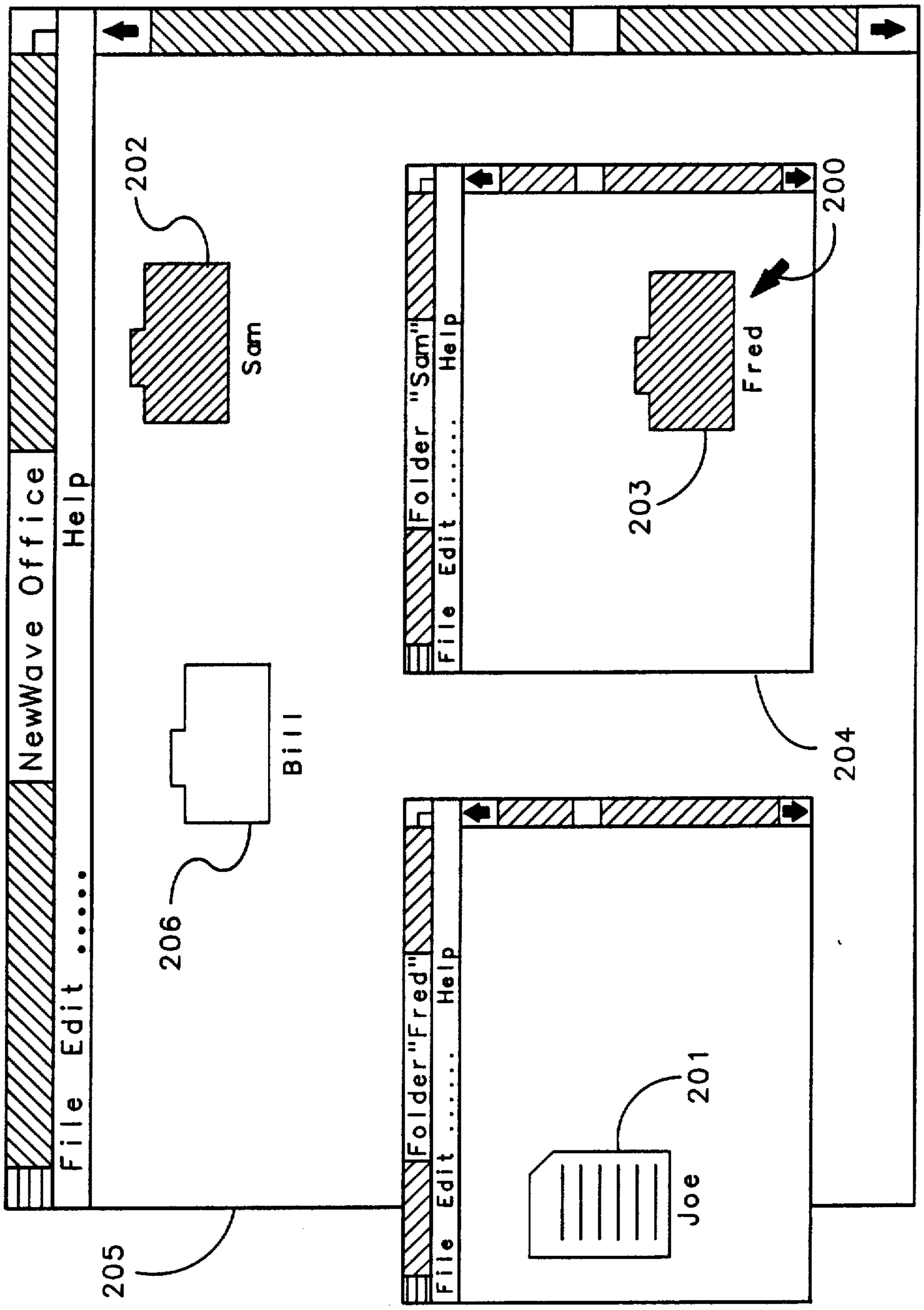

At this time translate to external processor is able to send the command in external form through API 130 to class independent recorder 125 and thus to class dependent recorder 126. Class dependent recorder 126 records the external command in task language file 131. FIG. 16, shows the completed transfer, object "Joe" is in folder "Fred". When folder "Fred" is opened, as shown in FIG. 17, object "Joe" may be seen.

Figure 18:
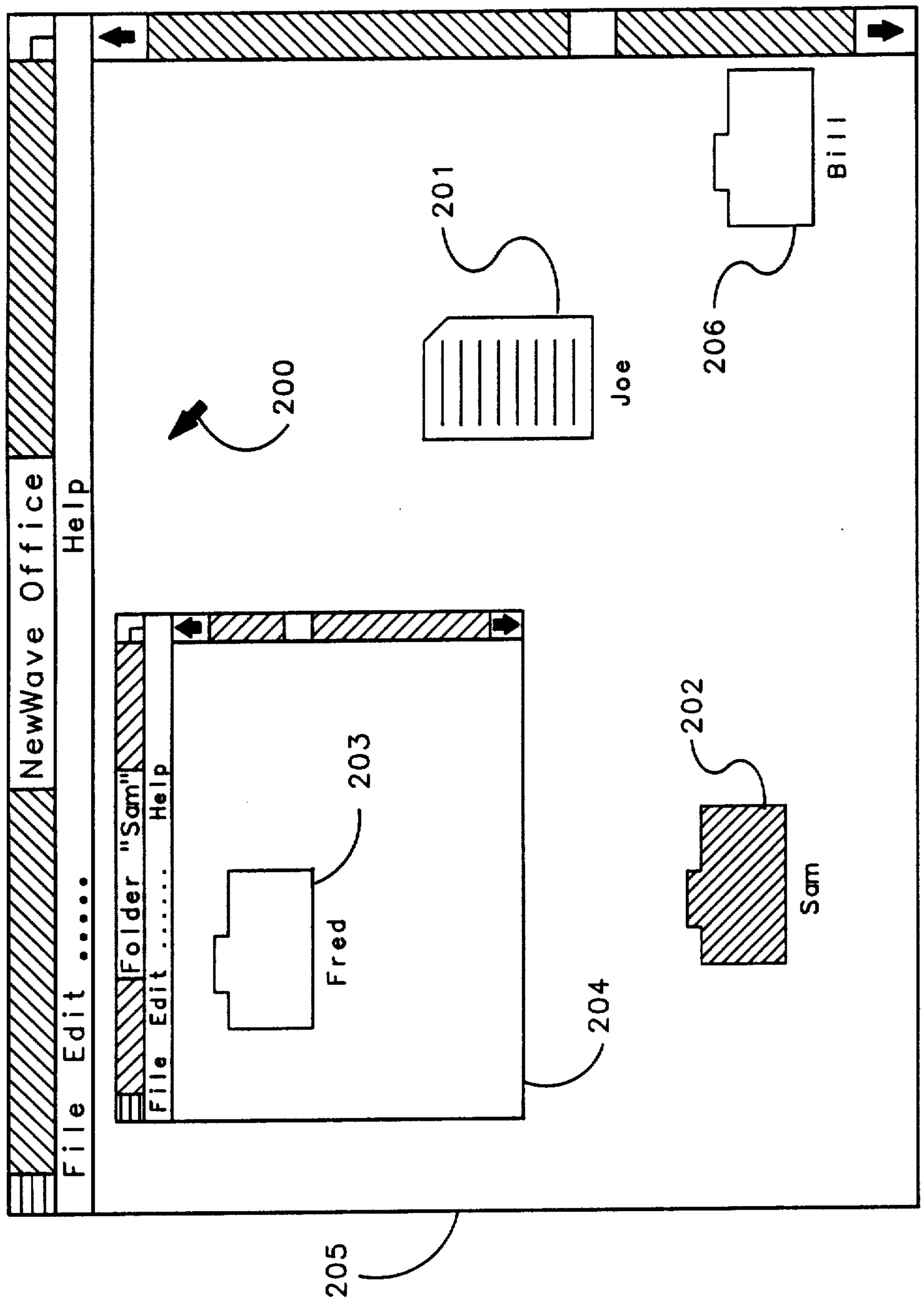

Once in a task language file, the commands which transferred object "Joe" to folder "Fred", may be played back. For instance, suppose window 205 appears as in FIG. 18. Since window 204, object text "Joe" and folder "Fred" are all in different locations within window 205, a mere playback of syntactic user actions would not result in object "Joe" being placed within folder "Fred". However, what was recorded was not syntactic user actions but rather semantic commands; therefore, playback of the semantic commands will cause object "Joe" to be placed within Folder "Fred".

Specifically, suppose a task language file contained the following commands:

FOCUS on Desktop "NewWave Office"
SELECT Document "Joe"
MOVE_TO Folder "Fred" WITHIN Folder "Sam".

Figure 5:
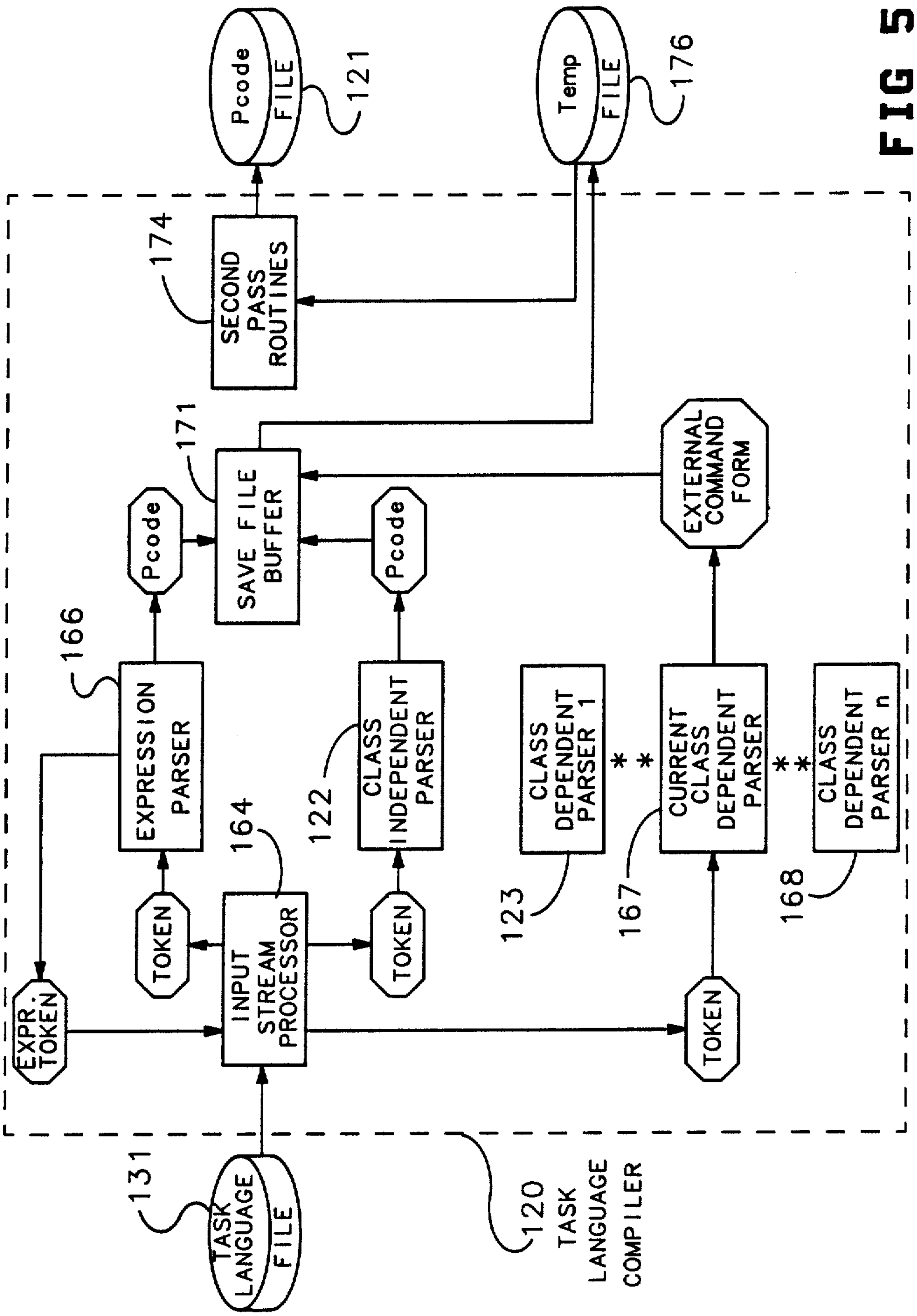
FIG. 5 is a diagram of a compiler in accordance with a preferred embodiment of the present invention.

The first command—FOCUS on Desktop "NewWava Office"—is a class independent command and, once compiled by a task language compiler 120 shown in FIG. 5, may be executed by agent 108. As will be further described below, the FOCUS command places the focus on the application "NewWave Office". This means that the task language commands are, if possible, to be treated as class dependent commands and sent to application "NewWave Office" for execution. For simplicity of discussion, the application "NewWave Office" is taken to be application 100.

The second and third commands—SELECT Document "Joe"—and—MOVE_TO Folder "Fred" WITHIN Folder "Sam"—are class dependent commands. These class dependent commands, once compiled by task language compiler 120 into pcode form, are received by agent engine 108. Agent engine extracts the class dependent commands in external form from the pcode form and sends the class dependent commands to application 100. User action interface component 145 of application 100 receives a message containing the external command and forwards the message to playback message test component 150. Playback message test component 150 ships the command to translate to internal processor 128. Translate to internal processor 128 translates the command from external form to internal form and returns the command in internal form to playback test component 150. The command in internal form is then sent through command interface component 146, through modal dialog box test component 152 through command test component 151 to command processor 102. Command processor 102 executes the command.

Agent 108 executes the command "FOCUS on Desktop 'NewWave Office'", by activating window 205. The position of cursor 200 is now determined with respect to the coordinates of window 205.

When command processor 102 receives the command "SELECT Document 'Joe'", command processor 102 causes object "Joe" to be selected. Since object "Joe" is within window 205 no additional interrogation is necessary.

When constructing the internal command form for the command "MOVE_TO Folder 'Fred' WITHIN Folder 'Sam'", translate to internal processor 128 sends an "API_INTERROGATE_MSG" to each open window. The function of this message is "API_WHO_ARE_YOU_FN".

When the window for Folder "Sam" receives this message, it responds with "Folder 'Sam'". Translate to internal processor 128 sends another "API_*INTERROGATE*_MSG". The function of this message is "API_WHERE_IS_FN". Folder "Fred" is included as a parameter. The message is forwarded to folder "Sam" which returns data indicating the coordinates of folder "Fred" within window 204. Translate to internal processor 128 then generates the internal form of the command MOVE_TO 'Fred' WITHIN Folder "Sam". Command processor 102 receives the command and transfers object "Joe" to folder "Fred".

Task language file 121 may be generated by compiled code written by a user, as well as by recording. In FIG. 5, data flow through a task language compiler 120 is shown. A task language file 131 includes commands written by a user. In the preferred embodiment of the present invention, the task language is written in accordance with the Agent Task Language Guidelines included as Appendix B to this Specification.

Task language compiler 120 is a two pass compiler. In the first pass the routines used include an input stream processor 164, an expression parser 166, a class independent parser 122, a save file buffer 171, second pass routines 174, and class dependent parsers, of which are shown class dependent parser 123, a class dependent parser 167 and a class dependent parser 168. As a result of the first pass a temporary file 176 is created.

Class independent parser 122 parses the class independent task language commands listed in Appendix B. Each application which runs on the system also has special commands which it executes. For each application, therefore, a separate class dependent parser is developed. This parser is able to parse commands to be executed by the application for which it is developed. Class dependent parsers may be added to or deleted from task language compiler 120 as applications are added to or deleted from the system.

When compiling begins, class independent parser 122 requests a token from input stream processor 164. Input stream processor 164 scans task language file 131 and produces the token. Class independent parser 122 then does one of several things. Class independent parser 122 may generate pcode to be sent to save file buffer 171. If class independent parser 122 expects the next token to be an expression, class independent parser 122 will call routine Make expression () which calls expression parser 166. Expressions parser 166 requests tokens from input stream processor 164 until the expression is complete. Expression parser 166 then generates pcode to be sent to file buffer 171 and then to be saved in temporary file 176. Additionally, expression parser 166 generates an expression token which is returned to input stream processor 164 . Input stream processor 164 delivers this expression to independent parser 122 when it is requested by independent parser 122.

As a result of a FOCUS command, a particular class dependent parser will have priority. Therefore, in its parsing loop, class independent scanner 122*a* will call the cass dependent parser for the application which currently has the focus. The class dependent parser will request tokens from input stream processor 164 until it has received a class dependent command which the semantic routines called by class dependent parser convert to external command form, or until the class dependent parser determines that it cannot parse the expressions that it has received. If the class dependent parser encounters an expression, it may invoke expression parser 166 using the call Make expression (). If the class dependent parser is unable to parse the tokens it receives, the class dependent parser returns an error and the class independent parser will attempt to parse the tokens.

A FOCUS OFF command will result in independent parser 122 immediately parsing all commands without sending them to a dependent parser. When a string of class independent commands are being parsed, this can avoid the needless running of dependent parser software, thus saving computing time required to compile the task language.

Figure 19:
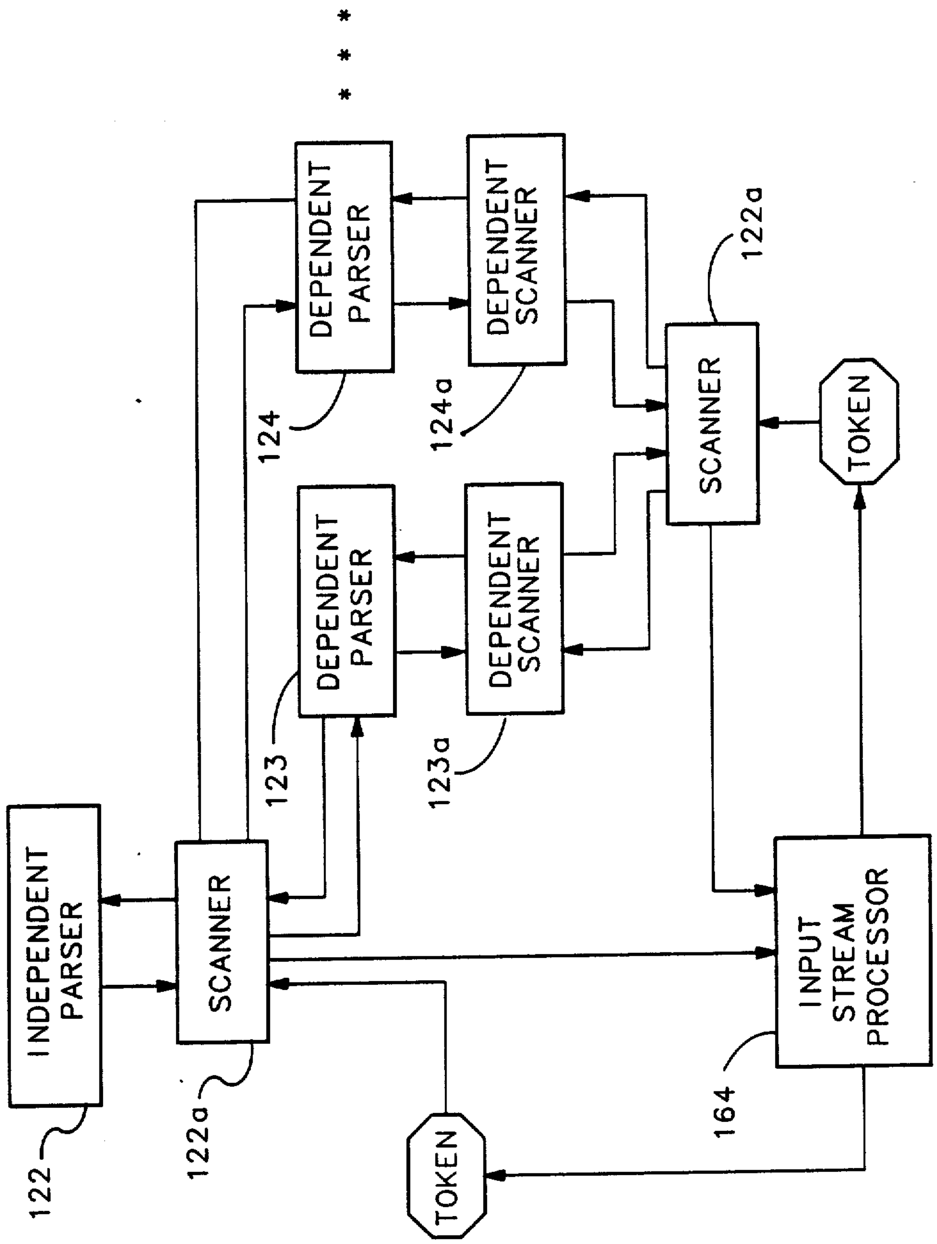
FIG. 19 shows data flow within the compiler shown in FIG. 5.

In FIG. 19 is shown data flow between independent parser 122 and dependent parsers of which dependent parser 123 and dependent parser 124 are shown. In order to focus the discussion on the relationship between parsers, calls to expression parser 166 by scanner 122*a* are not taken into account in the discussion of FIG. 19.

When independent parser 122 is ready for a token, independent parser 122 calls a scanner routine 122*a*. Scanner 122*a* checks if there is a focus on an application. If there is not a focus on an application, scanner 122*a* calls input stream processor 164 which returns to scanner 122*a* a token. Scanner 122*a* returns the token to independent parser 122*a*.

If there is a focus on an application, the dependent parser for the application has precedence and is called. For instance, when focus is on the application for parser 123, parser 123 calls scanner 122*a* through a dependent scanner 123*a*. Scanner 122*a* checks its state and determines that it is being called by a dependent parser, so it does nor recursively call another dependent parser. Scanner 122*a* calls input stream processor 164 which returns to scanner 122*a* a token. Scanner 122*a* returns the token to dependent parser 123 through dependent scanner 123*a*. Although the present implementation of the present invention includes dependent scanner 123*a*, in other implementations dependent scanner 123*a* may be eliminated and parser 123 may call scanner 122*a* directly.

Dependent parser 123 will continue to request tokens through dependent scanner 123*a* as long is dependent parser 123 is able to parse the tokens it receives. With these tokens dependent parser will call semantic routines which will generate class dependent external commands embedded in pcode. When dependent parser 123 is unable to parse a token it receives, dependent parser will return to scanner 122*a* an error. Scanner 122*a* then calls input stream processor 164 and receives from input stream processor 164 the token which dependent parser 123 was unable to parse. This token is returned to independent parser 122. Independent parser 122 parses the token and calls semantic routines to generate pcode for execution by agent 108. The next time independent parser 122 requests a token from scanner 122*a*, scanner 122*a* will again call dependent parser 123 until there is a FOCUS OFF command or until there is a focus on another application.

When the focus is on the application for dependent parser 124, scanner 122*a* will call dependent parser 124. Dependent parser 124 calls a dependent scanner 124*a* and operates similarly to dependent parser 123.

Save file buffer 171, shown in FIG. 5, receives pcode from class independent parser 122 and from expression parser 166, and receives external command forms embedded in pcode from class dependent parsers. Save file buffer 171 stores this information in a temporary file 176. Second pass routines 174 takes the pcode and external command forms stored in temporary file 176 and performs housekeeping, e.g., fixes addresses etc., in order to generate task language file 121.

Appendix A contains an Introduction to API 130 (Programmer's Guide Chapter 4).

Appendix B contains guidelines for developing agent task language (Agent Task Language Guidelines).

Appendix C contains a description of Task Language Internals.

Appendix D contains description of API_INTERROGATE_MSG.

Appendix E contains a paper entitled "Extensible Agent Task Language".

Appendix F contains a listing of independent parser 122.

APPENDIX A

HP NewWave Environment: Programmer Guide

HEWLETT PACKARD

Manual Part No.
D1701-90002

Notice

The information contained in this document is subject to change without notice.

Hewlett-Packard makes no warranty of any kind with regard to this material, including, but not limited to, the implied warranties of merchantability and fitness for a particular purpose. Hewlett-Packard shall not be liable for errors contained herein or for incidental or consequential damages in connection with the furnishing, performance, or use of this material.

Hewlett-Packard assumes no responsibility for the use or reliability of its software on equipment that is not furnished by Hewlett-Packard.

This document contains proprietary information which is protected by copyright. All rights are reserved. No part of this document may be photocopied, reproduced, or translated to another program language without the prior written consent of Hewlett-Packard Company.

Microsoft® and Microsoft® Windows, and MS-DOS® are registered trademarks of Microsoft Corporation.

©1988 by Hewlett-Packard Co.

Personal Software Division
3410 Central Expressway
Santa Clara, CA 95051, U.S.A.

Printing History

First Edition—March, 1988

Printed in U.S.A.

Table of Contents

Chapter 1: Introduction to the HP NewWave Environment

HP NewWave Developer Kit - Overview . . . . 1-1
The Programmer Guide . . . . . . . . . . . 1-2
The HP NewWave Environment - What it Offers Users . . . . . . . . . . . . . . 1-4
The HP NewWave Environment - What it Offers Developers . . . . . . . . . . . . 1-5
The Sample Applications . . . . . . . . . . . 1-8

Chapter 2: Introduction to the OMF

Overview of the OMF . . . . . . . . . . . . 2-1
Object Definitions . . . . . . . . . . . . . . 2-4
Properties . . . . . . . . . . . . . . . . . . 2-10
Messages and Methods . . . . . . . . . . . . 2-12
OMF Links . . . . . . . . . . . . . . . . . 2-15
View Specifications . . . . . . . . . . . . . 2-21
Destination Specification . . . . . . . . . . 2-23
Source Specification . . . . . . . . . . . . 2-23
OMF View Specification . . . . . . . . . . 2-23
Snapshots . . . . . . . . . . . . . . . . . . 2-28
Maintaining A View . . . . . . . . . . . . . 2-32
Actions Performed on Objects . . . . . . . . 2-34
Serialization / Deserialization of Objects . . . . 2-39
OMF Function Summary . . . . . . . . . . . 2-40
OMF Message Summary . . . . . . . . . . . 2-45
OMF Property Summary . . . . . . . . . . . 2-48

Chapter 3: Adding OMF Functionality to an Application

Listing of SHAPE.C . . . . . . . . . . . . 3-3
Transforming SHAPES into an Object: Overview . . . . . . . . . . . . . . . . 3-7
Changes to the User Interface . . . . . . . . 3-8
Communicating with the OMF . . . . . . . . 3-11
OMF Control of the Life Cycle . . . . . . . . 3-14
Binding a Data File to HPSHAPE . . . . . . . 3-21
Listing of HPSHAPE . . . . . . . . . . . . . 3-25
Compiling, Linking, and Installing . . . . . . . 3-33
Compiling and Linking HPSHAPE . . . . . . . 3-36
HPSHAPE Installation . . . . . . . . . . . . 3-38
Debugging . . . . . . . . . . . . . . . . . . 3-41

Chapter 4: Introduction to the API

Overview of the API . . . . . 4-1
The API Facilities . . . . . 4-3
The API Modes . . . . . 4-5
Messages to your Application . . . . . 4-6
Designing a Task Language . . . . . 4-8
The Application Architecture . . . . . 4-13
Message Handling in API Applications . . . . . 4-22
How Your Application Responds to Different Modes . . . . . 4-30
API Function Summary Tables . . . . . 4-39
Summary of API Components . . . . . 4-43

Chapter 5: Adding API Functionality to an Application

Designing the Task Language . . . . . 5-2
Designing the Commands . . . . . 5-4
Designing a Skeleton Window Procedure . . . . . 5-6
Designing an Action Processor . . . . . 5-7
Designing a Command Processor . . . . . 5-9
Adding API Initialization and Termination . . . . . 5-11
Designing a Translate To External Processor . . . . . 5-14
Designing a Translate To Internal Processor . . . . . 5-15
Adding API Mode Flags . . . . . 5-16
Adding Recording Functionality . . . . . 5-17
Adding Playback Functionality . . . . . 5-19
Adding Monitoring Functionality . . . . . 5-20
Adding Interrogation Functionality . . . . . 5-23
Adding Error Handling . . . . . 5-25

Chapter 6: Encapsulation: Integrating Applications into the NewWave Environment

Encapsulating Applications . . . . . 6-2
Functionality of an Encapsulated Application . . . . . 6-5

Chapter 7: Agent Task Language

Appendix A: Programmer Guide Glossary

Appendix B: HPSHAPE Listing

Appendix C: Agent Test Tool

1 Introduction to the HP NewWave Environment

HP NewWave Developer Kit - Overview

The HP NewWave Developer Kit is a set of tools for application developers to write software for the NewWave Environment. It consists of:

- The HP NewWave development software for developing applications.
- "The HP NewWave Environment: Programmer Guide" explains how to develop NewWave applications.
- "The HP NewWave Environment: Design Examples" provides descriptions with examples for implementing NewWave features.
- "The HP NewWave Environment: Programmer Reference Manual" contains detailed specifications for all NewWave functions, macros, and messages as well as other reference material.
- "The HP NewWave Environment: User Interface Guidelines" presents the standards to keep in mind when designing a user interface to keep it consistent with other NewWave applications.
- "The HP NewWave Environment: Writer Style Guide" provides guidelines for technical writers designing manuals for NewWave applications.
- Application Examples include the source code on diskette for three sampl applications: HPSHAPE, HPTEXT, and HPLAYOUT. These can be usec for learning or as skeleton applications for writing new application programs.

It is assumed that readers of these manuals have a solid background in MS-DOS, Microsoft Windows, and the C language.

The Programmer Guide

This manual, "The HP NewWave Environment: Programmer Guide" consists c the following chapters.

Chapter 1 - Introduction

Chapter 1 describes the Programmer Kit in general; the contents of the Programmer Guide; and provides an overview of the HP NewWave Environment.

Chapter 2 - Introduction to the OMF

Chapter 2 provides the concepts behind using the Object Management Facility (OMF).

Chapter 3 - Adding OMF Functionality to an Application

This manual uses the sample application HPSHAPE as a running example to demonstrate the steps in transforming a Windows application (the Windows version of SHAPES) into an application with NewWave functionality (HPSHAPE). In this chapter, the OMF theory derived from Chapter 2 is applied towards adding OMF functionality to the SHAPES.

Chapter 4 - Introduction to the API

Chapter 4 describes how the Application Program Interface (API) enables yoı to incorporate NewWave task automation, help servicing, and computer basec training into your software. It includes a description of the application architecture; a summary of the API functions, macros, and messages; and actual NewWave code components that you can insert into your applications.

Chapter 5 - Adding API Functionality to an Application

Chapter 5 builds on the running example HPSHAPE. It takes the intermediate version of the example (i.e., the Windows version with object handling capabilities) and shows what needs to be done to access the features provided by the API.

Chapter 6 - Integrating Existing Applications into the HP NewWave Environment Chapter 6 describes what must be done to integrate existing MS-DOS and Windows applications into the HP NewWave Environment.

Chapter 7 - The Agent Task Language

Chapter 7 describes the elements of an Agent Task Language for your application.

Appendix A - Glossary

The Glossary contains definitions for terms used to describe NewWave elements.

Appendix B - HPSHAPE Listing

This is a complete listing of the code for the HPSHAPE sample program.

Appendix C - API Test Tool

This describes the API Test Tool which permits you to incorporate API functionality prior to the final release of the API.

The HP NewWave Environment - What it Offers Users

The HP NewWave Environment provides a consistent user interface. The user interface is based on an object-oriented model comprised of intuitive operations. It is capable of multi-tasking, context-switching, and graphical manipulation of data.

The HP NewWave Environment allows the user to focus on tasks instead of the tools needed to perform those tasks. This objective is achieved through the concept of objects. Objects permit binding the information with which the user is working to the application programs that can operate on this information.

Another special feature of the HP NewWave Environment is the ability to move information between objects. It is very easy for a user to take information from one object, say a spreadsheet, and include it in the report. The move can be a simple copy in which the information moved will not change, or it can be shared dynamically so that if the spreadsheet data changes, the report will change accordingly.

The HP NewWave Environment also permits the user to set up macros, referred to as "Agent Tasks". These Agent Tasks can be invoked directly by the user or can be triggered automatically by an event, such as a time setting.

The HP NewWave Environment provides the user with a variety of help services. Help information can be obtained by selecting an item from a pull-down menu or by positioning the "help" cursor on the item in question.

With NewWave's computer-based training, the user can receive on-line, interactive training for software applications.

While there is no formal user documentation yet, we think you will find it easy to get around the HP NewWave Environment, particularly if you are familiar with Windows. There is a full set of on-line help instructions provided. We encourage you to try out all the features. There is one caveat, however. There may be some references to the "Desktop", the old name for the main window. In future releases, this name will be changed to the "NewWave Office".

The HP NewWave Environment - What it Offers Developers

For the developer, the HP NewWave Environment provides the benefits of a consistent user interface, data interchange, and an object protocol that promotes "forward compatibility" with future applications and system developments. This is possible because the HP NewWave Environment was developed on top of the Microsoft Windows 2.0 environment. The Windows environment offers a graphics-oriented user interface, multi-tasking, and hardware independence.

To understand the significance of the HP NewWave application architecture, it is useful to take a look at conventional MS-DOS and Windows applications.

Traditional MS-DOS applications take complete control of the system. When one application is running, no other application may run in the background. Thus, the user has one connection to the system, through a single application executing on the screen.

Under the traditional MS-DOS type of system, the user interacts with the application, and that application interacts directly with the hardware of the system. Although the application runs on top of MS-DOS, some applications bypass MS-DOS and interface directly with the hardware, causing portability and maintenance problems. For example, an application specifically written for an EGA monitor cannot be moved to another system with a different type of monitor unless it is re-coded.

In addition to designing an application's basic features, developers of conventional applications need to devote a lot of time to special features such as the user interface, graphics, help, and macros.

In order to demonstrate how the NewWave application architecture works, it is useful to compare the architecture of a typical Windows application (shown in Figure 1-1) with the architecture of a NewWave application (shown in Figure 1-2). Windows serves as an interface between the user and the application, providing many benefits to both the developer and the user. It enables the developer to isolate himself from the details of the hardware and provides a graphical user interface. Thus, the user is somewhat "protected" from the cryptic world of MS-DOS. Windows also provides a consistent user interface throughout all of the applications that run in the Windows environment.

Windows does however have its limitations in that it does not give the developer a means to provide services, such as help or task automation. In addition, both the developer and user are confined to the "file model". They must know the names of the files that contain their information, which directory and drive the file is located on, and any individual extensions the filename may have. The users also need to know which application corresponds to a file.

The HP NewWave Environment is built on the Microsoft Windows 2.0 standard. In the HP NewWave Environment, the developers only need to provide the basic feature set for their applications. The HP NewWave Environment provides the user interface components, graphical interface, help and macro support. As shown in Figure 1-2, a NewWave application uses Windows as an interface between the user and the application like a conventional application. In addition, NewWave application uses the OMF to take care of objects and goes through the API to access the Help, Agent, and CBT facilities.

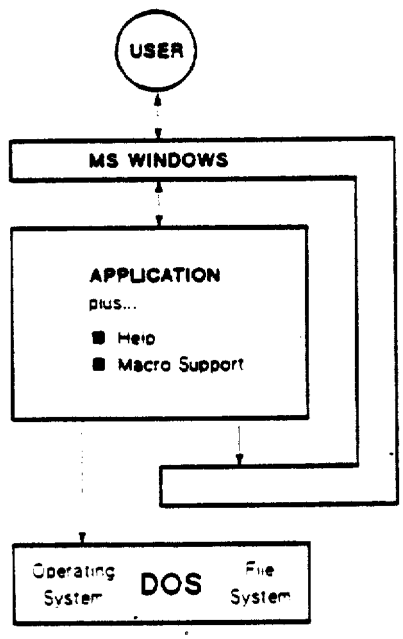

Figure 1-1. Architecture of a Typical Windows Application

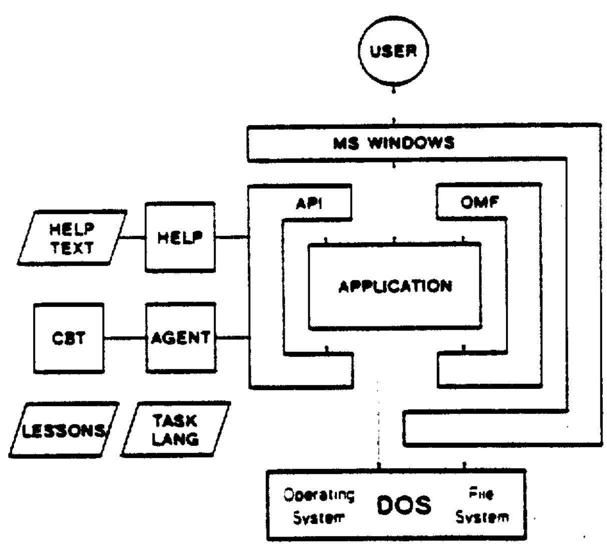

Figure 1-2. Architecture of a Typical NewWave Application

The Sample Applications

There is no formal documentation for the sample applications: HPSHAPE, HPTEXT, and HPLAYOUT; however, each is equipped with on-line help instructions.

HPSHAPE is the main model employed in this manual for teaching concepts. I is based on the Windows program "SHAPES". It allows you to select a shape from a menu and display that shape in a window. There is a complete listing of HPSHAPE in Appendix B of this manual.

HPLAYOUT allows the user to include selected objects inside the HPLAYOUT window. It is a typical "destination object" (this is described in Chapter 2).

HPTEXT displays a fixed piece of text. The user can select a portion of the tex and can include that text in the HPLAYOUT window. HPTEXT is a typical "source object" (this is described in Chapter 2).

2 Introduction to the OMF

Overview of the OMF

In conventional MS-DOS applications, a user types a command to start the application, waits for the application to start up, and then accesses the file to be worked on. In NewWave, this is a one-step process; the user double clicks on a object and the application is brought up automatically with the file to be worke on.

The main purpose of the Object Management Facility (OMF) is to perform the "housekeeping" necessary to provide the end user with an easy to use, object-oriented environment. Specifically, the OMF performs the following functions:

- Binds an object's data to an application's executable file and creates a running process of that application whenever the object is accessed;
- Keeps track of relationships between objects so that related objects can be treated as a single entity when copied, mailed, or destroyed, and so that objects are notified when associated objects have changes;
- Manages communication between objects through a set of defined messages;
- Maintains data files for the objects. The OMF provides a unique root file name for an object (typically a number, such as 000039) and stores the object's files in a special directory. The application can use its own unique file extensions. This frees the user from having to worry how files are stored by MS-DOS.

This chapter is divided up into the following sections:

Object Definitions - Describes the different classifications and types of objects.

Properties - Defines class-level and object-level properties, property names, and property formats.

Messages and Methods - Defines messages and methods and discusses what happens when a message is sent and received. Identifies required methods and optional methods and describes class-specific methods.

OMF Links - Defines links, parent and child objects, simple links, and views in terms of both data passing and visual views.

View Specifications - Discusses the specific items that must be in place in order for a view to work.

Snapshots - Defines snapshots and how they relate to dynamic access library objects.

Maintaining a View - Describes the communication between objects that must take place when a view is to be updated or deleted.

Actions Performed on Objects - Describes what can happen to an object from its creation through normal interaction to its removal from the system.

Serialization - Describes the serialization and deserialization of objects.

OMF Function Summary - Provides summary tables for all OMF functions.

OMF Message Summary - Provides summary tables for all OMF messages.

Object Property Summary - Provides summary tables for OMF class and object properties.

Throughout this chapter, we will be referring to the example depicted in Figure 2-1. In the example, there is a report folder in the NewWave Office window. In the folder, there are two reports produced by a word processing program (WORDPROC.NWE): "Financial Report" and "Annual Report". Financial Report uses three columns of data from a spreadsheet object entitled "6 Months Sales", produced by a spreadsheet program (SPREAD.NWE). Annual Report includes "Sales Chart" which is produced by a graphics program (CHART.NWE). Sales Chart is derived from one column of data from the same spreadsheet "6 Month Sales". Note that all of the application programs used in the examples in this chapter are fictitious names and are used for illustration purposes only.

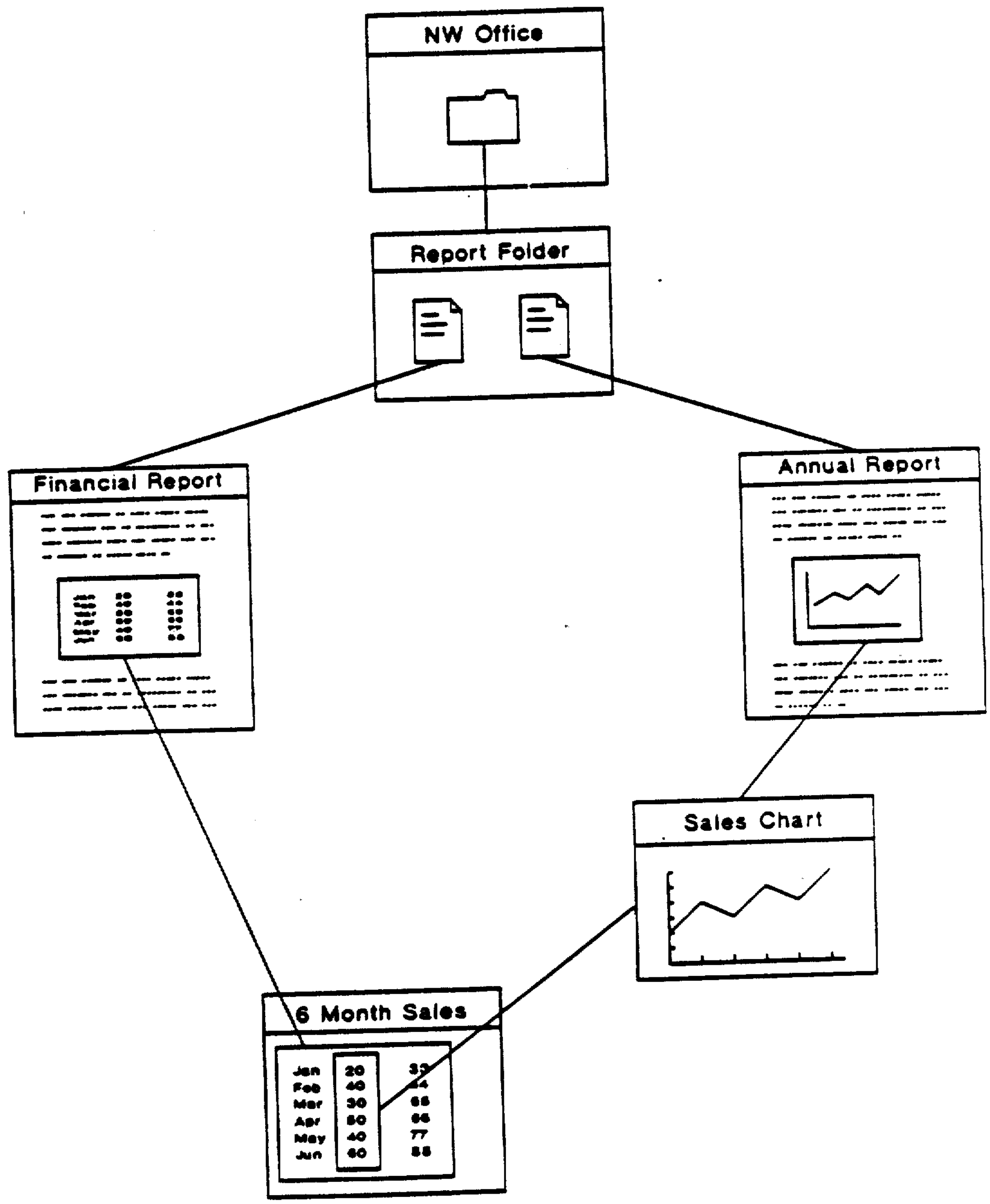
Figure 2-1. Example Scenario

Object Definitions

In the NewWave environment, an *object* is an entity comprised of data (stored in one or more data file(s)) and the name of an executable file that can interpret the data files. It is the job of the OMF to know which application works with a particular set of information. Objects that are bound to the same application are considered to be of the same *class*.

Figure 2-2 illustrates one way to think of an object, that is, as an entity that is part application (WORDPROC.NWE) and part data, and associated with the window that the user sees. The object has properties related to its application referred to as class properties, and it has unique properties referred to as object properties. This is described in detail later in the chapter. In Figure 2-3, the objects from the example are shown connected to the data windows that the user sees.

An important feature of an object is that its data is contained within the object, i.e., the form of the data is known only to that object's executable code. Changes cannot occur to the data except through the interface supplied by the object's code.

In general, an object is represented on the screen as an icon when it is in a closed state. After a user opens the object's icon, the icon is grayed and a window displaying its data appears in the NewWave Office.

The two major classifications of objects are system objects and user objects. Object types are described in detail in the text that follows.

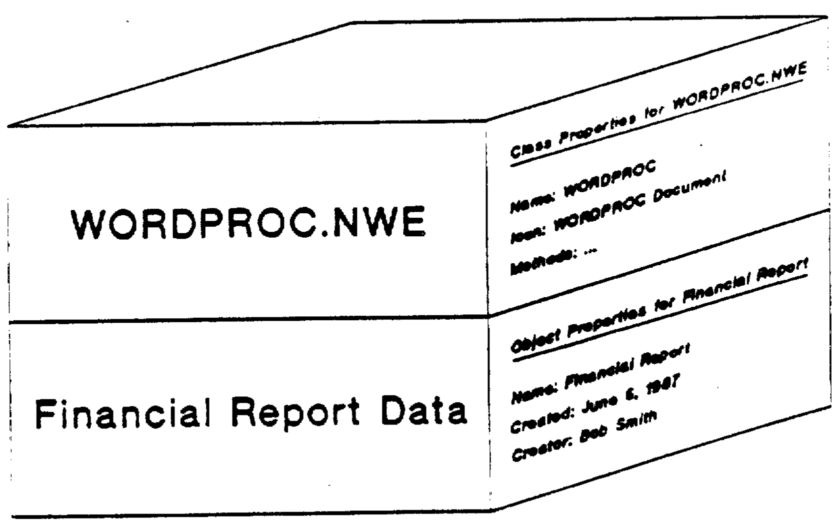

Figure 2-2. Artist's conception of an Object

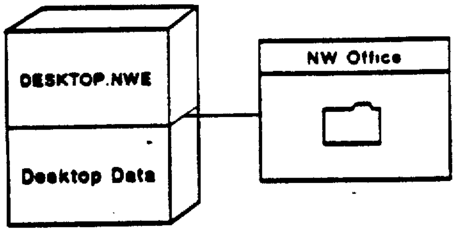

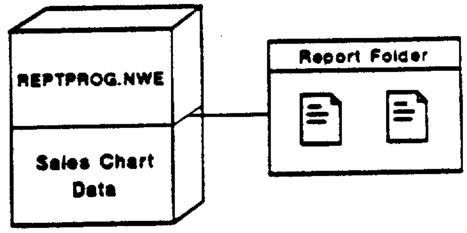

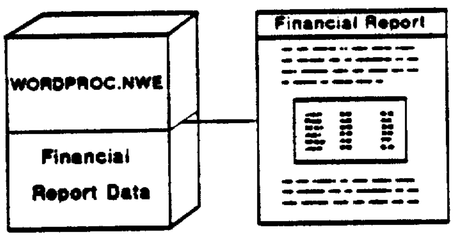

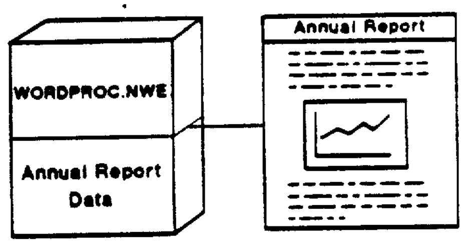

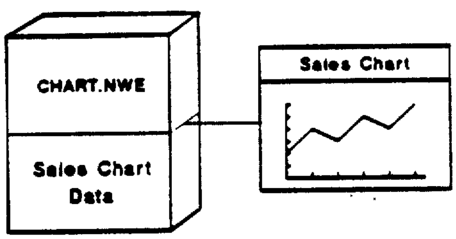

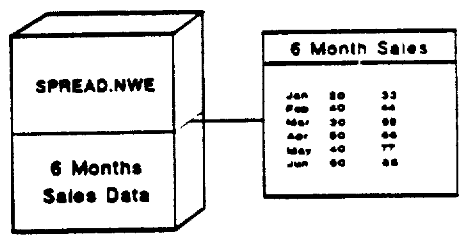

System Object Classification

A *system object* represents a single fixed resource in the NewWave system. System objects cannot be cut, copied or shared by the user. The NewWave Office, the File Drawer, and the Waste Basket are all system objects. In general, the NewWave Office displays the icons of system objects; however they can be accessed by any application through OMF function calls. System objects are installed and de-installed on the user's system by selecting the desired objects through the NewWave Office's Manage Tools command of the Settings menu.

There are two types of system objects: system tools and system containers. A *system tool* is a general utility application, such as a calculator or a popup calendar. System container objects are described below under the "Container Objects" heading.

User Object Classification

In contrast to system objects, a user has complete control over user objects. A *user object* can be freely created, copied, or destroyed by the user.

Container Objects

*Container objects* hold other objects. A container object shows the icons and/or titles of the objects that it contains.

A folder is an example of a *user container object*. It contains user objects and possibly other file folders. In Figure 2-4, the report folder from the example is shown. It is a typical example of a user container object.

The File Drawer and Waste Basket are examples of *system container objects*. System containers generally exist to perform some operation on the objects they contain or to hold objects created by the system itself (as well as user objects).

When a container object includes another object, the container shows an icon and/or title as a representation of the inclusion. The container obtains this information from the OMF and does not need to call the application code associated with the included object.

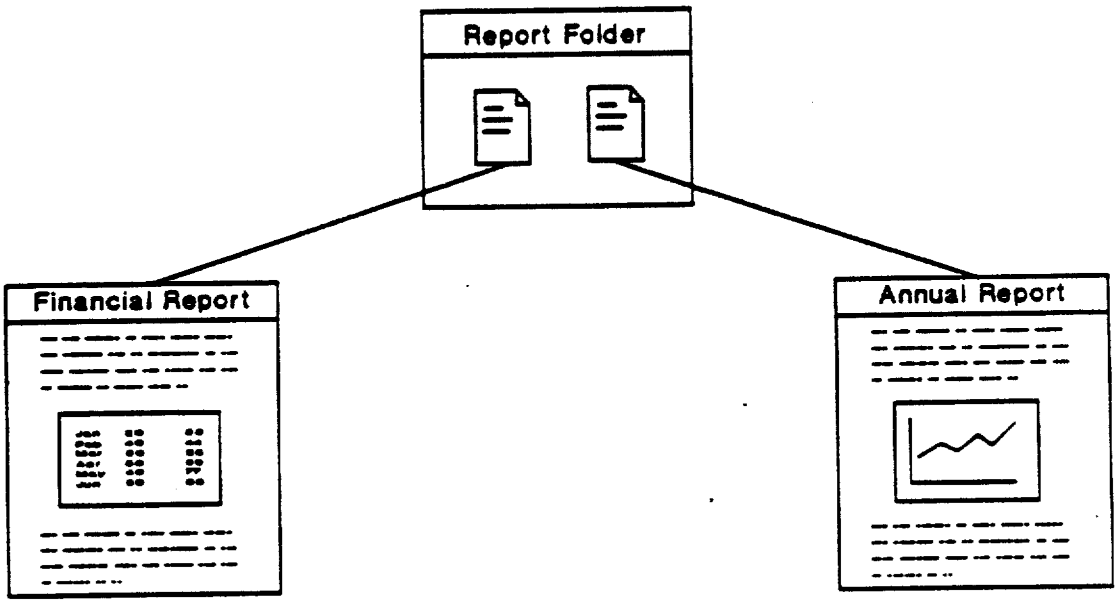

Figure 2-4. Example of a Container Object

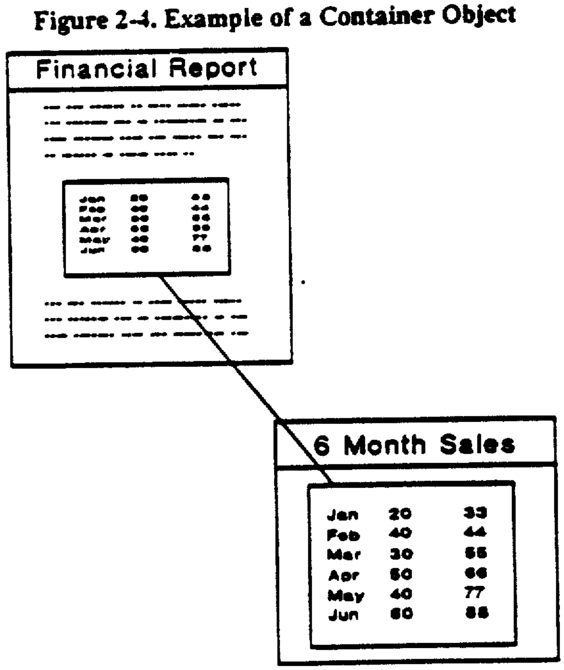

Figure 2-5. Example of a Compound Object

Data Objects: Simple and Compound

*Data objects* are user objects that directly hold actual data. They are tied to more "traditional" applications, such as spreadsheets, word processors, and graphics programs.

Data objects come in two types: simple and compound.

A *simple data object* contains "homogeneous" data, that is, all of the data is bound to the same application and can be edited without references to other objects.

When a data object includes another object, it is referred to as a *compound object* or *composite object* (the terms are synonymous). Figure 2-5 shows a typical compound object, the Financial Report from our example. It fits the definition of a compound object because it includes data from the spreadsheet.

As opposed to simple data objects, compound objects must have the ability to include other objects. A compound object must be able to respond to commands as if it were a single entity. For example, when a compound object receives a message to print itself, it must notify all of the objects that it contains.

Examples of Object Types

The different types of objects are summarized in the table below:

Table 2-1. Types of Objects

| Object Type | Object Classification | Example |
|---|---|---|
| System Container | System | File Cabinet, Waste Basket, NewWave Office |
| System Tool | System | Calculator, Calendar |
| User Container | User | Report Folder |
| Simple Data | User | "6 Month Sales" spreadsheet |
| Compound Data | User | "Annual Report", "Financial Report", "Sales Chart" graph |

Note that the "Sales Chart" graph fits the definition of a compound object, because it includes data from the "6 Month Sales" spreadsheet.

Properties

The NewWave environment has defined characteristics of objects that are referred to as *properties*. These properties are assigned by you as a software developer depending on which characteristics you want your objects to have. You can also define your own set of properties and assign them as needed.

All properties consist of a name and a value. Property names can be standard NewWave names, numbers, or text strings. Property values can be any data structure and are determined by the nature of the property. There are two different categories of properties: class and object.

The properties of a particular object can be accessed by other objects through the functions, OMF_ReadProperty and OMF_WriteProperty.

Class Properties

The *class properties* for an object are the characteristics that carry over to each and every object associated with the same application.

Once a class is defined and installed on the NewWave Office, the icon representing that class is shown in the "Create A New..." dialog box of the NewWave Office. Typical class properties include the name of the class, the name of the icon, the methods supported by the class, etc. (For a complete list of the standard class properties, refer to the OMF Property Summary Tables section at the end of this chapter.)

Object Properties

*Object properties* relate to the unique characteristics of a particular object. For example, both the Annual Report and the Financial Report are represented by the same kind of icon in the NewWave Office window, meaning that they are of the same class. However, they do have different object property information, such as their titles, user comments, date and time of creation, the user who created the object, etc. These are all typical object properties. (For a complete list of the standard object properties, refer to the OMF Property Summary Tables section at the end of this chapter.)

The object properties are used by the OMF and other applications to determine how the object behaves and/or its characteristics.

Property Names

Each object and class property has a name. Property names are assigned by the application developer and can be 1. a pre-defined standard property name from the include file "NWOMF.H", e.g., PROP_TITLE,
2. a private numeric name, e.g., 0xFFFF0801, or
3. a null terminated string, e.g., "Position".

The pre-defined and numeric names are actually special DWORD numbers with -1 in the HIWORD and an integer ID in the LOWORD. (Note that if the 0x8000 bit is set in the ID, the property is not transferred if the object is copied or mailed. This is useful if a property is not appropriate for a transferred version of the object. The bit should not be used on a class property.) The advantage of using numeric names is in space savings, since they only require one DWORD.

Private numeric names must be greater than or equal to PROP_USERDEFINED (equal to 0x800) to avoid conflict with the pre-defined names.

String property names are case sensitive; property "Doc" is not the same property as "doc". If the first letter of the property name is a dollar sign ($), the property is protected from being transferred as in the 0x8000 bit described above for predefined and numeric names. String property names must be at least 5 characters long to avoid collisions with numeric names. The advantage of using string property names is the uniqueness of the name.

Private numeric and string property names should only be used to access an object's own object and class properties. This is to avoid conflicts over use of the same property names.

In general, there are performance and storage space advantages to using private numeric names rather than strings.

Property Formats

Property values can be any kind of data up to 32,767 bytes in length. There are three general formats:

1. Null-terminated character strings,
2. Binary data structures of various kinds, and
3. Existence, that is, using the existence of a propery to represent a TRUE value and non-existence to represent a FALSE value.

The formats of the standard properties are described in detail in the "HP NewWave Environment: Programmer Reference Manual".

Messages and Methods

The OMF provides the ability for objects to communicate with each other (or with the OMF itself) via messages.

The code that an object executes in response to a specific type of message is called a *method*. Saying that an object has an "X" method simply means that it knows how to process the "X" message.

Sending Messages

By sending a message, one object can cause another object to perform a particular task without the sender having to know what kind of object is being asked to perform the task. The actual code executed when a message is received depends on the kind of object receiving the message. For example, i message to print is received by a word processing object like "Financial Repoi the word processor code for printing the document is executed. If the same message is received by "6 Month Sales" (the spreadsheet object) the spreadsheet program code for printing is executed. When new object types ar added to the system, they become fully integrated into the system and only ne to respond to appropriate messages.

Sending a message to an object is very similar to calling a subroutine in the receiving application. In fact, like all messages in Windows, messages are accepted by the receiving application's main window procedure. Control flov exactly the same as with a procedure call, including the possibility of the receiver sending messages back to the sender while processing the message. Recursion, both direct and indirect, is possible. Deadlock cannot occur, beca the sender is re-entered to process messages even while waiting for the retur of a message it has sent. On the other hand, stack overflow can occur and should be guarded against.

Basically, the message processing scheme described above is a behavior protocol. This protocol is independent of specific objects, thus providing a consistent behavior between objects. Therefore, applications are modular. They all follow the same rules for message passing. The protocol is also extensible, allowing for an application to create specific messages for its own application to process without restructuring the basis of the OMF.

Receiving Messages

As discussed above, the code that an object executes when it receives each type of message is referred to as a method. The application must state which methods its class of objects supports, and be able to process the messages that it receives. To get an idea of the methods that an application could potentially support, refer to the OMF Message Section at the end of this chapter.

To inform the OMF that your application knows how to respond to specified message types, you must:

1. Provide code to respond to the HAS_METHOD message, and
2. List the method types in the HAVE_METHODS section of your installation file (installation files are described in detail in Chapter 8 of the "HP NewWave Environment: Programmer Reference Manual").

The HAS_METHOD message is sent to your application to ask if it can handle a specific OMF (or your own defined) message. Either METHOD_PRESENT or NO_METHOD is returned, depending on whether or not it supports that method.

HAVE_METHODS is an installation file command and is applied when your application is first installed. By listing a method type in HAVE_METHODS, you enable other applications to use the function OMF_GetMethod to see if a method is handled by your application.

Depending on the circumstances, the OMF may use either the HAS_METHOD message or the HAVE_METHODS installation command. HAS_METHOD requires activating an object whereas with HAVE_METHODS activating the object is not necessary. Thus, your application must declare the same set of methods in both places.

Required Methods

Although most methods are optional, each application is required to support the following methods:

CREATE_OMF,

TERMINATE,

HAS_METHOD,

DIE_PLEASE.

These messages can be sent to all objects and the objects must respond accordingly.

Since HAS_METHOD is required of all objects, it is assumed to be an included method and is not to be listed in the HAVE_METHODS clause of the installation file.

Optional Methods

All other methods are optional depending on what you wish to support in the application. No extra code is required for messages that are not appropriate to your application.

Class-Specific Methods

As a developer, you can define your own set of messages for use in your applications. You must make sure that class-specific methods are only sent to objects of the correct class, since some other class could be using the same method ID for its own class-specific methods.

Class-specific methods use codes between OMF_USER (0x100) and MAX_METHOD_ID (0x7FFF).

OMF Links

As discussed earlier, a major function of the OMF is to keep track of object relationships. A *link* is a defined connection between a parent object and a child object; it is tracked by the OMF.

A *child object* is the subordinate partner in a link and is either contained by the parent or provides data to the parent. By definition, a user object must be a child object to at least one parent. Since links can be readily changed and there can be more than one link to a child object, a child object can have any number of parents. Note also that a child object can also serve as a parent object to other child objects.

A *parent object* is either a container (e.g. file folder) or a compound object. A parent object (for example, "Financial Report") can have any number of children.

A parent object must assign a unique reference name to each of its child objects. A *reference name* is a 32-bit number and will be discussed later in greater detail. (It is often practical to use an index into an array as a reference name.) Reference names need only be meaningful and unique to the parent object. Thus, the same reference name can be used by different parent objects on the system. In like manner, the same child object can be referred to by different reference names from different parent objects.

Figure 2-6 shows the parent child relationships in the example and demonstrates how reference names might be assigned. Note that both "Financial Report" and "Annual Report" have "Report Folder" as a parent. Accordingly, they must have different reference names for those links, so that Report Folder can tell them apart. On the other hand, "6 Month Sales" is child to both "Financial Report" and "Sales Chart"; there is no requirement for its parents to call it by the same name.

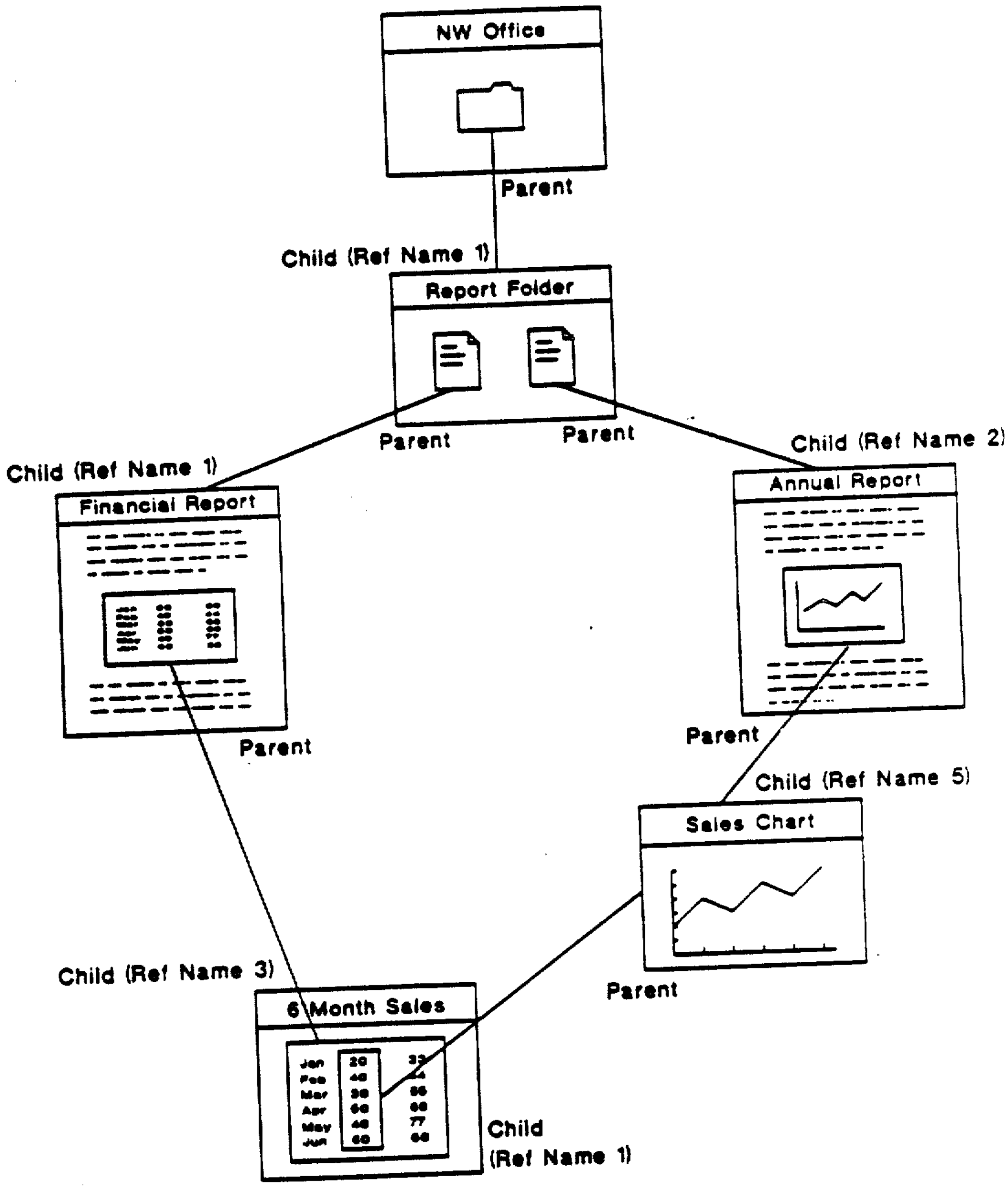

Figure 2-6. Reference Name Examples

Simple Links

A *simple link* is one that connects a container object to its children. For example, the NewWave Office's File Drawer may contain a folder or document. When a container object is opened, it displays icons or other representations of the objects it contains, but not the contents of those objects. Since the container object does not need any data from the child object, only minimal communication is needed between the parent and the child.

Views

*Views* are links in which there is a transfer of data from the child object to the parent object. The child object in a view is the *source* of the data and the parent is the *destination* in the transfer.

In contrast to simple links, views require additional responsibilities from the parent and child objects. The parent object is responsible for requesting that data be transferred. The child object is responsible for informing the parent when new data is available and for supplying data when it is requested.

There are two different kinds of views: data passing and visual.

A *data passing view* is one in which the child sends data to the parent for interpretation. An example of a data passing view is "6 Month Sales" passing sales data to "Sales Chart". "Sales Chart" then uses the data to create its graph.

A *visual view* is one where the child renders a picture of itself for the parent on the display or the printer. An example of this type of view is "Sales Chart" displaying itself within "Annual Report". In such a case, no actual data reaches the parent object.

Figure 2-7 shows the types of links between the objects in the example.

The details of setting up a view between two objects are discussed later in the chapter.

View Examples

To help your understanding of views, we recommend that you experiment with the HPTEXT and HPLAYOUT sample applications. HPTEXT is a typical source object. It permits you to select portions of text to be shared with other objects in visual views. HPLAYOUT is a typical destination object that can accept a visual view from a source object. You should go through the exercise of transferring data from HPTEXT to HPLAYOUT. You should also try out the "Manage Links" commands in HPTEXT to see how views are maintained.

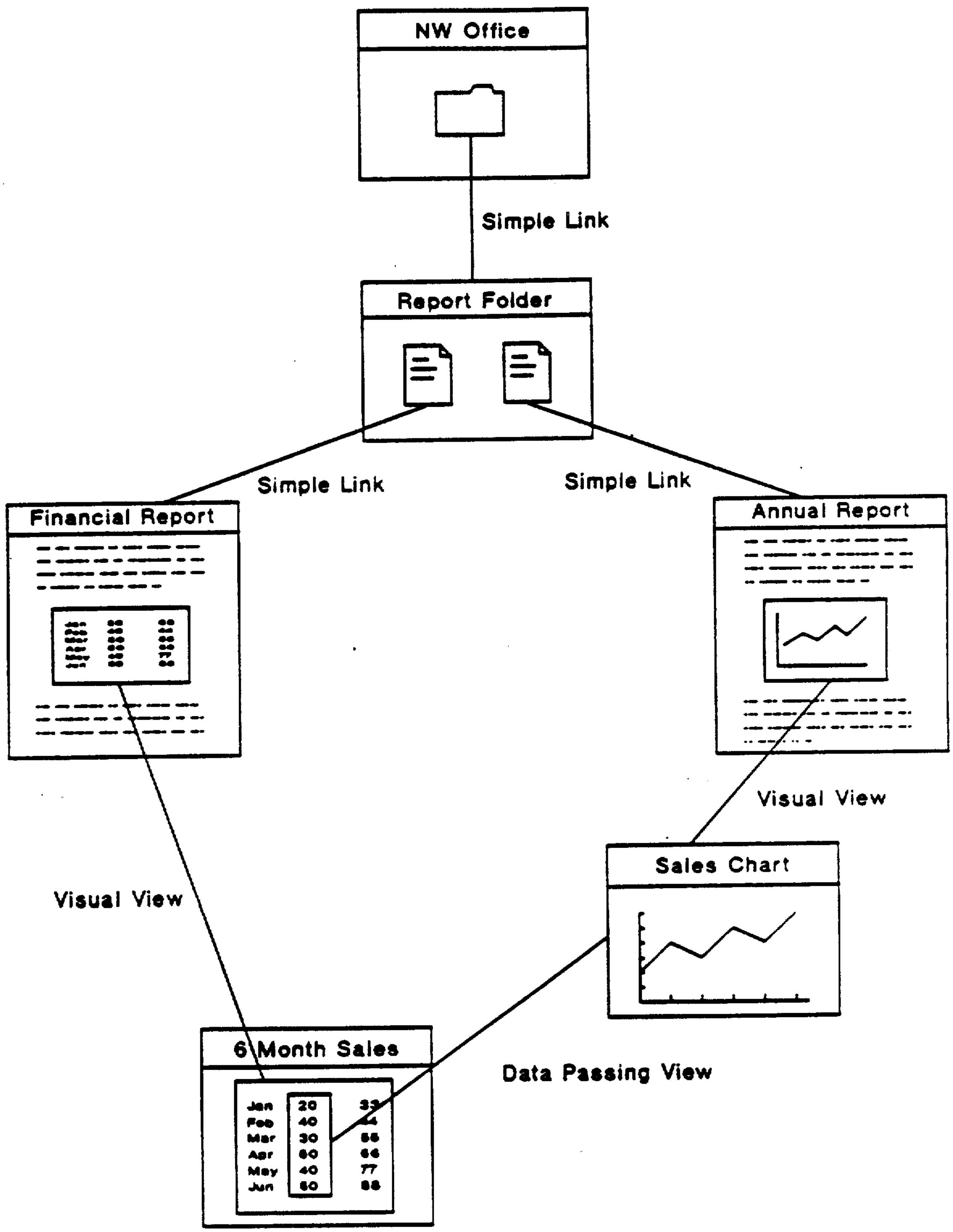
Figure 2-7. Types of Links

Reference Names

Wherever there is a link, there must be a reference name for the parent object to identify the child object. Reference names are used by the OMF in function calls to identify objects to be passed. When reference names are passed, they must be declared as type OBJECTNAME. OBJECTNAME is defined as being 32 bits long (a double word).

The first 3 bits (high order bits 31, 30, 29) are known as the scope of the object name. The *scope* is used to furnish additional information concerning the object, the link, or the object's usage, depending on the nature of the function call and object. The three scope bits define how the remaining 29 bits in OBJECTNAME are to be interpreted.

The OBJECTNAME scope value can be one of the following: *global*, *persistent*, *datalink*, *parameter*, *self* or *nullscope*. These names provide a means for the OMF and other applications to reference objects and act appropriately.

The following scopes are defined:

GLOBAL - Global names can be used by any object to refer to one of the system objects, such as the NewWave Office, File Drawer, Waste Basket, the Print Spooler, the OMF Clipboard, the Agent, etc. A given global name always refers to the same system object no matter who uses it.

PERSISTENT - This is the scope that objects use to name their own children in a simple link, i.e., a container relationship. The term persistent refers to the fact that the name persists as long as the relationship is in existence. The parent object can arbitrarily assign any value to the low order 29 bits and the OMF remembers that name. Persistent names are only usable by the parent who assigned them. Persistent name X used by one object does not necessarily refer to the same object as persistent name X used by a different object.

DATALINK - This is similar to the PERSISTENT scope except that it refers to visual or data passing views as opposed to simple links.

PARAMETER - This scope allows the name of an object to be passed as a parameter to a message. This name refers to the same object no matter which application uses it.

An important difference between a parameter name and a global name is that a parameter name is transient. A parameter name is valid only as long as the object to which it refers still exists on the same system. In most cases, a parameter name is passed in a message and gets used while processing that message. The name is then forgotten or used to assign a persistent or datalink name to the object.

It is not valid for an object to remember any parameter names in its data file while it is inactive, because the parameter name may no longer be valid if the object is copied or if the referenced object no longer exists. Parameter names are obtained by calling OMF_MakeObjParam on a name of some other scope.

SELF - This scope always refers to the object making the particular OMF call. The low 29 bits are ignored for all object names of this type.

NULLSCOPE - This indicates an error condition. NULLOBJECT is a pre-defined name for this scope. Calling OMF_Assign to assign NULLOBJECT to a persistent or datalink name enables the parent object to delete the links to its children. NULLOBJECT and NULLSCOPE do not equal NULL however.

View Specifications

Whenever a view is established, certain information concerning the view must be stored. This information is referred to as a view specification or view spec for short. A *view specification* is the information associated with a view that indicates which part of the source object is being referenced, where it is placed in the destination object and other information concerning the nature and status of the view. The view specification also specifies which kind of data transfers the child object can provide and how the system should perform those data transfers.

The view specification information is not a single entity; rather, it has three components. They reside in the destination object, the source object, and the OMF. It is thus useful to think of the view specification in terms of its locations as follows:

- Destination Specification
- Source Specification
- OMF View Specification, including:
  - Data ID
  - Textual Data ID
  - View Class
  - Snapshot Indicator
  - Flags Figure 2-8 shows the view specifications for two views from our example.

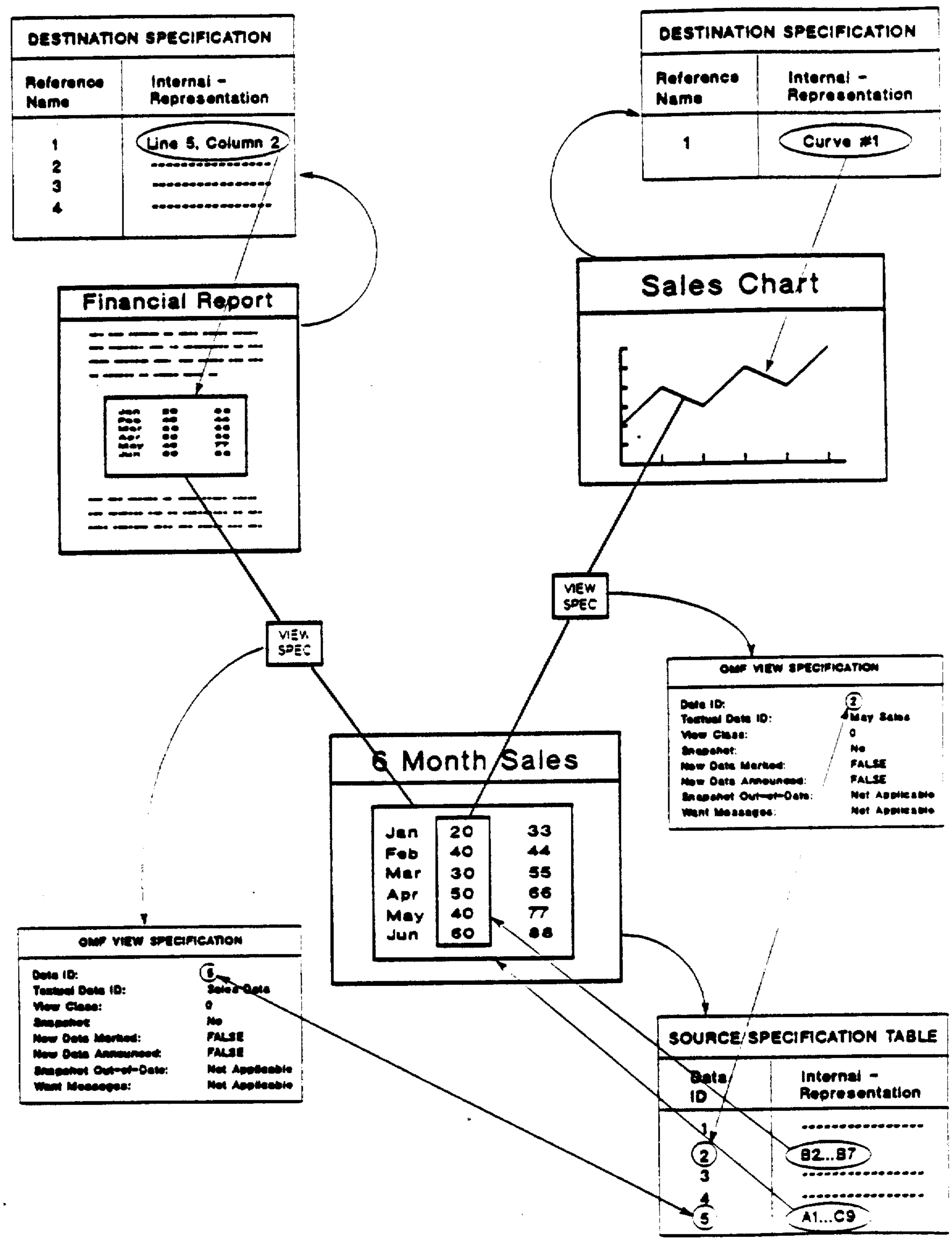
Figure 2-8. Example of View Specifications

Destination Specification The *destination specification* indicates where within the parent object the data from the child object is to be displayed or used. Although logically this is associated with the view specification, it is only used and maintained by the parent object and is not kept by the OMF as part of the view spec. The parent object has complete responsibility for keeping track of where within itself it displays or uses data from a child object.

Source Specification The *source specification* indicates which part of the child object is being displayed (in the case of a visual view) or transferred (as in a data passing view). The source specification is logically associated with the view spec, but actually is stored by the child object. The source specification is a data structure that the child object uses to keep track of a single range of viewed data. The child object usually maintains a table of source specifications for the various ranges of viewed data that it is supporting.

OMF View Specification The OMF is responsible for storing the data ID, textual data ID, view class, snapshot indicator, and flags. These are described below.

Data ID

The *data ID* is a token assigned by the child object to identify a part of itself being displayed or transferred. This ID is used as a parameter for identifying views in the OMF function calls made by the child object.

The data ID is actually a 16-bit integer and is often simply an index into the table of source specifications belonging to the child. Each source specification describes a part of the object being transferred.

The same range of viewed data can be used in multiple views. When this happens, the same data ID is used for these views. Generally the child object does not care how many views are using the same data ID, except when it is checking to see if a data ID is still in use.

Often there will be multiple data IDs within the same child object that refer to different parts of the data. In our example, "6 Month Sales" has a data ID corresponding to "B2...B7" (the column of data used to build the chart) for its view to "Sales Chart". On the other hand, the data ID for the link between "6 Month Sales" and "Financial Report" corresponds to "A1...C9" because those are the columns used.

In the view spec for the link between "Sales Chart" and "Annual Report", the data ID "0" is used. Objects that cannot support views of different parts of themselves will generally use the same data ID for all views they support. The chart application uses data ID "0" for this purpose.

Textual Data ID

The *textual data ID* is a string that can be displayed to the user for the purpose of identifying the transferred information. It is up to 32 characters and is supplied by the child object. Although not required, it is good practice for child objects to specify textual IDs.

In "Annual Report", the user sees the "Sales Chart" child object as "Sales Graph". In "Sales Chart", the "6 Month Sales" object is seen as "6 Month Graph Data". In "Financial Report", "6 Month Sales" is seen as "6 Month Report Data".

View Class

The *view class* specifies which operations the parent object can request a view to perform. These operations are called *view methods*. They are either the methods the source object itself can perform (i.e., are included in its HAVE_METHODS list), or else they are methods that the object guarantees will be supported on its behalf by a snapshot associated with any of the views it provides (snapshots are defined later in this chapter).

Different classes of objects will in general need to provide different sets of view methods to support particular data types. For example, a chart might support only visual views, a text object might support a set which also includes transferring text data, and a spreadsheet would likely add transfer of numeric data as well.

Although most objects need to define only one such set of view methods, complex objects may need to define more than one set to support views of different data types they may contain. An object can define up to eight such sets as described below. Although a given child object can support more than one kind of a view, once a particular view spec has been established, its view class cannot be changed.

The view class is specified by an integer in the range 0 to 7. Each view class value is associated with a different class property of the child object. A range of 8 numeric property names, PROP_VIEWMETHODS + 0 through PROP_VIEWMETHODS + 7, is reserved for this purpose. Only those class properties that are to be used need to be defined. Each of these properties is simply a list of WORDs with each word specifying a supported view method. The PROP_VIEWMETHODS properties should never be altered after the object class has been installed.

The view class is usually 0 unless your application can supply fundamentally different types of data. For example, if the application SPREAD.NWE can supply both graphics and spreadsheet data to other objects, there needs to be two different view classes since the relationships are not the same.

A parent object can test the methods of a view by using the OMF routines OMF_GetViewMethod and OMF_GetViewMethodList.

View class 0 is a special class in that it identifies the methods of an *initial view* (or *default view*) of an object. An initial view is a view that is created when the user has not specified any particular part of the child object to be transferred. This occurs when an icon is pasted or moved into the parent's window, or when a new object is created within a parent object. For example, when a spreadsheet icon is Cut from a folder, and Pasted into a document, an initial view of the spreadsheet is created.

Initial views must be of view class 0 so that prospective parents can know which view methods will be supported before accepting a child object for inclusion.

Snapshot Indicator

The *snapshot indicator* tells the OMF if a view uses a snapshot, and if so, identifies the snapshot. A snapshot can be described as an "intelligent buffer" for the data being transferred through a view. A *snapshot* is a special type of object that is associated with a separate executable file (referred to as a *dynamic access library*) instead of the full application code. This is described in depth later.

Snapshots have a one-to-one relationship with data IDs. If several views of the same child object have the same data ID, then they also will have the same snapshot.

A child object makes the decision whether or not a snapshot is appropriate for the view. This decision is transparent to the parent object. A child object that does not provide a snapshot must be prepared to receive and process the view messages that the parent object sends to the view. A view message is a request to a view. The OMF routes it to the snapshot if it exists or to the source object according to the algorithm illustrated in Figure 2-9.

Even when a snapshot is provided, it does not necessarily have to service all the view methods. Since the snapshot is an object, it has a set of methods associated with its object class that are distinct from the view methods of the view. A snapshot is not asked to perform a view method unless its own class supports the method. When a view is initialized, an object class is specified for the snapshot. The class defines the methods that the snapshot will support. (A view message that a snapshot does not support is passed on to the child object if supported there. If not, then an error is returned.)

Note also that a snapshot does not have to be kept up-to-date by the child object. The child object has a choice about what the OMF should do when a message is sent to a view with an out-of-date snapshot. The child object can request that the OMF force it to update the snapshot, or to route any view messages to the child object itself, bypassing the snapshot completely.

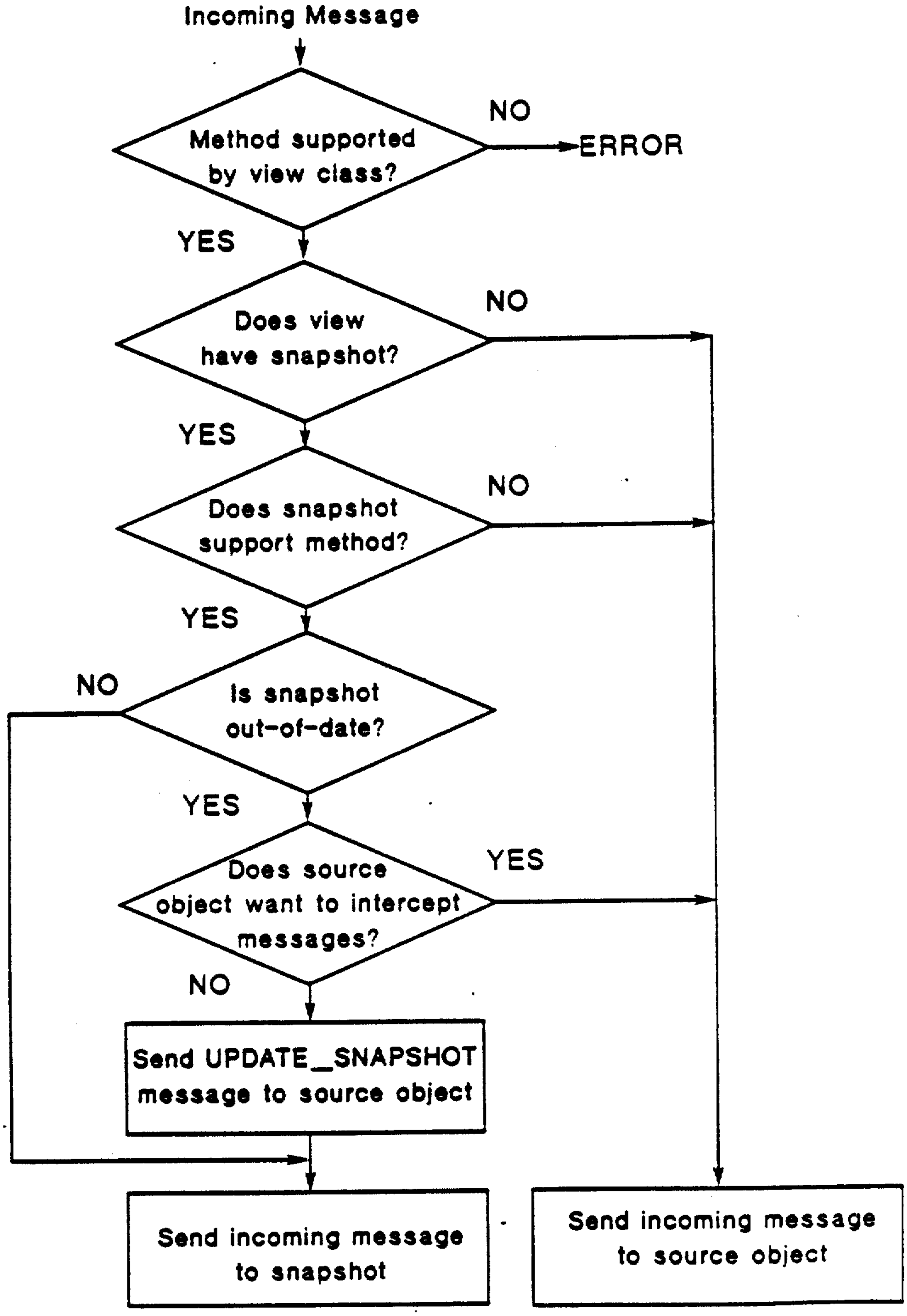
Figure 2-9. How Views Deal with Incoming Messages

Flags

There are four flags that are used when dealing with a view.

*New data marked* indicates that new data has been marked for this view but not yet announced. It essentially means that a change to the source object is in progress. This flag is set when the source object calls the function OMF_SetNewData.

*New data announced* indicates that the source object change is complete but that when the new data was announced for this view, the parent object was inactive. As a result, this flag is set to true, so that when the parent object becomes active, it will look for the new data. This flag is set when the source object calls the function OMF_AnnounceNewData and the parent is inactive. The parent object can test this flag with the function OMF_TestNewData and clear it with the function OMF_ClearNewData.

*Snapshot out-of-date* indicates that the snapshot's contents are not up-to-date. This flag is set by the source object. Its effect is shown in Figure 2-9 "How Views Deal with Incoming Messages".

*Want messages* indicates what the OMF should do with view messages when the snapshot is out-of-date. This flag is set by the source object. Its effect is shown in Figure 2-9 "How Views Deal with Incoming Messages".

Snapshots

A snapshot is a special kind of object. Normally, working with a view causes the child object's application to be invoked. Where large applications are involved, this can cause a lot of unnecessary overhead. To eliminate this overhead, you can set up your application to provide snapshots.

A *snapshot* is an object that uses executable code from a separate library referred to as a *dynamic access library* (or *DAL*) rather than using the full application executable code. The code in the DAL need only perform those functions necessary for manipulation of the view inside a parent object. Typically, a snapshot only needs to be able to display itself and transfer data. Thus, the child object does not have to be active in order for the parent to display or get data from it.

Figure 2-10 illustrates the difference between a view with and a view without a snapshot. On the left side, the view between "Financial Report" and "6 Month Sales" is shown without a snapshot. Note that the "6 Month Sales" object is active but not open; there is no visible window. As a result, there is more overhead on the system because the full SPREAD.NWE application is running. On the right, the same view is shown with a snapshot as alternative. In this case, the "6 Month Sales" object is shown in a state of dormancy and SPRDSNAP.NWE (a fictitious name for the spreadsheet snapshot library) is active. This results in less overhead on the system.

Note that a snapshot must be self-contained and include all of the data necessary for it to perform its methods. The snapshot may choose to keep data in any suitable form. For example, the SPREAD application probably stores its data in tables of numbers. SPRDSNAP.NWE could be simplified by storing a vector description of the table which can be quickly replayed on demand. Note also that the snapshot needs to keep only that data described by the source specification of the view.

Snapshot objects cannot be compound. Snapshot objects are referred by the child object using reference names with PARAMETER scope. The parent object cannot tell if a snapshot is being used or not. It just sends messages to the view (via OMF_SendViewMsg) and the OMF routes the message to the snapshot or child object as described earlier in Figure 2-9 "How Views Deal with Incoming Messages".

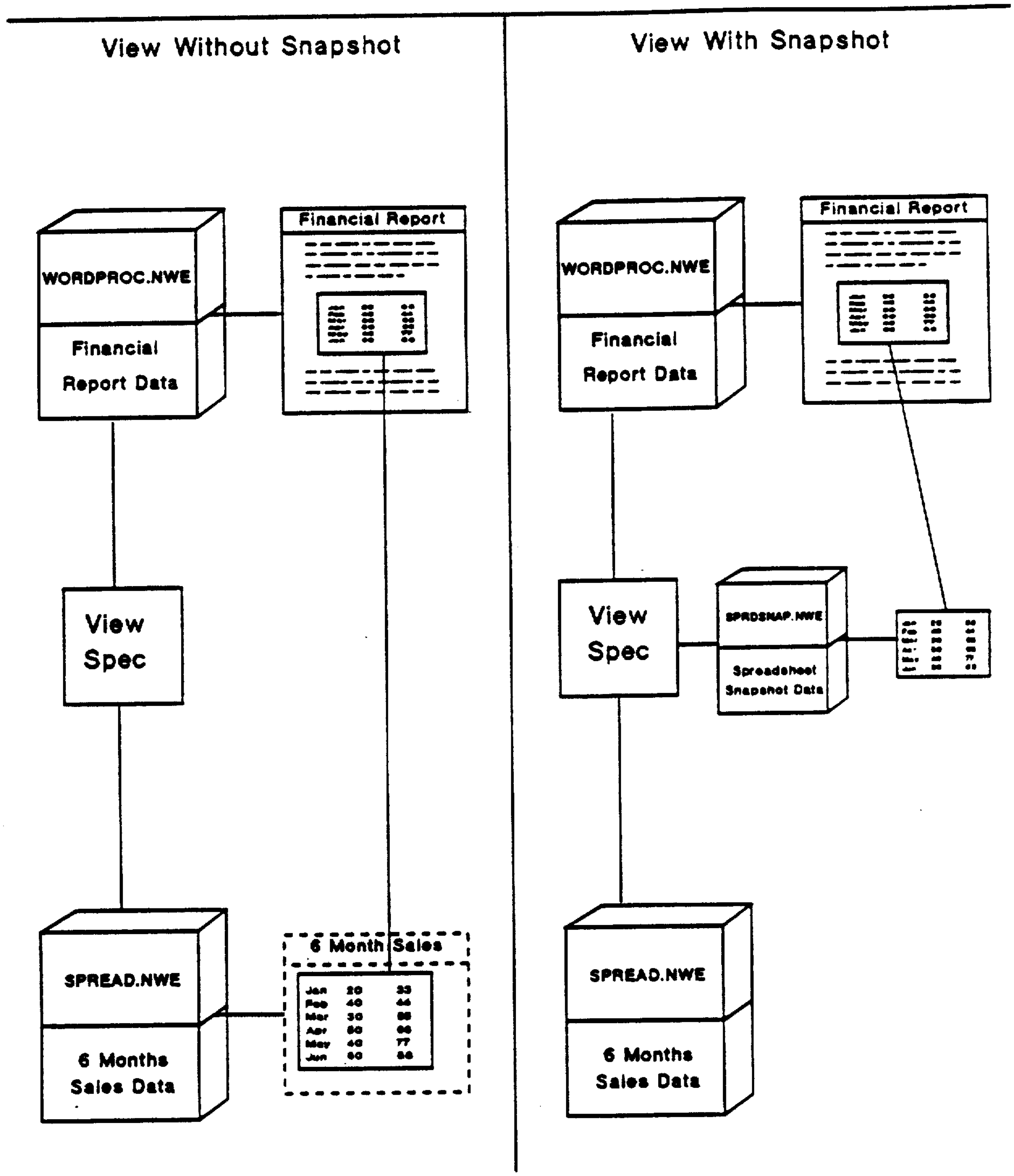
Figure 2-10. Difference Between View With Snapshot and View Without Snapshot

Dynamic Access Objects

Dynamic Access Libraries (or DALs) bind a data file with a dynamic library containing code that can perform operations on the data. An object which has a dynamic access library instead of the code of the application itself, is referred to as a *dynamic access object*. A dynamic access object is best thought of as a library that binds together the object's data and operations on that data, such as reading, writing, and displaying.

Dynamic access objects are not active in the same sense that normal objects are, for they do not directly interact with the user. Most importantly, dynamic access objects are not allowed to make most OMF calls themselves.

The most common use of a dynamic access object is as a snapshot. Remember that a snapshot is an object, but its data file only contains the data from the portion of the source object being viewed. Also the code which encapsulates the data file is a dynamic library, as opposed to another application.

All dynamic access objects must have a class property of PROP_DALNAME. This gives the name of the dynamic library's executable file that is associated with that particular object. This class property is set up when the dynamic access object's class is installed.

There are two interfaces to describe for dynamic access objects: the external interface that an application using the dynamic access object sees, and the internal interface that the object presents to the OMF.

External DAL Interface

The *external DAL interface* is what the application object sees. This interface consists of three functions:

1. OMF_GetDALObject - Activates a dynamic access object.
2. OMF_FreeDALObject - Frees a dynamic access object.
3. OMF_SendDALMsg - Sends a message to a dynamic access object.

Each of these calls is described in detail in the Programmer Reference Manual.

When a dynamic access object is used as a snapshot, the child object uses these calls to define and update the contents of the snapshot.

The parent object does not use these calls to access the snapshot. Instead, OMF will internally make these calls when the parent object calls OMF_GetView, OMF_FreeView, and OMF_SendViewMsg, respectively.

Internal DAL Interface

The *internal DAL interface* is the interface that the dynamic access object presents to the OMF. These are messages that are sent to the library by the OMF. All DAL objects must support these messages. This interface consists of four messages:

1. LIB_OBJ_INIT - Sent to an object to pass it the root filename of its data files.
2. LIB_OBJ_TERMINATE - Sent to an object when all outstanding OMF_GetDALObject and OMF_GetView calls on it have been freed by corresponding calls to OMF_FreeDALObject and OMF_FreeView.
3. LIB_USER_INIT - Sent to an object to inform it another user has made a call to OMF_GetDALObject or OMF_GetView on it. The term *user* here refers to another object accessing the DAL object.

4. LIB_USER_TERMINATE - Sent to an object to inform it that a user of the DAL object has called OMF_FreeDALObject or OMF_FreeView on it.

A fifth message, LIB_COPY_SELF, is not required for dynamic access objects in general, but is required for snapshots.

These messages are explained in detail in the "HP NewWave Environment: Programmer Reference Manual".

All dynamic access libraries must contain an EXPORTed entry point to process messages "sent" to the DAL object. The actual name of the entry point does not matter; but the library's module DEF file must EXPORT the routine as ordinal entry point "@ 1". It is recommended that this is the only EXPORTed entry point for the library.

The procedure to handle messages to the dynamic access library is called the library's *message procedure*, and must have the following form:

```
LONG FAR PASCAL MessageProc (hObjData, hUserData, wMsg, lParam)
```

where:

*hObjData* is the handle returned by the library when it was sent LIB_OBJ_INIT message for this object. This allows the library to determine which object is receiving the message. If the message being received is LIB_OBJ_INIT, this parameter is NULL.

*hUserData* is the handle returned by the library when this object was sent the LIB_USER_INIT message. This allows the library to determine which user of the object is sending the message, if it needs to do so. If the message being received is LIB_USER_INIT, this parameter is NULL.

*wMsg* is the message type that the caller specified to OMF_SendDALMsg.

*lParam* is the lParam that the caller specified to OMF_SendDALMsg. Interpretation of this value varies for different message types.

Maintaining A View

After a view has been set up, it will require further maintenance: either updating or deleting the view.

Updating A View

When a child object is changed by the user, it must update all of the views affected by the change (by calling OMF_SetNewData and OMF_AnnounceNewData). The child object tells the system about each view needing to be updated. If the parent of a view is active when the child object : changed, the system notifies it with the message (DATA_CHANGE).

When a parent object is activated, it should ask the system (by calling OMF_TestNewData) if any of the views it includes were updated while it was inactive. Note that a parent may not care about this if it has a visual view to t child object, since it does not store any data from the child.

For example, if a change is made to "6 Month Sales", the "Financial Report" : "Sales Chart" need to be notified that a change is occurring. Here are the ste in the process:

1. "6 Month Sales" indicates that a change is in progress by setting the "nev data marked" flags in the view specifications maintained by the OMF. Since the change is in progress, it is better to wait until the change is complete before updating the destination objects.

2. When the change is finally complete, "6 Month Sales" tells the OMF to announce the changes to its destination objects. Let's assume that "Financial Report", "Sales Chart", and "Annual Report" are inactive. The inter-object relationships cause the following to happen.
3. The OMF sets the "new data announced" flag maintained by the OMF for the "Financial Report"-"6 Month Sales" view specification. When "Financial Report" is opened, the flag will indicate that its data needs to be updated.
4. "Sales Chart" is a different situation because it is a source object to "Annual Report". A change in "6 Month Sales" affects "Annual Report" as well as "Sales Chart". "Sales Chart" is activated in order to receive the data change.
5. When "Sales Chart" announces that it has been updated, the "new data announced" flag for "Annual Report" object is set. Since "Annual Report" is inactive and not a source object, the flag is set rather than activating it.

Deleting A View

When the representation of the child object is deleted in the parent object, the parent object informs the system that it no longer includes the child. If the data ID of the deleted view is then no longer in use, the system in turn notifies the child object (by sending the message LOSE_DATAID) that the particular data ID is no longer needed.

The LOSE_DATAID message is only sent if the child object is active when the parent object deletes the link. Thus, when the child object is activated, it should ask the system (by calling OMF_EnumParents or OMF_GetDataIdUsage) if any of the data IDs it provides were deleted. If so, the child object can remove its internal information (source specification) associated with that data ID. This is roughly analogous to a destination object calling OMF_TestNewData when it starts up.

Views are described in detail in the "HP NewWave Environment: Program Design Examples" manual where it is explained how to incorporate a view from both the parent and the child object.

Actions Performed on Objects

As opposed to conventional MS-DOS programming, programming in the NewWave environment is driven by events; it entails waiting for actions to occur to objects. Thus, it is useful to think in terms of the different actions that are performed on objects. An object can be created, activated, opened, closed, terminated, and destroyed.

Figure 2-11 illustrates the actions that can be performed on an object.

Creating Objects

To begin a new document, a user *creates* an object. This is done by opening on the "Create a New..." dialog box from the File menu and selecting the desired object. A copy of the appropriate template object is placed in the current window. The appropriate set of data files and the internal OMF entries are created.

At this point, the application is in a state of dormancy and no messages are sent to the application (except for encapsulated applications which are a special case). When the user is ready to enter new data, the object will leave its state of dormancy and go through activation and opening as described below.

Activating Objects

Between user sessions with an object, the object remains in a state of dormancy. If some other object in the system wishes to communicate with the object, it is *activated*. Often an object is activated in order for the user to gain access to the data. In that case, the object is also opened. (Opening is described below).

The major difference between activation and opening is that an activated object does not display its window or interact with the user in any way. It can, however, receive messages from other objects or the OMF. An open object has its own user interface (its window) and can be manipulated directly by the user.

When the object is activated, the OMF starts up the associated application. The first thing the application does is to create a NewWave window although it does not display the window or interact with the user in any way. As soon as the window is created, it registers the window handle with the OMF (by calling OMF_Init). The reason for this is that the OMF uses the window handle as the "address" to which messages are sent.

OMF_Init returns to the object the root name of the object's data files. The object may access those files immediately or it may simply remember the object file name for later access. Then it goes into its normal Windows message processing loop, and waits to be told what it should do next. The user sees othing at this time.

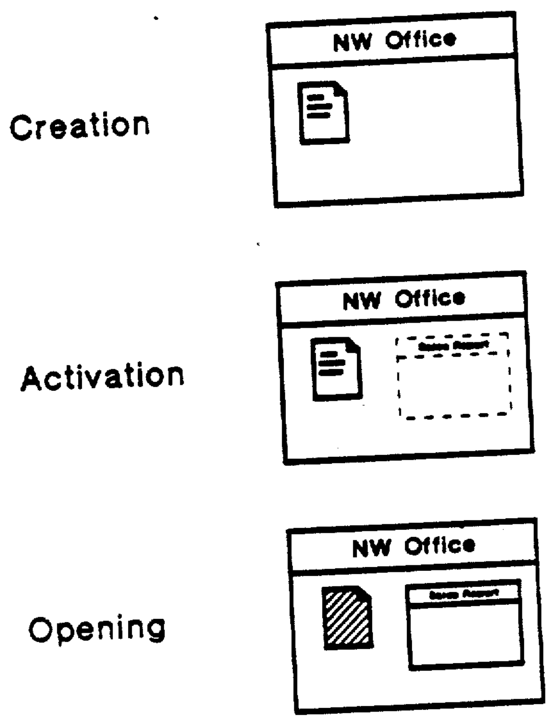

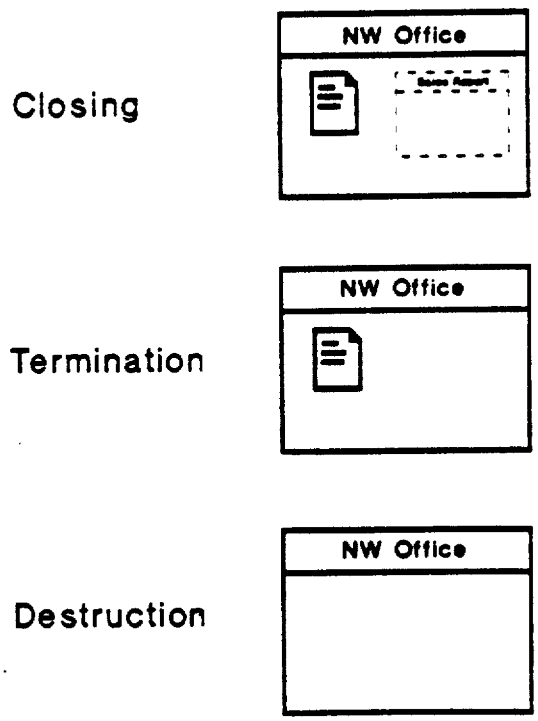

Figure 2-11 Actions Performed on Objects

Finally, the OMF sends the object a CREATE_OMF message. The object can perform any OMF-dependent initialization while processing the message. OMF_Init is the only OMF function that can be called before CREATE_OMF is received.

An example of an object that is active but not open would be "Sales Chart" when "Annual Report" is opened. "Sales Chart" needs to be active because it is being displayed within "Annual Report". It does not need to be open since the user is only involved with "Annual Report" and is not editing graphs.

Opening Objects

*Opening* an object means that the user has requested direct access to that object. In the process, its icon is grayed and a window is opened for the object. When a user gives a command that indicates that he wishes to work on an object (e.g., double-clicking on the object), the object is activated and is then sent a message (OPEN) to open itself. It then displays its window on the screen and is available for interaction with the user.

Editing is an example of an object being active and open. As an example, the user might open "Financial Report" by double clicking on its icon. Unseen by the user, the NewWave Office makes a call to OMF_GetOMFObject requesting activation of the "Financial Report" object. The OMF scans its tables and identifies the data files and application code that comprise that object. It then runs the application code (WORDPROC.NWE in this example), passing to the object the root name of the data file(s) corresponding to the object in question. The NewWave Office then makes a call to OMF_Send to send a message to the child object, "6 Month Sales" requesting that it open itself. Finally the document shows its window displaying the "Financial Report" data for the user to edit.

Closing Objects

*Closing* is the process of shutting down the application and is essentially opposite of opening. The user indicates that he is through working with an object by closing the object's window. The object then removes its "visible" window from the display without actually destroying it. It remains active but not open until it is terminated. The object remains active because other objects in the system may need to communicate with it. The object continues to execute its Windows message processing loop, and waits for more instructions.

Terminating Objects

When the OMF determines that no other active object in the system currently wishes to communicate with an object that is not open, the object is said to be terminated and the OMF sends that object a TERMINATE message. (Note that a terminated object is not deleted from the system; it is simply in an inactive state. See Destroying Objects below.) Termination is the counterpart to activation. When an object receives the TERMINATE message, it should 1. perform any housekeeping involved with termination such as saving data files and the coordinates of the window,
2. return to its message processing loop and wait for a DIE_PLEASE message,
3. then destroy its "hidden" window, and
4. finally terminate itself.

Objects should not destroy their "hidden" window and call the Windows function PostQuitMessage until the DIE_PLEASE message is received.

Destroying Objects

When a user no longer needs an object, either by itself or as part of a compound object, he can remove the object from the system by placing it in the Waste Basket and then emptying the Waste Basket. When the OMF determines that an object has no links to it from any other object in the system (including the Waste Basket) the OMF *destroys* that object. This means that the data files associated with that object are physically removed from the file system and the object no longer exists. Destroying is the counterpart to creating.

The Life Cycle of an Object

Figure 2-12 shows the typical life cycle of an object. An object is only created and destroyed once. Most often an object is activated, opened, worked on, closed, terminated, and then later re-activated. When an object is activated without being opened, it takes the path that bypasses Opening and Closing. When an object is closed but kept active and then requested to open again, it follows the path upwards from Closing back to Opening.

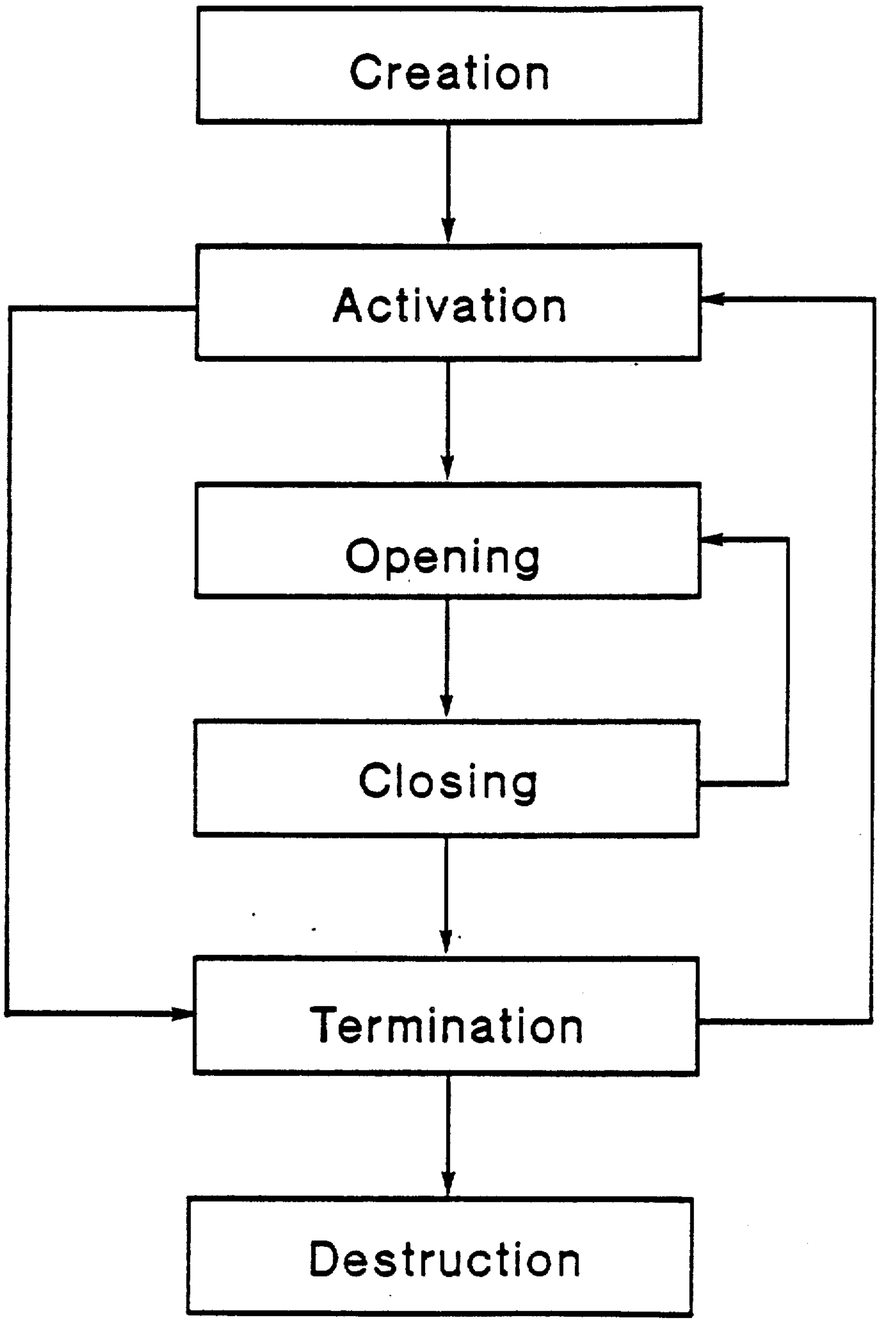
Figure 2-12. The Life Cycle of an Object

Serialization / Deserialization of Objects

It is possible to take an object from one NewWave system and move that object to another NewWave system. This is possible by serializing and deserializing the objects.

For example, suppose a user wants to send "Financial Report" to another NewWave system that is not connected electronically. The user performs this task by clicking the mouse button once to select the "Financial Report" object. The user then selects the "Export to Disk File" command from the Items Menu At this point the user is prompted to type in a DOS filename to which the extension ".SER" is added. The user types in a filename of "A:\FINREPT", and serializes the object to a floppy disk in drive A:. The user then takes the disk to the next system, and places the floppy in drive A:. From the NewWave Office on the new system, the user selects the command "Import from Disk File" from the File Menu, and types the name of the file, "A:\FINREPT". The OMF performs a deserialization on that file, and the "Financial Report" document object now appears in the NewWave Office window.

Serialization also causes all child objects of the serialized object to be serialized For example, since the "Financial Report" document includes "6 Month Sales" it must also be serialized into the same diskette file and would be re-created when the file was deserialized.

It is also possible for an object to be self-serializing. This means that the object may process and support its own serialization / deserialization in order to perform some special operations on its files. If an application states that it supports the SERIALIZE method, then this message is sent to the object for processing.

Once the application receives a SERIALIZE or a DESERIALIZE message from the OMF, the application reads and writes data from and to a serial file All of the above mentioned functions are discussed in detail in the "HP NewWave Environment: Programmer's Reference Manual".

The rule of thumb is to let the OMF take care of serializing and deserializing object. The only time that an application needs to process its own serialization/deserialization when it references an external file (a DOS file), the format of its data file needs to be "cleaned" up before it can be serialized

OMF Function Summary

There are approximately 70 functions available for calling the OMF. These fall into these eight general categories:

1. System Functions
2. Status Functions
3. Property Functions
4. Update Functions
5. Clipboard Functions
6. Serialization Functions
7. View Functions
8. Dynamic Access Library Functions Note that these are *general* categories set up for the convenience of learning the OMF functions. Not all of the functions fit neatly into these categories.

OMF System Functions

This category of OMF calls is the most general. It includes functions for initialization and termination as well as functions that retrieve miscellaneous OMF information.

Table 2-2. OMF System Functions

| Function/Macro | Description |
|---|---|
| OMF_Init | Registers with the OMF at startup. |
| OMF_Term | Last OMF call during termination process. |
| OMF_Opening | Informs the OMF that an object is now open. |
| OMF_Closing | Tells the OMF that the user closed the object. |
| OMF_ObjectFlag | Sets (or checks) OMF notification flags. |
| OMF_GetOMFObject | Establishes access to a known object. |
| OMF_FreeOMFObject | Tells the OMF that access to an object is done. |
| OMF_Send | Sends a message to another object. |
| OMF_PassWindowHandle | Tells the OMF that the window handle has changed. |
| OMF_GetOMFVersion | Returns the current OMF version number. |
| OMF_GetOMFDirectory | Returns the drive:path to the OMF files. |
| OMF_GetOMFError | Returns the most recent OMF error code. |
| OMF_Shutdown | Initiates a system shutdown. |
| OMF_ConfigChange | Causes a CONFIG_CHANGE message to be sent to all active objects that have set their FLAG_CONFIGURATION flag when a configuration value has changed. |

OMF Status Functions

The OMF status functions are used primarily to retrieve information concerning existing object relationships.

Table 2-3. OMF Status Functions

| Function/Macro | Description |
|---|---|
| OMF_EnumObjects | Returns names of generic objects. |
| OMF_EnumGlobalObjects | Returns names of global objects. |
| OMF_EnumChildren | Returns names of caller's child objects. |
| OMF_EnumChildrenOf | Returns names of specified object's child objects. |
| OMF_EnumParents | Returns names of calling object's parent objects. |
| OMF_EnumParentsOf | Returns names of specified object's parent objects. |
| OMF_GetChildCountOf | Gets a specified object's number of child objects. |
| OMF_GetParentCountOf | Returns the number of parents of a specified child object. |
| OMF_IsDescendant | Checks whether two objects are related. |
| OMF_GetMethod | Checks whether a given OMF method is supported by a specified object. |
| OMF_GetMethodList | Returns the complete list of an object's methods. |
| OMF_GetType | Returns the displayable class name. |
| OMF_GetIcon | Returns the handle to the object's icon. |
| OMF_GetObjectState | Checks if an object is open and/or active. |
| OMF_GetDiskSize | Gets the size (in bytes) of an object including its DATALINK descendants. |

OMF Property Functions

The OMF property functions are used to find out information about an objec properties and to make modifications to them.

Table 2-4. OMF Property Functions

| Function/Macro | Description |
|---|---|
| OMF_GetProperties | Returns the handle to the property list. |
| OMF_FreeProperties | Releases the property list. |
| OMF_ReadProperty | Reads from the property list. |
| OMF_WriteProperty | Writes to the property list. |
| OMF_ReadPropertyHandle | Reads a single property value into a global memory buffer and returns the handle to the buffer. |
| OMF_SetModified | Updates Modified/Last Writer properties. |

OMF Update Functions

The OMF update functions are used when adding or removing objects.

Table 2-5. OMF Update Functions

| Function/Macro | Description |
|---|---|
| OMF_MakeObjParam | Gets an object name that can be passed in a message. |
| OMF_Assign | Assigns an object to a reference name. |
| OMF_Copy | Duplicates an existing object. |
| OMF_AddChildTo | Adds a child object to a specified parent object. |
| OMF_RemoveChildFrom | Removes a child object from a specified parent object. |
| OMF_ImportObject | Creates an object from a DOS file. |
| OMF_Export | Copies an object's file to a DOS file. |

OMF Clipboard Functions

The OMF clipboard functions are used when moving objects to and from the clipboard.

Table 2-6. OMF Clipboard Functions

| Function/Macro | Description |
|---|---|
| OMF_PutOnOMFClipboard | Puts an object on the OMF clipboard. |
| OMF_PutViewOnOMFClipboard | Puts an object and a view on the clipboard. |
| OMF_RemoveFromOMFClipboard | Takes an object from the OMF clipboard. |
| OMF_EmptyOMFClipboard | Clears the OMF clipboard. |

OMF Serialization Functions

The OMF Serialization functions are used when converting objects to serial files or vice versa.

Table 2-7. OMF Serialization Functions

| Function/Macro | Description |
|---|---|
| OMF_Serialize | Creates a serial file from an object. |
| OMF_DeSerialize | Creates an object from a serial file. |
| OMF_GetSerialData | Reads data directly from a serial file. |
| OMF_GetSerialDataHandle | Reads data from a serial file returning a handle to the data. |
| OMF_PutSerialData | Writes data directly to a serial file. |

OMF View Functions

The OMF View Functions are involved primarily with view specifications.

Table 2-8. OMF View Functions

| Function/Macro | Description |
|---|---|
| OMF_InitViewSpec | Used by a child object to initialize a new view. |
| OMF_CopyViewSpec | Copies the viewspec from one view to another view. |
| OMF_SetDataIdText | Changes the view's textual ID. |
| OMF_SetSnapshotState | Allows child object to update the state of the snapshot. |
| OMF_SetNewData | Sets new data flag before announcing it. |
| OMF_AnnounceNewData | Notifies parent objects about new data. |
| OMF_GetDataIdUsage | Allows child object to determine the number of destinations where the data ID is used. |
| OMF_GetSnapshot | Returns the object name of the snapshot to the child object. |
| OMF_GetView | Activates a view in order to send messages to it. |
| OMF_FreeView | Deactivates a view when it is through receiving messages. |
| OMF_GetViewMethod | Tests for a single view method. |
| OMF_GetViewMethodList | Returns a list of view methods. |
| OMF_GetDataIdText | Returns a child object's description of the view. |
| OMF_SendViewMsg | Sends view messages to the child object or snapshot. |
| OMF_ClearNewData | Resets the new data announced flag for a view. |
| OMF_TestNewData | Called by a parent object to test a view's new data announced flag. |

OMF Dynamic Access Library Functions

The OMF Dynamic Access Library functions are used when dealing with a snapshot's dynamic access object.

Table 2-9. OMF Dynamic Access Library Functions

| Function/Macro | Description |
|---|---|
| OMF_GetDALObject | Activates a dynamic access object. |
| OMF_FreeDALObject | Frees a dynamic access object. |
| OMF_SendDALMsg | Sends a message to a dynamic access object. |

OMF Message Summary

Table 2-10. Required OMF Messages

| Message | Description |
|---|---|
| HAS_METHOD | Inquires about supported methods. |
| TERMINATE | Informs an object that it has been deactivated. |
| DIE_PLEASE | Tells an object to terminate itself. |
| CREATE_ OMF | This is the first message from the OMF when an object is activated. |

Table 2-11. Major Event OMF Messages

| Message | Description |
|---|---|
| OPEN | The user has requested the object to open. |
| DISCARD_ICONS | Icon handles from OMF_GetIcon are no longer valid. |
| CLASS_CHANGE | Class properties have changed. |
| CONFIG_CHANGE | Sent to an active object that has set its own FLAG_CONFIGNOTIFICATION flag with OMF_ObjectFlag whenever any object calls OMF_ConfigChange. |
| QUERY_SHUTDOWN | Sent to all active objects that have set their FLAG_QUERYSHUTDOWN (with OMF_ObjectFlag) when the user tries to close the NewWave Office. |
| WARM_START | The object is being informed of a system restart after a system shutdown. |

Table 2-12. General Information OMF Messages

| Message | Description |
|---|---|
| OBJECT_OPENING | A child (or global) object has been opened. |
| OBJECT_CLOSING | A child (or global) object has been closed. |
| ADD_CHILD | A new child object is being added. |
| LOSE_CHILD | A child is being removed. |
| ADDED_PARENT | A reference to this object was added. |
| LOST_PARENT | A reference to this object was deleted. |
| PROP_CHANGE | The properties of the object, its child object, or a global object were changed. |

Table 2-13. OMF Message Replies

| Message | Description |
|---|---|
| ENUM_OBJECT | This message is returned from an OMF_EnumObjects call. |

Table 2-14. OMF Task Messages

| Message | Description |
|---|---|
| OMF_INSERT | An object is being passed for inclusion. |
| CONTAINMENT_STATUS | Used to test if an object can accept another object being dragged on top of it. |
| CONVERT | Sent to indicate that a conversion is to take place concerning an object and a file or memory block. |
| COPY_EXTERNAL | An object is being copied. |
| DESTROY_EXTERNAL | An object is being destroyed. |
| DESTROY_MODELESS | Used when a dynamic library is called to display a modeless dialog box. |
| SERIALIZE | An object is being serialized. |
| DESERIALIZE | An object is being deserialized. |
| COPY_SELF | Sent when OMF_Copy is called for that object. |
| MULTI_INSERT | Used to test if an object can accept multiple insertions from a group drag move or copy to the object. |
| PREPARE_PRINT | An object is being started by the print spooler. |
| PRINT_ADD_TO_QUEUE | Sent from inside an application to indicate that an object is to be printed. |
| PRINT_MASTER | Tells an object to print itself in entirety. |
| WINDOW_TO_TOP | Tells an object to bring its window to the front. |
| OMF_NEW_OBJECT | Sent when the CREATOR has created a new object at your request. |

Table 2-15. OMF View Management Messages

| Message | Description |
|---|---|
| INIT_VIEW | Sent from a parent object to a child object to initialize a new view specification. |
| LOSE_DATAID | Sent from the OMF to a child object to indicate no more requestors remain for a data ID. |
| UPDATE_SNAPSHOT | Sent from the OMF to a child object to update a snapshot. |
| DATA_CHANGE | Sent from the OMF to a parent object to indicate that new data is available. |
| DATA_CHANGE_END | Sent from the OMF to a destination object to indicate that no more new data is available. |
| DATAID_CHANGE | Sent from the OMF to a parent object to indicate that a view's textual data ID is new. |

Table 2-16. OMF View Messages

| Message | Description |
|---|---|
| GET_SIZE | Determines the size of a visual view. |
| DISPLAY_VIEW | Display a visual view in another object's window. |
| PRINT_SLAVE | Print a visual view as part of another object. |

Table 2-17. OMF Messages to Dynamic Access Objects

| Message | Description |
|---|---|
| LIB_OBJ_INIT | Passes the root filename of the object to a dynamic access library. |
| LIB_OBJ_TERMINATE | Sent to an object when the last outstanding OMF_GetDALObject call on it is being freed up by the OMF_FreeDALObject routine. |
| LIB_USER_INIT | Sent to an object to inform it about another user, that is, that another call to OMF_GetDALObject has been made. |
| LIB_USER_TERMINATE | Sent to an object to inform it that an application using the object has called OMF_FreeDALObject on it. |
| LIB_COPY_SELF | Sent to an object when its data file must be copied. |

OMF Property Summary

A list of the class properties and their descriptions follows.

Table 2-18. Class Properties

| Property Name | Description |
|---|---|
| PROP_CLASSNAME | The name of the class of objects. Not localized. |
| PROP_DALNAME | Used by Dynamic Access Library (DAL) objects only, identifies the object's dynamic library. |
| PROP_EVENTTRIGGERS | Used by the Agent to trigger tasks that utilize this object. |
| PROP_ICONNAME | Identifies the object's class icon. |
| PROP_METHODS | Identifies which messages this class of objects can respond to. |
| PROP_TEXTID | Identifies the name of the class (visible to the user). Used in localization. |
| PROP_USERUNITS | Contains the units of an object's size in terms that are relevant to the user, e.g., "pages", "number of objects", etc. Used in localization. (See PROP_USERSIZE below.) |
| PROP_VIEWMETHODS | Specifies the methods that are supported by views of objects of this class. Used by child objects of views. |

The full list of object properties appears below:

Table 2-19. Object Properties

| Property Name | Description |
|---|---|
| PROP_ADDCHILD | Allows children to be added and removed from the object, only appropriate for parent objects. |
| PROP_COMMENTS | Contains comments the user has entered concerning this object. |
| PROP_CREATED | Contains the date and time of the object's creation. |
| PROP_CREATOR | Identifies the user who created the object. |
| PROP_DESKTOPFLAGS | Used by encapsulated DOS applications only. Contains specific flags which permit/prevent editing an object's title; indicate data files in the DOS domain; cause deletion of DOS domain files if object is destroyed; and protect objects from move/copy/cut share. |
| PROP_EXTRADISK | Specifies the size of any data external to the OMF data base. |
| PROP_FASTPROPS | Permits the "fast prop" properties to be read by a single OMF_ReadProperty call (see below). |
| PROP_FORMATTEDFOR | Used by WYSIWYG objects only, identifies the device to be emulated for WYSIWYG. |
| PROP_ISANNOTATION | Identifies object as an annotation, e.g., a voice or text description. Used by annotation objects only. |
| PROP_LASTWRITER | Contains the name of the user who last modified the object. |
| PROP_MODIFIED | Contains the date and time of the object's last modification. |
| PROP_OLDAPPINFO | Used by encapsulated DOS applications only, identifies object as an old application shell object and contains certain DOS information. |
| PROP_PUBLIC | Indicates whether object should be copied when a parent is copied (otherwise, it is considered public and a second reference is made rather than a duplicate copy). |
| PROP_RECEIVED | Present on envelope objects only, contains the date and time that the envelope was received. |
| PROP_SENDER | Present on envelope objects only, identifies the sender of the envelope. |
| PROP_SYSTEM | For GLOBAL objects, specifies the visibility of the object. For other objects, specifies whether or not the object is the "blank" master copy. |
| PROP_TIMEZONE | Present on the NewWave Office only, identifies the user's time zone. |
| PROP_TITLE | Contains the object's title. |
| PROP_USERSIZE | Contains the size of an object in units that are relevant to a user, e.g., 16 pages for a text document, 34 objects for a folder, etc. (Contains number only; units are contained in PROP_USERUNITS. See above.) |

FastProperties

*FastProperty* is a special type of object property. Those properties classified as FastProperties can all be retrieved by a single call, the OMF function OMF_ReadProperty for property PROP_FASTPROPS. They are returned together in the FastProperty structure. The properties classified as FastProperties are:

PROP_MODIFIED,

PROP_LASTWRITER,

PROP_PUBLIC,

PROP_ADDCHILD,

PROP_SYSTEM,

PROP_EXTRADISK,

PROP_DESKTOPFLAGS, and

PROP_TITLE.

3 Adding OMF Functionality to an Application

In this chapter, we are going to take a simple Windows program, SHAPES, and turn it into a simple NewWave object, HPSHAPE. When we are through, it will run in the NewWave environment. Please note the resulting program will not be the same as the one listed in the Appendix B of this manual, but only an introductory skeleton that we will build on in subsequent chapters.

This chapter is divided into the following sections:

- Transforming SHAPES into an Object: Overview
- Changes to the User Interface
- Communicating with the OMF
- OMF Control of the Life Cycle
- Binding a Data File to HPSHAPE
- Listing of HPSHAPE
- Required Files for Compiling and Linking
- Compiling and Linking HPSHAPE
- The Installation File
- Debugging

Note The skeleton produced in this chapter uses only the OMF, not the API, and is only included for explanatory purposes. Before you begin to design your actual application, you should read through Chapter 5 to understand how the API will impact it. Use the sample programs which come with the NewWave Development Kit as skeletons rather than the program produced in this chapter.

The SHAPES program is a slightly modified version of the original SHAPES program distributed with the Windows Software Development Kit. It only does one thing: it allows you to choose a shape (rectangle, ellipse, triangle, star or no shape) from a menu, and then it draws that shape on the screen within its window. Its form is shown in Figure 3-1 on the next page.

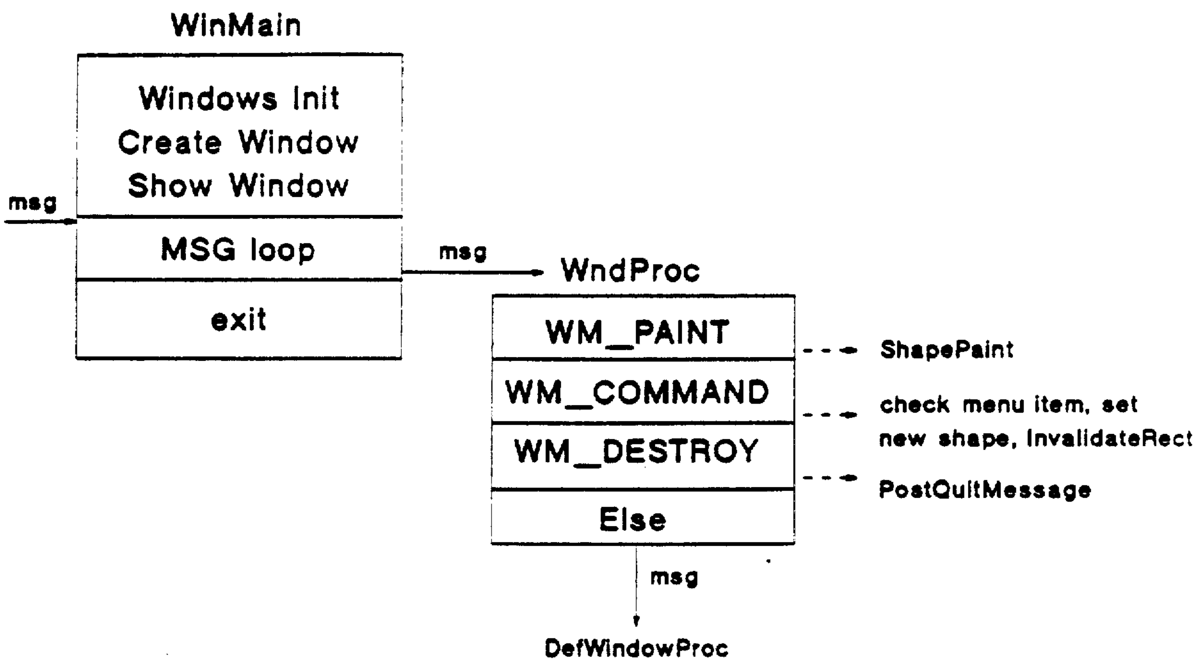

Figure 3-1. Initial SHAPES Logic Flow

SHAPES only has a few components. Like all Windows programs, it has:

- WinMain - the main body
- WndProc - the application window procedure

WinMain does Windows initialization, creates the application window, displays it and then goes into a loop getting messages for this application and dispatching them to the application's window procedure, WndProc. WndProc is essentially a big switch statement that processes each message.

SHAPES processes the messages WM_PAINT, WM_COMMAND and WM_DESTROY. For WM_PAINT, it calls the Windows function BeginPaint, then our own function ShapePaint which draws the chosen shape, and then calls the Windows function EndPaint. The "chosen shape" is initially a star. For WM_COMMAND, SHAPES removes the check mark from the menu for the old chosen shape, sets the new chosen shape to the menu selection and draws a new check mark for it. It then forces a new WM_PAINT message to be sent by calling the Windows function InvalidateRect. For WM_DESTROY, SHAPES merely calls PostQuitMessage with a value of 0 to terminate its message processing loop.

For reference purposes, a complete listing of the SHAPES program as it appears before any NewWave modifications is provided on the following pages. Note that in general it follows standard Windows naming conventions (e.g., "lp" is a long pointer). In addition it uses an initial "g" to denote variables that are global.

Listing of SHAPE.C

```
/*******************************************************/
/*              SHAPE TEMPLATE APPLICATION             */
/*                      shape.c                        */
/*******************************************************/

#include <windows.h>
#include "shape.h"

/*******************************************************/
/*                 Global Variables                    */
/*******************************************************/

HWND    ghWnd;
HANDLE  ghInst;
int     gnShape = SHAPE_STAR;
POINT   TrianglePoints[] = ((0, 0), (50, 100), (100, 0), (0, 0));
POINT   StarPoints[]     = ((100, 75), (0, 75), (80, 0),
                            (50, 100), (20, 0), (100, 75));

/*******************************************************/
/*            Forward Declarations                     */
/*******************************************************/

BOOL PASCAL            ShapeInit (HANDLE);
void PASCAL            ShapeCreateWindow (void);
long FAR PASCAL        ShapeWndProc (HWND, unsigned, WORD, LONG);
void PASCAL            ShapePaint (HWND, HDC);

/*******************************************************/
/*                   WinMain                           */
/*******************************************************/

int PASCAL WinMain (hInstance, hPrevInstance, lpszCmdLine, cmdShow)
HANDLE hInstance, hPrevInstance;
LPSTR  lpszCmdLine;
int    cmdShow;
(
   MSG msg;

   /* Windows initialization */
   if (!hPrevInstance)
      if (!ShapeInit (hInstance))
         exit (1);
   ghInst = hInstance;

   ShapeCreateWindow ();
   if (ghWnd == NULL)
      exit (1);

   ShowWindow (ghWnd, cmdShow);
   UpdateWindow (ghWnd);

   /* Quit message will terminate application */
   while (GetMessage ((LPMSG)&msg, NULL, 0, 0)) (
      TranslateMessage ((LPMSG)&msg);
      DispatchMessage ((LPMSG)&msg);
      )

   exit (0);
)

/*******************************************************/
/*                   ShapeInit                         */
/*******************************************************/

BOOL PASCAL ShapeInit (hInstance)
HANDLE     hInstance;
(
   WNDCLASS   ShapeClass;

   ShapeClass.cbClsExtra     = 0;
   ShapeClass.cbWndExtra     = 0;
   ShapeClass.hCursor        = LoadCursor (NULL, IDC_ARROW);
   ShapeClass.hIcon          = LoadIcon (hInstance,
                               MAKEINTRESOURCE (SHAPE_ICON));
   ShapeClass.lpszMenuName  = MAKEINTRESOURCE (SHAPE_MENU);
   ShapeClass.lpszClassName = (LPSTR)"Shape";
```

```
    ShapeClass.hbrBackground = GetStockObject (WHITE_BRUSH);
    ShapeClass.hInstance     = hInstance;
    ShapeClass.style         = CS_VREDRAW | CS_HREDRAW;
    ShapeClass.lpfnWndProc   = ShapeWndProc;

    /* register this new class with WINDOWS */
    if (!RegisterClass ((LPWNDCLASS)&ShapeClass))
        return (FALSE);   /* Initialization failed */

    return (TRUE);    /* Initialization succeeded */
}

/*********************************************************/
/*            ShapeCreateWindow                          */
/*********************************************************/

void PASCAL ShapeCreateWindow ()
{
    ghWnd = CreateWindow( (LPSTR)"Shape", (LPSTR)"Shape",
                          WS_OVERLAPPEDWINDOW, 100, 100,
                          300, 150, (HWND)NULL, (HMENU)NULL,
                          ghInst, (LPSTR)NULL );
} /* End of ShapeCreateWindow */

/*********************************************************/
/*                   ShapeWndProc                        */
/*********************************************************/

long FAR PASCAL ShapeWndProc (hWnd, message, wParam, lParam)
HWND            hWnd;
unsigned        message;
WORD            wParam;
LONG            lParam;
{
    HMENU       hMenu;

    switch (message) {
       case WM_PAINT:
          BeginPaint (hWnd, (LPPAINTSTRUCT)&ps);
          ShapePaint (hWnd, ps.hdc);
          EndPaint   (hWnd, (LPPAINTSTRUCT)&ps);
          break;

       case WM_COMMAND:
          hMenu = GetMenu (hWnd);
          CheckMenuItem (hMenu, gnShape, MF_UNCHECKED);
          if ((gnShape = wParam) != SHAPE_NONE)
             CheckMenuItem (hMenu, gnShape, MF_CHECKED);
          InvalidateRect (hWnd, (LPRECT)NULL, TRUE);
          break;

       case WM_DESTROY:
          PostQuitMessage (0);
          break;

       default:
          return (DefWindowProc (hWnd, message, wParam, lParam));
       }

    return (0L);
}
/*********************************************************/
/*                   ShapePaint                          */
/*********************************************************/

void PASCAL   ShapePaint (hWnd, hDC)
HWND   hWnd;
HDC    hDC;
{
    RECT rClient;

    GetClientRect (hWnd, (LPRECT)&rClient);
    SetMapMode (hDC, MM_ANISOTROPIC);
    SetWindowOrg (hDC, -10, 110);
    SetWindowExt (hDC, 120, -120);
    SetViewportOrg (hDC, 0, 0);
    SetViewportExt (hDC, rClient.right, rClient.bottom);
```

```
switch (gnShape) {
   case SHAPE_RECTANGLE:
      Rectangle (hDC, 0, 0, 100, 100);
      break;

   case SHAPE_ELLIPSE:
      Ellipse (hDC, 0, 0, 100, 100);
      break;

   case SHAPE_TRIANGLE:
      Polygon (hDC, (LPPOINT)TrianglePoints, 4);
      break;

   case SHAPE_STAR:
      Polygon (hDC, (LPPOINT)StarPoints, 6);
      break;
   }
}
```

Transforming SHAPES into an Object: Overview

There are really two facets to making SHAPES into a NewWave object:

1. making it look like all the other objects in the NewWave system, and
2. making it work like an object.

The first part is involved with cosmetics such as using the NewWave window management routines, changing SHAPES' menu layout, and adding telescoping effects. These are dictated by the "HP Environment: NewWave User Design Rules", and to keep things simple, we will only add the essential changes for now.

The second part, making it work like an object, involves restructuring the SHAPES program a bit to work with the OMF.

In this section, we are going to alter the SHAPES program to look and work like a very simple NewWave object, called HPSHAPE. To do this, we will change SHAPES to:

- present a NewWave user interface;
- communicate with the OMF;
- allow the OMF to control its life cycle;
- bind a data file to the SHAPES object.

Changes to the User Interface

Adding Window Management

NewWave objects create and manage their windows a little differently than ordinary Windows applications do. The differences allow the object windows to always remain in front of the Desktop's window, and to handle the minimize and maximize functions on these windows.

The first change is that objects create their main window by calling the function NW_CreateWindow rather than the Windows function CreateWindow:

```
NW_CreateWindow (lpClass, lpCaption, lStyle, x, y, cx, cy,
                 hParent, hMenu, hInst, lpParms) : hWnd
```

The parameters are exactly the same as for the Windows function CreateWindow, except that hParent must be NULL. HPSHAPE can also just pass an empty string for lpCaption because we will be changing the caption before the window is shown.

We make this change in the function ShapeCreateWindow. We also need to include the NewWave Utility Functions include file, NWUTIL.H at the beginning of our program to give the C compiler the necessary declarations:

```
#include <nwutil.h>

 ...

void PASCAL ShapeCreateWindow ()
{
    ghWnd = NW_CreateWindow( (LPSTR)"Shape", (LPSTR)"",
                             WS_OVERLAPPEDWINDOW, 100, 100, 300, 150,
                             (HWND)NULL, (HMENU)NULL, ghInst,
                             (LPSTR)NULL );
}
```

NewWave needs to specially process certain Windows messages that are sent to windows created with NW_CreateWindow. Rather than make all applications decide which messages should be handled specially and which should not. NewWave provides a function called NW_MessageFilter which should be called for every message received by the window:

```
NW_MessageFilter (hWnd, message, wParam, lParam, lpReply) : bProcessed
```

The hWnd, message, wParam, and lParam values are exactly what Windows passed to the window procedure. The lpReply parameter points to a LONG value that the function will set if it processes the message. The function returns a non-zero value if it has processed the message. When this happens, the object should immediately return to Windows with the value pointed to by lpReply. However, if the function returns zero, the object should process the message itself before returning to Windows.

```
/*  WINDOW PROCEDURE  */

long FAR PASCAL ShapeWndProc(hWnd, message, wParam, lParam)

 ...

{
    LONG lReply;

    if (NW_MessageFilter (hWnd, message, wParam, lParam,
                          (LONG FAR *) &lReply))
       return (lReply);
```

Windows does not automatically handle the minimize, maximize, and restore commands for windows created with NW_CreateWindow. To make these commands work properly in NewWave, HPSHAPE must use some additional utility functions:

```
    NW_Minimize (hWnd)
    NW_Maximize (hWnd)
    NW_Restore (hWnd)
```

HPSHAPE must check for the Windows WM_SYSCOMMAND message, commands SC_MINIMIZE, SC_MAXIMIZE, and SC_RESTORE and use these utility functions to perform the command. HPSHAPE's window procedure now appears as follows:

```
/*  WINDOW PROCEDURE  */

long FAR PASCAL ShapeWndProc(hWnd, message, wParam, lParam)

 ...

    switch (message) {
       case WM_SYSCOMMAND:
          switch (wParam & 0xFFF0) {
             case SC_MINIMIZE:
                if (IsIconic (hWnd))
                   NW_Restore (hWnd);
                else
```

```
            NW_Minimize(hWnd);
         break;
      case SC_MAXIMIZE:
         if (IsZoomed (hWnd))
            NW_Restore (hWnd);
         else
            NW_Maximize(hWnd);
         break;
      case SC_RESTORE:
         NW_Restore (hWnd);
         break;
      default:
         return (DefWindowProc (hWnd, message, wParam, lParam));
      }
   break;
```

Note that:

1. The low-order four bits of wParam must be masked off for the code to work properly because Windows uses those bits internally.
2. The minimize and maximize commands must be treated as toggles, i.e., they must restore the window if it is already minimized or maximized.
3. All other WM_SYSCOMMAND commands must be passed to DefWindowProc for processing.

Altering the SHAPES Menu

Now we will make some minor changes to the layout of HPSHAPE's menu to better comply with the "HP NewWave Environment: User Interface Design Rules". SHAPE's current menu, as defined in its resource file (SHAPE.RC) is:

```
SHAPE_MENU MENU
BEGIN
  POPUP "Shape"
    BEGIN
       MENUITEM "Rectangle", SHAPE_RECTANGLE
       MENUITEM "Ellipse",   SHAPE_ELLIPSE
       MENUITEM "Triangle",  SHAPE_TRIANGLE
       MENUITEM "Star",      SHAPE_STAR
       MENUITEM "Clear",     SHAPE_NONE
    END
END
```

We will split up the menu into two popup menus: File and Edit. The File menu will offer the different shapes; the Edit menu will only offer the Clear command. Note that we will not need to alter the code at all to support these changes, because Windows will still return the same values in wParam with the WM_COMMAND message.

The new menu for HPSHAPE looks like:

```
HPSHAPE_MENU MENU
BEGIN
  POPUP "&File"
    BEGIN
       MENUITEM &"Rectangle", SHAPE_RECTANGLE
       MENUITEM &"Ellipse",   SHAPE_ELLIPSE
       MENUITEM &"Triangle",  SHAPE_TRIANGLE
       MENUITEM &"Star",      SHAPE_STAR
    END
  POPUP "&Edit"
    BEGIN
       MENUITEM &"Clear", SHAPE_NONE
    END
END
```

Note also that we have added Windows menu mnemonics for the File and Edit menus using the & character.

Communicating with the OMF

To communicate with the OMF, HPSHAPE needs to do three things:

1. initialize its session with the OMF;
2. trap messages from the OMF and set up a procedure to process them; and
3. allow other objects to query about the methods HPSHAPE supports using HAS_METHOD.

Adding OMF Initialization

Since the OMF communicates with HPSHAPE using messages, the first thing we need to do is pass HPSHAPE's window handle to it. We do this with the function OMF_Init:

```
OMF_Init (hWnd, lpszCmdLine, lpPathNameBuffer) : ghOMF
```

With this function, HPSHAPE passes to the OMF its window handle, which it received from NW_CreateWindow, and the command line that was passed to its WinMain. The NewWave Environment has a special use for the command line, lpszCmdLine; HPSHAPE does not try to examine it directly. The OMF in turn returns HPSHAPE's unique root data file name, and returns the OMF handle for the object. The OMF handle identifies the object to the OMF in all subsequent OMF function calls.

We place the call to OMF_Init in WinMain right after we have created our window. Before we do, we must declare the function to the C compiler by referencing the NewWave OMF include file, NWOMF.H, at the beginning of our code:

```
#include <nwomf.h>

 ...

/*  GLOBAL VARIABLES  */

char     gShapeFile[ MAXROOTFILENAMELENGTH + 1];
OMFHND   ghOMF;

 ...

/*  WINMAIN PROCEDURE  */

int PASCAL WinMain( hInstance, hPrevInstance, lpszCmdLine, cmdShow )

 ...

    /* OMF Initialization */
    ghOMF = OMF_Init ( ghWnd, lpszCmdLine, (LPSTR) gShapeFile );
    if (ghOMF <= 1) {
       DestroyWindow (ghWnd);
       exit (1);
       }
```

If the initialization fails, HPSHAPE terminates cleanly by destroying its window and exiting. If the initialization succeeds, HPSHAPE has become an object and must be prepared to be activated and process incoming messages.

Handling OMF Messages

Messages from the OMF always take the form WM_OMF with the OMF-specific message (e.g., OPEN or DIE_PLEASE) in wParam. We trap them by adding another case to HPSHAPE's window procedure.

```
/*  WINDOW PROCEDURE  */

long FAR PASCAL ShapeWndProc(hWnd, message, wParam, lParam)

 ...

    switch (message) {
       case WM_OMF:
          return (MessageFromOMF (hWnd, wParam, lParam));
```

We also need to create the procedure MessageFromOMF to process all the messages from the OMF that HPSHAPE has methods for handling. To start with, it only processes the OMF message HAS_METHOD. Objects may send HAS_METHOD to HPSHAPE to see if it can process other OMF messages like OPEN or DIE_PLEASE.

```
/*  MESSAGE FROM OMF */

long PASCAL MessageFromOMF( hWnd, wParam, lParam )
HWND hWnd;
WORD wParam;
LONG lParam;
{
    switch( wParam )  {
       case HAS_METHOD:
          return (HasMethod ((unsigned)LOWORD(lParam)));
       default :
          return (0L);
       }
}
```

The HAS_METHOD message contains the requested method in the LOWORD of lParam, which HPSHAPE passes to its HasMethod function. We have not yet implemented any methods for processing any OMF messages except HAS_METHOD itself, as shown below:

```
/*  HAS METHOD PROCEDURE  */

long PASCAL HasMethod( Method )
unsigned Method;
{
    switch( Method ) {
       case HAS_METHOD :
          return (METHOD_PRESENT);

       default :
          return (NO_METHOD);
       }
}
```

Having HPSHAPE's HasMethod return METHOD_PRESENT for the HAS_METHOD message itself may seem redundant since HPSHAPE could not reply to this message if it did not even have a HAS_METHOD method to begin with. Actually, all NewWave objects simply assume the other object in the system support the HAS_METHOD method as the bare minimum. We return a value for it from HasMethod merely as a formality.

As an alternative, another object can determine if HPSHAPE had a particular method by examining its properties. As you will see when we build the installation file for HPSHAPE, we must list its properties, including a a list of its methods. The OMF (or another object) can also query HPSHAPE's methods from these properties without asking it directly.

Depending on a number of factors, the system may determine whether a method is supported by using either mechanism. So the same set of methods must be listed both ways (except HAS_METHOD is never included as a property).

HPSHAPE now has the form shown in Figure 3-2.

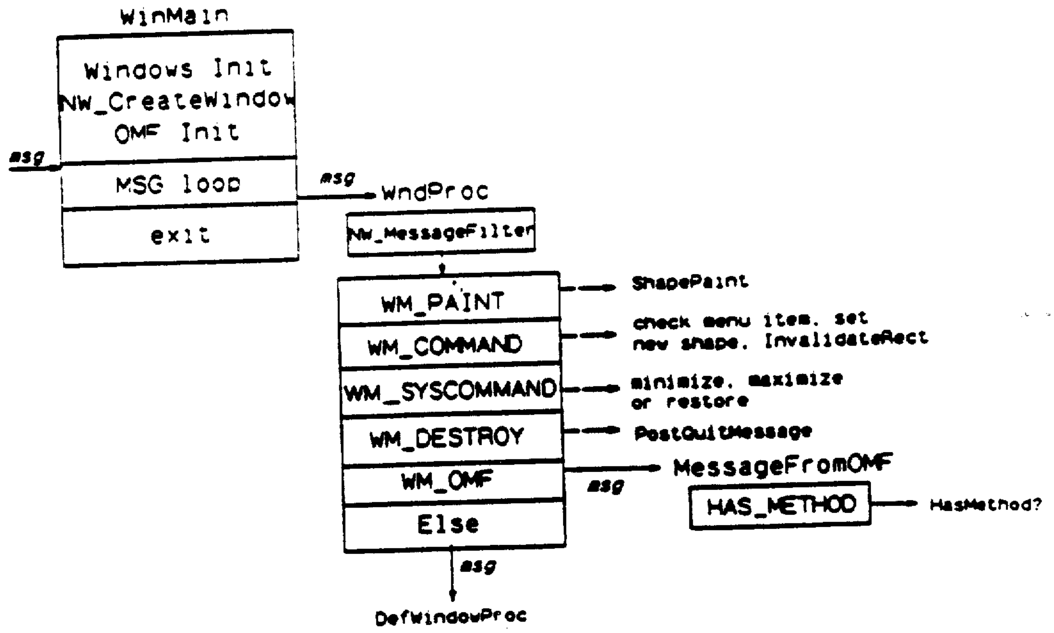

Figure 3-2. HPSHAPE Logic Flow: Phase 1

OMF Control of the Life Cycle

Most Windows programs automatically display their application window in the main body of the program, WinMain, just before they enter the message retrieve/dispatch loop. They process a WM_CREATE message before processing any other message, and destroy their window and terminate when the user closes the window (WM_CLOSE).

NewWave objects respond to most Windows messages just like generic Windows programs do. In the NewWave system, however, the OMF is the master controller, not Windows. Objects like HPSHAPE must change the way they process certain Windows messages to reflect this.

In the Windows version, SHAPES, the window is displayed as soon as it is created. It allows the default window procedure DefWindowProc to process the WM_CLOSE message, which results in Windows destroying its window and sending it a WM_DESTROY message. SHAPES processes the WM_DESTROY message by calling PostQuitMessage (0). All of this has to change to make the program compatible with the OMF.

To allow the OMF to control the activating, opening, closing, and terminating (that is, the life cycle of an object), HPSHAPE must:

1. Show the application window only after an OPEN message arrives.
2. Process the CREATE_OMF message by retrieving the object's title from its list of properties.
3. Process the OPEN message by:
   - setting the object title as the window caption,
   - informing its parents that it is opening and sending them its window position for telescoping, and
   - showing the object window.
4. Process the Windows WM_CLOSE message by:
   - hiding the object window and

- informing its parents that it is closing and sending them its window position for telescoping.

5. NOT respond to the Windows WM_DESTROY message with a call to PostQuitMessage.
6. Process the TERMINATE message by terminating the session with the OMF.
7. Process the DIE_PLEASE message by:
   - destroying the object window and
   - calling PostQuitMessage.

In addition, as we add methods for handling these OMF messages, we must alter HPSHAPE's HasMethod function to return METHOD_PRESENT for the methods CREATE_OMF, OPEN, TERMINATE, and DIE_PLEASE.

Now, let's look at each of these steps in detail.

Adding Activation

The first thing to do is take out the ShowWindow and UpdateWindow calls from WinMain. HPSHAPE displays and hides the window only when requested.

HPSHAPE always receives a CREATE_OMF message as a result of its call to OMF_Init. This is the first NewWave message of any kind that the object receives. When it gets this message, it officially becomes active. This is a good place to do any housekeeping an active object might need, like opening its dat files. For now, all HPSHAPE does is retrieve the object's title from its properties for use as the caption of the window displayed when it receives an OPEN message.

Note that an object is not allowed to make any OMF calls other than OMF_In until it has received the CREATE_OMF message.

HPSHAPE retrieves its object's title using several property functions:

```
OMF_GetProperties  (ghOMF, Name, bClass) : hProperties
OMF_ReadProperty   (ghOMF, hProperties, lpName, lpBuffer, nMaxLength) : nRead
OMF_FreeProperties (ghOMF, hProperties) : bOk
```

The object uses OMF_GetProperties to get a handle to its property list. It use OMF_ReadProperty to read a specific property from that list. It then frees th property list handle because it does not need to read any other properties. In this case, the specific property, lpName, is the object title, PROP_TITLE. lpBuffer is just a long pointer to our title string buffer, gszObjTitle which we declare to be of length MAXTITLE + 1. As you will see in the next section, gszObjTitle is used as the caption of the opening window.

We add the processing for CREATE_OMF as another case within MessageFromOMF:

```
/* GLOBAL VARIABLES */

char     gszObjTitle [MAXTITLE+1];

 ...

/*  MESSAGE FROM OMF  */

long PASCAL MessageFromOMF (hWnd, wParam, lParam)

 ...
```

```
HPROPERTIES hProps;

switch (wParam) {
   case CREATE_OMF :
      gszObjTitle [0] = 0;    /* default */
      hProps = OMF_GetProperties (ghOMF, SELF, FALSE);
      if (hProps != NULL) {
         OMF_ReadProperty (ghOMF, hProps, PROP_TITLE,
                           (LPSTR)gszObjTitle,
                           sizeof(gszObjTitle));
         OMF_FreeProperties (ghOMF, hProps);
         }
      return (CO_OK);
```

Note that HPSHAPE returns CO_OK to tell the OMF it is finished with its activation processing and can now accept other messages.

Now that HPSHAPE can handle the CREATE_OMF message. it should be able to respond properly to a HAS_METHOD (CREATE_OMF) message if it receives one. It should return METHOD_PRESENT for HasMethod (CREATE_OMF). To do this, we simply add CREATE_OMF as another case that returns METHOD_PRESENT in our HasMethod function.

```
/*  HAS METHOD PROCEDURE  */

long PASCAL HasMethod( Method )
unsigned Method;
{
    switch( Method ) {
       case HAS_METHOD :
       case CREATE_OMF :
          return (METHOD_PRESENT);

       default :
          return (NO_METHOD);
       }
}
```

Adding Open

After it receives a CREATE_OMF message, HPSHAPE is active and can process other messages. In order for it to be interactive with the user, however, it must first receive an OPEN message. To process the OPEN message, HPSHAPE should set the caption on its window, inform its parents to display the telescoping effect from an icon to an open window, and then show the window.

HPSHAPE uses a Windows function, SetWindowText, to set up the retrieved object title as the window caption:

```
SetWindowText (hWnd, (LPSTR)gszObjTitle);
```

HPSHAPE informs its parents that is opening using the OMF procedure:

```
OMF_Opening (ghOMF, lpRect)
```

The second parameter, a long pointer to a rectangle (LPRECT), describes where the opening window is going to be displayed on the screen. The object's parents use the rectangle coordinates to draw the successively larger rectangles which make it appear as if the object telescopes from an icon to an open window.

We can find out the coordinates of the hidden window by using a Windows function, and then inform our parents to telescope:

```
GetWindowRect (hWnd, (LPRECT) &rRect);
OMF_Opening (ghOMF, (LPRECT) &rRect);
```

HPSHAPE can now display its object window:

```
ShowWindow (hWnd, SW_NORMAL);
UpdateWindow (hWnd);
```

The entire section of code for opening is as follows:

```
long PASCAL MessageFromOMF (hWnd, wParam, lParam)

 ...

   RECT rRect;

   switch (wParam) {
      case OPEN:
         SetWindowText (hWnd, (LPSTR)gszObjTitle);
         GetWindowRect (hWnd, (LPRECT) &rRect);
         OMF_Opening (ghOMF, (LPRECT) &rRect);
         ShowWindow (hWnd, SW_NORMAL);
         UpdateWindow (hWnd);
         return (0L);
```

Finally, since HPSHAPE now has a method for handling the OPEN message, we can add OPEN as another case that returns METHOD_PRESENT in HPSHAPE's HasMethod function.

Adding Close

Closing an object is the exact opposite of opening it. HPSHAPE must hide its object window, and then inform its parents to telescope from where the window is back to the object's icon.

When the user closes HPSHAPE's object window, HPSHAPE receives a WM_CLOSE message from Windows. At this time, HPSHAPE hides its window, as the user expects it to disappear, but remains active. We also add OMF_Closing, the opposite of OMF_Opening. It will inform the object's parent to do the backwards telescoping from object window to icon. We do all this in HPSHAPE's window procedure because WM_CLOSE is a Windows message:

```
long FAR PASCAL ShapeWndProc(hWnd, message, wParam, lParam)

 ...

   RECT rRect;

   switch (message) {
      case WM_CLOSE:
         ShowWindow (hWnd, SW_HIDE);
         UpdateWindow (hWnd);
         GetWindowRect (hWnd, (LPRECT) &rRect);
         OMF_Closing (ghOMF, (LPRECT) &rRect);
         break;
```

Note that because WM_CLOSE is a Windows message, we do not add a case for WM_CLOSE in HPSHAPE's HasMethod procedure. The only messages HPSHAPE needs to list are methods for OMF messages.

Adding Termination

Termination is the opposite of activation. When an object terminates, it prepares to enter an inactive state.

The first thing we need to do is take the case for the Windows WM_DESTROY message out of HPSHAPE's window procedure. We allow the default window procedure (DefWindowProc) to process this message, for which it will do nothing.

When HPSHAPE receives the TERMINATE message from the OMF, it must do its last-breath housekeeping and release its OMF handle. The OMF function OMF_Term releases the OMF handle that OMF_Init provided. Note that your application cannot make any other OMF calls after it has called OMF_Term. HPSHAPE then returns TERMINATE_OK after processing TERMINATE.

We add this case to MessageFromOMF:

```
long PASCAL MessageFromOMF( hWnd, wParam, lParam )

 ...

    switch (wParam) {
       case TERMINATE :
          OMF_Term (ghOMF);
          return (TERMINATE_OK);
```

Once again, since HPSHAPE now has a method for handling the TERMINATE message, we can add TERMINATE as another case that returns METHOD_PRESENT in HPSHAPE's HasMethod function.

The last NewWave message that HPSHAPE receives is DIE_PLEASE. This message tells the object to destroy its window and call PostQuitMessage to terminate its GetMessage/DispatchMessage loop. It is the last case that we add to MessageFromOMF:

```
    case DIE_PLEASE :
       DestroyWindow (hWnd);
       PostQuitMessage (0);
       return (0L);
```

DIE_PLEASE is the last method we will include in HPSHAPE in this chapter, so that the HasMethod procedure is now as follows:

```
/*  HAS METHOD PROCEDURE  */

long PASCAL HasMethod( Method )
unsigned Method;
{
    switch( Method ) {
       case HAS_METHOD :
       case CREATE_OMF :
       case OPEN       :
       case TERMINATE  :
       case DIE_PLEASE :
          return (METHOD_PRESENT);

       default :
          return (NO_METHOD);
       }
}
```

The form of HPSHAPE at this stage is shown in Figure 3-3.

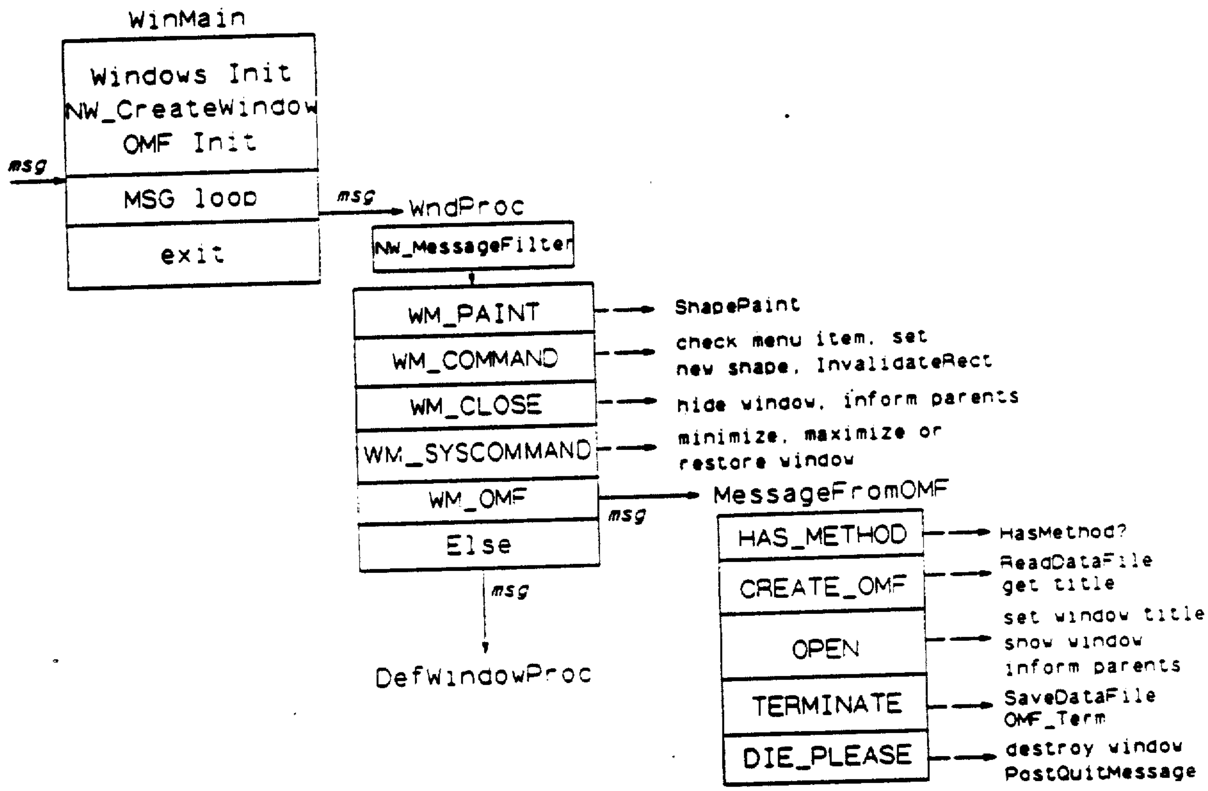

Figure 3-3. HPSHAPE Logic Flow: Phase 2

Binding a Data File to HPSHAPE

The last thing we need to do to HPSHAPE is bind a data file to it. The Windows version of the program, SHAPES, had no need for a data file because the shape was not remembered when the application was closed. The NewWave version, HPSHAPE, however, saves out the last shape chosen when it terminates so the same shape appears when it is invoked again. It does this because NewWave objects are not just applications, they are instances of data attached to applications.

The OMF has actually done all the "binding" for us by creating a unique root data file name for us; we now just need to use it. The next steps are:

1. Create a data file name from the root file name passed to HPSHAPE from OMF_Init.
2. Read the data file as part of the CREATE_OMF processing.
3. Write the data file as part of the OMF_TERMINATE processing.

Naming Data Files

As you may recall, part of the purpose of calling OMF_Init is to retrieve the object's root data file name. The OMF creates unique file names for all its objects in the form:

```
drive:\path\name
```

To use this name for its data file. HPSHAPE only needs to add a file name extension to it. If HPSHAPE needed more than one data file, it would simply use different file name extensions to identify them.

For HPSHAPE, we attach the file name extension ".SHP" to our global variable gShapeFile using the C function strcat before we open the file. We will add this, and a call to a new procedure we need to write, ReadDataFile, to our CREATE_OMF message processing in MessageFromOMF:

```
case CREATE_OMF :
   strcat (gShapeFile, ".shp");
   ReadDataFile (hWnd);
   gszObjTitle [0] = 0;     /* default */
   hProps = OMF_GetProperties (ghOMF, SELF, FALSE);
   if (hProps != NULL) {
      OMF_ReadProperty (ghOMF, hProps, PROP_TITLE,
                        (LPSTR)gszObjTitle,
                        -sizeof(gszObjTitle));
      OMF_FreeProperties (ghOMF, hProps);
      }
   return (CO_OK);
```

Reading The Data Files

The procedure ReadDataFile is used to:

1. Convert the file name from the ANSI character set to the correct local character set.
2. Try to open the file, and if it exists:
   - read the first record from the file (the shape),
   - close the file, and
   - put up a check mark for the shape on the Edit menu that it retrieved from the data file.

```
/*      ReadDataFile        */

BOOL PASCAL ReadDataFile (hWnd)
HWND        hWnd;
{
    int  hFile;
    char LocalShapeFile(MAXROOTFILENAMELENGTH+1];

    AnsiToOem ((LPSTR)gShapeFile, (LPSTR)LocalShapeFile);
    if ((hFile = open (LocalShapeFile, O_RDONLY | O_BINARY))
                 != -1) {
       if (read (hFile, &gnShape, sizeof(int))
             != sizeof(int))
          gnShape = SHAPE_NONE;
       close (hFile);
       if (gnShape != SHAPE_NONE)
          CheckMenuItem (GetMenu (hWnd), gnShape,
                         MF_CHECKED);
       return (TRUE);
       }
    else
       return (FALSE);
}
```

AnsiToOem is a Windows function that does character set conversion. This conversion is necessary because all file names returned by and passed to the OMF use the ANSI character set, which is not necessarily the same as the native character set of the operating system.

Open, read and close are all low-level I/O functions in C. To use these functions, we must also add the include statements that define these functions for the Microsoft C compiler:

```
#include <fcntl.h>
#include <sys\types.h>
#include <sys\stat.h>
#include <io.h>
```

Writing The Data Files

We read from our data file as part of HPSHAPE's CREATE_OMF processing. Conversely, we need to write to the data file as part of our OMF_TERMINATE processing:

```
case TERMINATE  :
    SaveDataFile ();
    OMF_Term (ghOMF);
    return (TERMINATE_OK);
```

Our procedure SaveDataFile does the following:

1. Converts the file name from the ANSI character set to the correct local character set.
2. Opens the file.
3. Writes out the current shape.
4. Closes the file.

```
/*      SaveDataFile        */

void PASCAL SaveDataFile ()
{
    int hFile;
    char LocalShapeFile[MAXROOTFILENAMELENGTH+1];

    AnsiToOem ((LPSTR)gShapeFile, (LPSTR)LocalShapeFile);
    hFile = open (LocalShapeFile, O_WRONLY | O_CREAT |
                  O_TRUNC | O_BINARY, S_IREAD | S_IWRITE);
    if (hFile == -1) return;
    write (hFile, &gnShape, sizeof(int));
    close (hFile);
}
```

At this stage, HPSHAPE's form is as shown in Figure 3-4. HPSHAPE is now functionally a very simple OMF object. It supports the minimum set of methods for handling OMF messages. It can activate itself, open itself, and terminate itself. It cannot display views of itself within other objects' windows or print itself. These topics are covered in the "HP NewWave Environment: Design Examples" manual.

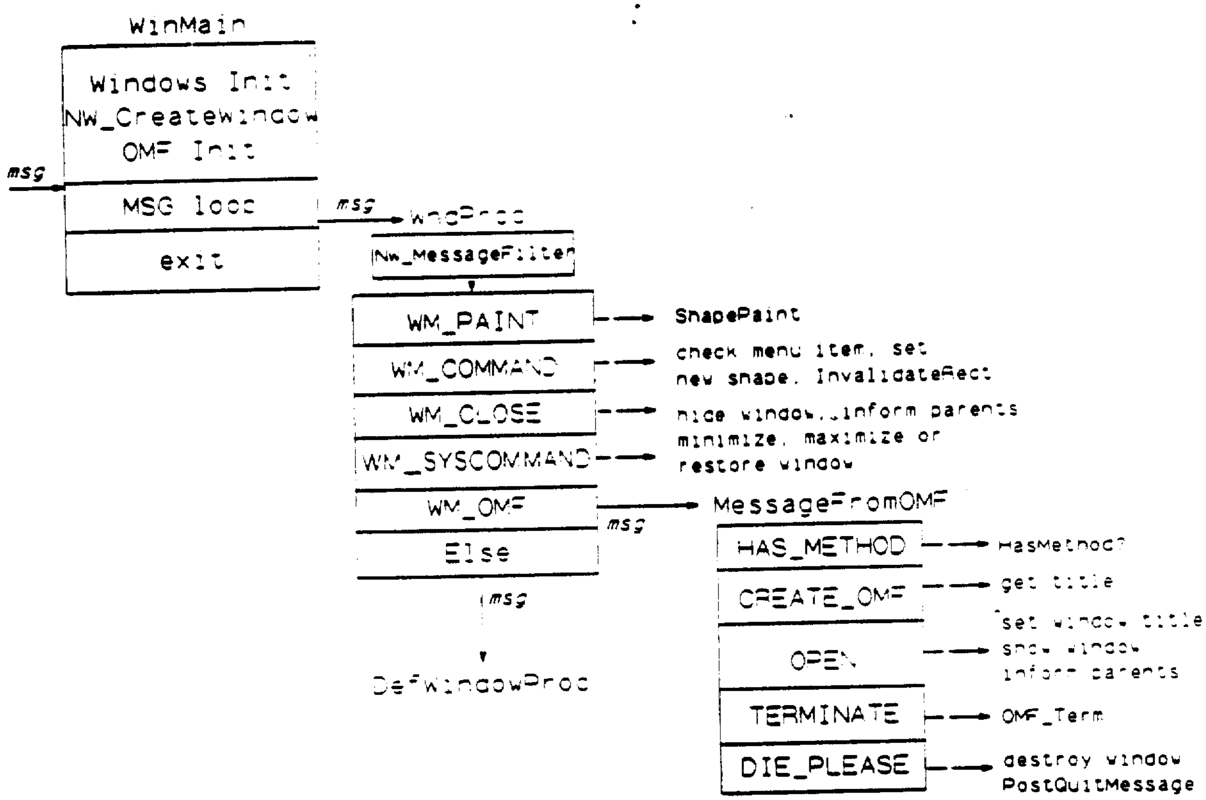

Figure 3-4. HPSHAPE Logic Flow: Final Phase

Listing of HPSHAPE

The following is a complete listing of HPSHAPE after adding the changes that make it a simple OMF object:

```
/*********************************************************/
/*              HPSHAPE Skeleton Application             */
/*                                                       */
/*       Copyright (c) Hewlett-Packard Co. 1988          */
/*********************************************************/

#define NOMINMAX      /* stdlib.h also defines min & max */
#define NOCOMM        /* suppress compiler running from Windows.H */
#include <windows.h>

#include <nwutil.h>
#include <nwomf.h>

#include <fcntl.h>
#include <types.h>
#include <stat.h>
#include <stdlib.h>
#include <string.h>
#include <stdio.h>
#include <io.h>

#include "hpshape.h"

/*********************************************************/
/*                    Global Variables                   */
/*********************************************************/

HANDLE          ghInst;
HWND            ghWnd;
OMFHND          ghOMF;
char            gShapeFile[MAXROOTFILENAMELENGTH+1];
char            gszObjTitle[MAXTITLE+1];
```

```
int     gnShape = SHAPE_STAR;
POINT   TrianglePoints[] = {{0, 0}, {50, 100}, {100, 0},
                           {0, 0}};
POINT   StarPoints[]     = {{100, 75}, {0, 75}, {80, 0},
                           {50, 100}, {20, 0}, {100, 75}};

/*********************************************************/
/*              Forward Declarations                    */
/*********************************************************/

/* Basic Windows Routines                                */
BOOL PASCAL             ShapeInit (HANDLE);
void PASCAL             ShapeCreateWindow (void);
long FAR PASCAL         ShapeWndProc (HWND, unsigned, WORD,
                                      LONG);
void PASCAL             ShapePaint (HWND, HDC);
/* OMF Routines                                          */
long PASCAL             MessageFromOMF (HWND, WORD, LONG);
long PASCAL             HasMethod (unsigned);
/* Utilities                                             */
BOOL PASCAL             ReadDataFile (HWND);
void PASCAL             SaveDataFile (void);
/*********************************************************/
/*                  WinMain                              */
/*********************************************************/

int PASCAL WinMain (hInstance, hPrevInstance, lpszCmdLine,
                   cmdShow)
HANDLE hInstance,
       hPrevInstance;
LPSTR  lpszCmdLine;
int    cmdShow;
{
    MSG msg;

    /* Windows initialization */
    if (!hPrevInstance)
       if (!ShapeInit (hInstance))
          exit (1);
    ghInst = hInstance;
    ShapeCreateWindow ();
    if (ghWnd == NULL)
       exit (1);

    /* OMF initialization */
    ghOMF = OMF_Init (ghWnd, lpszCmdLine, (LPSTR)gShapeFile);
    if (ghOMF <= 1) {
       DestroyWindow (ghWnd);
       exit (1);
       }

    /* Quit message will terminate application */
    while (GetMessage ((LPMSG)&msg, NULL, 0, 0)) {
       TranslateMessage ((LPMSG)&msg);
       DispatchMessage ((LPMSG)&msg);
       }
    exit (0);
}
/*********************************************************/
/*                  ShapeInit                            */
/*********************************************************/

BOOL PASCAL ShapeInit (hInstance)
HANDLE      hInstance;
{
    WNDCLASS   HPSHAPEClass;

    HPSHAPEClass.cbClsExtra     = 0;
    HPSHAPEClass.cbWndExtra     = 0;
    HPSHAPEClass.hCursor        = LoadCursor (NULL, IDC_ARROW);
    HPSHAPEClass.hIcon          = LoadIcon (hInstance,
                                     MAKEINTRESOURCE (HPSHAPE_ICON));
    HPSHAPEClass.lpszMenuName   = MAKEINTRESOURCE (HPSHAPE_MENU);
    HPSHAPEClass.lpszClassName = (LPSTR)"HPSHAPE";
```

```
    HPSHAPEClass.hbrBackground = GetStockObject (WHITE_BRUSH);
    HPSHAPEClass.hInstance     = hInstance;
    HPSHAPEClass.style         = CS_VREDRAW | CS_HREDRAW;
    HPSHAPEClass.lpfnWndProc   = ShapeWndProc;

    /* register this new class with WINDOWS */
    if (!RegisterClass ((LPWNDCLASS)&HPSHAPEClass))
       return (FALSE);   /* Initialization failed */
    return (TRUE);    /* Initialization succeeded */
}

/*******************************************************/
/*             ShapeCreateWindow                       */
/*******************************************************/

void PASCAL ShapeCreateWindow ()
{
    ghWnd = NW_CreateWindow ((LPSTR) "HPSHAPE", (LPSTR) "",
                            WS_OVERLAPPEDWINDOW, 100, 100, 300, 150,
                            (HWND)NULL, (HMENU)NULL, ghInst,
                            (LPSTR)NULL );
} /* End of ShapeCreateWindow */

/*******************************************************/
/*                    ShapeWndProc                     */
/*******************************************************/

long FAR PASCAL ShapeWndProc (hWnd, message, wParam, lParam)
HWND            hWnd;
unsigned        message;
WORD            wParam;
LONG            lParam;
{
    LONG   lReply;
    HMENU  hMenu;
    RECT   rRect;

    if (NW_MessageFilter (hWnd, message, wParam, lParam,
                          (LONG FAR *) &lReply))
       return (lReply);

    switch (message) {
       case WM_PAINT:
          BeginPaint (hWnd, (LPPAINTSTRUCT)&ps);
          ShapePaint (hWnd, ps.hdc);
          EndPaint   (hWnd, (LPPAINTSTRUCT)&ps);
          break;

       case WM_CLOSE:
          ShowWindow (hWnd, SW_HIDE);
          UpdateWindow (hWnd);
          GetWindowRect (hWnd, (LPRECT) &rRect);
          OMF_Closing (ghOMF, (LPRECT) &rRect);
          break;

       case WM_COMMAND:
          hMenu = GetMenu (hWnd);
          CheckMenuItem (hMenu, gnShape, MF_UNCHECKED);
          if ((gnShape = wParam) != SHAPE_NONE)
             CheckMenuItem (hMenu, gnShape, MF_CHECKED);
          InvalidateRect (hWnd, (LPRECT)NULL, TRUE);
          break;

          case WM_SYSCOMMAND:
             switch (wParam & 0xFFF0) {
                case SC_MINIMIZE:
                   if (IsIconic (hWnd))
                      NW_Restore (hWnd);
                   else
                      NW_Minimize(hWnd);
                   break;

                case SC_MAXIMIZE:
                   if (IsZoomed (hWnd))
                      NW_Restore (hWnd);
                   else
                      NW_Maximize(hWnd);
                   break;
```

```
            case SC_RESTORE:
               NW_Restore (hWnd);
               break;

            default:
               return (DefWindowProc (hWnd, message, wParam, lParam));
            }
         break;

      case WM_OMF:
         return (MessageFromOMF (hWnd, wParam, lParam));

      default:
         return (DefWindowProc (hWnd, message, wParam, lParam));
      }

   return (0L);
}
/**********************************************************/
/*                  ShapePaint                            */
/**********************************************************/

void PASCAL   ShapePaint (hWnd, hDC)
HWND    hWnd;
HDC     hDC;
{
    RECT rClient;

    GetClientRect (hWnd, (LPRECT)&rClient);
    SetMapMode (hDC, MM_ANISOTROPIC);
    SetWindowOrg (hDC, -10, 110);
    SetWindowExt (hDC, 120, -120);
    SetViewportOrg (hDC, 0, 0);
    SetViewportExt (hDC, rClient.right, rClient.bottom);

    switch (gnShape) {
       case SHAPE_RECTANGLE:
          Rectangle (hDC, 0, 0, 100, 100);
          break;

       case SHAPE_ELLIPSE:
          Ellipse (hDC, 0, 0, 100, 100);
          break;

       case SHAPE_TRIANGLE:
          Polygon (hDC, (LPPOINT)TrianglePoints, 4);
          break;

       case SHAPE_STAR:
          Polygon (hDC, (LPPOINT)StarPoints, 6);
          break;
       }

}
/**********************************************************/
/*                      MessageFromOMF                    */
/**********************************************************/

long PASCAL MessageFromOMF (hWnd, wParam, lParam)
HWND hWnd;
WORD wParam;
LONG lParam;
{
    HPROPERTIES   hProp;
    RECT          rRect;

    switch (wParam)  {
       case CREATE_OMF :
          strcat (gShapeFile, ".shp");
          ReadDataFile (hWnd);
          gszObjTitle [0] = 0;    /* default */
          hProps = OMF_GetProperties (ghOMF, SELF, FALSE);
          if (hProps != NULL) {
             OMF_ReadProperty (ghOMF, hProps, PROP_TITLE,
                               (LPSTR)gszObjTitle,
                               -sizeof(gszObjTitle));
             OMF_FreeProperties (ghOMF, hProps);
```

```
            }
         return (CO_OK);

      case OPEN        :
         SetWindowText (hWnd, (LPSTR)gszObjTitle);
         GetWindowRect (hWnd, (LPRECT) &rRect);
         OMF_Opening (ghOMF, (LPRECT) &rRect);
         ShowWindow (hWnd, SW_NORMAL);
         UpdateWindow (hWnd);
         return (0L);

      case HAS_METHOD :
         return( HasMethod( (unsigned)LOWORD(lParam) ) );

      case TERMINATE  :
         SaveDataFile ();
         OMF_Term (ghOMF);
         return (TERMINATE_OK);

      case DIE_PLEASE :
         DestroyWindow (hWnd);
         PostQuitMessage (0);
         return (0L);

      default :
          return (0L);
      }
}  /* MessageFromOMF */


/*********************************************************/
/*                    HasMethod                          */
/*********************************************************/

long PASCAL HasMethod (Method)
unsigned    Method;
{
    switch (Method)  {
       case CREATE_OMF  :
       case OPEN        :
       case TERMINATE   :
       case DIE_PLEASE  :
          return (METHOD_PRESENT);

       default :
          return (NO_METHOD);
    }
}   /* HasMethod */

/*********************************************************/
/*              ReadDataFile                             */
/*********************************************************/

BOOL PASCAL ReadDataFile (hWnd)
HWND         hWnd;
{
    int  hFile;
    char LocalShapeFile[MAXROOTFILENAMELENGTH+1];

    AnsiToOem( (LPSTR)gShapeFile, (LPSTR)LocalShapeFile );
    if ((hFile = open (LocalShapeFile, O_RDONLY | O_BINARY))
               != -1) {
       if (read (hFile, &gnShape, sizeof(int)) != sizeof(int))
          gnShape = SHAPE_NONE;
       close (hFile);
       if (gnShape != SHAPE_NONE)
          CheckMenuItem (GetMenu (hWnd), gnShape, MF_CHECKED);
       return (TRUE);
       }
    else
       return (FALSE);
}
```

```
/*********************************************************/
/*              SaveDataFile                              */
/*********************************************************/

void PASCAL SaveDataFile ()
{
    int hFile;
    char LocalShapeFile[MAXROOTFILENAMELENGTH+1];

    AnsiToOem ((LPSTR)gShapeFile, (LPSTR)LocalShapeFile);
    hFile = open (LocalShapeFile,
                  O_WRONLY | O_CREAT | O_TRUNC | O_BINARY,
                  S_IREAD | S_IWRITE);
    if (hFile == -1) return;
    write (hFile, &gnShape, sizeof(int));
    close (hFile);
}
```

Compiling, Linking, and Installing

To prepare HPSHAPE to run in the NewWave environment, you must have these files:

- The Source Files (HPSHAPE.C and include files),
- The Resource File (HPSHAPE.RC),
- The Icon Files (HPSHAPE.ICO and HPSHAPEM.ICO),
- The Definition File (HPSHAPE.DEF), and
- The Installation File (HPSHAPE.IN$).

The first four are the standard files necessary to build a Windows application. The last one, the installation file, is used to install your application into NewWave.

A complete listing of all of the files can be found in Appendix B. Remember that our HPSHAPE program files are not the same as the ones listed in the back of this manual, but form an introductory skeleton to be built on in subsequent chapters.

Creating Source Files

We have already created the source file for HPSHAPE in the first part of this chapter. Please note, however, that it uses several include files:

- HPSHAPE.H
- WINDOWS.H
- NWUTIL.H
- NWOMF.H
- various C include files

HPSHAPE.H

HPSHAPE.H basically defines values for the different shapes that the user may draw on the screen:

```
#define SHAPE_RECTANGLE    100
#define SHAPE_ELLIPSE      101
#define SHAPE_TRIANGLE     102
#define SHAPE_STAR         103
#define SHAPE_NONE         104
```

WINDOWS.H

WINDOWS.H is the standard Windows include file. It defines all the Windows functions, data structures, types, and constants. Since the Windows environment forms the foundation of the NewWave environment, the WINDOWS.H file must always be included in the application.

NWUTIL.H

NWUTIL.H is the NewWave utility functions include file. It defines the utility function calls and the data structures, types, and constants for using these calls.

NWOMF.H

NWOMF.H is the OMF include file. It defines all of the OMF function calls, structures for use with the clipboard, structures for properties and fast properties, global object names, standard class names and their methods, miscellaneous defines for calls and messages, structures for different messages, maximums and other constants, scopes, and general types and defines. By default, NWOMF.H includes the NewWave error number file, NWOMFERR.H.

I/O Utility Files

As we discussed in the previous section on binding a file to HPSHAPE, the input/output routines used come from various C libraries.

Resource File

Since NewWave is Windows-based, we must have a resource file for HPSHAPE to define the names and attributes of the resources that HPSHAPE needs.

The HPSHAPE.RC resource file defines the file name of the icon that will represent HPSHAPE when it is minimized (HPSHAPEM.ICO). This icon should be different than the icon used to represent HPSHAPE objects to help users distinguish minimized windows from object icons.

The resource file also defines the application menus and the command selections from those menus. It includes STYLE.H, a stripped down version of WINDOWS.H created especially for resource compilation, and the HPSHAPE include file, HPSHAPE.H, to define the menu selections:

```
#include "STYLE.H"
#include "HPSHAPE.H"

HPSHAPE_ICON ICON    HPSHAPEM.ICO

HPSHAPE_MENU MENU
BEGIN
  POPUP "&File"
    BEGIN
      MENUITEM "Rectangle", SHAPE_RECTANGLE
      MENUITEM "Ellipse",   SHAPE_ELLIPSE
      MENUITEM "Triangle",  SHAPE_TRIANGLE
      MENUITEM "Star",      SHAPE_STAR
    END
  POPUP "&Edit"
    BEGIN
      MENUITEM "Clear", SHAPE_NONE
    END
END
```

Icon Files

HPSHAPEM.ICO is the icon used to represent the HPSHAPE application when its window has been minimized. The HPSHAPE icon is basically a small pictorial representation of the HPSHAPE object.

HPSHAPE.ICO is the icon used to represent HPSHAPE objects on the NewWave Office. This icon is similar but not the same as the HPSHAPEM.ICO icon. As recommended by the "HP NewWave Environment: User Interface Design Rules" manual, the minimized icon uses a dashed border, and the object icon a solid border.

Icon files are created by using the Window's utility, ICONEDIT.EXE, which comes with the Windows Software Developement Kit.

Definition File

HPSHAPE.DEF is the definition file required for all Windows-based applications. This file contains information such as the application's name, the name of its MS-DOS stub program, the size of the stack, the size of the heap, some specifications for the code segments and data segment, plus the import and export list for the application.

```
NAME    HPSHAPE

DESCRIPTION 'HP NewWave version of SHAPES program'

STUB 'WINSTUB.EXE'

CODE    MOVEABLE
DATA    MOVEABLE MULTIPLE
HEAPSIZE    2048
STACKSIZE   4096

EXPORTS         ;Must export all procedures called by Windows
    ShapeWndProc @1 ; (ordinal numbers use less memory)
```

All procedures called directly by Windows must be exported. The only procedure in HPSHAPE that Windows calls directly is its main window procedure, ShapeWndProc, which it calls to pass messages to HPSHAPE.

Installation File

HPSHAPE.INS is a text file containing NewWave installation commands. This file is described in detail later in this chapter.

Compiling and Linking HPSHAPE

HPSHAPE is compiled and linked in the same manner as a regular Windows application. We use Microsoft's MAKE utility to automate the process and create a special MAKE file for HPSHAPE (called HPSHAPE.MAK):

```
# Directory where OMF files are located:
OMF = \HPNWDEV

HPSHAPE.OBJ: HPSHAPE.C HPSHAPE.H
  cl -c -AM -Gw -Oas -Zpe -W2 -I$(OMF) HPSHAPE.C

HPSHAPE.RES: HPSHAPE.RC HPSHAPE.H HPSHAPEM.ICO .
  rc -r  HPSHAPE.RC

HPSHAPE.NWE: HPSHAPE.DEF HPSHAPE.OBJ
  link4  HPSHAPE, HPSHAPE.NWE/NOE, HPSHAPE/MAP,  \
      $(OMF)\HPNWLIB MLIBW, HPSHAPE.DEF
  rc     HPSHAPE.RES HPSHAPE.NWE
  mapsym HPSHAPE

HPSHAPE.NWE: HPSHAPE.RES
  rc     HPSHAPE.RES HPSHAPE.NWE
```

The file shows the process of compiling and linking the HPSHAPE application:

1. The first step involves compiling the source file (HPSHAPE.C) with the Windows include file (WINDOWS.H), the NewWave include files (NWOMF.H and NWUTIL.H), and the include file for the HPSHAPE application itself (HPSHAPE.H). These files are compiled by the Microsoft C Compiler, and the object code for the HPSHAPE program is created (HPSHAPE.OBJ).
2. The second step involves compiling the resource file (HPSHAPE.RC) with the Windows include file (STYLE.H), and the HPSHAPE include file (HPSHAPE.H). These files are processed through Microsoft's resource compiler, creating HPSHAPE.RES which contains the compiled resource information. The resource file includes HPSHAPEM.ICO, which is the icon to be displayed by Windows when HPSHAPE is minimized.
3. The third step is to link the object code of HPSHAPE (HPSHAPE.OBJ), with the definition file (HPSHAPE.DEF), and any standard Windows and C libraries that are included in the program. Also included is the NewWave library (HPNWLIB.LIB) which contains all the NewWave utility and OMF functions we are using. Note that we are overriding the linker's default .EXE extension for the executable file to .NWE. This is done to prevent an end user of the system from trying to run the application without the NewWave environment. In this step, we add the compiled resource file (HPSHAPE.RES) to the executable, and run the Microsoft MAPSYM utility to produce a .SYM file for symbolic debugging.
4. The fourth and final step is optional. This step covers the case in which only the resource file is modified. In this situation, there is no need to relink the object files of the application, since the application was not modified. Therefore, it is advantageous to bypass step three if the only file that was changed was the resource file, and just re-add the compiled resource file (HPSHAPE.RES) to the executable file, replacing the old resources.

At this point the HPSHAPE application is compiled and ready to be installed into the NewWave environment.

HPSHAPE Installation

The first step in installing NewWave applications is creating an installation file. HPSHAPE's installation file, HPSHAPE.INS, specifies the:

- information required by the OMF to identify the application
- files which are to be installed with the application
- names of the executable files
- name of the object's icon
- methods the application supports
- class properties
- object properties This file is as follows. (Note that it resembles a Windows resource file.)

```
CLASS_NAME      "HPSHAPE"
TEXT_ID         "HP Shape"
ICON_NAME       "HPSHAPE"
ICON_FILE       HPSHAPE.ICO     END_NAMES

OVERWRITE_OLD_OBJECT
```

```
EXECUTABLE_FILE  HPSHAPE.NWE

MODULE_FILENAMES
   HPSHAPE.NWE
END_NAMES

OBJECT_FILENAMES   END_NAMES  ;no initial data files

HAVE_METHODS
   CREATE_OMF
   OPEN
   TERMINATE
   DIE_PLEASE
END_METHODS

OBJECT_PROPERTIES
   PROP_SYSTEM
      BEGIN_VALUES
      END_VALUES
END_PROPERTIES
```

Description of Installation Terms

`CLASS_NAME     "HPSHAPE"`

The *CLASS_NAME* should always be the first statement in the installation file. It uniquely identifies the type of object that is being installed. Since the application is called HPSHAPE, that is the name that is assigned. This name is kept as a class property.

`TEXT_ID     "HP Shape"`

*TEXT_ID* is the textual name of the object class which is displayed when you bring up the "Create A New ..." dialog box. It too is kept as a class property.

`ICON_NAME     • "HPSHAPE"`

*ICON_NAME* identifies the icon that is used to represent HPSHAPE objects on the NewWave Desktop or in folders. In general, this name should always be the same as the CLASS_NAME of the application.

`ICON_FILE     HPSHAPE.ICO     END_NAMES`

*ICON_FILE* is the icon file that corresponds to ICON_NAME.

`EXECUTABLE_FILE   HPSHAPE.NWE`

*EXECUTABLE_FILE* designates the name of the file that will be executed when the object is activated, in this case HPSHAPE.NWE.

`MODULE_FILENAMES     HPSHAPE.NWE     END_NAMES`

*MODULE_FILENAMES* identifies the object's files that should be copied into the OMF's application directory. Since any number of files could be associated with an application, MODULE_FILENAMES allows for more than one file name to be specified. The END_NAMES statement must be used to denote the end of the list. Please note that the executable file must be included in this list for it to be copied over; the EXECUTABLE_FILE entry merely designates it as executable.

`OBJECT_FILENAMES     END_NAMES`

*OBJECT_FILENAMES* allows a set of files to be copied to the OMF's data directory to serve as the initial data files of each HPSHAPE object created using the "Create A New ..." dialog box. HPSHAPE objects do not need any initial data files, so do not list any files here.

```
HAVE_METHODS
   CREATE_OMF
   OPEN
   TERMINATE
   DIE_PLEASE
END_NAMES
```

*HAVE_METHODS* is the list of the methods that the HPSHAPE program supports. These methods are copied to the class properties of the object, thus allowing the OMF and other applications to inquire if the object supports a method or not. If a given method is not specified in the list, other objects and the OMF will assume at run-time that the installed application does not support the requested method. (Note that HAS_METHOD is not listed.)

```
OBJECT_PROPERTIES
   PROP_SYSTEM
        BEGIN_VALUES
        END_VALUES
END_PROPERTIES
```

*OBJECT_PROPERTIES* defines the initial object properties of each HPSHAPE object created using the "Create A New ..." dialog box.

PROP_SYSTEM is an object property that is required for objects to be created by the "Create a New ..." dialog process in the File menu. No values have been specified for PROP_SYSTEM so that the object being installed becomes the "blank" master.

Installing HPSHAPE: The Final Step

To install HPSHAPE, all we do is select Installation from the Settings menu on the NewWave Office, and specify the name HPSHAPE.INS. The NewWave Office takes over and installs HPSHAPE as a new master object. All of the files specified in the .INS file, i.e. HPSHAPE.ICO and HPSHAPE.NWE, must be in the same directory of the same disc as the .INS file itself so that the NewWave Office can find and copy them.

The master object is installed into an OMF subdirectory that stores all of the master files for each object class. The process of installing the master object does not place an object onto the NewWave Office itself, but rather makes it accessible to the "Create a New ..." dialog box. In order to make an HPSHAPE object appear on the NewWave Office, you must choose "Create a New ..." from the File menu, and select the HPSHAPE master object explicitly.

Debugging

Since the underlying environment of NewWave is Windows, the ordinary Windows debugging tools can be used to help debug an application written for NewWave. These include:

- Windows symbolic debugger (SYMDEB.EXE)
- Heapwalker (HEAPWALK.EXE)
- Shaker (SHAKER.EXE)

These utilities are described in the documentation for the Windows Software Development Kit.

In addition, there are some NewWave-specific tools to help you debug your application:

- Diagnostic Utility
- Tracing Facility
- Tracing Version of the OMF

These are described briefly below. Detailed information on these tools is available in the "NewWave Environment: Programmer's Reference Manual".

Diagnostic Utility

The OMF provides you with a diagnostic utility. This on-line diagnostic utility is used to capture communication between objects and the OMF during a NewWave session. It is primarily used for debugging NewWave application programs where there may be problems involving the OMF.

The diagnostic utility provides you with three primary functions:

1. An object can be shown in context with the rest of its family tree, showing its parents and its children. This is accomplished by simply dragging an object's icon into the the diagnostic utility's window.
2. An object's properties and class properties can be displayed in a window. This is done by using the commands in the Prop_Display popup menu of the diagnostic utility.
3. An on-line listing of all the calls made to the OMF can be dumped to a window and/or to a file. This is accessed via the Trace _Control popup menu of the diagnostic utility.

Tracing Facility

The NewWave tracing facility allows you to place "debug writes" into your code which will be logged to a trace file. You can use the tracing facility calls to log only the debug writes made by your object, or to log all debug writes made by all objects in the system in the proper order.

Tracing Version of the OMF

A special version of the OMF which itself uses the NewWave tracing facility is also available to you. This can be used to obtain a single log file which traces all the OMF calls made, along with the debug writes made by your object and the other objects in the system, all in their correct time sequence.

4 Introduction to the API

Overview of the API

What is the API and what does it do for you?

The Application Program Interface (API) enables you as an application developer to readily incorporate advanced features into your software. Where user interfaces allow a user to communicate with applications, a program interface allows an application program to interface with other facilities on the system. Specifically, the API serves as an interface between your application and these three facilities, as shown in Figure 4-1:

- The Agent, which provides task automation;
- Help Facility, used for comprehensive on-line assistance; and
- Computer Based Training (CBT), which enables built-in product training for your software users.

The API provides you with a set of functions and messages for accessing these facilities. The API is readily implemented by structuring your application code appropriately to include "hooks" for accessing the API. To make it easier to incorporate the API, segments of code for using the API, referred to as *components*, have been worked out and are supplied for you. You can plug these components directly into your application and need only make sure that the variable names match.

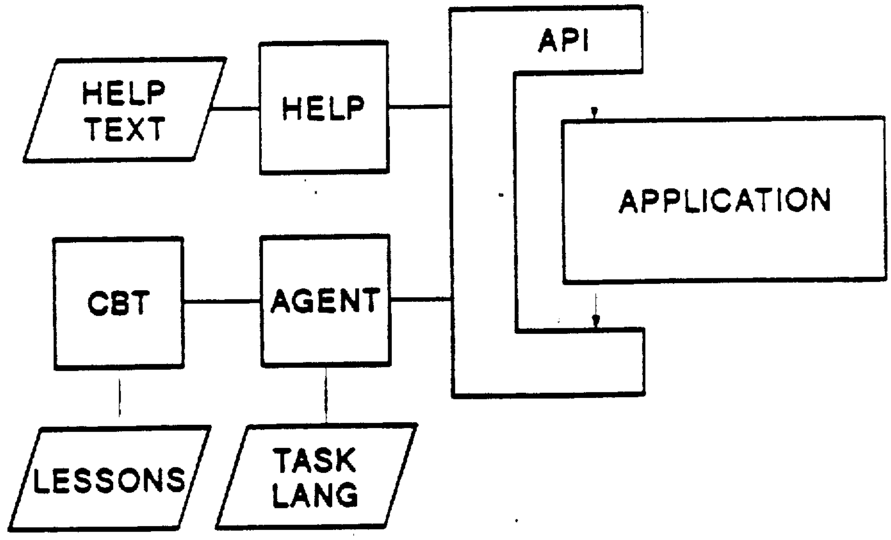

Figure 4-1 - The API: Interface between the Application and the API Facilities

Design Philosophy for API Applications

Designing an application that uses the API facilities is no more difficult than developing any other application with comparable features. By keeping the design philosophy in mind, it should, in fact, be easier because of the tools that are provided. There are four basic things you must do when designing an API application:

- Define a set of commands to describe the functions a user performs in your application. This is called the Task Language.
- Separate the interpretation of user actions from the actual execution of the commands derived from those actions.
- Structure your application so that it has the following categories of support:
  1. playback of tasks;
  2. the recording of tasks;
  3. interrogation, that is, for help, Agent, or CBT requests;
  4. monitoring of user actions and commands for computer based training;
  5. error handling within tasks.
- Incorporate function calls into your code for interfacing with the API.

Chapter Organization

The chapter is divided into the following sections:

- The API Facilities
- The API Modes
- Messages to Your Application
- The Task Language
- The API Architecture
- Message Handling in API Applications
- How Your Application Responds to the Different Modes
- API Function Summary
- API Component Summary

The API Facilities

The concept behind the API is to give your application program the capability to access the API Facilities. Windows can be thought of as a "message delivery system", since it delivers all external messages to your application. Continuing the analogy, the application architecture can be thought of as a "message routing system" and the API itself is a "message monitoring system". The architecture (that is, the structure of your application) ensures that messages get routed to the appropriate part of your code or to external API procedures, as required. The API monitors messages and their resulting commands at different interface points within your application.

The Agent

The *Agent* is the name of the service that provides task automation. In the HP NewWave environment, a user can record any series of commands and save the series for later re-use, i.e., playback. A recorded series of commands is referred to as an *Agent Task*. The Agent acts on the user's behalf to record or perform Agent Tasks. The Agent does more than memorize keystrokes; it structures tasks in terms of the commands in the Task Language that you design for your application. This means that the result of a user's actions is recorded and not the intermediate steps that cause the command.

To record a task, the user selects "Start Record" from the API-provided "Task" menu. As the user goes through the steps in the task, your application must translate the user actions into commands, execute them, and pass them on to the Agent via the API for recording. The user indicates the end of the task by selecting "End Record" from the menu and must then name the task for later recall.

At the same time as the commands are being recorded, an "Agent Task" is created. The user can open the task and perform any desired editing. Tasks can include control statements and interrogation functions that are not possible through direct recording of commands. A user can also, if desired, create a task by typing commands directly into the task.

To have the stored task performed, the user selects "Perform Task" from the menu and specifies the task to be executed. The Agent retrieves each stored command and passes them back to your application via the API for execution, attached to Playback messages.

The Help Facility

With the NewWave Help Facility, you can readily provide your users with extensive on- line assistance. The API-supplied "Help" menu lets the users access a list of help topics or receive context-sensitive help by clicking on a specific item.

Setting up a help text file is straightforward and requires no programming. The help author can make use of automatic indexing and can enable the user to jump from topic to topic. Since adding help text requires no additional coding of the application, the help author can operate independently of the application developer, for the most part. Help text for new commands can be readily added.

By selecting *Help Topics* from the menu, the user can browse through an index of informational topics that you (or a help author) provides for the application. When the user selects the topic, the API passes the information on to the Help Facility.

*Context-sensitive help* refers to a help message that is provided directly for a single item and should correspond to the user's current situation. For context-sensitive help, the user selects "Screen Help" from the menu and the application passes the request on to the API which informs the Help Facility accordingly. The cursor is changed into a question mark (?). With the question mark as a cursor, the user clicks on the item in question and the Help Facility provides the appropriate help text. Context-sensitive help can be provided for all menu commands or for specific parts of the application window.

Computer Based Training (CBT)

NewWave provides the building blocks for you (or a lesson author) to create innovative lessons for your users. You basically set up a lesson (which is the equivalent to an Agent Task) and instruct the API to "monitor" the user's responses in the lessons. For example, you can write a task to open a window, display text to ask the user to create a document, and detect sucessful completion of this activity.

Other tools will be available in the future to enable you to include additional graphics including animation in the lessons.

The API Modes

As mentioned earlier, an application that makes use of the API must have the following categories of support:

1. task playback;
2. the recording of tasks;
3. interrogation, for example, returning context-sensitive help to the help facility;
4. monitoring of user actions for computer based training;
5. error handling within tasks.

These are accomplished by structuring your application to operate according to the current mode in effect. There are five modes of operation for the API:

1. Playback Mode
2. Record Mode
3. Intercept Mode (Help)
4. Monitor Mode (CBT)
5. Error Mode

*Playback* refers to the execution of an Agent Task by your application working in tandem with the API. In Playback Mode, your application is sent commands from the Agent Task and must execute them.

*Record* is the mode in which the user performs actions and your application translates them into commands to be stored in an Agent Task.

*Intercept* is set while the user requests context-sensitive help. For example, suppose the user wants more information concerning an item on the bottom left corner of your window. The user selects "Screen Help", and moves the "question mark" cursor to the item and clicks the mouse.

*Monitor Mode* is used by the Computer Based Training (CBT) facility. In Monitor mode, the commands a user generates are passed to CBT for approval before the command is executed. Thus, the CBT task can prevent the user from performing unwanted commands.

*Error Mode* is used to pass errors inside your application to the Agent instead of the user. It is tied to the "ON ERROR DO..." statement which is a class independent command in the Task Language. In this mode, the task is notified about an error rather than having the error displayed in an Error Message Box.

The modes are set by "MODE_ON_FLAGS" that are passed in the API_SET_MODE_FLAGS_MSG message.

Messages to your Application

In order to understand how your application interacts with the API, consider Figure 4-2. All interaction between your application and the user and the rest of the environment comes to your application in the form of messages from the Windows messaging system. The messages may be the result of activity within Windows itself, the OMF, the user, or the API.

*Windows housekeeping messages* are used for general activities such as painting windows. To be a good Windows citizen you must process these messages according to Windows guidelines.

*OMF messages* are used for object management tasks, such as CREATE_OMF, OPEN, or TERMINATE. Your application can respond to other objects by processing these messages.

*User action messages* are mouse movements, mouse clicks, menu selections, keystrokes, etc. The user does something to cause Windows to send you these messages. Some of these messages are meaningful to your application, but not necessarily all of them.

Processing API Messages

All API messages are generated as a result of your application calling API functions. API messages may be the result of a user request, such as selecting "Record a Task"; an Agent request, such as requesting the playback of an agent task involving the application; or a Help request, such as requesting help information on a certain location within the application window.

Note that the API sends messages to your application via Windows. Your application communicates with the API by calling an API function. The API can send your application three types of messages:

- API_PLAYBACK_MSG,
- API_SET_MODE_FLAGS_MSG,
- API_INTERROGATE_MSG.

The API_PLAYBACK_MSG supplies the command to the application prior to execution by the application.

API_SET_MODE_FLAGS_MSG changes the mode bits in the APIModeFlag in order to change the flow of control within your application.

API_INTERROGATE_MSG enables Help, the Agent or CBT to request certain information from the application, for example context-sensitive help. Some types of requests are common to all object classes, while other types of interrogation are specific to a single object class. The common requests are called *Class Independent Interrogation Functions*. Currently these include context- sensitive help requests where the application returns a help context number to allow the help system to display the appropriate text.

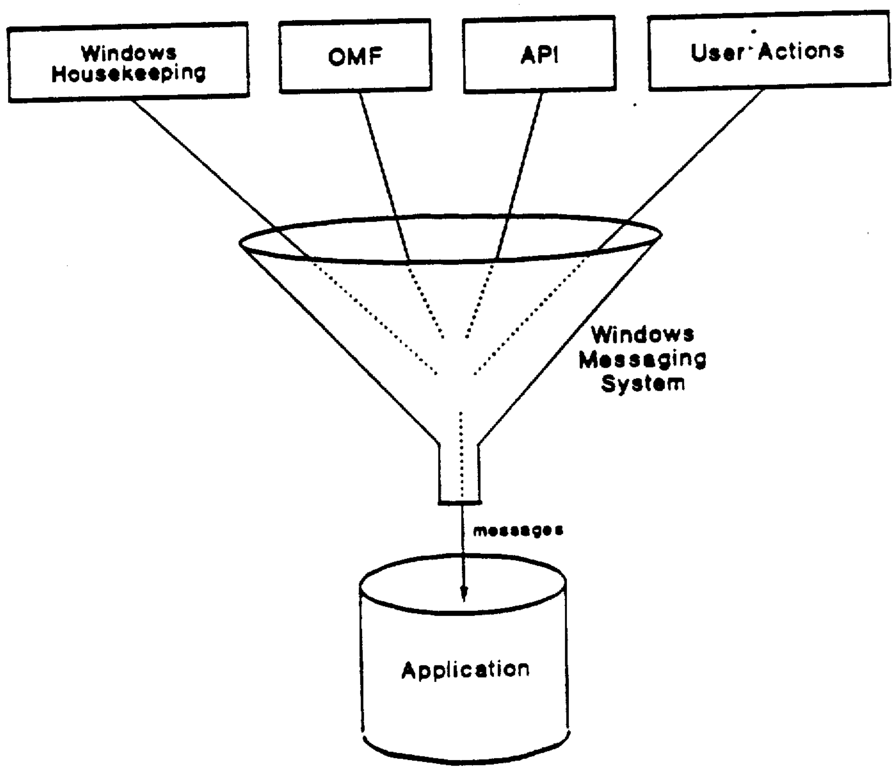
Figure 4-2. Message Types Received by the Application

Designing a Task Language

What Is a Task Language?

In order for your application to interact with the API and the user, it is necessary for you to design a task language. A *task language* is the text form of the commands that describe the application's functionality. The task language for the HPSHAPE program is shown below. Although simpler than the task language for most applications, it does demonstrate the basic concepts.

```
RECTANGLE
ELLIPSE
TRIANGLE
STAR
CLEAR
MINIMIZE
MAXIMIZE
RESTORE
CLOSE
```

An application's task language is comprised of *class dependent commands*, which represent functions that can be performed by your application, such as TRIANGLE. The Agent provides *class independent commands*, which are functions such as flow control, IF, FOR, DO, etc. that are interpreted by the Agent itself.

Note that many class dependent commands are common across applications, for example, the CLOSE command. These are still executed by your application and not the Agent, and so are defined as class dependent.

As discussed earlier, there are two ways of creating tasks:

1. by recording commands generated by the user's actions, and
2. by typing commands directly into an Agent Task.

Tasks are compiled to produce the external form of the command used by the Agent.

Designing Your Commands

The Agent is only concerned with the commands themselves, not in the way the user arrives at the commands. Your application must be able to exclude any non-essential activity by the user in the process of creating a command. It is possible to arrive at the same command through more than one means. For example, a mouse click in a menu, a keyboard accelerator, or the keyboard interface to the menu could all be used to "close" an application, but the Agent only records that the application was "closed" without recording the keystrokes. The Agent simply takes the command as interpreted by your application. To the Agent, a command is simply a token that is given to it to store in Record Mode and that it must return when in Playback Mode.

As the application designer, it is up to you to design your task commands. The task commands are not visible to the user until you implement a compiled version of your task language. Task command design has many long term ramifications, so you need to consider your design carefully. Here are some general guidelines for designing the commands in your Task Language:

1. Eliminate any ambiguity in your commands. You want your users to know the exact meaning of the commands.
2. Be sure that your command set is all-inclusive with regard to the functionality of your application. Everything that your application can do, your task language should be able to replicate.
3. Use the same terms that appear in your pull-down menus. Different terminology would be confusing to the user.

4. Use a simple vocabulary. The creation of Agent tasks should not be limited to "power users". The broader your base of task users, the more successful your application product will be.

Chapter 7 "Agent Task Language" furnishes a complete list of guidelines. If your application has a similar function to those described in the guidelines, use the command format recommended.

How Does Your Application Use Commands?

At the highest conceptual level, commands are what an application can do. This may include commands that may be given from pull-down menus, from pressing buttons in dialog boxes, or from typing or mouse operations in the client area.

Commands may be represented in four ways: as keywords in the Task Language form; as binary external commands that are stored by a task and passed to an application for execution; as binary internal commands that are used within an application during command execution; and as pcodes which are similar to the external form but with a special header used by the Agent. These are shown in Figure 4-3 "Different Forms of a Command". The transformation of commands from one form to another is shown in Figure 4-4.

The *Task Language command form* is the form of the command that is displayed in the Task window.

The *external form* is the version that is passed to the API. It consists of binary data understood by the application only. Although the external form is passed to the API, it is essentially private to your application and is not interpreted by the API or any other application. (However, your CBT tasks do need to interpret the external form.) When an Agent Task is compiled, an external form command is created from each class dependent command.

---

Note The external form contains the command number and the parameters for the command and must have no run-time dependent data such as memory pointers.

---

The *internal form*, on the other hand, is used totally within your application. You can represent these commands internally in whatever form is convenient for you, as long as you have the necessary processors to translate back and forth between the internal and external forms.

Note also that it is recommended that you give your internal commands values that correspond to the ranges in Appendix A of the "HP NewWave Environment: Programmer Reference Manual". This will enable you to take advantage of those API macros that are based on the range coding.

The *pcode command form* refers to the binary version of the external command form that is stored in the Agent task, along with some instructions to allow the Agent to replay the command.

Task Language Form
"RECTANGLE"

Pcode Form

| | | | | | |
|---|---|---|---|---|---|
| 12 | 8 | 1 | 6 | 8001 | 50 |

External Form

| | | |
|---|---|---|
| 6 | 8001 | 50 |

Internal Form

| | |
|---|---|
| 8001 | 50 |

Figure 4-3 - Different Forms of a Command

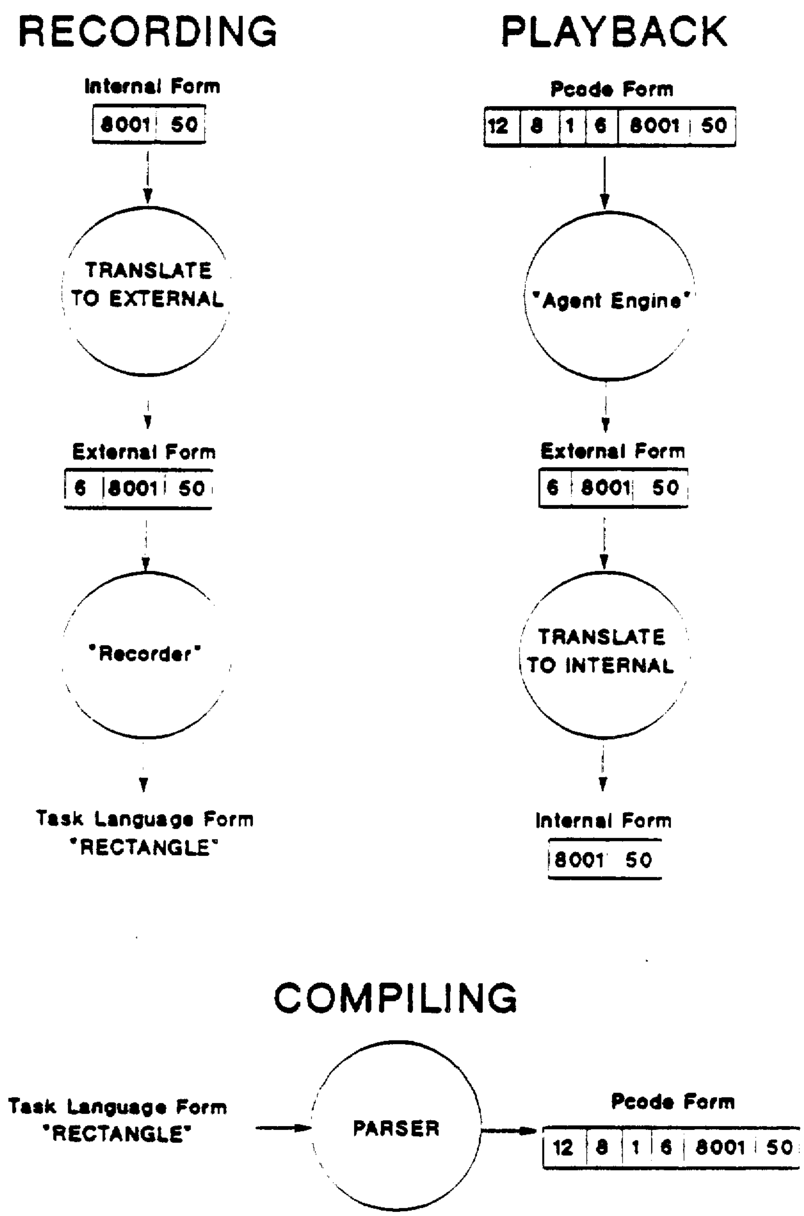
Figure 4-4 Transformations of Commands

The Application Architecture

Separating User Actions and Commands

In conventional applications, you generally test to determine which action a user performed on the screen. Then you actually execute the action in the same part of your code. When you design an API application, an intermediate step is required. You must match the user's action to a defined command from the Task Language and then execute it. The cleanest way to do this in your code is to have one procedure dedicated to interpretation of user actions into commands and a second procedure devoted to actually executing the commands. The procedure that interprets the actions is referred to as the *Action Processor*; the procedure that executes the commands is called the *Command Processor*.

Figure 4-5 shows how the Action Processor and Command Processor within your application interact with Windows and the API facilities. The important concept here is that the Action Processor and Command Processor are major elements separating the interpretation of actions and the execution of commands, with calls to the API between the processors. User actions, API messages, OMF messages, Windows housekeeping, and help requests all come into your application in the form of messages. They may be intercepted initially by the API (in the case of help requests or menu selections) or may pass through to the main body of your application. After the Action Processor, commands may be intercepted by the API or they may go directly to the Command Processor.

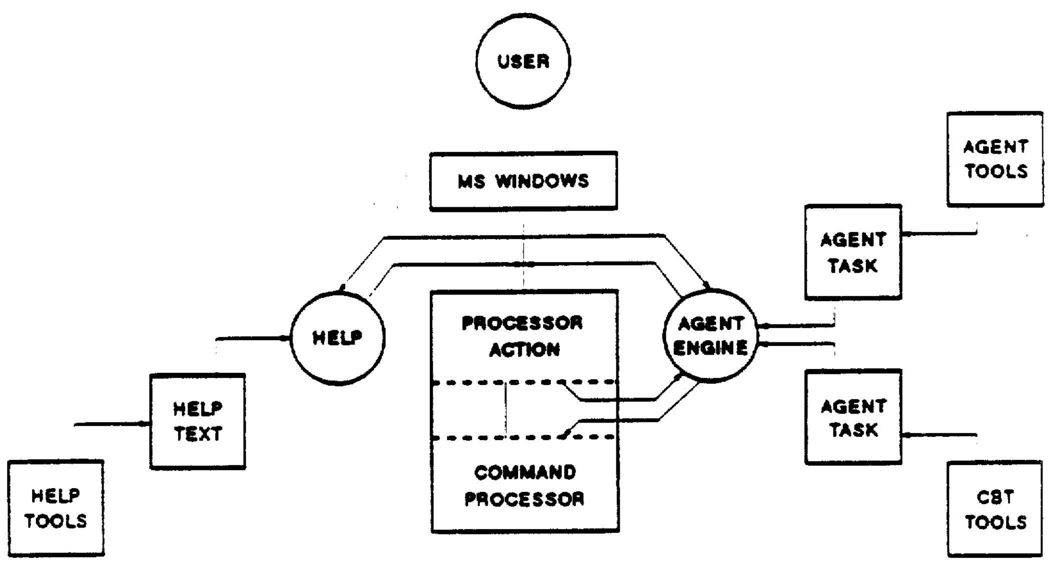

Figure 4-5 - How the Action Processor and Command Processor Interact with Windows and the API

Structuring Your Code

An overview of the components and processors used in your application is shown in the block diagram in Figure 4-6. As mentioned earlier, in order to make use of the API, it is necessary for you to structure your code to accommodate calls to the API. In the block diagram, the rectangular shape is used to show components and the square shapes indicate processors. (Note that there are special meanings for the terms "component" and "processor" here, as explained below.)

The most important reason to write an application according to the Architecture is that it guarantees that the application will pass information to the API at the correct points. It will always generate commands before they are needed by the Command Processor. It will always set the correct mode before the application depends on that mode being set. However, it is up to you, the developer, to choose how much of this architecture you adhere to. Just note that whether or not you need to deviate from the architecture, your application must always do API related processing in the order required by the architecture.

A flow chart showing the recommended architecture is shown in Figure 4-7. This is the basic *application architecture*. The flow chart actually represents the logic that is required in the main window procedure. In subsequent sections, you can see how the logic applies to the major API modes. These sections take a closer look at the conversations that take place between your application and the API. Notice that the order of communication is very important. Certain events must happen only after other events. The predefined application architecture ensures that the events take place in the right order.

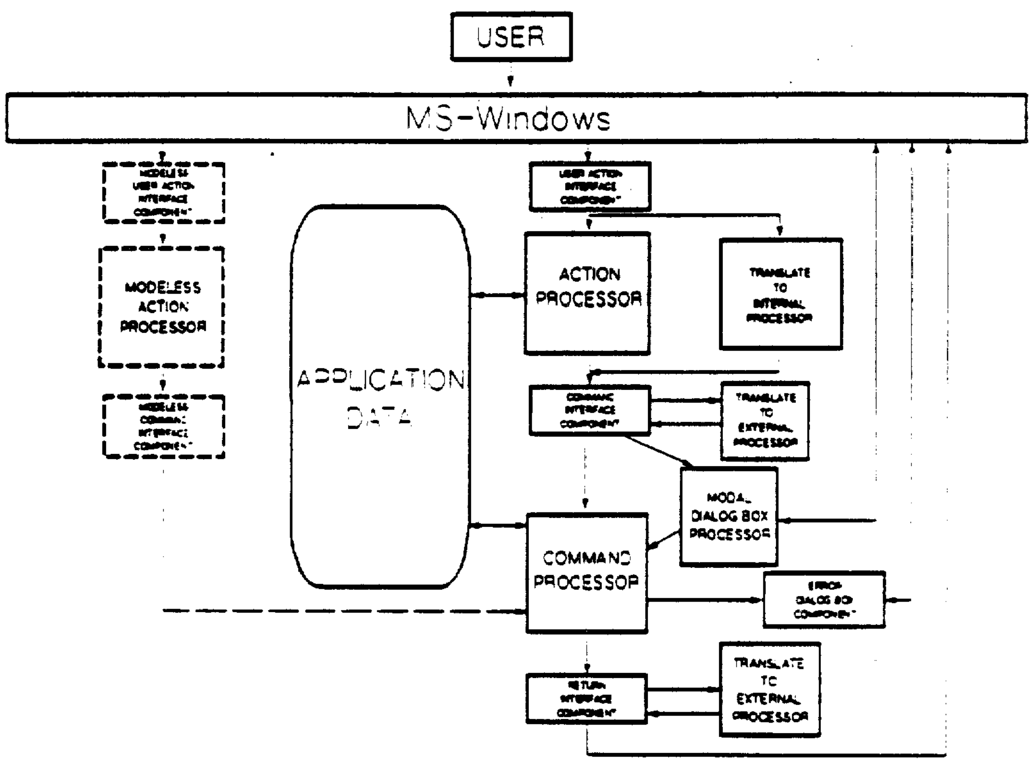

Figure 4-6. Application Architecture Block Diagram

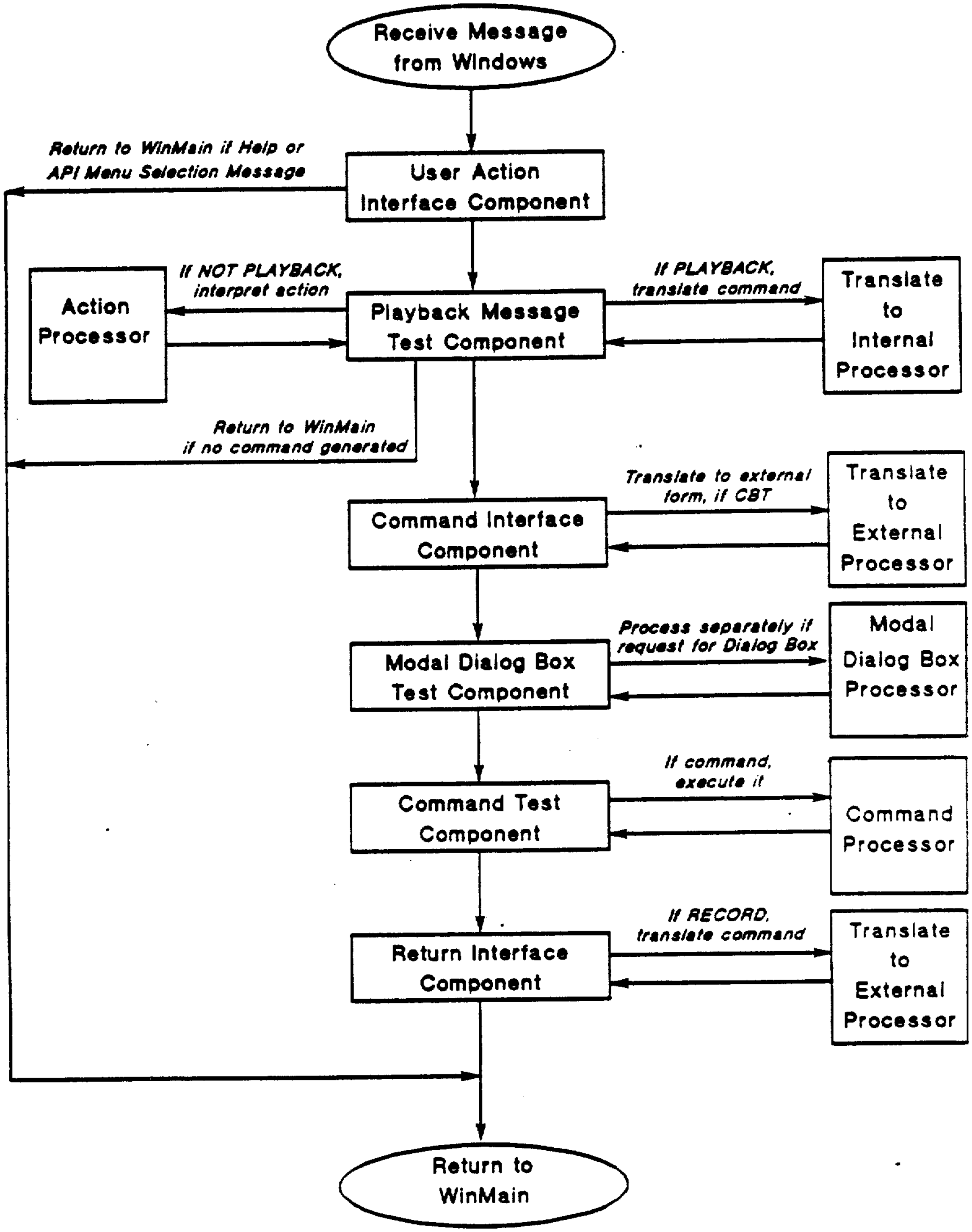
Figure 4-7 - Application Architecture Flow Chart

Functions and Macros

The smallest building blocks of the Application Architecture are the API functions and macros. These are used in playing back commands, providing help to the user, and recording commands after they have been executed. The functions are direct calls to the API. The macros are tests for modes or other conditions.

Components

The functions and macros comprise components. The term *component* refers to a segment of program code supplied by HP. All you need to do with a component is copy it verbatim into your program in the appropriate location and make sure that the variable names match up with the ones you are using. The logic including all the appropriate calls has been worked out for you. A list of the components currently available and the global variables they use is provided at the end of this chapter.

For example, there is a component called API Initialization Processing that is required before other API calls are made. Its implementation in the HPSHAPE code is as follows:

```
if ( !APIInit( (LPAPIHND)&ghAPI, ghWnd, ghInst, ghOMF,
               (LPSTR)szAppHelpFile,
               (LPSTR)szObjTitle, API_NO_MODE ) ) (
    if ( APIError (ghAPI, API_NO_MODE) >= API_START_API_FATAL_ERR )
        return(CO_ERROR);
    )

if ( !APIInitMenu(ghAPI, GetMenu(hWnd), API_TASK_MENU | API_HELP_MENU,
                  API_NO_MODE) ) (
    if ( NoteAPIError (ghAPI) >= API_START_API_FATAL_ERR ) (
        APITerm(ghAPI, hWnd, ghInst, ghOMF, API_NO_MODE);
        return(CO_ERROR);
        )
    )
```

In short, this initializes the API, gets an API handle, and checks for errors. It then requests display of the Task and Help menus on the application menu bar, as well as checking for other errors. This component is explained in more detail at the end of the chapter. As long as your application uses the same variables as in this example, you can simply plug this component into your application in the appropriate place.

Processors

A *processor* has the same defined purpose within all API applications. However, the specific functions that a processor performs are unique to the application so that you, the developer, are responsible for writing the processor code. There are four processors required for all API applications:

- Action Processor
- Command Processor
- Translate to Internal Processor
- Translate to External Processor There are other processors that may be required if you make use of dialog boxes in your application:

- Modal Dialog Box Processor
- Modeless Dialog Box Action Processor

Modal dialog boxes are displayed when a menu item selects a command that requires additional parameters from the user. The user must supply the information or cancel the command before proceeding. Modeless dialog boxes are also displayed by a menu item but allow the user to continue with other commands before selecting a button within the modeless dialog box.

The modal dialog box requires an immediate answer and thus can be thought of as occupying a specific location in your main logic. The modeless dialog box has a fair degree of independence from the main logic of your application and has its own window procedure and Action Processor. The logic of the modeless dialog box must be in the same recommended structure as all NewWave applications, although it does use the same Command Processor as the rest of your application rather than having its own Command Processor.

The block diagram in Figure 4-6 shows how a modeless dialog box fits into the application architecture. Note that there can be multiple modeless dialog boxes within an application; they fit in the same way as the one shown in the figure.

The Action Processor

The *Action Processor* is the part of your program that interprets the user's actions and translates them into internal commands. It takes the following messages as input:

- User Action Messages
- API Messages
- OMF Messages
- Windows Housekeeping Messages Its main purpose is to handle the Windows user action messages, derive the internal command that results from the user's actions, and return that command to the window procedure where it will eventually be executed. The Action Processor must also be able to answer API Interrogation Messages, set modes according to API Set Mode Messages, and take care of OMF and Windows housekeeping requests.

In interpreting user actions, the Action Processor observes the clicks and movements of the mouse and waits until a meaningful command has been generated. The Action Processor is responsible for handling the different ways in which a user can build the same command and for generating an appropriate command that can be understood by the Command Processor. In HPSHAPE, for example, when the user chooses a menu item, such as "Triangle" from the Edit Menu, a command is generated. The Action Processor then builds the command, "New_Shape Triangle".

The Action Processor is a giant switch statement based on messages of all types (including messages from Windows, OMF, and API that are not related to user actions). Some messages will result in a command being generated; others will be dealt with entirely in the Action Processor (such as WM_PAINT). A typical Action Processor could have the form shown below.

```
switch (message) {

    case WM_PAINT:
        { }
    case WM_COMMAND:
        { }
    case WM_CLOSE:
        { }
    case WM_SYSCOMMAND:
        { }
```

```
case WM_OMF:
    { }
case API_INTERROGATE_MESSAGE:
    { }
case API_SET_MODE_FLAGS_MSG:
    { }
default:
    { }
}
```

The Command Processor

The purpose of the *Command Processor* is to execute internal commands that are passed to it. The only input to the Command Processor is a command in the internal format, and the only return value is an error if the command cannot be executed. The Command Processor is not concerned with the source of the commands; its only purpose is to execute them. It handles all possible functions that a user might wish to perform. The Command Processor is a giant switch statement based on the task language command set. The format of the Command Processor in HPSHAPE is shown below:

```
switch (applCmd->cmd) {
    case MINIMIZE_WINDOW:
        { }
    case MAXIMIZE_WINDOW:
        { }
    case RESTORE_WINDOW:
        { }
    case CLOSE_WINDOW:
        { }
    case NEW_SHAPE:
        { }
    default:
        { }
}
```

The Translate to Internal Processor

The *Translate to Internal Processor* translates the external format of the command (used by the API) to the internal format (used by your application). Note that in some cases, the internal format may be the same as the external format.

The Translate to External Processor

The *Translate to External Processor* is responsible for translating a command from internal format to external format. It takes an internal command as input and returns an external command. The command that the Action Processor builds may have internal information such as pointers, array indices, etc. For the API to record the command, it must be in external format. All parameters for the external format of the command must be value rather than reference parameters.

Modal Dialog Box Processor

The *Modal Dialog Box Processor* is called whenever a command requiring an immediate user response into a modal dialog box has been generated. Note that there are two commands involved with a call to the Modal Dialog Box Processor:

1. a dialog command causing the modal dialog box to be displayed 2. a command generated by the user's response to the modal dialog box.

The Modal Dialog Box Processor is used to display the appropriate modal dialog box and derive a command to be returned based on the user's response. The user fills in the modal dialog box and presses a button. This forms a new command with user's entry as a data parameter. The Command Processor then executes the command. The input to the Modal Dialog Box Processor is the command requesting the modal dialog box, and the return value is the new command derived from the user's response.

Note that in some cases you may want to use the modal dialog box to determine a parameter when recording. In playback, the modal dialog box does not need to be accessed since the parameter is already known. In other cases, you may want to enter an Agent Task command to put up a modal dialog box to prompt for user input during playback.

Modeless Dialog Box Processing

The window procedure for modeless dialog boxes is structured much the same as the main window procedure, with its own Action Processor. It calls the same Command Processor as the main window procedure. Commands are generated by the modeless dialog box when a button is selected, or some other operation changes the state of the application.

Message Handling in API Applications

The Window Procedure Components

All API applications follow the same basic logic in processing messages. The logic is shown in the flow chart in Figure 4-6. The window procedure in the HPLAYOUT sample application consists of the following API components:

- User Action Interface Component
- Playback Message Test Component
- Command Interface Component
- Modal Dialog Box Test Component
- Command Test Component
- Return Interface Component A typical window procedure is shown on the pages that follow. Note that in your application, there will be some variations. You may use different variable names. You might pull pieces of the code out into separate procedures. The important point is that you maintain the same basic structure with the hooks into the API.

The following window procedure example comes from the sample application HPLAYOUT.

```
/****************************************************************************/
/*                          LayoutWndProc                                   */
/*                                                                          */
/* Main procedure to handle all messages.                                   */
/****************************************************************************/

long FAR PASCAL LayoutWndProc(hWnd, message, wParam, lParam)
HWND        hWnd;
unsigned    message;
WORD        wParam;
LONG        lParam;
{
APICMDSTRUCT      extCmd;
INTCMDSTRUCT      intCmd;
APIRTNTYPE        applRtn;
```

```
if ( NW_MessageFilter(hWnd, message, wParam, lParam, (LONG FAR *)
                &applRtn) )
     return(applRtn);

/************** USER ACTION INTERFACE COMPONENT **************/

if ( APIInterceptOn(gAPIModeFlags) || APIHaveMenu (message, wParam)) {
     APIUserActionInterface( ghAPI, hWnd, (LPAPIUNSIGNED)&message,
                             wParam, lParam, API_NO_MODE);
     }

applRtn = (APIRTNTYPE)0;

if ( APIHaveMessage ( message )) {

    intCmd.wCmd = API_NO_CMD;

/*********** END OF USER ACTION INTERFACE COMPONENT **********/

/************** PLAYBACK MESSAGE TEST COMPONENT **************/

    if (APIPlaybackMsg(message))
        TranslateToInternalProcessor(message, wParam, lParam, &intCmd);
    else
        ActionProcessor(hWnd, message, wParam, lParam, &intCmd,
                    &applRtn);

    if (APIHaveCommand(intCmd.wCmd)) {
        gapplErr = API_NO_ERR;

/*********** END OF PLAYBACK MESSAGE TEST COMPONENT **********/

/****************  COMMAND INTERFACE COMPONENT ***************/

        if (APIMonitorOn(gAPIModeFlags)) {
            TranslateToExternalProcessor(&intCmd, &extCmd);
            APICommandInterface( ghAPI, (LPAPICMDSTRUCT)&extCmd,
                                 API_NO_MODE );
            if (extCmd.wCmd == API_NO_CMD)
                intCmd.wCmd = API_NO_CMD;
            }

/************* END OF COMMAND INTERFACE COMPONENT ************/


/**************** MODAL DIALOG TEST COMPONENT ***************/

        if (APIHaveDialogCommand(intCmd.wCmd))
            ModalDialogBoxProcessor(hWnd, &intCmd);

/************* END OF MODAL DIALOG TEST COMPONENT ************/

/****************** COMMAND TEST COMPONENT ******************/

        if (APIHaveCommand(intCmd.wCmd))
           CommandProcessor (hWnd, message, wParam, lParam, &intCmd,
                          &applRtn);

/*************** END OF COMMAND TEST COMPONENT **************/

/***************** RETURN INTERFACE COMPONENT ****************/

       if (APIPlaybackOn(gAPIModeFlags) || APIRecordOn(gAPIModeFlags)) {
            if (APIRecordOn(gAPIModeFlags)) {
                TranslateToExternalProcessor(&intCmd, &extCmd);
                APIRecordInterface( ghAPI, (LPAPICMDSTRUCT)&extCmd,
                                    API_NO_MODE );
                }
            APIReturnInterface( ghAPI, gapplErr, API_NO_MODE );
            }

        } /* End if (APIHaveCommand) */

    } /* End if (APIHaveMessage) */

return(applRtn);

/************** END OF RETURN INTERFACE COMPONENT *************/

} /* End LayoutWndProc */
```

In the following paragraphs, the window procedure is broken down into its components and the API functions that comprise the components are described. As mentioned earlier, the application architecture can be thought of as a message routing system. The descriptions indicate the messages and commands flowing in and out of each component.

A summary of all API functions and macros is provided at the end of this chapter. (Refer to Chapter 2 of the "Programmer Reference Manual" for detailed descriptions of the API functions and macros, Chapter 5 for descriptions of the messages, and Appendix A for supplemental API information.)

User Action Interface Component

The purpose of the *User Action Interface Component* is to test whether the user is accessing one of the API facilities. If the user is requesting Help for an item in a pull-down menu, then the rest of the window procedure is bypassed and the application is set into Intercept Mode. For example, if the user has selected one of the API menu items or is using context-sensitive help, the API deals with the message and no further action from the application is required.

---

Note The API reserves certain values to provide help for the system menu and non-client areas, and for the API menus. Thus, the application must not use menu item IDs less than 100 or greater than 0xDFFF.

---

All incoming messages pass through the User Action Interface Component on to the Playback Message Component except for the menu selection and context-sensitive help messages, which are handled by the User Action Interface. The code for the User Action Interface Component follows:

```
/*************** USER ACTION INTERFACE COMPONENT ***************/

if (APIInterceptOn (gAPIMode?.a;s:  | APIHaveMenu (message, wParam))
    APIUserActionInterface (gnAF:, hwnd, (LPAPIUNSIGNED) &message,
                            wParam, lParam, API_NO_MODE);
applRtn = (APIERRTYPE)0L;
if (APIHaveMessage (message) ) {
    applCmd.cmd = API_NO_CMD;
    gapplErr    = API_NO_ERR;

/************ END OF USER ACTION INTERFACE COMPONENT ***********/
```

where *APIInterceptOn* tests to see if the API is set to intercept all messages to the application;

*APIHaveMenu* tests to see if the user just made a selection from any of the API menus (Help or Task);

*APIUserActionInterface* passes the message on to the API, if either test is passed. The API may process the message if it is a context-sensitive help or API menu selection message;

*APIHaveMessage* tests to see if the API processed the message. If this is the case (that is, the message is set to zero), then there is no need for your application to see the message and the program will return from the window procedure.

Playback Message Test Component

The *Playback Message Test Component* comes next in the window procedure and is used to test if the message to be processed is a playback message. If it is a playback message, then it is passed to the Translate to Internal Processor where the attached handle is used to retrieve the command, and the command is translated to internal format so that it can be executed. If it is not a playback message, it is passed to the Action Processor. After one of the two processors has been called, there is a test made to see if a command (internal format) has been generated. If there was a Windows housekeeping or OMF message, then it may have been fully processed within the Action Processor and the command variable will be null indicating that no further processing is required. The code for the Playback Message Test Component follows:

```
/************** PLAYBACK MESSAGE TEST COMPONENT **************/

    if (APIPlaybackMsg(message))
        TranslateToInternalProcessor(message, wParam, lParam, &intCmd);
    else
        ActionProcessor( hWnd, message, wParam, lParam, &intCmd,
                         &applRtn);

    if (APIHaveCommand(intCmd.wCmd)) {
        gapplErr = API_NO_ERR;

/*********** END OF PLAYBACK MESSAGE TEST COMPONENT **********/
```

where *APIPlaybackMsg* is the test to see if it is a playback message;

*TranslateToInternalProcessor* is the call to the application's Translate to Internal Processor;

*ActionProcessor* is the call to the application's Action Processor; and

*APIHaveCommand* tests to see if a command is ready for processing by the application's Command Processor.

Command Interface Component

The purpose of the *Command Interface Component* is to pass the external form of the command to the Agent. It receives an internal command as input. If the application is in Monitor Mode, the internal form is passed to Translate to External, and then the returned external command is passed to the Agent via the APICommandInterface function. The Command Interface Component uses the following code:

```
/****************  COMMAND INTERFACE COMPONENT ***************/

        if (APIMonitorOn(gAPIModeFlags)) {
            TranslateToExternalProcessor(&intCmd, &extCmd);
            APICommandInterface( ghAPI, (LPAPICMDSTRUCT)&extCmd,
                                 API_NO_MODE );
            if (extCmd.wCmd == API_NO_CMD)
                intCmd.wCmd = API_NO_CMD;
            }
/************* END OF COMMAND INTERFACE COMPONENT ************/
```

where *APIMonitorOn* is used to test if the application is in Monitor Mode. If Monitor is on, then the command needs to be translated to external form and passed on to the Agent;

*TranslateToExternalProcessor* is the call to the application's Translate to External Processor; and

*APICommandInterface* is the function that passes the external form of the command on to the Agent.

Monitor mode allows CBT to examine the command before it has been executed, and to cancel the command if it is not desirable.

Modal Dialog Box Test Component

If the user has performed an action that requires a modal dialog box, then it may be necessary to provide additional processing of the message, since the modal dialog box may be used to form a new command based on the user's response. (IMPORTANT: Note that not all applications require modal dialog boxes. If your application does not use modal dialog boxes, then you can omit the Modal Dialog Box Test Component. HPSHAPE, for example, does not use modal dialog boxes.) The purpose of the *Modal Dialog Box Test Component* is to test whether a dialog command has been formed and then to call the Modal Dialog Box Processor.

The Modal Dialog Box Test Component receives an internal command as input which it passes to the Modal Dialog Box Processor if the command requires a dialog. If so, the same or a different command may be returned as described above. The code for the Modal Dialog Box Test Component follows:

```
/*************** MODAL DIALOG BOX TEST COMPONENT ***************/

     if (APIHaveDialogCommand (intCmd. wCmd))
         ModalDialogBoxProcessor(hWnd, &intCmd);

/************** END OF MODAL DIALOG TEST COMPONENT *************/
```

where *APIHaveDialogCommand* is used to check if a dialog command has been formed and

*ModalDialogBoxProcessor* is the call to the Modal Dialog Box Processor procedure that you write to handle dialog commands.

Command Test Component

The purpose of the *Command Test Component* is to test if a command has been generated and, if so, to pass the command on to the Command Processor for execution. It receives an internal command as input. If the command is not API_NO_CMD, the Command Processor executes the command and only returns a value if there is a problem. The Command Test Component uses the following code:

```
/******************* COMMAND TEST COMPONENT ******************/

     if (APIHaveCommand(intCmd.wCmd))
         CommandProcessor( hWnd, message, wParam, lParam, &intCmd,
                           &applRtn);

/*************** END OF COMMAND TEST COMPONENT ***************/
```

where *APIHaveCommand* tests to see if there is a command. Note that APIHaveCommand was also used at the end of the Playback Message Test Component. (It is possible that after a command has been formed in the Playback Message Test Component, further processing caused the command to be cancelled, for example, if the user pressed the "cancel" button in a modal dialog box.)

*CommandProcessor* is the call to the Command Processor procedure that you write to execute commands.

Return Interface Component

The Return Interface is only called if the application is in Playback Mode or Record Mode. The purpose of the *Return Interface Component* is to tell the Agent that the command is complete and has been executed and that the application is ready for the next command. The Return Interface Component receives an internal command as input and an error value if there was a problem. If the application is in Record mode, then the command must be translated to its external format and recorded as part of the Agent Task. If there was a problem, then the error must be passed on to the API via the APIReturnInterface function. The code for the Return Interface Component is as follows:

```
/***************** RETURN INTERFACE COMPONENT *****************/

       if (APIPlaybackOn(gAPIModeFlags) || APIRecordOn(gAPIModeFlags)) {
```

```
            if (APIRecordOn(gAPIModeFlags)) {
                TranslateToExternalProcessor(&intCmd, &extCmd);
                APIRecordInterface( ghAPI, (LPAPICMDSTRUCT) &extCmd,
                                    API_NO_MODE );
            }
            APIReturnInterface( ghAPI, gapplErr, API_NO_MODE );
            }

        } /* End if (APIHaveCommand) */

    } /* End if (APIHaveMessage) */

return(applRtn);
/************** END OF RETURN INTERFACE COMPONENT *************/
```

where *APIPlaybackOn* is used to check if Playback Mode is on;

*APIRecordOn* is used twice in the logic to test if Record Mode is on. The first time it is used in combination with APIPlaybackOn to see if the ReturnInterface call is necessary. The second time it is used to see if the command needs to be translated and recorded.

*TranslateToExternalProcessor* is the call to the application's Translate to External Processor (which you write). The command needs to be in external format in order to be recorded;

*APIRecordInterface* is used to record a command after it has been performed.

*APIReturnInterface* informs the Agent that the command is complete and that the application is ready to receive or build the next command. It also informs the Agent about any errors. If an error has occurred in Playback Mode, the Agent stops the execution and displays an error message.

How Your Application Responds to Different Modes

The API sends your application an API_SET_MODE_FLAG_MSG whenever it wants your application to change the global variable, APIModeFlags. APIModeFlags indicates which mode your application is in: "Record Mode", "Playback Mode", "Monitor Mode" or "Intercept Mode". Because NewWave applications are continuously communicating with the API, your application must perform API-related processing in a very specific order. The following paragraphs describe how your application interacts with the API during the four major modes.

What Happens During Monitor Mode?

In Monitor (CBT) Mode, the end user is performing actions according to a lesson and CBT is observing the actions. Monitor Mode is turned on when your application receives the API_SET_MODE_FLAG_MSG with the variable, lParam, set to turn Monitor Mode on. The flow of control during Monitor Mode is shown in Figure 4-8.

In the Playback Message Test Component, the flow takes the path to the Action Processor since the user's actions need to be interpreted. It is possible that the Action Processor can handle the command so that there is no need to send the command down to the Command Processor. Such a case would be a Windows or OMF message. If this happened, the flow would take the optional path from the Playback Message Test Component to return to WinMain.

Once a command has been formed in the Action Processor, it is translated to external form and passed via the API to the CBT task, which may cancel the command. If the command is approved by CBT, normal processing continues.

Since some user actions in Monitor Mode involve responses to questions in modal dialog boxes, it may be necessary to access the Modal Dialog Box Processor. While in the modal dialog box, your application may allow the user to escape in which case the command returned would be "CANCEL".

There is additional monitoring within the dialog procedure to allow CBT to control which command the dialog box produces.

In normal situations, however, a command will have been built up, necessitating the Command Processor to be accessed for execution of the command. Since Monitor Mode does not require either recording or the return interface, flow goes straight through the Return Interface Component.

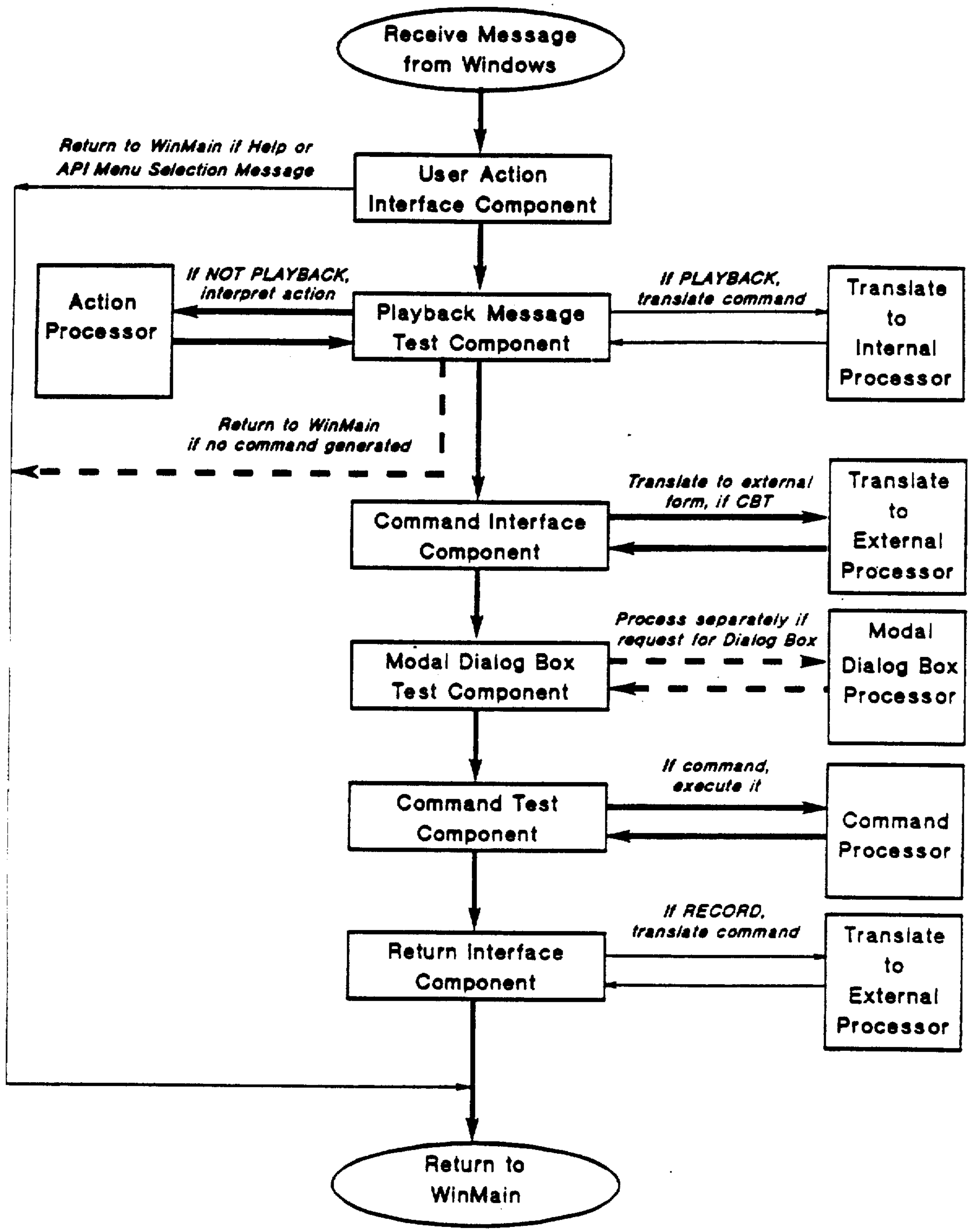

Figure 4-8 - Flow of Control during Monitor Mode

What Happens During Playback Mode?

In Playback Mode, the API sends commands to your application via API_PLAYBACK_MSG with a handle to a location in global memory where the command is stored. To process this message, your application must retrieve the command from global memory, then process the command. For example, when the Agent runs an Agent task, it tells the API to send your application each command from the task in this way. The API places a command in global memory, then posts an API_PLAYBACK_MSG to your application. When your application calls the Return Interface Component, the API will post the next playback command, and so on until the task is completed.

The flow of control during Playback is shown in Figure 4-9. Control falls through the User Action Interface since Help is not involved. The Playback Message Test is passed, and the external form of the command is then translated by the Translate to Internal Processor.

The Command Interface is bypassed, since only Monitor Mode uses it. There is a possibility that the command may involve a modal dialog box, so that there is an optional path to the Modal Dialog Box Processor. As in Monitor Mode, your application may permit the user to escape from the modal dialog box in which case the command returned would be "CANCEL".

If the command has not been cancelled in the modal dialog box, then the Command Processor is accessed to execute the command. You then inform the API that the command has been executed via APIReturnInterface and control then returns to WinMain.

Note the order of the processing. After receiving the message from the API, your application had to process that message. Meanwhile, the API waited for the response. The API could only tell the Agent to continue executing the task after your application had called APIReturnInterface.

Note that while in playback mode, some messages will not be playback messages, for example, paint messages. These messages are handled in the usual way by the Action Processor.

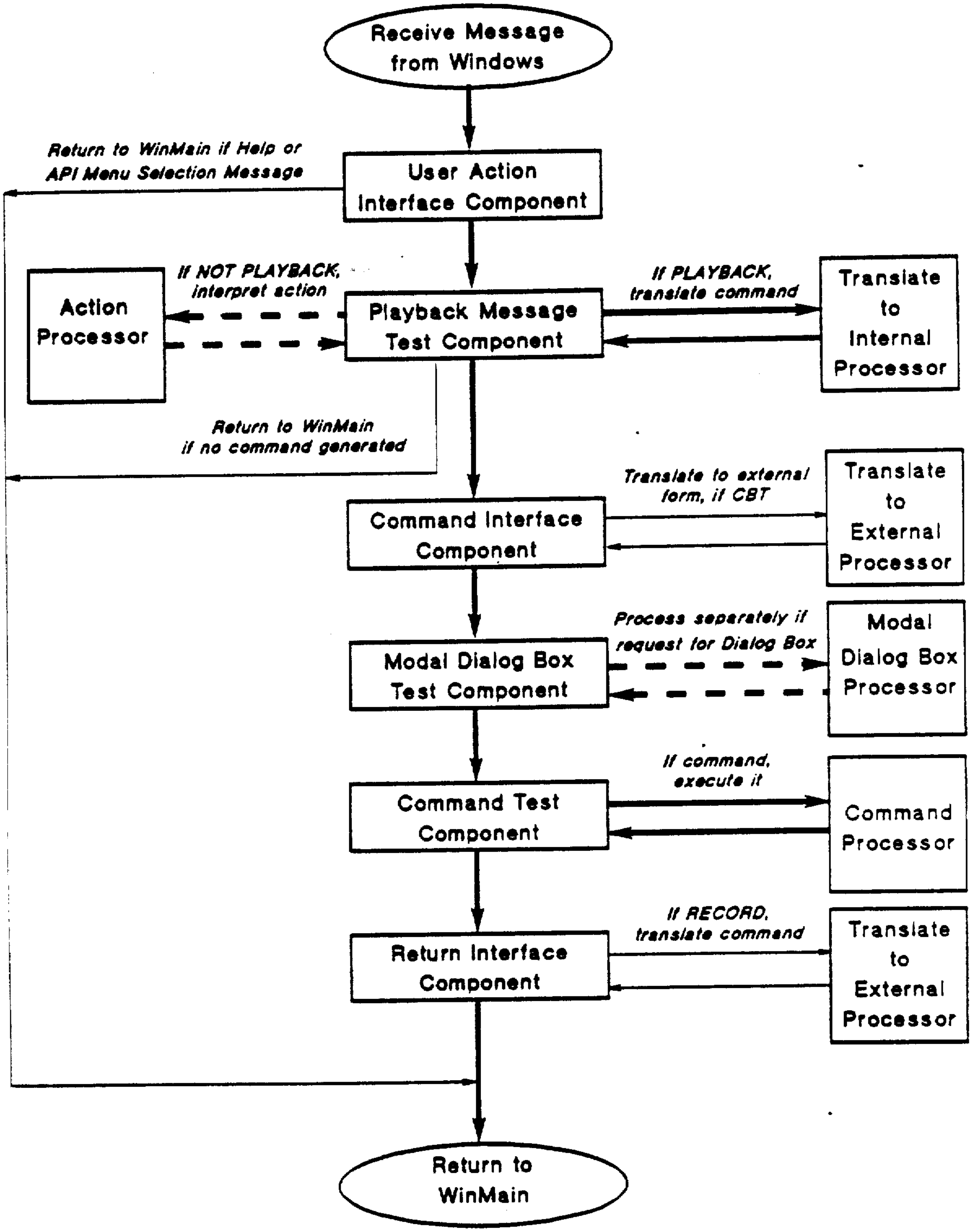
Figure 4-9. Flow of Control During Playback Mode

What Happens During Record Mode?

Record Mode is switched on when the user selects "Start Recording" from the API Task Menu. Like the other modes, Record Mode informs your application by sending it the API_SET_MODE_FLAG_MSG with the variable, lParam, set appropriately. The flow of control during Record Mode is shown in Figure 4-10.

Once in Record Mode, the flow bypasses the User Action Interface. Since the message represents a current user action rather than a command to be played back, the Action Processor is accessed from the Playback Message Test Component. In the Action Processor, your application interprets the user action and derives a command. If the action involves a modal dialog box, the Modal Dialog Box Processor will be called. Unless the command is cancelled by the user in the modal dialog box, the Command Processor will be accessed from the Command Test Component in order to execute the command. From the Return Interface Component, the Translate to External Processor must be called to put the command in external form for recording. After that the Record Interface is called to actually record the command. Finally, your application needs to call the Return Interface to inform the API that your application is ready for the next command.

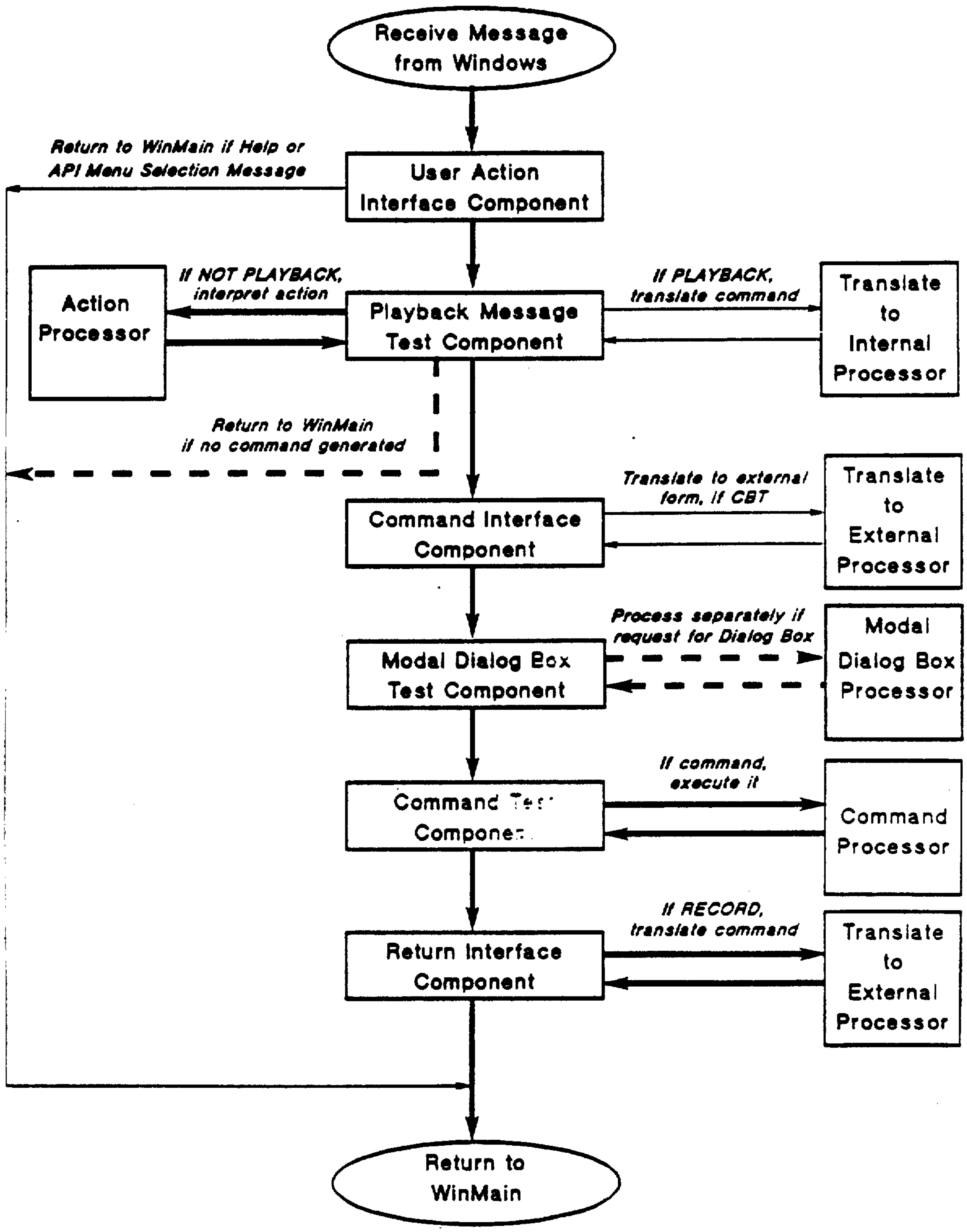
Figure 4-10 - Flow of Control during Record Mode

What Happens During Intercept Mode?

Intercept mode is turned on when the user requests screen help.

There are two types of Help requests that a user can make:

1. For information on a menu item, and
2. For information within the application's window.

When Help is requested from a menu item, the message is taken care of in the User Action Interface Component, which routes the message directly to the Help Facility, as shown in Figure 4-11.

Requesting Help from within the application window is a little bit more complicated. The Help Facility responds by supplying the help text. The help text selection corresponds to the screen coordinates at the location in the application where the user requested help. To translate the mouse position into a help message number, the API sends your application an API_INTERROGATE_MSG which must be handled by your Action Processor. Your application must respond by returning the index number of the corresponding help text. The HPSHAPE program has a function called InterrogateFromAPI that does this processing. Since it is a simple program, it always returns the index number for its general screen help text. More complex applications may choose to use the mouse position and the current state (for example, using a selected item) to produce a more specific help message. The flow chart is shown in Figure 4-12.

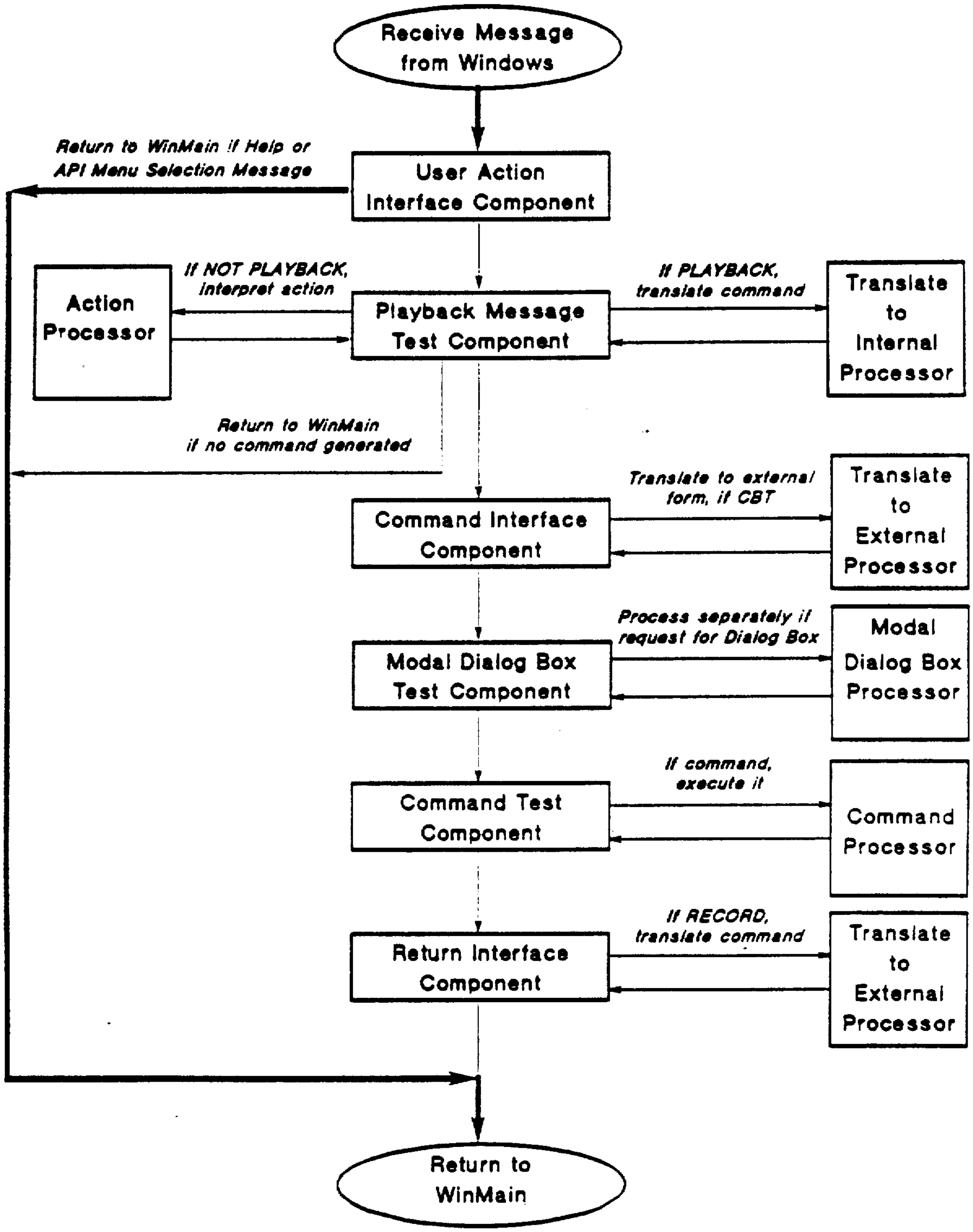
Figure 4-11. Flow of Control During Intercept Mode - Menu Selection

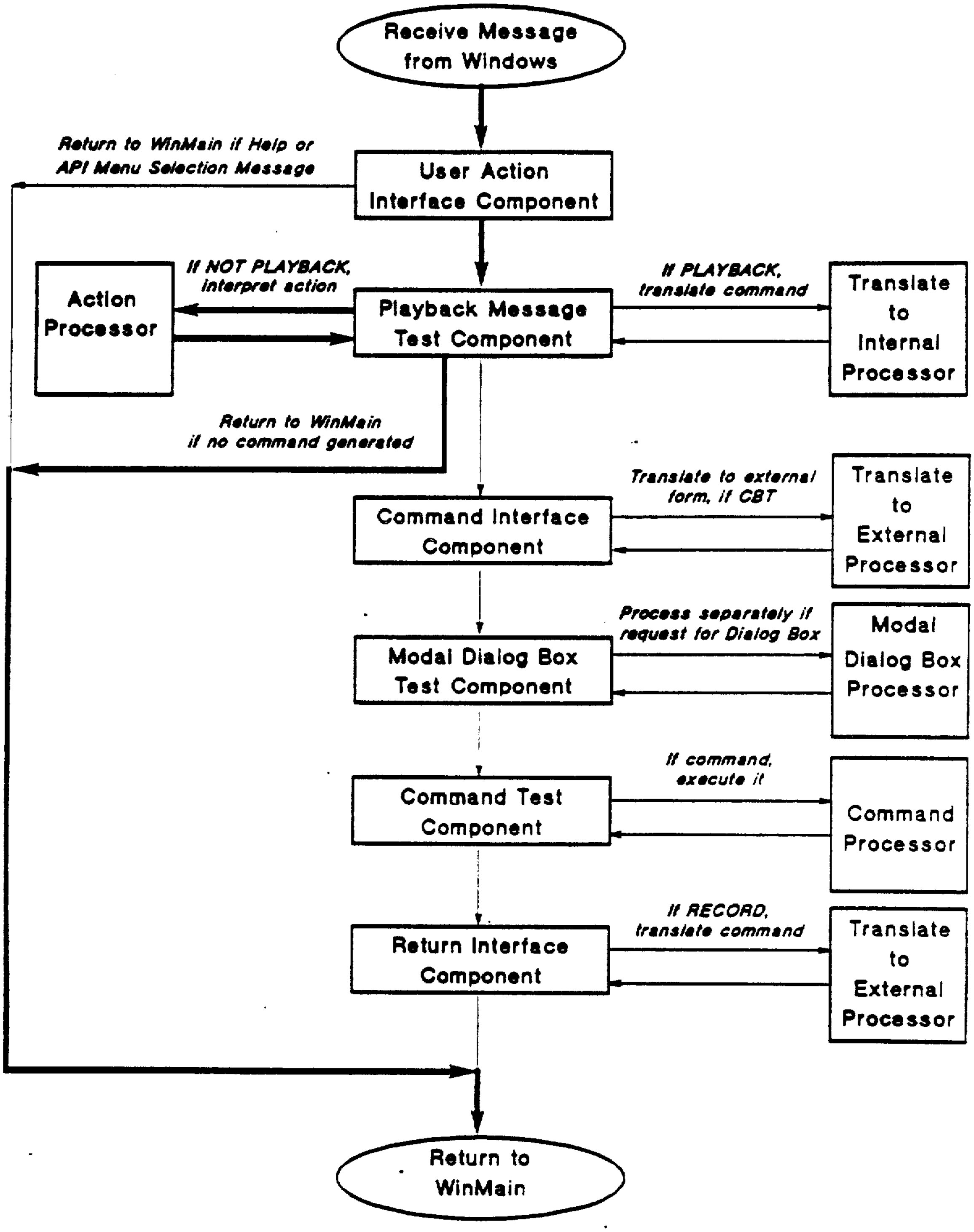
Figure 4-12. Flow of Control During Intercept Mode - Interrogate Message

API Function Summary Tables

The API functions and macros fall in to four general categories:

- API Interface Functions
- API Have Test Macros
- API Mode Test Macros
- Miscellaneous API Functions and Macros The *API Interface Functions* are used to pass information to the API as well as to perform some type of initialization or termination. The *API Have Test Macros* test to see if a particular entity is present. The *API Mode Test Macros* check the current mode of the API. *Miscellaneous API Functions and Macros* is the category for everything else.

The API functions are summarized in the following tables. For more detail, refer to Chapter 2 in the "Programmer Reference Manual".

Table 4-1. API Interface Functions

| Function/Macro | Description |
|---|---|
| APICommandInterface | Used when a command has been generated in the main application or a modeless dialog box. Passes the external form of the command to the Agent. |
| APIDlgCommandInterface | Used when a command comes from a modal dialog box. It passes the external form of the command to be executed to the Agent. |
| APIDlgHelpInterface | Used to provide access to Help from a modal dialog box executed before APIReady is called. |
| APIDlgInit | Performs initialization when a modal dialog box is opened. It passes the modal dialog box information to the API environment. |
| APIDlgTerm | Used to terminate a modal dialog box session and API interaction. |
| APIDlgUserActionInterface | Passes a user action (derived from a Dialog Box) to the Agent, used by CBT and Help. |
| APIEnableMenuItem | Enables, disables or grays a menu item while still allowing Help to access that item. |

Table 4-1. API Interface Functions (cont.)

| Function/Macro | Description |
|---|---|
| APIError | Returns the error after an API function has been called. |
| APIErrorInterface | When an error is detected by the application, APIErrorInterface signals that an error occurred to the Agent. |
| APIInit | Initializes the API data structures and help. |
| APIInitMenu | Adds Task and/or Help menus to an application menu. |
| APIModelessDlgInit | Performs initialization when a modeless dialog box is opened. It passes the modeless dialog box information to the Agent. |
| APIModelessDlgTerm | Used to terminate modeless dialog box and API interaction. |
| APINotReady | Notifies the Agent that the application is not ready to receive messages from the API. |
| APIReady | Informs the Agent that the application is ready to receive API messages (such as set modes or playback). |
| APIRecordInterface | Passes the external form of a command to the Agent for recording. Called after the command has been executed. |
| APIReturnInterface | Tells the Agent that the command is complete and that the application is ready ot receive or build the next command. Informs the Agent about any errors. |
| APITerm | Signals termination of the use of the API. |
| APIUserActionInterface | Responds to API menu selections. Passes all messages to the API so that Help or CBT may act on them. |

Table 4-2. API Have Test Macros

| Function/Macro | Description |
| --- | --- |
| APIHaveButton | Tests if API button has been activated (e.g., Help button). |
| APIHaveCommand | Tests if the user's action(s) have formed a command. |
| APIHaveDialogCommand | Tests if the user's action(s) form a dialog box command. |
| APIHaveMenu | Tests if an API menu (Task, Help, etc.) has been selected. |
| APIHaveMessage | Determines if a message has been processed and nullified by the API. If not, then the message requires further processing by the application. |
| APIPlaybackMsg | Tests for a playback message. If true, the application should call the Translate To Internal Processor to generate an internal command. |

Table 4-3. API Mode Test Macros

| Function/Macro | Description |
| --- | --- |
| APIErrorOn | Signals the application that error capturing has been set by an "ON ERROR DO ..." statement within an Agent task. Errors will be handled by the Agent task and do not require any further reporting by the application. |
| APIInterceptOn | Indicates that all messages should be intercepted by APIUserActionInterface. |
| APIMonitorOn | Tests if the application is in Monitor Mode, in which case commands are passed to the API and may be nullified before they are passed on to the Command Processor. |
| APINoWindowOn | Tests whether application is to run without visible windows. |
| APIPlaybackOn | Tests if the application is in Playback Mode. |
| APIRecordOn | Tests if the application is in Record Mode. |

Table 4-4. Miscellaneous API Functions and Macros

| Function/Macro | Description |
| --- | --- |
| APIChangeCaption | Changes the caption displayed by facilities like Help. |
| APIGetAPIVersion | Returns the current API part number and version. |
| APIMessageBox | Creates and displays a window containing an application-supplied message and caption, plus some combination of pre-defined icons and push buttons. |
| APILoadAccelerators | Loads the API Accelerators to support the keyboard accelerators for the Task and Help menu items. |

Summary of API Components

This section provides descriptions of the API components currently available. As long as your application uses the same variables as in these examples, you can simply plug the components into your application in the prescribed places. The following global variables are used in these examples:

```
/*********************************************************************/
/*                         Global Variables                         */
/*********************************************************************/

APIERRTYPE          applErr;    /* global error for API calls        */
HANDLE              hInst;      /* what instance of the applic       */
HWND                hWnd;       /* handle to object's window         */
OMFHND              hOMF;       /* OMF handle to object              */
APIHND              hAPI;       /* API handle to object              */
APIMODEFLAGSTYPE    APIModeFlags;  /* contains mode flags for API    */
char                ShapeFile[MAXROOTFILENAMELENGTH+1];
                        /* contains name of objects data files   */
char                szCaption[MAXCAPTIONLENGTH];
                        /* used for the caption of object        */
char                szObjTitle[MAXTITLE+1];   /* title of the object */
LASTLOCATION        WinPosn;

/*********************************************************************/
```

User Action Interface Component

```
if ( APIInterceptOn(APIModeFlags) || APIHaveMenu(message, wParam) )
    APIUserActionInterface( hAPI, hWnd, (LPAPIUNSIGNED)&message,
                            wParam, lParam, API_NO_MODE );

if ( APIHaveMessage(message) ) {
    /* Process the message */
```

The *User Action Interface Component* is the first component in your window procedure. APIInterceptOn tests if the application is in intercept mode, i.e., all messages are to be routed to the API. If this is the case, then the API wants to see all user actions and must be alerted through APIUserActionInterface. APIHaveMenu tests if the user made a selection from an API menu in which case the API would also want to see the user's actions, although the APIIntercept mode may not have been turned on. After these tests, the return value is initialized to 0.

At the end of the component, it is necessary to test if a message has been produced that needs to be processed (by means of APIHaveMessage). If there is no message, then there is no reason for further processing in the window procedure and the control returns back to WinMain.

Playback Message Test Component

```
if (APIPlaybackMsg(message))
    TranslateToInternalProcessor(message, wParam, lParam, &intCmd);
else
    ActionProcessor(hWnd, message, wParam, lParam, &intCmd, &applRtn);

if (APIHaveCommand(intCmd.wCmd)) {
    applErr = API_NO_ERR;
```

The *Playback Message Test Component* is the second component in window procedure. Its purpose is to test if a playback message has been received from the Agent. If so, the message needs to be translated to its internal form (by means of the Translate to Internal Processor). If not a playback message, it must be routed to the Action Processor where it can be interpreted. Either processor may result in a command to be passed to the Command Processor. APIHaveCommand is used to test if a command has been generated, with no further processing required if there is no command.

Command Interface Component

```
if (APIMonitorOn(APIModeFlags)) {
    TranslateToExternalProcessor(&intCmd, &extCmd);
    APICommandInterface(hAPI, (LPAPICMDSTRUCT)&extCmd, API_NO_MODE);
    if (extCmd.wCmd == API_NO_CMD)
        intCmd.wCmd = API_NO_CMD;
    }
```

The *Command Interface Component* is the third component in the window procedure. At this point in the window procedure, a command has been formed and is in its internal form. If the application is in monitor mode (CBT), then the external form of the command must be passed on to the API (by way of the Translate to External Processor). The purpose of this is to check in the case of CBT that an appropriate command has been formed and if not to cancel it. If the command has been canceled (set to API_NO_CMD), it is necessary to reset the internal command variable as well so that the command processor will not be called.

Modal Dialog Test Component

```
if (APIHaveDialogCommand(intCmd.wCmd))
    ModalDialogBoxProcessor(hWnd, &intCmd);
```

The *Modal Dialog Test Component* comes next in the window procedure, if the application has any modal dialog boxes. If the command is in the range of dialog commands the Modal Dialog Box Processor is called to display the modal dialog box and get the user input. When the Modal Dialog Box Processor returns a command for the Command Processor will have been generated (or API_NO_CMD if the user cancelled the modal dialog box).

Command Test Component

```
if (APIHaveCommand(intCmd.wCmd))
    CommandProcessor(hWnd,message,wParam,lParam,&intCmd,&applRtn);
```

The *Command Test Component* is the fifth component in the window procedure. APIHaveCommand checks to see if there is a complete, uncancelled command at this point. If there is, then the Command Processor is called in order to execute the command.

Return Interface Component

```
if (APIPlaybackOn(APIModeFlags) || APIRecordOn(APIModeFlags)) {
    if (APIRecordOn(APIModeFlags)) {
        TranslateToExternalProcessor(&intCmd, &extCmd);
        APIRecordInterface(hAPI,(LPAPICMDSTRUCT)&extCmd,API_NO_MODE);
        }
    APIReturnInterface(hAPI, applErr, API_NO_MODE);
    }
```

The *Return Interface Component* is the final command in the window procedure. If the application is either recording a new task or playing back an existing task or CBT lesson, then it is necessary to call APIReturnInterface to let the API know that this command has been completed and that the application is ready for the next command.

If the application is record mode, then in addition the command must be sent to the Agent to be recorded. This is done by first translating the command to its external form and then calling APIRecordInterface.

API Initialization Component

```
if ( !APIInit( (LPAPIHND)&hAPI, hWnd, hInst, hOMF,
              (LPSTR)szAppHelpFile,
              (LPSTR)szObjTitle, API_NO_MODE ) ) {
   if ( APIError(hAPI, API_NO_MODE) >= API_START_API_FATAL_ERR )
       return(CO_ERROR);
```

```
    }
if ( !APIInitMenu(hAPI, GetMenu(hWnd), API_TASK_MENU | API_HELP_MENU,
                  API_NO_MODE) ) {
    if ( NoteAPIError(hAPI) >= API_START_API_FATAL_ERR ) {
        APITerm(hAPI, hWnd, ghInst, ghOMF, API_NO_MODE);
        return(CO_ERROR);
        }
    }
```

The API Initialization component must be called by an application before any API calls can be made (although the mode test macros may be used before this call). This component is used to initialize the API. APIInit returns to the application a handle to the API. This call is normally followed by a call to APIInitMenu, which will add the Task and Help menus to the given menu bar.

This component should be placed in the Action Processor during handling of the CREATE_OMF message. APIInitMenu should be called once for each window that requires API menus.

API Termination Component

```
APITerm(hAPI, hWnd, hInst, hOMF, API_NO_MODE);
```

APITerm is called in the Action Processor while handling the TERMINATE message, before OMF_Term is called. No calls to the API may be made after APITerm.

API Ready Component

```
APIReady(hAPI, API_NO_MODE);
```

APIReady is called in the Action Processor while handling an OPEN or WARM_START message. This call will cause the API to set up the APIModeFlags and start sending playback messages to the application.

API Not Ready Component

```
APINotReady ( hAPI, API_NO_MODE );
```

APINotReady is called in the Command Processor while handling an API_CLOSE_WINDOW_CDCMD command. It is paired with the API Ready Component in the OPEN message handling. It should be preceded by the API Return Interface Component to allow the close message to be correctly recorded. The API Mode Flags are turned off with this call, and no more playback messages will be sent to the application.

Modal Dialog Box User Action Interface Component

```
if (APIInterceptOn(APIModeFlags) || APIHaveButton(message, wParam))
    APIDlgUserActionInterface( hAPI, ABOUTBOX, hDlg,
                               (LPAPIUNSIGNED)&message, wParam, lParam,
                               API_NO_MODE );
```

This component is placed at the start of each modal dialog box procedure. It permits the API buttons (i.e., Help) to be trapped, and also allows the API to see all messages while in intercept mode. If the message has been handled by the API it sets the message to zero.

Modal Dialog Box Initialization Component

```
switch (message) {

case WM_INITDIALOG:
    if ( APIPlaybackOn(APIModeFlags)
    ||   APIRecordOn(APIModeFlags)
    ||   APIMonitorOn(APIModeFlags) )
        APIDlgInit (hAPI, ABOUTBOX, hDlg, API_NO_MODE);
    break;
```

Called when the the modal dialog box procedure receives the WM_INITDIALOG message. This informs the API that the modal dialog box is ready.

Modal Dialog Box Command Interface Component

```
if (APIMonitorOn(APIModeFlags)) {
    TranslateToExternalProcessor(&intDlgCmd, &extDlgCmd);
    APIDlgCommandInterface( hAPI,(LPAPICMDSTRUCT)&extDlgCmd,
                            API_NO_MODE );
    if (extDlgCmd.wCmd == API_NO_CMD)
        intDlgCmd.wCmd = API_NO_CMD;
    }
```

Called in a modal dialog box procedure whenever a button has been selected and a command generated. This allows CBT to monitor the generated command, and to cancel the command if CBT wishes.

Modal Dialog Box Termination Component

```
if (APIHaveCommand(intCmd.wCmd)) {
    if ( APIPlaybackOn(APIModeFlags)
    ||   APIRecordOn(APIModeFlags)
    ||   APIMonitorOn(APIModeFlags) )
        APIDlgTerm (hAPI, DIALOG_ID, hDlg, API_NO_MODE);
    EndDialog(hDlg,TRUE);
    }
```

Called when any pushbutton has been selected that will remove the modal dialog box, and placed after the Modal Dialog Command Interface Component.

Modeless Dialog Box User Action Interface Component

```
if ( APIInterceptOn(APIModeflag) || APIHaveButton(message, wParam) )
    APIDlgUserActionInterface( hAPI, ID_OF_DBOX, hDlg,
                               (LPAPIUNSIGNED)&message,
                               wParam, lParam, API_NO_MODE );

if (APIHaveMessage(message)) {
    /* Process the message */
```

This component is placed at the start of each modeless dialog box procedure. It permits the API buttons (i.e., Help) to be trapped, and also allows the API to see all messages while in intercept mode. If the message has been handled by the API it sets the message to zero, and APIHaveMessage will return FALSE.

Modeless Dialog Box Command Interface Component

```
if (APIMonitorOn(APIModeFlags)) {
    TranslateToExternalProcessor(&intCmd, &extCmd);
    APICommandInterface(hAPI, (LPAPICMDSTRUCT)&extCmd, API_NO_MODE);
    if (extCmd.wCmd == API_NO_CMD)
        intCmd.wCmd = API_NO_CMD;
    }
```

This component is placed in the main window procedure for a modeless dialog box after the modeless action processor. It allows CBT to monitor the command generated by the modeless action processor, and to cancel this command if it wishes.

Modeless Dialog Box Return Interface Component

```
if (APIPlaybackOn(APIModeFlags) || APIRecordOn(APIModeFlags)) {
    if (APIRecordOn(APIModeFlags)) {
        TranslateToExternalProcessor(&intCmd, &extCmd);
        APIRecordInterface(hAPI,(LPAPICMDSTRUCT)&extCmd,API_NO_MODE);
        }
    APIReturnInterface( hAPI, applErr, API_NO_MODE );
    }
```

This component is placed after the command processor in the window procedure for a modeless dialog box. It will record the command if in record mode, and call APIReturnInterface to tell the API that the command has been processed and another message may be played back.

Modeless Dialog Box Initialization Component

```
switch (message) {

case WM_INITDIALOG:
    if ( APIPlaybackOn(APIModeFlags)
    ||   APIRecordOn(APIModeFlags)
    ||   APIMonitorOn(APIModeFlags) )
       APIModelessDlgInit(hAPI, DLG_MODELESS, hDlg, API_NO_MODE);
    break;
```

Placed in the modeless Action Processor while handling the WM_INITDIALOG message, this component informs the API that the modeless dialog box is now ready.

Modeless Dialog Box Termination Component

```
switch (message) {

case WM_DESTROY:
    if ( APIPlaybackOn(APIModeFlags)
    ||   APIRecordOn(APIModeFlags)
    ||   APIMonitorOn(APIModeFlags) )
         APIModelessDlgTerm(hAPI, DLG_MODELESS, hDlg, API_NO_MODE);
    break;
```

Placed in the modeless dialog box Action Processor, this handles the WM_DESTROY message by informing the API that the box is no longer displayed.

Error Message Box Component

```
if ( APIErrorOn(APIModeFlags) )
    APIErrorInterface (hAPI, error, API_NO_MODE);
else {
    APIMessageBox( hAPI, wHelpNo, hWnd, (LPSTR)szMsg,
                   (LPSTR)szCaption, MB_OK | MB_ICONEXCLAMATION );
    applErr = error;  /* Set error number for APIReturnInterface */
    }
```

This component is called whenever an application wishes to report an error to the user. It allows the API to trap the error without displaying a message box.

5 Adding API Functionality to an Application

In this chapter, you will apply the theory from Chapter 4 "Introduction to the API" to the HPSHAPE program that we began in Chapter 3. We will add all five API categories of support: first playback and record, then monitoring, interrogation and error handling.

There is a full listing of HPSHAPE in Appendix B of this manual. You will find code samples from that listing in this chapter.

The chapter is divided into the following sections:

- Designing the Task Language
- Designing the Commands
- A Skeleton Window Procedure
- The Action Processor
- The Command Processor

- Initialization and Termination
- The Translate to External Processor
- The Translate to Internal Processor
- API Mode Flags
- Recording
- Playback
- Monitoring
- Interrogation
- Error Handling

Designing the Task Language

The Task Language you design should be based on the user interface. The *user interface* is the portion of the application program that is visible to the user, that allows the user to make choices regarding how the software will be run, and that permits the user to actually operate the software. In the Windows environment, there are menus of actions and options from which the user can make selections.

The Task Language should have a command for each action or option selected by the user. There need not be commands corresponding to all buttons and menus in the user interface. Rather, there should be commands for each application activity that the user can request. Refer to Chapter 7 "Agent Task Language" when you are actually ready to design your application's task language.

HPSHAPE has two user menus and a system menu with the following options:

```
System Menu    File        Edit
...........    .........   .......
Restore        Rectangle   Clear
Move           Ellipse
Size           Triangle
Minimize       Star
Maximize       Close
Close
```

The user can select any of these menu items to control the application. There are no other commands available to the user as HPSHAPE has no dialog boxes and does not support any user action within its window. Thus the HPSHAPE Task Language should support the following:

- Draw a rectangle
- Draw an ellipse
- Draw a triangle
- Draw a star
- Clear the window
- Close the object
- Minimize the window (make it an icon)
- Maximize the window (make it fill the entire screen)
- Restore the window (put window back to normal size)
- Move or Size the window (control the window's screen position)

The command syntax shown below adheres to the task language style guidelines, using the menu item name for each command. Note that Move and Size are not covered in this example.

```
RECTANGLE
ELLIPSE
TRIANGLE
STAR
CLEAR
CLOSE
MINIMIZE
MAXIMIZE
RESTORE
```

Chapter 7 describes how to write a parser that will translate the Task Language into pcodes, which contain the external form of commands. As described in Chapter 4, you need to write a "Translate to Internal Processor" for your application that will convert the external command format into a format that your application can work with, the internal command.

Designing the Commands

Considering the above task language command syntax, we must now design the external format of the commands. The API requires the external command structure to contain first a word for the length of the command (in bytes), then a word for the command number followed by any parameters for the command. For HPSHAPE we will define a single integer parameter in the external form and use this to identify the type of shape to be drawn.

The external commands are as follows:

| Task Language Command | Command ID | Parameter |
|---|---|---|
| RECTANGLE | NEW_SHAPE | 'R' |
| ELLIPSE | NEW_SHAPE | 'E' |
| TRIANGLE | NEW_SHAPE | 'T' |
| STAR | NEW_SHAPE | 'S' |
| CLEAR | NEW_SHAPE | 'N' |
| CLOSE | API_CLOSE_WINDOW_CDCMD | |
| MINIMIZE | API_MINIMIZE_WINDOW_CDCMD | |
| MAXIMIZE | API_MAXIMIZE_WINDOW_CDCMD | |
| RESTORE | API_RESTORE_WINDOW_CDCMD | |

Note that the values for the command ID have used predefined names from the API header file NWAPI.H where applicable. The only new command, NEW_SHAPE, is defined in HPSHAPE.H to be beyond the range of predefined values, API_START_CDCMD + 1.

The API requires that you define APICMDSTRUCT to represent the application's external command structure. This is the data type of the external format of the command. The API then uses this type definition when working with your application. Your application must define this structure before it includes nwapi.h.

The following definition is placed in HPSHAPE before the NewWave include files:

```
typedef struct {
    WORD wLen;          /* Length of one command and associated params */
    WORD wCmd;          /* The command itself */

    struct  {
        int     XCmd;       /* Numerical value of the command */
     } external;

} APICMDSTRUCT, *PAPICMDSTRUCT;

#include "nwomf.h"
#include "nwapi.h"
#include "nwutil.h"
#include "hpshape.h"
```

Designing the Internal Command Format

The external commands passed between the API and application are translated to internal form before the application processes the command. The internal form is used by the application's Command Processor. The commands to be handled in HPSHAPE are:

```
NEW_SHAPE
API_CLOSE_WINDOW_CDCMD
API_MINIMIZE_WINDOW_CDCMD
API_MAXIMIZE_WINDOW_CDCMD
API_RESTORE_WINDOW_CDCMD
```

In HPSHAPE, the internal format and content of commands looks very similar to the external format. The only differences are:

- There is no length variable.
- The command parameters are translated to different integer values.

The differences are for illustration purposes, and are not strictly necessary for this application. However, more complicated applications may need to translate parameters that depend on specific run-time information.

The internal format of commands should be defined in HPSHAPE as shown below:

```
typedef struct {
    WORD    wCmd;
    struct  {
            int     iCmd;    /*  Command    */
      } internal;
} INTCMDSTRUCT, *PINTCMDSTRUCT;
```

Designing a Skeleton Window Procedure

The window procedure should be designed next, followed by the Action Processor and then the Command Processor.

To make a minimal version of an application, you a need a window procedure that calls the Action Processor and Command Processor. This adds no functionality to the application but gives a structure to which features can be added. Here is the limited version of the window procedure:

```
/*********************************************************************/
/*                            ShapeWndProc                           */
/*********************************************************************/

long FAR PASCAL ShapeWndProc(hWnd, message, wParam, lParam)
HWND            hWnd;
unsigned        message;
WORD            wParam;
LONG            lParam;
{
    APICMDSTRUCT     extCmd;
    APIRTNTYPE       applRtn;
    INTCMDSTRUCT     intCmd;

    if (NW_MessageFilter( hWnd, message, wParam, lParam,
                         (LONG FAR *)&applRtn ))
       return (applRtn);

    ActionProcessor (hWnd, message, wParam, lParam, &intCmd, &applRtn);

    if (APIHaveCommand (intCmd.cmd)) /* API provided macro to check  */
                                     /* if a command to be processed.*/
       {
          CommandProcessor (hWnd, message, wParam, lParam, &intCmd,
                           &applRtn);

       }

    return(applRtn);

} /* End of ShapeWndProc */
```

Designing an Action Processor

The Action Processor handles all incoming messages and either completely processes the message or build a command to hand on to the Command Processor. Paint messages and OMF messages are fully processed in the Action Processor, while user menu commands generate commands for the Command Processor.

The Action Processor code listing follows:

```
/***********************************************************************/
/*                          ActionProcessor                             */
/***********************************************************************/

void PASCAL  ActionProcessor (hWnd, message, wParam, lParam, applCmd,
                              pRtn, pErr)

HWND            hWnd;
unsigned        message;
WORD            wParam;
LONG            lParam;
PAPICMDSTRUCT   intCmd;
LONG            *pRtn;

{
    PAINTSTRUCT  ps;

    switch (message) {

        /* Paint message sent to update the screen */
        case WM_PAINT:
            BeginPaint (hWnd, (LPPAINTSTRUCT)&ps);
            ShapePaint (hWnd, (LPPAINTSTRUCT)&ps);
            EndPaint   (hWnd, (LPPAINTSTRUCT)&ps);
            break;

        /* A menu selection */
        case WM_COMMAND:
            /* was the close option chosen */
            if (wParam == IDDCLOSE)
                intCmd->wCmd = API_CLOSE_WINDOW_CDCMD;
            else {
                /* something was selected from the shape menu */
                intCmd->wCmd = NEW_SHAPE;
                intCmd->internal.lCmd = wParam;
            }
            break;

        /* Window being closed */
        case WM_CLOSE:
            intCmd->wCmd = API_CLOSE_WINDOW_CDCMD;
            break;

        /* selection from system menu or minimize/maximize */
        case WM_SYSCOMMAND:
            switch (wParam&0xFFF0) {
                case SC_MINIMIZE:
                    intCmd->wCmd = API_MINIMIZE_WINDOW_CDCMD;
                    break;

                case SC_MAXIMIZE:
                    intCmd->wCmd = API_MAXIMIZE_WINDOW_CDCMD;
                    break;

                case SC_RESTORE:
                    intCmd->wCmd = API_RESTORE_WINDOW_CDCMD;
                    break;

                default:
                    *pRtn = DefWindowProc(hWnd, message, wParam, lParam);
                    break;

            }  /* End of case WM_SYSCOMMAND */
            break;

        /* The message has come via the OMF */
        case WM_OMF:
```

```
            *pRtn = MessageFromOMF(hWnd, wParam, lParam);
            break;

        default:
            *pRtn = DefWindowProc(hWnd, message, wParam, lParam);
            break;
        }
}
```

If the message received is WM_COMMAND, WM_CLOSE, or WM_SYSCOMMAND, the Action Processor sets *intCmd* to the appropriate value. Otherwise, *intCmd* is not set, and messages are processed within the Action Processor or by a function called within the Action Processor.

Note that this version of the Action Processor is simplified for instructional purposes. Refer to the listing of HPSHAPE in Appendix B for the complete version of Action Processor.

Designing a Command Processor

Now that the Action Processor is complete, you can write the Command Processor. This must process any of the application's internal commands. The code for the HPSHAPE Command Processor follows:

```
/*********************************************************************/
/*                         CommandProcessor                          */
/*********************************************************************/

void PASCAL   CommandProcessor (hWnd, message, wParam, lParam, applCmd,
                                 pRtn, pErr)
HWND           hWnd;
unsigned       message;
WORD           wParam;
LONG           lParam;
PINTCMDSTRUCT  applCmd;
LONG           *pRtn;
{
    HMENU        hMenu;
    RECT         rcRect;

    switch (intCmd->wCmd) {

        case API_MINIMIZE_WINDOW_CDCMD:
            if (IsIconic(hWnd))
                NW_Restore(hWnd);
            else
                NW_Minimize(hWnd);

            *pRtn = 0L;
            break;

        case API_MAXIMIZE_WINDOW_CDCMD:
            if (IsZoomed(hWnd))
                NW_Restore(hWnd);
            else
                NW_Maximize(hWnd);

            *pRtn = 0L;
            break;

        case API_RESTORE_WINDOW_CDCMD:
            NW_Restore(hWnd);
            break;

        case NEW_SHAPE:
            /* Get the handle to the menu of the current window */
            hMenu = GetMenu(hWnd);

            /* Uncheck the old menu item */
            CheckMenuItem(hMenu, nShape, MF_UNCHECKED);

            /* check the new menu item */
            if ((nShape = intCmd->internal.lCmd) != SHAPE_NONE)
                CheckMenuItem(hMenu, nShape, MF_CHECKED);
```

```
                /* send a paint message */
                InvalidateRect(hWnd, (LPRECT)NULL, TRUE);
                UpdateWindow(hWnd);  /* Force repaint for every shape, not
                                        just last shape, when playing back
                                        several NEW_SHAPE commands */

                *pRtn = 0L;
                break;

            default:
                break;
            }
    }
```

Adding API Initialization and Termination

Your application now has the two most important processors which contain most of the functionality of your application: the Action Processor and the Command Processor. You have the basic building blocks you need to begin adding API functionality. To complete the infrastructure for the API, your application must add calls to initialize and terminate the API.

The object must initialize the API when it is activated, terminate the API when it is deactivated, tell the API it is ready when opened, and tell the API it is no longer ready when closed. The code for these calls is in the Action Processor MessageFromOMF procedure and in the Command Processor during a Close command.

Initializing the API

When your object is activated it must initialize the API. This is done in MessageFromOMF while processing the OMF message CREATE_OMF by calling APIInit and APIInitMenu. These two calls make up the API Initialization Component. Note that other API calls are not valid until APIInit has been called.

```
long PASCAL MessageFromOMF(hWnd, wParam, lParam)
  .
  .
  .
switch(wParam) {
case CREATE_OMF:
    .
    .
    .
    /* APIInit registers the window handle with the API          */
    APIInit( (LPAPIHND)&ghAPI,        /* receives handles from API */
             hWnd,                    /* Window handle             */
             ghInst,                  /* Instance handle           */
             ghOMF,                   /* OMF handle                */
             (LPSTR)"HPSHAPE.HLP",    /* Name of help text file    */
                                      /* Can be null string if     */
                                      /* no file exists.           */
             (LPSTR)gszObjTitle,      /* Title of help window      */
                                      /* Can be null string if     */
                                      /* no help implemented.      */
             API_NO_MODE);            /* Placeholder for future    */
                                      /* APIInit changes           */

    /* APIInitMenu adds the Task and Help Menus to the menu bar  */
    APIInitMenu( ghAPI,               /* API Handle */
                 GetMenu (hWnd),      /* Get menu (to add items to)*/
                 API_TASK_MENU | API_HELP_MENU,
                                      /* Add both Task & Help Menus*/
                 API_NO_MODE );       /* dummy variable            */
```

Adding API Ready

After receiving the CREATE_OMF message, the object may receive an OPEN OMF message. While processing this message the object must inform the API that it is ready to receive API messages (eg Playback messages). This is done by calling APIReady - the API Ready Component - at the end of the OPEN message processing in MessageFromOMF.

```
case OPEN:
    .
    .
    .
    /* Tell API the object is ready to receive messages */
    APIReady( ghAPI,            /* API handle      */
              API_NO_MODE );    /* dummy variable */

    return(0L);
```

Adding API Not Ready

When the object's window is closed, the object must inform the API that it is no longer ready for API messages. When the object receives a WM_CLOSE message from windows, its action processor builds a API_CLOSE_WINDOW_CDCMD which is passed to the command processor. In response to this command, the command processor must hide the window, call APINotReady to indicate it is no longer available for API messages, and then call OMF_Closing to tell the OMF that the window has closed.

The API Not Ready Component been added to the Command Processor of HPSHAPE as shown below:

```
case API_CLOSE_WINDOW_CDCMD:
    ShowWindow(hWnd, SW_HIDE);
    UpdateWindow(hWnd);
    APINotReady(ghAPI, API_NO_MODE);
    if (!OMF_Closing(ghOMF, (LPRECT) &rcRect))
        NoteError();
    break;
```

Adding API Terminate

When the OMF determines that an object need no longer remain active, a TERMINATE message will be sent to the object. The object must terminate access to the API while processing this message, before OMF_Term is called. This is done by calling APITerm.

The API Terminate Component has been added to the TERMINATE case of the MessageFromOMF procedure as shown below:

```
case TERMINATE:
  .
  .
  .
  /* terminate use of API */
     APITerm(ghAPI, hWnd, ghInst, ghOMF, API_NO_MODE);

     /* free up memory with the OMF */
     OMF_Term(ghOMF);
  .
  .
  .
```

Testing the HPSHAPE Window Procedure Skeleton

At this point you can test your "skeleton" application by opening it and processing some actions and commands.

To add record or monitoring, your application must be able to translate from internal to external format using the Translate To External Processor. For playback, it also needs a Translate To Internal Processor.

Designing a Translate To External Processor

The Translate To External Processor is very straightforward. Its purpose is to translate from the internal format (which is used by the application) to the external format (which the API can store).

In HPSHAPE this conversion is simply a matter of translating the command parameter from one integer value to another. (More complex applications may need to do more work than this.) Here is a listing of the Translate To External Processor for HPSHAPE:

```
/**********************************************************************/

void PASCAL  TranslateToExternalProcessor(intCmd,extCmd)
PINTCMDSTRUCT intCmd; /* The internal command, passed in  */
PAPICMDSTRUCT extCmd; /* The external command, passed out */
{
    /* The external command number is the same as the internal one,  */
    /* so copy it unchanged.                                          */
    extCmd->wCmd = intCmd->wCmd;

    /* If the internal command is NEW_SHAPE, must deal with parameter*/
    if (intCmd->wCmd == NEW_SHAPE)
        switch (intCmd->internal.lCmd) {

            case SHAPE_RECTANGLE : extCmd->external.XCmd = R;
                                   break;

            case SHAPE_ELLIPSE   : extCmd->external.XCmd = E;
                                   break;

            case SHAPE_TRIANGLE  : extCmd->external.XCmd = T;
                                   break;

            case SHAPE_STAR      : extCmd->external.XCmd = S;
                                   break;

            case SHAPE_NONE      : extCmd->external.XCmd = C;
                                   break;

            default:
                    break;
        }

    /* set the size of the command */
    extCmd->wLen = sizeof(APICMDSTRUCT);

} /* end of TranslateToExternalProcessor */
```

You will see how HPSHAPE calls the Translate To External Processor later in this chapter.

Designing a Translate To Internal Processor

The Translate To Internal Processor converts the external form of the command (passed from the API) into the internal form (used by the application). You will see how this is called when Playback is added later in this chapter.

This processor must first retrieve the external command from global memory and then translate it into internal form. For HPSHAPE the translation is simply a matter of mapping the command parameter from one integer value to another. Here is a listing of HPSHAPE's Translate To Internal Processor.

```
/**********************************************************************/
/*                    TranslateToInternalProcessor                    */
/*                                                                    */
/* Take the external command from the buffer at handle LOWORD(lParam)*/
/* and change its value into the internal command format.            */
/**********************************************************************/
```

```
void PASCAL TranslateToInternalProcessor(message,wParam,lParam,intCmd)
unsigned       message; /* Not used                          */
WORD           wParam;  /* Not used                          */
LONG           lParam;  /* Global handle to external command */
PINTCMDSTRUCT intCmd;   /* The internal command to return    */
{
    LPAPICMDSTRUCT extCmd;      /* pointer to the external command struct */

    /* get the pointer to the external command structure */
    extCmd = (LPAPICMDSTRUCT)GlobalLock(LOWORD(lParam));
    if (extCmd == NULL) {
        NoteError();
        return;
        }

    /* set the internal command ID to be that of the external command*/
    intCmd->wCmd = extCmd->wCmd;

    /* If the command is NEW_SHAPE, translate the parameter */
    if (extCmd->wCmd == NEW_SHAPE)
        switch(extCmd->external.XCmd) {

            case R :  intCmd->internal.ICmd = SHAPE_RECTANGLE;
                      break;

            case E :  intCmd->internal.ICmd = SHAPE_ELLIPSE;
                      break;

            case T :  intCmd->internal.ICmd = SHAPE_TRIANGLE;
                      break;

            case S :  intCmd->internal.ICmd = SHAPE_STAR;
                      break;

            case C :  intCmd->internal.ICmd = SHAPE_NONE;
                      break;

        default:
                      break;
        }

    GlobalUnlock(LOWORD(lParam));
} /* end of TranslateToInternalProcessor */
```

Adding API Mode Flags

For your application to use any of the API categories of support, the flow of control within your application must be controlled by the API. To do this the application must supply a global variable of type APIMODEFLAGSTYPE, and support a message from the API to set these flags. The application never directly access these flags, but uses the API mode test macros with this variable.

HPSHAPE declares a global variable *gAPIModeFlags* at the top of its program file as shown:

```
APIMODEFLAGSTYPE     gAPIModeFlags;
```

The Action Processor must handle a message from the API to set and clear the flags within *gAPIModeFlags*. HPSHAPE adds the following code to the Action Processor message switch:

```
void PASCAL  ActionProcessor (hWnd, message, wParam, lParam, applCmd,
                              pRtn, pErr)

    switch (message) {
      .
      .
      .

        /* message from the API */
        case  API_SET_MODE_FLAGS_MSG:
            if (wParam == API_SET_MODE_ON_FLAG)
                gAPIModeFlags = gAPIModeFlags | lParam;
            else
                gAPIModeFlags = gAPIModeFlags & lParam;
            break;
```

Adding Recording Functionality

With the Translate To Internal Processor and Translate To External Processor in place, you can now add the calls to use all the API categories of support.

To add Record, you need to do two things.

1. You must allow the user to select "Record" from the "Task" menu. This is done by adding the User Action Interface Component at the beginning of the window procedure.
2. You must call the API to record the commands after the Command Processor has executed them. This is done by adding the Return Interface Component just after the Command Processor has been called.

The User Action Interface Component processes user selections from the API menus ("Task" and "Help"), and will also handle the messages for context sensitive help. It does this by intercepting messages before the application has processed them, and sets the message to zero if it has been processed by the API. For efficiency the API will only intercept messages other than API menu messages when in "Intercept Mode", which is used by help.

The User Action Interface Component must be placed before the message has been handled by the application, that is, before the Action Processor and Translate To Internal Processor. The User Action Interface Component looks like this:

```
if (APIInterceptOn(ghAPIModeFlags) || APIHaveMenu(message, wParam)) {
    APIUserActionInterface( ghAPI, hWnd, (LPAPIUNSIGNED)&message,
                            wParam, lParam, API_NO_MODE );
    }
```

For recording, you must also add the Return Interface Component. This calls the API to record a command, then notifies the API that the current command processing is complete. This component is also used during Playback to tell the API a command has been processed.

The Return Interface Component should be placed after the Command Processor, and looks like this:

```
if (APIPlaybackOn(gAPIModeFlags) || APIRecordOn(gAPIModeFlags)) {
    if (APIRecordOn (gAPIModeFlags)) {
        TranslateToExternal (&intCmd, &extCmd);
        APIRecordInterface( ghAPI, (LPAPICMDSTRUCT)&extCmd,
                            API_NO_MODE );
    }
    APIReturnInterface (ghAPI, gapplErr, API_NO_MODE);
    }
```

To allow recording of the Close command, the Return Interface Component must also be placed before APINotReady is called. Therefore the Command Processor has the following code for the close window command:

```
case API_CLOSE_WINDOW_CDCMD:
    ShowWindow(hWnd, SW_HIDE);
    UpdateWindow(hWnd);

    if (APIPlaybackOn(gAPIModeFlags) || APIRecordOn(gAPIModeFlags)) {
        if (APIRecordOn (gAPIModeFlags)) {
            TranslateToExternal (&intCmd, &extCmd);
            APIRecordInterface( ghAPI, (LPAPICMDSTRUCT)&extCmd,
                                API_NO_MODE );
        }
        APIReturnInterface g(hAPI, gapplErr, API_NO_MODE);
        }
```

```
APINotReady(ghAPI, API_NO_MODE);
if (!OMF_Closing(ghOMF, (LPRECT) &rcRect))
    NoteError();
break;
```

Adding Playback Functionality

To support Playback, you must add code to handle playback messages from the API. This is done by calling the Translate To Internal Processor instead of the Action Processor when your application receives an API_PLAYBACK_MSG. The internal command generated is then passed to the Command Processor just as if it had come from the Action Processor.

This code is shown below:

```
if (APIPlaybackMsg(message))
    TranslateToInternal(message, wParam, lParam, &intCmd);
else
    ActionProcessor( hWnd, message, wParam, lParam, &intCmd,
                     &applRtn, &applErr );
```

This is all the code you need to add for Playback and Record. The only remaining additions to the window procedure are for monitoring.

Adding Monitoring Functionality

The final additions to the window procedure are for monitoring, used by CBT. In this mode, commands generated by the Action Processor are passed via the API to the CBT task. CBT may choose to allow the command to be executed, in which case it is passed on to the Command Processor, or CBT may cancel the command.

To do this, the Command Interface Component is added between the Action Processor and Command Processor calls. The command interface component is shown below:

```
if (APIMonitorOn(gAPIModeFlags)) {
    TranslateToExternalProcessor(&intCmd,&extCmd);
    APICommandInterface(ghAPI,(LPAPICMDSTRUCT)&extCmd,API_NO_MODE);

    /* Cancel internal command if external command has  */
    /* been nullified.                                  */
    if (extCmd.wCmd == API_NO_CMD)
       intCmd.wCmd = API_NO_CMD;

 }
```

The full window procedure now looks like this:

```
/*********************************************************************/
/*                          ShapeWndProc                             */
/*                                                                   */
/* Main procedure to handle all messages sent to HPSHAPE.            */
/*********************************************************************/

long FAR PASCAL ShapeWndProc(hWnd, message, wParam, lParam)
HWND            hWnd;
unsigned        message;
WORD            wParam;
LONG            lParam;
{
    APIRTNTYPE       applRtn;  /* used as a return value          */
    APICMDSTRUCT     extCmd;   /* the external command for api    */
    INTCMDSTRUCT     intCmd;   /* the internal command for api    */

    /* function called for windows created with NW_CreateWindow   */
    /* to specially handle some messages                  */

    if (NW_MessageFilter( hWnd, message, wParam, lParam,
                          (LONG FAR *)&applRtn ))
        return (applRtn);
```

```
if (APIInterceptOn(gAPIModeFlags) || APIHaveMenu(message,wParam)) {
    APIUserActionInterface( ghAPI, hWnd, (LPAPIUNSIGNED)&message,
                            wParam, lParam, API_NO_MODE );
    }
applRtn = (APIERRTYPE)0L;
if (APIHaveMessage (message)) {
    intCmd.wCmd = API_NO_CMD;

    if (APIPlaybackMsg(message))
        TranslateToInternalProcessor( message, wParam, lParam,
                                      &intCmd );
    else
        ActionProcessor( hWnd, message, wParam, lParam,
                         &intCmd, &applRtn );

    if (APIHaveCommand(intCmd.wCmd)) {
        gapplErr = API_NO_ERR;

        if (APIMonitorOn(gAPIModeFlags)) {
            TranslateToExternalProcessor(&intCmd,&extCmd);
            APICommandInterface(ghAPI, (LPAPICMDSTRUCT)&extCmd,
                                API_NO_MODE);
            if (extCmd.wCmd == API_NO_CMD)
                intCmd.wCmd = API_NO_CMD;
            }

        if (APIHaveCommand(intCmd.wCmd))
            CommandProcessor(hWnd, message, wParam, lParam,
                             &intCmd, &applRtn );
        if (APIPlaybackOn(gAPIModeFlags) ||
            APIRecordOn  (gAPIModeFlags) ) {

            if (APIRecordOn(gAPIModeFlags)) {
                TranslateToExternalProcessor(&intCmd,&extCmd);
                APIRecordInterface(ghAPI,(LPAPICMDSTRUCT)&extCmd,
                                   API_NO_MODE);
                }

            APIReturnInterface(ghAPI, gapplErr, API_NO_MODE);

            }

        } /* EndIf of APIHaveCommand */

    } /* EndIf of APIHaveMessage */

  return(applRtn);

} /* End of ShapeWndProc */
```

Adding Interrogation Functionality

The window procedure you have built in the preceding sections will display a "Help" menu with both Help Index and Screen Help options. The User Action Interface Component will handle these menu selections, and while in Screen Help mode, will pass any menu selections directly to the help system to provide help about the selected item.

The only remaining functionality required for full Help support is for your application to provide context sensitive help within its client area. This is used when the user selects "Screen Help" and then clicks the mouse within the application's window. To provide help here, the application must provide a help interrogation function which will translate the coordinates of the mouse click into the number of the help text to be displayed. This is implemented by the API sending an API_INTERROGATE_MSG to the application, which returns the help text ID.

To add this to HPSHAPE, a new message type is added to the Action Processor, and a new routine InterrogateFromAPI is added to provide the help text ID:

```
void PASCAL  ActionProcessor (hWnd, message, wParam, lParam, applCmd,
                              pRtn, pErr)
    .
    .
    .
    switch (message) (
        .
        .
        .
        case API_INTERROGATE_MSG:
            *pRtn = InterrogateFromAPI(hWnd, wParam, lParam);
            break;

        .
        .
        .

/**********************************************************************/
/*                          InterrogatefromAPI                        */
/*                                                                    */
/* Command from API - handle context sensitive help requests.        */
/**********************************************************************/

long PASCAL InterrogatefromAPI(hWnd, wParam, lParam)
HWND        hWnd;
WORD        wParam; /* Type of interrogation message              */
LONG        lParam; /* Coordinates of mouse click in device units */
(
    switch (wParam) (

        case API_RENDER_HELP_FN:
            return(106L);              /* # of the context # */

        default:
            return(0L);
        )
) /* end of InterrogatefromAPI */
```

Note that in this example the help returned is always the same - 106L. In a more complex application the mouse coordinates (from *lParam*) may be used along with the current state of the application to produce different help numbers.

Other uses of interrogation will be defined in the future for API services such as CBT or direct manipulation. An application may also have private interrogation messages used between cooperating applications.

Adding Error Handling

The final API functionality to add is Error Handling. This is of interest to the API so that Task Execution may be stopped in the event of an error, and also so that tasks may be written to handle errors themselves with no user interaction.

Whenever an application would report an error to the user, it must first check if the API is trapping error messages. If errors are to be trapped, APIErrorInterface is called to notify the agent of the error and no message box is displayed. If error trapping is not on (the normal case), the message box is displayed to the user as normal and an error flag is set to be returned to the API when the command finishes execution and calls APIReturnInterface. Note that the error number to be passed to the API should be the same number as is displayed to the user as part of the error message.

In HPSHAPE there is a common routine used to report errors, NoteError. To support API error handling, this routine must have the Error Dialog Box Component added as shown below.

```
void PASCAL NoteError(error)
unsigned  error;      /* ID for both the error message and help text */
(
```

```
    char    szMsg[MSGERR];

    if ( !LoadString(ghInst, error, (LPSTR)szMsg, sizeof(szMsg)) )
        return;

    /* Error Dialog Box Component                                    */

    if (APIErrorOn(gAPIModeFlags))         /* Is task trapping errors? */
        APIErrorInterface(ghAPI,
                          (APIERRTYPE)error,     /* Error num for API */
                          API_NO_MODE);

    else {
        APIMessageBox(ghAPI,
                      (APIDIALOGIDTYPE)error,   /* Help Text number  */
                      hWnd,
                      (LPSTR)szMsg,
                      (LPSTR)szCaption,
                      MB_OK | MB_ICONEXCLAMATION );

        gapplErr = error;          /* Set global for APIReturnInterface */
        }
}
```

The above component should be used to report errors detected in the Action Processor, Command Processor, or Translate To External Processor. However errors detected in the Translate To Internal Processor will result in no command being generated, so the following logic must be used to inform the API of the error:

```
    /* Error detected in Translate To Internal */
    gapplErr = error;
    intCmd->wCmd = API_NO_CMD;
    APIReturnInterface( ghAPI, gapplErr, API_NO_MODE);
```

6 Encapsulation: Integrating Applications into the NewWave Environment

Recognizing the importance of integrating existing MS-DOS applications into the HP NewWave Environment, HP provides a technique known as encapsulation. Encapsulation allows a developer to increase the level of interaction of an existing MS-DOS or Microsoft Windows application with the NewWave environment. See Appendix I in the "HP NewWave Environment: Programmer Reference Manual" for more information.

Encapsulation gives you the ability to run applications from within the NewWave environment, and enables the encapsulated applications to have many NewWave functions. An application encapsulated into the NewWave environment as a persistent object inherits the following OMF functions.

- Each instance is initially created using the "Create A New..." menu function.
- Each instance is represented by a title and an icon unique to the application. The title typically reflects the MS-DOS filename associated with that instance. The exceptions to this are described later in this document.
- Each instance can be manipulated using the NewWave Office's standard direct manipulation, keyboard and clipboard functions.
- Each instance can be imported and exported directly (using the NewWave Office commands) or indirectly.
- When an instance is opened, the appropriate application code is executed and the data associated with that instance is automatically loaded.

- Standard text-based (non-Windows) applications can be enhanced with a Windows-style menu structure to invoke macros required or desired to emulate NewWave functionality.
- New data instances created while running the application are automatically registered in the NewWave Office window.

Note that an application encapsulated into the NewWave environment as a persistent object does not have the ability to share data.

Encapsulating Applications

To encapsulate existing applications, you must perform the following actions:

- Create an icon to represent the application by using the Windows program ICONEDIT (.ICO file);
- Define the command line options or keystroke macro required to load a data file on startup;
- Set up empty template data files for the application masters contained in the Creator object;
- Build a menu definition file (.MNU) that includes macros for pop-up menus and their associated keystroke macros;
- Create a special installation file (.INS) that installs the application to the Desktop and defines the various components, and specifies the required methods and class properties;
- Set up a Program Information File (.PIF) as required by Windows.

An existing MS-DOS, non-Windows application (a "standard" application) is called an *oldap* in this chapter. An existing Windows applications is referred to as a *winap*.

To encapsulate oldaps, five different files must be created:

- NewWave Object Installation File (.INS);
- Object Icon File (.ICO);
- Empty Template Data File(s);
- Program Information File normally required by Windows (.PIF);
- Menu/Macro Definition File (.MNU).

Winaps are not managed by WINOLDAP (the Windows utility for invoking non-Windows applications) and therefore do not require .PIF files. Furthermore, because the menus of winaps cannot be altered by encapsulation, winaps do not require .MNU files.

Encapsulating Standard MS-DOS Applications

A standard, non-Windows MS-DOS application (oldap) can be encapsulated into the NewWave environment as a persistent, non-data-sharing object if it meets all of the following requirements:

- The application can be run under MS-Windows;
- The complete set of data associated with each instance of the application can be stored in a single file, or a set of files with a common root name and different extensions;
- When the application is invoked, the data associated with that instance can be loaded either by command line parameters, or by providing a deterministic keystroke macro (a keystroke macro that achieves the intended results for all possible conditions or states of the application);

- A template data file (or files) can be provided that represents an empty (new) instance;
- A unique Desktop icon can be provided for the application.

It is also desired, (but not required) that the following conditions can be met:

- The application can be run in text (non-graphics) mode;
- A deterministic keystroke macro can be defined that saves the application's data in the same files used when it was invoked;
- A deterministic keystroke macro can be defined that exits the application.

Certain standard applications can operate within a Windows-style window, if the application's display output is completely text-based, and uses either MS-DOS console output (including ANSI escape sequences, if desired) or BIOS INT10 display output interrupt service calls. The differences between a standard application operating in a window (a good oldap) and one that takes over the entire display (a bad oldap) are as follows:

- A good oldap operates in a Windows-style window, and can occupy the display simultaneously with other Windows applications and good oldaps.
- A good oldap can multi-task with other Windows applications and good oldaps.
- A good oldap runs co-resident with the Windows kernel and other Windows applications and good oldaps, and therefore has less memory available to it than a bad oldap.
- A good oldap must have all its text output produced in its graphics-based window, therefore its display performance is significantly slower than if it was run as a bad oldap and took over the entire display.

Note Due to the severe memory restrictions and other performance issues, good oldaps are not supported for encapsulation into NewWave at this time.

WINOLDAP (the Windows 2.0 interface module for oldaps) provides a facility to emulate Windows-style pull-down menus over the text display of an oldap. For good oldaps, this makes use of the menu facilities provided by Windows. For bad oldaps, a simulated menu bar is overlayed on the oldap's text display. For each menu item, a keystroke macro can be defined. When the menu item is selected, the keystroke macro is passed to the application as if it were input from the keyboard by the user. Encapsulated NewWave applications make extensive use of this feature to allow the application installer to create menu functions that emulate many of the components of the NewWave user interface. This feature is only available for standard applications that use text video modes for their user interface. More information on oldap menus and macros is provided later in this document.

Encapsulating Windows Applications

An MS-DOS Windows application (winap) can be encapsulated into the NewWave environment as a persistent, non-data-sharing object if it meets all of the following requirements:

- The complete set of data associated with each instance of the application can be stored in a single file, or a set of files with a common root name and different extensions;

- When the application is invoked, the data associated with that instance can be loaded by specifying an appropriate command line parameter;
- The application provides a Save command consistent with the Windows Application Style Guide that saves the application's data in the same files used when it was started;
- The application provides a Close command consistent with the Windows Application Style Guide;
- A template data file (or files) can be provided that represents an empty (new) instance;
- A unique Desktop icon can be provided for the application.

Functionality of an Encapsulated Application

Object Modes

MS-DOS applications rely on access to data stored in the MS-DOS file system, while the NewWave environment (and true NewWave applications) shields the user completely from MS-DOS by using the OMF for all data access. As a result, encapsulated applications must strike a compromise between these two different worlds. Two inescapable, but mutually incompatible, rules must be observed:

1. When an MS-DOS application is executing, its data must be stored in an MS-DOS file known to and controlled by the user.
2. When an MS-DOS application instance is manipulated within the NewWave environment, the data must be stored in a file known to and controlled by the OMF.

To remain true to both these rules, encapsulated applications can automatically switch between the two modes. While in the MS-DOS mode, the application data is stored in a user specified MS-DOS file, which is kept track of by using an object property. In the OMF mode, the application's data files are stored within the OMF data structure exactly like any other NewWave application.

An encapsulated application's object is originally created in the MS-DOS mode, using the title specified in the "Create A New..." menu function as the filename. Whenever it is copied or imported, the new version is created in the OMF mode. It is converted from OMF mode to MS-DOS mode when opened by the user, who is prompted at that time for a new MS-DOS filename.

Certain configuration information is provided for each application class. This includes a default data file path, and the keyfile extension. The keyfile extension indicates which file must exist to make up a valid instance.

Establishing a New File Reference

To ensure system integrity, several checks are made on the filename provided by the user whenever a new object is created or an object is converted from OMF mode to MS-DOS mode. To accomplish this, a global system table (stored as HPOMF.DOS in the \HPNWDATA directory) of all currently referenced MS-DOS files is maintained for all encapsulated applications. The following verification procedure is used.

1. The filename is trimmed of trailing blanks, and upshifted for consistency.
2. If after trimming and upshifting the filename is a null string or is the string "UNTITLED" (the default title in the "Create A New..." menu function), the user is prompted to re-enter the filename.

3. The filename is checked for valid MS-DOS syntax.
4. If no path is specified, the default path for this application class is prefixed to the filename.
5. The extension provided by the user is discarded. Encapsulated applications are considered to have all of their files within the specified fileset, regardless of their extension, to be part of the individual object instance.
6. If the fileset is currently referenced by an instance of another application class, an error is indicated, and the user is prompted to re-enter the filename.
7. If the fileset is currently referenced by an instance of the same application class, the user is given the option of creating a Shared instance of the existing object, or re-entering the filename.
8. If the fileset currently exists, but is not already referenced within the NewWave environment and the keyfile does not exist, an error is indicated and the user is prompted to re-enter the filename.
9. If the fileset currently exists, including the keyfile, and it is not currently referenced within the NewWave environment, the user is given the option of referencing the existing fileset or re-entering the filename.
10. If the fileset does not exist, and is not currently referenced within the NewWave environment, the fileset is created by making copies of the files that belong to the source instance. In the case of creating a new instance from the "Create A New..." menu function, the files copied are the template files belonging to the master instance.

Automatically Registering New Files Created by the Application

Encapsulated applications are provided a feature to automatically register as new objects any new data files that are created while the application is executing. This is equivalent to a Save or Copy to Desktop function.

A current time stamp is recorded for encapsulated applications when the application is invoked or when control is transferred to it via a change of focus. When a change of focus occurs, or when the application is terminated, the default data directory of the encapsulated application is scanned for keyfiles with a date stamp greater than the recorded date stamp. For each file found that is not already registered in HPOMF.DOS, a new instance is created for that encapsulated application that references the new file, and the object is put on the Desktop via an OMF_INSERT message.

If a conflict occurs because an existing filename is subsequently registered to another object class, the new or updated file is not automatically registered under the new encapsulated application object class.

Desktop Management of Encapsulated Objects

When an MS-DOS application object is in MS-DOS mode, the object's title displayed is the 1-8 character MS-DOS root filename. The title cannot be edited either via the on-screen editing in the iconic view or via the Attributes... dialog box.

If the title is selected for editing in the iconic view (by clicking the mouse on the title string), the drive, path, filename and extension are displayed. This field cannot be edited, and it is removed as soon as any other mouse or menu operation is performed. There is no method available to display the filename in the list view, nor is there a keyboard equivalent for this mouse operation.

When an MS-DOS application object is in OMF mode (as the result of being copied or imported) the title displayed in either iconic or the list view is the root portion of the source filename prefaced by the string "Copy of " or "Import from ". The title cannot be edited either via the on-screen editing in the iconic view or via the Attributes... dialog box.

When an MS-DOS application object is in MS-DOS mode and it is destroyed by the Waste Basket, a Waste Basket configuration option determines whether the referenced MS-DOS files are destroyed. Turning this option off (part of the Waste Basket's Settings... dialog) provides a way to unregister MS-DOS files from the NewWave environment.

Application and Data Binding and other NewWave Functions

When the encapsulated application object is opened, its appropriate data files are automatically loaded by specifying the appropriate command line parameters, or by sending a keystroke macro.

For winaps, the data file is saved and the application is closed using the application's existing Save and Close/Exit commands. It is important that the winap be consistent with Microsoft's application style guidelines for these functions to be reasonably consistent with the NewWave environment. Specifically, the application should prompt the user to confirm a data file being saved if the application is closed without an explicit file save being performed. Winaps must allow the data file to be loaded as a command line option.

For standard applications (oldaps) which operate in text mode, Windows 2.0 provides a completely configurable pop-up menu bar, similar to menus under Windows. The default items under the system menu, which are used for clipboard functions, are Mark, Copy and Paste. For encapsulated applications, additional menus and menu items can be configured for each application when it is installed. Each menu item invokes a keystroke macro to perform the desired function. Keystroke macros can also be invoked just prior to context switching out of the application (when the user types Alt-Tab). This configurable menu facility makes it possible to add NewWave-style Save and Exit functions to many encapsulated applications.

Object Containment with Encapsulated Applications

One of the powerful features of the Desktop's direct manipulation user interface is the ability to drag an icon and place it on top of another icon. The Desktop verifies that the target supports the CONTAINMENT_STATUS method, and if so, it initiates the appropriate OMF actions.

Encapsulated applications can also be inserted into other encapsulated application objects. A class property, defined at installation, specifies what class an object can be inserted into.

When an encapsulated application receives the OMF_INSERT message, the MS-DOS application is invoked, and makes the data filespec of the object being inserted available for use as a command line parameter or argument in a startup keystroke macro. Depending on the particular application, this can be used to initiate the appropriate actions in the MS-DOS application to access the source object's data.

The encapsulated application never actually accepts the OMF_INSERT message. Instead, after it has accessed the source object's data file, it returns a failure code. This ensures that the original source object is left intact. An encapsulated application cannot actually accept a child object, so if it did not refuse the OMF_INSERT, the source object would be lost.

Global MS-DOS Applications

Encapsulated applications can also be supported as global Desktop objects. In this case, there is either no data file, or a single data fileset is associated with the application. As global objects their operation is completely consistent with other NewWave global objects. The encapsulated global object has all of the same control features, including command line parameters and keystroke macros. A typical use of an encapsulated application as a global object is as a system service. This allows the encapsulated application to receive data or command files via an OMF_INSERT message generated when a user drags an appropriate data object to the icon of the global encapsulated application.

7 Agent Task Language

This chapter will be released shortly. It will be mailed to the address supplied on the "Update Reply Card".

A Programmer Guide Glossary

About... A command in the File Menu which displays copyright information and other status information in a popup window.

Action Processor. A procedure present in all NewWave applications whose purpose is to interpret the user's actions. The code for the Action Processor is unique to the particular application.

Activating Objects. The process of starting up an object's application without displaying its window to the user.

Agent. A *system object* that can perform tasks on behalf of the user, within and across applications, by executing *agent tasks*.

Agent Task. An object which stores, and allows the user to edit, a script written in Agent task language, which the *Agent* is to execute. Also see Embedded Task.

Agent's Desk. The object that organizes what the *Agent* is working on.

Annotation. A text or voice component which may be attached to a particular piece of data in a data object. May be implemented as an object, but is not modelled as such to the user.

API Components. Segments of code for using the API that supplied for developers. These can be plugged directly into applications.

Application. An application program that operates within NewWave, whether fully compatible or encapsulated. The executable code portion of an *object*.

Application Program Interface (API). The Application Program Interface provides the command interface to application programs used by the *Agent*. It supports User Actions, Commands, Interrogation Functions, and API Messages. Through the API, the application can access *help* and *embedded tasks*.

Application Architecture. Refers to the program structure that is recommended for all NewWave applications.

Attributes.... A Settings Menu command which allows the user to view and edit the generic attributes associated with the current object.

Blank Master. The template object that is supplied by the application designer as a prototype for new objects for a class. There is only one blank master per class; it cannot be removed from the system. The designer (or user) can supply other masters as well that can be removed. See Master. See User Master.

Categories of Support. Those capabilities that NewWave applications that employ the Agent must be able to support. Specifically NewWave applications must be able to support *playback* of tasks, *recording* of tasks, *intercepting* of messages, the *monitoring* of commands for CBT, and *error mode* in which errors are trapped.

CBT. See Computer-Based Training.

Child Object. An object that is connected to another object (the *parent*) by a *link*, and is either contained by the parent, or provides data to the parent. In order to exist, any *user object* must have at least one parent, and may have several; thus it is always a child object.

Class. Refers to an application program and general attributes, such as icons, objects, commands, etc. that are common to that application.

Class Dependent Commands. Task Language Commands that can be performed by your application.

Class Independent Commands. Task Language Commands that are interpreted by the Agent itself.

Class Independent Interrogation Functions. Task Language Commands involved with accessing data common to all object classes.

Class Properties. Those defined characteristics of objects that are common to a specific applications. See Properties and Object Properties.

Clear. An Edit Menu command which removes the contents from a region without deleting the region itself, leaving a blank space. Also see Delete.

Clipboard. That facility provided by Microsoft Windows that allows one piece of information at a time to be Cut, Copied, or Shared from one object, then Pasted into another object. Since only one thing at a time can be placed onto the Clipboard (though possibly in several formats), there is no need to identify the chunk of data by name. The system always assumes that what you put there is the item that you wish to Paste elsewhere. The OMF provides a number of functions which can enhance the Clipboard in the NeWave environment.

Close. A Microsoft Windows Control Menu command which closes the current object. In a *data object* Close does not automatically save the object's state, but puts up a dialog box if the user has made changes that have not yet been saved. Close in other objects (containers and annotations) saves automatically.

Closing Objects. The process of shutting down an object's application. Closing is the intermediate phase between making the object's window invisible and stopping the application.

Command. The operation an application performs based on one or more user actions.

Command Interface Component. Segment of code that receives an internal command as input, has the command translated to external form, and passes the external form of the command to the Agent.

Command Test Component. Segment of code that tests if a command has been generated and, if so, to pass the command on to the Command Processor for execution.

Command Processor. A procedure present in all NewWave applications whose purpose is to execute commands. The code for the Command Processor is unique to the particular application.

Composite Object. Another term for *compound object*.

Components. See API Components.

Compound Object. This is an object that uses information provided by a different object or objects, and which acts as their *parent*. Also see Container Object.

Computer-Based Training (CBT). Information provided by the system to help the user in learning to use the system, to increase user performance after initial learning, and/or to reinforce previous learning. CBT can be provided by a combination of tutorials, demonstrations, interactive lessons (in which the CBT system leads and monitors the user in the execution of an application program), and on-line documentation. Also see Help Information. Also refers to the facility which allows the user and the system to interact together during an interactive lesson.

Container Object. Object that is used primarily to contain or manipulate other objects. The File Drawer and file folders are examples of container objects. When a container object is opened, it shows icons or other representations of the objects that it contains, rather than the contents of those objects as a *compound data object* would.

Context-sensitive Help. Help messages that are provided directly for a single item and correspond to the user's current situation.

Control Menu. The menu provided in main windows and modeless dialog boxes which is activated by clicking on the "system icon" at the far left end ofthe menu bar. The Control menu primarily contains commands for manipulating the window or dialog box.

Convert... A File Menu command which allows transfer of data to and from DOS (or other) files.

Copy. To copy a selected area of data from an existing object, or to copy a selected object from a compound or container object to the *Clipboard*. Also see Drag Copy.

Copy to Desktop... A File Menu command which copies all of the object to a new object placed on the Desktop, without doing a Save. Required command for data objects.

Create A New... A File Menu command which allows creating a new object as an inclusion of the current object. Required for objects which can add children.

Create Text Annotation. A File Menu command which allows creation of text annotations within the current object.

Create Voice Annotation. A File Menu command which allows creation of voice annotations within the current object.

Creating Objects. The process of generating a new object, it involves clicking on the "Create a New..." command from the File Menu and selecting the desired object template.

Cut. An Edit Menu command used to copy a selected area of data from an existing object, or a selected object from a compound or container object to the *Clipboard*, and then remove it (by deleting or clearing) from the original location. Also see Copy and Drag Move.

DAL. See Dynamic Access Library.

Data ID. A token assigned by the child object to identify a part of itself being displayed or transferred. This ID is used as a parameter for identifying views in the OMF function calls made by the child object. The data ID is actually a 16-bit integer and is often simply an index into the table of source specifications belonging to the child. See Source Specification.

Data Object. Object that directly holds the user's data. These objects correspond to the data files of the traditional applications such as word processors and spreadsheets.

Data Passing View. A *view* through which data is sent from the child (source) object to the parent (destination) object, to be used by the parent. An example is a child spreadsheet object sending data to a parent chart object, which generates a chart from the data. Also see Visual View.

Data Transfer. The act of moving data from one place to another either via the *Clipboard* or by *direct manipulation* (*move* or *copy*). Also see Cut, Copy, Share, Paste, Drag Move and Drag Copy.

Data View. See Data Passing View.

DATALINK. The scope definition used to refer to visual or data-passing views as opposed to simple links. See Scope.

Default View. See Initial View.

Delete. An Edit Menu command which removes an item or block of data; if supported by the object class, it also removes the region which contained the data; also the [DEL] key on the keyboard. Also see Clear.

Deserialize. To convert a serial file back into an object by recomposing its data files and child objects.

Desktop. The Desktop is the central object in the NewWave system, and is the (apparent) container of all the other objects in the system. It is the first display a user sees when he loads the NewWave, and provides access to a number of system facilities. It is also used as the temporary target of some operations which create new objects, such as the *Copy to Desktop...* command.

Destination. See Destination Object below.

Destination Object. An object that is the *parent* of a *view*, that is, the object that receives the transferred information.

Destination Specification. The location within the parent object where the data from the view of a child object is to be displayed or used.

Destroying Objects. The process of removing an object from the system when the user no longer needs the object, either by itself or as part of a compound object. The user places the object in the Waste Basket and then empties it.

Direct Manipulation. The ability of the user to control the operation of a system or application by manipulating displayed representations of the actual items (by clicking, dragging, etc.). Such manipulations include moving, sizing, stretching, or any other continuous manipulation of a displayed object.

Drag Copy. A direct manipulation copy of the current selection, performed with the mouse. The user actions are the same as for a *drag move* except that the Ctrl key is used at the time the mouse button is pressed to make a copy of the selected item(s).

Drag Move. A direct manipulation move of the current selection, performed with the mouse. The user presses mouse button 2 while pointing at the selection, and then drags either a representation of the selection or a special cursor to the desired destination. When the button is released, the move is completed.

Dynamic Access Library. Special executable code that is stored in a separate library that is associated with a snapshot. Also referred to as a *dynamic access object* or *DAL*. See Dynamic Access Object. See Snapshot.

Dynamic Access Object. An object which has a dynamic access library instead of the code of an application. A dynamic access object is best thought of as a library that binds together the object's data and operations on that data, such as reading, writing, and displaying. See Dynamic Access Library. See Snapshot.

Embedded Task. An *agent task* stored within an object, accessed via that object's Task Menu.

Encapsulated Application. Refers to an existing application program that can operate within the NewWave structure but cannot be made fully compatible. Synonymous with integrated application.

Error Mode. The mode used to pass errors inside your application to the Agent instead of the user.

External Command Form. The version of a Task Language Command that is passed to the API. It consists of binary data understood by the application only. See Internal Command Form.

External DAL Interface. The interface between an object and a dynamic access object that the object uses to send a message to, activate, or free the dynamic access object. See Dynamic Access Library. See Dynamic Access Object. See View. See Internal DAL Interface.

FastProperties. A special type of object property that allows certain properties to be returned as a group when called the FastProperties property is read.

File Drawer. The File Drawer is an example of a system container which, like the Desktop, does not process its contents.

File Folders. Container objects. Both the system and the user can create, manipulate and destroy file folders.

GLOBAL. A scope definition used by an object to refer to one of the system objects, such as the File Drawer, Waste Basket, the OMF Clipboard, the Agent, etc. A given global name always refers to the same system object no matter who uses it. See Scope.

Graying. Reducing the apparent contrast between a region or item and the background either by changing the item's color to one "nearer" to the background color, or by overpainting the region with a background-colored stipple pattern. Graying is used to indicate that the item is present but not available in the current context or state.

Help Connection. An application is connected to the NewWave Help subsystem if it was the last application to access it. There can be only one application connected to the Help subsystem at a time.

Help Index. The help index lists all topics such as commands, options, specifications, and error recovery messages that are accessible to the user.

Help Information. Information provided by the system that describes the operational characteristics of the software or hardware necessary to accomplish user tasks in an efficient and error-free manner. The primary purpose of Help is to provide assistance in the execution of current user tasks, though it can also aid in learning to use the system. Also see Help Text and Computer-Based Training.

Help Subtopic. A help subtopic is an inclusion under a *help topic*. For example, if a topic name is *File Commands*, then the subtopics might be *Save, Copy to Desktop..., Open, Create a New...* and so on. These items may be shown indented from the *help topics*.

Help Text. The collection of all the indexed *help topics* provided by the application to the Help subsystem. A particular form of *help information*.

Help Topic. A help topic is defined as an index item which may have *help subtopics* defined under it. It is always a top level index item, i.e., one that is not indented in the index.

Initial View. The view that is created when the user has not specified any particular part of the child object to be transferred. This occurs when an icon is pasted or moved into the parent's window, or when a new object is created within a parent object. Synonymous with *default view*. See View

Insert. An Edit Menu command which inserts an empty row, column, or block in a list or table. Also, the [Ins] key on the keyboard.

Integrated Application. Refers to an existing application program that can operate within the NewWave structure but cannot be made fully compatible. Synonymous with encapsulated application.

Intercept Mode. The mode set while the user requests context-sensitive help. The user selects "Screen Help", and moves the "question mark" cursor to the item and clicks the mouse.

Internal Command Form. The version of a Task Language Command that is used totally within an application. These commands are represented internally in any form convenient for the developer, as long as the necessary processors are present to translate back and forth between the internal and external forms. See External Command Form.

Internal DAL Interface. The interface between a dynamic access object and the OMF, that the dynamic access object uses to receive and process messages from the OMF and other objects. See Dynamic Access Library. See Dynamic Access Object. See View. See Internal DAL Interface.

Library Message. A message processed by a Dynamic Access Library, as opposed to an application.

Link. A connection between a *parent object* and a *child object*. Also see View.

List to Printer... A command which prints the information about the content of a container object in list format.

Manage Links... A File Menu command which displays a dialog box with commands to manage links between objects. Required in user objects. Also see Show Links... .

Master. An object that is used as a template for creating new objects by the "Create a New" dialog box. There are two types of masters: blank masters and user masters. See Blank Master. See User Master.

Maximize. A Microsoft Windows Control Menu command which makes a window expand to a specified maximum size.

Message. The means of communication between objects and facilities in the NewWave Environment. Messages are transamitted via Microsoft Windows. A message has three parts: the message type, a word parameter *wParam*, and a long parameter *lParam*. The type indicates the type of request to the receiver. The parameters are used in various ways to carry information. See Library Message. See View Message.

Message Procedure. The procedure to handle library messages sent to the dynamic access library. See Dynamic Access Library.

Method. The code that an object executes in response to a specific type of message. See Message.

Minimize. A Microsoft Windows Control Menu command which turns a window into a "Window icon" (logically, simply a small window).

Modal Dialog Box. A kind of dialog box which requires user attention before he can continue. Application-modal boxes allow the user to use other applications, but system-modal boxes do not. Also see Modeless Dialog Box.

Modal Dialog Box Test Component. Segment of code that tests if the user has performed an action that requires a modal dialog box.

Modeless Dialog Box. A kind of dialog box which allows the user to continue working with any application, including the one which produced the box, while the box is up. Also see Modal Dialog Box and Semi-Modal Dialog Box.

Monitor Mode. The mode in which the commands generated by a user are passed to CBT for approval prior to execution.

Move. In general, the act of changing the location of an object or item by means of an input device. Also see Drag Move.

Also, a Microsoft Windows Control Menu command which allows the user to move a window.

New Data Announced Flag. The flag within the OMF View Specification that indicates that the source object change is complete but that when the new data was announced for this view, the parent object was inactive. See View Specification.

New Data Marked Flag. The flag within the OMF View Specification that indicates that new data has been marked for this view but not yet announced. It essentially means that a change to the source object is in progress. See View Specification.

NULLSCOPE. The scope definition that indicates an error condition. NULLOBJECT is a pre-defined name for this scope. Calling OMF_Assign to assign NULLOBJECT to a persistent or datalink name enables the parent object to delete the links to its children. NULLOBJECT and NULLSCOPE do not equal NULL however. See Scope.

Object. An entity which comprises data (stored in zero or more data files) and the name of an executable file that knows how to interpret those data files. Also see Data Object, User Object and Compound Object.

Object Management Facility (OMF). The collection of system routines that allows objects to exist and be manipulated under the NewWave system. The Object Management Facility keeps track of objects and allows objects to communicate with each other.

Object Manipulation. See Direct Manipulation.

Object Properties. Those defined characteristics of objects that are unique to an individual object. See Properties and Class Properties.

OMF. See Object Management Facility.

OMF Messages. Messages involving the OMF used for general object management tasks.

OMF View Specification. The portion of the view specification that is maintained by the OMF. It consists of the *data ID*, *textual data ID*, *view class*,

*snapshot indicator*, the *new data announced flag*, the *new data marked flag*, *snapshot out-of-date flag*, and the *want messages* flag. See View Specification.

On-Line Training. See Computer-Based Training.

Open. A File Menu command which opens the selected object.

Opening Objects. The process of starting up an object's application and displaying its window to the user, while graying its icon.

PARAMETER. The term "PARAMETER" has a special meaning within NewWave. It is the scope definition used to allow the name of an object to be passed as a parameter to a message. See Scope.

Parent Object. An object that is either a container (e.g., file folder) or a compound object; it includes at least one other object, called a *child object*. A parent object may have many children, and vice versa.

Paste. An Edit Menu command which transfers the contents of the *Clipboard* to a selected point or area in the object. (Used with *Cut*, *Copy*, or *Share*.)

Paste Special... An Edit Menu command which allows application-specific options for pasting.

Pcode Command Form. The binary version of the external command form that is stored in the Agent Task appended to instructions that enable the Agent to replay the command.

PERSISTENT. A scope definition that objects use to name their own children in a simple link, i.e., a container relationship. The term persistent refers to the fact that the name persists as long as the relationship is in existence. Persistent names are only usable by the parent who assigned them. Persistent name X used by one object does not necessarily refer to the same object as persistent name X used by a different object. See Scope.

Playback. The execution of an Agent Task by your application working in tandem with the API.

Playback Message Test Component. Segment of code that tests if a message to be processed is a playback message.

Print... A File Menu command which within a data object, prints all or some of the object. Within a container, it prints the selected object(s).

Processor. This refers to certain procedures required for all NewWave applications. A processor has the same defined purpose in all applications but is written by the application developer and is thus unique to the application.

Properties. Certain defined characteristics of objects. Those that are common to a specific applications are *class properties*. Those that are unique to an individual object are *object properties*. See Class Properties and Object Properties.

Record Mode. The mode in which the user performs actions and your application translates them into commands to be stored in an Agent Task.

Redo. An Edit Menu command which reverses the most recent *Undo*, in effect undoing the undo. In an object with single-level undo, *Redo* alternates with *Undo* in a single *toggling* menu item.

Reference Name. A 32-bit number used to identify an object. Persistent and datalink scope names are used by a parent object to identify its child objects. Other scopes allow different ways of identifying objects. See Scope.

Related Help Topic. In *help text*, a topic that is in some way related to the currently displayed *help topic*. Generally a user would access related help topics by selecting words embedded in the help text.

Restore. A Microsoft Windows Control Menu command which restores original size after a *Maximize* or *Minimize* command.

Return Interface Component. Segment of code that tells the Agent that the command is complete and has been executed and that the application is ready for the next command. It is only appropriate if the application is in Playback Mode or Record Mode.

Save. A File Menu command which allows periodic saving of the current object. Required for data objects, but implicit for nondata objects and annotations.

Scope. The first 3 bits (highorder bits 31, 30, 29) of the reference name (type OBJECTNAME). They are used to furnish additional information concerning the object, the link, or the object's usage, depending on the nature of the function call and object. The three scope bits define how the remaining 29 bits in OBJECTNAME are to be interpreted. See Reference Name.

Select All. An Edit Menu command which selects all of the data in the current object (or in the current *data domain* of the current object).

SELF. The scope definition that refers to the object itself that is making a particular OMF call. The SELF scope causes the low 29 bits to be ignored. See Scope.

Serial File. A single data stream that is produced by serializing an object. This file can be deserialized to obtain a copy of the original object.

Serialize. To convert an object's data, including any child objects, into a form suitable for serial transmission to a remote location. At this remote location, the serial file is converted back into a copy of the original object. See Deserialize.

Services. Objects that act on data objects or compound objects. Examples of services are SPIN (the print spooler) and Mail.

Share. An Edit Menu command which prepares the system to establish a *view* between a selected data area of the current object (the source) and another existing object (the destination), or to establish a *simple link* between a complete object (a child of the current object) and another existing object. Share puts a reference to the selected information on the *Clipboard*. When a *view* has been established, future changes to the shared data in the source object are automatically made available to the destination object.

Show Links... A File Menu command which displays a dialog box showing the links between this object and the objects that contain it, that receive data from it (both parents) and from which it receives data (children). Also see Manage Links... .

Simple Data Object. A data object that contains "homogeneous" data, that is, all of the data is bound to the same application and can be edited without references to other objects.

Simple Link. A link that connects a container object to its children.

Size. A Microsoft Windows Control Menu command which allows the user to change the size of the window.

Snapshot. A special type of object that is associated with a separate executable file (referred to as a *dynamic access library*) instead of the full application code. A snapshot serves as an "intelligent buffer" for the data being displayed or transferred with a view. See Dynamic Access Library. See View.

Snapshot Indicator. The part of a view specification that indicates if a snapshot is attached to the view.

Snapshot Out-of-Date Flag. The flag within the OMF View Specification that indicates that the snapshot's contents are not up-to-date. This flag is set by the source object. See OMF View Specification.

Source. See Source Object below.

Source Object. An object that is the *child* of a *view*, that is, the object that provides the information that is to be transferred. See Destination Object.

Source Specification. A data structure that describes the part of the child object to be displayed (in the case of a visual view) or transferred (as in a data passing view).

SPIN. The NewWave printer spooler service object.

System Container Objects. System objects that generally exist to perform some operation on the objects they contain or to hold objects created by the system itself (as well as user objects). See System Objects below.

System Objects. System Objects represent fixed resources in the system, and cannot be created, copied or deleted by the user. The Desktop and the File Drawer are examples of system container objects; also see Tool Object.

System Tool. A system object that is a general utility application, such as a calculator or a popup calendar. See System Object above.

Task Language Form. The form of a command that is displayed to the user.
Telescoping. The animated displaying of a series of rectangular images from the original to the final position of an object being opened or closed.

Terminating Objects. The final step in the process of shutting down an application after the object's window has been made invisible. This occurs when the OMF determines that no other active object in the system currently wishes to communicate with the closed object. See Closing Objects.

Textual Data ID. A string that can be displayed to the user for the purpose of identifying the information being displayed or transferred with a view. It is up to 32 characters and is supplied by the child object.

Tool Object. A *system object* that is not a *container object*. A calculator, a terminal and some kinds of encapsulated applications are examples of system tool objects.

Translate to External Processor. A processor whose purpose is to take an external command as input and returns an internal command.

Translate to Internal Processor. A processor whose purpose is to take an internal command as input and returns an external command.

Undo. An Edit Menu command which undoes the last "significant" user action. *Undo* alternates with *Redo*.

Update Destinations. A File Menu command which causes the current data to be sent to all parents of the current object which are connected via *views*. Required in any data object that supports *Share*.

User Action. The action a user takes to interact with an application. For example, pressing a key, moving the mouse, or clicking the mouse button.

User Action Interface Component. A segment of code provided that tests whether the user is accessing one of the API facilities.

User Action Messages. Messages generated by the user, usually from mouse movements, mouse clicks, menu selections, keystrokes, etc.

User Container Objects. A *user object* which is a *container*. The only current NewWave examples are file folders and envelopes.

User Master. An object that is created by a user (or the application designer) that is copied to create new objects by the "Create a New" dialog box. As opposed to blank masters, a user master can be removed from the system. See Blank Master. See Master.

User Object. A user object can be freely created, copied, mailed and destroyed by the user. It generally represents the information with which the user is working, such as a document, drawing or spreadsheet, or a container such as a folder or an envelope.

View. A kind of *link* between two objects where either (a) actual data is sent over the link, from the child object to the parent object (a *data passing view*), or (b) the child object renders a visual representation of itself on the display or printer at the request of the parent (a *visual view*). "Data" in this context does not include the title or the icon of the child object, which do not require the use of a view.

View Class. A defined category of the operations that a parent object can request a view to perform. See View Methods.

View Message. A message that is sent to a view to request some operation on the viewed data, such as display or retrieval. The OMF routes view messages either to the source object of the view, or to the view's snapshot, depending on the contents of the OMF View Specification.

View Methods. The code executed in a source object or a snapshot to process a *View Message*.

View Specification. Attributes of a view that specify which part of the source (child) object is referenced, where it is placed in the destination (parent) object, and the *OMF View Specification* which keeps track of the status of the view.

Visual View. A kind of *link* between two objects in which the child (source) object renders a visual representation of the shared part of itself onto the display or printer at the request of the parent object. An example is a figure in a document object. See also Data Passing View.

Want Messages Flag. The flag within the OMF View Specification that indicates what the OMF should do with view messages when the snapshot is out-of-date. This flag is set by the source object. See OMF View Specification.

Windows Housekeeping Messages. Messages generated by Microsoft Windows, generally for housekeeping tasks involving the screen, such as painting windows.

B HPSHAPE Listing

```
/**************************************************************************/
/*                                                                        */
/*                              HPSHAPE.C                                 */
/*                                                                        */
/*                       HPSHAPE SAMPLE APPLICATION                       */
/*                                                                        */
/*                        Application Source File                         */
/*                                                                        */
/*                         5010-4100  A.00.00                             */
/*                           Feb 24, 1988                                 */
/*                                                                        */
/*                                                                        */
/*                 written for OMF A.00.00, API A.00.00                   */
/*                                                                        */
/*              COPYRIGHT (c) HEWLETT-PACKARD COMPANY 1988                */
/*                                                                        */
/**************************************************************************/

/**************************************************************************/
/*              Includes and API Recorded Command Structure               */
/**************************************************************************/
```

```
#include "hpshape.h"

#include <fcntl.h>
#include <types.h>
#include <stat.h>
#include <stdlib.h>
#include <string.h>
#include <stdio.h>
#include <io.h>

/* Define structure for PROP_LASTLOCATION to store last screen location */
typedef struct {
    RECT rcRect;
    BOOL bMaximized;
    BOOL bMinimized;
} LASTLOCATION;

/*  Define structure the API uses for recording commands                */
/*  This external format is specific to HPShape program                 */

typedef struct {
    WORD wLen;          /* Length of one command and associated params */
    WORD wCmd;          /* The command itself */

    struct  {
        int      XCmd; /* Numerical value of the command */
    } external;

} APICMDSTRUCT, *PAPICMDSTRUCT;
/* Now define the structure used for internal commands                  */

typedef struct {
    WORD  wCmd;

    struct  {
        int        ICmd;      /*   Command                               */
    } internal;

} INTCMDSTRUCT, *PINTCMDSTRUCT;

/* Now include API header file (need definition of APICMDSTRUCT first)  */

#include "nwapi.h"

/**********************************************************************/
/*                          Global Variables                          */
/**********************************************************************/

APIERRTYPE          gapplErr;  /* global error for API calls           */
HANDLE              ghInst;    /* what instance of the applic          */
HWND                ghWnd;     /* handle to objects window             */
OMFHND              ghOMF;     /* OMF handle to object                 */
APIHND              ghAPI;     /* API handle to object                 */
APIMODEFLAGSTYPE    gAPIModeFlags; /* contains mode flags for API      */
char                gShapeFile[MAXROOTFILENAMELENGTH+1];
                               /* contains name of object's data files. */
char                gszCaption[MAXCAPTIONLENGTH];
                                      /* used for the caption of object */
char                gszObjTitle[MAXTITLE+1];     /* title of the object */
LASTLOCATION        gWinPosn;

int     gnShape = SHAPE_STAR;

POINT   TrianglePoints[] = {{0, 0}, {50, 100}, {100, 0}, {0, 0}};
POINT   StarPoints[]     = {{100, 75}, {0, 75}, {80, 0}, {50, 100},
                            {20, 0}, {100, 75}};


/**********************************************************************/
/*                        Forward Declarations                        */
/**********************************************************************/

/* Basic Windows Routines                                              */
BOOL PASCAL         ShapeInit(HANDLE);
void PASCAL         ShapeCreateWindow(void);
long FAR PASCAL     ShapeWndProc(HWND, unsigned, WORD, LONG);
void PASCAL         ShapePaint(HWND, LPPAINTSTRUCT);
int  PASCAL         WinMain(HANDLE, HANDLE, LPSTR, int);
```

```
/* OMF/API Processors                                                       */
long PASCAL         MessageFromOMF(HWND, WORD, LONG);
long PASCAL         InterrogateFromAPI(WORD, LONG);
void PASCAL         ActionProcessor (HWND, unsigned, WORD, LONG,
                                     PINTCMDSTRUCT, LONG *);
void PASCAL         CommandProcessor (HWND, unsigned, WORD, LONG,
                                     PINTCMDSTRUCT, LONG *);
void PASCAL         TranslateToInternalProcessor(unsigned, WORD, LONG,
                                     PINTCMDSTRUCT);
void PASCAL         TranslateToExternalProcessor(PINTCMDSTRUCT,
                                     PAPICMDSTRUCT);
long PASCAL         HasMethod(unsigned);

/* View-handling Routines                                                   */
BOOL PASCAL         InitView(HANDLE);
HANDLE PASCAL       GetSize(HANDLE);
BOOL PASCAL         DisplayView(HANDLE);
long PASCAL         CopySelf(HWND, HANDLE);

/* Utilities                                                                */
BOOL PASCAL         ReadDataFile(void);
void PASCAL         SaveDataFile(LPSTR);
void PASCAL         NoteError(void);
void PASCAL         SaveWindowPosition(HWND);

/****************************************************************************/
/*                              WinMain                                     */
/*                                                                          */
/* Initial procedure called by windows - initializes, open window,          */
/* receives messages, translates messages and accelerators, and            */
/* dispatches the message for handling by ShapeWndProc.                     */
/****************************************************************************/

PASCAL WinMain(hInstance, hPrevInstance, lpszCmdLine, cmdShow)
HANDLE      hInstance, hPrevInstance;
LPSTR       lpszCmdLine;
int         cmdShow;
{
    APIACCELTABLETYPE    APIAccelTable;
    MSG                  msg;

    /* is this the first instance of the application */
    if (!hPrevInstance)

     /* this is the first instance - init variables such as pen,icon */
       if (!ShapeInit(hInstance))
         exit(1);

    /* load the accelerators for the API only */
    APIAccelTable = APILoadAccelerators();
    if (APIAccelTable == NULL)
       exit(1);

    /* store the instance of this application in a global variable*/
    ghInst = hInstance;

    /* Create a window instance  - this will return back a handle to window */
    ShapeCreateWindow();

    /* if there was and error in creating the window */
    if (ghWnd == NULL)
       exit(1);

    /* OMF initialization  - register the window with the OMF*/
    /* and also retrieve the root file name of objects data files */

    ghOMF = OMF_Init(ghWnd, lpszCmdLine, (LPSTR)gShapeFile);
    /* if any type of error occured  - ie out of memory */
    if (ghOMF <= 1) {
       DestroyWindow(ghWnd);
       exit(1);
       }

    /* handle to API not yet initialized */
    ghAPI = NULL;

    /* Quit message will terminate application */
    /* go into the normal windows messaging loop */
```

```
      while (GetMessage((LPMSG)&msg, NULL, 0, 0)) {
         if (!TranslateAccelerator(ghWnd, APIAccelTable, (LPMSG)&msg) ) {
            TranslateMessage((LPMSG)&msg);
            DispatchMessage((LPMSG)&msg);
            }
         }
      return(0);
   } /* end of WinMain */

/*********************************************************************/
/*                              ShapeInit                            */
/*                                                                   */
/* Initializes HPSHAPES' window. - only called  for the first instance */
/* of apl                                                            */
/*********************************************************************/

BOOL PASCAL ShapeInit(hInstance)
HANDLE     hInstance;
{
    WNDCLASS   HPShapeClass;

    /* We don't care about these values, but they must be 0 */
    HPShapeClass.cbClsExtra = 0;
    HPShapeClass.cbWndExtra = 0;

    /* GET all the necessary resources for this CLASS */

    /* load in the cursor */
    HPShapeClass.hCursor = LoadCursor(NULL, IDC_ARROW);
    if (HPShapeClass.hCursor == NULL)
       return(FALSE);

    /* load in the icon */
    HPShapeClass.hIcon = LoadIcon(hInstance, MAKEINTRESOURCE(HPSHAPE_ICON));
    if (HPShapeClass.hIcon == NULL)
       return(FALSE);

    /* menu name, class name, colors */
    HPShapeClass.lpszMenuName  = MAKEINTRESOURCE(HPSHAPE_MENU);
    HPShapeClass.lpszClassName = (LPSTR)"HPShape";
    HPShapeClass.hbrBackground = GetStockObject(WHITE_BRUSH);
    if (HPShapeClass.hbrBackground == NULL)
       return(FALSE);

    HPShapeClass.hInstance   = hInstance;
    HPShapeClass.style       = CS_VREDRAW | CS_HREDRAW;
    HPShapeClass.lpfnWndProc = ShapeWndProc;

    /* register this new class with WINDOWS */
    if (!RegisterClass((LPWNDCLASS)&HPShapeClass))
       return(FALSE);   /* Initialization failed */

    return(TRUE);    /* Initialization succeeded */
  }  /* end of ShapeInit */
/*********************************************************************/
/*                         ShapeCreateWindow                         */
/*                                                                   */
/* Creates the window to be used by HPSHAPE.  Makes it a NW window.   */
/*********************************************************************/

void PASCAL ShapeCreateWindow()
{
   /* this procedure is called for each instance of an application */
   /* create the window and return back a handle to the window    */
   ghWnd = NW_CreateWindow((LPSTR) "HPShape",
                        (LPSTR) "",
                        WS_OVERLAPPEDWINDOW,
                        (short) CW_USEDEFAULT,  /*  x - top left coordinate  */
                        NWCW_STAGGERPOS,        /*  y                        */
                        (short) CW_USEDEFAULT,  /* cx - preferred width      */
                        0,                      /* cy - preferred height     */
                        (HWND)NULL,             /* no parent                 */
                        (HMENU)NULL,            /* use the window class menu */
                        (HANDLE)ghInst,         /* handle to window instance */
                        (LPSTR)NULL             /* no params to pass on      */
                        );

} /* End of ShapeCreateWindow */
```

```
/**************************************************************************/
/*                            ShapeWndProc                               */
/*                                                                        */
/* Main procedure to handle all messages sent to HPSHAPE.                */
/**************************************************************************/

long FAR PASCAL ShapeWndProc(hWnd, message, wParam, lParam)
HWND            hWnd;
unsigned        message;
WORD            wParam;
LONG            lParam;
{
    APIRTNTYPE       applRtn;  /* used as a return value */
    APICMDSTRUCT     extCmd;   /* the external command struc for apl */
    INTCMDSTRUCT     intCmd;   /* the internal command struc for apl */

    /* function called for windows that are created with             */
    /* NW_CreateWindow to specially handle some messages             */

    if (NW_MessageFilter(hWnd, message, wParam, lParam, (LONG FAR *) &applRtn))
        return (applRtn);

    /* is API to intercept messages or has an API menu item been seleceted */
    /* such as the help or the task */

    if (APIInterceptOn(gAPIModeFlags) || APIHaveMenu (message, wParam)) {
        /* is this a message for the API - may set certain flags */
        APIUserActionInterface(ghAPI, hWnd, (LPAPIUNSIGNED)&message, wParam,
                               lParam, API_NO_MODE);
        }

    applRtn = (APIERRTYPE)0L;
    /* is there stil' a command to be handled or did APIUserAct.. take it */
    if (APIHaveMessage (message)) {
        intCmd.wCmd = API_NO_CMD;

        /* are we currently playing back a message or recorded task */
        if (APIPlaybackMsg(message))
            /* translate to the internal format of the application */
            TranslateToInternalProcessor(message, wParam, lParam, &intCmd);
        else
            /* you are in record mode or a user interactive command */
            ActionProcessor(hWnd, message, wParam, lParam, &intCmd,
                            '&applRtn);

        /* is there a command that was created in the action processor */
        /* that need to be executed */
        if (APIHaveCommand(intCmd.wCmd)) {

            gapplErr = API_NO_ERR;

            /* are we in  a CBT */
            if (APIMonitorOn(gAPIModeFlags)) {
                /* set to external language and pass the external */
                /* form of the command to the Agent */

                TranslateToExternalProcessor(&intCmd,&extCmd);
                APICommandInterface(ghAPI, (LPAPICMDSTRUCT)&extCmd,
                                    API_NO_MODE);
                /* the internal command must be cancelled if the          */
                /* APICommandInterface or APIClgCommandInterface has      */
                /* nullified the command                                  */
                if (extCmd.wCmd == API_NO_CMD)
                   intCmd.wCmd = API_NO_CMD;
                }
            /* has  the command been formed  and has to be executed */
            if (APIHaveCommand(intCmd.wCmd))
                /* perform the command */
                CommandProcessor(hWnd, message, wParam, lParam, &intCmd,
                                 &applRtn);

            /* is a command being played back or being recorded */
            if (APIPlaybackOn(gAPIModeFlags) || APIRecordOn (gAPIModeFlags)) {
                if (APIRecordOn(gAPIModeFlags)) {
                    /* translate to ext lang and tell Agent that command */
                    /* is complete and ready for next command */
                    TranslateToExternalProcessor(&intCmd,&extCmd);
                    APIRecordInterface(ghAPI,(LPAPICMDSTRUCT)&extCmd,
```

```
                                        API_NO_MODE);
                    }
                /* return control back to the user */
                APIReturnInterface(ghAPI, gapplErr, API_NO_MODE);
                }

            } /* EndIf of APIHaveCommand */

        }  /* EndIf of APIHaveMessage */

    return(applRtn);

} /* End of ShapeWndProc */

/**************************************************************************/
/*                      TranslateToInternalProcessor                      */
/*                                                                        */
/* Take the external command from the buffer at handle LOWORD(lParam)     */
/* and change its value into the internal command format.                 */
/**************************************************************************/

void PASCAL  TranslateToInternalProcessor(message, wParam, lParam, intCmd)
unsigned        message;
WORD            wParam;
LONG            lParam;
PINTCMDSTRUCT intCmd;
{

    LPAPICMDSTRUCT extCmd;      /* pointer to the external command struct */

    /* get the pointer to the external command structure */
    extCmd = (LPAPICMDSTRUCT)GlobalLock(LOWORD(lParam));
    if (extCmd == NULL) {
        NoteError();
        return;
        }
    /* set the internal command to be that of the external command */
    /* in this case the command is a new_shape */
    intCmd->wCmd = extCmd->wCmd;

    /* what is the external command that has to be translated and put */
    /* into an internal command that can be executed  by the applic. */
    /* what type of shape  */
    switch(extCmd->external.XCmd) {

       case R :  intCmd->internal.ICmd = SHAPE_RECTANGLE;
                 break;

       case E :  intCmd->internal.ICmd = SHAPE_ELLIPSE;
                 break;

       case T :  intCmd->internal.ICmd = SHAPE_TRIANGLE;
                 break;

       case S :  intCmd->internal.ICmd = SHAPE_STAR;
                 break;

       case C :  intCmd->internal.ICmd = SHAPE_NONE;
                 break;

       default:
                 break;
       }

    GlobalUnlock(LOWORD(lParam));

} /* end of TranslateToInternalProcessor */

/**************************************************************************/
/*                   TranslateToExternalProcessor                         */
/*                                                                        */
/* Convert the internal command format into the external command format.*/
/**************************************************************************/

void PASCAL  TranslateToExternalProcessor(intCmd,extCmd)
PINTCMDSTRUCT intCmd;
PAPICMDSTRUCT extCmd;
{
```

```
/* what command is stored internally - in this case NEW_SHAPE */
/* place this command in the external structure */
extCmd->wCmd = intCmd->wCmd;

/* what is the internal command and put into the external command */
/* language  - what are the parmeter associated with the command  */
/* in this case we know it is a command for a new shape but what  */
/* shape */
switch (intCmd->internal.ICmd) {

   case SHAPE_RECTANGLE :   extCmd->external.XCmd = R;
                            break;

   case SHAPE_ELLIPSE   :   extCmd->external.XCmd = E;
                            break;

   case SHAPE_TRIANGLE  :   extCmd->external.XCmd = T;
                            break;

   case SHAPE_STAR      :   extCmd->external.XCmd = S;
                            break;

   case SHAPE_NONE      :   extCmd->external.XCmd = C;
                            break;

   default:                 break;
}

/* set the size of the command */
extCmd->wLen = sizeof(APICMDSTRUCT);

} /* end of TranslateToExternalProcessor */

/*************************************************************************/
/*                           ActionProcessor                             */
/*                                                                       */
/* Handle all of the user actions - set up intCmd for Command Processor */
/*************************************************************************/

void PASCAL  ActionProcessor (hWnd, message, wParam, lParam, intCmd,
                              pRtn)
HWND           hWnd;
unsigned       message;
WORD           wParam;
LONG           lParam;
PINTCMDSTRUCT  intCmd;
LONG           *pRtn;     /* the return value of the procedure */
{
   PAINTSTRUCT        ps ;      /* the paint structure */

   /* this routine actually builds a command */
   switch (message) {

      /* was a paint message sent to update the screen */
      case WM_PAINT:
         BeginPaint   (hWnd, (LPPAINTSTRUCT)&ps);
         ShapePaint(hWnd, (LPPAINTSTRUCT)&ps);
         EndPaint     (hWnd, (LPPAINTSTRUCT)&ps);
         break;

      /* was there a menu selection */
      case WM_COMMAND:
         /* was the close option chosen */
         if (wParam == IDDCLOSE)
            intCmd->wCmd = API_CLOSE_WINDOW_CDCMD;
         else {
            /* something was selected from the shape menu */
            intCmd->wCmd = NEW_SHAPE;
            intCmd->internal.ICmd = wParam;
            }
         break;

      /* the window being closed */
      case WM_CLOSE:
         intCmd->wCmd = API_CLOSE_WINDOW_CDCMD;
         break;
```

```
                /* selection from system menu or minimize/maximize */
                case WM_SYSCOMMAND:
                    switch (wParam & 0xFFF0) {
                        case SC_MINIMIZE:
                            intCmd->wCmd = API_MINIMIZE_WINDOW_CDCMD;
                            break;

                        case SC_MAXIMIZE:
                            intCmd->wCmd = API_MAXIMIZE_WINDOW_CDCMD;
                            break;
                     /* request for restoring previous coordinates */
                     case SC_RESTORE:
                         intCmd->wCmd = API_RESTORE_WINDOW_CDCMD;
                         break;

                     default:
                         /* let windows handle it */
                         *pRtn = DefWindowProc(hWnd, message, wParam, lParam);
                         break;

                     }  /* End of case WM_SYSCOMMAND */
                 break;

            case API_INTERROGATE_MSG:

                /* The message has come via the API */
                *pRtn = InterrogatefromAPI(wParam, lParam);
                break;

            case  API_SET_MODE_FLAGS_MSG:
                if (wParam == API_SET_MODE_ON_FLAG)
                    gAPIModeFlags = gAPIModeFlags | lParam;
                else
                    gAPIModeFlags = gAPIModeFlags & lParam;
                break;

            case WM_OMF:

                /* The message has come via the OMF */
                *pRtn = MessageFromOMF(hWnd, wParam, lParam);
                break;

            default:
                *pRtn = DefWindowProc(hWnd, message, wParam, lParam);
                break;
            }
    }  /* end of action processor */

/***************************************************************************/
/*                          CommandProcessor                               */
/*                                                                         */
/* Handle any of the commands passed from the Action Process or API        */
/***************************************************************************/

void PASCAL   CommandProcessor (hWnd, message, wParam, lParam, intCmd,
                                 pRtn)
HWND          hWnd;
unsigned      message;
WORD          wParam;
LONG          lParam;
PINTCMDSTRUCT intCmd;
LONG          *pRtn;          /* application return error code */
{
    HMENU               hMenu;
    RECT                rcRect;

    switch (intCmd->wCmd) {

        case API_MINIMIZE_WINDOW_CDCMD:
            if (IsIconic(hWnd))
                NW_Restore(hWnd);
            else {
                if (!IsZoomed(hWnd))
                    GetWindowRect(hWnd, (LPRECT)&gWinPosn.rcRect);
                NW_Minimize(hWnd);
                }
            break;
```

```
                case API_MAXIMIZE_WINDOW_CDCMD:
                    if (IsZoomed(hWnd))
                        NW_Restore(hWnd);
                    else {
                        if (!IsIconic(hWnd))
                            GetWindowRect(hWnd, (LPRECT)&gWinPosn.rcRect);
                        NW_Maximize(hWnd);
                        }
                    break;

                case API_RESTORE_WINDOW_CDCMD:
                    NW_Restore(hWnd);
                    break;

                case API_CLOSE_WINDOW_CDCMD:
                    SaveWindowPosition(hWnd);
                    GetWindowRect(hWnd, (LPRECT) &rcRect);
                    ShowWindow(hWnd, SW_HIDE);
                    UpdateWindow(hWnd);
                    APINotReady(ghAPI, API_NO_MODE);
                    if (!OMF_Closing(ghOMF, (LPRECT) &rcRect))
                        NoteError();
                    break;

            case NEW_SHAPE:
                /* get the handle to the menu of the current window */
                hMenu = GetMenu(hWnd);

                /* Uncheck the old menu item */
                CheckMenuItem(hMenu, gnShape, MF_UNCHECKED);

                /* check the new menu item */
                if ((gnShape = intCmd->internal.ICmd) != SHAPE_NONE)
                    CheckMenuItem(hMenu, gnShape, MF_CHECKED);

                /* send a paint message */
                InvalidateRect(hWnd, (LPRECT)NULL, TRUE);
                UpdateWindow(hWnd);  /* Force repaint for every shape, not
                                        just last shape, when playing back
                                        several NEW_SHAPE commands */

                /* are there views of the shape program in any other object */
                /* set the new_data flag for all views of shapes */

                if (OMF_SetNewData(ghOMF, 0))   {
                    /* notify the destinations */
                    if (!OMF_AnnounceNewData(ghOMF))
                        NoteError();
                    }

                break;

            default:
                NoteError();
                break;
            }

} /* end of CommandProcessor */

    /****************************************************************************/
    /*                              ShapePaint                                  */
    /*                                                                          */
    /* Paint the requested shape.                                               */
    /****************************************************************************/

    void PASCAL   ShapePaint(hWnd, lpPS)
    HWND          hWnd;
    LPPAINTSTRUCT lpPS;
    {
        RECT rClient;
        HDC  hDC = lpPS->hdc;

        /* what are the parameters of the application Client area */
        GetClientRect(hWnd, (LPRECT)&rClient);

        /* what mode are you printing out */
        SetMapMode (hDC, MM_ANISOTROPIC);
```

```
        /* set up the view port */
        SetWindowOrg(hDC, -10, 110);
        SetWindowExt(hDC, 120, -120);
        SetViewportOrg(hDC, 0, 0);
        SetViewportExt(hDC, rClient.right, rClient.bottom);

        switch (gnShape) {
            case SHAPE_RECTANGLE:
                Rectangle(hDC, 0, 0, 100, 100);
                break;

            case SHAPE_ELLIPSE:
                Ellipse(hDC, 0, 0, 100, 100);
                break;

            case SHAPE_TRIANGLE:
                Polygon (hDC, (LPPOINT)TrianglePoints, 4);
                break;

            case SHAPE_STAR:
                Polygon (hDC, (LPPOINT)StarPoints, 6);
                break;
            }

    }  /* end of ShapePaint */

/**********************************************************************/
/*                        MessageFromOMF                              */
/*                                                                    */
/* Process the messages sent from the OMF.                            */
/**********************************************************************/

long PASCAL MessageFromOMF(hWnd, wParam, lParam)
HWND hWnd;
WORD wParam;
LONG lParam;
{

    char          szClassText[MAXTYPESTRLENGTH+1];
    HPROPERTIES   hProp;
    RECT          rcRect;
    int           state;

    switch(wParam)  {

       case CREATE_OMF:
           /* read in the data file assoc. with object - what was the */
           /* the object when last closed */
           strcat(gShapeFile, ".shp");
           ReadDataFile();

           if (gnShape != SHAPE_NONE)
               CheckMenuItem(GetMenu(hWnd), gnShape, MF_CHECKED);

           /* set up gszCaption with "Title (ClassText)" */
           gszObjTitle[0] = szClassText[0] = '\0';

           /* get handle to the property list of an object - of SELF */
           /* in this case */
           hProp = OMF_GetProperties(ghOMF, SELF, FALSE);

           if (hProp == NULL)
               NoteError();

           else {
               /* reads the property PROP_TITLE into buffer */
               if (OMF_ReadProperty(ghOMF,
                           hProp,
                           PROP_TITLE,
                           (LPSTR)gszObjTitle,
                           -sizeof(gszObjTitle) ) == -1) {
                   NoteError();
                   gszObjTitle[0] = '\0';
                   }
               /* no longer need handle to property list */
               if (!OMF_FreeProperties(ghOMF, hProp))
                   NoteError();

               } /* end get properties */
```

```
        /* get the title of the class object */
        if (!OMF_GetType(ghOMF, SELF, (LPSTR)szClassText)) {
            NoteError();
            szClassText[0] = '\0';
            }
        /* put in the object title and the class title */
        strcpy(gszCaption, gszObjTitle);
        strcat(gszCaption, " (" );
        strcat(gszCaption, szClassText);
        strcat(gszCaption, ")" );

        /* register the handle of the window with the API */
        APIInit((LPAPIHND)&ghAPI, hWnd, ghInst, ghOMF,(LPSTR)"HPShape.HLP",
                (LPSTR)gszObjTitle, API_NO_MODE);

        /* put up the task or help items on the menu */
        APIInitMenu(ghAPI, GetMenu(hWnd), API_TASK_MENU | API_HELP_MENU,
                    API_NO_MODE);

        return(CO_OK);

    case WARM_START :
    case OPEN       :
        /* the window is not currently maximized or minimized */
        gWinPosn.bMaximized = gWinPosn.bMinimized = FALSE;

        /* Move window to previous position on screen */
        /* This example uses properties to store screen coordinates */
        /* get the properties to find out the screen size */
        hProp = OMF_GetProperties(ghOMF, SELF, FALSE);
        if (hProp == NULL)
            NoteError();
        else {
            /* what was the last location of the window */
            if (OMF_ReadProperty( ghOMF,
                                  hProp,
                                  PROP_LASTLOCATION,
                                  (LPSTR)&gWinPosn,
                                  sizeof(gWinPosn) ) == sizeof(gWinPosn) )

                /* if there was an old position - move win to that */
                MoveWindow(hWnd,
                           gWinPosn.rcRect.left,
                           gWinPosn.rcRect.top,
                           (gWinPosn.rcRect.right - gWinPosn.rcRect.left+1),
                           (gWinPosn.rcRect.bottom - gWinPosn.rcRect.top+1),
                           FALSE);

            /* if the OMF_READPROPERTY fails - then let create */
            /* window set the default window size  */

            /* no longer need the property list handle */
            if (!OMF_FreeProperties(ghOMF, hProp))
                NoteError();
            } /*End got properties */

        SetWindowText(hWnd, (LPSTR)gszCaption);

        if ((!IsIconic(hWnd)) && (!IsZoomed(hWnd)))
            GetWindowRect(hWnd, (LPRECT)&gWinPosn.rcRect);

        /* Now get window rectangle for telescope effect */
        if (gWinPosn.bMaximized) {   /* Full screen rectangle */
            rcRect.top = rcRect.left = 0;
            rcRect.right = GetSystemMetrics(SM_CXSCREEN);
            rcRect.bottom = GetSystemMetrics(SM_CYSCREEN);
            }
        else /* Find normal rectangle */
            rcRect = gWinPosn.rcRect;

        /* notify the parents that source object is opening */
        OMF_Opening(ghOMF,(wParam == WARM_START) ? NULL : (LPRECT)&rcRect);

        /* if the previous window was maximized */
        if (gWinPosn.bMaximized)
            NW_Maximize(hWnd);
        else if (gWinPosn.bMinimized && (wParam == WARM_START))
            NW_Minimize(hWnd);
```

```
            else
                NW_Restore(hWnd);

            UpdateWindow(hWnd);

            /* tell API that applic is ready to receive API_Play back msg */
            APIReady(ghAPI,API_NO_MODE);
            return(0L);

        case HAS_METHOD :
            return(HasMethod((unsigned)LOWORD(lParam)));

        case INIT_VIEW:
            return((long) InitView(LOWORD(lParam)));

        case GET_SIZE:
            return((long) GetSize(LOWORD(lParam)));

        case DISPLAY_VIEW:
            return((long) DisplayView(LOWORD(lParam)));

        case COPY_SELF:
            return((long)CopySelf(hWnd,(HANDLE)LOWORD(lParam)));

        case TERMINATE :
            /* what state the object is in - active, open,.... */
            state = (OMF_GetObjectState(ghOMF,SELF) == OS_OPEN);

            /* save the current shape */
            SaveDataFile(gShapeFile);

            /* where is the window on the screen */
            SaveWindowPosition(hWnd);

            /* terminate use of API */
            if (state == OS_OPEN)
                APITerm(ghAPI, hWnd, ghInst, ghOMF, API_NO_MODE);

            /* free up memory with the OMF */
            OMF_Term(ghOMF);

            if ((LOWORD(lParam) == TRUE)) {  /* full system shutdown */

                if (state == 1)      /* object was opened */
                    return((long)DONE_UNTIL_WARMSTART);
                else                 /* object was active but not open */
                    return((long)TERMINATE_OK);
                }

            else        /* object being freed by somebody else */
                return((long)TERMINATE_OK);

        case DIE_PLEASE :
            DestroyWindow(hWnd);
            PostQuitMessage(0);
            return(0L);

        case WINDOW_TO_TOP:
            if (!IsIconic(hWnd))  {
                BringWindowToTop(hWnd);
                SetFocus(hWnd);
                }
            else
                NoteError();

            return(0L);

        default :
            return(0L);

        } /* end of switch on OMF message type */

} /* End of MessageFromOMF */

/**************************************************************************/
/*                              HasMethod                                 */
/*                                                                        */
/* Reply to the HAS_METHOD message to indicate if a method is supported */
/* or not by HPSHAPE.                                                     */
/**************************************************************************/

long PASCAL HasMethod(Method)
```

```
unsigned    Method;
{
    switch(Method)  {

      case CREATE_OMF    :
      case OPEN          :
      case WARM_START    :
      case INIT_VIEW     :
      case GET_SIZE      :
      case DISPLAY_VIEW  :
      case COPY_SELF     :
      case TERMINATE     :
      case DIE_PLEASE    :
      case WINDOW_TO_TOP :
         return(METHOD_PRESENT);

      default :
         return(NO_METHOD);
    }

 }   /* end of HasMethod */
/*************************************************************************/
/*                              GetSize                                  */
/*                                                                       */
/*
/* States size HPSHAPE needs to be in order to display itself as a view */
/*************************************************************************/

HANDLE PASCAL GetSize(hGetSize)
HANDLE        hGetSize;
{
    LPGETSIZESTRUCT    lpGetSize;
    LPRETURNSIZESTRUCT lpReturnSize;
    HANDLE             hReturnSize;

    /* this procedure is called from the destination to the source */
    /* to make sure that the source will fit within area that the  */
    /* destination has specified */

    /* our local pointer to the destination's size structure */
    lpGetSize = (LPGETSIZESTRUCT) GlobalLock(hGetSize);

    if (lpGetSize == NULL) {
        NoteError();
        return(0L);
        }

    /* the return structure that we are going to return to the destination */
    hReturnSize = GlobalAlloc(GMEM_MOVEABLE | GMEM_LOWER,
                              (DWORD)sizeof(RETURNSIZESTRUCT));

    if (hReturnSize == NULL) {
        NoteError();
        return(0L);
        }

    /* long pointer to the return structure */
    lpReturnSize = (LPRETURNSIZESTRUCT) GlobalLock(hReturnSize);
    if (lpReturnSize == NULL) {
        GlobalFree(hReturnSize);
        NoteError();
        return(0L);
        }

     /* the following settings guartantee a square picture */
    if (lpGetSize->MaxHeight > lpGetSize->MaxWidth) {
        lpReturnSize->RealHeight = lpGetSize->MaxWidth;
        lpReturnSize->RealWidth = lpGetSize->MaxWidth;
        lpReturnSize->BaseLine = lpGetSize->MaxWidth;
        }
    else  {
        lpReturnSize->RealHeight = lpGetSize->MaxHeight;
        lpReturnSize->RealWidth = lpGetSize->MaxHeight;
        lpReturnSize->BaseLine = lpGetSize->MaxHeight;
        }

    GlobalUnlock(hGetSize);
    GlobalUnlock(hReturnSize);
    return(hReturnSize);
 } /* End of GetSize */
```

```
/*************************************************************************/
/*                              InitView                                 */
/*                                                                       */
/* Establishes a view definition for the for the data to be displayed   */
/* in the requesting object.                                             */
/*************************************************************************/

BOOL PASCAL InitView(hView)
HANDLE      hView;
{
    LPINITVIEWSTRUCT lpView;
    BOOL bStatus;

    lpView = (LPINITVIEWSTRUCT) GlobalLock(hView);
    if (lpView == NULL) {
        NoteError();
        return(FALSE);
        }

    /* define the data id and other view specifications for a link */
    bStatus = OMF_InitViewSpec(ghOMF,
                               lpView->dwDestination,
                               lpView->dwRefName,
                               0, (LPSTR) NULL, 0, (LPSTR) NULL);

    GlobalUnlock(hView);
    return(bStatus);
}  /* end of InitView */

/*************************************************************************/
/*                             DisplayView                               */
/*                                                                       */
/* Paints the view in the DC specified by the destination object.       */
/*************************************************************************/

BOOL PASCAL DisplayView(hDisplay)
HANDLE      hDisplay;        /* handle to the display context of the
                                destination area */
{
    LPDISPLAYSTRUCT lpDisplay;      /* local pointer to display context */
    HDC             hTargetDC;      /* handle to the display structure  */
    RECT            rWhole,         /* used for the view port           */
                    rPart;          /* used for the clipping region     */
    DWORD           rBkColor;       /* used for background color        */
    HANDLE          hRgn;

    /* set the local pointer to the display struct of the destination */
    lpDisplay = (LPDISPLAYSTRUCT) GlobalLock(hDisplay);
    if (lpDisplay == NULL) {
        NoteError();
        return(FALSE);
        }
    /* what is the target display context */
    hTargetDC = lpDisplay->hDC;

    /* the region and clipping region */
    rWhole = lpDisplay->Whole;
    rPart = lpDisplay->Part;
    rBkColor = lpDisplay->rgbBkColor;
    GlobalUnlock(hDisplay);

    SaveDC(hTargetDC);

    SetBkColor(hTargetDC,rBkColor);
    SetMapMode (hTargetDC, MM_ANISOTROPIC);
    SetWindowOrg(hTargetDC, -10, 110);
    SetWindowExt(hTargetDC, 120, -120);
    SetViewportOrg(hTargetDC, rWhole.left, rWhole.top);
    SetViewportExt(hTargetDC, rWhole.right-rWhole.left,
                              rWhole.bottom-rWhole.top);

    /* set the clipping region */
    hRgn = CreateRectRgn(rPart.left, rPart.top, rPart.right, rPart.bottom);
    if (hRgn == NULL)
        NoteError();
```

```
    else {
        SelectClipRgn(hTargetDC,hRgn);
        /* delete region after it has been copied in the DC */
        DeleteObject(hRgn);

        /* update the target display context of the dest */
        switch (gnShape) {
            case SHAPE_RECTANGLE:
                Rectangle(hTargetDC, 0, 0, 100, 100);
                break;

            case SHAPE_ELLIPSE:
                Ellipse(hTargetDC, 0, 0, 100, 100);
                break;

            case SHAPE_TRIANGLE:
                Polygon (hTargetDC, (LPPOINT)TrianglePoints, 4);
                break;

            case SHAPE_STAR:
                Polygon (hTargetDC, (LPPOINT)StarPoints, 6);
                break;
            }

        } /* end else */

    RestoreDC(hTargetDC,-1);
    return(TRUE);

} /* end of DisplayView */

/**************************************************************************/
/*                          CopySelf                                      */
/*                                                                        */
/* Allows the object to be copied when contained in another object.      */
/**************************************************************************/

LONG PASCAL CopySelf(hWnd, hData)
HWND    hWnd;
HANDLE    hData;
{

    LPSTR     lpText;

    /*  COPY_SELF message received */
    /* lock handle that contains DOS filename of new object */
    if (!(lpText = GlobalLock(hData)))  {
         GlobalUnlock(hData);
         return(long)CS_ERROR;
         }

    /*  save new binary data file for new object */
    lstrcat(lpText, (LPSTR)".shp");
    SaveDataFile(lpText);

    GlobalUnlock(hData);
    return((long)CS_DONE);

} /* end of CopySelf */

/**************************************************************************/
/*                          ReadDataFile                                  */
/*                                                                        */
/* Gets the data file for HPSHAPE.                                        */
/**************************************************************************/

BOOL PASCAL ReadDataFile()
{
    int  hFile;
    char LocalShapeFile[MAXROOTFILENAMELENGTH+1];

    if (!AnsiToOem((LPSTR)gShapeFile,(LPSTR)LocalShapeFile))
        gnShape = SHAPE_NONE;

    if ((hFile = open(LocalShapeFile, (int)(O_RDONLY | O_BINARY))) != -1) {
        if (!read(hFile, (char *)&gnShape, sizeof(int)))
            gnShape = SHAPE_NONE;
        close(hFile);
        return(TRUE);
        }
```

```
        else
            return(FALSE);

    } /* end of ReadDataFile */

/*****************************************************************/
/*                          SaveDataFile                         */
/*                                                               */
/* Saves the data file which is the last shape selected.         */
/*****************************************************************/

void PASCAL SaveDataFile(SaveFile)
LPSTR  SaveFile;
{
    int hFile;
    char LocalShapeFile[MAXROOTFILENAMELENGTH+1];

    if (!AnsiToOem((LPSTR)SaveFile,(LPSTR)LocalShapeFile))
        return;

    hFile = open(LocalShapeFile,
                (int)(O_WRONLY | O_CREAT | O_TRUNC | O_BINARY),
                S_IREAD | S_IWRITE);
    if (hFile == -1)
        NoteError();

    /* Have opened file */
    else {
        if (write(hFile, (char *)&gnShape,
                (unsigned)sizeof(int)) != sizeof(int))
            NoteError();
        if (close(hFile) == -1)
            NoteError();
        }
} /* end of SaveDataFile */

/*****************************************************************/
/*                       InterrogateFromAPI                      */
/*                                                               */
/* Command from API - handle context sensitive help requests.    */
/*****************************************************************/

long PASCAL InterrogateFromAPI(wParam, lParam)
WORD        wParam;
LONG        lParam;
{
    switch (wParam) {

        case API_RENDER_HELP_FN:
            return(106L);               /* # of the context # */

        default:
            return(0L);
        }
} /* end of InterrogateFromAPI */

/*****************************************************************/
/*                           NoteError                           */
/*                                                               */
/* Displays and error message to the user if an error occurs during */
/* execution.                                                    */
/*****************************************************************/

void PASCAL NoteError()
{
    char szMsg[MSGERR];

    if (LoadString(ghInst, IDS_ERROR, (LPSTR)szMsg, sizeof(szMsg))) {
        APIMessageBox(ghAPI,
                    0,
                    ghWnd,
                    (LPSTR)szMsg,
                    (LPSTR)gszCaption,
                    MB_OK | MB_ICONEXCLAMATION,
                    API_NO_MODE);
        }

} /* End of NoteError */
```

```
/****************************************************************************/
/*                         SaveWindowPosition                               */
/*                                                                          */
/* Saves the last window coordinates in a property.                         */
/****************************************************************************/

void PASCAL SaveWindowPosition(hWnd)
HWND hWnd;
{

    HPROPERTIES    hProp;

    /* get the properties of the object - the handle */
    hProp = OMF_GetProperties(ghOMF, SELF, FALSE);
    if (hProp == NULL)  {
         NoteError();
         return;
         }

    /* not current minimized or maximized unless Icon or Zoom */
    gWinPosn.bMinimized = FALSE;
    gWinPosn.bMaximized = FALSE;

    if (IsIconic(hWnd))
         gWinPosn.bMinimized = TRUE;
    else if (IsZoomed(hWnd))
         gWinPosn.bMaximized = TRUE;
    else
         GetWindowRect(hWnd, (LPRECT) &gWinPosn.rcRect);

    /* write out the properties */
    OMF_WriteProperty(  ghOMF,
                        hProp,
                        PROP_LASTLOCATION,
                        (LPSTR)&gWinPosn,
                        sizeof(gWinPosn) );

    /* free up the handle */
    OMF_FreeProperties(ghOMF, hProp);

} /* End of SaveWindowPosition */

/****************************************************************************/
/*                                                                          */
/*                              HPSHAPE.H                                   */
/*                                                                          */
/*                      HPSHAPE SAMPLE APPLICATION                          */
/*                                                                          */
/*                       Application Include File                           */
/*                                                                          */
/*                          5010-4100  A.00.00                              */
/*                            Feb 24, 1988                                  */
/*                                                                          */
/*                 written for OMF A.00.00, API A.00.00                     */
/*                                                                          */
/*               COPYRIGHT (c) HEWLETT-PACKARD COMPANY 1988                 */
/*                                                                          */
/****************************************************************************/

#ifndef RC_INVOKED  /* Only include the following if NOT RC */

/****************************************************************************/
/*                         Standard Include Files                           */
/****************************************************************************/

#define NOCOMM
#define NOMINMAX
#include "windows.h"
#include "nwomf.h"
#include "nwutil.h"

/****************************************************************************/
/*                            Standard Defines                              */
/****************************************************************************/

#define MSGERR              80
#define NEW_SHAPE           ((WORD)API_START_CDCMD+1)
```

```
#define PROP_LASTLOCATION (PROP_USERDEFINED+1)
#define MAXCAPTIONLENGTH  (MAXTYPESTRLENGTH + MAXTITLE + 3 + 1)

#endif              /* End RC_INVOKED not defined */

/**********************************************************************/
/*                         Menu Constants                             */
/**********************************************************************/

#define SHAPE_RECTANGLE   100
#define SHAPE_ELLIPSE     101
#define SHAPE_TRIANGLE    102
#define SHAPE_STAR        103
#define SHAPE_NONE        104
#define IDDCLOSE          105

/**********************************************************************/
/*                   API External Format Commands                     */
/**********************************************************************/

#define R        50
#define E        51
#define T        52
#define S        53
#define N        54
#define I        55
#define X        56
#define C        57

/**********************************************************************/
/*                     Resource Identifiers                           */
/**********************************************************************/

#define IDS_ERROR        97
#define HPSHAPE_ICON     98
#define HPSHAPE_MENU     99
```

```
/**********************************************************************/
/*                                                                    */
/*                          HPSHAPE.RC                                */
/*                                                                    */
/*                  HPSHAPE SAMPLE APPLICATION                        */
/*                                                                    */
/*                  Application Resource File                         */
/*                                                                    */
/*                      5010-4100  A.00.00                            */
/*                        Feb 24, 1988                                */
/*                                                                    */
/*              written for OMF A.00.00, API A.00.00                  */
/*                                                                    */
/*           COPYRIGHT (c) HEWLETT-PACKARD COMPANY 1988               */
/*                                                                    */
/**********************************************************************/

#include "style.h"
#include "hpshape.h"

HPSHAPE_ICON ICON    HPSHAPEM.ICO

HPSHAPE_MENU MENU
BEGIN
    POPUP "&File"
    BEGIN
        MENUITEM "&Rectangle",    SHAPE_RECTANGLE
        MENUITEM "&Ellipse",      SHAPE_ELLIPSE
        MENUITEM "&Triangle",     SHAPE_TRIANGLE
        MENUITEM "&Star",         SHAPE_STAR
```

```
        MENUITEM SEPARATOR
        MENUITEM "&Close",       IDDCLOSE
    END
    POPUP "&Edit"
    BEGIN
        MENUITEM "&Clear", SHAPE_NONE
    END
END

STRINGTABLE
BEGIN
    IDS_ERROR    "HP NewWave Shapes Error"
END

/*****************************************************************************/
/*                                                                           */
/*                           HPSHAPE.INS                                     */
/*                                                                           */
/*                     HPSHAPE SAMPLE APPLICATION                            */
/*                                                                           */
/*                           Install File                                    */
/*                                                                           */
/*                         5010-4100  A.00.00                                */
/*                           Feb 24, 1988                                    */
/*                                                                           */
/*                 written for OMF A.00.00, API A.00.00                      */
/*                                                                           */
/*               COPYRIGHT (c) HEWLETT-PACKARD COMPANY 1988                  */
/*                                                                           */
/*****************************************************************************/

CLASS_NAME      "HPShape"
TEXT_ID         "HP Shape"
ICON_NAME       "HPShape"
ICON_FILE       hpshape.ico    END_NAMES

OVERWRITE_OLD_OBJECT

EXECUTABLE_FILE  HPSHAPE.NWE

MODULE_FILENAMES
    hpshape.nwe
    hpshape.hlp
END_NAMES

OBJECT_FILENAMES   END_NAMES    ; this object has no initial data files

HAVE_METHODS
    CREATE_OMF
    WARM_START
    TERMINATE
    DIE_PLEASE
    OPEN
    INIT_VIEW
    GET_SIZE
    COPY_SELF
    DISPLAY_VIEW
END_METHODS

OTHER_CLASS_PROPERTIES
   PROP_VIEWMETHODS
        BEGIN_VALUES
            0x26 0x00    ; DISPLAY_VIEW
        END_VALUES
END_PROPERTIES

OBJECT_PROPERTIES
    PROP_SYSTEM
        BEGIN_VALUES
        END_VALUES
    PROP_TITLE  "HP Shape"
END_PROPERTIES
```

```
;**********************************************************************
;*                                                                    *
;*                          HPSHAPE.DEF                               *
;*                                                                    *
;*                   HPSHAPE SAMPLE APPLICATION                       *
;*                                                                    *
;*                  Application Definition File                       *
;*                                                                    *
;*                      5010-4100  A.00.00                            *
;*                         Feb 24, 1988                               *
;*                                                                    *
;*                written for OMF A.00.00; API A.00.00                *
;*                                                                    *
;*            COPYRIGHT (c) HEWLETT-PACKARD COMPANY 1988              *
;*                                                                    *
;**********************************************************************

;**  Important:  Note that if LINK4 version 5.01.05 or later is used,  **
;**  the following line must be added to HPSHAPE.DEF:                  **
;**                       EXETYPE WINDOWS                              **
;**  Failure to do so will result in a "Not Enough Memory" error being **
;**  reported when the application is run.                             **

NAME    HPShape

DESCRIPTION 'HP NewWave version of Shapes program'

STUB 'WINSTUB.EXE'

CODE    MOVEABLE
DATA    MOVEABLE MULTIPLE

HEAPSIZE    2048        ; Must be non-zero to use Local memory manager
STACKSIZE   4096        ; Must be non-zero for SS == DS

EXPORTS                 ; Must export all procedures called by Windows
    ShapeWndProc @1     ; (ordinal numbers use less resident memory)
```

```
#*********************************************************************
#*                                                                   *
#*                          HPSHAPE.MAK                              *
#*                                                                   *
#*               NewWave HPShape Sample Application                  *
#*                                                                   *
#*                          Make File                                *
#*                                                                   *
#*                      5010-4100  A.00.00                           *
#*                         Feb 24, 1988                              *
#*                                                                   *
#*               written for OMF A.00.00, API A.00.00                *
#*                                                                   *
#*            COPYRIGHT (c) HEWLETT-PACKARD COMPANY 1988             *
#*                                                                   *
#*********************************************************************

# This make file assumes the use of the following tools:
# - Microsoft C 5.0 Compiler
# - Microsoft LINK version 5.01.01 or greater.

#*** Important:  Note that if LINK4 version 5.01.05 or later is used,  **
#*** the following line must be added to HPSHAPE.DEF:                  **
#***                   EXETYPE WINDOWS                                  **
#*** Failure to do so will result in a "Not Enough Memory" error being **
#*** reported when the application is run.                              **

# Note that this program has code arranged into logical units,
# and is NOT segmented optimally for performance

# Directory to find OMF header files
OMF = \hpnwdev

# Compiler switches
hpshape.obj: hpshape.c hpshape.h
    cl  -c -AM -G2sw -Ox -Zpe -W3  -FPa -I$(OMF) hpshape.c

hpshape.res: hpshape.rc hpshape.ico hpshape.h
    rc -r hpshape.rc

hpshape.nwe: hpshape.def hpshape.obj
    link4  /noe hpshape, hpshape.nwe, hpshape/map, \
           $(OMF)\hpnwlib mlibw,hpshape.def
    rc     hpshape.res hpshape.nwe
    mapsym hpshape

hpshape.nwe: hpshape.res
    rc     hpshape.res hpshape.nwe

hpshape.hlp: hpshape.bld
    del    hpshape.hlp
    $(OMF)\hphelpfl hpshape.bld hpshape.hlp no 0
```

C Agent Test Tool

This appendix will be released shortly. It will be mailed to the address supplied on the "Update Reply Card."

Index

A

Action Processor 4-13, 4-19
Activating Objects 2-19, 2-34
Adding Activation to HPSHAPE 3-15
Adding API Initialization and Termination to HPSHAPE 5-11
Adding API Mode Flags to HPSHAPE 5-16
Adding API Not Ready to HPSHAPE 5-12
Adding API Ready to HPSHAPE 5-12
Adding API Terminate to HPSHAPE 5-13
Adding Close to HPSHAPE 3-18
Adding Error Handling to HPSHAPE 5-25
Adding Interrogation Functionality to HPSHAPE 5-23
Adding Monitoring Functionality to HPSHAPE 5-20
Adding OMF Initialization to HPSHAPE 3-11
Adding Open to HPSHAPE 3-17
Adding Playback Functionality to HPSHAPE 5-19
Adding Recording Functionality to HPSHAPE 5-17
Adding Termination to HPSHAPE 3-18
Adding Window Management to HPSHAPE 3-8
Agent Task 4-3
Altering the SHAPES Menu 3-10
API Component Summary 4-43
API Components 4-17
API Have Test Macros Summary Table 4-41
API Initialization Component 4-45
API Interface Functions Summary Table 4-39
API Mode Test Macros Summary Table 4-41
API Not Ready Component 4-46
API Ready Component 4-46
API Termination Component 4-46
Application Architecture 4-14

C

Class Dependent Commands 4-8
Class Independent Commands 4-8
Class Independent Interrogation Functions 4-6
Class Properties 2-9, 2-10
Class Properties Summary Table 2-33, 2-48
Class-Specific Methods 2-13, 2-14
CLASS_NAME 3-39
Closing Objects 2-21, 2-36
Command Interface Component 4-27, 4-44
Command Processor 4-13, 4-20
Command Test Component 4-28, 4-45
Components 4-17
Container Objects 2-5, 2-6
Context-sensitive help 4-4
Creating Objects 2-19, 2-34
Creating Source Files 3-33

D

Data ID 2-22, 2-23
Data Objects: Simple and Compound 2-7, 2-8
Definition File 3-35
Deleting A View 2-18, 2-33
Description of Installation Terms 3-39
Designing a Command Processor 5-9
Designing a Skeleton Window Procedure 5-6
Designing a Translate To External Processor 5-14
Designing a Translate To Internal Processor 5-15
Designing an Action Processor 5-7
Designing the Commands 5-4
Designing the Internal Command Format 5-5
Designing the Task Language 5-2
Destroying Objects 2-22, 2-37
Diagnostic Utility 3-41
Dynamic Access Objects 2-15, 2-30

E

Error Handling Category of Support 4-5
Error Message Box Component 4-48
Examples of Object Types 2-8, 2-9
EXECUTABLE_FILE 3-39
External command form 4-9
External DAL Interface 2-15, 2-30

F

FastProperties 2-35, 2-50
Flags 2-12, 2-27

G

General Information OMF Messages Summary Table 2-30, 2-45
Glossary A-1

H

Handling OMF Messages in HPSHAPE 3-12
HAVE_METHODS 3-40
Help Topics 4-4
HPSHAPE.H 3-33

I

I/O Utility Files 3-34
Icon Files 3-35
ICON_FILE 3-39
ICON_NAME 3-39
Initializing the API in HPSHAPE 5-11
Installation File 3-35
Intercept Category of Support 4-5
Intercept Mode 4-36
Internal command form 4-10
Internal DAL Interface 2-15, 2-30

M

Major Event OMF Messages Summary Table 2-30, 2-45
Miscellaneous API Functions and Macros Summary Table 4-42
Modal Dialog Box Command Interface Component 4-47
Modal Dialog Box Initialization Component 4-46
Modal Dialog Box Processor 4-21
Modal Dialog Box Termination Component 4-47
Modal Dialog Box Test Component 4-27
Modal Dialog Box User Action Interface Component 4-46
Modal Dialog Test Component 4-44
Modeless Dialog Box Command Interface Component 4-47
Modeless Dialog Box Initialization Component 4-48

Modeless Dialog Box Return Interface Component 4-48
Modeless Dialog Box Termination Component 4-48
Modeless Dialog Box User Action Interface Component 4-47
MODULE_FILENAMES 3-39
Monitor Category of Support 4-5
Monitor Mode 4-30

N

Naming Data Files in HPSHAPE 3-21
NWOMF.H 3-34
NWUTIL.H 3-34

O

Object Properties 2-9, 2-10
Object Property Summary Table 2-34, 2-49
OBJECT_FILENAMES 3-39
OBJECT_PROPERTIES 3-40
OMF Clipboard Functions 2-28, 2-43
OMF Clipboard Functions Summary Table 2-28, 2-43
OMF Dynamic Access Library Functions Summary Table 2-29, 2-44
OMF Message Replies Summary Table 2-31, 2-46
OMF messages 4-6
OMF Messages to Dynamic Access Objects Summary Table 2-32, 2-47
OMF Property Functions 2-27, 2-42
OMF Property Functions Summary Table 2-27, 2-42
OMF Serialization Functions 2-28, 2-43
OMF Serialization Functions Summary Table 2-28, 2-43
OMF Status Functions 2-26, 2-41
OMF Status Functions Summary Table 2-26, 2-41
OMF System Functions 2-25, 2-40
OMF System Functions Summary Table 2-25, 2-40
OMF Task Messages Summary Table 2-31, 2-46
OMF Update Functions 2-27, 2-42
OMF Update Functions Summary Table 2-27, 2-42
OMF View Functions Summary Table 2-29, 2-44
OMF View Management Summary Table 2-32, 2-47
OMF View Messages Summary Table 2-32, 2-47
Opening Objects 2-21, 2-36
Optional Methods 2-13, 2-14

P

Pcode command form 4-10
Playback Category of Support 4-5
Playback Message Test Component 4-26, 4-44
Playback Mode 4-32
Processors 4-18
Property Formats 2-10, 2-11
Property Names 2-10, 2-11

R

Reading The Data Files in HPSHAPE 3-22
Receiving Messages 2-12, 2-13
Record Category of Support 4-5
Record Mode 4-34
Reference Names 2-18, 2-19
Required Methods 2-12, 2-13
Required OMF Messages Summary Table 2-30, 2-45
Resource File 3-34
Return Interface Component 4-29, 4-45

S

Sending Messages 2-11, 2-12
Simple Links 2-16, 2-17
Snapshot Indicator 2-10, 2-25
System Object Classification 2-5, 2-6

T

Task Language 4-8
Task Language command form 4-9
Terminating Objects 2-22, 2-37
Terms, See glossary A-1
Testing the HPSHAPE Window Procedure Skeleton 5-13
TEXT_ID 3-39
Textual Data ID 2-22, 2-24
The Agent 4-3
The Life Cycle of an Object 2-22, 2-37
Tracing Facility 3-42
Tracing Version of the OMF 3-42
Translate to External Processor 4-20
Translate to Internal Processor 4-20

U

Updating A View 2-17, 2-32
User Action Interface Component 4-25, 4-43
User action messages 4-6
User Object Classification 2-5, 2-6

V

View Class 2-22, 2-24
Views 2-16, 2-17

W

Windows housekeeping messages 4-6
WINDOWS.H 3-33
Writing The Data Files in HPSHAPE 3-23

APPEND_ B

AGENT TASK LANGUAGE GUIDELINES

X.09.00

HEWLETT PACKARD

Personal Software Division

Location Code: D6-6320

Project Number: ####-####

March 30, 1988

Barbara Packard
Glenn Stearns

* HP Confidential *

Copyright © 1988 HEWLETT-PACKARD COMPANY

PURPOSE AND OVERVIEW

SECTION 1

NOTE

I would like to gratefully acknowledge the many hours spent by the Task Language Review Committee and thank them for their review and excellent suggestions.

1.1 PURPOSE

The purpose of this document is to provide VABs and project teams with information about Task Language to enable them to design the Task Language commands for their specific applications. It describes the structure of a task script and the construction of a Task Language command. Various components of the language are explained in detail. The Class Independent commands and functions as currently defined for Core Wave are listed. A subset of the Task Language commands for desktop objects is included as an example of Class Dependent commands.

By definition, it is only a guideline. Ultimately the power of Task Language rests with the applications involved. They have the final say on command specifications which involve their object class. The degree to which their commands map to the interactive user environment and maintain consistency with other object classes, as well as the capability they provide will affect the user's perception of Task Language, which he will view in totality.

1.2 OVERVIEW

The Task Language provides the user access to the task automation functionality of New Wave. With it he can create scripts which will create, delete, modify, and otherwise manipulate New Wave objects. Agent Tasks will function across object classes and will be supported by all New Wave applications.

It is important to understand the model of the Task Language user. New Wave Agent Tasks will be created by

- the casual New Wave user who records a few of his actions, saves them as a task which he executes to repeat his actions,
- the power user who constructs complicated automated tasks which execute for considerable time without user intervention, and all the flavors in between. The first type, quite possibly, may never look at the Task Language form of the task he has recorded. The second type will demand a language with at least the power of command languages in existing applications such as Excel or DBaseIII Plus. We must remember that the casual user may, as he becomes familar with his system, write more complicated tasks and move toward the power user model. Another potential user of Task Language is an "Intelligent Agent". The addition of AI to New Wave would necessitate this user model.

The chosen model for Task Language is the power user. The language will be appropriate for constructing large automated tasks, quite possibly involving several applications. Such tasks, while executing, may receive user input and display information through converational windows designed by the task writer and controlled by the Task Language script. Most of the functionality of well-known programming languages is present. More will be added in future New Wave releases. However, our goal is that relationship of the user's interactive actions to the Task Language commands will be apparent from the syntax of the language. In particular, the syntax of Task Language commands which are recorded will be meaningful enough to serve as a learning aid to users who wish to explore the more advanced features of New Wave Agent Tasks.

We note that the creation and performing of an Agent Task is a three stage process.

1. The Task Language script is created using the Agent Task Editor. Commands are entered in the *Task Language form*. Alternatively, the script is created as the Agent remembers user actions while in *Record* mode.

2. The script is *compiled* into a binary form by the task compiler. The compiler consists of several sub-parsers, a class independent parser plus class dependent parsers, i.e. a parser of each object class which is to be accessed during the execution of this particular Agent Task. The binary output of the compiler is known as the *external form* of a command. The external form is described in other documentation.

3. At run time, the Agent dispatches the binary instructions to the appropriate object.

This document concentrates primarily on the first state.

Besides the command set, the Task Language supports several data types, user and system variables, arithmetic and logical expressions, and functions. These are described in later sections.

NOTE

The syntax of these commands does not have to be finalized for VAB Wave. It is presented here both for your review and suggestions and as examples of the guidelines set forth in the following sections. The Class Independent command syntax will be released to VABs with the caveat that some syntax may change. We expect any such changes to be minor and feel that VABs would be better served if alerted early on to Class Independent command keywords to avoid. However, we must live with the style guidelines as released to our VABs.

TASK ORGANIZATION

SECTION 2

An Agent Task script is a set of commands in Task Language form which is then compiled to an *external form* as defined in the API section of the *Programmers' Reference Manual*. This external form is executed at runtime either by the Agent (*Class Independent* command) or an application (*Class Dependent* command) through an API message. API messages are also described in the *Programmers' Reference Manual*. A script may have up to two sections: *Main* and *Procedure*. The following examples illustrate the organization. The specific commands are explained in detail in later sections of this document.

2.1 TASK MAIN SECTION

The *Main* section of a task is the only one which is required. It consists of a list of commands bracketed by the TASK and ENDTASK commands. Task execution begins with the first command in this section, so it essentially directs the flow control of the task script. The following is a simple example of a task which makes a copy of a folder on the Desktop.

Example

```
TASK  'A simple example
FOCUS OFFICE_WINDOW "NewWave Office"
SELECT FOLDER "Orders"
MAKE_COPY
ENDTASK
```

2.2 PROCEDURE SECTION

Following the main body is an optional procedure section consisting of one or more *procedures*. Each procedure consists of a list of commands bracketed by PROCEDURE and ENDPROC commands. These commands may be executed from elsewhere in the task script with a DO command. We can expand the simple example in the previous section:

Example

```
TASK  'A simple example with a procedure
FOCUS OFFICE_WINDOW "NewWave Office"
TITLE# = "August Orders"
DO COPY_FOLDER
TITLE# = "September Orders"
DO COPY_FOLDER
ENDTASK

'The procedure section starts here
PROCEDURE COPY_FOLDER
SELECT FOLDER TITLE#
MAKE_COPY
ENDPROC
```

Note the use of TITLE# in this example. TITLE# is a Task Language *variable*. Variables are discussed in Section 7.

TASK LANGUAGE COMMANDS

SECTION 3

This section discusses the general syntax of Task Language commands. Task Language commands form the "meat" of a task. They are of two types: *Class Independent* commands and *Class Dependent* commands. In NewWave the classes of objects installed as well as the objects in the user's workspace will vary from system to system. To provide task automation across object classes, each application must support a unique set of commands peculiar to its own feature set. And the Task Language compiler must be able to accept or reject a script command based on which object classes are installed on the system as well as the format of the command itself. To do this the compiler uses multiple parsers. The Class Independent parser is present on all systems. It handles parse and semantic routines and generates the binary format for the Class Independent commands. In addition, each application provides a parser, in the form of a dynamic library, which does the same thing for all the Class Dependent commands which it supports. This is necessary for several reasons:

- Only the application knows the *external form* (binary) of the commands it supports.
- Only the application knows the Task Language script commands it supports.
- Two applications may support different flavors of the same command. For example, SELECT in the context of a word processor may not mean the same as in the context of a spreadsheet.

Obviously there will be much overlap in Class Dependent parsers. Hewlett-Packard will assist VABs in the development of their parsers with documentation, library routines, and source code templates.

3.1 BASIC SYNTAX

Both Class Independent and Class Dependent commands will need to follow the same syntax guidelines.

Task Language commands are based on English imperative sentence structure, which consists of a verb followed by zero or more objects. Sometimes the verb is preceded by a conditional clause introduced by a keyword such as IF or WHILE. Such a command may be referred to as a *statement*. In this document, Task Language commands and Task Language statements may be considered interchangeable. In the examples which follow, items in brackets ( [ . . ] ) are optional. Items in *italics* represent user supplied values.

In general, a Task Language command will have the format:

```
<command keyword>  [ parameter ] . . .
```

The parts of a command are separated by one or more spaces. The line end terminates the command. (See *Continuation Character*.) Blank spaces at the beginning of a line are ignored. The *command keyword* is a verb form. It will parallel a user action, for example selecting a menu item. (See *Keyword Identifiers*.) Some command keywords define user actions which are not menu selections. Actions which are common across many applications have their verb forms defined in this document (e.g. MOVE_TO, COPY_TO). Applications should use these defined verb forms so that the Task Language appears as consistent as possible to users. Parameters, when present, modify the verb. It is conceivable that the parameter syntax of a command keyword may vary across applications. For example, the objects of a move or copy verb might be different in a word processor or spreadsheet context than in the Desktop. Many commands will have no parameters, consisting only of the keyword verb. Optional keywords, or *noisewords*, may be added to the command to improve readability.

3.2 KEYWORD IDENTIFIERS

Keywords and noisewords consist of any alphanumeric character plus the underline character "_". The first character must be a letter. These identifiers are not case sensitive, e.g. TITLE, Title, and title are all equivalent. When the keyword is a command keyword, it should be as close as possible to any menu selections that the user would make when accomplishing the same action interactively. If the selection consists of a phrase of two or more words, the command keyword should contain those words with the spaces replaced by the underline character, e.g. CREATE_A_NEW. If the command keyword does not represent a menu selection, it should describe the user action in English, e.g. MOVE_TO, CHANGE_TITLE etc. If the command keyword for the action has been predefined in this document, the application should use it.

3.3 NOISEWORDS

The Guidelines recommend limited use of noisewords. They should be used *only* in those situations where their addition *significantly* improves the readability of the command and makes it more English-like. Noisewords are frequently prepositions such as OF or TO and can be useful immediately following the command keyword. They should be used judiciously since they can inflate the size of the parse tables and parse routine. Do not insert a noiseword in a command if it would make the corresponding spoken or written sentence sound stilted.

Examples

The simpler command

SELECT *<classname>* "*<title>*"

is preferable to the more verbose form

SELECT *<classname>* [WITH] [TITLE] "*<title>*"

The noisewords WITH and TITLE are not necessary and would be unusual in the spoken or written sentence. However, in the case CHANGE_TITLE [OF] *<classname>* "*<old title>*"

[TO] "*<new title>*"

OF and TO make the command read like an English sentence and are recommended. If in doubt, leave the noiseword out. Noisewords are always recorded.

3.4 PARAMETERS

A parameter may be a keyword, user supplied data, or a keyword followed by data. Parameters may be required or optional. Ordinarily, they are not separated by commas. When the command parameter is data, it must be a recognized Task Language data type such as integer or string. But such parameters may be Task Language variables or expressions as well as constants. A parameter which might create ambiguity in the command should be preceded by a keyword. The following two Desktop commands illustrate optional and required keyword parameters.

```
TEXTUAL_VIEW  [SORTED] {BY_CLASS}
                       {BY_TITLE}
                       {BY_DATE }

CHANGE_ATTRIBUTES  [TITLE "<title>"]
                   [PUBLIC ON ]
                   [PUBLIC OFF]
                   [COMMENTS "<comments>"]
```

In the examples above, either BY_CLASS, BY_TITLE, or BY_DATE *must* appear as a keyword parameter. The parameters "<title>" and "<comments>" are string expressions. The keyword SORTED in the TEXTUAL_VIEW command is a noiseword added to improve readability while TITLE and COMMENTS in the CHANGE_ATTRIBUTES command are necessary keywords to resolve ambiguity. Optional keyworded parameters should not be order dependent unless the order is needed for readability. If the same parameter appears more than once in a script command, the compiler should display an error message.

3.5 DIALOG COMMANDS

There are two types of commands which simulate the action of dialog boxes. The task writer may choose to have the dialog box displayed and receive user input as the task is executed. Alternatively, the information which the user would input to the dialog box in interactive mode may be defined as command parameters. In this case, there is no user interaction at execution time.

The command verb should map closely to the interactive action. Frequently, it will correspond to a selection on a pull-down menu, e.g. INSTALLATION.

3.5.1 Modal Dialog Boxes

Modal dialog boxes are terminated by a user action such as pressing the OK button. When a modal dialog box is open, the rest of the application is effectively locked out until it is closed. Each such box maps to a single task language command. All checkboxes, list boxes, editboxes etc. are expressed as keyworded parameters. They will be optional in the cases where user input is not necessary, and they should not be order dependent. If a modal dialog box is an auto-close box with more than one action button (e.g. closing with SAVE or DISCARD), each button is a parameter. Again, the keywords should reflect the user actions. Parameters which are omitted assume their current values. Table 1.1 summarizes the syntax for dialog box controls.

Example

```
SET_USER  [[NAME] "<name>"]
          [[WITH] TIMEZONE "<timezone>"]
```

is an example of a modal dialog command. Note that it is not necessary for the user to act on every item in this dialog box, hence the parameters are optional.

Certain dialog controls have buttons which change the state of other controls in the dialog box. Such buttons are also represented as keyworded parameters, e.g. DEFAULTS, CLEAR. Other parameters which then appear in the same command will be taken as exceptions to the stipulated state. When present, a parameter of this type should precede the controls it affects. DEFAULTS type buttons in subdialog boxes have separate keyworded paramters, e.g. TAB_SETTINGS_DEFAULTS.

Example

```
CELL_SETTINGS DEFAULTS CENTER
```

illustrates this with a spreadsheet command. The user wants all the default cell settings *except* for justification.

3.5.2 Dialog Command Parameters

Table 1.1 summarizes dialog box controls as they map to parameters in dialog box commands.

Table 1.1. Dialog Box Controls Syntax

| Control | Parameter | Example |
|---|---|---|
| Checkbox | <keyword> {ON / OFF} | CHANGE_ATTRIBUTES PUBLIC ON |
| Listbox | Selection is a parameter of the action command | SET_USER TIMEZONE *"-7h"* |
| Editbox | Content is a parameter of the action command | SET_USER NAME *"Joe"*<br>LIST_TO_PRINT 2 COPIES DEVICE *"LPT1"* |
| Radiobutton | <keyword> | CONFIGURE_DEVICE PORTRAIT |
| Single action* | None | SET_USER box |
| Multiple actions* | <keyword> for each button | In a word processor, CLOSE may be presented with a dialog box which allows the user to SAVE or DISCARD his changes. |

3.5.3 Interactive Modal Dialog Commands

Commands which will bring up a modal dialog box to display a message or to obtain information from the user should have a, ' ? ', appended to the command keyword. For example,

```
ABOUT?
```

results in a modal dialog box which contains information on the current object. The task will resume when the user clicks on OK. This command corresponds to the user selecting *About...* on the *File* menu.

When parameters appear in interactive dialog box commands, the values will be filled in when the dialog box is opened for user input. This feature is useful when setting up default values.

---

*Applies to *Modal* dialog boxes only.

3.5.4 Recording in Modal Dialog Boxes

In *Record* mode, the values of *all* modal dialog box parameters are recorded. The effect is then to record the entire state of the object. Therefore, DEFAULTS type parameters are not recorded. Later, the user may edit the task to delete any unwanted parameters.

3.5.5 Modeless Dialog Boxes

Modeless dialog boxes differ from modal in that they remain open until explicitly closed by the user. Frequently, they may be moved. The user may continue to work in other parts of the application. These boxes have specific Task Language commands to open and close them. Each action within a modeless dialog box corresponds to a *command* rather than a *parameter* as in a modal box. The action command verb must be specific enough to avoid ambiguity with commands not related to the dialog box. Such an unambiguous command implies activation of the dialog box window. (See discussion of the ACTIVATE command in the next section.) A Task Language command verb which opens a modeless dialog box should be the same as the menu selection which opens the box interactively. Opening a modeless dialog box implicitly makes it the current active window. Each such command should include an optional keyword parameter QUIET. When present, this parameter suppresses display of the dialog box while still allowing the state-modifying dialog box commands to be executed. Only those controls which result in actions or state changes are represented by commands. For example, if the interactive action consists of the user selecting an item from a listbox and pushing a control button, the command would consist of the control button verb with the listbox selection as a parameter. The selection itself would not be a command unless it caused a *persistent* change of state in the dialog box. A non-persistent state change is represented as a parameter of the action command.

Commands which pertain to the Desktop *Show Links*... option on the *Items* menu can be used to illustrate several points discussed in this section. The following example is identical to a New Wave user selecting the *Show Links*... option in the Desktop *Items* menu, completing the dialog box and pressing Done. The user has previously selected an item on his Desktop.

Example

```
'Opens the modeless dialog box and makes it the active window
SHOW_LINKS

   'The parameter DOCUMENT "August Orders" is a listbox selection
   'It is not a persistent change of state hence not a command

   OPEN_PARENT DOCUMENT "August Orders"         'User presses OPEN

   'Illustrate the use of a variable as a parameter
   a# = "New Orders!"
   OPEN_PARENT DOCUMENT a#

CLOSE                                           'User presses DONE
```

3.5.6 Recording in Modeless Dialog Boxes

In *Record* mode, only the commands which are executed by a user action are recorded. Note the difference from modal dialog boxes.

3.6 PARAMETER LISTS

If the parameters form a list of elements of the same type then the list elements should be separated by commas. The lists may be of either of definite or indefinite length.

Example

```
MANAGE_TOOLS  PUT_IN_OFFICE_WINDOW <classname> "<title>"
                        [, <classname> "<title>" ]...
```

3.7 USER NAMES

Certain commands, e.g. LABEL and DEFINEWINDOW, require a user defined identifier as a parameter. These identifiers have the same construction as keywords. In fact, keywords are acceptable. The compiler will be context-sensitive to this situation.

3.8 COMMENTS

Comments are introduced using the single-quote character, ' ' '. Unless the character is within a string literal, the compiler will ignore all characters on a line following a single-quote character. Since blank lines are also ignored by the compiler, they may be inserted to improve readability.

3.9 CONTINUATION CHARACTER

The Task Language is a line-oriented command language. A carriage return terminates a command. However, commands may be continued on successive lines by using the ampersand, ' & ', as a continuation character. If the last nonblank character on a line is the ampersand, the compiler will suppress the carriage return and continue parsing the command from the next line. An exception occurs if the ampersand is in a string literal.

Example

```
'The continuation character can improve readability and allow
'the use of long strings

CHANGE_OWN_ATTRIBUTES  PUBLIC OFF  &

        COMMENTS "We are inserting a rather long comment string which" + &
                 "won't fit on one line, so we use concatenation and"  + &
                 "continuation."
```

CLASS INDEPENDENT COMMANDS

SECTION 4

*Class Independent* commands are parsed by the class independent parser and executed by the Agent itself at runtime, independent of any application object which may be open. Most Class Independent commands either manipulate task conversational windows and handle flow control of the task. All Class Independent commands are described in the section on the command syntax.

4.1 CONVERSATIONAL WINDOW COMMANDS

The task conversational window is a feature provided by Task Language to enable the task to communicate with the user. With these commands, the task writer can design and display a window on the screen. He can output information to the user in the window. Or he can put an editbox or pushbutton in the window to get input from the user. Some commonly used window designs are available in the MESSAGE and INPUT commands. Some examples of the functionality provided by conversational window commands are listed below:

Examples

| | |
|---|---|
| DEFINEWINDOW | defines a task conversational window |
| OPENWINDOW | opens a previously defined conversational window |
| CLOSEWINDOW | closes a conversational window |
| TITLEWINDOW | change the caption bar |
| CLEARWINDOW | clears a conversational window |
| OUTPUT | outputs text to a conversational window |

4.2 FLOW CONTROL AND EXECUTION

The execution sequence of task commands may be controlled by the conditional execution and looping capabilities. Frequently executed command sequences may be placed in a *procedure*. Task data may be stored in *variables*.

Examples

| | |
|---|---|
| IF..ELSE..ENDIF | conditional execution |
| WHILE..ENDWHILE | looping |
| PROCEDURE..ENDPROC | defines a *procedure* or subroutine |

Class Independent Commands

| | |
|---|---|
| DO | executes a procedure |
| RETURN | exit a procedure returning to the command following the DO statement |
| GOTO | unconditional jump |
| <var> = <expr> | assignment |

4.3 FOCUS COMMAND

The FOCUS command needs additional discussion since it results in both compile time and run time actions. The syntax is

```
FOCUS  [ [ON]   <classname>  "<title string>" ]
       [ [OFF]                                 ]
```

where <classname> refers to the *class* of object (e.g. DOCUMENT, FOLDER) and "<*title string*>" is the title of the specific object referenced. When a class of objects is installed, its classname is added to those recognized by the parsers.

When a task is executed, the majority of the commands will result in the Agent sending a message to the object which currently has the focus. The parameters of this message comprise a command which will direct the object to change its state. At run time, the FOCUS command tells the Agent which object is the target of subsequent command messages. At compile time it has another role. It controls selection of the class parser which will parse Class Dependent commands and generate the external command form. Commands are compiled sequentially in the order received. However, the order in which commands are actually *executed* at run time will seldom, if ever, be completely sequential. Conditional execution (IF, WHILE), jumps (GOTO), procedure execution (DO), user variables, etc. virtually guarantee that there is no way to make a determination at compile time which object will have the focus at runtime. The FOCUS command sets a *compile time* focus. In effect, it determines which Class Dependent parser will parse the commands following it. The command

```
FOCUS  DOCUMENT "Orders Report"
```

will cause all Class Dependent commands to be parsed by the Document parser until another FOCUS command is encountered. If the class and title parameters are missing, only class independent commands will be accepted by the parsers until another FOCUS statement is encountered. The main effect of this command is to reduce compilation time.

The following example illustrates the compile time and run time behavior of the FOCUS command. It displays a conversational window asking the user if he wishes to see his spreadsheet. If so, it opens it and calls a procedure which executes some spreadsheet commands.

Example

```
TASK  'this task illustrates the FOCUS command

'Get user input via a message box with YES and NO pushbuttons
MESSAGE  a#  "Do you want to see your spreadsheet?"  YESNO
'If a# = 1, user pressed YES
'If a# = 2, user pressed NO

IF  a# = 1
'direct commands to desktop
    FOCUS  OFFICE_WINDOW  "NewWave Office"
    title#  =  "Your Spreadsheet"
```

```
    SELECT  SPREADSHEET  title#
    OPEN
    DO SS_STUFF
ENDIF

'Focus again on the Desktop to be safe at run time
'Note that without the FOCUS command, commands will be parsed by the
'OFFICE_WINDOW parser, but, at run time, commands will be sent to the object
'which has the focus at return from ss_stuff OR no object will have focus,
'depending on the value of a#.

FOCUS  OFFICE_WINDOW  "NewWave Office"
    :
< more commands >
    .
ENDTASK

PROCEDURE  SS_STUFF
'Set compile and run time focus
'Note that without the following FOCUS command, commands will be parsed
'by the parser which has the focus at the ENDTASK command, but, at run time,
'commands will be sent to the OFFICE_WINDOW object, NewWave Office.

FOCUS  SPREADSHEET  title#
    :
< spreadsheet commands >
    .
CLOSE
RETURN
ENDPROC  'run time focus is still on the spreadsheet
```

4.4 INTERRUPT COMMANDS

Interrupt commands are available which enable the task to take action if a system variable is modified by the Agent. For example

ON ERROR DO ERRORPROC will cause the routine ERRORPROC to be executed if the Agent detects a task execution error. See Appendix A.

4.5 COMMAND PRECEDENCE

Class Dependent commands have precedence over Class Independent commands. If a FOCUS command is in effect, the command is passed to the class parser specified by it. If that parser returns an error, the command is passed to the Class Independent parser which will either parse it or cause a compile error to be displayed. However, to minimize user confusion, developers should avoid conflicts with Class Independent command verbs.

CLASS DEPENDENT COMMANDS

SECTION 5

A Class Dependent command sends a run time message to an application which will cause it to change its state. Both the Task Language form (which the task writer enters) and the external form (the task compiler output which the Agent sends to the application) are defined by the application. Many Class Dependent commands are common to most, if not all, applications. It is important that the Task Language form of these look as similar as possible. Command id numbers found across classes are predefined in NWAPI.H. The command keyword is the literal define with API__ and _CDCMD removed. These predefined values are provided for the convenience of application developers. Some of the more common Class Dependent commands are discussed in this section. Information about commands may also be found in the NWAPI.H file.

Reiterating, if a command matches a menu command, its keyword should match the command on that menu.

5.1 SELECTION COMMANDS

In New Wave all applications will support some form of selection although the action will vary depending on the application. This section describes selection commands for common types of applications. Developers should use the most appropriate model as a guide when defining their selection commands.

The concept of *selection* is described in the User Interface Design Rules. Interactively, selection usually reflects keyboard input or some form of mouse click by the user. It can be either absolute or relative. Selecting the folder named "Orders" on your Desktop, or cells A1 through B6 in a spreadsheet is an *absolute* selection, whereas selecting the next two words in a document is *relative*. In the second case, the portion of the document selected clearly depends on where the selection starts. The commands must make this differentiation. Task Language defines both absolute and relative selection. Not all objects will implement both modes - those that do will provide a user toggle to allow recording in either mode. It is important to understand the distinction between absolute and relative when specifying Task Language commands.

5.1.1 General Syntax

This section describes general syntax of selection commands. Later sections include examples of selection command syntax for some common object types.

5.1.1.1 SELECT

The SELECT command is an absolute selection of a single element or a range of elements. Any previous selection is deselected. The corresponding user action is a mouse selection. The syntax is:

```
SELECT <parm-1> [ TO <parm-2> ]
```

The format of the *<parm-i>* depends on the application. The TO clause is used to designate the selection of a range or a number of items.

5.1.1.2 DISJOINT_SELECT

The DISJOINT_SELECT command is an absolute selection of a single element or a range of elements. Previous selections are not affected by this command. The corresponding user action is a mouse selection with either the shift key or control key depressed, depending on the application. The parameters are the same as those in the SELECT command.

```
DISJOINT_SELECT <parm-1> [ TO <parm-2> ]
```

5.1.1.3 ADJUST_SELECTION

The ADJUST_SELECTION command changes the set of items or modifies the boundaries of the range of the currently selected items. If the current selections are disjoint, the most recent selection will be adjusted. The general syntax is:

ADJUST_SELECTION [*<handle-parm>*] [ TO ] *<location-parm>*

The form of *<location-parm>* determines if the selection is absolute or relative. Some applications such as imaging or graphics require an additional parameter ( *<handle-parm>* ) to indicate the location through which the area is to be adjusted.

5.1.1.4 DESELECT

The DESELECT command removes all current selections. It has no parameters.

5.1.1.5 SELECT_ALL

The SELECT_ALL command selects the entire object, e.g. all items in the current window, the entire spreadsheet, document, table etc. It has no parameters.

5.1.1.6 Keyboard Commands

Cursor key commands are relative selection commands. They are most frequently used in the context of a two dimensional object such as a spreadsheet or a table.

LEFT [*<int>*]

RIGHT [*<int>*]

UP [*<int>*]

DOWN [*<int>*]

*<int>* indicates the number of cursor movements; if omitted, one is assumed. The item under the cursor will be selected. Previous selections are deselected. In some cases these commands form the parameter syntax for a relative ADJUST_SELECTION. For example,

ADJUST_SELECTION RIGHT 3 extends the current selection three units to the right.

Certain keyboard actions are intrinsically absolute, e.g. pressing the *Ctrl Home* or *Ctrl End* keys. Commands which reflect such actions are defined to be absolute in nature; any selection which occurs as a by-product of these commands is considered absolute.

5.1.1.7 Other Relative Commands

Certain object types are linear in nature. For example, a document is essentially a character stream. Relative movement is accomplished by positional commands:

NEXT *<parm>* [*<int>*]

PREVIOUS *<parm>* [*<int>*]

*<parm>* is some unit, expressed as a keyword, which makes sense in the context of the object (e.g. WORD, LINE, etc.) and *<int>* indicates the number of units from the current selection point. Previous selections are deselected. In most cases, the result of these commands will be an empty selection.

Since the parameters and syntax of selection commands vary widely with the object, we will refine the preceding definitions with examples of representative object types.

5.1.1.8 Recording Repeated Relative Commands

When two identical or related commands are recorded, the application may, at its discretion, overwrite the first command and increment the [<int>] parameter. For example,

```
LEFT
LEFT
```

may be replaced by

```
LEFT 2
```

The user should be able to turn off this overwriting if desired. Certain procedures such as CBT or animation may need the multiple command mode.

5.1.2 Container Objects

For container objects such as folders or the Desktop, all selections are absolute. The items are selected from icons or lists, and their parametric representation in the corresponding Task Language command is the class name keyword and title string. The following commands are supported:

Container Object Selection Syntax

```
SELECT            <classname>  "<title>"

DISJOINT_SELECT   <classname>  "<title>"

DESELECT

SELECT_ALL
```

A DISJOINT_SELECT is accomplished interactively by clicking on an item while holding down the Shift key. In container objects, this command is a toggle. A previously selected item will be deselected while an unselected item is selected. No change is made to the select status of the other items in the container.

Example

The command

```
SELECT FOLDER "August Orders"
```

represents a mouse click on the icon representing "August Orders", which will be highlighted. Any items previously selected will be deselected. The sequence

```
SELECT_ALL
DISJOINT_SELECT FOLDER "August Orders"
```

results in the selection of all icons in the container *except* the "August Orders" folder.

5.1.3 Table Objects

Table objects are two dimensional objects such as database tables and spreadsheets. They support both relative and absolute selection. In spreadsheets selection granularity is based on cells. At least one cell will always be selected. Absolute selection parameters are cell references or cell ranges. A user-defined name for a cell range may also be used as a selection parameter. Database tables behave similarly, but a "cell" is really a field in a record and the absolute selection parameter is expressed in terms of row and column. In table objects, the keyboard commands, used for relative selection, may be used both as commands or as parameters of the ADJUST_SELECTION command.

To set the context, we give a brief review of interactive selection in table objects. A cell is selected by clicking on it with the mouse or using the cursor keys until the desired cell is highlighted. Continuing to hold the button down and moving the mouse over the table, or holding the shift key down and moving the cursor keys will highlight (select) a rectangular area, a *range* of cells. The original cell is the *anchor* cell while the cell diagonally opposite the anchor is the *movable* cell. If only one cell is selected, it is both anchor and movable. Adjustments to the selected area will be along the sides of the rectangle which intersect at the movable cell. At the end of the adjustment, the new movable cell will be the cell diagonally opposite the anchor. The anchor will not have changed.

Selection Syntax

```
SELECT              "cell parameter"  [TO "cell parameter"]

DISJOINT_SELECT     "cell parameter"  [TO "cell parameter"]

ADJUST_SELECTION    [TO] {  "cell parameter"   }
                         { <keyboard command> }

SELECT_ALL

KEYBOARD COMMANDS

                    LEFT          [<int>]

                    RIGHT         [<int>]

                    UP            [<int>]

                    DOWN          [<int>]
```

For spreadsheets *"cell parameter"* is a string expression containing a cell location, e.g. "C10", or a cell range, e.g. "J1...M10". For database tables the absolute selection parameter is expressed in terms of row and column using the following syntax forms.

```
SELECT  [ROW <int>] [ COLUMN {"<fieldname>"} ]
                    [        {   <int>    } ]
```

Note that the column can be expressed either as a field name string or a numeric. If the ROW parameter is omitted, the column selection is across all rows. If the COLUMN parameter is omitted, the row selection is across all columns. The following syntax defines selection of rectangular area.

```
SELECT  ROW <int> COLUMN {"<fieldname>"} TO ROW <int> COLUMN {"<fieldname>"}
                         {   <int>    }                      {   <int>    }
```

Note that in this case all row and column parameters must be present.

Examples

```
LEFT 3
```

selects the third cell or field to the left of the current selection, which is now deselected. The sequence

```
FOCUS SPREADSHEET "September Orders"
SELECT "A1...C3"
DISJOINT_SELECT "D4"
ADJUST_SELECTION DOWN 4
```

selects the cells from A1 through C3 plus D4 through D8.

5.1.4 Document Objects

A document may be considered in the context of a stream of characters, essentially a one dimensional object. Selection begins with a point called the *edit point* and ends with the cursor position. It may be empty ( cursor and edit point coincide), forward or backward, relative or absolute. When a selection is adjusted, it is from the edit point to the new cursor position. A document may not necessarily support disjoint selection. The absolute selection parameters consist of a page number, possibly optional, with horizontal and vertical offsets relative to the page. The offsets are in some local linear measurement unit. Possible units include inches, millimeters, line number and character on the line, etc. Relative selection parameters are in syntactic units such as CHARACTER, WORD, LINE, PARAGRAPH, etc.

Selection Syntax

SELECT [PAGE <*page number*>] <*x offset*>, <*y offset*>
[TO [PAGE <*page number*>] <*x offset*>, <*y offset*>]

ADJUST_SELECTION [TO] { [PAGE <*page number*>] <*x offset*>, <*y offset*> | <*keyboard command*> }

SELECT_ALL

Keyboard Command Examples

NEXT <*syntactic unit*> [<*int*>]

PREVIOUS <*syntactic unit*> [<*int*>]

A relative command has the effect of deselecting any current selection and moving the cursor and edit point to coincide at the parametric units from the previous cursor position. It results in an empty selection.

Examples

```
FOCUS DOCUMENT "August Report"
 Move the cursor and edit point together, nothing is selected
  SELECT PAGE 2 1 INCH, 4 INCH
 Select the next two paragraphs
  ADJUST_SELECTION NEXT PARAGRAPH 2
 Deselect the last word
  ADJUST_SELECTION PREVIOUS WORD
```

5.1.5 Image and Graphics Objects

Absolute selection parameters for image and graphics objects are expressed in terms of coordinates on a grid. The ADJUST_SELECTION command requires the additional handle parameter to specify the side or sides of the selection area which will be moved. DISJOINT_SELECT is not supported in image objects. In a graphics object it acts as a toggle, deselecting an area if previously selected. Relative selection is supported for the ADJUST_SELECTION command.

Selection Syntax

SELECT <*x*> , <*y*> [ TO <*x*> , <*y*> ]

DISJOINT_SELECT <*x*> , <*y*> [ TO <*x*> , <*y*> ]

ADJUST_SELECTION *absolute*

ADJUST_SELECTION { TOP_LEFT | TOP_RIGHT | BOTTOM_RIGHT | BOTTOM_LEFT } [TO] <x> , <y>

ADJUST_SELECTION { TOP | BOTTOM } [TO] <y>

ADJUST_SELECTION { LEFT_SIDE | RIGHT_SIDE } [TO] <x>

ADJUST_SELECTION *relative*

ADJUST_SELECTION [LEFT | RIGHT] [<int>] [UP | DOWN] [<int>]

DESELECT

SELECT_ALL

Examples

```
10,10 to 50,100 will be selected
 SELECT 10,10 TO 50,100
'Top left or 10,10 becomes the anchor point
  ADJUST_SELECTION BOTTOM_RIGHT TO 30,70
'New selection area is 10,10 to 30,70
```

5.1.6 View Selection

View Selection. A View is selected in the coordinates of the object which contains it. Selecting any portion of the area which contains the View will select the entire View. User-defined marks may be associated with a View to simplify the Task Language command.

5.2 OBJECT MANIPULATION COMMANDS

Many applications will support some form of direct manipulation of objects. The supported syntax is defined below. The MOVE_TO and COPY_TO commands may refer to an object in either opened or iconic form. The operation is performed on the current selection. The WITHIN clause refers to an open object.

Object Manipulation Syntax

MOVE_TO <classname> "<*title*>" [ WITHIN <classname> "<*title*>"]

MOVE_TO "<*coordinates*>" [ WITHIN <classname> "<*title*>"]

COPY_TO <classname> "<*title*>" [ WITHIN <classname> "<*title*>"]

COPY_TO "<*coordinates*>" [ WITHIN <classname> "<*title*>"]

Again, "<*coordinates*>" is expressed in the context of the object, e.g. a spreadsheet cell, a graphics grid point, etc.

5.3 DATA MANIPULATION

Applications which support direct manipulation of data should use the same verbs and parameter syntax as in the object manipulation commands whenever possible. In addition, the following commands cause the application to move data and objects to/from the Clipboard.

Clipboard Commands

| | |
|---|---|
| COPY | copies the selection to the Clipboard |
| CUT | deletes the selection and places it on the Clipboard |
| PASTE | inserts the Clipboard contents at the selected location |
| SHARE | makes a *reference* to the selected item available to other objects |

5.4 WINDOW MANIPULATION

These commands alter the state of the current window. They are applicable only to windows in which the user could perform the action interactively.

Window Commands

| | |
|---|---|
| ACTIVATE | set the current active window |
| ADJUST_WINDOW | changes the size and/or location of the current window |
| MAXIMIZE | maximizes the current window size to full screen |
| MINIMIZE | changes the current window to iconic form |
| RESTORE | restores the iconic or maximized current window to its previous size |

5.5 MISCELLANEOUS COMMANDS

Certain commands will be supported by most applications. Refer to the User Interface Design Rules for further discussion.

5.6 REFERENCING SUBORDINATE WINDOWS

Most applications will need to support Task Language commands which reference *subordinate windows*. These windows may be either the main window of the application, subwindows, MDI windows, modeless dialog boxes, in fact, any window except modal dialog boxes. The Task Language must identify the target window. For example, if an object has two subordinate windows visible, the script must be able to specify which (or possibly neither) an ADJUST_WINDOW command is to move or size. All window manipulation commands fall into this category. Many applications will find a similar situation with other commands such as the Clipboard CUT, COPY, and PASTE. Task Language uses the Class Dependent ACTIVATE command plus a *window identifier* to set the current active window. The following guidelines apply for referencing subordinate windows.

1. If the subordinate window is a modeless dialog box which is opened by the task via a command verb, use the same keyword as the window identifier, e.g. ATTRIBUTES to identify the Desktop dialog box.

2. If the subordinate window is an application child window which is user created or has a caption bar which is user created, use a string parameter as the window identifier, e.g. the date windows in the Agent's Desk Calendar.

3. If the command can be applied to the main window of the application as well as one or more subordinate windows, the window identifier parameter is optional. The absence of this parameter indicates the main window of the application.

5.6.1 ACTIVATE Command

The ACTIVATE command sets the current active window. All applications must support it if they have subordinate windows. Commands following an ACTIVATE command which are directed to a particular window will be sent to that window until the current window is changed, either explicitly with another ACTIVATE or implicitly. The syntax is:

```
ACTIVATE [<window identifier>]
```

The *<window identifier>* parameter is used to designate the window as in the case of a modeless dialog box. If this parameter is not present, the main window of the application is assumed. However, the keyword parameter MAIN may also be used to designate the application main window.

5.6.2 Implicit Window Activation

Certain commands carry implicit window activation. When they are executed, the window acted upon becomes the current active window. An ACTIVATE command may be used as well, but it is redundant. The following command types imply activation.

1. Any command which opens a subordinate window activates that window. For example, if a command opens a modeless dialog box, that box is then the current active window.

2. Any command which is completely unambiguous in the window it references implies an activation of that window. For example, the CHANGE_ATTRIBUTES Desktop command is only applicable to the CHANGE_ATTRIBUTES dialog box and therefore would imply activation of it.

5.6.3 ADJUST_WINDOW Command

The ADJUST_WINDOW command is used to change both the size and location of the selected window. The window must be of a type such that the user could perform these operations on it in interactive mode, e.g. the main window of an object or a modeless dialog box. A single command is used since it is difficult to resize a window without moving it. The syntax is

```
ADJUST_WINDOW [TO <width> [BY] <height>]
              [AT <point-location>]
```

5.7 KEYWORDS AND PARAMETERS

This section summarizes some of the rules for parameters.

1. The keyword parameters ON and OFF are used to define the state of checkboxes in dialog boxes and of toggle type menu commands.

2. When referencing an object by its class and title use the sequence <classname> *<title>* where <classname> is a keyword identifier referring to the class of object (e.g. SPREADSHEET) and *<title>* is a string parameter containing the title of the specific object. Do not use noisewords such as WITH TITLE in this context. They add to verboseness and do not improve readability.

3. When referencing locations, use a parameter of data type *point*. If needed, the parameter may be prefaced with the keyword AT, optionally to improve readability or required to disambiguate.

4. ON, OF, etc. may be used as noisewords after the command verb if doing so makes the command more grammatically correct in the context of an English sentence.

   ```
   CHANGE_TITLE [OF] DOCUMENT "Orders" TO "August Orders"
   ```

5. The keyword QUIET is an optional parameter in commands which open modeless dialog boxes. When present, the box is invisible during task execution although the commands changing its state will be executed. Otherwise, the default, the box is displayed.

6. The keywords should be identical whenever possible to the selections the user chooses when performing the same action interactively. If the selection contains more than one word, the keyword phrase should replace the blanks with the underline character.

DATA TYPES AND FORMATS

SECTION 6

Data is used in commands to control their specific actions. Task Language supports five types of data. These are *integers*, *real numbers*, *strings*, *points*, and *regions*.

6.1 INTEGER CONSTANTS

*Integer constants* are represented by strings of digits (0,1,2,3,4,5,6,7,8,9). Integer constants may begin with a *unary minus* operator (-). e.g.,

Example

```
1
10743
0
-12
```

6.2 REAL CONSTANTS

*Real constants* are represented in Task Language by zero or more digits that are followed by a single decimal point (.) and another string of digits. Scientific notation is also supported. Below are some examples of real constants.

Example

```
23.5
0.0
-1056.12345
-0.14322
.234
1.23E-9
```

During parsing, all real constants are stored in double precision format. However, the Agent can handle both single and double precision real constants as command parameters at run time.

6.3 STRING CONSTANTS

*String constants* are represented by strings of printable characters (not control codes, ALT-characters, or escape) that are enclosed in quotes as follows:

Example

```
"This is a string"
"a"
"COST = $23.00"
"%&$#@?!@&*..."
```

The only character that cannot be in a string constant is the quote, because the quote would be mistaken for a string terminator. However, a quote can be represented in a string constant by repeating the quote character. The CHR function may also be used. The commands

```
OUTPUT "This is a quote "" in a string."
```

and

```
OUTPUT "This is a quote " + CHR(22) + " in a string."
```

would both display the following in a conversational window.

```
This is a quote " in a string.
```

6.4 POINT CONSTANTS

*Points* are used to identify locations on the computer screen. *Point constants* have the format *(x,y)*, where *x* and *y* are integers or 0 and are in units of screen coordinates. The exact metric or granularity may be context dependent; however, it is *not* row, column. See the SCREEN command in Appendix A for a discussion of physical and logical screen coordinates.

Example

```
(0,0)
(639,349)
(50,50)
(12,3)
```

The EDITBOX and PUSHBUTTON Task Language commands have point data type parameters.

6.5 REGION CONSTANTS

*Regions* are used to identify rectangular areas on the computer screen. *Region constants* have the format *((x,y),w,h)*, where *x*, *y*, *w*, and *h* are all positive integers or 0 and are in units of screen coordinates. *(x,y)* is a point constant and represents the upper-left corner point of the region while *w* and *h* represent the width and height of the region. Below are two examples of region constants.

Example

```
((0,0), 640, 350)
((20,20), 50,100)
```

The DEFINEWINDOW command, which defines a user conversational window, has a region type parameter.

Example

```
DEFINEWINDOW MYWINDOW ( (10,50), 200, 250 ) POPUP "Test Window"
```

6.6 AGENT INTERNAL DATA TYPES

Certain commands cause the Agent to store a value into a variable (either system or user) that is not one of the standard data types. This data is needed by the Agent to monitor some aspect of the task. Variables containing non-standard data types should not be modified by the Task Language script, and the data in them cannot be displayed with Task Language commands. To illustrate, the PUSHBUTTON command causes a button id to be stored in a user variable. Using that variable later as a parameter in the TESTBUTTON function call will return the state of that button, i.e. 1 if pushed else 0.

Example

```
TASK  'illustrates the PUSHBUTTON command and internal data types
DEFINEWINDOW MYWINDOW ( (10,50), 200, 250 ) POPUP "Task Window"
OPENWINDOW MYWINDOW
'   :
'The actions start here
LABEL DO_WORK
   :
   < action commands >
   .
'See if the user is ready to quit
CLEARWINDOW MYWINDOW  'clear the window and home the cursor
OUTPUT "Do you want to stop now?"

'Display the pushbuttons
PUSHBUTTON MYWINDOW go# "Continue" AT (5, 25)
PUSHBUTTON MYWINDOW stop# "Quit" AT (50, 25)
'go# and stop# contain the button ids for the pushbuttons.  Button ids
'are internal agent data types

WAIT  'for user to push a button
IF TESTBUTTON( go# ) <> 0
  GOTO DO_WORK
ENDIF

CLOSEWINDOW mywindow
ENDTASK
```

Further explanations of internal data types are found in the descriptions of the commands using them.

VARIABLES

SECTION

7

Variables are used to store data which can then be accessed by a task at a later time. Variable identifiers are identical to keyword identifiers with the exception that the *last* character is a pounds sign, "#". Variables assume the type of the data stored into them.

7.1 USER VARIABLES

User variables are defined by the user to hold data needed to execute the task correctly. Data is stored to a variable by an assignment statement.

Example

```
text# = "hello world!"
```

The user variable text# now has the value "hello world and is of type string. If, later in the task, text# is assigned a numeric value, its type will change accordingly. Since variable types can change, they are not initialized or typed at the start of a task. Accessing data in a variable before a value has been assigned to it results in a a run-time error.

Certain commands, e.g. INPUT and MESSAGE, take a user variable as a parameter. Information obtained as a result of the execution of these commands is stored in the variable and is then available to the task.

EXPRESSIONS

SECTION 8

The Task Language supports arithmetic, string, and logical expressions. A command which specifies a user supplied literal as a parameter should also accept an expression as that parameter.

```
SELECT DOCUMENT "August Orders"
```

and

```
month# = "August"
SELECT DOCUMENT month# + " Orders"
```

will result in the same action at task execution time.

Variables may be used as terms in expressions. Since the type of the data in a variable cannot be determined at compile time, validity of the data in expressions will be checked by the Agent at run-time.

8.1 ARITHMETIC AND STRING EXPRESSIONS

The following are valid terms in an expression:

- a data constant
- a variable
- an expression enclosed in parenthesis

Operations involving both real and integer terms are supported; the result will be a real. Although both single and double precision reals are supported, the result of any expression involving reals will be double precision.

Arithmetic Operators

| | |
|---|---|
| + | addition |
| - | subtraction |
| * | multiplication |
| / | division |

String Operator

| | |
|---|---|
| + | concatenation |

8.2 POINTS AND REGIONS

Operations on point and region constants are not supported. However, any integer element of a point or region constant may be replaced by a numeric expression. e.g.,

```
(10, 2*a# + 1)
((a#, b#), c#, d#)
```

8.3 RELATIONAL EXPRESSIONS

Two valid expressions of the same type may be joined by a relational operator to form a *relational expression*. Relational expressions may be used as the conditional in IF and WHILE statements.

Relational Operators

| | |
|---|---|
| = | equal |
| < | less than |
| > | greater than |
| <= | less than or equal |
| >= | greater than or equal |
| <> | not equal |

Strings are compared character by character using an appropriate collating sequence as the comparision basis. The comparision terminates with the first instance of non-identical characters or the end of one of the strings. If the comparision reaches a terminating character, the relation is "equal to" if both strings are the same length else the longer string is consider greater than the shorter. The comparision is case sensitive. if compared, "hello" will be greater than HELLO". The result of a relational expression is not presently a recognized data type.

8.4 LOGICAL EXPRESSIONS

Relational expressions may be joined by AND or OR, or prefixed by NOT to form *logical expressions*. Logical expressions may also be used as conditionals.

Example

```
TASK
   :
MESSAGE "Continue?" YESNO answer#

IF answer# = 1 AND title# <> ""
   SELECT DOCUMENT title#
ELSE
   GOTO FINISHED
ENDIF
   :

LABEL FINISHED
ENDTASK
```

NOTE

AND, OR, and NOT are used as logical operators and should not be used as keywords in commands.

FUNCTIONS

SECTION 9

Task Language functions are very much like functions found in conventional programming languages. They are used to provide information to the Agent Task and, as such, return a value which may be assigned to a variable. The *type* of the function is the data type of the value it returns. If the function type is appropriate, the functions itself may be used as a parameter for a Task Language command. If the type is numeric or string, the function may be used as a term in an expression.

A function may have relaxed type restrictions on some parameters (e.g. real or integer, numeric or string). The return value may be similarly relaxed.

Optional parameters are permitted but should follow any required parameters.

9.1 BASIC SYNTAX

A function has the format:

```
<function name>( [parm1 [, parm2]...] )
```

where <function name> is a keyword identifier. Note that function parameters, unlike command parameters, are positional and separated by commas. A function parameter may be an expression or another function.

9.2 CLASS INDEPENDENT FUNCTIONS

Class Independent functions can be used across applications. When the function type is appropriate they can be used in both Class Independent and Class Dependent commands. Most Class Independent functions are used for data manipulation or conversion, although functions are provided to interrogate elements in conversational windows.

9.2.1 Data Manipulation Functions

Table 1.2 contains a synopsis of the data manipulation functions implemented for Core Wave.

Functions

Table 1.2. Class Independent Functions, Data Manipulation

| Name | Type | Parameters | Return Value |
|---|---|---|---|
| EDITBOX | string | id of editbox | text in the editbox |
| TESTBUTTON | integer | button id | 1 if pushed else 0 |
| ABS | numeric | any numeric | absolute value of parameter |
| ASC | integer | string | numeric Ascii value of first character of string |
| CHR | string | integer | returns integer argument as 1 character string |
| FIND | integer | substring to find, source string, location in search string | returns location of substring in search string |
| INT | long | real | returns integer portion of parameter |
| LEFT | string | source string, length of substring | returns string of leftmost characters |
| LEN | integer | string | returns number of characters in the string |
| MID | string | source string, start of substring extract, length of substring | returns extracted substring |
| MOD | integer | integer1, integer2 | returns remainder of integer1/integer2 |
| RIGHT | string | source string, length of substring | returns string of rightmost characters |
| STR | string | any numeric, number of decimal places* | returns Ascii string of the parameter |
| SYS_ERROR | integer | none | returns error number of last execution error |
| NUM | integer | string | returns 1 if parameter converts to a numeric, else 0 |
| VAL | numeric | string | returns numeric value of string |

*Optional parameter, post Core Wave extension

CAUTION

The *functionality* of the preceding functions will be provided although the names and parameter structure may change.

9.2.2 Interrogation Functions

A task may need access to data within an application. For example, the execution flow of a task may depend on the value of a cell in a spreadsheet. The Clipboard interrogation functions make the data on the Clipboard available to the task. The same data is available to the application via the CUT, COPY, and PASTE commands.

Clipboard Functions

`GetClipboardData()` returns a string containing the data on the Clipboard. If the Clipboard is empty, it returns the null string. `GetClipboardData` has no parameters.

`PutClipboardData()` puts the string referenced by the string parameter onto the Clipboard. It returns a non-zero value if the operation succeeded, zero if it failed.

WARNING

These definitions are VERY, VERY preliminary.

9.3 CLASS DEPENDENT FUNCTIONS

Class Dependent functions are used for two purposes:

1. To provide information or data of a type that is very application specific.
2. To interrogate an object to receive information on its state, e.g. request the contents of an element in a dialog box.

Class Dependent functions may be used in the Class Dependent commands of that particular application.

< example should go here. . . >

LOCALIZATION

SECTION 10

< to be added . . . >

CLASS INDEPENDENT COMMAND SYNTAX

APPENDIX A

A.1 COMMAND SYNTAX EXPLANATION

This appendix describes the details of the Class Independent commands of Task Language which have been implemented for Core Wave. Each description includes a formal syntax description, as well as textual information about parameters and a general explanation of its purpose. Some descriptions also include examples.

Syntax

```
LOCATE [id.window] [int.exp.row, int.exp.col]
```

Above is a sample syntax description for the LOCATE command. In syntax descriptions, keywords and keysymbols are UPPERCASE-BOLDFACE (e.g., LOCATE and , ). These are words that must be used literally (except for upper and lowercase), as they are shown. Any words that are *lowercase-italic* (e.g., *id.window*, *int.exp.row*, and *int.exp.col* ) should be replaced by user-supplied data and identifiers. The lowercase-italic words are specially named to provide information about what should be used to replace them. For instance, *id.window* should be replaced by a window identifier. Any portion of a syntax description that is enclosed within square brackets is optional. So, a window identifier does not have to be included in every LOCATE command.

Each lowercase-italic name is composed of up to three words that are separated from one another by periods. The first word is always used. It specifies the basic type of data that must be used. The options for this first word are:

Basic Data Types

| | |
|---|---|
| *any* | any of the basic data types |
| *id* | an identifier (name of a variable, window or label) |

| | |
|---|---|
| *int* | an integer |
| *key* | a keyword identifier |
| *num* | a number (either integer or real) |
| *pnt* | a point |

Class Independent Commands

| | |
|---|---|
| *real* | a real number |
| *rgn* | a region |
| *str* | a string |
| *log* | an expression that evaluates to a logical (boolean) value, i.e. either true or false |

The middle word is optional. If used, it specifies any further restrictions on the form the data must take (constant, variable or expression).

Parameter Type Restrictions

| | |
|---|---|
| *con* | constant |
| *exp* | expression |
| *var* | variable |

Any place where an expression can be used, a constant, variable or function could also be used.

The last descriptor is always a name. This is some meaningful name that indicates the purpose of the data, such as *col* for column number.

Comments

Any text following a "'" character (single quote) is treated as a comment and ignored by the Task Language compiler.

ASSIGNMENT assign a value to a variable

Syntax

```
any.var  =  any.exp
```

Parameters

| | |
|---|---|
| *any.var* | a variable of any type. |
| *any.exp* | any valid expression that returns data of a valid Task Language data type. |

Description

The expression *any.exp* is evaluated and reduced to a single value. The resulting value is assigned to the variable *any.var*. *any.var* will be cast to the appropriate type if necessary.

Example

```
pi# = 3.14159

title# = month# + " Orders"
```

BEEP

Produces an audible tone

Syntax

```
BEEP  [int.exp.duration]  [int.exp.pitch]
```

Parameters

| | |
|---|---|
| *int.exp.duration* | how long to sustain the tone in tenths of seconds. |
| *int.exp.pitch* | the pitch (0 is the lowest pitch, and 255 is the highest). |

Example

```
BEEP 10 150
```

C_EARWINDOW

Clear a user conversational window

Syntax

```
CLEARWINDOW  [id.window]
```

Parameters

*id.window* — a user defined window name. If absent, current window is referenced.

Description

Clears the contents of the named or current window (including controls) and homes the cursor.

Example

See DEFINEWINDOW.

CLOSEWINDOW

Close a conversational window

Syntax

```
CLOSEWINDOW  [id.window]
```

Parameters

*id.window* — a user defined window name.

Description

If specified, *id.window* is closed. Otherwise, the current window is closed.

Example

See DEFINEWINDOW.

Define a user conversational window

Syntax

```
DEFINEWINDOW  id.window rgn.exp.size { CBT   } [str.exp.title]
                                     { POPUP }
```

Parameters

| | |
|---|---|
| *id.window* | user defined window name identifier |
| *rgn.exp.size* | region expression specifying the *region*, i.e. the size and location, of the window on the screen |
| CBT \| POPUP | keyword specifying the window style |
| *str.exp.title* | the title of the window. If the window is type POPUP and a title parameter is present, the window will be created with a caption bar and the title will be centered in it unless the title is the null string (""). If the title parameter is not present, no caption bar is created. CBT style windows are always created without caption bars. They have a title line at the top of the window unless the title is the null string (""). |

Description

Defines a window that can be used to converse with the user. Once defined, windows can be opened (OPENWINDOW) and closed (CLOSEWINDOW). Text can be displayed within an open window using a range of conversational commands. Controls (e.g., pushbuttons) can be used inside open windows to prompt for input.

NOTE

The DEFINEWINDOW command does not define or redefine the current window.

The following example illustrates several conversational window commands.

DEFINEWINDOW

Example

```
TASK   Simple conversational window example
  DEFINEWINDOW TEST_WINDOW ((10,50), 200, 250) POPUP "Test Window"
```

```
    OPENWINDOW TEST_WINDOW          'Open it and make it the current window
    PAUSE 3                         'Wait a bit
    CLOSEWINDOW                     'And close it

    TITLEWINDOW TEST_WINDOW "New Title"     'Change the title
    OPENWINDOW TEST_WINDOW                  'Open it again
    OUTPUT "Hello world!"                   'Write to it
    PAUSE 3                                 'Wait
    CLEARWINDOW                             'Clear the screen
    CLOSEWINDOW TEST_WINDOW                 'Close it

ENDTASK
```

DO

Execute the procedure *id.label*.

Syntax

```
DO   id.procname
```

Parameters

*id.procname* a user defined name of a procedure.

Description

Both DO and GOTO commands are use to transfer control from one place in an Agent Task to another. When control is transferred to a procedure with a DO command, it is temporary. Control is transferred to the command following the DO command either explicitly with a RETURN statement or by executing the last statement in the procedure.

Example

See PROCEDURE...ENDPROC.

EDITBOX

Creates an editbox in a conversational window.

Syntax

```
EDITBOX  id.window id.var int.exp.length AT pnt.exp.location
```

Parameters

| | |
|---|---|
| *id.window* | user defined window name identifier |
| *id.var* | a user variable which will receive the editbox id. After the command is executed, *id.var* contains internal Agent data and should never be modified by the task script. |
| *int.exp.length* | length of the editbox in logical screen coordinates |
| *pnt.exp.location* | the location (in logical window coordinates) for the upper left-hand corner of the editbox. |

Description

Creates and displays a conversational editbox in the indicated conversational window. The editbox consists of a rectangle of the standard font height and of varying width, with upper left-hand corner at point *pnt.exp.location*.

The editbox is identified by the contents of *id.var*. *id.var* is the parameter of the EDITBOX function which is used to return the current text of an editbox.

Example

See WAIT.

END

Terminates execution of a task.

Syntax

```
END
```

Parameters

None.

Description

Halts execution of the task. Commands may occur after the end statement if it is not intended to be reached in a sequential fashion of execution. If the ENDTASK statement is reached without encoutering an END, the END is implied and execution terminates.

FOCUS

Changes focus to a specified object.

Syntax

```
FOCUS [[ON]  id.classname str.exp.title]
      [[OFF]                           ]
```

Parameters

| | |
|---|---|
| *id.classname* | the keyword identifier which specifies the class of the object. Examples are FOLDER or DOCUMENT. |
| *str.exp.title* | the object's title. |
| OFF | optional keyword to remove object focus |

Description

Changes focus to the specified object within the object that has current focus. This object will receive class dependent commands until another FOCUS command is processed. If the class and title are not present, no object has the focus and only class independent commands are valid until another FOCUS command is processed.

NOTE

Compile time command processing is completely sequential. The programmer must ensure that his FOCUS commands direct commands to the appropriate object at run time.

Example

```
FOCUS ON DOCUMENT "Summer Report"
```

GOTO

Transfers control to a labelled statement

Syntax

```
GOTO  id.label
```

Parameters

*id.label* a user defined statement label.

Description

The next statement that is executed after the GOTO is the one that is identified by the label *id.label*, interrupting normal sequential execution.

Example

See INPUT

IF ... ELSE ... ENDIF

Conditional execution

Syntax

```
IF  log.exp.condition
    if-statements
[  ELSE
   else-statements  ]
ENDIF
```

Parameters

| | |
|---|---|
| *log.exp.condition* | a conditional expression (one that has a true or false value). |
| *if-statements* | any number of Task Language commands. |
| *else-statements* | any number of Task Language commands. |

Description

Depending on the result of evaluating the conditional expression *log.exp.condition*, either *if-statements* will be run if *log.exp* is true, or *else-statements* will be run if *log.exp* is false and there is an ELSE clause.

INPUT

Creates a window to prompt the user for input

Syntax

```
INPUT  user.var [LENGTH int.exp.length]  [str.exp.prompt]
```

Parameters

| | |
|---|---|
| *user.var* | a variable identifier which will receive the contents of the editbox after the task user completes his input |
| *str.exp.prompt* | an optional string expression displayed as text in the window |
| *int.exp.length* | number of characters in the editbox. If not specified, a default value is provided. |

Description

When the INPUT command is executed, a window is displayed in the center of the screen which contains the prompt string, if any, a single line editbox, and OK and CANCEL pushbuttons. When the user has completed his input, either by mouse click on a pushbutton or by pushing the *Enter* key, the results are placed in *user.var*. *Enter* or OK will result in the contents of the editbox assigned to *user.var*. CANCEL will put the null string into *user.var*. This will allow a task to get user input with a single command.

Example

```
TASK  'This task opens folders for the user
LABEL OPEN_FOLDER

'Use the INPUT command to get folder name
INPUT name# 50 "Enter folder name?"
IF name# = ""  'user pressed CANCEL button
   GOTO DONE
ENDIF

'else the user pressed ENTER or OK
FOCUS DESKTOP "NewWave Office"
SELECT FOLDER "name#"
OPEN
GOTO OPEN_FOLDER

LABEL DONE
ENDTASK
```

JUSTIFY

Justifies text in a conversational window.

Syntax

```
JUSTIFY  [LEFT  ]
         [RIGHT ]
         [CENTER]
```

Parameters

| | |
|---|---|
| LEFT | **left** justifies conversational window output |
| RIGHT | **right** justifies conversational window output |
| CENTER | **center** justifies conversational window output |

Description

Any text that is subsequently printed (with OUTPUT) to any conversational window will be justified (either LEFT, RIGHT, or CENTER) until a subsequent JUSTIFY statement is encountered. The default justification mode is LEFT. JUSTIFY is a global command; it operates on all defined conversational windows.

LABEL define a label

Syntax

```
LABEL  id.label
```

Parameters

| | |
|---|---|
| *id.label* | a user defined label. |

Description

The user name *id.label* identifies a statement for use with the GOTO statement.

Example

See INPUT.

LOCATE

Positions the cursor in a conversational window.

Syntax

```
LOCATE  [id.window]  [int.exp.row int.exp.col]
```

Parameters

| | |
|---|---|
| *id.window* | a user defined window name. |
| *int.exp.row* | a row for positioning text (measured in characters of the current font size). |
| *int.exp.col* | a column for positioning text (measured in characters of the current font size). |

Description

Can be used to do one or both of two things. Specifying *id.window* makes *id.window* the new current window. In this case it has the same functionality as the class dependent ACTIVATE command. Specifying *int.exp.row* and *int.exp.col* repositions the cursor of the [new] current window to the new row and column. LOCATE without any parameters does nothing.

Example

See WAIT.

MESSAGE

Creates a message window

Syntax

```
MESSAGE  user.var [str.exp.prompt]
         [HAND                ]  {OK                      }
         [EXCLAMATION_POINT   ]  {OKCANCEL                }
         [QUESTION            ]  {RETRYCANCEL             }
                                 {ABORTRETRYIGNORE        }
                                 {YESNO                   }
                                 {YESNOCANCEL             }
                                 {USER str.exp.button...  }
```

Parameters and Options

| | |
|---|---|
| *user.var* | a variable identifier which will receive the button id of the button clicked by the user |
| *str.exp.prompt* | an optional string expression displayed as text in the window |
| HAND | draw a hand icon in the window |
| EXCLAMATION_POINT | draw an exclamation point icon in the window |
| QUESTION | draw a question mark icon in the window |
| OK | draw one pushbutton labelled OK |
| OKCANCEL | draw two pushbuttons labelled OK and CANCEL |
| RETRYCANCEL | draw two pushbuttons labelled RETRY and CANCEL |
| ABORTRETRYCANCEL | draw three pushbuttons labelled ABORT, RETRY, and CANCEL |
| YESNO | draw two pushbuttons labelled YES and NO |
| YESNOCANCEL | draw three pushbuttons labelled YES, NO, and CANCEL |
| USER | draw up to three pushbuttons with user defined labels |
| *str.exp.button* | label text for the pushbuttons |

MESSAGE

Description

When the MESSAGE command is executed, a window is displayed in the center of the screen which contains the prompt string, if any, and pushbuttons as defined in the command. When the user clicks on a button, the value of that button is assigned to *user.var*. The values are consecutive integers with the left button having the value 1.

Example

```
TASK                     'Illustrate message box
   :
LABEL GO_AGAIN
   .
'Display a window with buttons YES and NO
MESSAGE test# "Do you want to continue?" yesno
IF test# = 1             'User pressed YES
   GOTO GO_AGAIN
ENDIF
'User pressed NO.
ENDTASK
```

Traps on any error condition

Syntax

```
ON ERROR DO   id.procname
```

Parameters

| | |
|---|---|
| *id.procname* | the name of a task procedure |

Description

Sets up a trap condition for Task Language program execution errors, New Wave application errors, and system errors. Upon the occurrence of an error while the Task Language program is running, the procedure identified by *id.procname* is executed. The special function SYS_ERROR() will return the error number. The RETURN statement will return control to the statement following the statement that was interrupted.

Example

```
TASK                          'Illustrates error trapping
   :
   .
'Set up the trap procedure
ON ERROR DO MYERRORTRAP
SET ERROR ON                  'Turn on error trapping
   :
   <more commands>
   .
ENDTASK

PROCEDURE MYERRORTRAP
'This procedure will be executed if an error occurs.
'It displays a message box with the error number
'and terminates the task.
'The error number is retrieved with SYS_ERROR().
   msg# = "Error number = " + STR( SYS_ERROR() )
   MESSAGE a# msg# HAND OK
   END
ENDPROC
```

ON ESCAPE DO

Traps on the escape key.

Syntax

```
ON ESCAPE DO   id.procname
```

Parameters

*id.procname* the name of a task procedure

Description

Sets up a trap condition. When the user presses the escape key (set by the SET ESCAPE command) the procedure identified by *id.procname* is executed. The RETURN statement will return control to the statement following the statement that was interrupted.

Example

See SET ESCAPE

ON TIMEOUT DO

Traps on a timeout

Syntax

```
ON TIMEOUT DO   id.procname
```

Parameters

*id.procname* the name of a task procedure

Description

Sets up a trap condition. Any time that the Task Language program is either in a WAIT loop or waiting for a return message from an application, timing begins. If the time exceeds the length of time that is assigned to a special variable, a timeout occurs. A timeout results in the execution of the procedure *id.procname*. The RETURN statement will return control to the statement following the statement that was interrupted. See SET TIMEOUT.

OPENWINDOW

Opens a conversational window.

Syntax

```
OPENWINDOW  id.window
```

Parameters

| | |
|---|---|
| *id.window* | a user defined window name. |

Description

Opens the window *id.window* and makes it the current window. *id.window* is required and must be defined with the DEFINEWINDOW command before it can be opened.

Example

See DEFINEWINDOW.

OUTPUT

Outputs text to a conversational window

Syntax

```
OUTPUT  [id.window] [str.exp.1; ... ; str.exp.n[;]]
```

Parameters

| | |
|---|---|
| *id.window* | user defined window name identifier |
| *str.exp.i* | (1<=*i*<=*n*), is a valid string expression. |

Description

A line of text is printed at the text cursor position in the conversational window specified by *id.window*. If *id.window* is not present, the current window is used. If no text strings are supplied, OUTPUT produces a linefeed. Otherwise, the value of each expression is printed in order. If there is a ";" as the last character, linefeed is suppressed.

Example

See WAIT.

PAUSE

Halts execution temporarily.

Syntax

```
PAUSE   int.exp.time
```

Parameters

*int.exp.time* the amount of time to pause, measured in seconds.

Description

Causes the system to pause for *int.exp.time* seconds before executing the next command in sequence.

Example

See DEFINEWINDOW.

PROCEDURE ... ENDPROC

Defines a procedure

Syntax

```
PROCEDURE   id.procname
  statements
ENDPROC
```

Parameters

*id.procname* a user defined procedure name

Description

The Task Language commands bracketed by the PROCEDURE and ENDPROC statements are executed when *id.procname* is the parameter of a DO statement.

Example

```
TASK  'Simple procedure example
   :
title# = "Important Report"
DO RPT_STUFF
FOCUS DESKTOP "NewWave Office"
   :
   < more commands >
   .
ENDTASK

PROCEDURE RPT_STUFF
FOCUS DESKTOP "NewWave Office"
SELECT DOCUMENT title#
FOCUS DOCUMENT title#
   :
   < commands >
   .
MESSAGE done# "Done?" YESNO
IF done# = 1
  RETURN
ENDIF
   :
   < more commands >
   .
ENDPROC
```

PUSHBUTTON

Draws a pushbutton in a conversational window

Syntax

```
PUSHBUTTON  id.window id.var str.exp.text AT pnt.exp.location
            [DEFAULT]
            [ESCAPE ]
```

Parameters

| | |
|---|---|
| *id.window* | identifies the conversational window in which to place the pushbutton. |
| *id.var* | a user variable which will receive the pushbutton id |
| *str.exp.text* | the text that is displayed inside of the pushbutton. |
| *pnt.exp.location* | the location (in logical window coordinates) for the upper left-hand corner of the pushbutton. |

Description

Creates and displays a pushbutton in the conversational window referenced by *id.window*. The pushbutton consists of a rounded rectangle that is large enough to contain the text *str.exp.text*. The upper left-hand corner of the rectangle is positioned at logical window coordinate *pnt.exp.location*. If the DEFAULT option is used, then the pushbutton has an extra thick border and can be selected by the user pressing enter, as well as in the normal way of mouse selection. If the ESCAPE option is used, then it can be selected by pressing the escape key as well as by mouse selection.

The pushbutton is referenced in function calls by *id.var*. For example, the TESTBUTTON function can be used to return the current status of a pushbutton.

Example

See WAIT.

RETURN

Exits a procedure

Syntax

```
RETURN
```

Parameters

None.

Description

Returns control to the statement that follows the DO statement that was most recently executed. All procedures end with an implicit RETURN statement.

SCREEN

Maps logical screen and window coordinates.

Syntax

```
SCREEN  int.exp.width int.exp.height
```

Parameters

*int.exp.width* the new screen width.

*int.exp.height* the new screen height.

Description

Changes the mapping of logical screen and window coordinates. The new mapping is to a logical screen size of *int.exp.width* by *int.exp.height* pixels, with the origin (0,0) in the upper left corner of the screen. Window coordinates will change, based on the new logical window units, which are equal to the new logical screen units. If there is no SCREEN command in effect, the logical window units are the same as the physical screen units (pixels) of the monitor of the system executing the task. This command allows the task writer to position his conversational windows in the same relative position on the screen regardless of the monitor on the execution system.

SET ERROR

Sets error trapping

Syntax

```
SET ERROR {ON }
          {OFF}
```

Parameters

ON keyword parameter to activate error trapping

OFF keyword parameter to deactivate error trapping

Description

Sets error trapping ON or OFF (see ON ERROR DO command). Error trapping is OFF by default.

Example

See ON ERROR DO....

SET ESCAPE

Sets escape trapping

Syntax

```
SET ESCAPE {[TO] [ALT] [CTRL] str_exp}
           {OFF                       }
```

Parameters

| | |
|---|---|
| ALT | escape trapping requires ALT key also held down |
| CTRL | escape trapping requires CTRL key also held down |
| *str_exp* | sets escape trap key to value |
| OFF | keyword parameter to deactivate escape trapping |

Description

Activates and deactivates escape key trapping (see ON ESCAPE DO command). Escape key trapping is OFF by default. There is no default value for the escape key. The user must sets the value with the *str_exp* parameter. If *str_exp* is longer than one character, only the first character is used. The user may further define the escape with the ALT and CTRL parameters.

Example

```
ON ESCAPE DO ESC_PROC              'trap procedure
SET_ ESCAPE TO CTRL "C"            'set escape key to control-C
.
:
PROCEDURE ESC_PROC
MESSAGE TEST# "Abort?" YESNO
IF TEST# = 1
END
RETURN
ENDPROC
```

SET RATE

Sets execution rate

Syntax

```
SET RATE {[TO] int_exp}
         {OFF         }
```

Parameters

| | |
|---|---|
| *int_exp* | rate at which the Agent executes commands, expressed in tenths of seconds |
| OFF | keyword parameter to deactivate execution rate control |

Description

Sets execution rate. This is used to slow down the rate a task executes. Setting the rate OFF is the same as setting it to 0. In this case the Agent uses a default value of 1 tenth of a second.

SET TIMEOUT

Sets timeout trapping

Syntax

```
SET TIMEOUT { [TO] int_exp }
            { OFF          }
```

Parameters

| | |
|---|---|
| *int_exp* | length of time Agent will wait for application to call API_RETURN before timing out, expressed in seconds |
| OFF | keyword parameter to deactivate timeout trapping |

Description

Sets timeout trapping. (See ON TIMEOUT DO command.) Timeout trapping is ON by default. The default timeout value is 120 seconds.

TA_K ... ENDTASK

Defines the main body of a Task Language script

Syntax

```
TASK
  statements
ENDTASK
```

Parameters

None.

Description

The TASK command must be the first statement of a Task Language script. The ENDTASK command terminates the main body of the script.

TITLEWINDOW

Changes the text in the caption bar of a conversational window.

Syntax

```
TITLEWINDOW [id.window] str.exp.title
```

Parameters

| | |
|---|---|
| *id.window* | a user defined window name. |
| *str.exp.title* | the new window title. |

Description

Changes the title of the conversational window *id.window* or the current window if *id.window* is not specified. The title is changed in the window's definition, and in the window if it is open.

Example

See DEFINEWINDOW.

WAIT

Suspend execution until an event is trapped.

Syntax

```
WAIT
```

Parameters

None.

Description

Waits indefinitely, until an event is trapped. The following example illustrates trapping, as well as the use of editboxes and pushbuttons in conversational windows.

WAIT

Example

```
TASK   'Testing pushbuttons and editboxes
'Define the conversational window
DEFINEWINDOW POPUP MAIN ( (10,50),200,250) "Testing Buttons"
OPENWINDOW MAIN  'Open the window
LOCATE MAIN 0 0
OUTPUT "Enter your output..."
i# = 10
done# = 0

'Define the user controls
PUSHBUTTON MAIN go# " Go " AT (5,25) DEFAULT
PUSHBUTTON MAIN stop# "Stop" AT (75,25)
EDITBOX MAIN a# 20 AT (10,50)

'Loop until user wants to stop
WHILE done# = 0
   WAIT
   IF TESTBUTTON(quit#) = 0
   'User didn't press QUIT, so display his input
     LOCATE MAIN 0 i#
     OUTPUT "Edittext = " + EDITBOX(a#)
     i# = i#+1
   ELSE
     done# = 1
   ENDIF
ENDWHILE

CLOSEWINDOW MAIN        'Close the window
ENDTASK
```

WHILE ... ENDWHILE commands

Execute a loop construct

Syntax

```
WHILE  log.exp.condition
   statements
ENDWHILE
```

Parameters

*log.exp.condition* — a conditional expression (one that has a true of false value).

*statements* — any number of Task Language statements that make up the body of the loop.

Description

WHILE and ENDWHILE are used, together, to construct a pretest, conditional loop. The loop will iteratively execute the statements between the WHILE and ENDWHILE statements (the loop's body) as long as the condition *log.exp.condition* is true. The condition is evaluated and tested prior to each loop iteration, so the body will not be executed at all if the condition is false on the first iteration.

Example

See WAIT.

OFFICE WINDOW COMMAND SYNTAX

APPENDIX B

This appendix describes the Class Dependent commands for the New Wave object *Office Window*, providing examples of appropriate Task Language syntax. Note particularly the use of keyword parameters and noisewords.

The organization and formats are the same as those for the Class Independent command syntax, including formal syntax description, parameter information, and explanation of purpose. Refer to A.1 for further explanation of the syntax terminology. In this appendix the *class* of an object is frequently used as a descriptor. The end user documentation will refer to the *type* of an object instead. However, since the target of this document is developers and many of the explanations in the main body reference object *classes*, we decided to leave it be.

The commands are arranged in alphabetical order except when commands are very tightly coupled. For example commands pertaining to the same modeless dialog box are described together.

CAUTION

This syntax is preliminary only. It is subject to change if the Office Window user interface changes. Also, resolution of issues by the Task Language Review Committee will cause modifications to existing syntax.

ABOUT?

Displays the ABOUT dialog box

Syntax

```
ABOUT?
```

Parameters

None.

Description

ABOUT? brings up a modal dialog box with information on the application. Interactively, it is displayed when *About...* is selected on the *Action* menu.

ACTIVATE

Makes a window active

Syntax

```
ACTIVATE   [ATTRIBUTES    ]
           |OWN_ATTRIBUTES|
           |SHOW_LINKS    |
           [MAIN          ]
```

Parameters

| | |
|---|---|
| ATTRIBUTES | activate the window of the ATTRIBUTES modeless dialog box |
| OWN_ATTRIBUTES | activate the window of the OWN_ATTRIBUTES modeless dialog box |
| SHOW_LINKS | activate the window of the SHOW_LINKS modeless dialog box |
| MAIN | activate the main window of the application |

Description

The ACTIVATE command changes the currently active window in the application. Commands which could apply to more than one window, (e.g. ADJUST_WINDOW, MINIMIZE) are directed to the currently active window. If no parameter is present, the main window is activated.

NOTE

Remember that commands which apply only to one particular window, whether it is the main window or a modeless dialog box, imply an ACTIVATE to that window.

Example

See ATTRIBUTES

ADD_SELECTION

Selects an Office Window object

Syntax

```
ADD_SELECTION [OF] id.classname str.exp.title
```

Parameters

| | |
|---|---|
| *id.classname* | the keyword identifier which specifies the class of the object. Examples are FOLDER or DOCUMENT. |
| *str.exp.title* | the object's title. |

Description

When the ADD_SELECTION command is executed, the specified object is *selected*. Objects which are currently selected remain selected.

Example

```
ADD_SELECTION SPREADSHEET "September Orders"
```

ADJUST_WINDOW

Move or size the currently window

Syntax

```
ADJUST_WINDOW  [AT pnt.exp.location ]
               [TO int.exp.width [BY] int.exp.height]
```

Parameters

| | |
|---|---|
| *int.exp.width* | width of the window in screen coordinates |
| *int.exp.height* | length of the window in screen coordinates |
| *pnt.exp.location* | the location in screen coordinates of the upper left-hand corner of the window |

Description

Execution of the ADJUST_WINDOW command changes the size and/or location of an Office Window window. The ACTIVATE command should be used to set focus to the window to be adjusted if necessary.

Example

See ATTRIBUTES.

ALIGN_BY_ROWS

Align the icons in the Office Window

Syntax

```
ALIGN_BY_ROWS
```

Parameters

None.

Description

The Office Window is divided into a grid by invisible lines, six horizontal and six vertical. The ALIGN_BY_ROWS command positions each object in the Office Window onto a grid point. The fill order is left to right, top to bottom.

AUTO_ALIGNMENT

Sets auto__alignment mode

Syntax

```
AUTO_ALIGNMENT  {ON }
                {OFF}
```

Parameters

| | |
|---|---|
| ON | activates auto alignment |
| OFF | deactivates auto alignment |

Description

When auto alignment is activated, an object dragged or dropped into the Office Window is automatically moved to the nearest grid point.

ATTRIBUTES

Open the ATTRIBUTES dialog box

Syntax

```
ATTRIBUTES  [QUIET]
```

Parameters

QUIET — Causes the display of the dialog box to be suppressed during task execution.

Description

Execution of this command opens the ATTRIBUTES modeless dialog box and makes the functions of it available to the task as commands. If the QUIET parameter is present, the box will not be visible. Otherwise, it will be displayed during task execution. This dialog box processes commands which change the attributes of a *selected* object. Interactively, it is available from selecting *Attributes...* on the *Objects* menu.

Example

```
TASK
:
FOCUS ON OFFICE_WINDOW "NewWave Office"
SELECT SPREADSHEET "August Orders"
ATTRIBUTES              'Open the dialog box and make it visible
'The SELECT command implies an ACTIVATE of the main window
    SELECT SPREADSHEET "September Orders"
    MAXIMIZE            'the main window of the Office Window
'To change the size of the dialog box, need to set focus to it first
    ACTIVATE ATTRIBUTES
    ADJUST_WINDOW ATTRIBUTES TO 300 100
'Change the title of the selected object
    CHANGE_ATTRIBUTES TITLE "Revised August Orders"
'ATTRIBUTES window is closed since it is active
CLOSE   'Close it
:
<more commands>
```

CHANGE_ATTRIBUTES

Change the attributes of a selected object

Syntax

```
CHANGE_ATTRIBUTES  [PUBLIC {ON }]
                   [       {OFF}]
                   [TITLE str.exp.title]
                   [COMMENTS str.exp.comments]
```

Parameters

| | |
|---|---|
| PUBLIC ON | makes this a public object. The PUBLIC radiobutton is checked. |
| PUBLIC OFF | The PUBLIC radiobutton is not checked. |
| *str.exp.title* | new title of the selected object |
| *str.exp.comments* | modifies the contents of the COMMENTS editbox |

Description

Execution of this command changes the state of the ATTRIBUTES dialog box.

CHANGE_TITLE

Changes the title of an object

Syntax

```
CHANGE_TITLE [OF]  id.classname str.exp.oldtitle
             [TO]  str.exp.newtitle
```

Parameters

| | |
|---|---|
| *id.classname* | the keyword identifier which specifies the class of the object. |
| *str.exp.oldtitle* | the current title of the object |
| *str.exp.newtitle* | the new title of the object |

Description

When the CHANGE_TITLE command is executed, the title of the specified object is changed to *str.exp.newtitle*.

Example

```
CHANGE_TITLE OF SPREADSHEET "August Orders" TO "Updated August Orders"
```

CLOSE

Close the currently active window

Syntax

```
CLOSE
```

Parameters

None.

Description

The CLOSE closes the currently active window. The ACTIVATE command may be used to direct focus. If the main window is active, it closes the Office Window and ends the New Wave session. It does not request user confirmation.

CLOSE?

Brings up the CLOSE confirmation dialog box

Syntax

```
CLOSE?
```

Parameters

None.

Description

This command brings up the modal dialog box asking for user confirmation before closing the Office Window.

CONTROL_PANEL

Executes the Windows program CONTROL.EXE

Syntax

```
CONTROL_PANEL
```

Parameters

None.

Description

The CONTROL_PANEL command executes the MS-Windows program CONTROL.EXE which permits the user to modify various attributes of his workspace.

COPY

Copy an object to the Clipboard

Syntax

```
COPY
```

Parameters

None.

Description

The COPY command makes copies of all selected objects and puts them on the Clipboard. The previous contents of the Clipboard are cleared.

COPY_TO

Copy an object to a closed container

Syntax

```
COPY_TO  id.classname1 str.exp.title1
         [WITHIN id.classname2 str.exp.title2]
```

Parameters

| | |
|---|---|
| *id.classname1* | the keyword identifier which specifies the class of the container object. |
| *str.exp.title1* | the title of the container object |
| *id.classname2* | the keyword identifier which specifies the class of the object which *contains* the container object. |
| *str.exp.title2* | the title of the object which contains the container object |

Description

The COPY_TO command makes copies of all selected objects and puts them in the closed container described by *id.classname1 str.exp.title1*. If the WITHIN *id.classname2 str.exp.title2* clause is present, the container object is within the open window described by it. If this clause is absent, the container object is within the current window.

Example

```
SELECT DOCUMENT "New Customers"
COPY_TO FOLDER "August Orders"
```

CREATE_A_NEW?

Brings up the CREATE_A_NEW dialog box

Syntax

```
CREATE_A_NEW?
```

Parameters

None.

Description

This command brings up the modal dialog box to allow the user to enter the information to create a new object.

CREATE_A_NEW

Creates a new object

Syntax

```
CREATE_A_NEW  id.classname str.exp.title1
              [FROM_MASTER str.exptitle2]
```

Parameters

| | |
|---|---|
| *id.classname* | the keyword identifier which specifies the class of the object to be created |
| *str.exp.title1* | the title of the new object |
| *str.exp.title2* | the title of the object which is the master |

Description

The CREATE_A_NEW command causes an object of the specified class and title to be created. If the FROM_MASTER clause is present, the object is created as in the specified master. If it is absent, the object is blank.

Example

```
CREATE_A_NEW DOCUMENT "September Orders" FROM_MASTER "Orders Template"
```

CUT

Deletes the selected objects and puts them on the Windows Clipboard

Syntax

```
CUT
```

Parameters

None.

Description

The CUT command removes all selected objects from the Office Window and places them on the Microsoft Windows Clipboard.

DOS_PROGRAMS

Runs the NewWave DOS Programs Manager

Syntax

```
DOS_PROGRAMS
```

Parameters

None.

Description

The DOS_PROGRAMS command brings up the DOS Programs Manager so the user can execute a DOS file.

EXPORT_TO_DISK_FILE?

Brings up a modal dialog box to export an object

Syntax

```
EXPORT_TO_DISK_FILE?
```

Parameters

None.

Description

This command brings up the modal dialog box asking for a filename to which to export a selected object. The action is accomplished interactively by selecting the *Export to Disk* option on the *Objects* menu.

EXPORT_TO_DISK_FILE

Serializes an objects data and copies it to a disk file

Syntax

```
EXPORT_TO_DISK_FILE  str.exp.filename
```

Parameters

*str.exp.filename* the name of the disk file to which the serialized data will be copied.

Description

The EXPORT_TO_DISK_FILE command formats an object's data suitably for transfer to another system and writes the formatted data to an MS-DOS file. The action is accomplished interactively by selecting the *Export to Disk* option on the *Objects* menu and entering the appropriate information into the dialog box.

ICONIC_VIEW

Displays the objects in the Office Window as icons

Syntax

```
ICONIC_VIEW
```

Parameters

None.

Description

The ICONIC_VIEW command causes the objects in the Office Window to be displayed in iconic form.

IMPORT_FROM_DISK_FILE?

Brings up the modal dialog box to create an object from a formatted disk file

Syntax

```
IMPORT_FROM_DISK_FILE?
```

Parameters

None.

Description

This command creates an object from formatted data contained in a disk file to be entered by the user. Interactively, the user selects *Import from Disk File* on the *Objects* menu.

IMPORT_FROM_DISK_FILE

Create an object from a formatted disk file

Syntax

```
IMPORT_FROM_DISK_FILE str.exp.filename
```

Parameters

| | |
|---|---|
| *str.exp.filename* | MS-DOS file containing the formatted data |

Description

When the IMPORT_FROM_DISK_FILE command is executed, an object is created from the formatted data contained in *str.exp.filename*. Interactively, the user selects *Import from Disk File* on the *Objects* menu and completes the dialog box.

LIST_VIEW

Display objects in list format

Syntax

```
LIST_VIEW  [SORTED]  {BY_TYPE }
                     {BY_TITLE}
                     {BY_DATE }
```

Parameters

| | |
|---|---|
| BY_CLASS | The list will be sorted by class of object |
| BY_TITLE | The list will be sorted by creation date |
| BY_DATE | The list will be sorted by object title |

Description

The LIST_VIEW command displays the contents of the currently selected container (may be the Office Window) in list format. List format gives more information on each object including class, title, and creation date. See ICONIC_VIEW.

LOCK_DISPLAY?

Brings up the dialog box which locks the system and hides the display

Syntax

```
LOCK_DISPLAY?
```

Parameters

None.

Description

This command brings up the dialog box which, upon confimation, locks the system and hides the display. The user must enter the correct password before the display is restarted. Interactively, the user selects the *Lock Display* option on the *Action* menu.

MAKE_COPY

Copies selected objects within the current window

Syntax

```
MAKE_COPY
```

Parameters

None.

Description

The MAKE_COPY command copies all selected objects within the current window and puts the copies in the current window.

MANAGE_MASTERS?

Brings up the MANAGE_MASTERS dialog box

Syntax

```
MANAGE_MASTERS?
```

Parameters

None.

Description

This command brings up a dialog which permits the user to input information which will change his choice of masters which he may use when creating objects.

MANAGE_MASTERS

Remove object classes from the workspace

Syntax

```
MANAGE_MASTERS DELETE id.classname.1 str.exp.title1
                      [, id.classname.2 str.exp.title2,
                     ..., id.classname.n str.exp.titlen]
```

Parameters

*id.classname.i* the keyword identifier indicating the object class to be removed

*str.exp.titlei* the title of the master to be deleted

Description

The MANAGE_MASTERS command removes objects from the workspace. The DELETE clause removes the identified masters as templates by deleting them from the listbox in the *Create a New* dialog box.

MANAGE_TOOLS?

Brings up the modal dialog box to select tools for the Office Window

Syntax

```
MANAGE_TOOLS?
```

Parameters

None.

Description

This command brings up the modal dialog box to allow the user to modify the selection of tools which appear on his Office Window.

MANAGE_TOOLS

Change the selection of tools which appear in the Office Window

Syntax

```
MANAGE_TOOLS [PUT_IN_OFFICE_WINDOW
                 id.classname.1 str.exp.title1
               [, id.classname.2 str.exp.title2,
              ..., id.classname.n str.exp.titlen]]
```

Parameters

| | |
|---|---|
| *id.classname.i* | the keyword identifier specifying the class of the tool |
| *str.exp.titlei* | the title of the tool |

Description

Execution of the MANAGE_TOOLS command changes the selection of tools in the Office Window. Tools appearing in the PUT_IN_OFFICE_WINDOW clause are placed in the Office Window.

MAXIMIZE

Increase the size of the current window

Syntax

```
MAXIMIZE
```

Parameters

None.

Description

This command increases the size of the currently selected window to its maximum size. Interactively, the user selects *Maximize* on the *System* menu.

MOVE_TO

Move selected objects to a closed container

Syntax

```
MOVE_TO  id.classname1 str.exp.title1
       [WITHIN id.classname2 str.exp.title2]
```

Parameters

| | |
|---|---|
| *id.classname1* | the keyword identifier which specifies the class of the container object. |
| *str.exp.title1* | the title of the container object |
| *id.classname2* | the keyword identifier which specifies the class of the object which *contains* the container object. |
| *str.exp.title2* | the title of the object which contains the container object |

Description

The MOVE_TO command puts all selected objects in the closed container described by *id.classname1 str.exp.title1*. If the WITHIN *id.classname2 str.exp.title2* clause is present, the container object is within the open window described by it. If this clause is absent, the container object is within the current window.

Example

```
SELECT DOCUMENT "New Customers"
MOVE_TO FOLDER "August Orders"
```

OPEN

Opens all selected objects

Syntax

```
OPEN
```

Parameters

None.

Description

The OPEN command opens all currently selected objects.

Example

```
SELECT DOCUMENT "August Orders"
OPEN
```

OPEN_SELECTED_OBJECT

Opens an object

Syntax

```
OPEN_SELECTED_OBJECT  id.classname str.exp.title
```

Parameters

| | |
|---|---|
| *id.classname* | the keyword identifier which specifies the class of the object to be opened |
| *str.exp.title* | the title of the object to be opened |

Description

The OPEN_SELECTED_OBJECT opens a selected object and does not change the selection status of the other objects in the Office Window.

PASTE

Paste objects on the Windows Clipboard

Syntax

```
PASTE
```

Parameters

None.

Description

The PASTE command inserts the objects on the Windows Clipboard into the next available spaces in the currently selected window. The contents of the Clipboard is not changed. menu.

PERFORM

Perform an Agent Task

Syntax

```
PERFORM
```

Parameters

None.

Description

The PERFORM command causes the selected Agent Task to be executed.

PRINT

Drops a selected object on the *Print* icon

Syntax

```
PRINT
```

Parameters

None.

Description

The PRINT command is the same as the interactive action of a user selecting an object and dragging it to the *Print* icon and inserting it.

Example

```
SELECT DOCUMENT "August Orders"
PRINT
```

PRINT_LIST_OF_OBJECTS?

Puts up the PRINT_LIST_OF_OBJECTS modal dialog box

Syntax

```
PRINT_LIST_OF_OBJECTS?
```

Parameters

None.

Description

This command brings up a modal dialog box in which the user can enter information to print the contents of a container.

PRINT_LIST_OF_OBJECTS

Prints a list of the contents of the selected container

Syntax

```
PRINT_LIST_OF_OBJECTS  [int.exp.copies [COPIES]]
                       [TO] DEVICE str.exp.device
```

Parameters

| | |
|---|---|
| *int.exp.copies* | the number of copies |
| *str.exp.device* | the name of the printer device |

Description

The PRINT_LIST_OF_OBJECTS command makes a hardcopy listing of the contents of the currently selected container. If *int.exp.copies* is not present, the number of copies defaults to one. The same action is performed interactively if the user selects *Print List of Objects* on the *Action* menu and fills in the displayed dialog box.

Example

```
SELECT FOLDER "Confidential Stuff"
PRINT_LIST_OF_OBJECTS "LPT1"
```

RESTORE

Restores a window to its default size

Syntax

```
RESTORE
```

Parameters

None.

Description

The RESTORE command changes the size of the current window to its default.

SAVE_AS_MASTER

Save a copy of an object as a Master

Syntax

```
SAVE_AS_MASTER  [str.exp.newtitle]
```

Parameters

*str.exp.newtitle* the new title of the master

Description

The SAVE_AS_MASTER makes copies of selected objects as templates for use in creating new objects.

Select an object by class and title

Syntax

```
SELECT  id.classname str.exp.title
```

Parameters

| | |
|---|---|
| *id.classname* | the keyword identifier indicating the class of the object |
| *str.exp.title* | the title of the object |

Description

This command selects a specific object in the current window. The object must be closed.

SELECT_ALL_OBJECTS

Select all the objects in the current window

Syntax

```
SELECT_ALL_OBJECTS
```

Parameters

None.

Description

The SELECT_ALL_OBJECTS selects all the objects in the current window.

DESELECT_ALL

Deselect all the objects in the current window

Syntax

```
DESELECT_ALL
```

Parameters

None.

Description

The DESELECT_ALL command deselects all the objects in the current window.

DESELECT

Deselect an object by class and title

Syntax

```
DESELECT  id.classname str.exp.title
```

Parameters

| | |
|---|---|
| *id.classname* | the keyword identifier indicating the class of the object |
| *str.exp.title* | the title of the object |

Description

This command deselects a selected object in the current window.

SELECT_OPENED

Select an open object by class and title

Syntax

```
SELECT_OPENED  id.classname str.exp.title
```

Parameters

| | |
|---|---|
| *id.classname* | the keyword identifier indicating the class of the object |
| *str.exp.title* | the title of the object |

Description

This command selects a specific object in the current window. The object must be open.

SEND_TO_MAILROOM

Inserts selected objects into the Mail Room

Syntax

```
SEND_TO_MAILROOM
```

Parameters

None.

Description

The SEND_TO_MAILROOM command inserts all selected objects into the Mail Room. It corresponds to the act of dragging an object to the Mail icon.

SET_PASSWORD?

Brings up the PASSWORD dialog box

Syntax

```
SET_PASSWORD?
```

Parameters

None.

Description

The SET_PASSWORD? command brings up the PASSWORD dialog box. The user can fill in information to set or modify the password on his New Wave Office.

SET_USER_TIME_ZONE?

Brings up the SET_USER_TIME_ZONE modal dialog box

Syntax

```
SET_USER_TIME_ZONE?
```

Parameters

None.

Description

The SET_USER_TIME_ZONE? command brings up the modal dialog box to permit the user to modify the user name and time zone information.

SET_USER_TIME_ZONE

Modify the user name and time zone information

Syntax

```
SET_USER_TIME_ZONE  { [NAME] str.exp.name                   }
                    { [WITH] TIME_ZONE str.exp.timezone      }
```

Parameters

| | |
|---|---|
| *str.exp.name* | new user name string |
| *str.exp.timezone* | string containing time zone used in object creation |

Description

The SET_USER_TIME_ZONE command is used to change the user name of the Office Window or to modify the time zone. The time zone string is important when mailing objects to destinations outside of the current time zone.

Example

```
SET_USER_TIME_ZONE TIME_ZONE "-7h."
```

SHARE

Shares selected objects with the Windows Clipboard

Syntax

```
SHARE
```

Parameters

None.

Description

This command SHAREs all selected objects to the Windows Clipboard The PASTE command may then be used to complete the share to another object.

SHOW_DOS_PATH

Display the path of an MS-DOS application

Syntax

```
SHOW_DOS_PATH [OF] id.classname str.exp.title
```

Parameters

| | |
|---|---|
| *id.classname* | the keyword identifier indicating the class of the object |
| *str.exp.title* | the title of the object |

Description

This command displays the path of the executable file of an MS DOS application which is encapsulated in the current window.

SHOW_LINKS

Initializes the SHOW_LINKS modeless dialog box

Syntax

```
SHOW_LINKS [QUIET]
```

Parameters

| | |
|---|---|
| QUIET | Causes display of the dialog box to be suppressed during task execution |

Parameters

None.

Description

The SHOW_LINKS command sends a message to the application to initialize the *Show Links* modeless dialog box. If the QUIET parameter is not present, the dialog box is displayed. The action is accomplished interactively when precisely one object in the current container is selected and the user chooses the *Show Links* option on the *Objects* menu. The dialog box lists the parents of the object. An object will have only one parent unless it is a *shared* object, in which case all objects which share it will be listed.

Example

```
FOCUS ON OFFICE_WINDOW "NewWave Office"
SELECT FOLDER "August Orders"
OPEN
FOCUS ON FOLDER "August Orders"
SELECT SPREADSHEET "New Orders"
SHOW_LINKS                'of the spreadsheet
'open an object which shares the object
    OPEN_PARENT FOLDER "1987 New Orders"
    PAUSE 2
'close the dialog box which is currently active
    CLOSE
'parent is active which is the folder
CLOSE                     'the folder
```

SHOW_OWN_LINKS

Initializes the SHOW_OWN_LINKS modeless dialog box in which a container displays its own links

Syntax

```
SHOW_OWN_LINKS [QUIET]
```

Parameters

QUIET Causes display of the dialog box to be suppressed during task execution

Parameters

None.

Description

The SHOW_OWN-LINKS command sends a message to the application to initialize the *Show Links* modeless dialog box for the container itself. If the QUIET parameter is not present, the dialog box is displayed. The action is accomplished interactively when the user chooses the *Show Links* option on the *File* menu. This command is not valid for the Office Window.

OPEN_PARENT

Open a parent of an object

Syntax

```
OPEN_PARENT  id.classname str.exp.title
```

Parameters

| | |
|---|---|
| *id.classname* | the keyword identifier indicating the object class of the parent |
| *str.exp.title* | the title of the parent |

Description

The OPEN_PARENT is a *Show Links* dialog box command. Its execution opens the specified parent which must be one of the entries in the listbox. Interactively, the user having opened the *Show Links* dialog box, selects an entry in the listbox and presses the *Open* button.

STRAIGHTEN_UP

Move objects to nearest grid point

Syntax

```
STRAIGHTEN_UP
```

Parameters

None.

Description

The STRAIGHTEN_UP commands moves the objects in the current window to the nearest point on an imaginery grid.

THROW_AWAY

Insert selected objects into the Waste Basket

Syntax

```
THROW_AWAY
```

Parameters

None.

Description

The THROW_AWAY command inserts all selected objects into the Waste Basket.

TRANSFER_MAIL

Activates the Mail Room

Syntax

```
TRANSFER_MAIL
```

Parameters

None.

Description

The TRANSFER_MAIL command activates the Mail Room. This initiates a send and receive mail transfer.

APPLICATION AND TASK DATA EXCHANGE

APPENDIX C

WARNING

The functionality discussed in this appendix is preliminary. Implementation has not been finalized.

The Task Language must support mechanisms to exchange data between Agent Tasks and applications. This is necessary to allow a task to control execution flow based upon data in an application as well as inputting data to it.

This capability will allow the Agent to interact with the application via the clipboard in the same way a user would. But in the Agent's case, the clipboard data is copied into Task Language variables. The flow control of the task may then be directed dependent on the value of the variables. The scope will be to allow testing and limited modification.

The process of getting data from the application requires executing the Task Language to select the data via one of the selection methodologies and cutting or the data to the clipboard via one of the Task Language commands:

CUT
COPY
PASTE

A user supplied name is the name given to a selection after it has been made. The name is preserved by the application and can be used again to releselect the data even though the data has moved within the object so the same syntactic selection would no longer be possible.

An application supplied id is an internal number used by the application to represent a selectable element that the user may name. It is predefined, by the application, to allow selection without user definition. For example, the "*prompt line*" might be *selectable* but not *named* by the user. An Agent Task could SELECT the prompt line and cut the contents to the clipboard.

User definable names for selections can also be preloaded by the application for optional display to the user. This can allow named selections within an Agent Task in a predefined way, like application ids but using strings not numbers. Readability and localization are considerations in this technique.

The user name or application id can be enumerated within the Agent Task and displayed within a conversational window. Functions will be provided for the purpose. After enumeration, a selection can be made on the data to transfer to the clipboard. Alternatively, the selection can be hard coded within the Agent Task.

There are some cases where the name is inherent to the data, carried with the data, and made visible to the user.

An example is the case of objects within a container. Each object is identified by the class type and title, which are used for selection.

Task Language must have the capability to precode an Agent Task to "select blind" and test for errors in order to determine if an object exists within a container. To allow the Agent Task to perform more sophisticated selection of titled objects within a container, the container objects must support enumeration of the class and title of the objects within them. This will allow an Agent Task to search objects within the container and perform repeated operations on all objects within the conatiner without knowing the class and titles ahead of time. For example, an Agent Task could go through a folder of messages, open them, and read the distribution list to organize them based the sender. It could then create a separate folder for each sender titled with the sender's name and file the mail accordingly. Note that the title of an object is not the same as a user defined name. An example of the latter might be a named paragraph in a word processor object or a named range of cells in a spreadsheet.

Supported Interrogation Functions

| | |
|---|---|
| GetClipBoardData() | class independent function to retrieve clipboard data |
| PutClipBoardData() | class independent function to put data on the clipboard |
| GetSelectionNames() | function to interrogate an application to get first named item. Returns string containing the name. |
| GetNextSelectionName() | function to interrogate an application to get next named item. Returns string containing the name. |

Example

```
TASK    'to illustrate SELECTION
   ExpectedYTD# = 4786.00

   FOCUS DESKTOP "NewWave Office"
   SELECT SPREADSHEET "Sales Performance"  'Select by class and title
   OPEN

   FOCUS SPREADSHEET "Sales Performance"
   SELECT_BY_NAME "Year to date"              'Named cell
   CUT                                  'Contents copied to the clipboard
'Copy the clipboard contents to a Task Languaged variable
'Use VAL function to convert string to numeric value
   YearToDate# = VAL( GetClipBoardData() )
   CLOSE

   IF YearToDate# < ExpectedYTD#
     DO NotifyMe
   ELSE
     DO NotifySales
   ENDIF

END
ENDTASK

PROCEDURE NotifyMe
'
' Task Langauge to Mail me a memo to get on this issue.
' My mail will forword this to me if I am at another offic
'
ENDPROC

PROCEDURE NotifySales
'
' Task Language to prepare a memo to sales "good job".
' Leave it in my InTray for me to review and send.
'
ENDPROC
```

Table of Contents

Section 1
PURPOSE AND OVERVIEW 1.1 Purpose . . . . . 1-1
1.2 Overview . . . . . 1-1

Section 2
TASK ORGANIZATION 2.1 Task Main Section . . . . . 2-1
2.2 Procedure Section . . . . . 2-2

Section 3
TASK LANGUAGE COMMANDS 3.1 Basic Syntax . . . . . 3-1
3.2 Keyword Identifiers . . . . . 3-2
3.3 Noisewords . . . . . 3-2
3.4 Parameters . . . . . 3-3
3.5 Dialog Commands . . . . . 3-3
3.5.1 Modal Dialog Boxes . . . . . 3-3
3.5.2 Dialog Command Parameters . . . . . 3-5
3.5.3 Interactive Modal Dialog Commands . . . . . 3-5
3.5.4 Recording in Modal Dialog Boxes . . . . . 3-5
3.5.5 Modeless Dialog Boxes . . . . . 3-6
3.5.6 Recording in Modeless Dialog Boxes . . . . . 3-6
3.6 Parameter Lists . . . . . 3-6
3.7 User Names . . . . . 3-7
3.8 Comments . . . . . 3-7
3.9 Continuation Character . . . . . 3-8

Section 4
CLASS INDEPENDENT COMMANDS 4.1 Conversational Window Commands . . . . . 4-1
4.2 Flow Control and Execution . . . . . 4-1
4.3 FOCUS Command . . . . . 4-2
4.4 Interrupt Commands . . . . . 4-4
4.5 Command Precedence . . . . . 4-4

Section 5
CLASS DEPENDENT COMMANDS 5.1 Selection Commands . . . . . 5-1
5.1.1 General Syntax . . . . . 5-1
5.1.1.1 SELECT . . . . . 5-1
5.1.1.2 DISJOINT_SELECT . . . . . 5-2
5.1.1.3 ADJUST_SELECTION . . . . . 5-2

Table of Contents 5.1.1.4 DESELECT . . . . . 5-2
5.1.1.5 SELECT_ALL . . . . . 5-2
5.1.1.6 Keyboard Commands . . . . . 5-2
5.1.1.7 Other Relative Commands . . . . . 5-3
5.1.1.8 Recording Repeated Relative Commands . . . . . 5-3
5.1.2 Container Objects . . . . . 5-4
5.1.3 Table Objects . . . . . 5-5
5.1.4 Document Objects . . . . . 5-6
5.1.5 Image and Graphics Objects . . . . . 5-7
5.1.6 View Selection . . . . . 5-8
5.2 Object Manipulation Commands . . . . . 5-8
5.3 Data Manipulation . . . . . 5-8
5.4 Window Manipulation . . . . . 5-9
5.5 Miscellaneous Commands . . . . . 5-9
5.6 Referencing Subordinate Windows . . . . . 5-10
5.6.1 ACTIVATE Command . . . . . 5-10
5.6.2 Implicit Window Activation . . . . . 5-10
5.6.3 ADJUST__WINDOW Command . . . . . 5-11
5.7 Keywords and Parameters . . . . . 5-12

Section 6
DATA TYPES AND FORMATS 6.1 Integer Constants . . . . . 6-1
6.2 Real Constants . . . . . 6-1
6.3 String Constants . . . . . 6-1
6.4 Point Constants . . . . . 6-2
6.5 Region Constants . . . . . 6-2
6.6 Agent Internal Data Types . . . . . 6-3

Section 7
VARIABLES 7.1 User Variables . . . . . 7-1

Section 8
EXPRESSIONS 8.1 Arithmetic and String Expressions . . . . . 8-1
8.2 Points and Regions . . . . . 8-2
8.3 Relational Expressions . . . . . 8-2
8.4 Logical Expressions . . . . . 8-2

Section 9
FUNCTIONS 9.1 Basic Syntax . . . . . 9-1
9.2 Class Independent Functions . . . . . 9-1
9.2.1 Data Manipulation Functions . . . . . 9-1

Table of Contents 9.2.2 Interrogation Functions . . . . 9-3
9.3 Class Dependent Functions . . . . 9-3

Section 10
LOCALIZATION

Appendix A
CLASS INDEPENDENT COMMAND SYNTAX

A.1 Command Syntax Explanation . . . . A-1
ASSIGNMENT . . . . A-3
BEEP . . . . A-4
CLEARWINDOW . . . . A-5
CLOSEWINDOW . . . . A-6
DEFINEWINDOW . . . . A-7
DO . . . . A-9
EDITBOX . . . . A-10
END . . . . A-11
FOCUS . . . . A-12
GOTO . . . . A-13
IF ... ELSE ... ENDIF . . . . A-14
INPUT . . . . A-15
JUSTIFY . . . . A-16
LABEL . . . . A-17
LOCATE . . . . A-18
MESSAGE . . . . A-19
ON ERROR DO . . . . A-21
ON ESCAPE DO . . . . A-22
ON TIMEOUT DO . . . . A-23
OPENWINDOW . . . . A-24
OUTPUT . . . . A-25
PAUSE . . . . A-26
PROCEDURE ... ENDPROC . . . . A-27
PUSHBUTTON . . . . A-28
RETURN . . . . A-29
SCREEN . . . . A-30
SET ERROR . . . . A-31
SET ESCAPE . . . . A-32
SET RATE . . . . A-33
SET TIMEOUT . . . . A-34
TASK ... ENDTASK . . . . A-35
TITLEWINDOW . . . . A-36
WAIT . . . . A-37
WHILE ... ENDWHILE commands . . . . A-39

Appendix B
OFFICE WINDOW COMMAND SYNTAX

ABOUT? . . . . B-2
ACTIVATE . . . . B-3

Table of Contents

:

ADD_SELECTION . . . B-4
ADJUST_WINDOW . . . B-5
ALIGN_BY_ROWS . . . B-6
AUTO_ALIGNMENT . . . B-7
ATTRIBUTES . . . B-8
CHANGE_ATTRIBUTES . . . B-9
CHANGE_TITLE . . . B-10
CLOSE . . . B-11
CLOSE? . . . B-12
CONTROL_PANEL . . . B-13
COPY . . . B-14
COPY_TO . . . B-15
CREATE_A_NEW? . . . B-16
CREATE_A_NEW . . . B-17
CUT . . . B-18
DOS_PROGRAMS . . . B-19
EXPORT_TO_DISK_FILE? . . . B-20
EXPORT_TO_DISK_FILE . . . B-21
ICONIC_VIEW . . . B-22
IMPORT_FROM_DISK_FILE? . . . B-23
IMPORT_FROM_DISK_FILE . . . B-24
LIST_VIEW . . . B-25
LOCK_DISPLAY? . . . B-26
MAKE_COPY . . . B-27
MANAGE_MASTERS? . . . B-28
MANAGE_MASTERS . . . B-29
MANAGE_TOOLS? . . . B-30
MANAGE_TOOLS . . . B-31
MAXIMIZE . . . B-32
MOVE_TO . . . B-33
OPEN . . . B-34
OPEN_SELECTED_OBJECT . . . B-35
PASTE . . . B-36
PERFORM . . . B-37
PRINT . . . B-38
PRINT_LIST_OF_OBJECTS? . . . B-39
PRINT_LIST_OF_OBJECTS . . . B-40
RESTORE . . . B-41
SAVE_AS_MASTER . . . B-42
SELECT . . . B-43
SELECT_ALL_OBJECTS . . . B-44
DESELECT_ALL . . . B-45
DESELECT . . . B-46
SELECT_OPENED . . . B-47
SEND_TO_MAILROOM . . . B-48
SET_PASSWORD? . . . B-49
SET_USER_TIME_ZONE? . . . B-50
SET_USER_TIME_ZONE . . . B-51
SHARE . . . B-52
SHOW_DOS_PATH . . . B-53
SHOW_LINKS . . . B-54
SHOW_OWN_LINKS . . . B-55
OPEN_PARENT . . . B-56
STRAIGHTEN_UP . . . B-57
THROW_AWAY . . . B-58
TRANSFER_MAIL . . . B-59

Appendix C
APPLICATION AND TASK DATA EXCHANGE

Appendix C

TASK LANGUAGE INTERNALS

SECTION ?

The creation and performing of an Agent Task is a three stage process:

1. The Ascii script is entered using the Task Editor. Alternatively, the script is created as the Agent remembers user actions while in *learn* mode.
2. The script is translated into a binary form which is readable by the Agent Interpretive Engine.
3. The Engine interprets the binary script and dispatches the instructions to the appropriate target.

This section discusses the second stage, translation of the Ascii script to a form readable by the Engine.

?.1 COMPILATION PROCESS

An Ascii script will be *compiled* (i.e. translated into binary format) from within an open Task Editor object upon demand of the user. As a default, a modified Task Editor object may be compiled when it is closed. Compilation is not permitted during the Learn process. A script must be free from syntax error before an executable binary file is created.

The full compilation process was selected for runtime speed and space efficiency. Incremental or automatic compilation was rejected in favor of full compilation on demand since programmers tend not to create source files linearly. It is expected that users will frequently build new script files from pieces of existing ones.

Compilation is a two stage process.

1. Pass 1. The first pass reads the Ascii script and generates binary P-code records. For short scripts, these are kept in a memory buffer. Large scripts will be written to a temporary file. If syntax errors occur, the compilation is terminated at the end of pass 1.
2. Pass 2. During the second pass the object file is created. The header record is written. The P-code records are read from the temporary file (or buffer) and instruction records referencing labels are fixed up. These include jump and procedure call records. The records are written to the object file. The P-code records are followed by data information records. The data information records are used for debugging and will not be used unless the task is executing in debug mode.

?.2 OBJECT FILE FORMAT

Successful compilation of a task creates a binary *object file*. An object file consists of three main parts: a fixed length header record, the binary P-code records which will be executed by the Agent interpretive engine, and assorted data tables. The data tables are useful for debugging but are not used in the actual task execution. The object file format is shown in Figure 1.

Figure 1. Object File Format

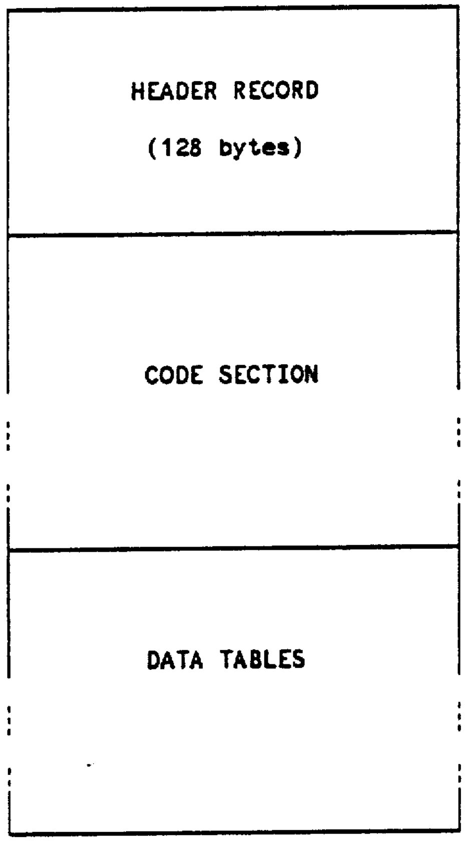

?.2.1 Header Record

The header record is a fixed length of 128 bytes. It contains information on the locations and sizes of the rest of the file. Its contents are described in Table 1.

Table 1. Header Record Information

| Offset | Size | Description |
|---|---|---|
| 0H | 8 bytes | Ascii string containing version of compiler |
| 8H | 2 bytes | Integer containing page size of code |
| AH | 2 bytes | Integer containing number of pages of code |
| CH | 2 bytes | Integer containing number of task variables |
| EH | 2 bytes | Integer containing total size of array tables |
| 10H | 4 bytes | Long integer containing byte offset of line number/code table |
| 14H | 2 bytes | Integer containing length of line number/code table |
| 16H | 4 bytes | Long integer containing byte offset of variable names info |
| 1AH | 2 bytes | Integer containing length of variable names info |
| 1CH | 100 | Reserved for future use |

?.2.2 Code Section

The code section of the object file consists of variable length, binary *P-Code* records. These are executed at run time by the Agent. A more detailed description of P-Codes will be found in the next section. Pointers to locations in the code are maintained as *Addresses*. Addresses consist of a page number and an offset into that page, thus identifying the start of an instruction. The Agent will request a *page* of code at a time. Page size is tentatively set at 512 bytes. P-Code instructions will not cross page boundaries.

?.2.3 Data Tables

The code section is followed by data tables. These are not needed in the actual execution of the task. They are included as debugging aids. A brief description follows.

1. Line Number/Address Pairs map the line number in the Ascii source file to the address in the object file of the P-Code instruction which corresponds to the beginning of the line. This will allow breakpoints to be set symbolically and execution monitoring.

2. User Names. The User Names table contains information which maps the Ascii name in the source file into the runtime data structures. There are two types of user names, variable and label. The latter includes procedure and function names. During debugging, this table will be searched linearly for a match with the name. In this situation, I don't think search speed is critical, and I don't anticipate the table being really big.

The formats of the records are shown in the following figures.

Figure 2. User Variables Record Format

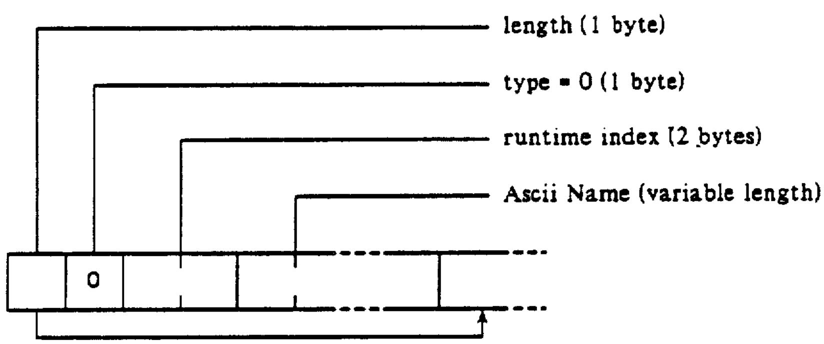

Figure 3. User Labels Record Format

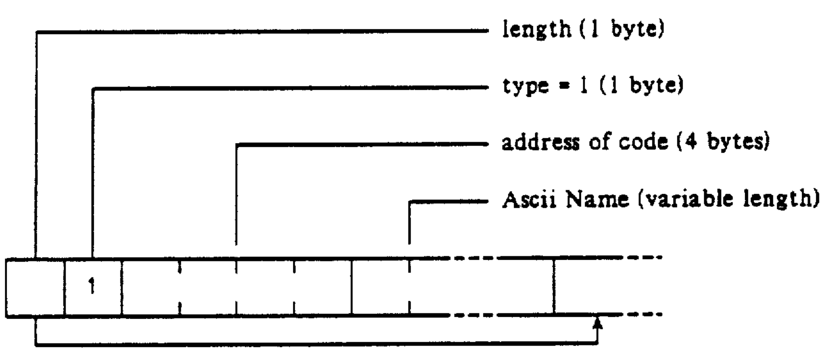

?.3 COMPILE TIME ENVIRONMENT

The Task Editor Compiler uses the YACC Parser Generator. Therefore, its structure will be somewhat determined by YACC. This section is still somewhate tentative. There are a number of details to be worked out. I think the prototype developed by Tom Watson will serve as a good skeleton, and the algorithms and data structure are based on that. Briefly, YACC produces a parse routines which is named yyparse. (cute, huh?) And a bunch of tables which I haven't completely deciphered yet. Summarizing the interface of yyparse with the outside world during the parsing, and ignoring errors:

1. yyparse requests a *token* by calling the scanner routine which must be called yylex.
2. yylex returns either an integer which is a token type, or, if the character does not map into any recognized token type, it returns the Ascii character itself. Token types are declared in the file which is input to YACC.
3. If the semantic processing of a token requires more information, a value is assigned to the integer *yylval* which yyparse takes to be the *value* of that token. What it actually represents is token dependent and under the control of the writer of the semantic routines. It frequently is an index to a table of values or structures..

?.3.1 Data Files

The compiler requires several data files to set its environment.

?.3.1.1 KEYWORD FILE. The keyword file is an Ascii file containing a list of all the keywords recognized by the compiler. There is a Domain Independent keyword file, and it is expected that most application domains will have a keyword file as well. Within the file, keywords are separated by CRLF.

?.3.1.2 DICTIONARY FILE. The Task Editor dictionary is contained in the file AGTSK000.DAD (directory to be determined, currently \OMF\agent). This is an Ascii file with records separated by CRLF. The records and fields are variable length and blank terminated. Blanks within fields must be enclosed within quoted strings. The type of the record is contained in the first byte. So far, only one type has been defined. When applications are installed in a New Wave system, provision must be made to add the necessary records to this file. The format of the record used by the Task Editor to access domain dependent information in shown in Table 2.

Table 2. AGTSK000.DAD Domain Information Record

| Field | Description |
|---|---|
| 1 | Record type - defined as ' 0 ' |
| 2 | Domain keyword - used in FOCUS, SELECT |
| 3 | Domain prefix for domain dependent commands |
| 4 | Fully qualified filename of .EXE file of domain dynamic library |
| 5 | Name of dynamic library entry procedure |
| 6 | Object classname. This is enclosed in double quotes and must be as it appears on the OMF Property List. |

?.3.2 Scanner Data Structures

This section defines the major data structures used by yylex.

?.3.2.1 STRINGTABLE. The string table is a dynamically allocated buffer which holds the Ascii of all identifiers and string literals. Names are fetched via an index into this buffer. Once an identifier is inserted, it is not removed. Keywords are included. The entries are contiguous, null-terminated strings.

?.3.2.2 IDENTIFIER BUFFER. The Identifier Buffer is an array of type IDENTIFIER. It holds information on all identifiers encountered in compilation. This is the *Spellings* buffer of the prototype expanded. System defined identifiers, e.g. keywords, are entered into the buffer at initialization. I haven't decided whether it should be static or dynamic, probably the latter.

```
typedef struct {
    int type;       /* of identifier.  Currently defined types are:
                       keyword, class symbol, class prefix, user symbol,
                       user variable, label */
    int name;       /* index into the string table */
    int value;      /* additional information depending on type, possibly
                       index into another table */
    int link;       /* to next entry with same hash value */
    } IDENTIFIER;
```

Each keyword has a unique *type*. Other types include user variable, class symbol, class prefix, etc. (This structure may expand.)

?.3.2.3 HASH BUFFER. The hash buffer is an fixed size integer array. If an element is non-zero, it is an index into the Spellings Buffer of the first identifier which hashed to that value.

?.3.2.4 CLASS INFORMATION. The class information array holds information about the domains which was found in AGTSK000.DAD. The structure of an element is:

```
typedef struct {
    HANDLE hLib;            /* to the domain dynamic library */
    int value;              /* Identifier buffer index of class symbol */
    int cmnd_prefix;        /* Identifier buffer index of command prefix */
    int libname;            /* string table index of library .EXE file */
    int libproc;            /* string table index of library procedure */
    int classname;          /* string table index of classname string */
    } CLASS;
```

?.3.2.5 ADDRESS. References to locations of P-Code instructions are kept in data type ADDRESS.

```
typedef struct {
    int page;
    int offset;
    } ADDRESS;
```

?.3.2.6 ADDITIONAL TABLES. Other tables include arrays for numeric and string constants. Their structure and use hasn't been decided.

?.3.3 Labels and Flow Control

All labels have an entry in the *Label Table*. The Label Table is an array of type ADDRESS. Labels can be declared (e.g. procedures, user labels) or implied as in an IF statement. The first time a label is encountered, it receives an entry in the Label Table. If the label has an associated identifier, the Label Table index is assigned to the value field and type becomes label (except when it is a keyword. . .). When the address is known, it is assigned to the Label Table entry.

Frequently, a P-Code instruction referencing a label whose address is not yet known is generated. When this happens, the Label Table index is put into the address field, and the length word of the P-Code instruction is made negative. During Pass 2 of the compiler, this field will be fixed up with the correct address.

?.3.3.1 IF STATEMENT. IF statements are handled by the If Stack. If Stack is an integer array of indices into Label Table. I expect to choose some reasonable level of nesting and give an error if it is exceeded. When an IF statement is encountered, a Label Table entry is created and its index pushed on the stack. The necessary JUMP P-Code can be generated. If an ENDIF is found, the address is assigned to the top entry and it is popped. If an ELSE pops up, the address is assigned to the top IF and it is popped. A new entry is created and its index pushed on the stack. The pushed value is negative to indicate ELSE. When the ENDIF comes along, the address is assigned and the entry popped.

Other flow control statements will be handled similarly.

?.3.3.2 IF AND WHILE.

?.3.4 Major Procedures

?.3.5 Scanner

?.3.6 Parser

NOTE

> We anticipate using the public domain version of YACC. We have not really checked out the limits of this parser generator.

?.4 RUN-TIME ENVIRONMENT

The Agent Interpretive Engine (run-time environment) is a simple stack machine. The basic components are:

- Stack. The Stack is a dynamically allocated buffer (probably from Local Heap). It is used mostly for expression evaluation, but it will also hold the return address for procedure calls. All data items except strings will be put on the stack by value. Strings will be pushed by reference.
- Static Data Structures. These tables are set up at task initialization. They include user variables, system variables, array structures, and interrupt state tables.
- Stringtable. This dynamically allocated buffer holds the current values of string variables.
- IP. The IP (instruction pointer) contains the address of the next sequential P-Code instruction to be executed.

These are described in greater detail in the section on data structures. When task execution commences, the engine does the following:

1. Send message to the task object to open the object file and send information from the header record.

2. On the basis of the header information, set up the static data structures, allocate the stack and stringtable, etc.

3. Set top of stack to 0.

4. Send message to the task object to send the first page of code instructions.

5. Set the IP to 0 and call FETCH to get the first instruction.

?.4.1 Run-time Data Structures

?.4.1.1 STACKTOKEN. Data items on the stack are in the form of the structure STACKTOKEN. All types except strings are pushed on by value.

```
typedef struct {
    int type;
    union {
        int ival;
        float fval;
        long lval;
        double dval;
        REGION rval;
        POINT pval;
        int stringindex;        /* index into string buffer */
        } value;
    } STACKTOKEN;
```

?.4.1.2 STRINGTABLE. The Stringtable is a dynamically allocated buffer which holds the values of the string variables and string values currently on the stack. Each entry is of the form:

```
typedef struct {
    int length;
    char string [];
    } STRINGTABLEENTRY;
```

The length is the length in bytes of the entry and includes the length word itself. The string is null terminated. If length is > 0, the entry is allocated; if < 0, the entry is free.

?.4.1.3 VARIABLE TABLE. The Variable Table is an array of type VARITEM which holds information and values of user and system variables. Its structure is quite similar to STACKTOKEN. The size of Variable Table is known after compilation.

```
typedef struct {
    int type;               /* of the data item */
    union {
        int ival;           /* integer */
        int lval;           /* long integer */
        float fval;         /* single precision real */
        double dval;        /* double precision real */
        REGION rval;        /* region variable */
        POINT pval;         /* point variable */
        struct {
            int type;       /* of the array */
            int size;       /* number of items in the array */
            int index;      /* byte offset of start in array table */
            } array;
        int stringindex;    /* of the entry in StringTable */
        };
    } VARITEM;
```

?.4.1.4 ADDRESS.
References to locations of P-Code instructions are kept in data type ADDRESS.

```
typedef struct {
    int page;
    int offset;
    } ADDRESS;
```

?.4.1.5 ARRAY TABLE. The size of the array table is known at compile time. It is a byte array.

?.4.1.6 INTERRUPT TABLE. The interrupt table holds information on the state of the interrupt conditions, address of interrupt procedures, etc. The structure will be defined later.

?.4.1.7 TO BE DEFINED. Among the things to be defined are breakpoint and other debugging tables. I have also not included various flags and pointers (TOS, IP etc.).

?.4.2 Run-time Procedures

?.5 DEBUGGING AIDS

?.6 P-CODE INSTRUCTION SET

The Agent Interpretive Engine performs a task by fetching and executing *P-Code instructions*. The generic P-Code record format is shown in Figure 4.

Figure 4. Binary P-Code Record Format

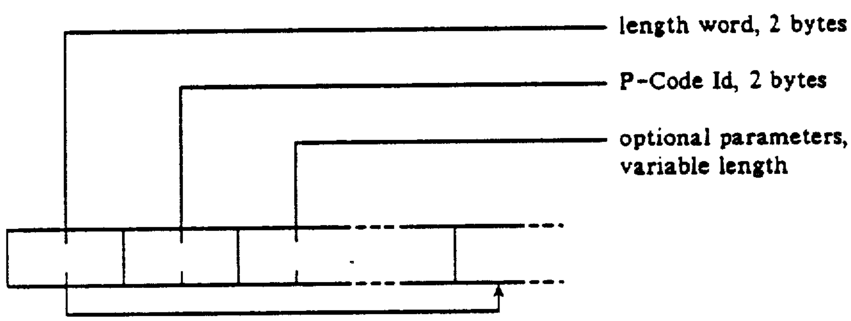

Field Description

| | |
|---|---|
| *Length* | contains the number of bytes in the record including the length word. A record with no parameters will have a length of 4. |
| *P-Code Id* | is the numeric opcode of the instruction. |
| *Parameters* | are any parameters which the instruction requires. The type and length are instruction-dependent. Parameter fields should be defined as fixed length. Strings are null-terminated. |

The currently defined instructions are summarized in the following table. It will be updated as required. Note that A refers to the item on top of stack and B refers to the item immediately below A. The IP (instruction pointer) is a data item of type ADDRESS which contains the page number and offset of the instruction.

Table 3. Summary of P-Code Instructions

| Mnemonic | ID # | Action |
|---|---|---|
| PUSH | * | Puts the contents of a data item on top of stack as A. |
| POP | * | Stores A into a data item and removes it from the stack. |
| PUSHI | * | Puts a value on top of stack as A. |
| PUSH_ARR | * | Puts the contents of an array element on top of stack as A. |
| COMPARE | * | Compares A and B, pops A and B, and sets A to reflect the result. |
| EXCHANGE | * | Exchanges A and B. |
| DUP | * | Pushes a copy of A on top of stack. |
| JUMP | * | Move the IP to a specified value. |
| JUMP_IF | * | JUMP if the value of A meets a specified condition. A is popped from the stack. |
| CALL | * | Pushes the contents of the IP on the stack and replace it with the address of a procedure. |
| RETURN | * | Replaces the contents of the IP with the value of A. A is popped. |
| SET_INT | * | Sets or clears an interrupt condition, optionally saving the address of a bound procedure. |
| ADD | * | Pops A and B, puts A + B on top of stack. |
| SUB | * | Pops A and B, puts A - B on top of stack. |
| MUL | * | Pops A and B, puts A * B on top of stack. |
| DIV | * | Pops A and B, puts A / B on top of stack. |
| COMMAND | * | Sends the parameters to the object with the focus for execution. |
| FOCUS | * | Gives a specified object the focus. |
| FUNCTION | * | Executes a system or Domain Independent function. The result is left in A. |

CALL

Transfer control to a user defined procedure

Syntax

```
CALL     Address
```

Fields

| | | |
|---|---|---|
| Length | 8 bytes | |
| P-Code Id | | |
| Parameters | | |
| | *Address* | of procedure. Type is ADDRESS. |

Algorithm

COMMAND

Sends a command message to the object with the Focus

Syntax

```
COMMAND     Domain Id, Command Length,
            Command Parameters
```

Fields

| | | |
|---|---|---|
| Length | variable | |
| P-Code Id | | |
| Parameters | | |
| | *Domain Id* | Integer indicating class of object recognizing this command |
| | *Command Length* | Integer containing length of length word, command, and parameters |
| | *Parameters* | variable length and type, command dependent |

Figure 5. Structure of P-Code = COMMAND
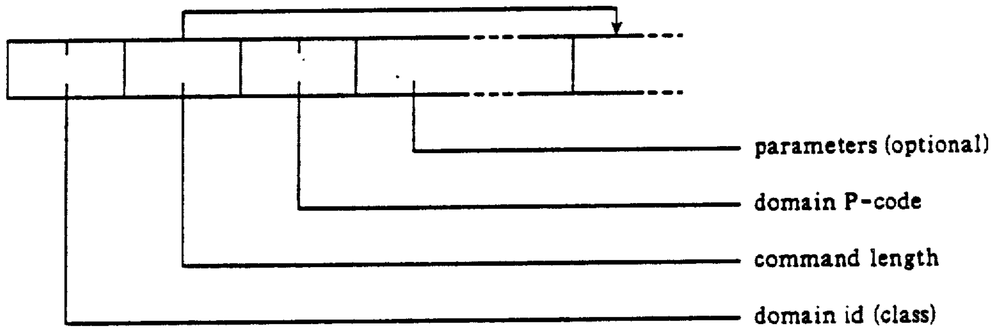
COMMAND
Algorithm
COMPARE
Compares A and B and set top of stack accordingly
Syntax
```
COMPARE
```
Fields
| | |
|---|---|
| Length | 4 bytes |
| P-Code Id | |
| Parameters | None |
Algorithm
DUP
Pushes a copy of A on the stack
Syntax
```
DUP
```

Fields

Length 4 bytes

P-Code Id

Parameters None

Algorithm

EXCHANGE

Exchanges A and B on the stack

Syntax

```
EXCHANGE
```

Fields

Length 4 bytes

P-Code Id

Parameters None

Algorithm

FOCUS

Gives a specified object the focus

Syntax

```
FOCUS    Title, Classname
```

Fields

Length 85 bytes

P-Code Id

Parameters

| | |
|---|---|
| *Title* | of the object. Null terminated string, field length is 15 characters. |
| *Classname* | of the object. Null terminated string, field length is 65 characters. |

Algorithm

JUMP

Move the IP to a specified value

Syntax

```
JUMP     Address
```

Fields

Length 8 bytes

P-Code Id

Parameters

| | |
|---|---|
| *Address* | New value of IP. Type is ADDRESS. |

Algorithm

JUMP_IF

JUMP if A meets a specified condition

Syntax

```
JUMP_IF     Condition, Address
```

Fields

| | | |
|---|---|---|
| Length | 10 bytes | |
| P-Code Id | | |
| Parameters | | |
| | *Condition* | Integer indicating condition A must meet to execute the JUMP |
| | *Address* | New value of IP. Type is ADDRESS. |

Algorithm

POP

Stores the top of stack into a data item

Syntax

```
POP     Data Item
```

Fields

| | | |
|---|---|---|
| Length | 6 bytes | |
| P-Code Id | | |
| Parameters | | |
| | *Data Item* | Integer index into the Variable Table |

Algorithm

PUSH

Puts the contents of a data item on top of stack

Syntax

```
PUSH     Data Item
```

Fields

Length 6 bytes

P-Code Id

Parameters

*Data Item* Integer index into the Variable Table

Algorithm

PUSH

Puts a value on top of stack

Syntax

```
PUSHI     Data Item
```

Fields

Length 14 bytes

P-Code Id

Parameters

*Data Item* to be pushed. Type is VARITEM.

Algorithm

Table of Contents

Section ?
TASK LANGUAGE INTERNALS

?.1 Compilation Process . . . . ?-1
?.2 Object File Format . . . . ?-2
?.2.1 Header Record . . . . ?-2
?.2.2 Code Section . . . . ?-3
?.2.3 Data Tables . . . . ?-3
?.3 Compile Time Environment . . . . ?-5
?.3.1 Data Files . . . . ?-5
?.3.1.1 Keyword File . . . . ?-5
?.3.1.1 Dictionary File . . . . ?-5
?.3.2 Scanner Data Structures . . . . ?-6
?.3.2.1 StringTable . . . . ?-6
?.3.2.1 Identifier Buffer . . . . ?-6
?.3.2.2 Hash Buffer . . . . ?-6
?.3.2.3 Class Information . . . . ?-7
?.3.2.4 Address . . . . ?-7
?.3.2.5 Additional Tables . . . . ?-7
?.3.3 Labels and Flow Control . . . . ?-7
?.3.3.1 IF Statement . . . . ?-7
?.3.3.1 IF and WHILE . . . . ?-7
?.3.4 Major Procedures . . . . ?-8
?.3.5 Scanner . . . . ?-8
?.3.6 Parser . . . . ?-8
?.4 Run-time Environment . . . . ?-9
?.4.1 Run-time Data Structures . . . . ?-9
?.4.1.1 STACKTOKEN . . . . ?-9
?.4.1.1 Stringtable . . . . ?-10
?.4.1.2 Variable Table . . . . ?-10
?.4.1.3 Address . . . . ?-10
?.4.1.4 Array Table . . . . ?-10
?.4.1.5 Interrupt Table . . . . ?-10
?.4.1.6 To Be Defined . . . . ?-11
?.4.2 Run-time Procedures . . . . ?-11
?.5 Debugging Aids . . . . ?-11
?.6 P-Code Instruction Set . . . . ?-12
CALL . . . . ?-14
COMMAND . . . . ?-15
COMPARE . . . . ?-17
DUP . . . . ?-18
EXCHANGE . . . . ?-19
FOCUS . . . . ?-20
JUMP . . . . ?-21
JUMP_IF . . . . ?-22
POP . . . . ?-23
PUSH . . . . ?-24
PUSHI . . . . ?-25

Appendix D

API_INTERROGATE_MSG

Purpose To allow the Agent to send for read-only information from the application so that the information returned is available within the Agent Task or set by other variable components.

The Agent thus SENDs the message API_INTERROGATE_MSG. The application looks up the necessary information and passes it back to the Agent. The Agent will then put that information into variables inside the task or will provide it to HELP. The Interrogate message can have many types, as defined in the CLASS INDEPENDENT INTERROGATION FUNCTIONS (refer to Section A-9), e.g. interrogation for HELP, CBT, or the Agent.

Parameters *wParam* is a number that falls within the range coding of the API and Class Independent Interrogation Functions.

*lParam* is a global handle to a global buffer, containing information relevant to the interrogation function being called.

Return Value The return value is dependent on the Class Independent Interrogation Function.

API_WHATS_INSERTABLE_AT_FN

Purpose - This message allows a caller to find out if there are any insertable objects at the specified point. An *insertable* object is one that supports the OMF_INSERT message.

Parameters - The LOWORD of lParam is a handle to global memory allocated with GMEM_LOWER. The memory is (MAXCLASSNAME + MAXTITLE + 2) bytes in size.

MAXCLASSNAME (defined in NWOMF.H) is the maximum length of the PROP_CLASSNAME property. MAXTITLE (also defined in NWOMF.H) is the maximum length of the PROP_TITLE property. The two extra bytes are for NULLs.

HIWORD is not used.

The receiver of this message should lock the handle that was passed and cast the resulting long pointer to an LPPOINT. This point is a screen coordinate position.

Return Value - If there is an insertable object at the point that was passed in the receiver's window, it should copy into the shared memory that object's null terminated PROP_CLASSNAME string immediately followed by that object's null terminated PROP_TITLE string. The two strings should be packed into the memory (e.g., "Folder\0June Sales\0" where "\0" indicates the NULL character).

If there is no insertable object at this point in the receiver's window, it should copy a NULL string into the memory.

The handle should be unlocked before returning.

The return value from the call should be -1L to indicate success and 0L to indicate problems. If the receiver does not support insertable children, it is permitted to return 0L without altering shared memory.

Special Notes - It is possible that the screen coordinates passed may specify a point that is not currently in the receiver's client area. If the receiver has a scrollable window, this is not necessarily an error. The receiver should map screen coordinates to his logical space when searching for an insertable child.

API_WHO_ARE_YOU_FN

Purpose - To allow an open object to supply its classname and title to the caller. This need only be handled if the object supports the OMF_INSERT message.

Parameters - The LOWORD of lParam is a handle to global memory allocated with GMEM_LOWER. The memory is (MAXCLASSNAME + MAXTITLE + 2) bytes in size.

MAXCLASSNAME (defined in NWOMF.H) is the maximum length of the PROP_CLASSNAME property. MAXTITLE (also defined in NWOMF.H) is the maximum length of the PROP_TITLE property. The two extra bytes are for NULLs.

HIWORD is not used.

Appendix E

Extensible Agent Task Language

Barbara Packard
Chuck Whelan

1. INTRODUCTION

The Agent Task Language is a set of procedural commands which provide users access to the task automation functionality of NewWave. Scripts can be written which will create, delete, modify, and otherwise manipulate NewWave objects. The scripts are processed by an interpretive engine, which is part of the Agent object. In the NewWave environment, each task is a separate object with associated data files. They will function across and within object classes and be supported by all NewWave applications. When the user *opens* a task, he sees the contents of the file containing the Task Language commands, available for editing and compilation. When he drags a task to the Agent icon, the associated binary *P-Code* file is executed. Task Language commands have a verb/object syntax:

```
<command keyword>  [ parameter ]. . .
```

The parameter of a command may be either a keyword or a literal. Commands are line-oriented, but a continuation character is available to extend a command across the line boundary. A primary concern in the language definition was the mapping of the interactive user interface to the Task Language commands. To make the scripts as readable as possible, we wanted to have the command keywords reflect user actions. For example, if an action was accomplished interactively by clicking on a menu item such as CUT, the corresponding Task Language command would contain that menu item as its command keyword verb. The parameter type is command dependent, but numeric, string and keyword command parameters can be used.

1.1 User Requirements

Agent Tasks will be created and executed by users whose expertise will vary widely. The spectrum will vary from

- the casual NewWave user who records a few of his actions within an object, saves them as a task which he executes to repeat his actions, to
- the power user who constructs complicated automated tasks, frequently for other users, which execute for considerable time without user intervention, The novice, using Task Language as a macro recorder, quite possibly may never look at the Task Language form of the task which has been recorded. He will require ease of use and high performance. The power user will demand a language with at least the power of command languages in existing applications such as Excel or DBaseIII Plus.

Our chosen model for Task Language is the power user. The language is appropriate for constructing large automated tasks which involve several applications. We have provided a conversational window facility, designed by the task writer and controlled by the Task Language script, which enables the task to receive user input and display information. Other features include variables, functions, task subroutines, control statements such as conditionals and loops, and numeric, string, and logical expressions. Note that a command parameter which is defined as a literal may also be an expression of the same type.

We expect that in time many casual users will move toward the power user model. The language should be designed to facilitate this. Toward this end, the Agent Task Recorder facility has a built-in Watch feature. The user can see the Task Language command which was recorded as a result of his action. Obviously, recorded tasks will not contain the advanced programming features listed above, but the relationship of the user's interactive actions to the Task Language commands will be apparent from the syntax of the command. In particular, the syntax of Task Language commands will be meaningful enough to serve as a learning aid to users who wish to explore the more advanced features of NewWave Agent Tasks. Here we have another reason for the close mapping of the command keywords to the interactive user action.

1.2 System Requirements

The system requirements, to automate a task which spans applications, have a somewhat different perspective. A Task Language statement is either a control statement ( examples include variable assignment, procedure call, loops ) or an action command ( such as CLOSE, CUT, PASTE ) to a particular object. The former is independent of the current active object and can be executed by the Agent interpretive engine, but the latter will be sent to an object of a particular application class and executed by it. Commands are not identical across applications; many are very class specific. For example, most applications support some form of SELECT. But the object of the selection, which translates to the parameter of the Task Language command will vary widely depending on the object class. In a document one would SELECT a range of text, in a spreadsheet a cell or range of cells. However, in the Office Window the selection is an icon, i.e. another object with a class and title. The NewWave open architecture specification mandates the dynamic installation and removal of application classes and leads to a unique configuration on each system. Task Language commands for a NewWave application written by an ISV must also be supported. It is impossible for the Agent engine to keep track of the command set and syntax supported by each application currently active on the system. The Agent engine should not interpret the contents of a command it sends to an application in playback. It is equally impractical to have each application class parse its commands at execution time, returning similar syntax error messages, or handling variables or expressions as parameters. The solution is a Task Language parser module and recorder template for each application class. The parser converts ASCII Task Language commands to the *external command* form recognized by the application. The recorder template converts the external command to ASCII Task Language commands during the task recording. These are installed into the task automation process when the application is installed into NewWave. As applications are added to and removed from the system, the set of Task Language commands accepted by the compiler and created by the recorder is customized accordingly.

1.3 Application Developer Requirements

If developers of NewWave applications need to provide parser and recorder modules for task automation, we must supply tools and guidelines to make their job as simple as possible. We must separate out the components which are common to all applications and provide code for these in libraries, as well as providing source templates for typical semantic routines. Since we wish to have the Task Language commands appear as one programming language to the user, we must provide guidelines and examples of appropriate syntax for commands which are the same or similar across applications.

2. THE TASK LANGUAGE COMPILER

Our first design decision was to *compile* Task Language scripts to a binary *P-Code* format for execution rather than *interpreting* the ASCII commands at runtime. There were several reasons for this.

1. The binary format is more compact particularly for long tasks.

2. A standardized binary format is more suitable for execution by applications in the Windows environment.

3. Syntax and other obvious errors can be flagged and fixed at compile time.

4. Non-sequential instructions such as loops and procedure calls can be handled efficiently.

5. Functions, variables, and expressions can be preprocessed and handled in a standard manner.

In the future we will add runtime debugging aids such as sourceline execution monitoring to minimize the disadvantage to the developer of separating the development and execution environments.

As a result, the Task Language compiler is a two pass compiler. The first pass follows the general compiler model of scanner, parser and semantics. It receives as input the ASCII Task Language script, parses it, and generates binary P-Code records which are written to a temporary file. The second pass fixes up instructions which reference addresses which were unknown when the P-Code was initially generated.

2.1 Object File Format

Successful compilation of a task creates a binary *object file*. An object file consists of two main parts: a fixed length header record and the binary P-code records which will be executed by the Agent interpretive engine. As a future enhancement, data tables to be used for debugging will be added as a third section. The object file format is shown in Figure 1.

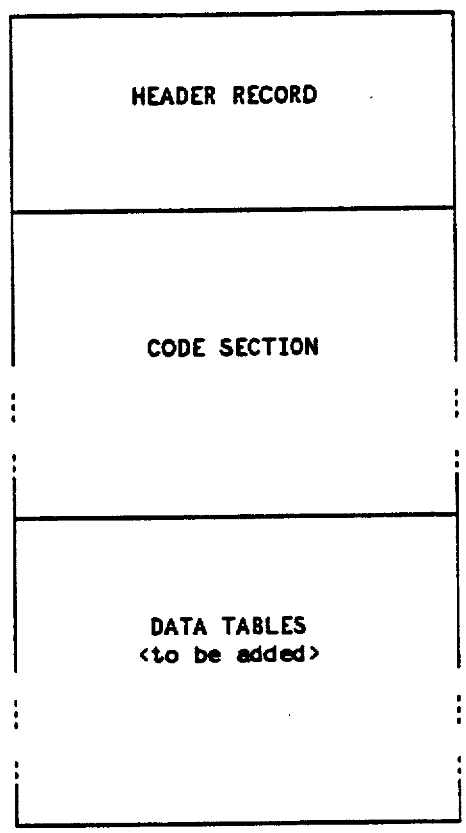

Figure 1. Object File Format

The header record is a fixed length. It contains the version id of the compiler as well as information such as the number of variables, conversational windows, and pages of code in the task.

The code section of the object file consists of the variable length, binary *P-Code* records which are executed at run time by the Agent engine. Many P-Code instructions are similar to high level assembly language. Pointers to locations in the code are maintained as *Addresses*. Addresses consist of a page number and an offset into that page, thus identifying the start of an instruction. Page size is a fixed length. P-Code instructions do not cross page boundaries; however, a continuation P-Code is available.

2.1.1 THE P-CODE RECORD. The Agent Interpretive Engine performs a task by fetching and executing the P-Code instructions. The generic record format is shown in Figure 2.

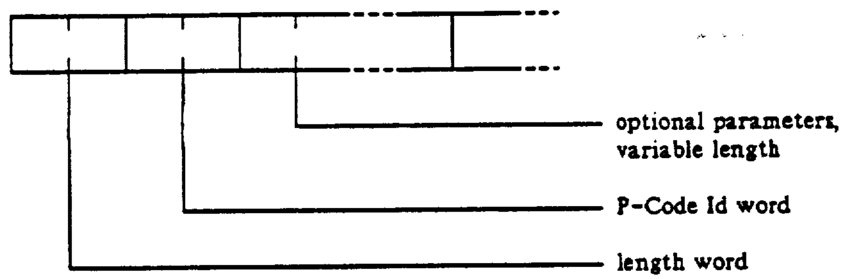

Figure 2. Binary P-Code Record Format

Field Description

| | |
|---|---|
| *Length* | contains the number of bytes in the record including the length word. A record with no parameters will have a length of 4. |
| *P-Code Id* | is the numeric opcode of the instruction. |
| *Parameters* | are any parameters which the instruction requires. The type and length are instruction-dependent. Parameter of type string are null-terminated. |

2.1.2 THE COMMAND P-CODE. As mentioned earlier, most P-Code instructions result in an action command sent to a particular application object. Figure 3 illustrates the P-Code format for a command. The parameters of the P-Code, except for the integer class id word, comprise the *external command* form which will be sent to the application.

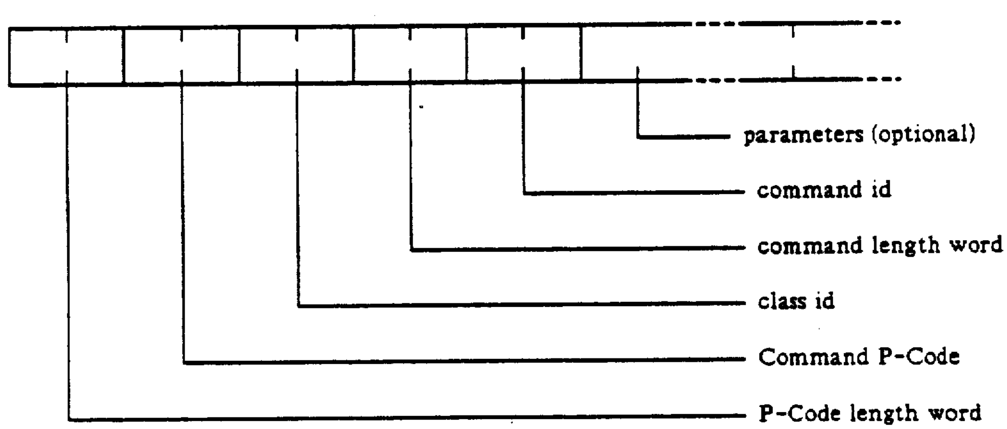

Figure 3. Structure of P-Code = COMMAND

Parameters

| | |
|---|---|
| *Class Id* | Integer indicating class of object recognizing this command, task dependent |
| *Command Length* | Integer containing length of length word, command id word, and parameters |
| *Command Id* | Set by application |
| *Parameters* | variable length and type, command dependent |

At runtime, the Agent engine strips the first three words and sends the remainder, the external command, to the application. The Agent engine requires the length word; the remainder of the structure is designed by the application. However, applications are strongly urged to used the format illustrated.

3. RUN-TIME ENVIRONMENT

The Agent Interpretive Engine is implemented as a simple stack machine. Variable assignments, function and procedure calls, and expression evaluations are all stack operations. When a task starts up, the Agent initializes its data structures using information in the task header record. It then makes a Windows intrinsic call to receive a Windows TIMER message at regular intervals. Each TIMER triggers a P-Code *fetch* and *execution*. The Agent relinquishes control between instructions thus allowing tasks to conform to same execution guidelines as other NewWave objects. P-Codes are fetched from the current page which is retained in memory. Pages are procured as needed. If the P-Code is a command, the Agent checks the class id to determine if the instruction class matches the class of the object which currently has focus. If so, it posts an API_PLAYBACK_MSG to the object with the command as a parameter. No more P-Code instructions are executed until it receives an API_RETURN_MSG.

4. THE TASK LANGUAGE PARSERS

To implement the modularization and customization of Task Language, we designed a system of multiple parsers. The main compiler contains two parsers, the top level, or *Class Independent*, parser and the *Expression* parser which handles functions and expressions of numeric, string and logical type. Each application has a parser module which parses its class dependent Task Language commands. This module also includes semantic routines which convert the parsed command to the external command form. The parser modules are in the form of Windows *dynamic libraries* and are accessed from the Class Independent parser through the Windows *LoadLibrary* intrinsic. The application's installation file identifies the library file, the application classname, and the names of its parse routines by adding them to its OMF Property List as a property PROP_AGENTTASKINFO. The Task Language Compiler enumerates all applications with this property. It is then aware of all available classes of Task Language commands. Again, this can be unique to each system configuration. However, it loads only the libraries of those requested by the task script.

4.1 Components

The following sections describe briefly the various components of the parsers. Figure 4 shows a data flow diagram of their interaction.

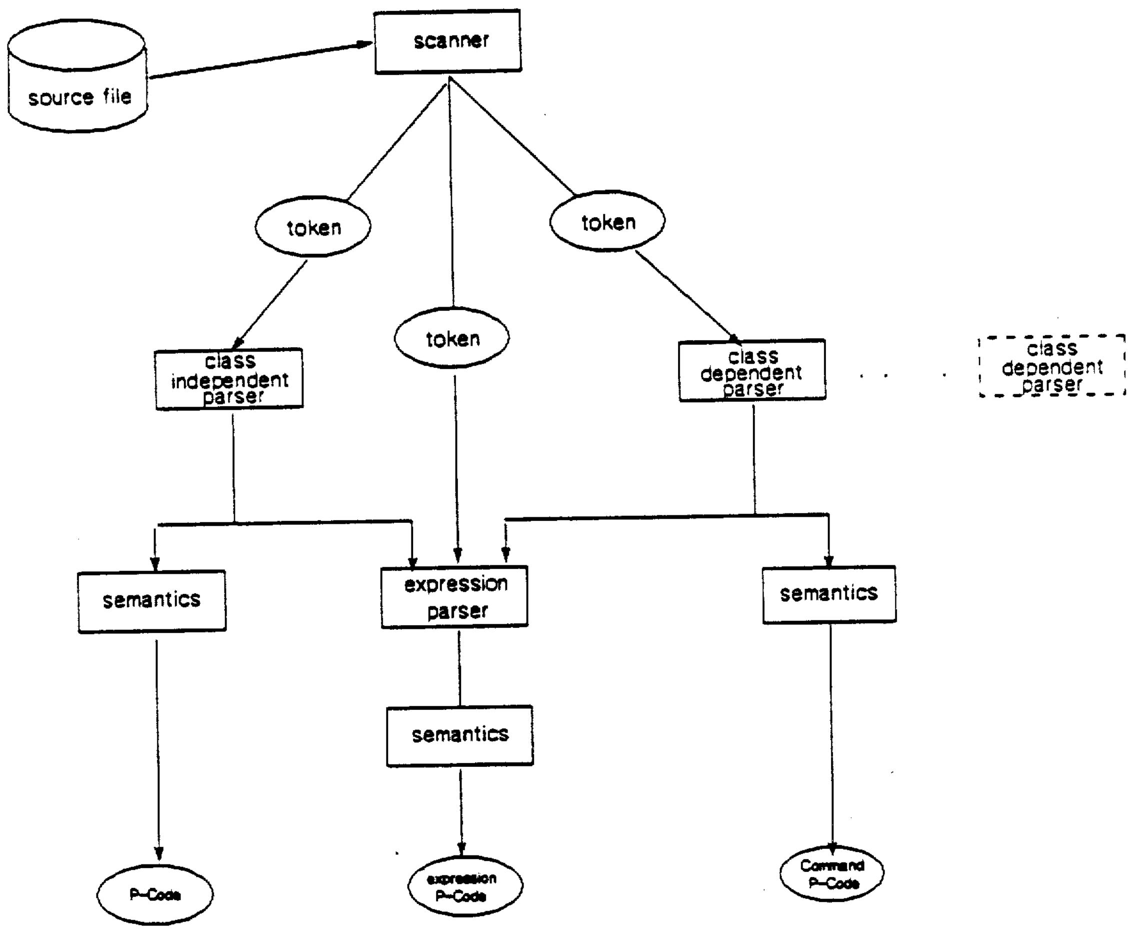

Figure 4. Parser Data Flow

4.1.1 PARSER ROUTINES. The current parser modules have been created using the YACC Parser Generator. YACC was developed at Bell Labs and may be purchased, together with its source files, at a nominal price from various software houses. It is also available from public domain sources. There is nothing to preclude a developer from substituting his customized parse routine in place of a YACC generated one.

4.1.2 KEYWORD FILE. The recommended Class Dependent parser model stores its command keywords in a file which is read into a table during the initialization process. The token number of each keyword depends on its position in the file. This permits a certain amount of command localization without reconstructing the parser.

4.1.3 SCANNER ROUTINE. The scanner was developed in-house and provides the only access to the Task Language source file. All parser modules must call it for token input. The scanner returns token types and indices to appropriate tables where the values are stored. If a parser module uses a different token representation, it may modify its scanner to retrieve the value at this point and continue processing.

4.1.4 EXPRESSION PARSER. The Expression Parser is available to the Class Independent and Class Dependent parsers. It is activated by a semantic call during the parse of a command. It processes tokens until it finds one which is not part of the expression. The associated semantic routines generate P-Codes to evaluate the expression and place the result on the engine run-time stack. The Expression Parser then sets the state of the scanner so that the next token request (by a command parser) will return a token type *expression* which will satisfy the conditions of the parse. Note that there is no requirement that Class Dependent parsers use the Expression Parser.

4.1.5 SEMANTIC ROUTINES. Since the structure of the external command form is known only to the relevant application, the semantic routines must be the responsibility of the application developer. However, we have provided a library of routines to perform functions such as initialization, buffer management, cleanup. Also, there are routines which handle the semantic processing of expressions when they occur as command parameters. Using this library will greatly simplify the implementation of the semantics. The output of the semantic routines is returned to the compiler in a buffer and then written to the object file.

4.2 The FOCUS Command

The compiler directs the source processing to the appropriate parser through the FOCUS command. This command needs additional discussion since it results in both compile time and run time actions. The syntax is

```
FOCUS  [ [ON]   <classname>  "<title string>" ]
       [ [OFF]                                ]
```

where <classname> refers to the *class* of object ( for example DOCUMENT or FOLDER) as recognized by the Task Language parsers, and *"<title string>"* is the title of the specific object referenced. At installation time this classname is added to the OMF PROP_AGENTTASKINFO property of the class. When a task is compiled, the compiler adds the classnames to its list of keywords recognized by the scanner, and through the scanner by the Class Dependent parsers as well.

filenames are declared in its PROP_AGENTTASK_INFO property in the application's installation file. Now all the running application needs is to get the FOCUS during a recording session, and away it goes.

6. ACKNOWLEDGMENTS

< to be added. . . >

```
#S3771; #O9306 * BARBARA.PF; LP602 * TUE, MAY 17, 1988, 6:14 AM
#S3771; #O9306 * BARBARA.PF; LP602 * TUE, MAY 17, 1988, 6:14 AM
#S3771; #O9306 * BARBARA.PF; LP602 * TUE, MAY 17, 1988, 6:14 AM
```

```
#S3771; #O9306 * BARBARA.PF; LP602 * TUE, MAY 17, 1988, 6:14 AM
#S3771; #O9306 * BARBARA.PF; LP602 * TUE, MAY 17, 1388, 6:14 AM
#S3771; #O9306 * BARBARA.PF; LP602 * TUE, MAY 17, 1988, 6:14 AM
```

```
#S3771; #O9306 * BARBARA.PF; LP602 * TUE, MAY 17, 1988, 6:14 AM
#S3771; #O9306 * BARBARA.PF; LP602 * TUE, MAY 17, 1988, 6:14 AM
#S3771; #O9306 * BARBARA.PF; LP602 * TUE, MAY 17, 1988, 6:14 AM
```

```
#S3771; #O9306 * BARBARA.PF; LP602 * TUE, MAY 17, 1988, 6:14 AM
#S3771; #O9306 * BARBARA.PF; LP602 * TUE, MAY 17, 1988, 6:14 AM
#S3771; #O9306 * BARBARA.PF; LP602 * TUE, MAY 17, 1988, 6:14 AM
```

```
/*************************************************************************
*
* hpagpPR0.H - Include file with scanner return defines                  *
*                                                                        *
**************************************************************************
*
* Agent PCODES Compiler include file                                     *
* Ver X.09.01  12/15/87                                                  *
*                                                                        *
*                                                                        *
*                                                                        *
*               COPYRIGHT HEWLETT PACKARD LIMITED                        *
*                            1986                                        *
*                     ALL RIGHTS RESERVED                                *
*                                                                        *
*                                                                        *
**************************************************************************
*                                                                        *
*                                                                        *
*                      MODIFICATION LOG                                  *
*                                                                        *
*  03/11/87 bp - created                                                 *
*  04/28/87 bp - modified for X.08.00                                    *
*       12/15/87 bp - modified for new naming conventions               *
*                                                                        *
*                                                                        *
*************************************************************************/

#define AND_            201
#define OR_             202
#define NOT_            203
#define CBT_            204
#define USER_VAR        500
#define USER_ARRAY      510
#define USER_LABEL      520
#define DATA_LABEL      525
#define USER_WINDOW     530
#define CLASS_SYMBOL    540
#define FUNCTION        550
#define SYS_VAR         580
#define INT_L           400
#define PNT_L           405
#define REAL_L          410
#define RGN_L           415
#define STR_L           420
#define STACK_L         430
#define ANY_EXP         440
#define NUM_EXP         441
#define STR_EXP         442
#define RGN_EXP         443
#define PNT_EXP         444
#define LOG_EXP         445
#define NO_EXP          450
#define LE_SYM          451
#define GE_SYM          452
#define NE_SYM          453
#define ERR_EXP         -99
#define USER_SYMBOL     600
#define LINE_END        700

typedef union {
    int ival;
    long lval;
    } YYSTYPE;

#ifndef HAVE_APICMDSTRUCT
typedef struct
  {
    WORD len;
    WORD cmd;
    char parms[128];
  }
APICMDSTRUCT;
#define HAVE_APICMDSTRUCT
#endif
```

```
#S3771; #O9306 * BARBARA.PF; LP602 * TUE, MAY 17, 1988, 6:14 AM
#S3771; #O9306 * BARBARA.PF; LP602 * TUE, MAY 17, 1988, 6:14 AM
#S3771; #O9306 * BARBARA.PF; LP602 * TUE, MAY 17, 1988, 6:14 AM

#S3771; #O9306 * BARBARA.PF; LP602 * TUE, MAY 17, 1988, 6:14 AM
#S3771; #O9306 * BARBARA.PF; LP602 * TUE, MAY 17, 1988, 6:14 AM
#S3771; #O9306 * BARBARA.PF; LP602 * TUE, MAY 17, 1988, 6:14 AM

#S3771; #O9306 * BARBARA.PF; LP602 * TUE, MAY 17, 1988, 6:14 AM
#S3771; #O9306 * BARBARA.PF; LP602 * TUE, MAY 17, 1988, 6:14 AM
#S3771; #O9306 * BARBARA.PF; LP602 * TUE, MAY 17, 1988, 6:14 AM

#S3771; #O9306 * BARBARA.PF; LP602 * TUE, MAY 17, 1988, 6:14 AM
#S3771; #O9306 * BARBARA.PF; LP602 * TUE, MAY 17, 1988, 6:14 AM
#S3771; #O9306 * BARBARA.PF; LP602 * TUE, MAY 17, 1988, 6:14 AM
```

```
#S3771; #O9307 * BARBARA.PF; LP602 * TUE, MAY 17, 1988, 6:14 AM
#S3771; #O9307 * BARBARA.PF; LP602 * TUE, MAY 17, 1988, 6:14 AM
#S3771; #O9307 * BARBARA.PF; LP602 * TUE, MAY 17, 1988, 6:14 AM

#S3771; #O9307 * BARBARA.PF; LP602 * TUE, MAY 17, 1988, 6:14 AM
#S3771; #O9307 * BARBARA.PF; LP602 * TUE, MAY 17, 1988, 6:14 AM
#S3771; #O9307 * BARBARA.PF; LP602 * TUE, MAY 17, 1988, 6:14 AM

#S3771; #O9307 * BARBARA.PF; LP602 * TUE, MAY 17, 1988, 6:14 AM
#S3771; #O9307 * BARBARA.PF; LP602 * TUE, MAY 17, 1988, 6:14 AM
#S3771; #O9307 * BARBARA.PF; LP602 * TUE, MAY 17, 1988, 6:14 AM

#S3771; #O9307 * BARBARA.PF; LP602 * TUE, MAY 17, 1988, 6:14 AM
#S3771; #O9307 * BARBARA.PF; LP602 * TUE, MAY 17, 1988, 6:14 AM
#S3771; #O9307 * BARBARA.PF; LP602 * TUE, MAY 17, 1988, 6:14 AM
```

```
/*****************************************************************
*                                                                *
* HPAGPEXT.H - Include file for definitions of external variables *
*                                                                *
******************************************************************
*                                                                *
* Agent PCODES Compiler .h file                                  *
* Ver X.05.01  12/15/87                                          *
*                                                                *
*                                                                *
*                                                                *
*               COPYRIGHT HEWLETT PACKARD LIMITED                *
*                            1988                                *
*                      ALL RIGHTS RESERVED                       *
*                                                                *
*                                                                *
*                                                                *
*                                                                *
******************************************************************
*                                                                *
*                                                                *
*                      MODIFICATION LOG                          *
*                                                                *
*  03/05/87 bp - created                                         *
*  04/28/87 bp - modified for X.08.00                            *
*       12/15/87 bp - modified for new naming conventions        *
*       05/15/88 bp - modified to make stringtable global        *
*                                                                *
*                                                                *
*                                                                *
*****************************************************************/
#include "hpagpost.h"

extern HANDLE hInst;
extern HANDLE hLibInst;
extern OMFHND hOMF;

/* file handles */
extern int fSource,
     fObject,
     fTemp,
     fPCodes,
     fLog;

/* compiler global variables  */
extern BOOL gFatalErrorflag;
extern int COPcount;
extern int arraysize;
extern int numvariables;
extern int glinenumber;
extern int numerrors;
extern int currfocus;
extern int gCurrErrnum;
extern int gLastKeyword;
extern int CBTclass;            /* for Computer Based Training parser */
extern AG_ADDRESS curraddr,
                  startaddr;

/* expression parser variables */
extern BOOL gErrorflag;
extern BOOL expressionflag;
extern int expressionstate;
extern int expressiontype;
extern int lasttoken;
extern YYSTYPE lastlval;
extern int exprtoken;
extern YYSTYPE exprlval;
extern BOOL numflag;
extern BOOL strflag;

/* scanner and parser variables */
extern int  Keyword;
extern int  token;
extern YYSTYPE  yylval;

extern int  hash[HASH_SIZE];
extern int  hash_ptr;

extern BOOL  newline;
extern BOOL  NewCharFlag;
extern BOOL  LabelFlag;
extern BOOL  gClassFlag;
extern BOOL  nilflag;
extern BOOL  inumflag;
extern BOOL  arrayflag;
extern BOOL  CDcmdflag;
extern BOOL  gEndProgflag;
extern BOOL  ContinueFlag;
extern long FAR *gErrorInfo;

/* source file buffer state globals */
extern FILEBUFSTATE gCurrBufState;

/* global data buffers */
extern char *gCharPtr, *gBufPtr, *gSourcePtr;
extern char tfilename[RECSIZE];
extern char cSourceLine[RECSIZE];
extern char cFileBuf[FILEBUF_SIZE+1];
extern char gTempBuf[RECSIZE+1];
extern char *gPCodePtr;
extern char gPCodeBuf[PAGESIZE];
```

```
/*************************************************************************
*   Handles, pointers, and variables for table management               *
*************************************************************************/

/* string table globals */
extern int  st_index;
extern int  st_size;
extern HANDLE hStringTable;

/* spelling table */
extern int  next_spelling;
extern int  spell_size;
extern HANDLE hSpellings;
extern IDENTIFIER *pSpellings;

/* class information */
extern int next_class;
extern int next_classid;
extern int class_size;
extern HANDLE hClassInfo;
extern CLASS *pClassInfo;

/* integer literals */
extern int  next_int;
extern int  intlit_size;
extern HANDLE hIntTable;
extern long  *pIntTable;

/* string literals */
extern int  next_str;
extern int  strlit_size;
extern HANDLE hStrlitTable;
extern int *pStrlitTable;

/* real literals */
extern int  next_real;
extern int  reallit_size;
extern HANDLE hRealTable;
extern double *pRealTable;

/* label information */
extern int next_label;
extern int label_size;
extern HANDLE hLabels;
extern LABEL *pLabels;

/* array information */
extern int next_array;
extern int arraytable_size;
extern HANDLE hArrayTable;
extern ARRAY *pArrayTable;

/* window information */
extern int next_window;
extern int window_size;
extern HANDLE hWindow;
extern WINDOW *pWindow;

/* function information */
extern int next_function;
extern int curr_function;
extern int function_size;
extern HANDLE hFunctionTable;
extern FNCT *pFunctionTable;

/* function parameter information */
extern int next_parm;
extern int parm_size;
extern HANDLE hParmTable;
extern long *pParmTable;
```

```
#S3771; #09307  *  BARBARA.PF; LP602  *  TUE, MAY 17, 1988,  6:15 AM
#S3771; #09307  *  BARBARA.PF; LP602  *  TUE, MAY 17, 1988,  6:15 AM
#S3771; #09307  *  BARBARA.PF; LP602  *  TUE, MAY 17, 1988,  6:15 AM
```

```
#S3771; #09307  *  BARBARA.PF; LP602  *  TUE, MAY 17, 1988,  6:15 AM
#S3771; #09307  *  BARBARA:PF; LP602  *  TUE, MAY 17, 1988,  6:15 AM
#S3771; #09307  *  BARBARA.PF; LP602  *  TUE, MAY 17, 1988,  6:15 AM
```

```
#S3771; #09307  *  BARBARA.PF; LP602  *  TUE, MAY 17, 1988,  6:15 AM
#S3771; #09307  *  BARBARA.PF; LP602  *  TUE, MAY 17, 1988,  6:15 AM
#S3771; #09307  *  BARBARA.PF; LP602  *  TUE, MAY 17, 1988,  6:15 AM
```

```
#S3771; #09307  *  BARBARA.PF; LP602  *  TUE, MAY 17, 1988,  6:15 AM
#S3771; #09307  *  BARBARA.PF; LP602  *  TUE, MAY 17, 1988,  6:15 AM
#S3771; #09307  *  BARBARA.PF; LP602  *  TUE, MAY 17, 1988,  6:15 AM
```

```
#S3771; #O9308 * BARBARA.PF; LP602 * TUE, MAY 17, 1988, 6:15 AM
#S3771; #O9308 * BARBARA.PF; LP602 * TUE, MAY 17, 1988, 6:15 AM
#S3771; #O9308 * BARBARA.PF; LP602 * TUE, MAY 17, 1988, 6:15 AM
```

```
#S3771; #O9308 * BARBARA.PF; LP602 * TUE, MAY 17, 1988, 6:15 AM
#S3771; #O9308 * BARBARA.PF; LP602 * TUE, MAY 17, 1988, 6:15 AM
#S3771; #O9308 * BARBARA.PF; LP602 * TUE, MAY 17, 1988, 6:15 AM
```

```
#S3771; #O9308 * BARBARA.PF; LP602 * TUE, MAY 17, 1988, 6:15 AM
#S3771; #O9308 * BARBARA.PF; LP602 * TUE, MAY 17, 1988, 6:15 AM
#S3771; #O9308 * BARBARA.PF; LP602 * TUE, MAY 17, 1988, 6:15 AM
```

```
#S3771; #O9308 * BARBARA.PF; LP602 * TUE, MAY 17, 1988, 6:15 AM
#S3771; #O9308 * BARBARA.PF; LP602 * #TUE, MAY 17, 1988, 6:15 AM
#S3771; #O9308 * BARBARA.PF; LP602 * TUE, MAY 17, 1988, 6:15 AM
```

```
/************************************************************************
*                                                                       *
* HPAGPDEC.H - Include file for definitions of global variables         *
*                                                                       *
*************************************************************************
*                                                                       *
* Agent TaskEditor/PCODES Compiler .h file                              *
* Ver X.09.01  12/15/87                                                 *
*                                                                       *
*                                                                       *
*                                                                       *
*                                                                       *
*                    COPYRIGHT HEWLETT PACKARD LIMITED                  *
*                                 1986                                  *
*                           ALL RIGHTS RESERVED                         *
*                                                                       *
*                                                                       *
*                                                                       *
*                                                                       *
*************************************************************************
*                                                                       *
*                                                                       *
*                            MODIFICATION LOG                           *
*                                                                       *
*  03/05/87 bp - created                                                *
*  04/28/87 bp - modified for X.08.00                                   *
*       12/15/87 bp - modified for new naming conventions               *
*       05/15/88 bp - modified to make stringtable global               *
*                                                                       *
*                                                                       *
*                                                                       *
************************************************************************/
#include "hpagpdef.h"

HANDLE hInst;
HANDLE hLibInst;
OMFHND hOMF;

/* file handles */
int fSource,
    fObject,
    fTemp,
    fPCodes,
    aLog;

/* compiler global variables  */
BOOL gFatalErrorflag;
int CDPcount;
int arraysize;
int numvariables;
int glinenumber;
int numerrors;
int currfocus;
int gCurrErrnum;
int gLastKeyword;
int CBTclass;                  /* for Computer Based Training parser */
AS_ADDRESS curraddr,
           startaddr;

/* expression parser variables */
BOOL gErrorflag;
BOOL expressionflag;
int expressionstate;
int expressiontype;
int lasttoken;
YYSTYPE lastlval;
int exprtoken;
YYSTYPE exprlval;
BOOL numflag;
BOOL strflag;

/* scanner and parser variables */
int  Keyword;
int  token;
YYSTYPE  yylval;

int  hash[HASH_SIZE];
int  hash_ptr;

BOOL  newline;
BOOL  NewCharFlag;
BOOL  LabelFlag;
BOOL  gClassFlag;
BOOL  nlflag;
BOOL  lnumflag;
BOOL  arrayflag;
BOOL  CDcmdflag;
BOOL  gEndProgflag;
BOOL  ContinueFlag;
long FAR *gErrorInfo;

/* source file buffer state globals */
FILEBUFSTATE gCurrBufState;

/* global data buffers */
char *gCharPtr, *gBufPtr, *gSourcePtr;
char tfilename[RECSIZE];
char cSourceLine[FILEBUF_SIZE];
char cFileBuf[FILEBUF_SIZE+1];
char gTempBuf[PAGESIZE+1];
char *gPCodePtr;
char gPCodeBuf[PAGESIZE];
```

```
/****************************************************************************
*   Handles, pointers, and variables for table management                   *
****************************************************************************/

/* string table globals */
int  st_index;
int  st_size;
HANDLE hStringTable;

/* spelling table */
int  next_spelling;
int  spell_size;
HANDLE hSpellings;
IDENTIFIER *pSpellings;

/* class information */
int next_class;
int next_classid;
int class_size;
HANDLE hClassInfo;
CLASS *pClassInfo;

/* integer literals */
int  next_int;
int  intlit_size;
HANDLE hIntTable;
long  *pIntTable;

/* string literals */
int  next_str;
int  strlit_size;
HANDLE hStrlitTable;
int *pStrlitTable;

/* real literals */
int  next_real;
int  reallit_size;
HANDLE hRealTable;
double *pRealTable;

/* label information */
int next_label;
int label_size;
HANDLE hLabels;
LABEL *pLabels;

/* array information */
int next_array;
int arraytable_size;
HANDLE hArrayTable;
ARRAY *pArrayTable;

/* window information */
int next_window;
int window_size;
HANDLE hWindow;
WINDOW *pWindow;

/* function information */
int next_function;
int curr_function;
int function_size;
HANDLE hFunctionTable;
FNCT *pFunctionTable;

/* function parameter information */
int next_parm;
int parm_size;
HANDLE hParmTable;
long *pParmTable;
```

```
#S3771; #O9308 * BARBARA.PF; LP602 * TUE, MAY 17, 1988, 6:15 AM
#S3771; #O9308 * BARBARA.PF; LP602 * TUE, MAY 17, 1988, 6:15 AM
#S3771; #O9308 * BARBARA.PF; LP602 * TUE, MAY 17, 1988, 6:15 AM

#S3771; #O9308 * BARBARA.PF; LP602 * TUE, MAY 17, 1988, 6:15 AM
#S3771; #O9308 * BARBARA.PF; LP602 * TUE, MAY 17, 1988, 6:15 AM
#S3771; #O9308 * BARBARA.PF; LP602 * TUE, MAY 17, 1988, 6:15 AM

#S3771; #O9308 * BARBARA.PF; LP602 * TUE, MAY 17, 1988, 6:15 AM
#S3771; #O9308 * BARBARA.PF; LP602 * TUE, MAY 17, 1988, 6:15 AM
#S3771; #O9308 * BARBARA.PF; LP602 * TUE, MAY 17, 1988, 6:15 AM

#S3771; #O9308 * BARBARA.PF; LP602 * TUE, MAY 17, 1988, 6:15 AM
#S3771; #O9308 * BARBARA.PF; LP602 * TUE, MAY 17, 1988, 6:15 AM
#S3771; #O9308 * BARBARA.PF; LP602 * TUE, MAY 17, 1988, 6:15 AM
```

```
#S3771; #O9309 * BARBARA.PF; LP602 * TUE, MAY 17, 1988, 6:15 AM
#S3771; #O9309 * BARBARA.PF; LP602 * TUE, MAY 17, 1988, 6:15 AM
#S3771; #O9309 * BARBARA.PF; LP602 * TUE, MAY 17, 1988, 6:15 AM
```

```
#S3771; #O9309 * BARBARA.PF; LP602 * TUE, MAY 17, 1988, 6:15 AM
#S3771; #O9309 * BARBARA.PF; LP602 * TUE, MAY 17, 1988, 6:15 AM
#S3771; #O9309 * BARBARA.PF; LP602 * TUE, MAY 17, 1988, 6:15 AM
```

```
#S3771; #O9309 * BARBARA.PF; LP602 * TUE, MAY 17, 1988, 6:15 AM
#S3771; #O9309 * BARBARA.PF; LP602 * TUE, MAY 17, 1988, 6:15 AM
#S3771; #O9309 * BARBARA.PF; LP602 * TUE, MAY 17, 1988, 6:15 AM
```

```
#S3771; #O9309 * BARBARA.PF; LP602 * TUE, MAY 17, 1988, 6:15 AM
#S3771; #O9309 * BARBARA.PF; LP602 * TUE, MAY 17, 1988, 6:15 AM
#S3771; #O9309 * BARBARA.PF; LP602 * TUE, MAY 17, 1988, 6:15 AM
```

```
/**********************************************************************
*                                                                     *
* HPAGPDEF.H - Include file for compiler defines                      *
*                                                                     *
***********************************************************************
*                                                                     *
* Agent TaskEditor/PCODES Compiler .h file                            *
* Ver X.09.01  12/15/87                                               *
*                                                                     *
*                                                                     *
*                                                                     *
*                    COPYRIGHT HEWLETT PACKARD LIMITED                *
*                                  1986                               *
*                           ALL RIGHTS RESERVED                       *
*                                                                     *
*                                                                     *
*                                                                     *
***********************************************************************
*                                                                     *
*                                                                     *
*                          MODIFICATION LOG                           *
*                                                                     *
*  03/06/87 bp - created                                              *
*       12/15/87 bp - modified for new naming conventions             *
*       05/15/88 bp - modified to make stringtable global             *
*                                                                     *
*                                                                     *
*                                                                     *
**********************************************************************/

#define COM1_TRACING
#define STATIC

#define CR '\015'
#define LF '\012'
#define CRLF "\15\12"
#define END_KEYWORD "$$$"
#define CBT_CLASSSYM        "AGCBT"

#define KEYWORD             200
#define END_OF_PROG         -1
#define NO_HANDLE           -1
#define NO_FOCUS            -1
#define NO_CLASS            -1
#define CBT_CLASS           -1
#define LIBFILE             1
#define KEYFILE             2
#define INITPROC            3
#define PARSEPROC           4
#define TERMPROC            5
#define CLASSNAME           6

#define AGENTNAME_INFO_INDEX     0
#define LIBFILE_INFO_INDEX       1
#define KEYFILE_INFO_INDEX       2
#define INITPROC_INFO_INDEX      5
#define PARSEPROC_INFO_INDEX     6
#define TERMPROC_INFO_INDEX      7

#define INITRTN             "PARSEINIT"
#define PARSERTN            "PARSECOMMAND"
#define TERMRTN             "PARSEEND"

#ifndef IDS_VERSIO
#define IDS_VERSIO          101
#define IDS_ARRAYERR        102
#endif

#ifndef EOF
    #define EOF             (-1)
#endif
#ifndef O_CREATE
    #define O_CREATE        0x0010
#endif

#ifndef DECIMAL_POINT
    #define DECIMAL_POINT           '.'
    #define MAXERRORS               20
#endif

#define EQ_SYMBOL           AG_EQ_SYMBOL
#define GT_SYMBOL           AG_GT_SYMBOL
#define LT_SYMBOL           AG_LT_SYMBOL
#define LE_SYMBOL           EQ_SYMBOL | LT_SYMBOL
#define GE_SYMBOL           EQ_SYMBOL | GT_SYMBOL
#define NE_SYMBOL           GT_SYMBOL | LT_SYMBOL
#define MINUS               -1                          /* avoid pcode collision */

#define IF_SYMBOL           1
#define ENDIF_SYMBOL        2
#define ELSE_SYMBOL         3
#define WHILE_SYMBOL        4
#define INWHILE_SYMBOL      5
#define ENDWHILE_SYMBOL     6
#define CONDITIONAL_SYM     -1


/* defines for scans routine */
#define S_INT               0
#define S_STR               1

/* scanner table defines */
#define DEBUG_STR           121
#define HASH_SIZE           101
#define STR_SIZE            80
#define SPELLINGS_SIZE      400
#define NUM_CLASSES         30
#define NUM_LABELS          100
#define NUM_ARRAYS          100
#define NUM_WINDOWS         10
#define NUM_LITS            100
#define NUM_FUNCTIONS       10
#define NUM_PARMS           100
#define INIT_ST_SIZE        3000
#define DELTA_ST_SIZE       1000
#define FILEBUF_SIZE        512
#define RECSIZE             256
#define MAXNAME             65
```

```
#define MAXEXT          5
#define MAXLIBS         3

#define PAGESIZE        512
#define BASE_HEX        16

typedef struct {
    int type;                   /* of identifier                */
    int name;                   /* index into string table      */
    int value;                  /* type dependent info          */
    int usertype;               /* if keyword collision         */
    int uservalue;              /* type dependent if usertype   */
    int link;                   /* to next entry with same hash */
} IDENTIFIER;

typedef struct {
    HANDLE hLib;                /* to domain dynamic library    */
    int classid;                /* for runtime commands */
    int value;                  /* Spellings buffer index of class symbol */
    int libname;                /* string table index of library.EXE file */
    int keywordfile;            /* string table index of keyword file */
    int libproc;                /* string table index of library procedure */
    int initproc;               /* string table index of library
                                   initialization procedure */
    int termproc;               /* string table index of library
                                   terminate procedure */
    int classname;              /* string table index of classname string */
    int lastaccess;             /* access count for LRU library swapping */
} CLASS;

typedef struct {
    int idnum;
    int size;
    int offset;
    }  ARRAY;

typedef struct {
    int name;                   /* IDENTIFIER table index of window name */
    BOOL defn;
} WINDOW;

typedef struct {
    int name;                   /* IDENTIFIER table index of label name */
    AG_ADDRESS address;
} LABEL;

typedef struct {
    int  index;                 /* to character in buffer */
    int  size;                  /* number of characters in buffer */
    long fileptr;               /* byte offset of start of buffer */
    int  linenumber;            /* saved at beginning of a command */
} FILEBUFSTATE;

typedef FILEBUFSTATE FAR *LPFILEBUFSTATE;

/* function entries are also saved in StringTable */
typedef struct {
    int classid;                /* 0 is CI function             */
    int idnum;                  /* token number from CAD        */
    int type;                   /* as defined in AG.H           */
    int nextclass;              /* function info entry if collision */
    int numparms;
    int reqparms;               /* number of required parameters*/
    int parms[1];               /* parmtypes as defined in AG.H */
    }  FUNCTIONINFO;

typedef FUNCTIONINFO FAR *LPFUNCTIONINFO;
#define FCTINFOSIZE             sizeof(FUNCTIONINFO) - sizeof(int)

typedef struct {
    int info_index;             /* in stringtable to function info entry */
    int classid;                /* 0 is CI function             */
    BOOL strflag;               /* at function entry            */
    BOOL numflag;               /* at function entry            */
    int numparms;               /* currently processed          */
    int parm_index;             /* start of parameters in parms table */
    }  FNCT;

#define MAX_INFOPROP 256

typedef struct  {   /* data maintained for a AGENTTASK_INFO property */
 char   propdata[MAX_INFOPROP+1];  /* last guarantees null term */
 HANDLE hmem;
} PROPINFODATA;
typedef PROPINFODATA FAR *LPPROPINFODATA;

/* buffer accessing macros */
#define GetLong(i)              (*(pIntTable + i))
#define GetDouble(i)            (*(pRealTable + i))
#define Round(i)                (int)(*(pRealTable + i)+0.5)
#define GetInt(i)               (int)GetLong(i)
#define GetReal(i)              (float)GetDouble(i)
#define DefUserWnd(i)           (pWindow + i)->defn = TRUE
#define IsWndDefined(i)         ((pWindow + i)->defn)
#define GetLabelEntry(i)        ((LABEL *)(pLabels + i))
#define GetArrayEntry(i)        ((ARRAY *)(pArrayTable + i))
#define GetClassEntry(i)        ((CLASS *)(pClassInfo + i))
#define GetRegion(i)            (AG_REGION *)(pRealTable + i )
#define GetPoint(i)             (POINT *)(pIntTable + i )
#define GetFunctionInfo(i)      (LPFUNCTIONINFO)GetStringTable(i);
#define GetStrLit(i)            GetStringTable( *(pStrlitTable + (i)) )
#define GetFunction(i)          (pFunctionTable + i)
#define GetParm(i)              (pParmTable + i)
#define GetFunctionEntry(i)     (pSpellings+i)->value
#define UnlockStringTable(i) while (GlobalFlags(hStringTable) & GMEM_LOCKCOUNT)\
                                GlobalUnlock( hStringTable )

/* forward procedure declarations */
LPSTR PASCAL GetStringTable( int );
int PASCAL PutStringTable( LPSTR );
int PASCAL PutStrLit( LPSTR );
VOID DoPass2( LPSTR );
VOID FreeTables( VOID );
char GetChar( VOID );
VOID InitScanFlags( VOID );
char *ReadFile(char *, PHANDLE, int);
char *scans( char *, char, char *);
VOID PASCAL SetErrMsg(int);
VOID UnlockTables( VOID );
VOID OutputPCode( int, int, LONG );
```

```
VOID OutputPCode2( int, LONG, LONG );
VOID OutputStackParms( int, int, LONG );
VOID WriteCmdPCode( LPSTR, int, int );
LONG MakePoint( LONG, LONG );
LONG MakeRegion(LONG, LONG, LONG );
LONG MakeMinus( LONG );
VOID RestoreCmdBuf( FILEBUFSTATE * );
VOID InitCmdBuf( FILEBUFSTATE * );
VOID MakeToken( int );
VOID UserInput( int, LONG, LONG, LONG, LONG * );
VOID FreeCDLibs( VOID );
VOID FreeCDParser( int );
VOID UpdateAccessCount( HANDLE );
LPSTR FAR PASCAL Externalyylex( LPINT, LPINT );
VOID FAR PASCAL MakeExpression( int );
VOID  FAR PASCAL FetchClassIndex( int, LPINT, LPINT );
VOID  FAR PASCAL FetchClassInfo( int, LPSTR, LPSTR );
                                                    /* from CIP StringTable */
LPSTR FAR PASCAL GetStringEntry( int );             /* from CIP literal tables */
LPSTR FAR PASCAL GetLiteral( int, int );            /* to CIP keyword table */
int FAR PASCAL FindString( LPSTR );
int FAR PASCAL FindInt( LONG );
int FAR PASCAL FindReal( double );
BOOL PASCAL OpenFiles( LPSTR, LPSTR );
BOOL PASCAL deletetempfile( LPSTR );
BOOL PASCAL lowrite( int, LPSTR, int );
VOID PASCAL SaveExprValue( int, LONG );
BYTE PASCAL asctohex( LPSTR );
VOID PASCAL hextoasc( BYTE, LPSTR );

/* C library functions */
double atof(char *);
int atoi(char *);
long atol(char *);
char *strpbrk();
char *strchr();

/* declarations from Lstr.lib */
void     FAR PASCAL lstrcpy (LPSTR, LPSTR);
void     FAR PASCAL lstrdelete (LPSTR, unsigned, unsigned);
void     FAR PASCAL lstrfill (LPSTR, BYTE, unsigned);
void     FAR PASCAL lstrinsert (LPSTR, unsigned, unsigned);
unsigned FAR PASCAL lstrlen (LPSTR);
void     FAR PASCAL lstrmove (LPSTR, LPSTR, unsigned);
```

```
#S3771; #O9309  *  BARBARA.PF; LP602  *  TUE, MAY 17, 1988,  6:15 AM
#S3771; #O9309  *  BARBARA.PF; LP602  *  TUE, MAY 17, 1988,  6:15 AM
#S3771; #O9309  *  BARBARA.PF; LP602  *  TUE, MAY 17, 1988,  6:15 AM
```

```
#S3771; #O9309  *  BARBARA.PF; LP602  *  TUE, MAY 17, 1988,  6:15 AM
#S3771; #O9309  *  BARBARA.PF; LP602  *  TUE, MAY 17, 1988,  6:15 AM
#S3771; #O9309  *  BARBARA.PF; LP602  *  TUE, MAY 17, 1988,  6:15 AM
```

```
#S3771; #O9309  *  BARBARA.PF; LP602  *  TUE, MAY 17, 1988,  6:15 AM
#S3771; #O9309  *  BARBARA.PF; LP602  *  TUE, MAY 17, 1988,  6:15 AM
#S3771; #O9309  *  BARBARA.PF; LP602  *  TUE, MAY 17, 1988,  6:15 AM
```

```
#S3771; #O9309  *  BARBARA.PF; LP602  *  TUE, MAY 17, 1988,  6:15 AM
#S3771; #O9309  *  BARBARA.PF; LP602  *  TUE, MAY 17, 1988,  6:15 AM
#S3771; #O9309  *  BARBARA.PF; LP602  *  TUE, MAY 17, 1988,  6:15 AM
```

```
#S3771; #O9310 * BARBARA.PF; LP602 * TUE, MAY 17, 1988, 6:15 AM
#S3771; #O9310 * BARBARA.PF; LP602 * TUE, MAY 17, 1988, 6:15 AM
#S3771; #O9310 * BARBARA.PF; LP602 * TUE, MAY 17, 1988, 6:15 AM
```

```
#S3771; #O9310 * BARBARA.PF; LP602 * TUE, MAY 17, 1988, 6:15 AM
#S3771; #O9310 * BARBARA.PF; LP602 * TUE, MAY 17, 1988, 6:15 AM
#S3771; #O9310 * BARBARA.PF; LP602 * TUE, MAY 17, 1988, 6:15 AM
```

```
#S3771; #O9310 * BARBARA.PF; LP602 * TUE, MAY 17, 1988, 6:15 AM
#S3771; #O9310 * BARBARA.PF; LP602 * TUE, MAY 17, 1988, 6:15 AM
#S3771; #O9310 * BARBARA.PF; LP602 * TUE, MAY 17, 1988, 6:15 AM
```

```
#S3771; #O9310 * BARBARA.PF; LP602 * TUE, MAY 17, 1988, 6:15 AM
#S3771; #O9310 * BARBARA.PF; LP602 * TUE, MAY 17, 1988, 6:15 AM
#S3771; #O9310 * BARBARA.PF; LP602 * TUE, MAY 17, 1988, 6:15 AM
```

```
typedef union   {
    int  ival;
    long lval;
        } YYSTYPE;
extern YYSTYPE yylval;
# define AND_  201
# define OR_  202
# define NOT_  203
# define USER_VAR 500
# define USER_ARRAY 510
# define FUNCTION 550
# define SYS_VAR 580
# define INT_L 400
# define PNT_L 405
# define REAL_L 410
# define RGN_L 415
# define STR_L 420
# define STACK_L 430
# define ANY_EXP 440
# define NUM_EXP 441
# define STR_EXP 442
# define RGN_EXP 443
# define PNT_EXP 444
# define LOG_EXP 445
# define NO_EXP 450
# define LE_SYM 451
# define GE_SYM 452
# define NE_SYM 453
# define LINE_END 700
# define UMINUS 281
```

```
#S3771; #O9310  *  BARBARA.PF; LP602  *  TUE, MAY 17, 1988,  6:15 AM
#S3771; #O9310  *  BARBARA.PF; LP602  *  TUE, MAY 17, 1988,  6:15 AM
#S3771; #O9310  *  BARBARA.PF; LP602  *  TUE, MAY 17, 1988,  6:15 AM

#S3771; #O9310  *  BARBARA.PF; LP602  *  TUE, MAY 17, 1988,  6:15 AM
#S3771; #O9310  *  BARBARA.PF; LP602  *  TUE, MAY 17, 1988,  6:15 AM
#S3771; #O9310  *  BARBARA.PF; LP602  *  TUE, MAY 17, 1988,  6:15 AM

#S3771; #O9310  *  BARBARA.PF; LP602  *  TUE, MAY 17, 1988,  6:15 AM
#S3771; #O9310  *  BARBARA.PF; LP602  *  TUE, MAY 17, 1988,  6:15 AM
#S3771; #O9310  *  BARBARA.PF; LP602  *  TUE, MAY 17, 1988,  6:15 AM

#S3771; #O9310  *  BARBARA.PF; LP602  *  TUE, MAY 17, 1988,  6:15 AM
#S3771; #O9310  *  BARBARA.PF; LP602  *  TUE, MAY 17, 1988,  6:15 AM
#S3771; #O9310  *  BARBARA.PF; LP602  *  TUE, MAY 17, 1988,  6:15 AM
```

```
#S3771; #O9311  *  BARBARA.PF; LP602  *  TUE, MAY 17, 1988,  6:15 AM
#S3771; #O9311  *  BARBARA.PF; LP602  *  TUE, MAY 17, 1988,  6:15 AM
#S3771; #O9311  *  BARBARA.PF; LP602  *  TUE, MAY 17, 1988,  6:15 AM
```

```
#S3771; #O9311  *  BARBARA.PF; LP602  *  TUE, MAY 17, 1988,  6:15 AM
#S3771; #O9311  *  BARBARA.PF; LP602  *  TUE, MAY 17, 1988,  6:15 AM
#S3771; #O9311  *  BARBARA.PF; LP602  *  TUE, MAY 17, 1988,  6:15 AM
```

```
#S3771; #O9311  *  BARBARA.PF; LP602  *  TUE, MAY 17, 1988,  6:15 AM
#S3771; #O9311  *  BARBARA.PF; LP602  *  TUE, MAY 17, 1988,  6:15 AM
#S3771; #O9311  *  BARBARA.PF; LP602  *  TUE, MAY 17, 1988,  6:15 AM
```

```
#S3771; #O9311  *  BARBARA.PF; LP602  *  TUE, MAY 17, 1988,  6:15 AM
#S3771; #O9311  *  BARBARA.PF; LP602  *  TUE, MAY 17, 1988,  6:15 AM
#S3771; #O9311  *  BARBARA.PF; LP602  *  TUE, MAY 17, 1988,  6:15 AM
```

```
typedef union   {
    int  ival;
    long lval;
        } YYSTYPE;
extern YYSTYPE yylval;
# define AND_ 201
# define OR_ 202
# define NOT_ 203
# define CBT_ 204
# define ABORTRETRYIGNORE_ 205
# define ALT_ 206
# define AT_ 207
# define BEEP_ 208
# define CLASSFOCUS_ 209
# define CLEARWINDOW_ 210
# define CLOSEWINDOW_ 211
# define COM1_ 212
# define COMMAND_ 213
# define CTRL_ 214
# define DEFAULT_ 215
# define DEFINEWINDOW_ 216
# define DO_ 217
# define EDITBOX_ 218
# define ELSE_ 219
# define END_ 220
# define ENDIF_ 221
# define ENDPROC_ 222
# define ENDTASK_ 223
# define ENDWHILE_ 224
# define ERROR_ 225
# define ESCAPE_ 226
# define EXCLAMATION_POINT_ 227
# define EXECUTE_ 228
# define FOCUS_ 229
# define GOTO_ 230
# define HAND_ 231
# define IF_ 232
# define IGNORE_ 233
# define INPUT_ 234
# define LABEL_ 235
# define LENGTH_ 236
# define LOCATE_ 237
# define MESSAGE_ 238
# define OFF_ 239
# define OK_ 240
# define OKCANCEL_ 241
# define ON_ 242
# define OPENWINDOW_ 243
# define OUTPUT_ 244
# define PAUSE_ 245
# define PCODE_ 246
# define PCOMMAND_ 247
# define POPUP_ 248
# define PROCEDURE_ 249
# define PUSHBUTTON_ 250
# define QUESTION_ 251
# define RATE_ 252
# define RETRYCANCEL_ 253
# define RETURN_ 254
# define SCREEN_ 255
# define SET_ 256
# define TASK_ 257
# define TITLEWINDOW_ 258
# define TIMEOUT_ 259
# define TO_ 260
# define USER_ 261
# define WAIT_ 262
# define WHILE_ 263
# define YESNO_ 264
# define YESNOCANCEL_ 265
# define USER_VAR 500
# define USER_ARRAY 510
# define USER_LABEL 520
# define DATA_LABEL 525
# define USER_WINDOW 530
# define CLASS_SYMBOL 540
# define SYS_VAR 560
# define INT_L 400
# define PNT_L 405
# define REAL_L 410
# define RGN_L 415
# define STR_L 420
# define STACK_L 430
# define ANY_EXP 440
# define NUM_EXP 441
# define STR_EXP 442
# define RGN_EXP 443
# define PNT_EXP 444
# define LOG_EXP 445
# define NO_EXP 450
# define USER_SYMBOL 600
# define LINE_END 700
```

```
#S3771; #O9311  *  BARBARA.PF; LP602  *  TUE, MAY 17, 1988,  6:15 AM
#S3771; #O9311  *  BARBARA.PF; LP602  *  TUE, MAY 17, 1988,  6:15 AM
#S3771; #O9311  *  BARBARA.PF; LP602  *  TUE, MAY 17, 1988,  6:15 AM

#S3771; #O9311  *  BARBARA.PF; LP602  *  TUE, MAY 17, 1988,  6:15 AM
#S3771; #O9311  *  BARBARA.PF; LP602  *  TUE, MAY 17, 1988,  6:15 AM
#S3771; #O9311  *  BARBARA.PF; LP602  *  TUE, MAY 17, 1988,  6:15 AM

#S3771; #O9311  *  BARBARA.PF; LP602  *  TUE, MAY 17, 1988,  6:15 AM
#S3771; #O9311  *  BARBARA.PF; LP602  *  TUE, MAY 17, 1988,  6:15 AM
#S3771; #O9311  *  BARBARA.PF; LP602  *  TUE, MAY 17, 1988,  6:15 AM

#S3771; #O9311  *  BARBARA.PF; LP602  *  TUE, MAY 17, 1988,  6:15 AM
#S3771; #O9311  *  BARBARA.PF; LP602  *  TUE, MAY 17, 1988,  6:15 AM
#S3771; #O9311  *  BARBARA.PF; LP602  *  TUE, MAY 17, 1988,  6:15 AM
```

```
#S3771; #O9312 * BARBARA.PF; LP602 * TUE, MAY 17, 1988, 6:15 AM
#S3771; #O9312 * BARBARA.PF; LP602 * TUE, MAY 17, 1988, 6:15 AM
#S3771; #O9312 * BARBARA.PF; LP602 * TUE, MAY 17, 1988, 6:15 AM

#S3771; #O9312 * BARBARA.PF; LP602 * TUE, MAY 17, 1988, 6:15 AM
#S3771; #O9312 * BARBARA.PF; LP602 * TUE, MAY 17, 1988, 6:15 AM
#S3771; #O9312 * BARBARA.PF; LP602 * TUE, MAY 17, 1988, 6:15 AM

#S3771; #O9312 * BARBARA.PF; LP602 * TUE, MAY 17, 1988, 6:15 AM
#S3771; #O9312 * BARBARA.PF; LP602 * TUE, MAY 17, 1988, 6:15 AM
#S3771; #O9312 * BARBARA.PF; LP602 * TUE, MAY 17, 1988, 6:15 AM

#S3771; #O9312 * BARBARA.PF; LP602 * TUE, MAY 17, 1988, 6:15 AM
#S3771; #O9312 * BARBARA.PF; LP602 * TUE, MAY 17, 1988, 6:15 AM
#S3771; #O9312 * BARBARA.PF; LP602 * TUE, MAY 17, 1988, 6:15 AM
```

```
/**********************************************************************
*
* HPAGPMSC.C - miscellaneous routines for the compiler
*
***********************************************************************
*
* Agent PCODES Compiler 'C' source file
* Ver X.06.05  08/26/87
*
*
*
*
*                    COPYRIGHT HEWLETT PACKARD LIMITED
*                                 1986
*                          ALL RIGHTS RESERVED
*
*
*
*
***********************************************************************
*
*
*                           MODIFICATION LOG
*
*  03/05/87 bp - created
*  04/28/87 bp - modified for X.06.00
*       04/15/88 bp - modified for global heap
*
*
***********************************************************************/
/**********************************************************************
*
*
*
*       input:
*       output:
*       return:
*
***********************************************************************
*
*       05/04/88 bp - created
*
***********************************************************************/
#define NOCOMM
#include "windows.h"
#include "nwomf.h"
#include "ctype.h"
#include "doscall.h"
#include "ctrace.h"
#include "nwutil.h"

#include "hpagpr0.h"
#include "nwapi.h"
#include "hoag.h"
#include "hoagtrc.h"
#include "hoagpext.h"

/* Function Prototype declarations for local routines */
STATIC BOOL  NEAR PASCAL FormPath(LPSTR,LPSTR);
STATIC BOOL NEAR PASCAL ExtractPropInfo(LPSTR,LPSTR,int,int);
```

```
/**********************************************************************
*                                                                     *
*       InitScanFlags - initializes the hash table, globals and flags *
*                                                                     *
*       input:  none                                                  *
*       output: global flags set                                      *
*       return: none                                                  *
*                                                                     *
***********************************************************************
*                                                                     *
*       03/06/87 bp - created                                         *
*                                                                     *
**********************************************************************/
void InitScanFlags()
{
/* initialize table pointers */
    Keyword = 0;
    next_spelling = 0;
    next_class = 0;
    next_label = 0;
    next_int = 1;
    next_real = 1;
    next_str = 1;
    next_window = 1;
    hash_ptr = 1;
    st_index = 1;

/* initialize scanner flags */
    newline = TRUE;
    NewCharFlag = TRUE;
    LabelFlag = FALSE;
    gClassFlag = FALSE;
    nilflag = TRUE;
    arrayflag = FALSE;
    CDcmdflag = FALSE;
    ContinueFlag = FALSE;
    expressionflag = FALSE;
    gErrorflag = TRUE;

/* initialize global variables */
    next_classid = 0;
    arraysize = 0;
    numvariables = 0;
    currfocus = NO_FOCUS;
    gCurrErrnum = 0;
    gSourcePtr = cSourceLine;
    CBTclass = 0;
    next_function = 0;
    curr_function = 0;
    next_parm = 0;
    CDPcount = 0;
    gFatalErrorflag = FALSE;

/* initialize hash table */
    memset( hash, '\0', HASH_SIZE*sizeof( int ) );

/* initialize output buffer data */
    memset( gPCodeBuf, '\0', PAGESIZE );
    gPCodePtr = gPCodeBuf;
    curraddr.page = 1;
    curraddr.offset = 0;

} /* InitScanFlags */
```

```
/***********************************************************************
*                                                                      *
*       PutClassInfo -  opens the Agent data dictionary and puts the   *
*                       class symbols in Spellings and the classnames  *
*                       etc. in the ClassInfo buffer.                  *
*       input:  none                                                   *
*       output: none                                                   *
*       return: TRUE if successful else FALSE                          *
*                                                                      *
************************************************************************
*                                                                      *
*       03/09/87 bp - created                                          *
*       05/09/88 bp - modified to read property list                   *
*                                                                      *
***********************************************************************/
BOOL PutClassInfo()
{
    register int pos, i;
    BOOL status;
    LPSTR lpClass;
    OBJECTNAME  ClassNum;
    HPROPERTIES hProp = 0;
    LPSTR       lpPropInfo;
    HANDLE hMem = 0;
    HANDLE hClass = 0;

    status = TRUE;

/* allocate the global memory */
/* for the AGENTTASK_INFO */
 if ( !(hMem=GlobalAlloc( GMEM_LOWER | GMEM_MOVEABLE | GMEM_ZEROINIT,
                    (DWORD)sizeof(PROPINFODATA))) )  {
    SetErrMsg( IDS_GMEM );
    return( FALSE );
    }
/* for the classname string */
 else if ( !(hClass=GlobalAlloc( GMEM_LOWER | GMEM_MOVEABLE | GMEM_ZEROINIT,
                    (DWORD)(MAXCLASSNAME+1)) ) )  {
    SetErrMsg( IDS_GMEM );
    return( FALSE );
    }

/* set up the class information table */
    ClassNum = OMF_EnumClasses( hOMF, 0L );
    while ( ClassNum != 0L )  {
        if ( !(hProp=OMF_GetProperties(hOMF,ClassNum,1)) )  {
            SetErrMsg( IDS_PROPERR );
            status = FALSE;
            break;
            }
        else  /* read the PROP_AGENTTASK_INFO property */
            if ( (i=OMF_ReadProperty( hOMF,hProp,PROP_AGENTTASK_INFO,
                            LPCAST(hMem),-MAX_INFOPROP)) != -1   )  {
            /* get pointer to the info data */
                if ( !(lpPropInfo = GlobalLock(hMem)) )  {
                    SetErrMsg( IDS_GMEM );
                    status = FALSE;
                    break;
                    }
                else  {  /* success! */
#ifdef COM1_TRACING
 cprint( "PutClassInfo: successful! datalen= %d",i,NULL);
 cprint( "   and data= \"%s\"",0,lpPropInfo);
#endif
                    if ( (i=OMF_ReadProperty( hOMF,hProp,PROP_CLASSNAME,
                            LPCAST(hClass),-(MAXCLASSNAME+1))) != -1 )  {
                        OMF_FreeProperties(hOMF,hProp);
                        hProp = 0;
                        if ( !(lpClass=GlobalLock(hClass)) )  {
                            SetErrMsg( IDS_GMEM );
                            status = FALSE;
                            break;
                            }
#ifdef COM1_TRACING
 cprint( "PutClassInfo: Classname = \"%s\"",0,lpClass);
#endif
                        if ( !ExtractPropInfo(      lpPropInfo,
                                                    (LPSTR)gTempBuf,
                                                    AGENTNAME_INFO_INDEX,
                                                    RECSIZE+1 ) )  {
                            SetErrMsg( IDS_PROPERR );
                            status = FALSE;
                            break;
                            }
                        else if (pos = Locate( gTempBuf ))  {
                            if (!((pSpellings + pos)->type))
                                (pSpellings + pos)->type = CLASS_SYMBOL;
                            Keyword = (pos > Keyword) ? pos : Keyword;
                            }
                        else  {
                            SetErrMsg( IDS_KEYERR );
                            status = FALSE;
                            break;
                            }
                        status = InitClass( lpPropInfo, lpClass, pos);
                        }   /* classname fetch succeeds */
                    else /* can't get classname */  {
                        SetErrMsg( IDS_CLSERR );
                        status = FALSE;
                        break;
                        }
                    GlobalUnlock( hMem );
                    GlobalUnlock( hClass );
                    } /* else property exists */
            } /* get properties succeeded */
        ClassNum = OMF_EnumClasses( hOMF, ClassNum );
        }  /* while */
    if (hProp)
        OMF_FreeProperties(hOMF,hProp);

    if ( !status ) {
        while ( GlobalFlags( hMem ) & GMEM_LOCKCOUNT ) GlobalUnlock( hMem );
        while ( GlobalFlags( hClass ) & GMEM_LOCKCOUNT ) GlobalUnlock( hClass );
        }

/***
    Set up the jump to the end of task code.
    Index of this label is always 0 so don't bother to save it.
***/
```

```
    if ( next_class )
        OutputPCode( AG_JUMP_PCODE, AddLabel( 0, 0 ), 0L );
    startaddr.page = curraddr.page;
    startaddr.offset = curraddr.offset;

/* cleanup */
    GlobalFree( hMem );
    GlobalFree( hClass );
    return( status );
}  /* PutClassInfo */
```

```
/************************************************************************
*                                                                       *
*       GetClassNameString - returns the class name in StringTable,     *
*                            used by other task editor modules.         *
*       input:               string containing classsymbol              *
*       output:              string containing class name (may = input) *
*       return:              none                                       *
*                                                                       *
*************************************************************************
*                                                                       *
*       04/17/87 bp - created                                           *
*                                                                       *
************************************************************************/
void FAR PASCAL GetClassNameString( ClassSymbol, ClassName )
LPSTR ClassSymbol;
LPSTR ClassName;
{
    int i, index;
    LPSTR pStringTable;
    LPSTR ptr;

    if ( (pStringTable = GetStringTable( 0 )) == NULL )  {
        *ClassName = '\0';
        return;
        }

/* find ClassInfo entry */
    for ( i = 0; i < next_class; i++ )  {
        index = (pClassInfo + i)->value;
        ptr = pStringTable + ((pSpellings + index)->name);
        if ( lstrcmp( ptr, ClassSymbol ) == 0 )
            break;
        }

    if ( i == next_class )  {
        *ClassName = '\0';
        }
    else {
/* copy the class Name */
        ptr = pStringTable + ((pClassInfo + i)->classname);
        lstrcpy( ClassName, ptr );
        }
    UnlockStringTable( );
}  /* GetClassNameString */
```

```
/****************************************************************************
*                                                                          *
*       CheckClassSymbol - returns token type of the identifier.  If       *
*                      type is not CLASS_SYMBOL, (e.g. keyword             *
*                      conflict), checks class info buffer.                *
*       input:         index in Spellings (return from Locate)             *
*       output:        none                                                *
*       return:        token type                                          *
*                                                                          *
****************************************************************************
*                                                                          *
*       05/02/88 bp - created                                              *
*                                                                          *
****************************************************************************/
int CheckClassSymbol( index )
int index;
{
    int i, type;

/* check identifier type */
    if ( (type = (pSpellings + index)->type) == CLASS_SYMBOL )
        return( type );
    else  {
    /* try to find a ClassInfo entry */
        for ( i = 0; i < next_class; i++ )  {
            if ( index == (pClassInfo + i)->value )
                return( CLASS_SYMBOL );
            }  /* for */
        } /* else */

/* didn't find it so return default */
    return( type );

}  /* CheckClassSymbol */
```

```
/****************************************************************************
*                                                                          *
*       FetchClassIndex - returns the index of the class symbol and        *
*                      class name from StringTable. used by other task     *
*                      editor modules.                                     *
*       input:         index of entry in class info array                  *
*       output:        ClassSymbol - index of class symbol                 *
*                      ClassName - index of class name                     *
*       return:        none                                                *
*                                                                          *
****************************************************************************
*                                                                          *
*       04/15/88 bp - created                                              *
*                                                                          *
****************************************************************************/
void FAR PASCAL FetchClassIndex( entrynum, ClassSymbol, ClassName )
int entrynum;
LPINT ClassSymbol;
LPINT ClassName;
{
    int index;

    if ( entrynum >= next_class )  {
        *ClassSymbol = 0;
        *ClassName = 0;
        return;
        }

/* get the values */
    index = (pClassInfo + entrynum)->value;
    *ClassSymbol = (pSpellings + index)->name;
    *ClassName = (pClassInfo + entrynum)->classname;

}  /* FetchClassIndex */
```

```
/****************************************************************************
*                                                                           *
*       FetchClassInfo - returns the class symbol and class name            *
*                        from StringTable, used by other task editor        *
*                        modules.                                           *
*       input:           index of entry in class info array                 *
*       output:          ClassSymbol - string will contain class symbol     *
*                        ClassName - string will contain class name         *
*       return:          none                                               *
*                                                                           *
*****************************************************************************
*                                                                           *
*       04/17/87 bp - created                                               *
*                                                                           *
****************************************************************************/
void FAR PASCAL FetchClassInfo( entrynum, ClassSymbol, ClassName )
int entrynum;
LPSTR ClassSymbol;
LPSTR ClassName;
{
    int index;
    LPSTR ptr;

    if ( entrynum >= next_class )  {
        lstrcpy( ClassSymbol, (LPSTR)"\0" );
        lstrcpy( ClassName, (LPSTR)"\0" );
        return;
        }

/* copy the class symbol */
    index = (pClassInfo + entrynum)->value;
    if ( (ptr = GetStringTable( (pSpellings + index)->name)) == NULL )
        return;
    lstrcpy( ClassSymbol, ptr );
    UnlockStringTable(0);

/* copy the class name */
    if ( (ptr = GetStringTable((pClassInfo + entrynum)->classname)) == NULL )
        return;
    lstrcpy( ClassName, (LPSTR)ptr );
    UnlockStringTable(0);

 }  /* FetchClassInfo */
```

```
/****************************************************************************
*       InitClass:                                                          *
*               initializes a ClassInfo entry to handle domain.             *
*               specific commands.                                          *
*                                                                           *
*       input:  record is a Task Editor dictionary record                   *
*       output: sets nErrMsg if error                                       *
*       return: TRUE if successful else FALSE                               *
*                                                                           *
*****************************************************************************
*                                                                           *
*       03/09/87 bp - created                                               *
*       04/17/87 bp - add classlink field                                   *
*       05/04/88 bp - remove classlink field, add lastaccess                *
*       05/09/88 bp - modified to read property list                        *
*                                                                           *
****************************************************************************/
BOOL InitClass( record, lpClassname, pos )
LPSTR record;
LPSTR lpClassname;
int pos;
{
    int newsize;
/* temporary variables for stringtable indices */
    int libfile, keywordfile, libproc, initproc, termproc, classname;

/* check for table overflow */
    if (next_class >= class_size)  {
        newsize = class_size + NUM_CLASSES;
        if ( !ExpandTable( &hClassInfo, newsize*sizeof(CLASS) ) )
            return( FALSE );
        else
            class_size = newsize;
        } /* next_class == class_size */

/* setup */
    (pClassInfo + next_class)->hLib = NULL;

/* class symbol identifier */
    (pClassInfo + next_class)->value = pos;
/* check if this is the CBT parser comment out for now
    if ( !strcmp(RecordBuffer, CBT_CLASSSYM) )  {
        CBTclass = next_class;
        (pClassInfo + next_class)->classid = CBT_CLASS;
        }
 */

/* Store all the strings in stringtable.  Note the use of temporary
   indices so any buffer expansion will occur before compiler
   evaluates global pointer to local heap. */

/* classname  */
    lstrcpy( (LPSTR)gTempBuf, lpClassname );
    if (! (classname = AddClassInfoField( gTempBuf, CLASSNAME )) )
        return( FALSE );
/* library filename */
    if ( !ExtractPropInfo( record, (LPSTR)gTempBuf, LIBFILE_INFO_INDEX,
                            RECSIZE ) )
        libfile = 0;
```

```
    else if ( *gTempBuf == '\0' )
        libfile = 0;
    else if (  !(libfile = AddClassInfoField( gTempBuf, LIBFILE )) )
        return( FALSE );
/* keyword filename */
    if ( !ExtractPropInfo( record, (LPSTR)gTempBuf, KEYFILE_INFO_INDEX,
                             RECSIZE ) )
        keywordfile = 0;
    else if ( *gTempBuf == '\0' )
        keywordfile = 0;
    else if ( !(keywordfile = AddClassInfoField( gTempBuf, KEYFILE )) )
        return( FALSE );
/* library entry procedure */
   if ( !ExtractPropInfo( record, (LPSTR)gTempBuf, PARSEPROC_INFO_INDEX,
                             RECSIZE ) )
        strcpy( gTempBuf, PARSERTN );
    else if ( *gTempBuf == '\0' )
        strcpy( gTempBuf, PARSERTN );
    if ( !(libproc = AddClassInfoField( gTempBuf, PARSEPROC )) )
        return( FALSE );
/* library initialization procedure */
   if ( !ExtractPropInfo( record, (LPSTR)gTempBuf, INITPROC_INFO_INDEX,
                             RECSIZE ) )
        strcpy( gTempBuf, INITRTN );
    else if ( *gTempBuf == '\0' )
        strcpy( gTempBuf, INITRTN );
    if ( !(initproc = AddClassInfoField(gTempBuf, INITPROC)) )
        return( FALSE );
/* library terminate procedure */
   if ( !ExtractPropInfo( record, (LPSTR)gTempBuf, TERMPROC_INFO_INDEX,
                             RECSIZE ) )
        strcpy( gTempBuf, TERMRTN );
    else if ( *gTempBuf == '\0' )
        strcpy( gTempBuf, TERMRTN );
    if ( !(termproc = AddClassInfoField(gTempBuf, TERMPROC)) )
        return( FALSE );

/* consistency check */
    if ( libfile && !keywordfile )
        return( FALSE );

/* fix up the entry */
    (pClassInfo + next_class)->libname = libfile;
    (pClassInfo + next_class)->keywordfile = keywordfile;
    (pClassInfo + next_class)->libproc = libproc;
    (pClassInfo + next_class)->initproc = initproc;
    (pClassInfo + next_class)->termproc = termproc;
    (pClassInfo + next_class)->classname = classname;
    (pClassInfo + next_class)->lastaccess = 0;


    next_class++;
    return( TRUE );
}  /* InitClass */
```

```
/*********************************************************************
 *       AddClassInfoField:                                          *
 *               Checks if an entry into the ClassInfo structure is  *
 *               already there and if not adds it to stringtable     *
 *                                                                   *
 *       Note:   Checks library filename, keyword filename, and      *
 *               procedure names                                     *
 *                                                                   *
 *                                                                   *
 *       input:  string containing entry to add                      *
 *               index of structure field                            *
 *       output: entry is added to stringtable if not there          *
 *       return: index of string in stringtable                      *
 *                                                                   *
 *********************************************************************
 *                                                                   *
 *       05/06/88 bp - created                                       *
 *       05/09/88 bp - modified to read property list                *
 *                                                                   *
 *********************************************************************/
int AddClassInfoField( record, fieldindex )
char *record;
int fieldindex;
{
    register int i, index;

    switch ( fieldindex )  {
case LIBFILE:
case KEYFILE:
/* concatenate with app directory */
        FormPath( (LPSTR)record, (LPSTR)tfilename );
        break;
case INITPROC:
case PARSEPROC:
case TERMPROC:
case CLASSNAME:
        strcpy( tfilename, record );
        break;
default:
        return( 0 );
        }  /* switch */

    for ( i = 0; i < next_class; i++ )  {
        switch ( fieldindex )  {
case LIBFILE:
            index = GetClassEntry(i)->libname;
            break;
case KEYFILE:
            index = GetClassEntry(i)->keywordfile;
            break;
case INITPROC:
            index = GetClassEntry(i)->initproc;
            break;
case PARSEPROC:
            index = GetClassEntry(i)->libproc;
            break;
case TERMPROC:
            index = GetClassEntry(i)->termproc;
            break;
```

```
case CLASSNAME:
          index = GetClassEntry(i)->classname;
          break;
default:
          return( 0 );
          }  /* switch */
       if ( !CmpStringTable( index, (LPSTR)tfilename ) )
          return( index );
       }  /* for */

/* didn't find it so add it */
   return( PutStringTable((LPSTR)tfilename) );
}  /* AddClassInfoField */
```

```
/**********************************************************************
*
*       scans   subset of sscanf library routine which will work in
*               dynamic libraries.  scans skips beginning whitespace,
*               copies (or translates) item into target, and returns a
*               pointer to the next character after the item.
*
*       input:  buf - source buffer
*               format - char with type of output
*                        S_INT - integer
*                        S_STR - string delimited by whitespace
*                        else  - string delimited by format char
*       output: in target
*       return: pointer to next character in source buffer
*
***********************************************************************
*
*       03/11/87 bp - created
*
**********************************************************************/
char *scans( buf, format, target )
char *buf;
char  format;
char *target;
{
    char *tptr;
    int  *t_int;
    int   i, len;
    static char fmt_str[4];

/* skip whitespace */
    tptr = buf + strspn( buf, " \t" );
    len = strcspn( tptr, " \t\n" );

/* fetch the item */
    switch ( format )  {
case S_INT:
        t_int = (int *)target;
        *t_int = atoi( tptr );
        tptr += len;
        break;
case S_STR:
        for ( i=0; i<len; i++ )
            *target++ = *tptr++;
        *target = '\0';
        break;
default:
        fmt_str[0] = format;
        fmt_str[1] = '\n';
        fmt_str[2] = '\0';
        if ( !(tptr = strchr( buf, format )) )  return( tptr );
        tptr++;
        len = strcspn( tptr, fmt_str );
        for ( i=0; i<len; i++ )
            *target++ = *tptr++;
        *target = '\0';
        tptr++;
        break;
        }  /* end switch */
```

```
    return( tptr );
}  /* scans */
```

```
/******************************************************************

 ExtractPropInfo()

   Purpose      :
           Returns an ascii string extracted from the AGENTTASK_INFO
           property data.

   Passed Parms :
           lpProp      - pointer to the AGENTTASK_INFO property data as
                         returned from the OMF_ReadProperty call.
           lpResult    - pointer to buffer for storing the resultant
                         extracted string.
           nIndex      - Relative field # within the property of the
                         field to be extracted.
           MaxLen      - Maximum # of bytes that can be returned,
                         including the NULL terminator.

   Side Effects :
           Stores the resultant filed in the passed result buffer.

   Return Value :
           Returns TRUE if a field was extracted.

           If FALSE, the indexed field was not found or it exceeded
           the maximum size alloted.  The caller should disregard
           the result buffer.

*        05/09/88 bp - added to CI parser                              *

 ******************************************************************/

STATIC BOOL NEAR PASCAL ExtractPropInfo(lpProp,lpResult,nIndex,MaxLen)
 LPSTR lpProp;
 LPSTR lpResult;
 int   nIndex;
 int   MaxLen;  /* max len (without the null) */
{
 char nxt;
 register int i;

/**********************************
 **  Skip to the requested field  **
 **********************************/
 for ( i=0;nIndex;nIndex--)
     /* comma's delimit fields of PROP_AGENTTASK_INFO */
     while ( (nxt=lpProp[i++]) != ',' )
        if ( !nxt )
           return(FALSE);

/******************************************************************
 **  return the field in caller's buffer with white space stripped  **
 ******************************************************************/
 while ( (nxt=lpProp[i++]) && nxt != ',' )
     if ( nxt > 0x20 ) {  /* disregard blanks and control characters */
        if ( MaxLen < 1 ) {
#ifdef COMI_TRACING
 cprintf( "ExtractPropInfo: field too large, max= %d",MaxLen,NULL);
#endif
```

```
        return(FALSE);  /* field would overrun passed buffer */
      }
      *lpResult++ = nxt;
      MaxLen--;
    }
  *lpResult = 0;  /* NULL-terminated string */
  return(TRUE);
}
```

```
/*****************************************************************

 FormPath()

   Purpose      :
          Produces a fully qualified path to a file relative to
          the HPAGENT0 directory off of the applications directory.

   Passed Parms :
          lpFilename - pointer to a file path (relative to Applics dir)
          lpResult   - pointer to buffer for storing the resultant
                       string.  The length of this buffer is expected to
                       be at least <MAXROOTFILENAMELENGTH> bytes.

   Side Effects :
          Stores the resultant path name in the passed result buffer.

   Return Value :
          Returns TRUE if no error occurred.
          If FALSE, the result buffer should be disregarded.

*       05/09/88 bp - added to CI parser

 *****************************************************************/

STATIC BOOL NEAR PASCAL FormPath(lpFilename,lpResult)
 LPSTR lpFilename;
 LPSTR lpResult;
{
 if ( OMF_GetOMFDirectory(hOMF,OD_APPLICS,(LPSTR)lpResult) )  {
    if ( lstrlen(lpResult)+lstrlen(lpFilename) <
          MAXROOTFILENAMELENGTH                              )  {
        lstrcat(lpResult,lpFilename);
        return(1);
    }
 }

 return(0);  /* unsuccessful */
}
```

```
#S3771; #O9312  *  BARBARA.PF; LP602  *  TUE, MAY 17, 1988,  6:16 AM
#S3771; #O9312  *  BARBARA.PF; LP602  *  TUE, MAY 17, 1988,  6:16 AM
#S3771; #O9312  *  BARBARA.PF; LP602  *  TUE, MAY 17, 1988,  6:16 AM
```

```
#S3771; #O9312  *  BARBARA.PF; LP602  *  TUE, MAY 17, 1988,  6:16 AM
#S3771; #O9312  *  BARBARA.PF; LP602  *  TUE, MAY 17, 1988,  6:16 AM
#S3771; #O9312  *  BARBARA.PF; LP602  *  TUE, MAY 17, 1988,  6:16 AM
```

```
#S3771; #O9312  *  BARBARA.PF; LP602  *  TUE, MAY 17, 1988,  6:16 AM
#S3771; #O9312  *  BARBARA.PF; LP602  *  TUE, MAY 17, 1988,  6:16 AM
#S3771; #O9312  *  BARBARA.PF; LP602  *  TUE, MAY 17, 1988,  6:16 AM
```

```
#S3771; #O9312  *  BARBARA.PF; LP602  *  TUE, MAY 17, 1988,  6:16 AM
#S3771; #O9312  *  BARBARA.PF; LP602  *  TUE, MAY 17, 1988,  6:16 AM
#S3771; #O9312  *  BARBARA.PF; LP602  *  TUE, MAY 17, 1988,  6:16 AM
```

```
#S3771; #09313 * BARBARA.PF; LP602 * TUE, MAY 17, 1988, 6:16 AM
#S3771; #09313 * BARBARA.PF; LP602 * TUE, MAY 17, 1988, 6:16 AM
#S3771; #09313 * BARBARA.PF; LP602 * TUE, MAY 17, 1988, 6:16 AM

#S3771; #09313 * BARBARA.PF; LP602 * TUE, MAY 17, 1988, 6:16 AM
#S3771; #09313 * BARBARA.PF; LP602 * TUE, MAY 17, 1988, 6:16 AM
#S3771; #09313 * BARBARA.PF; LP602 * TUE, MAY 17, 1988, 6:16 AM

#S3771; #09313 * BARBARA.PF; LP602 * TUE, MAY 17, 1988, 6:16 AM
#S3771; #09313 * BARBARA.PF; LP602 * TUE, MAY 17, 1988, 6:16 AM
#S3771; #09313 * BARBARA.PF; LP602 * TUE, MAY 17, 1988, 6:16 AM

#S3771; #09313 * BARBARA.PF; LP602 * TUE, MAY 17, 1988, 6:16 AM
#S3771; #09313 * BARBARA.PF; LP602 * TUE, MAY 17, 1988, 6:16 AM
#S3771; #09313 * BARBARA.PF; LP602 * TUE, MAY 17, 1988, 6:16 AM
```

```
/*********************************************************************
*                                                                    *
* HPAGPSCN.C - Source file for scanner and associated routines       *
*                                                                    *
**********************************************************************
*                                                                    *
* Agent PCODES Compiler 'C' source file                              *
* Ver X.09.01  12/15/87                                              *
*                                                                    *
*                                                                    *
*                                                                    *
*                                                                    *
*                  COPYRIGHT HEWLETT PACKARD LIMITED                 *
*                               1986                                 *
*                         ALL RIGHTS RESERVED                        *
*                                                                    *
*                                                                    *
*                                                                    *
*                                                                    *
**********************************************************************
*                                                                    *
*                                                                    *
*                          MODIFICATION LOG                          *
*                                                                    *
*  03/05/87 bp - created                                             *
*  04/28/87 bp - modified for X.06.00                                *
*       12/15/87 bp - modified for new naming conventions            *
*                                                                    *
*                                                                    *
*                                                                    *
*********************************************************************/
/*********************************************************************
*                                                                    *
*                                                                    *
*                                                                    *
*       inout:                                                       *
*       output:                                                      *
*       return:                                                      *
*                                                                    *
**********************************************************************
*                                                                    *
*       05/11/88 bp - created                                        *
*                                                                    *
*********************************************************************/
#define NOCOMM
#include "windows.h"
#include "hwomf.h"
#include "ctype.h"
#include "doscall.h"
#include "ctrace.h"

#include "hpagpor0.h"
#include "hwapi.h"
#include "hpag.h"
#include "hpagatrc.h"
#include "hpagpext.h"
```

```
/*********************************************************************
*                                                                    *
*       The following special routines are called by yylexl() to verify *
*       the type of character.                                       *
*                                                                    *
*       return: TRUE or FALSE                                        *
*                                                                    *
**********************************************************************
*                                                                    *
*       03/10/87 bp - copied from TW prototype                       *
*                                                                    *
*********************************************************************/

/*********************************************************************
*                                                                    *
*       isident                                                      *
*                                                                    *
*********************************************************************/
BOOL isident(c)
char c;
{
    if (isalnum(c) || (c == '_'))
      return(TRUE);
    else
      return(FALSE);
}

/*********************************************************************
*                                                                    *
*       isspecial                                                    *
*                                                                    *
*********************************************************************/
BOOL isspecial(c)
char c;
{
    if ((c == '+') ||
        (c == '-') ||
        (c == '*') ||
        (c == '\\') ||
        (c == '/') ||
        (c == '=') ||
        (c == '<') ||
        (c == '>') ||
        (c == '$') ||
        (c == '(') ||
        (c == '\''))
      return(TRUE);
    else
      return(FALSE);
}
```

```
/*****************************************************************
*
*       GetChar
*               is called by yylexl for the next character
*               from the input stream.  It manages loading new
*               lines from the file and ensures that yylexl receives
*               a NEWLINE character at the end of each line and
*               an EOF marker at the end of the Source file.
*
*       input:  none
*       output: none
*       return: next character
*
******************************************************************
*
*       03/10/87 bp - created from TW prototype
*
*****************************************************************/

char GetChar()
{

    if (newline) {
        glinenumber++;
        newline = FALSE;

        if ( !getline( gSourcePtr ) ) {
            newline = TRUE;
            return(EOF);
            }
        else  gCharPtr = gSourcePtr;
        } /* if newline */

    if ((*gCharPtr == '\n') || (*gCharPtr == '\0')) {
        newline = TRUE;
        return('\n');
        }
    else
        return(*gCharPtr++);

} /* GetChar() */
```

```
/*****************************************************************
*
*       getline
*               is called by GetChar for the next line of source input
*       input:  pointer to output buffer
*       output: buffer filled with source line
*       return: FALSE if EOF else TRUE
*
******************************************************************
*
*       03/10/87 bp - created
*       05/11/88 bp - modified for binary mode file
*
*****************************************************************/
BOOL getline( line )
char *line;
{
    if (!*gBufPtr)
        return( FALSE );

    while ( (*gBufPtr != LF) && (*gBufPtr) )  {
        if ( (*line = *gBufPtr++) != CR )
            line++;
        if ( (!*gBufPtr) && (gBufPtr == (cFileBuf + gCurrBufState.size)) )
            fillbuf( fSource );
        }
    *line = '\n';


    if (*gBufPtr == LF)
        gBufPtr++;
    if ( (!*gBufPtr) && (gBufPtr == (cFileBuf + gCurrBufState.size)) )
        fillbuf( fSource );

    return( TRUE );
}  /*  getline  */
```

```
/*******************************************************************
*                                                                  *
*       yylexi  - is called by yyparse indirectly through yylex for the *
*               next token from the Source program file.  yylexi returns*
*               a token type directly and stores any associated token   *
*               value in the yylval.  All unique tokens are entered into*.
*               the global Spellings table.                        *
*       input:  none                                               *
*       output: value in yylval                                    *
*       return: token type                                         *
*                                                                  *
********************************************************************
*                                                                  *
*       03/10/87 bp - modified from TW prototype                   *
*                                                                  *
*******************************************************************/

int yylexi()
{
    static char c;
    static char strlit[STR_SIZE];
    char *sl;
    BOOL varflag = FALSE;
    BOOL numlitflag = FALSE;

    char GetChar();

    yylval.lval = 0L;

    /* Detect new statement line and set global flags accordingly */

    if ((c == '\n') && !nlflag) {
      NewCharFlag = TRUE;
      LabelFlag = FALSE;
      gClassFlag = FALSE;
      nlflag = TRUE;
      token = LINE_END;
      return(token);
      }

    /* absorb excess white-space */

    if ( NewCharFlag )
      while(isspace(c = GetChar()))  {
        if ((c == '\n') && !nlflag) {
            if ( ContinueFlag )
                NewCharFlag = FALSE;
            else {
                nlflag = TRUE;
                token = LINE_END;
                LabelFlag = FALSE;
                return(token);
                }
          };
        }

    if ( ContinueFlag && NewCharFlag )  {
    /* & wasn't the last character, must return it */
        ContinueFlag = FALSE;
        NewCharFlag = FALSE;            /* for next time */
        token = '&';
        return( token );
        }

    ContinueFlag = FALSE;
    NewCharFlag = TRUE;
    nlflag = FALSE;

    /* detect end-of-file */

    if (c == EOF) {
      if ( (token != LINE_END) && (token != END_OF_PROG) ) {
        NewCharFlag = FALSE;
        token = LINE_END;
        }
      else
        token = END_OF_PROG;
      return(token);
      }


    /* detect string literals and enter into string table */

    if (c == '"') {
        sl = strlit;
        while(((c = GetChar()) != '"') && (c != '\n'))
            *sl++ = c;
        *sl = '\0';

        if (c == '\n')
            NewCharFlag = FALSE;

        yylval.lval = MAKELONG( PutStrLit((LPSTR)strlit), STR_L );
        token = STR_L;
        return(token);
        } /* string literal */

    /* detect and omit quoted comments */

    if (c == '\'') {
      while((c = GetChar()) != '\n');
          return( yylexi() );
      }

/* detect numeric literals */

    sl = strlit;
    if (isdigit(c)) {
        numlitflag = TRUE;
        token = INT_L;
        while ( isdigit(c) )  {
            *sl++ = c;
            c = GetChar();
            } /* end while */
        *sl = '\0';
        if ( c != DECIMAL_POINT )  {
            yylval.lval = MAKELONG( PutIntLit(strlit), INT_L );
            token = INT_L;
            if (!isspace(c))
```

```
            NewCharFlag = FALSE;
          return(token);
          }  /* c is not decimal point */
      } /* isdigit */

/* special case of reals .888 */

    if (c == DECIMAL_POINT)  {
        *sl++ = c;
        token = numlitflag ? REAL_L : c;
        while ( isdigit(c = GetChar()) )  {
            token = REAL_L;
            *sl++ = c;
            }
        *sl = '\0';
        if ( token == REAL_L )
            yylval.lval = MAKELONG( PutRealLit(strlit), REAL_L );
        if (!isspace(c))
            NewCharFlag = FALSE;
        return(token);
        }  /* c is decimal point */

/* detect special symbols */

    if (isspecial(c)) {

        if (c == '&') {
            ContinueFlag = TRUE;
            return( yylexi() );
            }

      if (c == '=') {

        /* check for =< and => */

        c = GetChar();
        if (c == '<') {
          token = LE_SYM;
          return(token);
          }
        else {
          if (c == '>') {
            token = GE_SYM;
            return(token);
            }
          else {
            token = '=';
            if (!isspace(c))
              NewCharFlag = FALSE;
            return(token);
            }
          }
        }

      if (c == '<') {

        /* check for <= and <> */

        c = GetChar();
        if (c == '=') {
          token = LE_SYM;
          return(token);
          }
        else {
          if (c == '>') {
            token = NE_SYM;
            return(token);
            }
          else {
            token = '<';
            if (!isspace(c))
              NewCharFlag = FALSE;
            return(token);
            }
          }
        }

      if (c == '>') {

        /* check for >= and >< */

        c = GetChar();
        if (c == '=') {
          token = GE_SYM;
          return(token);
          }
        else {
          if (c == '<') {
            token = NE_SYM;
            return(token);
            }
          else {
            token = '>';
            if (!isspace(c))
              NewCharFlag = FALSE;
            return(token);
            }
          }
        }

      token = c;
      return(token);
      }

/* Keyword or User-defined Symbol */

      if (isalpha(c)) {
          sl = strlit;
          *sl++    = c;
          while(isident(c = GetChar()))
              *sl++ = c;
          if ( c == '$' )  {
              varflag = TRUE;
              *sl++ = c;
              c = GetChar();
              }
          *sl = '\0';
          yylval.lval = Locate( strlit );
          token = varflag ? (arrayflag ? USER_ARRAY : USER_VAR) : USER_SYMBOL;
```

```
        if (( yylval.ival <= Keyword )
              && ( (!LabelFlag) || (varflag) )
              && ( !gClassFlag ) ) {
        /* checking where command and function have same name */
            if ( !expressionflag && (yylval.ival <= gLastKeyword) )
                token = KEYWORD;
            else
                token = (pSpellings + yylval.ival)->type;
            }
        else if ( gClassFlag )
            token = CheckClassSymbol( yylval.ival );
        else if ( !(pSpellings + yylval.ival)->type )
            (pSpellings + yylval.ival)->type = token;

        if ( (token == USER_VAR)        || (token == USER_ARRAY)
                                        || (token == SYS_VAR) )
            yylval.lval = MAKELONG( yylval.ival, token );

        if (token == KEYWORD)
            token += yylval.ival;
        if (!isspace(c))
            NewCharFlag = FALSE;
        return(token);
        } /* identifier */

    token = c;
    return(token);
} /* yylex1 */
```

```
/*****************************************************************
*                                                               *
*   Locate                                                      *
*       searches the spelling table for a symbol.  If it is found, *
*       its location is returned.  Otherwise, it is entered and the *
*       new location is returned.  Symbols are NOT case sensitive. *
*                                                               *
*       input:  character string containing upshifted symbol    *
*       output: none                                            *
*       return: index of symbol in Spellings                    *
*                                                               *
*****************************************************************
*                                                               *
*       03/09/87 bp - created                                   *
*                                                               *
*****************************************************************/
int Locate( Symbol )
char *Symbol;
{
    int StringLength;
    int hash_index;
    int st_ptr;

    int sp_index, newsize;

    StringLength = strlen(Symbol);
    AnsiUpper( (LPSTR)Symbol );         /* upshift the identifier */

    /* Use hash function to compute hash index */

    if (StringLength >= 3) {
      hash_index = (int)Symbol[0] +
                   (int)Symbol[StringLength-1] +
                   (int)Symbol[(int)((StringLength-1)/2)];
      hash_index = (hash_index + StringLength) % HASH_SIZE;
      }
    else
      hash_index = ((int)Symbol[0] * 3) % HASH_SIZE;


    /* First level test for symbol is hash table entry */

    if (hash[hash_index] == 0) {
    /* Must enter symbol */
        if ( ++next_spelling >= spell_size )  {
            newsize = spell_size + SPELLINGS_SIZE;
            if ( !ExpandTable( hSpellings, newsize*sizeof(IDENTIFIER) ) )
                return( 0 );
            else
                spell_size = newsize;
            }
        if ( (st_ptr = PutStringTable( (LPSTR)Symbol ) ) )  {
            (pSpellings + next_spelling)->name = st_ptr;
            hash[hash_index] = next_spelling;
            return(next_spelling);
            }
        else
            return( 0 );
        } /* hash = 0 */
```

```
    else {
    /* Symbols are found - make sure they are identical */

        sp_index = hash[hash_index];
        if (CmpStringTable((pSpellings + sp_index)->name, (LPSTR)Symbol) == 0)
            return(sp_index);
        else {
            while ((pSpellings + sp_index)->link != 0) {
                sp_index = (pSpellings + sp_index)->link;
                if (CmpStringTable((pSpellings + sp_index)->name,
                                        (LPSTR)Symbol) == 0)
                    return(sp_index);    /* Identical symbols found */
                }  /* while */

        /* No identical symbol found - must enter */

            if ( ++next_spelling >= spell_size )  {
                newsize = spell_size + SPELLINGS_SIZE;
                if ( !ExpandTable( &hSpellings, newsize*sizeof(IDENTIFIER) ) )
                    return( 0 );
                else
                    spell_size = newsize;
                }  /* if expanding */

            if ( st_ptr = PutStringTable( (LPSTR)Symbol ) )  {
                (pSpellings + sp_index)->link = next_spelling;
                (pSpellings + next_spelling)->name = st_ptr;
                return(next_spelling);
                }
            else
                return( 0 );
            }  /* else new symbol */
        }  /* else hash table entry found */
} /* Locate */
```

```
/*****************************************************************
*                                                                *
*       yylex  - is called by yyparse.  It checks global flags and *
*                if appropriate sends a command to a subordinate *
*                parser.  If not appropriate, it calls yylex1 to return *
*                to yyparse the next token from the Source program file. *
*       input:   none                                            *
*       output:  possible class commands in pcode file, value in yylval *
*       return:  token type                                      *
*                                                                *
******************************************************************
*                                                                *
*       04/21/87 bp - created                                    *
*                                                                *
*****************************************************************/

int yylex()
{
    BOOL status;

    if ( gFatalErrorflag )
        return( END_OF_PROG );

    if ( expressionflag )
        return( scanexpr() );

    status = ( CDcmdflag && (currfocus != NO_FOCUS) );

    while ( status )  {
        while ( status )
            status = ParseAppCmd( currfocus );
        if ( CBTclass )
            status = ParseAppCmd( CBTclass );
        }

    CDcmdflag = FALSE;
    return( yylex1() );
} /* yylex */
```

```
#S3771; #O9313 * BARBARA.PF; LP602 * TUE, MAY 17, 1988, 6:16 AM
#S3771; #O9313 * BARBARA.PF; LP602 * TUE, MAY 17, 1988, 6:16 AM
#S3771; #O9313 * BARBARA.PF; LP602 * TUE, MAY 17, 1988, 6:16 AM

#S3771; #O9313 * BARBARA.PF; LP602 * TUE, MAY 17, 1988, 6:16 AM
#S3771; #O9313 * BARBARA.PF; LP602 * TUE, MAY 17, 1988, 6:16 AM
#S3771; #O9313 * BARBARA.PF; LP602 * TUE, MAY 17, 1988, 6:16 AM

#S3771; #O9313 * BARBARA.PF; LP602 * TUE, MAY 17, 1988, 6:16 AM
#S3771; #O9313 * BARBARA.PF; LP602 * TUE, MAY 17, 1988, 6:16 AM
#S3771; #O9313 * BARBARA.PF; LP602 * TUE, MAY 17, 1988, 6:16 AM

#S3771; #O9313 * BARBARA.PF; LP602 * TUE, MAY 17, 1988, 6:16 AM
#S3771; #O9313 * BARBARA.PF; LP602 * TUE, MAY 17, 1988, 6:16 AM
#S3771; #O9313 * BARBARA.PF; LP602 * TUE, MAY 17, 1988, 6:16 AM
```

```
#S3771, #O9314  *  BARBARA.PF; LP602  *  TUE, MAY 17, 1988,  6:16 AM
#S3771; #O9314  *  BARBARA.PF; LP602  *  TUE, MAY 17, 1988,  6:16 AM
#S3771; #O9314  *  BARBARA.PF; LP602  *  TUE, MAY 17, 1988,  6:16 AM
```

```
#S3771; #O9314  *  BARBARA.PF; LP602  *  TUE, MAY 17, 1988,  6:16 AM
#S3771; #O9314  *  BARBARA.PF; LP602  *  TUE, MAY 17, 1988,  6:16 AM
#S3771; #O9314  *  BARBARA.PF; LP602  *  TUE, MAY 17, 1988,  6:16 AM
```

```
#S3771; #O9314  *  BARBARA.PF; LP602  *  TUE, MAY 17, 1988,  6:16 AM
#S3771; #O9314  *  BARBARA.PF; LP602  *  TUE, MAY 17, 1988,  6:16 AM
#S3771; #O9314  *  BARBARA.PF; LP602  *  TUE, MAY 17, 1988,  6:16 AM
```

```
#S3771; #O9314  *  BARBARA.PF; LP602  *  TUE, MAY 17, 1988,  6:16 AM
#S3771; #O9314  *  BARBARA.PF; LP602  *  TUE, MAY 17, 1988,  6:16 AM
#S3771; #O9314  *  BARBARA.PF; LP602  *  TUE, MAY 17, 1988,  6:16 AM
```

```
/***********************************************************************
*                                                                      *
* HPAGPFIL.C - Source file for file handling routines                  *
*                                                                      *
************************************************************************
*                                                                      *
* Agent PCODES Compiler 'C' source file                                *
* Ver X.09.01  12/15/87                                                *
*                                                                      *
*                                                                      *
*                                                                      *
*              COPYRIGHT HEWLETT PACKARD LIMITED                       *
*                           1986                                       *
*                    ALL RIGHTS RESERVED                               *
*                                                                      *
*                                                                      *
*                                                                      *
************************************************************************
*                                                                      *
*                                                                      *
*                          MODIFICATION LOG                            *
*                                                                      *
*  03/05/87 bp - created                                               *
*  04/28/87 bp - modified for X.06.00                                  *
*       12/15/87 bp - modified for new naming conventions              *
*                                                                      *
*                                                                      *
***********************************************************************/
/***********************************************************************
*                                                                      *
*                                                                      *
*                                                                      *
*       input:                                                         *
*       output:                                                        *
*       return:                                                        *
*                                                                      *
************************************************************************
*                                                                      *
*       07/16/87 bp - created                                          *
*                                                                      *
***********************************************************************/
#define NOCOMM
#include "windows.h"
#include "nwomf.h"
#include "ctype.h"
#include "doscall.h"
#include "ctrace.h"

#include "hpagpor0.h"
#include "nwapi.h"
#include "hpag.h"
#include "hpagetrc.h"
#include "hpagpext.h"

STATIC BOOL PASCAL deletetempfile( LPSTR );
```

```
/***********************************************************************
*                                                                      *
*       OpenFiles                                                      *
*               opens the files of the task                            *
*                                                                      *
*       input:  Sourcefile - name of Ascii source                      *
*               ObjectName - root name of this task object             *
*       output: globals fSource, fObject, fPCode set,                  *
*               gErrorInfo if error                                    *
*       return: TRUE if succeeds else FALSE                            *
*                                                                      *
************************************************************************
*                                                                      *
*       03/06/87 bp - created                                          *
*       05/12/88 bp - modified to add doscall routines                 *
*                                                                      *
***********************************************************************/
BOOL PASCAL OpenFiles( SourceFile, ObjectName )
LPSTR SourceFile;
LPSTR ObjectName;
{
    HANDLE hBuf;
    LPSTR pBuf;
    int len, errorcode = 0;

/* get path buffer */
    len = lstrlen( ObjectName );
    if ( (hBuf = GlobalAlloc(   GHND | GMEM_DDESHARE ,
                                MAKELONG((len+MAXEXT), 0) )) != NULL )  {
        if ( (pBuf = GlobalLock( hBuf )) == NULL )  {
            GlobalFree( hBuf );
            SetErrMsg( IDS_GMEM );
            return( FALSE );
            }
        else
            lstrcpy( pBuf, ObjectName );
        }
    else {
        SetErrMsg( IDS_GMEM );
        return( FALSE );
        }

/* open the source file */
    if ( (fSource = lpOpen( SourceFile, O_READ ))
              == NO_HANDLE )  {
        errorcode = IDS_FERR;
        goto cleanup;
        }
/* and read the first buffer */
    if ( fillbuf( fSource ) )  {
        errorcode = IDS_FERR;
        goto cleanup;
        }

/* get the extent of the temp file */
    LoadString( hLibInst, IDS_TEMPEXT, pBuf + len, MAXEXT );
/* and open it */
    if ( (fTemp = lpOpen( pBuf, O_CREATE|O_RD_WR )) == NO_HANDLE )  {
        dosclose( fSource );
```

```
        errorcode = IDS_FERR;
        goto cleanup;
        }

/* get the extent of the object file and delete it */
    LoadString( hLibInst, IDS_PCODEEXT, pBuf + len, MAXEXT );
    dsdoscall( HiWord(pBuf), DOS_UNLINK, 0, 0, LoWord(pBuf) );

/* get the extent of the Ascii PCode file */
    LoadString( hLibInst, IDS_ASCPCEXT, pBuf + len, MAXEXT );
/* and open it */
    if ( (fPCodes = lpOpen( pBuf, O_CREATE|O_WRITE )) == NO_HANDLE )  {
        dosclose( fSource );
        dosclose( fTemp );
        errorcode = IDS_FERR;
        goto cleanup;
        }
cleanup:
    GlobalUnlock( hBuf );
    GlobalFree( hBuf );

    if ( errorcode ) {
        SetErrMsg( errorcode );
        return( FALSE );
        }
    else return( TRUE );
}  /* OpenFiles */
```

```
/***********************************************************************
*                                                                      *
*       lpOpen                                                         *
*               open a file                                            *
*                                                                      *
*       input:  lpFileName - long pointer to file name                 *
*               ext        - short pointer to extent character string  *
*               mode       - of the open                               *
*       output: none                                                   *
*       return: valid handle if succeeds else NO_HANDLE                *
*                                                                      *
************************************************************************
*                                                                      *
*       03/06/87 bp - created                                          *
*       05/12/88 bp - modified to add doscall routines                 *
*                                                                      *
***********************************************************************/
int lpOpen( lpFileName, mode ).
LPSTR lpFileName;
int mode;
{
/* check if need to create the file */
    if ( mode & O_CREATE )  {
        if ( !ldoscreat( lpFileName, 0 ) )  {
            return( NO_HANDLE );
            }
        }
    else if ( !ldosopen( lpFileName, mode ) )  {
            return( NO_HANDLE );
            }

    return( AX_retrn );
}  /* lpOpen *7
```

```
/***********************************************************************
*                                                                      *
*       lpwrite                                                        *
*               write to a file                                        *
*                                                                      *
*       input:  lpBuf           - long pointer to data buffer          *
*               filenum         - file handle                          *
*               numbytes        - to write                             *
*       output: buffer is written to filenum                           *
*       return: TRUE if success else FALSE and SetErrMsg is called     *
*                                                                      *
************************************************************************
*                                                                      *
*       05/12/88 bp - created                                          *
*                                                                      *
***********************************************************************/
BOOL PASCAL lpwrite( filenum, lpBuf, numbytes )
int filenum;
LPSTR lpBuf;
int numbytes;
{
    if ( !doswrite( filenum, lpBuf, numbytes ) )  {
        SetErrMsg( IDS_FERR );
        return( FALSE );
        }
    else if ( AX_retrn != numbytes )  {
        SetErrMsg( IDS_FERR );
        return( FALSE );
        }
    else return( TRUE );
}  /* lpwrite */
```

```
/***********************************************************************
*                                                                      *
*       ReadFile:                                                      *
*               opens a file, allocs memory to hold the data, reads    *
*               it into the buffer, and closes the file.               *
*                                                                      *
*       input:  FileName                                               *
*               mode - of the open                                     *
*       output: hBuf - local HANDLE to the data buffer                 *
*       return: char pointer to the data buffer                        *
*                                                                      *
************************************************************************
*                                                                      *
*       03/09/87 bp - created                                          *
*       05/12/88 bp - modified to add doscall routines                 *
*                                                                      *
***********************************************************************/
char *ReadFile( FileName, hBuf, mode )
char *FileName;
PHANDLE hBuf;
int mode;
{
    register int errorcode = 0;
    int filenum, numbytes;
    char *filebuf = NULL;

    if ( !dosopen( FileName, mode ) )  {
        SetErrMsg( IDS_FERR );
        return( NULL );
        }
    else filenum = AX_retrn;

    if ( !doslseek( filenum, 0L, FROM_END ) )  {
        errorcode = IDS_FERR;
        goto cleanup;
        }
    else  {
        numbytes = AX_retrn;
        if ( !doslseek( filenum, 0L, FROM_START ) )  {
            errorcode = IDS_FERR;
            goto cleanup;
            }
        }

    if ((*hBuf = LocalAlloc( LHND, numbytes+1 )) == NULL)  {
        errorcode = IDS_LMEM;
        goto cleanup;
        }
    else if ((filebuf = LocalLock( *hBuf )) == NULL)  {
        errorcode = IDS_LMEM;
        LocalFree( *hBuf );
        goto cleanup;
        }

    if ( !dosread( filenum, filebuf, numbytes ) )  {
        errorcode = IDS_FERR;
        LocalUnlock( *hBuf );
        LocalFree( *hBuf );
```

```
        goto cleanup;
        }
    else {
        numbytes = AX_retrn;
        *(filebuf + numbytes) = '\0';
        }

cleanup:
    dosclose(filenum);
    if ( errorcode ) {
        SetErrMsg( errorcode );
        *hBuf = NULL;
        return( NULL );
        }
    else return( filebuf );
}   /* ReadFile */
```

```
/*****************************************************************
*                                                                *
*       fillbuf - reads a block of data into a memory buffer    *
*               Data is read into FileBuf.  The pointer gBufPtr is set *
*               to the beginning of the global data area cFileBuf.  A *
*               '\0' is appended to the data.  The structure     *
*               gCurrBufState is updated with the file pointer field *
*               set to the file pointer position prior to the read. *
*               If read error, gErrorInfo is set.                *
*       input:  MS DOS file handle                               *
*       output: cFileBuf contains the data                       *
*       return: number of bytes read                             *
*                                                                *
******************************************************************
*                                                                *
*       03/10/87 bp - created                                    *
*       05/12/88 bp - modified to add doscall routines           *
*                                                                *
*****************************************************************/
int fillbuf( filehandle )
int filehandle;
{
    register int numbytes;

/* save the file pointer */
    if ( doslseek( filehandle, 0L, FROM_CURRENT ) )
        gCurrBufState.fileptr = MAKELONG( AX_retrn, DX_retrn );
    else {
        SetErrMsg( IDS_FERR );
        return( 0 );
        }
/* and read the next buffer */
    if ( !dosread( filehandle, cFileBuf, FILEBUF_SIZE ) ) {
        numbytes = 0;
        SetErrMsg( IDS_FERR );
        }
    else numbytes = AX_retrn;

    cFileBuf[numbytes] = '\0';          /* set end of buf mark */
    gBufPtr = cFileBuf;
    gCurrBufState.size = numbytes;
    return( numbytes );
}   /* fillbuf */
```

```
/*********************************************************************
*                                                                    *
*       cleanup1 - called at end of pass1 if error to close files, etc. *
*       input:  root name of data file for this object               *
*       output: none                                                 *
*       return: none                                                 *
*                                                                    *
**********************************************************************
*                                                                    *
*       03/16/87 bp - created                                        *
*                                                                    *
*********************************************************************/
cleanup1( ObjectName )
LPSTR ObjectName;
{
    FreeCDLibs();
    FreeTables();
    deletetempfile( ObjectName );

    dosclose( fSource );
    dosclose( fPCodes );
}
/* cleanup1 */
```

```
/*********************************************************************
*                                                                    *
*       cleanup2 - called at end of compile to close files, etc.     *
*       input:  root name of data file for this object               *
*       output: none                                                 *
*       return: none                                                 *
*                                                                    *
**********************************************************************
*                                                                    *
*       03/16/87 bp - created                                        *
*       05/12/88 bp - modified to add doscall routines               *
*                                                                    *
*********************************************************************/
cleanup2( ObjectName )
LPSTR ObjectName;
{
    FreeCDLibs();
    FreeTables();
    deletetempfile( ObjectName );
    dosclose( fObject );
}
/* cleanup2 */
```

```
/*************************************************************************
*                                                                        *
*       deletetempfile - deletes the compile's temporary file           *
*       input:  root name of data file for this object                  *
*       output: none                                                     *
*       return: none                                                     *
*                                                                        *
**************************************************************************
*                                                                        *
*       03/16/87 bp - created                                            *
*       05/12/88 bp - modified to add doscall routines                   *
*                                                                        *
*************************************************************************/
STATIC BOOL PASCAL deletetempfile( ObjectName )
LPSTR ObjectName;
{
    HANDLE hBuf;
    LPSTR pBuf;
    int len, errorcode = 0;

    dosclose( fTemp );

/* get path buffer */
    len = lstrlen( ObjectName );
    if ( (hBuf = GlobalAlloc(   GHND | GMEM_DDESHARE ,
                                MAKELONG((len+MAXEXT), 0) )) != NULL )  {
        if ( (pBuf = GlobalLock( hBuf )) == NULL )  {
            GlobalFree( hBuf );
            SetErrMsg( IDS_GMEM );
            return( FALSE );
            }
        else
            lstrcpy( pBuf, ObjectName );
        }
    else {
        SetErrMsg( IDS_GMEM );
        return( FALSE );
        }

/* get the extent of the file and delete it */
    LoadString( hLibInst, IDS_TEMPEXT, pBuf + len, MAXEXT );
    dsdoscall( HiWord(pBuf), DOS_UNLINK, 0, 0, LoWord(pBuf) );

    return( TRUE );
}  /* deletetempfile */
```

```
/*************************************************************************
*                                                                        *
*       WritePCode - Adds a PCode instruction to the tempfile output    *
*               buffer, calls routine to output ASCII form              *
*                                                                        *
*       input:  pointer to buffer containing instruction                *
*       output: copied to output buffer                                 *
*       return: TRUE if success else FALSE                              *
*                                                                        *
**************************************************************************
*                                                                        *
*       03/20/87 bp - created                                            *
*                                                                        *
*************************************************************************/
WritePCode( PCode )
AG_PCODES *PCode;
{
    int len;

    len = PCode->length > 0 ? PCode->length : -PCode->length;

    if ( (curraddr.offset + len) > PAGESIZE )  {
        if ( !WritePage() )
            return( FALSE );
        }
    AddtoPage( (char *)PCode, len );
    WriteAscPCode( PCode );
    return( TRUE );

}  /* WritePCode */
```

```
/*****************************************************************
*                                                                *
*       AddtoPage - copies buffer to tempfile buffer            *
*               No checking for overflow is done                 *
*       input:  pointer to buffer                                *
*               number of bytes to copy                          *
*       output: globals gPCodePtr and gPCodeSize are updated     *
*       return: none                                             *
*                                                                *
******************************************************************
*                                                                *
*       03/20/87 bp - created                                    *
*                                                                *
*****************************************************************/
AddtoPage( buffer, numbytes )
char *buffer;
int numbytes;
{
    memcpy( gPCodePtr, buffer, numbytes );
    gPCodePtr += numbytes;
    curraddr.offset += numbytes;
}  /* AddtoPage */
```

```
/*****************************************************************
*                                                                *
*       WritePage - writes a page of PCodes to the tempfile     *
*                                                                *
*       input:  none                                             *
*       output: buffer written to tempfile, globals curraddr, gPCodePtr *
*               are updated, gPCodeBuf is re-initialized, gErrorInfo is *
*               updated if error                                 *
*       return: TRUE if success else FALSE                       *
*                                                                *
******************************************************************
*                                                                *
*       03/20/87 bp - created                                    *
*                                                                *
*****************************************************************/
BOOL WritePage()
{
    if ( !curraddr.offset )
        return( TRUE );

    if ( !lowrite( fTemp, (LPSTR)gPCodeBuf, PAGESIZE ) )  {
        SetErrMsg( IDS_FERR );
        return( FALSE );
        }

    curraddr.page++;
    curraddr.offset = 0;
    memset( gPCodeBuf, '\0', PAGESIZE );
    gPCodePtr = gPCodeBuf;
    return( TRUE );
}  /* WritePage */
```

```
/**********************************************************************
*                                                                     *
*       WriteAscPCode - Writes a PCode instruction to a file in Ascii *
*               for debug purposes: uses global buffer tfilename      *
*                                                                     *
*       input:  pointer to buffer containing instruction              *
*       output: written to file                                       *
*       return: TRUE if success else FALSE                            *
*                                                                     *
***********************************************************************
*                                                                     *
*       03/20/87 bp - created                                         *
*                                                                     *
**********************************************************************/
WriteAscPCode( PCode )
AG_PCODES *PCode:
{
    char *charptr:
    char *parmptr:
    int len:

/* setup */
    charptr = tfilename:
    len = abs(PCode->length) - AG_MIN_PCODE:     /* length of parameters */
    itoa( PCode->length, charptr, 10 ):
    strcat( charptr, " "):
    charptr += strlen( charptr ):
    itoa( PCode->idnum, charptr, 10 ):
    strcat( charptr, " "):
    charptr += strlen( charptr ):

/* add the parameters */
    parmptr = PCode->parms:
    for ( ; len > 0; len-- )  {
        hextoasc( *parmptr++, (LPSTR)charptr ):
        charptr += 2:
        }
    strcpy( charptr, CRLF ):

/* and write it */
    len = strlen( tfilename ):
    return( (lowrite( fPCodes, (LPSTR)tfilename, len )) ):
}  /* WriteAscPCode */
```

```
#S3771; #O9314  *  BARBARA.PF; LP602  *  TUE, MAY 17, 1988,  6:17 AM
#S3771; #O9314  *  BARBARA.PF; LP602  *  TUE, MAY 17, 1988,  6:17 AM
#S3771; #O9314  *  BARBARA.PF; LP602  *  TUE, MAY 17, 1988,  6:17 AM

#S3771; #O9314  *  BARBARA.PF; LP602  *  TUE, MAY 17, 1988,  6:17 AM
#S3771; #O9314  *  BARBARA.PF; LP602  *  TUE, MAY 17, 1988,  6:17 AM
#S3771; #O9314  *  BARBARA.PF; LP602  *  TUE, MAY 17, 1988,  6:17 AM

#S3771; #O9314  *  BARBARA.PF; LP602  *  TUE, MAY 17, 1988,  6:17 AM
#S3771; #O9314  *  BARBARA.PF; LP602  *  TUE, MAY 17, 1988,  6:17 AM
#S3771; #O9314  *  BARBARA.PF; LP602  *  TUE, MAY 17, 1988,  6:17 AM

#S3771; #O9314  *  BARBARA.PF; LP602  *  TUE, MAY 17, 1988,  6:17 AM
#S3771; #O9314  *  BARBARA.PF; LP602  *  TUE, MAY 17, 1988,  6:17 AM
#S3771; #O9314  *  BARBARA.PF; LP602  *  TUE, MAY 17, 1988,  6:17 AM
```

```
#S3771; #O9315 * BARBARA.PF; LP602 * TUE, MAY 17, 1988, 6:17 AM
#S3771; #O9315 * BARBARA.PF; LP602 * TUE, MAY 17, 1988, 6:17 AM
#S3771; #O9315 * BARBARA.PF; LP602 * TUE, MAY 17, 1988, 6:17 AM
```

```
#S3771; #O9315 * BARBARA.PF; LP602 * TUE, MAY 17, 1988, 6:17 AM
#S3771; #O9315 * BARBARA.PF; LP602 * TUE, MAY 17, 1988, 6:17 AM
#S3771; #O9315 * BARBARA.PF; LP602 * TUE, MAY 17, 1988, 6:17 AM
```

```
#S3771; #O9315 * BARBARA.PF; LP602 * TUE, MAY 17, 1988, 6:17 AM
#S3771; #O9315 * BARBARA.PF; LP602 * TUE, MAY 17, 1988, 6:17 AM
#S3771; #O9315 * BARBARA.PF; LP602 * TUE, MAY 17, 1988, 6:17 AM
```

```
#S3771; #O9315 * BARBARA.PF; LP602 * TUE, MAY 17, 1988, 6:17 AM
#S3771; #O9315 * BARBARA.PF; LP602 * TUE, MAY 17, 1988, 6:17 AM
#S3771; #O9315 * BARBARA.PF; LP602 * TUE, MAY 17, 1988, 6:17 AM
```

```
/*****************************************************************
*                                                                *
* HPAGPCI0.C - Main source file for task editor compiler library *
*                                                                *
******************************************************************
*                                                                *
* Agent TaskEditor/PCODES Compiler 'C' source file               *
* Ver X.09.01  12/15/87                                          *
*                                                                *
*                                                                *
*                                                                *
*                COPYRIGHT HEWLETT PACKARD LIMITED               *
*                             1986                               *
*                      ALL RIGHTS RESERVED                       *
*                                                                *
*                                                                *
*                                                                *
******************************************************************
*                                                                *
*                                                                *
*                       MODIFICATION LOG                         *
*                                                                *
*  03/05/87 bp - created                                         *
*  04/28/87 bp - modified for X.08.00                            *
*       12/15/87 bp - modified for new naming conventions        *
*                                                                *
*                                                                *
*****************************************************************/
/*****************************************************************
*                                                                *
*                                                                *
*                                                                *
*       input:                                                   *
*       output:                                                  *
*       return:                                                  *
*                                                                *
******************************************************************
*                                                                *
*       03/06/87 bp - created                                    *
*                                                                *
*****************************************************************/
#define NOCOMM
#include "windows.h"
#include "nwomf.h"
#include "ctype.h"
#include "doscall.h"
#include "ctrace.h"

#include "hpagppr0.h"
#include "nwapi.h"
#include "hpag.h"
#include "hpagatrc.h"
#include "hpagpdec.h"
```

```
/*****************************************************************
*                                                                *
*       InitSpellings                                            *
*               is called by CompileScript to initialize the spelling
*               table of keywords.  Later, user defined symbols are
*               entered into the table by Locate as they are     *
*               encountered.                                     *
*                                                                *
*       input:  none                                             *
*       output: none                                             *
*       return: TRUE if succeeds else FALSE                      *
*                                                                *
******************************************************************
*                                                                *
*       03/06/87 bp - created from prototype code by TW          *
*                                                                *
*****************************************************************/
BOOL InitSpellings()
{
    char *Keywordptr, *charptr;
    static HANDLE hKeywordTable;
    char *pKeywordTable;
    int pos, tempval, symvariable = 0;
    BOOL status = TRUE;
    BOOL functionflag = FALSE;

    InitScanFlags();

    if (!InitTables())  return( FALSE );

/* set up keyword table */

/* get the name of the keyword file */
    LoadString( hInst, IDS_ASCKEY, (LPSTR)gTempBuf, RECSIZE );
/* and load it into memory */
    if ((pKeywordTable =
            ReadFile( gTempBuf, &hKeywordTable, O_READ )) == NULL)
        return( FALSE );

/* set up the keyword table */
    charptr = pKeywordTable;

    while ( *charptr && !functionflag )  {
        Keywordptr = gTempBuf;

        while ( isspace(*charptr) ) charptr++;
        while ( (*charptr) && !isspace(*charptr) )
            *Keywordptr++ = *charptr++;
        *Keywordptr = '\0';

        if ( !strcmp( gTempBuf, END_KEYWORD ) )
            functionflag = TRUE;
        else if ( !(pos = Locate( gTempBuf ))) {
            status = FALSE;
            break;
        }
        else  {
            if ( *(--Keywordptr) == '#' )  {
                (pSpellings + pos)->type = SYS_VAR;
```

```
                (pSpellings + pos)->value = ++sysvariable;
                }
            else
                (pSpellings + pos)->type = KEYWORD;

            Keyword = (pos > Keyword) ? pos : Keyword;
            }
        while ( (*charptr == LF) || (*charptr == ' ') ) charptr++;
        } /* while */

/* set up the function information in stringtable */
    gLastKeyword = pos;

    while ( *charptr ) {
        Keywordptr = gTempBuf;

        while ((*charptr) && (*charptr != LF) && (*charptr != ' '))
            *Keywordptr++ = *charptr++;
        *Keywordptr = '\0';

        if (!(pos = Locate( gTempBuf ))) {
            status = FALSE;
            break;
            }
        else {
        /* Note use of temporary to avoid assignment of function return
           into global pointer */
            tempval = PutFunctionInfo( charptr, 0 );
            (pSpellings + pos)->value = tempval;
            (pSpellings + pos)->type = FUNCTION;
            Keyword = (pos > Keyword) ? pos : Keyword;
            }
        while ( (*charptr != LF) && *charptr ) charptr++;
        while ( (*charptr == LF) || (*charptr == ' ') ) charptr++;
        } /* while */

    if (hKeywordTable != NULL) {
        LocalUnlock( hKeywordTable );
        LocalFree( hKeywordTable );
        hKeywordTable = NULL;
        }

/* set class information  and return */
    return( status ? PutClassInfo() : FALSE );
} /* InitSpellings */
```

```
/************************************************************************
 *
 *      DoPass2 - does 2nd pass of the compiler which writes the
 *              PCode object file with header and debug information
 *
 *      input:  root name of data file for this object
 *      output: PCode object file
 *      return: none
 *
 ************************************************************************
 *
 *      03/18/87 bp - created
 *
 ************************************************************************/
void DoPass2( ObjectName )
LPSTR ObjectName;
{
    if ( !InitPass2( ObjectName ) || numerrors ) {
        cleanup2( ObjectName );
        return;
        }
    if ( WriteHeader() ) {
        if ( WriteCode() )
            WriteTables();
        }
    cleanup2( ObjectName );
    return;
} /* DoPass2 */
```

```
/***********************************************************************
*                                                                      *
*       CompileScript                                                  *
*               Entry procedure of the parser,                         *
*               called by the Task Editor                              *
*                                                                      *
*       input:  Sourcefile - name of Ascii source                      *
*               ObjectName - root name of data files for this task     *
*       output: ErrorInfo - low word is error number of 1st error      *
*                           hi word is line number of 1st error        *
*       return: number of errors                                       *
*                                                                      *
************************************************************************
*                                                                      *
*       03/06/87 bp - created                                          *
*                                                                      *
***********************************************************************/
int FAR PASCAL CompileScript( hInstance, OMF_handle, Sourcefile,
                              ObjectName, ErrorInfo)
HANDLE hInstance;
OMFHND OMF_handle;
LPSTR Sourcefile;
LPSTR ObjectName;
long FAR *ErrorInfo;
{
    BOOL pass2flag = FALSE;

    hInst = hInstance;
    hOMF = OMF_handle;

/* initialize error stuff */
    gErrorInfo = ErrorInfo;
    *gErrorInfo = 0L;
    glinenumber = 0;
    numerrors = 0;

/* open the files */
    if ( !OpenFiles( Sourcefile, ObjectName ))
        return(numerrors);

/* initialize the tables */
    if (!InitSpellings())  {
        cleanup1( ObjectName );
        return(numerrors);
        }

/* and parse */
    yyparse();

    if ( !numerrors )
        DoPass2( ObjectName );
    else
        cleanup1( ObjectName );

    return( numerrors );
}
```

```
/***********************************************************************
*                                                                      *
*       main - initialization routine for the library                  *
*                                                                      *
*       input:  argv, argc                                             *
*       output: none                                                   *
*       return: none                                                   *
*                                                                      *
************************************************************************
*                                                                      *
*       03/24/87 bp - created                                          *
*                                                                      *
***********************************************************************/
BOOL PASCAL main(argc, argv)
int argc;
WORD FAR *argv;
{
/* Initialize the local heap */
    LocalInit( (WORD)0, (WORD)0, (WORD)argv[1] );

/* save the instance handle */
    hLibInst = (WORD)argv[2];

    return( TRUE );
}  /* main */
```

```
#S3771; #O9315  *  BARBARA.PF; LP602  *  TUE, MAY 17, 1988,  6:17 AM
#S3771; #O9315  *  BARBARA.PF; LP602  *  TUE, MAY 17, 1988,  6:17 AM
#S3771; #O9315  *  BARBARA.PF; LP602  *  TUE, MAY 17, 1988,  6:17 AM

#S3771; #O9315  *  BARBARA.PF; LP602  *  TUE, MAY 17, 1988,  6:17 AM
#S3771; #O9315  *  BARBARA.PF; LP602  *  TUE, MAY 17, 1988,  6:17 AM
#S3771; #O9315  *  BARBARA.PF; LP602  *  TUE, MAY 17, 1988,  6:17 AM

#S3771; #O9315  *  BARBARA.PF; LP602  *  TUE, MAY 17, 1988,  6:17 AM
#S3771; #O9315  *  BARBARA.PF; LP602  *  TUE, MAY 17, 1988,  6:17 AM
#S3771; #O9315  *  BARBARA.PF; LP602  *  TUE, MAY 17, 1988,  6:17 AM

#S3771; #O9315  *  BARBARA.PF; LP602  *  TUE, MAY 17, 1988,  6:17 AM
#S3771; #O9315  *  BARBARA.PF; LP602  *  TUE, MAY 17, 1988,  6:17 AM
#S3771; #O9315  *  BARBARA.PF; LP602  *  TUE, MAY 17, 1988,  6:17 AM
```

```
#S3771; #O9316  *  BARBARA.PF; LP602  *  TUE, MAY 17, 1988,  6:17 AM
#S3771; #O9316  *  BARBARA.PF; LP602  *  TUE, MAY 17, 1988,  6:17 AM
#S3771; #O9316  *  BARBARA.PF; LP602  *  TUE, MAY 17, 1988,  6:17 AM

#S3771; #O9316  *  BARBARA.PF; LP602  *  TUE, MAY 17, 1988,  6:17 AM
#S3771; #O9316  *  BARBARA.PF; LP602  *  TUE, MAY 17, 1988,  6:17 AM
#S3771; #O9316  *  BARBARA.PF; LP602  *  TUE, MAY 17, 1988,  6:17 AM

#S3771; #O9316  *  BARBARA.PF; LP602  *  TUE, MAY 17, 1988,  6:17 AM
#S3771; #O9316  *  BARBARA.PF; LP602  *  TUE, MAY 17, 1988,  6:17 AM
#S3771; #O9316  *  BARBARA.PF; LP602  *  TUE, MAY 17, 1988,  6:17 AM

#S3771; #O9316  *  BARBARA.PF; LP602  *  TUE, MAY 17, 1988,  6:17 AM
#S3771; #O9316  *  BARBARA.PF; LP602  *  TUE, MAY 17, 1988,  6:17 AM
#S3771; #O9316  *  BARBARA.PF; LP602  *  TUE, MAY 17, 1988,  6:17 AM
```

```
/*****************************************************************
*                                                                *
* HPAGPBUF.C - Source file for buffer managing routines         *
*                                                                *
******************************************************************
*                                                                *
* Agent PCODES Compiler 'C' source file                         *
* Ver X.09.01  12/15/87                                         *
*                                                                *
*                                                                *
*                                                                *
*                COPYRIGHT HEWLETT PACKARD LIMITED              *
*                             1986                              *
*                      ALL RIGHTS RESERVED                      *
*                                                                *
*                                                                *
*                                                                *
******************************************************************
*                                                                *
*                                                                *
*                       MODIFICATION LOG                        *
*                                                                *
*  03/13/87 bp - created                                        *
*  04/28/87 bp - modified for X.06.00                           *
*       12/15/87 bp - modified for new naming conventions       *
*       05/15/88 bp - modified to make stringtable global       *
*                                                                *
*                                                                *
*****************************************************************/
/*****************************************************************
*                                                                *
*                                                                *
*                                                                *
*       input:                                                  *
*       output:                                                 *
*       return:                                                 *
*                                                                *
******************************************************************
*                                                                *
*       07/07/87 bp - created                                   *
*                                                                *
*****************************************************************/
#define NOCOMM
#include "windows.h"
#include "nwomt.h"
#include "ctype.h"
#include "doscall.h"
#include "ctrace.h"

#include "hpagpor0.h"
#include "nwapi.h"
#include "hpag.h"
#include "hpagetrc.h"
#include "hpagpext.h"
STATIC BOOL NEAR PASCAL ExpandStringTable( int );
```

```
/*****************************************************************
*                                                                *
*       InitTables - allocates the buffers to hold the strings  *
*                and symbols of the compile and locks them.     *
*                First initializes all global handles to NULL and then *
*                allocates initial memory requirements for them *
*                                                                *
*       returns TRUE if successful else FALSE                   *
*                                                                *
******************************************************************
*                                                                *
*       03/13/87 bp - created                                   *
*       05/15/88 bp - modified to make stringtable global       *
*                                                                *
*****************************************************************/
BOOL InitTables()
{

/* initialize handles to NULL */
    hStringTable = NULL;
    hSpellings = NULL;
    hClassInfo = NULL;
    hIntTable = NULL;
    hStrlitTable = NULL;
    hRealTable = NULL;
    hLabels = NULL;
    hArrayTable = NULL;
    hWindow = NULL;
    hFunctionTable = NULL;
    hParmTable = NULL;

/* allocate the handles */
    if ((hStringTable = GlobalAlloc(    GHND | GMEM_DDESHARE,
                                        MAKELONG(INIT_ST_SIZE,0) )) == NULL)  {

        SetErrMsg( IDS_GMEM );
        return( FALSE );
        }
    else st_size = INIT_ST_SIZE;

    if ((hSpellings = LocalAlloc( LHND, SPELLINGS_SIZE*sizeof(IDENTIFIER) ))
                        == NULL)  {
        SetErrMsg( IDS_LMEM );
        return( FALSE );
        }
    else spell_size = SPELLINGS_SIZE;

    if  ((hClassInfo = LocalAlloc( LHND, NUM_CLASSES*sizeof(CLASS) )) == NULL)  {
        SetErrMsg( IDS_LMEM );
        return( FALSE );
        }
    else class_size = NUM_CLASSES;

    if  ((hIntTable = LocalAlloc( LHND, NUM_LITS*sizeof(long) )) == NULL)  {
        SetErrMsg( IDS_LMEM );
        return( FALSE );
        }
    else intlit_size = NUM_LITS;

    if ((hStrlitTable = LocalAlloc( LHND, NUM_LITS*sizeof(int) )) == NULL)  {
```

```
        SetErrMsg( IDS_LMEM );
        return( FALSE );
        }
    else strlit_size = NUM_LITS;

    if ((hRealTable = LocalAlloc( LHND, NUM_LITS*sizeof(double) )) == NULL)  {
        SetErrMsg( IDS_LMEM );
        return( FALSE );
        }
    else reallit_size = NUM_LITS;

    if ((hLabels = LocalAlloc( LHND, NUM_LABELS*sizeof(LABEL) )) == NULL)  {
        SetErrMsg( IDS_LMEM );
        return( FALSE );
        }
    else label_size = NUM_LABELS;

    if ((hArrayTable = LocalAlloc( LHND, NUM_ARRAYS*sizeof(ARRAY) )) == NULL)  {
        SetErrMsg( IDS_LMEM );
        return( FALSE );
        }
    else arraytable_size = NUM_ARRAYS;

    if ((hWindow = LocalAlloc( LHND, NUM_WINDOWS*sizeof(WINDOW) )) == NULL)  {
        SetErrMsg( IDS_LMEM );
        return( FALSE );
        }
    else window_size = NUM_WINDOWS;

    if ((hFunctionTable = LocalAlloc(   LHND,
                                NUM_FUNCTIONS*sizeof(FNCT) )) == NULL)  {
        SetErrMsg( IDS_LMEM );
        return( FALSE );
        }
    else function_size = NUM_FUNCTIONS;

    if ((hParmTable = LocalAlloc( LHND, NUM_PARMS*sizeof(long) )) == NULL)  {
        SetErrMsg( IDS_LMEM );
        return( FALSE );
        }
    else parm_size = NUM_PARMS;

    return( LockTables() );
}  /* InitTables */
```

```
/************************************************************************
*                                                                      *
*       LockTables - locks all of the global handles                   *
*                                                                      *
*       input:  none                                                   *
*       output: pointers to global handles are set.                    *
*       return: TRUE if success else FALSE and gErrorInfo is updated   *
*                                                                      *
*************************************************************************
*                                                                      *
*       03/13/87 bp - created                                          *
*       05/15/88 bp - modified to make stringtable global              *
*                                                                      *
************************************************************************/
LockTables()
{
    BOOL status = TRUE;

    if ( hSpellings != NULL )  {
        if ((pSpellings = (IDENTIFIER *)LocalLock( hSpellings )) == NULL)  {
            SetErrMsg( IDS_LMEM );
            status = FALSE;
            }
        }
    if ( hClassInfo != NULL )  {
        if ((pClassInfo = (CLASS *)LocalLock( hClassInfo )) == NULL)  {
            SetErrMsg( IDS_LMEM );
            status = FALSE;
            }
        }
    if ( hIntTable != NULL )  {
        if ((pIntTable = (long *)LocalLock( hIntTable )) == NULL)  {
            SetErrMsg( IDS_LMEM );
            status = FALSE;
            }
        }
    if ( hStrlitTable != NULL )  {
        if ((pStrlitTable = (int *)LocalLock( hStrlitTable )) == NULL)  {
            SetErrMsg( IDS_LMEM );
            status = FALSE;
            }
        }
    if ( hRealTable != NULL )  {
        if ((pRealTable = (double *)LocalLock( hRealTable )) == NULL)  {
            SetErrMsg( IDS_LMEM );
            status = FALSE;
            }
        }
    if ( hLabels != NULL )  {
        if ((pLabels = (LABEL *)LocalLock( hLabels )) == NULL)  {
            SetErrMsg( IDS_LMEM );
            status = FALSE;
            }
        }
    if ( hArrayTable != NULL )  {
        if ((pArrayTable = (ARRAY *)LocalLock( hArrayTable )) == NULL)  {
            SetErrMsg( IDS_LMEM );
            status = FALSE;
            }
```

```
        }
    if ( hWindow != NULL )  {
        if ((pWindow = (WINDOW *)LocalLock( hWindow )) == NULL)  {
            SetErrMsg( IDS_LMEM );
            status = FALSE;
            }
        }
    if ( hFunctionTable != NULL )  {
        if ((pFunctionTable = (FNCT *)LocalLock( hFunctionTable )) == NULL)  {
            SetErrMsg( IDS_LMEM );
            status = FALSE;
            }
        }
    if ( hPermTable != NULL )  {
        if ((pPermTable = (long *)LocalLock( hPermTable )) == NULL)  {
            SetErrMsg( IDS_LMEM );
            status = FALSE;
            }
        }
    return( status );
}  /* LockTables */
```

```
/*************************************************************************
 *                                                                       *
 *      UnlockTables - unlocks all of the global handles                 *
 *                                                                       *
 *      input:  none                                                     *
 *      output: pointers to global handles set to NULL                   *
 *      return: none                                                     *
 *                                                                       *
 *************************************************************************
 *                                                                       *
 *      03/13/87 bp - created                                            *
 *      05/15/88 bp - modified to make stringtable global                *
 *                                                                       *
 *************************************************************************/
void UnlockTables()
{
    if ( hSpellings != NULL )  {
        pSpellings = NULL;
        LocalUnlock( hSpellings );
        }
    if ( hClassInfo != NULL )  {
        pClassInfo = NULL;
        LocalUnlock( hClassInfo );
        }
    if ( hIntTable != NULL )  {
        pIntTable = NULL;
        LocalUnlock( hIntTable );
        }
    if ( hStrlitTable != NULL )  {
        pStrlitTable = NULL;
        LocalUnlock( hStrlitTable );
        }
    if ( hRealTable != NULL )  {
        pRealTable = NULL;
        LocalUnlock( hRealTable );
        }
    if ( hLabels != NULL )  {
        pLabels = NULL;
        LocalUnlock( hLabels );
        }
    if ( hArrayTable != NULL )  {
        pArrayTable = NULL;
        LocalUnlock( hArrayTable );
        }
    if ( hWindow != NULL )  {
        pWindow = NULL;
        LocalUnlock( hWindow );
        }
    if ( hFunctionTable != NULL )  {
        pFunctionTable = NULL;
        LocalUnlock( hFunctionTable );
        }
    if ( hPermTable != NULL )  {
        pPermTable = NULL;
        LocalUnlock( hPermTable );
        }
}  /* UnlockTables */
```

```
/*****************************************************************
*                                                                *
*       FreeTables - frees all of the global handles             *
*                                                                *
*       input:  none                                             *
*       output: global handles set to NULL                       *
*       return: none                                             *
*                                                                *
******************************************************************
*                                                                *
*       03/13/87 bp - created                                    *
*       05/15/88 bp - modified to make stringtable global        *
*                                                                *
*****************************************************************/
void FreeTables()
{
    UnlockTables();

    if ( hStringTable != NULL )  {
        UnlockStringTable();
        GlobalFree( hStringTable );
        hStringTable = NULL;
        }

    if ( hSpellings != NULL )  {
        LocalFree( hSpellings );
        hSpellings = NULL;
        }
    if ( hClassInfo != NULL )  {
        LocalFree( hClassInfo );
        hClassInfo = NULL;
        }
    if ( hIntTable != NULL )  {
        LocalFree( hIntTable );
        hIntTable = NULL;
        }
    if ( hStrlitTable != NULL )  {
        LocalFree( hStrlitTable );
        hStrlitTable = NULL;
        }
    if ( hRealTable != NULL )  {
        LocalFree( hRealTable );
        hRealTable = NULL;
        }
    if ( hLabels != NULL )  {
        LocalFree( hLabels );
        hLabels = NULL;
        }
    if ( hArrayTable != NULL )  {
        LocalFree( hArrayTable );
        hArrayTable = NULL;
        }
    if ( hWindow != NULL )  {
        LocalFree( hWindow );
        hWindow = NULL;
        }
    if ( hFunctionTable != NULL )  {
        LocalFree( hFunctionTable );
        hFunctionTable = NULL;
```

```
    }
    if ( hParmTable != NULL )  {
        LocalFree( hParmTable );
        hParmTable = NULL;
        }
}  /* FreeTables */
```

```
/*******************************************************************
*                                                                  *
*       ExpandTable - increases size of a Table                    *
*               unlocks all the buffer handles                     *
*               reallocates the handle                             *
*               locks the handles                                  *
*       input:  pointer to a table handle                          *
*               new size in bytes                                  *
*       output: gErrorInfo updated if error                        *
*       return: TRUE if successful else FALSE                      *
*                                                                  *
********************************************************************
*                                                                  *
*       03/13/87 bp - created                                      *
*                                                                  *
*******************************************************************/
BOOL ExpandTable( hBuf, numbytes )
PHANDLE hBuf;
int numbytes;
{
    HANDLE hNewBuf;
    BOOL status = TRUE;

    UnlockTables();

    if ((hNewBuf = LocalReAlloc(*hBuf, numbytes, LHND)) == NULL)  {
        status = FALSE;
        SetErrMsg( IDS_LMEM );
        }
    *hBuf = hNewBuf;

    if ( !LockTables() )
        return( FALSE );
    else
        return( status );

}       /* ExpandTable */
```

```
/**********************************************************************
*                                                                     *
*       PutStringTable - enters a string literal in StringTable       *
*                                                                     *
*       input:  Symbol - string to be entered                         *
*       return: index of entry if successful else NULL                *
*                                                                     *
***********************************************************************
*                                                                     *
*       03/06/87 bp - created                                         *
*       05/15/88 bp - modified to make stringtable global             *
*                                                                     *
**********************************************************************/
int PASCAL PutStringTable( Symbol )
LPSTR Symbol;
{
    int len, index, newsize;
    LPSTR lptr;
    HANDLE hBuf;

    len = lstrlen( Symbol );
    if ( index = ExpandStringTable( ++len ) (          /* ++ for '\0 */
        return( 0 );
        }
    if ( (lptr = GlobalLock( hStringTable )) == NULL ) (
        SetErrMsg( IDS_GMEM );
        return( 0 );
        }
    lstrcpy( lptr + index, Symbol );
    UnlockStringTable();
    return( index );
}       /* PutStringTable */
```

```
/**********************************************************************
*                                                                     *
*       ExpandStringTable - calls GlobalRealloc if necessary to get   *
*               room for entry.  If already enough room, just returns *
*                                                                     *
*       input:  length of new entry                                   *
*       return: index of new entry if successful else FALSE           *
*               calls SetErrMsg if error                              *
*                                                                     *
***********************************************************************
*                                                                     *
*       05/15/88 bp - created                                         *
*                                                                     *
**********************************************************************/
STATIC BOOL NEAR PASCAL ExpandStringTable( len )
int length;
{
    int index, newsize;
    HANDLE hBuf;

    index = st_index;
    if ((len + index) > st_size)  {
        newsize = st_size + DELTA_ST_SIZE;
        if ( (hBuf = GlobalReAlloc(     hStringTable,
                                        makelong( newsize, 0 ),
                                        GHND | GMEM_DDESHARE )) == NULL )  (
            SetErrMsg( IDS_GMEM );
            return( 0 );
            }
        else {
            hStringTable = hBuf;
            st_size = newsize;
            }
        }
    st_index += len;
    return( index );
}       /* ExpandStringTable */
```

```
/***********************************************************************
*                                                                      *
*       CmpStringTable - compares a string with an entry in StringTable *
*                                                                      *
*       input:  Symbol - string to be entered                          *
*               index - to entry in StringTable to compare with        *
*       return: result of compare as in strcmp                         *
*                                                                      *
************************************************************************
*                                                                      *
*       03/08/87 bp - created                                          *
*       05/16/88 bp - modified to make stringtable global              *
*                                                                      *
***********************************************************************/
int CmpStringTable( index, Symbol )
int   index;
LPSTR Symbol;
{
    LPSTR lptr;
    int flag;

    if ( (lptr = GetStringTable( index )) == NULL )
        return( 1 );
    flag = lstrcmp( lptr, Symbol );
    UnlockStringTable();
    return( flag );
}   /* CmpStringTable */
```

```
/***********************************************************************
*                                                                      *
*       GetStringTable - fetches an entry from stringtable             *
*                                                                      *
*       input:  index - to entry in StringTable to fetch               *
*       return: long pointer to string                                 *
*                                                                      *
*       NOTE:   Caller must unlock the global buffer!!                 *
*                                                                      *
************************************************************************
*                                                                      *
*       05/15/88 bp - created                                          *
*                                                                      *
***********************************************************************/
LPSTR PASCAL GetStringTable( index )
int   index;
{
    LPSTR lptr;

    if ( hStringTable != NULL )  {
        if ( (lptr = GlobalLock( hStringTable )) != NULL )) )
            return( lptr + index );
        }
    else {
        SetErrMsg( IDS_GMEM );
        return( NULL );
        }
}   /* GetStringTable */
```

```
/**********************************************************************
*                                                                     *
*       AddFunctionEntry - reserves the space for a function information*
*               entry in StringTable                                  *
*                                                                     *
*       input:  numparms - of the function                            *
*       return: index of entry if successful else NULL                *
*                                                                     *
***********************************************************************
*                                                                     *
*       07/07/87 bp - created                                         *
*       05/16/88 bp - modified to make stringtable global             *
*                                                                     *
**********************************************************************/
int AddFunctionEntry( numparms )
int numparms;
{
    return( ExpandStringTable( FCTINFOSIZE + numparms*sizeof(int)) );

}       /* AddFunctionEntry */
```

```
#S3771; #O9316 * BARBARA.PF; LP602 * TUE, MAY 17, 1988, 6:17 AM
#S3771; #O9316 * BARBARA.PF; LP602 * TUE, MAY 17, 1988, 6:17 AM
#S3771; #O9316 * BARBARA.PF; LP602 * TUE, MAY 17, 1988, 6:17 AM

#S3771; #O9316 * BARBARA.PF; LP602 * TUE, MAY 17, 1988, 6:17 AM
#S3771; #O9316 * BARBARA.PF; LP602 * TUE, MAY 17, 1988, 6:17 AM
#S3771; #O9316 * BARBARA.PF; LP602 * TUE, MAY 17, 1988, 6:17 AM

#S3771; #O9316 * BARBARA.PF; LP602 * TUE, MAY 17, 1988, 6:17 AM
#S3771; #O9316 * BARBARA.PF; LP602 * TUE, MAY 17, 1988, 6:17 AM
#S3771; #O9316 * BARBARA.PF; LP602 * TUE, MAY 17, 1988, 6:17 AM

#S3771; #O9316 * BARBARA.PF; LP602 * TUE, MAY 17, 1988, 6:17 AM
#S3771; #O9316 * BARBARA.PF; LP602 * TUE, MAY 17, 1988, 6:17 AM
#S3771; #O9316 * BARBARA.PF; LP602 * TUE, MAY 17, 1988, 6:17 AM
```

```
#S3771; #O9317  *  BARBARA.PF; LP602  *  TUE, MAY 17, 1988,  6:17 AM
#S3771; #O9317  *  BARBARA.PF; LP602  *  TUE, MAY 17, 1988,  6:17 AM
#S3771; #O9317  *  BARBARA.PF; LP602  *  TUE, MAY 17, 1988,  6:17 AM
```

```
#S3771; #O9317  *  BARBARA.PF; LP602  *  TUE, MAY 17, 1988,  6:17 AM
#S3771; #O9317  *  BARBARA.PF; LP602  *  TUE, MAY 17, 1988,  6:17 AM
#S3771; #O9317  *  BARBARA.PF; LP602  *  TUE, MAY 17, 1988,  6:17 AM
```

```
#S3771; #O9317  *  BARBARA.PF; LP602  *  TUE, MAY 17, 1988,  6:17 AM
#S3771; #O9317  *  BARBARA.PF; LP602  *  TUE, MAY 17, 1988,  6:17 AM
#S3771; #O9317  *  BARBARA.PF; LP602  *  TUE, MAY 17, 1988,  6:17 AM
```

```
#S3771; #O9317  *  BARBARA.PF; LP602  *  TUE, MAY 17, 1988,  6:17 AM
#S3771; #O9317  *  BARBARA.PF; LP602  *  TUE, MAY 17, 1988,  6:17 AM
#S3771; #O9317  *  BARBARA.PF; LP602  *  TUE, MAY 17, 1988,  6:17 AM
```

```
/***********************************************************************
*
* HPAGPPS2.C - Source file for Pass 2 of the Task Language compiler
*
************************************************************************
*
* Agent PCODES Compiler 'C' source file
* Ver X.09.01  12/15/87
*
*
*
*                    COPYRIGHT HEWLETT PACKARD LIMITED
*                                  1986
*                           ALL RIGHTS RESERVED
*
*
*
*
************************************************************************
*
*
*                           MODIFICATION LOG
*
*  03/05/87 bp - created
*  04/28/87 bp - modified for X.06.00
*       12/15/87 bp - modified for new naming conventions
*
*
*
***********************************************************************/
/***********************************************************************
*
*
*
*
*       input:
*       output:
*       return:
*
************************************************************************
*
*       03/16/87 bp - created
*
***********************************************************************/
#define NOCOMM
#include "windows.h"
#include "nwomf.h"
#include "ctype.h"
#include "doscall.h"
#include "ctrace.h"

#include "hpagpor0.h"
#include "nwapi.h"
#include "hpag.h"
#include "hpagstrc.h"
#include "hpagpext.h"
```

```
/***********************************************************************
*
*       InitPass2 - closes and opens files and performs any
*                   initializations necessary for compiler pass 2.  In case
*                   of error, gErrorInfo will be updated.
*       input:  long pointer to root data file name for this task
*       output: none
*       return: TRUE if successful else FALSE
*
************************************************************************
*
*       03/12/87 bp - created
*       05/12/88 bp - modified to add doscall routines
*
***********************************************************************/
InitPass2( ObjectName )
LPSTR ObjectName;
{
    HANDLE hBuf;
    LPSTR  pBuf;
    register int  i;

/* finup up class info initialization instructions */
    if ( next_classid )
        OutputClassIdPCode();
    else if ( next_class )
        AddLabelAddr( 0, &startaddr );

/* close the source and ascii PCodes files */
    dosclose( fSource );
    fSource = NO_HANDLE;
    dosclose( fPCodes );
    fPCodes = NO_HANDLE;

/* check if all windows have been defined */
    for ( i = 1; i < next_window; i++ )  {
        if ( !IswndDefined( i ) )  {
            SetErrmsg( IDS_DWERR );
            return( FALSE );
            }
        } /* for */

/* and all the labels */
    for ( i = 0; i < next_label; i++ )  {
        if ( !GetLabelEntry( i )->address.page )  {
            SetErrmsg( IDS_LBLERR );
            return( FALSE );
            }
        } /* for */

/* and the arrays dimensioned */
    for ( i = 0; i < next_array; i++ )  {
        if ( !GetArrayEntry( i )->size )  {
            SetErrmsg( IDS_ARRAYERR );
            return( FALSE );
            }
        } /* for */

/* write the last page */
```

```
    WritePage();
/* reset page number */
    (curraddr.page)--;
/* and rewind the temp file  */
    doslseek( fTemp, 0L, FROM_START );          /* position to start */

/* get the path of the object file */
    i = lstrlen( ObjectName );
    if ( (hBuf = GlobalAlloc(   GHND | GMEM_DDESHARE ,
                                MAKELONG((i+MAXEXT), 0) )) != NULL )  {
        if ( (pBuf = GlobalLock( hBuf )) == NULL )  {
            GlobalFree( hBuf );
            SetErrMsg( IDS_GMEM );
            return( FALSE );
            }
        else
            lstrcpy( pBuf, ObjectName );
        }
    else {
        SetErrMsg( IDS_GMEM );
        return( FALSE );
        }

    LoadString( hLibInst, IDS_PCODEEXT, pBuf + i, MAXEXT );
/* and open it */
    if ( (fObject = loOpen( pBuf, O_CREATE|O_WRITE ))
                == NO_HANDLE )  {
        SetErrMsg( IDS_FERR);
        }
    GlobalUnlock( hBuf );
    GlobalFree( hBuf );
    return( (fObject == NO_HANDLE) ? FALSE : TRUE );
}  /* InitPass2 */
```

```
/***********************************************************************
*                                                                      *
*       WriteHeader - writes the header record in the object file      *
*                                                                      *
*       input:  none                                                   *
*       output: header record written, gErrorInfo updated if error     *
*       return: TRUE if success else FALSE                             *
*                                                                      *
*       NOTE:   uses global buffer gTempBuf                            *
*                                                                      *
************************************************************************
*                                                                      *
*       03/18/87 bp - created                                          *
*                                                                      *
***********************************************************************/
BOOL WriteHeader()
{
    AG_HEADER *header;

/* setup and initialization */
    header = (AG_HEADER *)gTempBuf;
    memset( gTempBuf, '\0', AG_HEADERSIZE );
    if (numvariables) numvariables++;   /* 1st variable is index 1 */

/* load version id */
    LoadString( hLibInst, IDS_VERSID, (LPSTR)tfilename, RECSIZE );
    strcpy( header->versionid, tfilename );
/* and the rest of the stuff; NOTE overwriting of version id '\0' */
    header->pagesize = PAGESIZE;
    header->numpages = curraddr.page;
    header->numvariables = numvariables;
    header->numwindows = next_window;
    header->numclasses = next_classid + 1;
    header->arraysize = arraysize;
    header->lnumtablelen = glinenumber;
    header->vartablelen = numvariables;

/* and write it */
    return( lowrite( fObject, (LPSTR)header, AG_HEADERSIZE ) );
}  /* WriteHeader */
```

```
/************************************************************************
*                                                                       *
*       WriteCode - copy the Pcodes from the temp file to the object    *
*               and fix up the label references                         *
*                                                                       *
*       input:  none                                                    *
*       output: code records are written to fObject, gErrorInfo is      *
*               updated if error.                                       *
*       return: TRUE if successful else FALSE                           *
*                                                                       *
*************************************************************************
*                                                                       *
*       03/18/87 bp - created                                           *
*                                                                       *
************************************************************************/
BOOL WriteCode()
{
    int i, len, numpages;
    char *pcodeptr;

    numpages = curraddr.page;

    for ( i=0; i < numpages; i++ )  {
    /* read the buffer */
        if ( !fillbuf( fTemp ) )  {
            SetErrMsg( IDS_FERR );
            return( FALSE );
            }
        pcodeptr = gBufPtr;

    /* and process the records */
        while ( len = *(int *)pcodeptr )  {
            if ( len < 0 ) {
                fixuplabel( pcodeptr );
                len = -len;
                }
            pcodeptr += len;
            }

    /* write buffer to the object file */
        if ( !lpWrite(fObject, (LPSTR)gBufPtr, PAGESIZE) )
            return( FALSE );
        }  /* for loop */
    return( TRUE );
}  /* WriteCode */
```

```
/************************************************************************
*                                                                       *
*       fixuplabel - fixup address field of pcode instruction with      *
*               correct label address                                   *
*       input:  pointer to pcode instruction                            *
*       output: instruction is fixed up                                 *
*       return: none                                                    *
*                                                                       *
*************************************************************************
*                                                                       *
*       03/18/87 bp - created                                           *
*       07/18/87 bp - modified for RESTORE statement                    *
*       02/04/88 bp - remove RESTORE statement                          *
*                                                                       *
************************************************************************/
fixuplabel( pcode )
AG_PCODES *pcode;
{
    LABEL *labelptr;
    AG_ADDRESS *addr;
    int idnum;

    idnum = pcode->idnum;
    addr = (AG_ADDRESS *)(pcode->parms);

    switch ( idnum )  {
case AG_ON_GO_PCODE:
        addr = (AG_ADDRESS *)((pcode->parms) + sizeof(int));
default:
        labelptr = GetLabelEntry( addr->offset );
        addr->offset = labelptr->address.offset;
        addr->page = labelptr->address.page;
        } /* end switch */

    pcode->length = -pcode->length;
}  /* fixuplabel */
```

```
/****************************************************************************
*
*       WriteTables - writes the debug tables to the object file
*
*       input:  none
*       output: debug tables, gErrorInfo updated if write error
*       return: TRUE if successful else FALSE
*
*****************************************************************************
*
*       03/17/87 bp - created
*
****************************************************************************/
WriteTables()
{
}  /* WriteTables */
```

```
#S3771; #O9317 * BARBARA.PF; LP602 * TUE, MAY 17, 1988, 6:17 AM
#S3771; #O9317 * BARBARA.PF; LP602 * TUE, MAY 17, 1988, 6:17 AM
#S3771; #O9317 * BARBARA.PF; LP602 * TUE, MAY 17, 1988, 6:17 AM

#S3771; #O9317 * BARBARA.PF; LP602 * TUE, MAY 17, 1988, 6:17 AM
#S3771; #O9317 * BARBARA.PF; LP602 * TUE, MAY 17, 1988, 6:17 AM
#S3771; #O9317 * BARBARA.PF; LP602 * TUE, MAY 17, 1988, 6:17 AM

#S3771; #O9317 * BARBARA.PF; LP602 * TUE, MAY 17, 1988, 6:17 AM
#S3771; #O9317 * BARBARA.PF; LP602 * TUE, MAY 17, 1988, 6:17 AM
#S3771; #O9317 * BARBARA.PF; LP602 * TUE, MAY 17, 1988, 6:17 AM

#S3771; #O9317 * BARBARA.PF; LP602 * TUE, MAY 17, 1988, 6:17 AM
#S3771; #O9317 * BARBARA.PF; LP602 * TUE, MAY 17, 1988, 6:17 AM
#S3771; #O9317 * BARBARA.PF; LP602 * TUE, MAY 17, 1988, 6:17 AM
```

```
#S3771; #O9318 * BARBARA.PF; LP602 * TUE, MAY 17, 1988, 6:18 AM
#S3771; #O9318 * BARBARA.PF; LP602 * TUE, MAY 17, 1988, 6:18 AM
#S3771; #O9318 * BARBARA.PF; LP602 * TUE, MAY 17, 1988, 6:18 AM

#S3771; #O9318 * BARBARA.PF; LP602 * TUE, MAY 17, 1988, 6:18 AM
#S3771; #O9318 * BARBARA.PF; LP602 * TUE, MAY 17, 1988, 6:18 AM
#S3771; #O9318 * BARBARA.PF; LP602 * TUE, MAY 17, 1988, 6:18 AM

#S3771; #O9318 * BARBARA.PF; LP602 * TUE, MAY 17, 1988, 6:18 AM
#S3771; #O9318 * BARBARA.PF; LP602 * TUE, MAY 17, 1988, 6:18 AM
#S3771; #O9318 * BARBARA.PF; LP602 * TUE, MAY 17, 1988, 6:18 AM

#S3771; #O9318 * BARBARA.PF; LP602 * TUE, MAY 17, 1988, 6:18 AM
#S3771; #O9318 * BARBARA.PF; LP602 * TUE, MAY 17, 1988, 6:18 AM
#S3771; #O9318 * BARBARA.PF; LP602 * TUE, MAY 17, 1988, 6:18 AM
```

```
/*
 * Created by CSD YACC (IBM PC) from "hoagptmp.Y" */

# line 96

#define UNION 1
typedef union   {
    int  ival;
    long lval;
        } YYSTYPE;
# define AND_ 201
# define OR_ 202
# define NOT_ 203
# define CBT_ 204
# define ABORTRETRYIGNORE_ 205
# define ALT_ 206
# define AT_ 207
# define BEEP_ 208
# define CLASSFOCUS_ 209
# define CLEARWINDOW_ 210
# define CLOSEWINDOW_ 211
# define COM1_ 212
# define COMMAND_ 213
# define CTRL_ 214
# define DEFAULT_ 215
# define DEFINEWINDOW_ 216
# define DO_ 217
# define EDITBOX_ 218
# define ELSE_ 219
# define END_ 220
# define ENDIF_ 221
# define ENDPROC_ 222
# define ENDTASK_ 223
# define ENDWHILE_ 224
# define ERROR_ 225
# define ESCAPE_ 226
# define EXCLAMATION_POINT_ 227
# define EXECUTE_ 228
# define FOCUS_ 229
# define GOTO_ 230
# define HAND_ 231
# define IF_ 232
# define IGNORE_ 233
# define INPUT_ 234
# define LABEL_ 235
# define LENGTH_ 236
# define LOCATE_ 237
# define MESSAGE_ 238
# define OFF_ 239
# define OK_ 240
# define OKCANCEL_ 241
# define ON_ 242
# define OPENWINDOW_ 243
# define OUTPUT_ 244
# define PAUSE_ 245
# define PCODE_ 246
# define PCOMMAND_ 247
# define POPUP_ 248
# define PROCEDURE_ 249
# define PUSHBUTTON_ 250
# define QUESTION_ 251
# define RATE_ 252
# define RETRYCANCEL_ 253
# define RETURN_ 254
# define SCREEN_ 255
# define SET_ 256
# define TASK_ 257
# define TITLEWINDOW_ 258
# define TIMEOUT_ 259
# define TO_ 260
# define USER_ 261
# define WAIT_ 262
# define WHILE_ 263
# define YESNO_ 264
# define YESNOCANCEL_ 265
# define USER_VAR 500
# define USER_ARRAY 510
# define USER_LABEL 520
# define DATA_LABEL 525
# define USER_WINDOW 530
# define CLASS_SYMBOL 540
# define SYS_VAR 560
# define INT_L 400
# define PNT_L 405
# define REAL_L 410
# define RGN_L 415
# define STR_L 420
# define STACK_L 430
# define ANY_EXP 440
# define NUM_EXP 441
# define STR_EXP 442
# define RGN_EXP 443
# define PNT_EXP 444
# define LOG_EXP 445
# define NO_EXP 450
# define USER_SYMBOL 600
# define LINE_END 700
#define yyclearin yychar = -1
#define yyerrok yyerrflag = 0
#ifndef YYMAXDEPTH
#define YYMAXDEPTH 150
#endif
extern YYSTYPE yylval;  /*CSD & DECUS LEX */
YYSTYPE yyval;          /*CSD & DECUS LEX */
# define YYERRCODE 256

#line 987

#define NOCOMM
#include "windows.h"
#include "wcmd.h"
#include "dostall.h"
#include "errface.h"

#ifndef HAVE_APICMDSTRUCT
typedef struct
  {
    WORD len;
    WORD cmd;
    char parms[128];
```

```
   )
APICMOSTRUCT;
#define HAVE_APICMOSTRUCT
#endif

#include "nwapi.h"
#include "hoeg.h"
#include "hoegpext.h"

#define yyunion(i,j)     memcpy( i, j, sizeof(YYSTYPE) )
#define MAX_USERBUTTONS 3

static int i;
static long ButtonText[MAX_USERBUTTONS+1];
static int  defvar;
static int  flag;
short yyexca[] =(
-1, 1,
        0, -1,
        -2, 0,
-1, 148,
        700, 222,
        -2, 211,
-1, 154,
        59, 219,
        -2, 224,
        );
# define YYNPROD 226
# define YYLAST 774
short yyact[]=(

  45,  76,  46,  72,  47, 209, 178,  79,  48,  49,
  50, 246,  51, 247,  83,  82,  77, 226, 225, 210,
  52,  75,  54, 207,  55,  56,  57,  58, 188,  59,
  60, 167, 165, 158,  61,  73,  62,  63,  64,  65,
 140, 137,  66, 132, 131, 130,  67,  68,  69, 128,
  74, 182, 198, 181,  70,  71,  45,  76,  46,  72,
  47,  98,  94, 284,  48,  49,  50, 136,  51, 300,
 134, 285, 163, 138, 303, 144,  52,  75,  54, 281,
  55,  56,  57,  58, 250,  59,  60, 282, 302, 288,
  61,  73,  62,  63,  64,  65, 301, 287,  66, 278,
 154, 204,  67,  68,  69, 299,  74, 279, 274, 205,
  70,  71,  45,  76,  46,  72,  47, 201, 212, 154,
  48,  49,  50, 187,  51, 314, 202, 194, 266, 313,
 292, 186,  52,  75,  54, 169,  55,  56,  57,  58,
 267,  59,  60, 170, 154, 261,  61,  73,  62,  63,
  64,  65, 148, 244,  66, 144, 178, 154,  67,  68,
  69, 215,  74, 129, 142, 276,  70,  71,  45,  76,
 ·46,  72,  47, 271, 243, 229,  48,  49,  50, 220,
  51, 211, 175, 157, 155, 126, 107, 108,  52,  75,
  54, 283,  55,  56,  57,  58, 280,  59,  60,  10,
 230,   8,  61,  73,  62,  63,  64,  65,  81, 148,
  66,   4, 241,·223,  67,  68,  69, 222,  74, 124,
 218, 231,  70,  71,  45,  76,  46,  72,  47, 143,
 309, 146,  48,  49,  50, 180,  51, 224, 159,   9,
 256, 310, 297, 275,  52,  75,  54, 295,  55,  56,
  57,  58, 103,  59,  60, 296, 242, 289,  61,  73,
  62,  63,  64,  65, 104, 101,  66, 298, 153, 152,
  67,  68,  69, 172,  74, 253, 254, 185,  70,  71,
 100,  45,  76,  46,  72,  47,   5,  84, 255,  48,

  49,  50,  44,  51, 193, 227, 259, 197, 102, 257,
 258,  52,  75,  54, 236,  55,  56,  57,  58, 151,
  59,  60, 237, 103, 150,  61,  73,  62,  63,  64,
  65,   7, 260,  66, 173, 104, 113,  67,  68,  69,
  80,  74, 192, 147, 105,  70,  71, 233, 239, 168,
 119, 118, 117, 305, 304, 307, 306, 294,  44, 265,
 111, 264, 114, 277, 263, 234, 262, 182, 235, 115,
 161, 199, 110, 106, 191, 120, 291, 272, 135, 145,
  97, 189, 219,  81,  96,  95, 248, 139, 206, 116,
 270, 245, 184,  93,  92, 183, 216, 214, 133,  91,
  53, 308, 293, 228, 109, 289, 213,  90,  39, 268,
 180,  88,  87,  86,  44, 179,  85, 125, 238,  43,
  42,  41,  40,  39,  38,  37,  81,  36,  35,  34,
  33, 196, 195, 190,  32,  31,  30,  29,  28,  27,
  26,  25,  24,  23,  22,  21,  20,  19,  81,  18,
  17,  16,  15,  14,  13,  11, 174, 208, 177, 251,
 123, 171, 122, 121,   6,   3,  78,   2,   1, 252,
  44, 221, 217, 249, 196, 195, 286, 232, 203, 200,
 273, 112, 290,  99, 166, 164, 141, 158, 240, 127,
   0,   0,   0,   0,   0,   0,   0,   0,   0,   0,
  81,   0,  12,   0,   0,   0,   0, 312,   0,   0,
   0, 311,   0,   0,   0,   0,   0,   0,   0,   0,
   0,   0,   0,   0,   0,   0,  44,   0,   0,   0,
   0,   0,   0,   0,   0,   0,   0,   0,   0,   0,
   0,   0,   0,   0,   0,   0,   0,   0,   0,   0,
   0,   0,   0,   0,   0,   0,   0,   0,  12,   0,
   0,   0,   0,   0,   0,   0,   0,   0,   0,   0,
   0,   0,   0,   0,   0,   0,   0,   0,   0,   0,
   0,   0,   0,  44,   0,   0,   0,   0,   0,   0,
   0,   0,   0,   0,   0,   0,   0,   0,   0,   0,
   0,   0,   0,   0,   0,   0,   0,   0,   0,   0,
   0,   0,   0,   0,  12,   0,   0,   0,   0,   0,
   0,   0,   0,   0,   0,   0,   0,   0,   0,   0,
   0,   0,   0,   0,   0,   0,   0,   0,   0,   0,
   0,   0,   0,   0,   0,   0,   0,   0,   0,   0,
   0,   0,   0,   0,   0,   0,   0,   0,   0,   0,
   0,   0,   0,   0,   0,   0,   0,   0,   0,   0,
  12,   0,   0,   0,   0,   0,   0,   0,   0,   0,
   0,   0,   0,   0,   0,   0,   0,   0,   0,   0,
   0,   0,   0,   0,   0,   0,   0,   0,   0,   0,
   0,   0,   0,   0,   0,   0,   0,   0,   0,   0,
   0,   0,   0,   0,   0,   0,   0,   0,   0,   0,
   0,   0,   0,   0,   0,   0,  12,   0,   0,   0,
   0,   0,   0,   0,   0,   0,   0,   0,   0,   0,
   0,   0,   0,   0,   0,   0,   0,   0,   0,   0,
   0,   0,   0,   0,   0,   0,   0,   0,   0,   0,
   0,   0,   0,   0,   0,   0,   0,   0,   0,   0,
   0,   0,   0,   0,   0,   0,   0,   0,   0,   0,
   0,   0,   0,  12 );
short yypact[]=(

  -46,-1000,-1000,  15,-574,-693,-1000,-1000,  15,-585,
-1000,-555,-1000,-1000,-1000,-1000,-1000,-1000,-1000,-1000,
-1000,-1000,-1000,-1000,-1000,-1000,-1000,-1000,-1000,-1000,
-1000,-1000,-1000,-1000,-1000,-1000,-1000,-1000,-1000,-1000,
-1000,-1000,-1000,-1000, 225,-1000,-1000,-1000,-1000,-1000,
-1000,-1000,-1000,-1000,-1000,-1000,-1000,-433,-1000,-1000,
-433,  39,-1000,-1000,-234,-213,-1000,-1000,-1000, 100,
-1000,-1000,-1000,-1000,-1000,-1000,-1000,-1000, -30,-1000,
-1000,-1000,-1000,-1000,-1000,-256,-551,-279,-555,-556,
```

```
-557,-172,-559,-372,-1000,-560,-286,-1000,-1000,  14,
-1000,-1000,-1000,-1000,-1000,-298,-257,-1000,-1000,-567,
-258,  -6,-1000,-1000,-1000,-1000,-373,-568,-569,-307,
-693,-1000, -40,-594,-1000,-284,-1000,-1000,-1000,-1000,
-1000,-1000,-447,-1000,-489,-1000,-1000,-1000,-1000,-319,
-1000,-1000,-572,-1000,-1000,-319,-1000,-1000, 235,-1000,
-1000,-1000,-323,-1000,-1000,-1000,-448,-1000,-1000,-1000,
-1000,-324,-341,-1000,-1000,-1000,-1000,-1000,-1000,-1000,
-577,-1000,-1000, -40,-695,-1000,-1000,-581,-1000,-260,
-325,-1000,-1000,-281,  73, -16,-1000,-1000,-1000,-262,
 -14,-582,-583,-1000,-1000,-285,-1000, 236,-1000,-266,
-1000,-1000, -39,-1000,-1000,  98,  73,-1000,-1000,-1000,
-1000,-1000,   8,-267,-289,-1000,-208,-1000,-1000,-366,
-1000,  35,-1000,-1000,-1000,-1000,-1000,-1000,-297,-1000,
-1000,-1000,-1000,-1000,-1000,-1000,-1000,-1000, -96,-302,
-1000,-1000,-1000,  50,-1000,-1000,-1000,-1000,-268,-1000,
-1000,-1000,-1000,-1000,-1000,-1000,-1000,-1000,-1000,-1000,
-342,  38,-276,-343,-363,-379,-1000,-1000,-353,-1000,
  73,-1000,-312,-1000, 235,-1000,-1000,-1000,-1000,  41,
-1000,-1000,  28,-1000,-1000,  61,-1000,-1000,-1000,-339,
-152,-354,-1000,-370,-1000,-1000,-1000,-1000,-1000,-1000,
-1000,-1000,-1000,  15,-363,-379,-313,-317,-1000,-1000,
-1000,-1000,-1000,-1000,-1000 };
short yypgo[]={

   0, 479, 478, 477, 476, 475, 474, 473, 280, 471,
 469, 468, 467, 466, 463, 229, 277, 462, 461, 459,
 458, 457, 288, 456, 455, 454, 321, 201, 453, 452,
 451, 273, 450, 448, 446, 199, 445, 444, 443, 442,
 441, 440, 439, 437, 436, 435, 434, 433, 432, 431,
 430, 429, 428, 427, 426, 425, 424, 420, 419, 418,
 417, 415, 414, 413, 412, 411, 410, 409, 407, 406,
 405, 403, 402, 401, 400, 399, 398, 397, 396, 395,
 394, 393, 392, 391, 390, 389, 388, 387, 385, 384,
 383, 382, 381, 380, 379, 378, 377, 376, 375, 374,
 372, 371, 370, 369, 367, 366, 364, 363, 362, 361,
 360, 357, 356, 355, 354, 353, 351, 196, 349, 191,
 347, 346, 345, 344, 343, 342, 341, 340, 339, 338,
 334, 333, 332, 322, 209, 314, 309, 269, 297, 268 };
short yyr1[]={

   0,  20,  21,  24,  25,  25,  26,  23,  23,  28,
  30,  30,  29,  22,  22,  33,  32,  31,  34,  27,
  27,  35,  35,  36,  36,  36,  38,  36,  36,  36,
  36,  36,  36,  36,  36,  36,  36,  36,  36,  38,
  36,  38,  36,  36,  36,  36,  36,  36,  36,  36,
  38,  36,  36,  36,  68,  37,  69,  70,  38,  71,
  39,   1,   1,  72,  40,  73,  74,  75,  41,   2,
   2,  13,  13,  76,  42,  77,  78,  79,  43,  80,
  81,  82,  59,  83,  83,  83,  44,  45,  85,  46,
  84,  84,  87,  86,  88,  86,  86,  89,  47,  90,
  91,  48,  93,  92,  92,  94,  95,  64,  49,  96,
  50,  16,  16,  17,  97,  17,  98,  51,  99,  52,
   4,   4, 100,   4,  14,  14, 101,  15,  53, 103,
 102,  18,  18,  18,  18,  19,  19,  19,  18,  19,
  19, 104,  19, 105, 105, 106,  54,   7,   7,   7,
   9,   9,   8,   8,  57,  58, 107,  56,  60, 108,
 109,  61,  62, 110,  62, 111,  62,  10,  10, 112,
  10,  11,  11,  12,  12, 114, 113, 116, 113, 118,
 113, 115, 115, 117, 121, 117, 119, 122, 119, 123,
 120, 124, 120,   3,   3,  63, 125,  65,   5,   5,
 126,  66,   6,   6, 127,  67, 128, 129, 128, 130,
  55, 132, 133, 131, 131, 134, 134, 135, 135, 136,
 137, 137, 136, 138, 139, 139 };
short yyr2[]={

   0,   4,   2,   2,   1,   2,   2,   0,   2,   2,
   1,   2,   2,   0,   2,   0,   3,   2,   1,   1,
   2,   2,   1,   1,   1,   1,   1,   1,   1,   1,
   1,   1,   1,   1,   1,   1,   1,   1,   1,   1,
   1,   1,   1,   1,   1,   1,   1,   1,   1,   1,
   1,   1,   1,   1,   0,   4,   0,   0,   5,   0,
   3,   0,   1,   0,   3,   0,   0,   0,   8,   1,
   1,   1,   1,   0,   3,   0,   0,   0,   9,   0,
   0,   0,  10,   0,   1,   1,   1,   1,   0,   3,
   1,   1,   0,   4,   0,   3,   1,   0,   3,   0,
   0,   6,   0,   4,   1,   0,   0,   6,   1,   0,
   5,   1,   1,   0,   0,   3,   0,   3,   0,   3,
   1,   1,   0,   4,   1,   1,   0,   3,   2,   0,
   5,   0,   1,   1,   1,   1,   1,   1,   1,   1,
   1,   0,   4,   1,   2,   0,   5,   1,   1,   1,
   1,   1,   1,   1,   2,   2,   0,   3,   1,   0,
   0,   5,   3,   0,   4,   0,   4,   1,   2,   0,
   4,   1,   2,   1,   1,   0,   3,   0,   3,   0,
   3,   1,   2,   1,   0,   4,   1,   0,   4,   0,
   3,   0,   3,   1,   1,   1,   0,   3,   0,   1,
   0,   3,   0,   1,   0,   3,   1,   0,   4,   0,
   3,   0,   0,   5,   1,   1,   1,   2,   2,   0,
   3,   2,   1,   1,   1,   2 };
short yychk[]={

-1000, -20, -21, -24, 257, -22, -25, -26, -27, 223,
 -35, -36, 700, -37, -38, -39, -40, -41, -42, -43,
 -44, -45, -46, -47, -48, -49, -50, -51, -52, -53,
 -54, -55, -56, -57, -58, -59, -60, -61, -62, -63,
 -64, -65, -66, -67, 500, 208, 210, 212, 216, 217,
 218, 220, 228, -84, 230, 232, 233, 234, 235, 237,
 238, 242, 244, 245, 246, 247, 250, 254, 255, 256,
 262, 263, 211, 243, 258, 229, 209, 700, -23, 700,
 -26, -35, 700, 700,  51, -69, -71, -72, -73, -76,
 -77, -85, -39, -90, 500, -98, -99,-102, 500,  -7,
  -9, 226, 259, 213, 225,-130,-107, 420, 400, -80,
-108,  -8,  -9, 226, 252, 259, -94,-125,-126,-127,
 -22, -28, -29, -32, 249, -68, 441,  -1, 600, 442,
 600, 600, 600, -86, 242, 540, 239, 500, 445, -96,
 600,  -4, 450, -15, 441,-103, 217,-131, 450,-134,
-135,-136,-137,-139, 442, 441, 500, 441,  -3, 242,
 239,-110,-111, 445,  -5, 600,  -6, 600,-123, 442,
 450, -30, -31, [illegible], -34, [illegible], [illegible], [illegible], 440, [illegible],
 -74, 500, 540, -33, -91, [illegible], 450, 442, [illegible], [illegible],
 -15,-106,-132,  53, 450, [illegible], [illegible], [illegible], [illegible], [illegible],
 -13, 441, 450, [illegible], 442, 450, -95, [illegible], [illegible], [illegible],
 500, 441, 443, [illegible], -37, 442, [illegible], [illegible], 226, [illegible],
 441, -19, [illegible], [illegible], 251, 600, [illegible], 99, [illegible], 441,
 233, 250, [illegible], [illegible],-113, 260, [illegible], [illegible], [illegible], [illegible],
  -1, 204, 248, 441, 442, -92, [illegible], [illegible], -97, -14,
 450, -15, -13, 240, 241, 253, [illegible], 254, 265, 261,
-133, 442,-112,-114,-116,-118, 124, 442, [illegible], 107,
 -93, 441,-104,-134, 450, 207, 441,-115, 442, 450,
-117, 442, 450,-119, 442, 450, -13, 450, 442, -79,
```

```
-27,-105, 442, -82,-120, 208, 214, 214, 208, 444,
221, 450, 442, 444,-123,-124,-121,-122, -83, 215,
226,-117,-119, 442, 442 };
short yydef[]={

   0,  -2,  13,   0,   0,   7,   2,   4,   0,   0,
  19,   0,  22,  23,  24,  25,  26,  27,  28,  29,
  30,  31,  32,  33,  34,  35,  36,  37,  38,  39,
  40,  41,  42,  43,  44,  45,  46,  47,  48,  49,
  50,  51,  52,  53,   0,  56,  59,  63,  65,  73,
  75,  86,  87,  88,  97,  99, 108,   0, 116, 118,
   0,   0, 209, 156,   0,   0,  79, 158, 159,   0,
 195, 105, 196, 200, 204,  90,  91,   3,  13,  14,
   5,  20,   6,  21,  54,   0,  61,   0,   0,   0,
   0,   0,   0,   0, 109,   0,   0, 128, 129,   0,
 147, 148, 149, 152, 153,   0,   0, 154, 155,   0,
   0,   0, 163, 165, 150, 151,   0, 198, 202,   0,
   1,   8,   0,   0,  15,   0,  57,  60,  62,  64,
  66,  74,   0,  89,   0,  94,  96,  98, 100,   0,
 117, 119, 120, 121, 126,   0, 145, 210,  -2, 214,
 215, 216,   0, 223,  -2, 157,   0, 160, 162, 193,
 194,   0,   0, 106, 197, 199, 201, 203, 205, 206,
   0,   9,  10,   0,   0,  18,  12,   0,  55,   0,
   0,  76,  92,   0,   0, 113, 111, 112, 122,   0,
 131,   0,   0, 217, 218, 221, 225,   0,  80,   0,
 164, 167,   0, 166, 171,   0,   0, 207,  11,  17,
  16,  58,   0,   0,   0,  95,   0, 110, 114,   0,
 127,   0, 132, 133, 134, 146, 212, 220,   0, 181,
 168, 169, 172, 173, 174, 175, 177, 179,   0,   0,
  67,  69,  70,   0,  93, 101, 102, 104,   0, 123,
 124, 125, 130, 135, 136, 137, 138, 139, 140, 141,
   0,   0,   0,   0,   0,   0, 107, 208,   0,  77,
   0, 115,   0, 213, 222,  81, 170, 176, 161,   0,
 178, 183,   0, 180, 186,   0,  68,  71,  72,   0,
   0,   0, 143,   0, 182, 189, 191, 184, 187,  78,
 103, 142, 144,  83,   0,   0,   0,   0,  82,  84,
  85, 190, 192, 185, 188 };
# define YYFLAG -1000
# define YYERROR goto yyerrlab
# define YYACCEPT return(0)
# define YYABORT return(1)

/*      parser for yacc output  */

int yydebug = 0; /* 1 for debugging */
YYSTYPE yyv[YYMAXDEPTH]; /* where the values are stored */
int yychar = -1; /* current input token number */
int yynerrs = 0;  /* number of errors */
short yyerrflag = 0;  /* error recovery flag */

yyparse()
   {

   static   short yys[YYMAXDEPTH];
   static   short yyj, yym;
   register YYSTYPE *yypvt;
   register short yystate, *yyps, yyn;
   register YYSTYPE *yypv;
   register short *yyxi;

   yystate = 0;
   yychar = -1;
   yynerrs = 0;
   yyerrflag = 0;
   yyps= &yys[-1];
   yypv= &yyv[-1];

yystack:    /* put a state and value onto the stack */

   if( yydebug  ) printf( "state %d, char 0%o\n", yystate, yychar );
   if( ++yyps> &yys[YYMAXDEPTH] )
      {
      yyerror( "yacc stack overflow" );
      return(1);
      }
   *yyps = yystate;
   ++yypv;
#ifdef UNION
   yyunion(yypv, &yyval);
#else
   *yypv = yyval;
#endif
yynewstate:

   yyn = yypact[yystate];

   if( yyn<= YYFLAG ) goto yydefault; /* simple state */

   if( yychar<0 ) if( (yychar=yylex())<0 ) yychar=0;
   if( (yyn += yychar)<0 || yyn >= YYLAST ) goto yydefault;

   if( yychk[ yyn=yyact[ yyn ] ] == yychar )
      {
      /* valid shift */
      yychar = -1;
#ifdef UNION
         yyunion(&yyval, &yylval);
#else
      yyval = yylval;
#endif
      yystate = yyn;
      if( yyerrflag > 0 ) --yyerrflag;
      goto yystack;
      }
yydefault:
   /* default state action */

   if( (yyn=yydef[yystate]) == -2 )
      {
      if( yychar<0 ) if( (yychar=yylex())<0 ) yychar = 0;
      /* look through exception table */

      for( yyxi=yyexca; (*yyxi!= (-1)) || (yyxi[1]!=yystate) ; yyxi += 2 ) ; /* VOID */

      for(yyxi+=2; *yyxi >= 0; yyxi+=2)
         {
         if( *yyxi == yychar ) break;
         }
      if( (yyn = yyxi[1]) < 0 ) return(0);   /* accept */
      }
```

```
  if( yyn == 0 )
      {
      /* error */
      /* error ... attempt to resume parsing */

      switch( yyerrflag )
          {

      case 0:   /* brand new error */

          yyerror( "syntax error" );
yyerrlab:
          ++yynerrs;

      case 1:
      case 2: /* incompletely recovered error ... try again */

          yyerrflag = 3;

          /* find a state where "error" is a legal shift action */

          while ( yyps >= yys )
              {
              yyn = yypact[*yyps] + YYERRCODE;
              if( yyn>= 0 && yyn < YYLAST && yychk[yyact[yyn]] == YYERRCODE )
                  {
                  yystate = yyact[yyn];  /* simulate a shift of "error" */
                  goto yystack;
                  }
              yyn = yypact[*yyps];

              /* the current yyps has no shift onn "error", pop stack */

              if( yydebug ) printf( "error recovery pops state %d, uncovers %d\n", *yyps, yyps[-1] );
              --yyps;
              --yypv;
              }

          /* there is no state on the stack with an error shift ... abort */

yyabort:
          return(1);


      case 3:  /* no shift yet; clobber input char */
          if( yydebug ) printf( "error recovery discards char %d\n", yychar );

          if( yychar == 0 ) goto yyabort; /* don't discard EOF, quit */
          yychar = -1;
          goto yynewstate;   /* try again in the same state */

          }

      }

   /* reduction by production yyn */

   if( yydebug ) printf("reduce %d\n",yyn);
   yyps -= yyr2[yyn];
   yypvt = yypv;
   yypv -= yyr2[yyn];
#ifdef UNION
   yyunion(&yyval, &yypv[1]);
#else
   yyval = yypv[1];
#endif
   yym=yyn;
   /* consult goto table to find next state */
   yyn = yyr1[yyn];
   yyj = yypgo[yyn] + *yyps + 1;
   if( yyj>=YYLAST || yychk[ yystate = yyact[yyj] ] != -yyn ) yystate = yyact[yypgo[yyn]];
   switch(yym)
      {

case 6:
# line 132
{ OutputPCode( AG_END_PCODE, 0, 0L ); } break;
case 15:
# line 173
{ LabelFlag = TRUE; } break;
case 16:
# line 175
{ SetupLabel( yypvt[-0].ival ); } break;
case 18:
# line 187
{ OutputPCode( AG_RETURN_PCODE, 0, 0L ); } break;
case 21:
# line 202
{ CDcmdFlag = TRUE;
             gCurrErrnum = 0;  } break;
case 22:
# line 206
{ CDcmdFlag = TRUE;
             gCurrErrnum = 0;  } break;
case 54:
# line 280
{ MakeExpression( ANY_EXP ); } break;
case 55:
# line 282
{ AssignStmt( yypvt[-1].ival, yypvt[-0].ival ); } break;
case 56:
# line 289
{ MakeExpression( NUM_EXP ); } break;
case 57:
# line 291
{ MakeExpression( NUM_EXP ); } break;
case 58:
# line 293
{ OutputPCode2( AG_BEEP_PCODE, yypvt[-2].ival, yypvt[-0].ival ); } break;
case 59:
# line 300
{ LabelFlag = TRUE; } break;
case 60:
# line 302
{ OutputPCode( AG_WINDOWCLEAR_PCODE, yypvt[-0].ival, 0L ); } break;
case 61:
# line 309
{ yyval.ival = 0; } break;
case 63:
```

```
# line 318
{ MakeExpression( STR_EXP ); } break;
case 64:
# line 320
{ OutputPCode( AG_COM1_PCODE, 0, yypvt[-0].lval ); } break;
case 65:
# line 327
{ LabelFlag = TRUE; } break;
case 66:
# line 329
{ LabelFlag = FALSE;
            MakeExpression( AGN_EXP ); } break;
case 67:
# line 332
{ MakeExpression( STR_EXP ); } break;
case 68:
# line 334
{ DefineWindow( yypvt[-5].ival, yypvt[-2].ival, yypvt[-3].lval, yypvt[-0].lval ); } break;
case 69:
# line 341
{ yyval.ival = AG_CBT_WND; } break;
case 70:
# line 344
{ yyval.ival = AG_POP_WND; } break;
case 71:
# line 351
{ yyval.lval = 0L; } break;
case 72:
# line 354
{ yyval.lval = ((HIWORD(yypvt[-0].lval) != STR_L) || (LOWORD(yypvt[-0].lval))) ?
              yypvt[-0].lval :
              MAKELONG(-1, 0); } break;
case 73:
# line 363
{ LabelFlag = TRUE; } break;
case 74:
# line 365
{ GoToLabel( AG_DO_PCODE, yypvt[-0].ival, USER_LABEL ); } break;
case 75:
# line 372
{ LabelFlag = TRUE; } break;
case 76:
# line 374
{ LabelFlag = FALSE;
            MakeExpression( NUM_EXP ); } break;
case 77:
# line 377
{ MakeExpression( PNT_EXP ); } break;
case 78:
# line 379
{ UserControl( AG_EDITBOX_PCODE, yypvt[-6].ival, yypvt[-5].lval, yypvt[-3].lval, yypvt[-0].lval, FALSE ); } break;
case 79:
# line 386
{ LabelFlag = TRUE; } break;
case 80:
# line 388
{ LabelFlag = FALSE;
            MakeExpression( STR_EXP ); } break;
case 81:
# line 391
{ MakeExpression( PNT_EXP ); } break;
case 82:
# line 392
{ UserControl( AG_PUSHBUTTON_PCODE, yypvt[-7].ival, yypvt[-6].lval, yypvt[-4].lval, yypvt[-1].lval, defvar ); break;
case 83:
# line 398
{ defvar = 0; } break;
case 84:
# line 402
{ defvar = AG_DEFBUTTON; } break;
case 85:
# line 405
{ defvar = AG_ESCBUTTON; } break;
case 86:
# line 412
{ OutputPCode( AG_END_PCODE, 0, 0L ); } break;
case 87:
# line 419
{ OutputPCode( AG_EXECUTE_PCODE, 0, 0L ); } break;
case 88:
# line 428
{ gClassFlag = TRUE; } break;
case 92:
# line 440
{ gClassFlag = FALSE;
            MakeExpression( STR_EXP ); } break;
case 93:
# line 443
{ ObjectFocus( yypvt[-2].ival, yypvt[-0].lval ); } break;
case 94:
# line 446
{ gClassFlag = FALSE;
            MakeExpression( STR_EXP ); } break;
case 95:
# line 449
{ ObjectFocus( yypvt[-2].ival, yypvt[-0].lval ); } break;
case 96:
# line 452
{ ObjectFocus( NO_FOCUS, 0L ); } break;
case 97:
# line 458
{ LabelFlag = TRUE; } break;
case 98:
# line 460
{ GoToLabel( AG_JUMP_PCODE, yypvt[-0].ival, USER_LABEL ); } break;
case 99:
# line 467
{ MakeExpression( LOG_EXP ); } break;
case 100:
# line 469
{ JumpConditional( IF_SYMBOL ); } break;
case 102:
# line 475
{ FixupJump( ELSE_SYMBOL ); } break;
case 103:
# line 478
{ FixupJump( ENDIF_SYMBOL ); } break;
case 104:
# line 482
{ FixupJump( ENDIF_SYMBOL ); } break;
```

```
case 105:
# line 489
{ JumpConditional( WHILE_SYMBOL );
          MakeExpression( LOG_EXP ); } break;
case 106:
# line 492
{ JumpConditional( INWHILE_SYMBOL ); } break;
case 107:
# line 494
{ FixupJump( ENDWHILE_SYMBOL ); } break;
case 108:
# line 501
{ OutputPCode( AG_IGNORE_PCODE, 0, 0L ); } break;
case 109:
# line 508
{ MakeExpression( STR_EXP ); } break;
case 110:
# line 510
{ UserInput( AG_INPUT_PCODE, yypvt[-1].lval, yypvt[-0].lval, yypvt[-3].lval ); } break;
case 111:
# line 516
{ yyval.lval = 0L; } break;
case 112:
# line 519
{ yyval.lval = yypvt[-0].lval; } break;
case 113:
# line 525
{ yyval.lval = 0L; } break;
case 114:
# line 528
{ MakeExpression( NUM_EXP ); } break;
case 115:
# line 530
{ yyval.lval = yypvt[-0].lval; } break;
case 116:
# line 537
{ LabelFlag = TRUE; } break;
case 117:
# line 539
{ SetupLabel( yypvt[-0].ival ); } break;
case 118:
# line 546
{ LabelFlag = TRUE;
          MakeExpression( NUM_EXP ); } break;
case 120:
# line 554
{ OutputPCode( AG_LOCATE_PCODE, 0, 0L ); } break;
case 121:
# line 557
{ OutputPCode( AG_LOCATE_PCODE, 0, yypvt[-0].lval ); } break;
case 122:
# line 560
{ MakeExpression( NUM_EXP ); } break;
case 123:
# line 562
{ OutputPCode( AG_LOCATE_PCODE, yypvt[-2].ival, yypvt[-0].lval ); } break;
case 124:
# line 568
{ yyval.lval = 0L; } break;
case 126:
# line 576
{ MakeExpression( NUM_EXP ); } break;
case 127:
# line 578
{ yyval.lval = MakePoint( yypvt[-2].lval, yypvt[-0].lval ); } break;
case 129:
# line 590
{ MakeExpression( STR_EXP );
          ButtonText[I] = 0L;
          i = 0; } break;
case 130:
# line 594
{ UserInput(    AG_MESSAGE_PCODE, yypvt[-2].lval,
                MAKELONG( yypvt[-1].lval, yypvt[-0].lval),
                yypvt[-4].lval, ButtonText ); } break;
case 131:
# line 602
{ yyval.lval = 0; } break;
case 132:
# line 605
{ yyval.lval = MB_ICONHAND; } break;
case 133:
# line 608
{ yyval.lval = MB_ICONEXCLAMATION; } break;
case 134:
# line 611
{ yyval.lval = MB_ICONQUESTION; } break;
case 135:
# line 617
{ yyval.lval = MB_OK; } break;
case 136:
# line 620
{ yyval.lval = MB_OKCANCEL; } break;
case 137:
# line 623
{ yyval.lval = MB_RETRYCANCEL; } break;
case 138:
# line 626
{ yyval.lval = MB_ABORTRETRYIGNORE; } break;
case 139:
# line 629
{ yyval.lval = MB_YESNO; } break;
case 140:
# line 632
{ yyval.lval = MB_YESNOCANCEL; } break;
case 141:
# line 635
{ yyval.lval = AG_USERBUTTON;
          MakeExpression( STR_EXP ); } break;
case 142:
# line 638
{ ButtonText[i] = 0L; } break;
case 143:
# line 644
{ if ( i < MAX_USERBUTTONS
                ButtonText[i++] = yypvt[-0].lval;
          MakeExpression( STR_EXP ); } break;
case 144:
# line 649
{ if ( i < MAX_USERBUTTONS )
```

```
                ButtonText[i++] = yypvt[-0].lval;
          MakeExpression( STR_EXP ); } break;
case 145:
# line 658
{ LabelFlag = TRUE; } break;
case 146:
# line 660
{ OnOoPCode( yypvt[-3].ival, yypvt[-0].ival ); } break;
case 148:
# line 669
{ yyval.ival = AG_SYSESCAPE_ID; } break;
case 149:
# line 672
{ yyval.ival = AG_SYSTIMEOUT_ID; } break;
case 150:
# line 678
{ yyval.ival = defvar = AG_SYSRATE_ID; } break;
case 151:
# line 681
{ yyval.ival = defvar = AG_SYSTIMEOUT_ID; } break;
case 152:
# line 687
{ yyval.ival = AG_SYSCOMMAND_ID; } break;
case 153:
# line 690
{ yyval.ival = AG_SYSERROR_ID; } break;
case 154:
# line 696
{ SetPCode( yypvt[-0].lval ); } break;
case 155:
# line 703
{ SetPCommand( yypvt[-0].lval ); } break;
case 156:
# line 710
{ MakeExpression( NUM_EXP ); } break;
case 157:
# line 712
{ OutputPCode( AG_PAUSE_PCODE, 0, yypvt[-0].lval ); } break;
case 158:
# line 719
{ OutputPCode( AG_RETURN_PCODE, 0, 0L ); } break;
case 159:
# line 726
{ MakeExpression( NUM_EXP ); } break;
case 160:
# line 728
{ MakeExpression( NUM_EXP ); } break;
case 161:
# line 730
{ OutputPCode2( AG_SCREEN_PCODE, yypvt[-2].lval, yypvt[-0].lval ); } break;
case 162:
# line 737
{ OutputPCode( AG_SET_INTERRUPT_PCODE, yypvt[-1].ival, MAKELONG(yypvt[-0].ival, 0) ); } break;
case 163:
# line 740
{ MakeExpression( NUM_EXP ); } break;
case 164:
# line 742
{ OutputPCode( AG_SET_INTERRUPT_PCODE, yypvt[-2].ival, MAKELONG(yypvt[-0].ival, 0) ); } break;
case 165:
# line 745
{ flag = 0;
          MakeExpression( STR_EXP ); } break;
case 166:
# line 748
{ OutputPCode(  AG_SET_INTERRUPT_PCODE, AG_SYSESCAPE_ID,
                    MAKELONG(yypvt[-0].ival, 0) ); } break;
case 167:
# line 755
{ SetSysVarPcode( defvar, 0, yypvt[-0].lval );
          yyval.ival = TRUE; } break;
case 168:
# line 758
{ yyval.ival = FALSE; } break;
case 169:
# line 762
{ MakeExpression( NUM_EXP ); } break;
case 170:
# line 764
{ SetSysVarPcode( defvar, 0, yypvt[-0].lval );
          yyval.ival = TRUE; } break;
case 171:
# line 772
{ SetSysVarPcode( AG_SYSESCAPE_ID, 0, yypvt[-0].lval );
          yyval.ival = TRUE; } break;
case 172:
# line 776
{ yyval.ival = yypvt[-0].ival; } break;
case 173:
# line 782
{ yyval.ival = FALSE; } break;
case 174:
# line 785
{ yyval.ival = TRUE; } break;
case 175:
# line 791
{ MakeExpression( STR_EXP ); } break;
case 177:
# line 795
{ MakeExpression( STR_EXP );
          flag = flag | AG_ALTKEY; } break;
case 179:
# line 800
{ MakeExpression( STR_EXP );
          flag = flag | AG_CTRLKEY; } break;
case 181:
# line 808
{ SetSysvarPcode( AG_SYSESCAPE_ID, flag, yypvt[-0].lval ); } break;
case 183:
# line 816
{ SetSysvarPcode( AG_SYSESCAPE_ID, flag, yypvt[-0].lval ); } break;
case 184:
# line 819
{ MakeExpression( STR_EXP );
          flag = flag | AG_CTRLKEY; } break;
case 185:
# line 822
{ SetSysvarPcode( AG_SYSESCAPE_ID, flag, yypvt[-0].lval ); } break;
case 186:
# line 828
```

```
{ SetSysVarPcode( AG_SYSESCAPE_ID, flag, yypvt[-0].lval ); } break;
case 187:
# line 831
{ MakeExpression( STR_EXP );
            flag = flag | AG_ALTKEY; } break;
case 188:
# line 834
{ SetSysVarPcode( AG_SYSESCAPE_ID, flag, yypvt[-0].lval ); } break;
case 189:
# line 840
{ MakeExpression( STR_EXP );
            flag = flag | AG_ALTKEY; } break;
case 191:
# line 845
{ MakeExpression( STR_EXP );
            flag = flag | AG_CTRLKEY; } break;
case 193:
# line 854
{ yyval.ival = TRUE; } break;
case 194:
# line 857
{ yyval.ival = FALSE; } break;
case 195:
# line 864
{ OutputPCode( AG_WAIT_PCODE, 0, 0L ); } break;
case 196:
# line 871
{ LabelFlag = TRUE; } break;
case 197:
# line 873
{ OutputPCode( AG_WINDOWCLOSE_PCODE, yypvt[-0].ival, 0L ); } break;
case 198:
# line 880
{ yyval.ival = 0; } break;
case 200:
# line 889
{ LabelFlag = TRUE; } break;
case 201:
# line 891
{ OutputPCode( AG_WINDOWOPEN_PCODE, yypvt[-0].ival, 0L ); } break;
case 202:
# line 898
{ yyval.ival = 0; } break;
case 204:
# line 907
{ LabelFlag = TRUE;
            MakeExpression( STR_EXP ); } break;
case 206:
# line 915
{ OutputPCode( AG_WINDOWTITLE_PCODE, 0, yypvt[-0].lval ); } break;
case 207:
# line 918
{ MakeExpression( STR_EXP ); } break;
case 208:
# line 920
{ OutputPCode( AG_WINDOWTITLE_PCODE, yypvt[-2].ival, yypvt[-0].lval ); } break;
case 209:
# line 927
{ MakeExpression( STR_EXP ); } break;
case 211:
# line 934
{ LabelFlag = TRUE; } break;
case 212:
# line 936
{ OutputPCode( AG_LOCATE_PCODE, yypvt[-0].ival, 0L );
            LabelFlag = FALSE;
            MakeExpression( STR_EXP ); } break;
case 217:
# line 954
{  } break;
case 219:
# line 962
{ OutputPCode( AG_OUTPUT_PCODE, FALSE, yypvt[-0].lval ); } break;
case 220:
# line 964
{ MakeExpression( STR_EXP ); } break;
case 222:
# line 972
{ OutputPCode( AG_OUTPUT_PCODE, TRUE, 0L ); } break;
case 223:
# line 975
{ OutputPCode( AG_OUTPUT_PCODE, TRUE, 0L ); } break;
case 224:
# line 981
{ OutputPCode( AG_OUTPUT_PCODE, FALSE, yypvt[-0].lval ); } break;/* End of actions */
        }
    goto yystack;  /* stack new state and value */

    }
```

```
#S3771; #O9318 * BARBARA.PF; LP602 * TUE, MAY 17, 1988, 6:18 AM
#S3771; #O9318 * BARBARA.PF; LP602 * TUE, MAY 17, 1988, 6:18 AM
#S3771; #O9318 * BARBARA.PF; LP602 * TUE, MAY 17, 1988, 6:18 AM
```

```
#S3771; #O9318 * BARBARA.PF; LP602 * TUE, MAY 17, 1988, 6:18 AM
#S3771; #O9318 * BARBARA.PF; LP602 * TUE, MAY 17, 1988, 6:18 AM
#S3771; #O9318 * BARBARA.PF; LP602 * TUE, MAY 17, 1988, 6:18 AM
```

```
#S3771; #O9318 * BARBARA.PF; LP602 * TUE, MAY 17, 1988, 6:18 AM
#S3771; #O9318 * BARBARA.PF; LP602 * TUE, MAY 17, 1988, 6:18 AM
#S3771; #O9318 * BARBARA.PF; LP602 * TUE, MAY 17, 1988, 6:18 AM
```

```
#S3771; #O9318 * BARBARA.PF; LP602 * TUE, MAY 17, 1988, 6:18 AM
#S3771; #O9318 * BARBARA.PF; LP602 * TUE, MAY 17, 1988, 6:18 AM
#S3771; #O9318 * BARBARA.PF; LP602 * TUE, MAY 17, 1988, 6:18 AM
```

```
#S3771; #09319 * BARBARA.PF; LP602 * TUE, MAY 17, 1988, 6:18 AM
#S3771; #09319 * BARBARA.PF; LP602 * TUE, MAY 17, 1988, 6:18 AM
#S3771; #09319 * BARBARA.PF; LP602 * TUE, MAY 17, 1988, 6:18 AM
```

```
#S3771; #09319 * BARBARA.PF; LP602 * TUE, MAY 17, 1988, 6:18 AM
#S3771; #09319 * BARBARA.PF; LP602 * TUE, MAY 17, 1988, 6:18 AM
#S3771; #09319 * BARBARA.PF; LP602 * TUE, MAY 17, 1988, 6:18 AM
```

```
#S3771; #09319 * BARBARA.PF; LP602 * TUE, MAY 17, 1988, 6:18 AM
#S3771; #09319 * BARBARA.PF; LP602 * TUE, MAY 17, 1988, 6:18 AM
#S3771; #09319 * BARBARA.PF; LP602 * TUE, MAY 17, 1988, 6:18 AM
```

```
#S3771; #09319 * BARBARA.PF; LP602 * TUE, MAY 17, 1988, 6:18 AM
#S3771; #09319 * BARBARA.PF; LP602 * TUE, MAY 17, 1988, 6:18 AM
#S3771; #09319 * BARBARA.PF; LP602 * TUE, MAY 17, 1988, 6:18 AM
```

```
/****************************************************************************
*                                                                           *
* HPAGPSEM.C - Source file for parser semantic routines                     *
*                                                                           *
*****************************************************************************
*                                                                           *
* Agent PCODES Compiler 'C' source file                                     *
* Ver X.09.01  12/15/87                                                     *
*                                                                           *
*                                                                           *
*                                                                           *
*                  COPYRIGHT HEWLETT PACKARD LIMITED                        *
*                               1986                                        *
*                        ALL RIGHTS RESERVED                                *
*                                                                           *
*                                                                           *
*                                                                           *
*****************************************************************************
*                                                                           *
*                                                                           *
*                          MODIFICATION LOG                                 *
*                                                                           *
*  03/20/87 bp - created                                                    *
*  04/28/87 bp - modified for X.06.00                                       *
*       12/15/87 bp - modified for new naming conventions                   *
*                                                                           *
*                                                                           *
****************************************************************************/
/****************************************************************************
*                                                                           *
*                                                                           *
*                                                                           *
*       input:                                                              *
*       output:                                                             *
*       return:                                                             *
*                                                                           *
*****************************************************************************
*                                                                           *
*       08/15/87 bp - created                                               *
*                                                                           *
****************************************************************************/
#define NOCOMM
#include "windows.h"
#include "nwomf.h"
#include "ctype.h"
#include "doscall.h"
#include "ctrace.h"

#include "hpagpor0.h"
#include "nwapi.h"
#include "hpag.h"
#include "hpagetrc.h"
#include "hpagpext.h"
```

```
/****************************************************************************
*                                                                           *
*       OutputPCode - general routine to output PCodes to the Object        *
*                 file                                                      *
*                                                                           *
*       input:  PCode id number                                             *
*               index1 is parameter information, PCode dependent            *
*               longindex2 is optional parameter information,               *
*               PCode dependent                                             *
*       output: instruction is written to object file buffer                *
*               uses global gTempBuf                                        *
*       return: none                                                        *
*                                                                           *
*****************************************************************************
*                                                                           *
*       03/20/87 bp - created                                               *
*       04/10/87 bp - add WINDOWTITLE                                       *
*       05/04/87 bp - change to long parameter                              *
*       05/15/87 bp - spun off OutputStackParms                             *
*       05/18/88 bp - modified to make stringtable global                   *
*                                                                           *
****************************************************************************/
void OutputPCode( PCode_id, index1, longindex2 )
int  PCode_id,
     index1;
long longindex2;
{
    AG_PCODES *pc_ptr;
    int *intptr;
    char *charptr;
    LPSTR pstr;
    long *longptr;
    double *dblptr;
    float *realptr;
    AG_ADDRESS *addr;
    POINT *pnt;
    int  index2, type2;
    BOOL stackflag = FALSE;
    int FAR *locptr;
    register int i;

    index2 = LOWORD( longindex2 );
    type2 = HIWORD( longindex2 );

    if ( (type2 == USER_VAR) || (type2 == STACK_L) )  {
        PutOnStack( longindex2 );
        OutputStackParms( PCode_id, index1, longindex2 );
        stackflag = TRUE;
        }

    pc_ptr = (AG_PCODES *)gTempBuf;
    pc_ptr->idnum = PCode_id;
    pc_ptr->length = AG_MIN_PCODE;
    charptr = pc_ptr->parms;
    intptr = (int *)charptr;

    switch ( PCode_id )  {

case AG_PAUSE_PCODE:
```

```
        pc_ptr->length += sizeof( int );
        *intptr = stackflag ? AG_INT_LIT : GetInt( index2 );
        break;

case AG_OUTPUT_PCODE:
case AG_COM1_PCODE:
/* index1 set means output carriage return */
        if ( stackflag )  {
            pc_ptr->length += sizeof( int );
            *intptr = AG_STR_LIT;
            }
        else  {
            *charptr = '\0';
            if (index2)
                lstrcpy( (LPSTR)charptr, GetStrLit( index2 ) );
                                        /* output carriage return */
            if ( index1 )
                strcat( charptr, CRLF );
            pc_ptr->length += strlen( charptr ) + 1;    /* term '\0' */
            } /* type is string literal */
        break;

case AG_WINDOWTITLE_PCODE:
case AG_LOCATE_PCODE:
        intptr++;
        if ( stackflag )  {
            pc_ptr->length += sizeof( int );
            *intptr = PCode_id == AG_WINDOWTITLE_PCODE ?
                                AG_STR_LIT : AG_POINT_LIT;
            } /* type is expression */
        else if ( PCode_id == AG_WINDOWTITLE_PCODE )  {
            charptr = (char *)(intptr);
            *charptr = '\0';
            if ( index2 )
                lstrcpy( (LPSTR)charptr, GetStrLit( index2 ) );
            pc_ptr->length += strlen( charptr ) + 1;    /* term '\0' */
            }
        else  {  /* PCode_id == AG_LOCATE_PCODE */
            if ( type2 )
                pnt = GetPoint( index2 );
            *intptr++ = type2 ? pnt->x : 0;
            *intptr++ = type2 ? pnt->y : 0;
            pc_ptr->length += 2*sizeof(int);
            }
        intptr = (int *)(pc_ptr->parms);

case AG_WINDOWOPEN_PCODE:
case AG_WINDOWCLOSE_PCODE:
case AG_WINDOWCLEAR_PCODE:
        pc_ptr->lengen += sizeof( int );
        if ( !index1 )
            *intptr = 0;
        else if ( !(*intptr = GetWindowNum( index1 )) )
            return;
        break;

case AG_ON_DO_PCODE:
/* index2 is Interrupt_id */
        pc_ptr->length += sizeof( int );
        *intptr++ = index2;
        charptr = (char *)intptr;

case AG_JUMP_PCODE:
case AG_JUMP_IF_PCODE:
case AG_JUMP_NOT_PCODE:
case AG_DO_PCODE:
        pc_ptr->length += sizeof( AG_ADDRESS );
        addr = &(GetLabelEntry( index1 )->address);
        memcpy( charptr, (char *)addr, sizeof(AG_ADDRESS));
        if ( !addr->page )                  /* label not yet defined */
            pc_ptr->length = -pc_ptr->length;
        break;

case AG_FOCUS_PCODE:
case AG_SETCLASS_PCODE:
        pc_ptr->length += sizeof( int );
        *intptr++ = index1;
        if ( stackflag )  {
            pc_ptr->length += sizeof( int );
            *intptr = AG_STR_LIT;
            }
        else  {
            charptr = (char *)(intptr);
            *charptr = '\0';
            pstr = PCode_id == AG_FOCUS_PCODE ?
                     GetStrLit( index2 ) : GetStringTable( index2 );
            lstrcpy( (LPSTR)charptr, pstr );
            pc_ptr->length += strlen( charptr ) + 1;    /* term '\0' */
            }
        break;

case AG_COMMANDINIT_PCODE:
case AG_SET_INTERRUPT_PCODE:
        pc_ptr->length += 2*sizeof( int );
        *intptr++ = index1;
        *intptr   = index2;
        break;

case AG_PUSH_PCODE:
case AG_POP_PCODE:
case AG_POP_SYSVAR_PCODE:
        pc_ptr->length += sizeof( int );
        *intptr = index1 ? GetVarNum( index1 ) : 0;
        break;

case AG_PUSH1_PCODE:
        pc_ptr->length += sizeof( int );
        *intptr++ = index1;

        switch (index1)  {
    case AG_STR_LIT:
            charptr = (char *)intptr;
            *charptr = '\0';
            lstrcpy( (LPSTR)charptr, GetStrLit( index2 ) );
            pc_ptr->length += strlen( charptr ) + 1;
            break;
    case AG_INT_LIT:
            *intptr = GetInt( index2 );
            pc_ptr->length += sizeof(int);
            break;
    case AG_[illegible]_LIT:
    case AG_POINT_LIT
```

```
            longptr = (long *)intptr;
            *longptr = GetLong( index2 );
            pc_ptr->length += sizeof(long);
            break;
    case AG_DOUBLE_LIT:
    case AG_REGION_LIT:
            dblptr = (double *)intptr;
            *dblptr = GetDouble( index2 );
            pc_ptr->length += sizeof(double);
            break;
    case AG_REAL_LIT:
            realptr = (float *)intptr;
            *realptr = GetReal( index2 );
            pc_ptr->length += sizeof(float);
            break;
    case AG_SYSVARIABLE:
            *intptr = GetVarNum( index2 );
            pc_ptr->length += sizeof(int);
            break;
            } /* inner switch */
        break;

case AG_STACK_PARMS_PCODE:
        pc_ptr->length += (index1 + 1)*sizeof( int );
        *intptr++ = index1;
        locptr = (int FAR *)longindex2;
        for ( i = 0; i < index1; i++ )
            *intptr++ = *locptr++;
        break;

case AG_TEST_PCODE:
        pc_ptr->length += sizeof( int );
        *intptr = index1;
        break;

default:
        break;
        } /* switch */
    WritePCode( pc_ptr );
}  /* OutputPCode */
```

```
/************************************************************************
*                                                                       *
*       OutputStackParms - routine to output PCodes to put command      *
*               parameters on the stack, e.g. variables or expressions  *
*                                                                       *
*       input:  PCode id number                                         *
*               index1 is parameter information, PCode dependent        *
*               longindex2 is optional parameter information,           *
*               PCode dependent                                         *
*       output: instruction is written to object file buffer            *
*               uses global gTempBuf                                    *
*       return: none                                                    *
*                                                                       *
*************************************************************************
*                                                                       *
*       05/15/87 bp - spun off from OutputPCode                         *
*                                                                       *
************************************************************************/
void OutputStackParms( PCode_id, index1, longindex2 )
int  PCode_id,
     index1;
long longindex2;
{
    int index2, type2;
    int numparms;
    int *locptr;

    index2 = LOWORD( longindex2 );
    type2 = HIWORD( longindex2 );
    locptr = (int *)tfilename;

    switch ( PCode_id )  {

case AG_DEFWINDOW_PCODE:
        numparms = index1;
        if ( index2 )
            *locptr++ = index2;
        *locptr = type2;
        locptr = (int *)tfilename;
        break;

case AG_FOCUS_PCODE:
case AG_WINDOWTITLE_PCODE:
case AG_LOCATE_PCODE:
        numparms = 1;
        *locptr = 2;
        break;

case AG_OUTPUT_PCODE:
/* index1 set means output carriage return */
        if (index1) {
            OutputPCode( AG_PUSHI_PCODE, AG_STR_LIT,
                    MAKELONG(FP_OFF(StrLit((LPSTR)CRLF )), 0) );
            OutputPCode( AG_ADD_PCODE, 0, 0L );
            }

default:
        numparms = 1;
        *locptr = 0;
```

```
        break;
        } /* switch */

    OutputPCode( AG_STACK_PARMS_PCODE, numparms, (LPINT)locptr );
} /* OutputStackParms */
```

```
/************************************************************************
*                                                                       *
*       OpPCode - general routine to output PCodes to evaluate          *
*               binary and unary expressions.  Result is left on the    *
*               stack.                                                  *
*                                                                       *
*       input:  opcode id number                                        *
*               term1, term2 are information on the expression operands *
*               HIWORD is operand type                                  *
*               loword is operand location                              *
*       output: instructions are written to object file buffer          *
*               uses global gTempBuf                                    *
*               error may be set if operands are incompatible           *
*       return: TRUE if success else FALSE                              *
*                                                                       *
*************************************************************************
*                                                                       *
*       05/26/87 bp - created                                           *
*       06/15/87 bp - cleanup                                           *
*                                                                       *
************************************************************************/
BOOL OpPCode( opcode_id, term1, term2 )
int  opcode_id;
long term1,
     term2;
{
    int pcode_id;
    BOOL exchangeflag;
    int index1, type1, index2, type2;

/* initialization and setup */
    index2 = LOWORD( term2 );
    type2 = HIWORD( term2 );
    index1 = LOWORD( term1 );
    type1 = HIWORD( term1 );

    if ( opcode_id != MINUS )  {
        PutOnStack( term2 );
        pcode_id = opcode_id;
        exchangeflag = !PutOnStack( term1 );
        }
    else  {
        PutOnStack( term1 );
        OutputPCode(    AG_PUSHI_PCODE, AG_INT_LIT,
                        MAKELONG(FindInt( 0L ), INT_L) );
        pcode_id = AG_SUB_PCODE;
        exchangeflag = FALSE;
        }

    if ( exchangeflag )
        OutputPCode( AG_EXCHANGE_PCODE, 0, 0L );

    OutputPCode( pcode_id, 0, 0L );
    return( TRUE );
} /* OpPCode */
```

```
/*****************************************************************
*                                                                *
*       RelOpPCode - general routine to output PCodes to evaluate *
*               relational expressions.  Result is left on the stack as *
*               a boolean value in an <ival>.                    *
*                                                                *
*       input:  opcode id number of the relational operator      *
*               term1, term2 are resultants of numeric expressions *
*               HIWORD is operand type                           *
*               loword is operand location                       *
*       output: instructions are written to object file buffer   *
*               uses global gTempBuf                             *
*               error may be set if operands are incompatible    *
*       return: TRUE if success else FALSE                       *
*                                                                *
******************************************************************
*                                                                *
*       06/15/87 bp - created                                    *
*                                                                *
*****************************************************************/
BOOL RelOpPCode( opcode_id, term1, term2 )
int  opcode_id;
long term1,
     term2;
{
/* output pcodes to find A - B */
    OpPCode( AG_SUB_PCODE, term1, term2 );

/* and compare */
    OutputPCode( AG_SET_SIGN_PCODE, 0, 0L);
    OutputPCode( AG_TEST_PCODE, opcode_id, 0L);

    return( TRUE );
}  /* RelOpPcode */
```

```
/*****************************************************************
*                                                                *
*       PutOnStack - emits pcodes to place a token on the stack  *
*               unless it is already there                       *
*       NOTE:   does no error checking for valid expression types *
*                                                                *
*       input:  value of the token                               *
*               low word is index into relevant table or type of *
*               expression                                       *
*               hi word is type of token                         *
*       output: pcodes are emitted if appropriate                *
*       return: TRUE if put on stack, FALSE if already there     *
*                                                                *
******************************************************************
*                                                                *
*       05/27/87 bp - created                                    *
*                                                                *
*****************************************************************/
PutOnStack( value )
long value;
{
    int type, index, pushtype;
    int pcode_id;

    type = HIWORD( value );
    index = LOWORD( value );

/* first check if already on stack */
    if ( type == STACK_L )
        return( FALSE );

    pcode_id =  AG_PUSHI_PCODE;

/* push it */
    switch ( type )  {

case STR_L:
        pushtype = AG_STR_LIT;
        break;

case INT_L:
        pushtype = (GetLong( index ) == (int)GetLong( index )) ?
            AG_INT_LIT :
            AG_LONG_LIT;
        break;

case REAL_L:
        pushtype = AG_DOUBLE_LIT;
        break;

case USER_VAR:
        pcode_id = AG_PUSH_PCODE;
        pushtype = index;
        value = 0L;
        break;

case SYS_VAR:
        pushtype = AG_SYSVARIABLE;
        break;
```

```
case PNT_L:
        pushtype = AG_POINT_LIT;
        break;

case RGN_L:
        pushtype = AG_REGION_LIT;
        break;
        }  /* switch */

/* generate the pcode */
    OutputPCode( pcode_id, pushtype, value );
    return( TRUE );
} /* PutOnStack */
```

```
#S3771; #O9319 * BARBARA.PF; LP602 * TUE, MAY 17, 1988, 6:18 AM
#S3771; #O9319 * BARBARA.PF; LP602 * TUE, MAY 17, 1988, 6:18 AM
#S3771; #O9319 * BARBARA.PF; LP602 * TUE, MAY 17, 1988, 6:18 AM

#S3771; #O9319 * BARBARA.PF; LP602 * TUE, MAY 17, 1988, 6:18 AM
#S3771; #O9319 * BARBARA.PF; LP602 * TUE, MAY 17, 1988, 6:18 AM
#S3771; #O9319 * BARBARA.PF; LP602 * TUE, MAY 17, 1988, 6:18 AM

#S3771; #O9319 * BARBARA.PF; LP602 * TUE, MAY 17, 1988, 6:18 AM
#S3771; #O9319 * BARBARA.PF; LP602 * TUE, MAY 17, 1988, 6:18 AM
#S3771; #O9319 * BARBARA.PF; LP602 * TUE, MAY 17, 1988, 6:18 AM

#S3771; #O9319 * BARBARA.PF; LP602 * TUE, MAY 17, 1988, 6:18 AM
#S3771; #O9319 * BARBARA.PF; LP602 * TUE, MAY 17, 1988, 6:18 AM
#S3771; #O9319 * BARBARA.PF; LP602 * TUE, MAY 17, 1988, 6:18 AM
```

```
#S3771; #O9321 * BARBARA.PF; LP602 * TUE, MAY 17, 1988, 6:18 AM
#S3771; #O9321 * BARBARA.PF; LP602 * TUE, MAY 17, 1988, 6:18 AM
#S3771; #O9321 * BARBARA.PF; LP602 * TUE, MAY 17, 1988, 6:18 AM
```

```
#S3771; #O9321 * BARBARA.PF; LP602 * TUE, MAY 17, 1988, 6:18 AM
#S3771; #O9321 * BARBARA.PF; LP602 * TUE, MAY 17, 1988, 6:18 AM
#S3771; #O9321 * BARBARA.PF; LP602 * TUE, MAY 17, 1988, 6:18 AM
```

```
#S3771; #O9321 * BARBARA.PF; LP602 * TUE, MAY 17, 1988, 6:18 AM
#S3771; #O9321 * BARBARA.PF; LP602 * TUE, MAY 17, 1988, 6:18 AM
#S3771; #O9321 * BARBARA.PF; LP602 * TUE, MAY 17, 1988, 6:18 AM
```

```
#S3771; #O9321 * BARBARA.PF; LP602 * TUE, MAY 17, 1988, 6:18 AM
#S3771; #O9321 * BARBARA.PF; LP602 * TUE, MAY 17, 1988, 6:18 AM
#S3771; #O9321 * BARBARA.PF; LP602 * TUE, MAY 17, 1988, 6:18 AM
```

```
/*********************************************************************
*                                                                    *
* HPAGPCMD.C - Source file for class dependent library interface     *
*                                                                    *
**********************************************************************
*                                                                    *
* Agent PCODES Compiler 'C' source file                              *
* Ver X.08.01  12/15/87                                              *
*                                                                    *
*                                                                    *
*                                                                    *
*                                                                    *
*               COPYRIGHT HEWLETT PACKARD LIMITED                    *
*                             1986                                   *
*                      ALL RIGHTS RESERVED                           *
*                                                                    *
*                                                                    *
*                                                                    *
*                                                                    *
**********************************************************************
*                                                                    *
*                                                                    *
*                        MODIFICATION LOG                            *
*                                                                    *
*  04/22/87 bp - created                                             *
*  04/28/87 bp - modified for X.08.00                                *
*       12/15/87 bp - modified for new naming conventions            *
*                                                                    *
*                                                                    *
*                                                                    *
*********************************************************************/
/*********************************************************************
*                                                                    *
*                                                                    *
*                                                                    *
*       input:                                                       *
*       output:                                                      *
*       return:                                                      *
*                                                                    *
**********************************************************************
*                                                                    *
*       04/22/87 bp - created                                        *
*                                                                    *
*********************************************************************/
#define NOCOMM
#include "windows.h"
#include "nwcmf.h"
#include "ctype.h"
#include "doscall.h"
#include "ctrace.h"

#include "hpagppr0.h"
#include "hpag.h"
#include "nwapi.h"
#include "hpagatrc.h"
#include "hpagpext.h"
```

```
/*********************************************************************
*                                                                    *
*       ParseAppCmd - controlling to handle class dependent commands *
*                                                                    *
*       input:  index in class array of current class                *
*       output: sets global CDcmdflag                                *
*       return: TRUE if success else FALSE                           *
*                                                                    *
**********************************************************************
*                                                                    *
*       04/22/87 bp - created                                        *
*       08/11/87 bp - modified to use CIP scanner                    *
*       05/16/88 bp - modified to make stringtable global            *
*                                                                    *
*********************************************************************/
BOOL ParseAppCmd( currfocus )
int  currfocus;
{
    HANDLE hLib;
    long (FAR PASCAL *lpParseCmd)();
    long result;
    LPSTR lptr;
    CLASS *currclass;
    static FILEBUFSTATE InitBufState;

    if ( !(GetClassEntry( currfocus )->libname) )  {
        currfocus = NO_FOCUS;
        return( FALSE );
        }

    if ( GetClassEntry( currfocus )->hLib == NULL )  {
        while ( !InitAppCmdLib( currfocus ) )  {
            if ( !SwapOutCDP() )
                break;
            }
        }
    currclass = GetClassEntry( currfocus );
    if ( (hLib = currclass->hLib) == NULL )  {
        SetErrMsg( IDS_DLERR );
        return( FALSE );
        }

/* get the address of the procedure */
    if ( (lptr = GetStringTable(currclass->libproc)) == NULL )
        return( FALSE );
    lpParseCmd = GetProcAddress( hLib, lptr);
    UnlockStringTable();
    if ( lpParseCmd == NULL )  {
        SetErrMsg( IDS_DLERR );
        return( FALSE );
        }

/* setup */
    InitCmdBuf( &InitBufState );

/* call it */
    LockData( NULL );
    CDcmdflag = FALSE;
    gEndProgflag = FALSE;
```

```
    result = (*lpParseCmd)( currclass->classid );
    UnlockData( NULL );
    UpdateAccessCount( hLib );

    if ( LOWORD(result) )  {
    /* parse was successful */
        CDcmdflag = TRUE;
        AddCmdPCodes( result, currclass->classid );
        }
    else  {
        CDcmdflag = FALSE;
        gCurrErrnum = HIWORD(result);
        RestoreCmdBuf( &InitBufState );
        }

    return( CDcmdflag );
}  /* ParseAppCmd */
```

```
/**********************************************************************
*                                                                     *
*       InitAppCmdLib - loads a class dependent parser preparatory to *
*               command compilation                                   *
*                                                                     *
*       input:  index - of entry in ClassInfo buffer                  *
*       output: save library handle in ClassInfo buffer               *
*       return: TRUE if success else FALSE                            *
*                                                                     *
***********************************************************************
*                                                                     *
*       04/22/87 bp - created                                         *
*       05/18/88 bp - modified to make stringtable global             *
*                                                                     *
**********************************************************************/
BOOL InitAppCmdLib( index )
int index;
{
    int i;
    HANDLE hLib;
    CLASS *class;
    int nameptr;
    int (FAR PASCAL *initproc)();
    BOOL status;
    char *classname;
    LPSTR lptr;
    LPSTR lptr2;

    class = GetClassEntry(index);
    nameptr =  class->libname;

    hLib = class->hLib = LoadLibrary( (LPSTR)GetStringTable( nameptr ) );
    if ( hLib < 32 )  {
        return( FALSE );
        }

#ifdef COM1_TRACING
 classname = (LPSTR)GetStringTable(class->classname);
 cprint( "InitAppCmdLib: Loading parser for %s",0,classname);
#endif

/* get the address of the initialization procedure  and call it */
    if ( (lptr = GetStringTable(class->initproc)) == NULL )  {
        return( FALSE );
    initproc = GetProcAddress( hLib, lptr );
    UnlockStringTable();
    if ( initproc == NULL )  {
        FreeLibrary( hLib );
        class->hLib = NULL;
        return( FALSE );
        }
    else  {
        status = FALSE;
        if ( (lptr = GetStringTable(class->keywordfile)) == NULL )
            return( FALSE );
        else  {
            len = lstrlen( lptr ) + 1;
            if ( (hBuf = GlobalAlloc(   GHND | GMEM_DDESHARE,
                                        MAKELONG(len, 0) )) == NULL )  {
```

```
                SetErrMsg( IDS_GMEM );
                goto cleanup;
                }
            else if ( (lptr2 = GlobalLock( hBuf )) == NULL )
                SetErrMsg( IDS_GMEM );
                goto cleanup;
                }

        lstrcpy( lptr2, lptr );
        UnlockStringTable();
        LockData( NULL );
        status =  (*initproc)( hInst, lptr2, next_class );
        UnlockData( NULL );
        GlobalUnlock( hBuf );
        GlobalFree( hBuf );
cleanup:
        if ( !status )  {
            FreeLibrary( hLib );
            class->hLib = NULL;
            return( FALSE );
            } /* if error */
        }  /* else */

    for ( i = 0; i < next_class; i++ )  {
        class = GetClassEntry(i);
        if ( !(CmpStringTable( class->libname, GetStringTable( nameptr ) )) )
            class->hLib = hLib;
        }

#ifdef COM1_TRACING
 cprint( "InitAppCmdLib: success : Parser loaded.", 0, NULL);
#endif
    return( TRUE );
}  /* InitAppCmdLib */
```

```
/*************************************************************************
 *                                                                       *
 *      InitCmdBuf - save state prior to initiating a command parse      *
 *                                                                       *
 *      input:  pointer to buf state structure                           *
 *      output: current file buf state is put into InitBufState          *
 *      return: none                                                     *
 *                                                                       *
 *************************************************************************
 *                                                                       *
 *      04/22/87 bp - created                                            *
 *      08/18/87 bp - modified to use CIP scanner                        *
 *                                                                       *
 ************************************************************************/
void InitCmdBuf( pInitBufState )
FILEBUFSTATE *pInitBufState;
{
/* save state */
    pInitBufState->index    = gCurrBufState.index   = (int)(gBufPtr - cFileBuf);
    pInitBufState->size     = gCurrBufState.size;
    pInitBufState->fileptr  = gCurrBufState.fileptr;
    pInitBufState->linenumber = glinenumber;

} /* InitCmdBuf */
```

```
/****************************************************************
*                                                               *
*       RestoreCmdBuf - restores the source buf state after a CDP *
*               command parse error                             *
*                                                               *
*       input:  pointer to structure containing initial values of the *
*               file buffer information                         *
*       output: global structure gCurrBufstate is restored      *
*               fillbuf may be called to reset source buffer    *
*       return: none                                            *
*                                                               *
*****************************************************************
*                                                               *
*       04/22/87 bp - created                                   *
*       06/18/87 bp - modified to use CIP scanner               *
*                                                               *
****************************************************************/
void RestoreCmdBuf( pInitBufState )
FILEBUFSTATE *pInitBufState;
{
/* restore the file buf info */
    if ( gCurrBufState.fileptr != pInitBufState->fileptr ) {
        doslseek( fSource, pInitBufState->fileptr, FROM_START );
        fillbuf( fSource );
        }
    glinenumber = pInitBufState->linenumber;
    gBufPtr = cFileBuf + pInitBufState->index;

/* restore the scanner flags */
    NewCharFlag = TRUE;
    LabelFlag = FALSE;
    nlflag = TRUE;
    newline = TRUE;

}  /*  RestoreCmdBuf */
```

```
/****************************************************************
*                                                               *
*                                                               *
*                                                               *
*       input:                                                  *
*       output:                                                 *
*       return:                                                 *
*                                                               *
*****************************************************************
*                                                               *
*       04/22/87 bp - created                                   *
*       05/04/88 bp - spin off FreeCDParser                     *
*                                                               *
****************************************************************/
VOID FreeCDLibs( )
{
    int i;
    HANDLE hLib;

    for ( i = 0; i < next_class; i++ )
        if ( (hLib = GetClassEntry(i)->hLib) != NULL )
            FreeCDParser( i );

}  /* FreeCDLibs */
```

```
/****************************************************************************
 *                                                                          *
 *      FreeCDParser                                                        *
 *                                                                          *
 *      input:                                                              *
 *      output:                                                             *
 *      return:                                                             *
 *                                                                          *
 ****************************************************************************
 *                                                                          *
 *      05/04/88 bp - spun off from FreeCDLibs                              *
 *                                                                          *
 ****************************************************************************/
void FreeCDParser( index )
int index;
{
    int j;
    CLASS *class;
    void (FAR PASCAL *termproc)();
    HANDLE hLib;
    LPSTR lptr;

    class = GetClassEntry(index);
    if ( (hLib = class->hLib) == NULL )
        return;

/* get the address of the terminate procedure  and call it */
    if ( !gFatalErrorflag )  {
        if ( (lptr = (LPSTR)GetStringTable(class->termproc)) == NULL ) {
            return;
        if (termproc = GetProcAddress(hLib, lptr))  {
            LockData( NULL );
            (*termproc)( );
            UnlockData( NULL );
            }
        }
    FreeLibrary( hLib );
    for ( j = 0; j < next_class; j++ ) {
        if ( GetClassEntry(j)->hLib == hLib )  {
            GetClassEntry(j)->hLib = NULL;
            GetClassEntry(j)->lastaccess = 0;
            }
        }  /* for j */

}  /* FreeCDParser */
```

```
/****************************************************************************
 *                                                                          *
 *      UpdateAccessCount                                                   *
 *                                                                          *
 *      input:                                                              *
 *      output:                                                             *
 *      return:                                                             *
 *                                                                          *
 ****************************************************************************
 *                                                                          *
 *      05/04/88 bp - created                                               *
 *                                                                          *
 ****************************************************************************/
void UpdateAccessCount( hLib )
HANDLE hLib;
{
    int j;

    for ( j = 0; j < next_class; j++ ) {
        if ( GetClassEntry(j)->hLib == hLib )  {
            GetClassEntry(j)->lastaccess = CDPcount;
            }
        }  /* for j */
    CDPcount++;

}  /* UpdateAccessCount */
```

```
/*****************************************************************
*                                                                *
*       SwapOutCDP                                               *
*                                                                *
*       input:                                                   *
*       output:                                                  *
*       return:                                                  *
*                                                                *
******************************************************************
*                                                                *
*       05/04/88 bp - created                                    *
*                                                                *
*****************************************************************/
BOOL SwapOutCDP(   )
{
    register int j, LRUcount;
    int index;
    HANDLE hLib;
    LPSTR classname;

    LRUcount = CDPcount;
    hLib = NULL;

    for ( j = 0; j < next_class; j++ ) {
         if (     (GetClassEntry(j)->lastaccess <= LRUcount) &&
                  (GetClassEntry(j)->hLib != NULL) )  {
              index = j;
              hLib = GetClassEntry(j)->hLib;
              LRUcount = GetClassEntry(j)->lastaccess;
              }
         }  /* for j */

     if ( hLib != NULL )  {
#ifdef COM1_TRACING
 classname = (LPSTR)GetStringTable(GetClassEntry(index)->classname);
 cprint( "SwapOutCDP: successful! release %s",0,classname);
#endif
         FreeCDParser( index );
         return( TRUE );
         }
     else return( FALSE );

}  /* SwapOutCDP */
```

```
#S3771; #O9321 * BARBARA.PF; LP602 * TUE, MAY 17, 1988, 6:19 AM
#S3771; #O9321 * BARBARA.PF; LP602 * TUE, MAY 17, 1988, 6:19 AM
#S3771; #O9321 * BARBARA.PF; LP602 * TUE, MAY 17, 1988, 6:19 AM

#S3771; #O9321 * BARBARA.PF; LP602 * TUE, MAY 17, 1988, 6:19 AM
#S3771; #O9321 * BARBARA.PF; LP602 * TUE, MAY 17, 1988, 6:19 AM
#S3771; #O9321 * BARBARA.PF; LP602 * TUE, MAY 17, 1988, 6:19 AM

#S3771; #O9321 * BARBARA.PF; LP602 * TUE, MAY 17, 1988, 6:19 AM
#S3771; #O9321 * BARBARA.PF; LP602 * TUE, MAY 17, 1988, 6:19 AM
#S3771; #O9321 * BARBARA.PF; LP602 * TUE, MAY 17, 1988, 6:19 AM

#S3771; #O9321 * BARBARA.PF; LP602 * TUE, MAY 17, 1988, 6:19 AM
#S3771; #O9321 * BARBARA.PF; LP602 * TUE, MAY 17, 1988, 6:19 AM
#S3771; #O9321 * BARBARA.PF; LP602 * TUE, MAY 17, 1988, 6:19 AM
```

```
#S3771; #O9322  *  BARBARA.PF; LP602  *  TUE, MAY 17, 1988,  6:26 AM
#S3771; #O9322  *  BARBARA.PF; LP602  *  TUE, MAY 17, 1988,  6:26 AM
#S3771; #O9322  *  BARBARA.PF; LP602  *  TUE, MAY 17, 1988,  6:26 AM

#S3771; #O9322  *  BARBARA.PF; LP602  *  TUE, MAY 17, 1988,  6:26 AM
#S3771; #O9322  *  BARBARA.PF; LP602  *  TUE, MAY 17, 1988,  6:26 AM
#S3771; #O9322  *  BARBARA.PF; LP602  *  TUE, MAY 17, 1988,  6:26 AM

#S3771; #O9322  *  BARBARA.PF; LP602  *  TUE, MAY 17, 1988,  6:26 AM
#S3771; #O9322  *  BARBARA.PF; LP602  *  TUE, MAY 17, 1988,  6:26 AM
#S3771; #O9322  *  BARBARA.PF; LP602  *  TUE, MAY 17, 1988,  6:26 AM

#S3771; #O9322  *  BARBARA.PF; LP602  *  TUE, MAY 17, 1988,  6:26 AM
#S3771; #O9322  *  BARBARA.PF; LP602  *  TUE, MAY 17, 1988,  6:26 AM
#S3771; #O9322  *  BARBARA.PF; LP602  *  TUE, MAY 17, 1988,  6:26 AM
```

```
/*
 * Created by CSD YACC (IBM PC) from "hoagpexp.Y" */

# line 29

#define UNION 1
typedef union   {
    int  ival;
    long lval;
        } YYSTYPE;
# define AND_ 201
# define OR_ 202
# define NOT_ 203
# define USER_VAR 500
# define USER_ARRAY 510
# define FUNCTION 550
# define SYS_VAR 560
# define INT_L 400
# define PNT_L 405
# define REAL_L 410
# define RGN_L 415
# define STR_L 420
# define STACK_L 430
# define ANY_EXP 440
# define NUM_EXP 441
# define STR_EXP 442
# define RGN_EXP 443
# define PNT_EXP 444
# define LOG_EXP 445
# define NO_EXP 450
# define LE_SYM 451
# define GE_SYM 452
# define NE_SYM 453
# define LINE_END 700
# define UMINUS 281
#define yyclearin yychar = -1
#define yyerrok yyerrflag = 0
#ifndef YYMAXDEPTH
#define YYMAXDEPTH 150
#endif
extern YYSTYPE yylval;  /*CSD & DECUS LEX */
static YYSTYPE yyval;           /*CSD & DECUS LEX */
# define YYERRCODE 256

#line 298

#define NOCOMM
#include "windows.h"
#include "nwomf.h"
#include "stdio.h"

#ifndef HAVE_APICMDSTRUCT
typedef struct
  {
    WORD len;
    WORD cmd;
    char parms[128];
  }
APICMDSTRUCT;
#define HAVE_APICMDSTRUCT
#endif

#include "nwapi.h"
#include "hoag.h"
#include "hoagpext.h"

#define yyunion(i,j)    memcpy( i, j, sizeof(YYSTYPE) )
static short yyexca[] ={
-1, 1,
        0, -1,
        -2, 0,
        };
# define YYNPROD 83
# define YYLAST 525
static short yyact[]={

  57,  15,  40,  15,  55,  16,  16,  16,  16,  16,
  31,  35,  31,  72,  65,  44,  42,  34,  43,  36,
  45,  44,  42,  96,  43,  97,  45,  12,   8,   9,
  11,  10,  13,  78,  80,  79,  72,  73,  60,  78,
  80,  79,  71,  70,  44,  56,  84,  14,  27,  45,
  69,  37,  58,  48,  46,  47,  99,  44,  42, 101,
  43,  66,  45,  65,  44,  42,  67,  43,  38,  45,
  49, 106,  44,  42,  41,  43,   7,  45,   6,  53,
  33,  61,  62,  63,  64,   5,  86, 105,  44,  42,
   4,  43,   3,  45,  53,   2,  74,  44,  42, 101,
  43,   1,  45,  75,  76,  37,  87,  88,  89,  90,
  91,  77,  59,  17,  21,  20,  95, 102,  92,  93,
  44,  42, 100,  43,  19,  45,  98,  44,  42,  85,
  43,  32,  45,  39,  28,   0,  37,   0,   0, 103,
 104,  98,  44,  42,  29,  43,   0,  45,  44,  42,
  67,  43,   0,  45,  65,  44,  42,   0,  43,   0,
  45,  44,  42,  58,  43,   0,  45,   0,   0,  51,
   0,   0,   0,   0,  51,   0,   0,  72,  73,   0,
   0,   0,   0,   0,   0,   0,   0,   0,   0,   0,
   0,   0,   0,   0,   0,   0,   0,   0,   0,   0,
   0,   0,   0,   0,   0,   0,   0,   0,   0,   0,
   0,   0,   0,   0,   0,   0,   0,   0,   0,   0,
   0,   0,   0,   0,   0,   0,   0,   0,   0,   0,
   0,   0,   0,   0,   0,   0,   0,   0,   0,   0,
   0,   0,   0,   0,   0,   0,   0,   0,   0,   0,
   0,   0,   0,   0,   0,   0,   0,   0,   0,   0,
   0,   0,   0,   0,   0,   0,   0,   0,   0,   0,
   0,   0,   0,   0,   0,   0,   0,   0,   0,   0,
   0,   0,   0,   0,   0,   0,   0,   0,   0,   0,
   0,   0,   0,   0,   0,   0,   0,   0,   0,   0,
   0,   0,   0,   0,   0,   0,   0,   0,   0,   0,
   0,   0,   0,   0,   0,   0,   0,   0,   0,   0,
   0,   0,   0,   0,   0,   0,   0,   0,   0,   0,
   0,   0,   0,   0,   0,   0,   0,   0,   0,   0,
   0,   0,   0,   0,   0,   0,   0,   0,   0,   0,
  23, [illegible], [illegible], [illegible], [illegible],   0,   0,   0,   0,   0,
  24, [illegible], [illegible], [illegible], [illegible],   0,   0,   0,   0,   0,
  25, [illegible], [illegible], [illegible], [illegible],   0,   0,   0,   0,   0,
   0,   0,   0,   0,   0,   0,   0,   0,   0,   0,
   0,   0,   0,   0,   0,   0,   0,   0,   0,   0,
   0,   0,   0,   0,   0,   0,   0,   0,   0,   0,
   0,   0,   0,   0,  31,  32,  33,   0,   0,   0,
  31,  32,  33,   0,   0,   0,   0,   0,   0,   0,
```

```
   0,   0,   0,   0,   0,   0,   0,   0,   0,   0,
   0,   0,   0,   0,   0,   0,   0,   0,   0,   0,
  18,  18,  18,  50,  54,   0,   0,   0,   0,   0,
  52,  34,  30,   0,   0,   0,   0,   0,   0,   0,
   0,   0,   0,   0,   0,   0,   0,   0,   0,   0,
   0,   0,   0,   0,   0,   0,   0,   0,   0,   0,
   0,   0,   0,   0,   0,   0,   0,   0,   0,   0,
  22,  22,  22,  22,  22,   0,   0,   0,   0,   0,
  25,  25,  25,  25,  25 };
static short yypact[]={

-413,-1000,-1000,-1000,-1000,-1000,-1000,-1000, -39, -39,
 -28, -29, -38,-1000, 119, -39, -39,-1000,-1000,-1000,
-1000,-1000,  13,-1000,-1000,-1000,-1000, 119,-1000,-1000,
-1000, -37,-1000,-1000,-1000, -30,-1000, 119,-1000,-1000,
 -36, -40, -39, -39, -39, -39, 113,-1000,-1000, 106,
   8,   6,  -1,  22,  -2, -37,-165, -40, -40,-1000,
 -21,   2,   2,-1000,-1000,-1000, -38, -39, -39, -39,
 -39, -39, -40, -40, -27, -24,-1000, -39,-1000,-1000,
-1000,-1000,-1000,-1000, -18, -19,-1000, 100,  85,  78,
  55,  15,-1000,-188,-1000, 119,-1000, -38,-1000,-1000,
 -39, -39,-1000,  46,  30,-1000,-1000 };
static short yypgo[]={

   0, 134, 131,  19,  38,  45, 129, 124, 115,  88,
 133, 114, 113, 112, 111, 101,  95,  92,  90,  89,
  78,  76,  74,  61,  48 };
static short yyr1[]={

   0,  15,  15,  15,  15,  15,  15,  16,  16,  17,
  17,  18,  18,  19,  19,  20,  20,   3,   3,   3,
   4,   4,   4,   4,   4,   4,   4,   4,   4,  12,
  12,  11,   8,   8,   8,   1,   1,   2,   2,   9,
   9,  10,  10,  22,  21,   5,   5,   5,   5,   5,
  13,  14,  14,  14,  14,  14,  14,  23,   7,  24,
  24,   6,   6 };
static short yyr2[]={

   0,   1,   1,   1,   1,   1,   1,   1,   2,   1,
   2,   1,   2,   1,   2,   1,   2,   1,   1,   1,
   3,   3,   3,   3,   3,   2,   1,   1,   1,   1,
   1,   1,   1,   1,   1,   1,   1,   1,   1,   7,
   7,   5,   5,   0,   3,   3,   3,   3,   2,   1,
   3,   1,   1,   1,   1,   1,   1,   0,   5,   0,
   1,   1,   3 };
static short yychk[]={

-1000, -15, -16, -17, -18, -19, -20, -21, 441, 442,
 444, 443, 440, 445,  -4,  40,  45, -12, 500,  -7,
  -8, -11, 550, 400, 410, 580, 420,  -4,  -1, -10,
 500,  40,  -2,  -9, 500,  40,  -3,  -4,  -9, -10,
  40, -22,  43,  45,  42,  47,  -4,  -4,  40,  -4,
 500, -10, 500,  -4, 500,  40,  -5,  40, 203, -13,
  -4,  -4,  -4,  -4,  -4,  41, -23,  44,  44,  44,
  44,  44, 201, 202,  -4,  -5,  -5, -14,  60,  62,
  61, 451, 452, 453, -24,  -6,  -3,  -4,  -4,  -4,
  -4,  -4,  -5,  -5,  41,  -4,  41,  44,  41,  41,
  44,  44,  -3,  -4,  -4,  41,  41 };
static short yydef[]={

   0,  -2,   1,   2,   3,   4,   5,   6,   7,   9,
  11,  13,  15,  43,   8,   0,   0,  26,  27,  28,
  29,  30,   0,  32,  33,  34,  31,  10,  12,  35,
  38,   0,  14,  37,  38,   0,  16,  17,  18,  19,
   0,   0,   0,   0,   0,   0,   0,  25,  57,   0,
  27,   0,   0,   0,  27,   0,  44,   0,   0,  49,
   0,  21,  22,  23,  24,  20,  59,   0,   0,   0,
   0,   0,   0,   0,   0,   0,  48,   0,  51,  52,
  53,  54,  55,  56,   0,  60,  61,   0,   0,   0,
   0,   0,  46,  47,  45,  50,  58,   0,  41,  42,
   0,   0,  62,   0,   0,  39,  40 };
# define YYFLAG -1000
# define YYERROR goto yyerrlab
# define YYACCEPT return(0)
# define YYABORT return(1)

/*      parser for yacc output  */

static int yydebug = 0; /* 1 for debugging */
static YYSTYPE yyv[YYMAXDEPTH]; /* where the values are stored */
static int yychar = -1; /* current input token number */
static int yynerrs = 0;  /* number of errors */
static short yyerrflag = 0;  /* error recovery flag */

yyparseexpr()
   {

   static short yys[YYMAXDEPTH];
   static short yyj, yym;
   register YYSTYPE *yypvt;
   register short yystate, *yyps, yyn;
   register YYSTYPE *yypv;
   register short *yyxi;

   yystate = 0;
   yychar = -1;
   yynerrs = 0;
   yyerrflag = 0;
   yyps= &yys[-1];
   yypv= &yyv[-1];

yystack:    /* put a state and value onto the stack */

   if( yydebug  ) printf( "state %d, char 0%o\n", yystate, yychar );
   if( ++yyps> &yys[YYMAXDEPTH] )
      {
      yyerror( "yacc stack overflow" );
      return(1);
      }
   *yyps = yystate;
   ++yypv;
#ifdef UNION
   yyunion(yypv, &yyval);
#else
   *yypv = yyval;
#endif
yynewstate:

   yyn = yypact[yystate];
```

```
    if( yyn<= YYFLAG ) goto yydefault; /* simple state */

    if( yychar<0 ) if( (yychar=yylex())<0 ) yychar=0;
    if( (yyn += yychar)<0 || yyn >= YYLAST ) goto yydefault;

    if( yychk[ yyn=yyact[ yyn ] ] == yychar )
        {
        /* valid shift */
        yychar = -1;
#ifdef UNION
            yyunion(&yyval, &yylval);
#else
        yyval = yylval;
#endif
        yystate = yyn;
        if( yyerrflag > 0 ) --yyerrflag;
        goto yystack;
        }
yydefault:
    /* default state action */

    if( (yyn=yydef[yystate]) == -2 )
        {
        if( yychar<0 ) if( (yychar=yylex())<0 ) yychar = 0;
        /* look through exception table */

        for( yyxi=yyexca; (*yyxi!= (-1)) || (yyxi[1]!=yystate) ; yyxi += 2 ) ; /* VOID */

        for(yyxi+=2; *yyxi >= 0; yyxi+=2)
            {
            if( *yyxi == yychar ) break;
            }
        if( (yyn = yyxi[1]) < 0 ) return(0);   /* accept */
        }

    if( yyn == 0 )
        {
        /* error */
        /* error ... attempt to resume parsing */

        switch( yyerrflag )
            {

        case 0:   /* brand new error */

            yyerror( "syntax error" );
yyerrlab:
            ++yynerrs;

        case 1:
        case 2: /* incompletely recovered error ... try again */

            yyerrflag = 3;

            /* find a state where "error" is a legal shift action */

            while ( yyps >= yys )
                {
                yyn = yypact[*yyps] + YYERRCODE;
                if( yyn>= 0 && yyn < YYLAST && yychk[yyact[yyn]] == YYERRCODE )
                    {
                    yystate = yyact[yyn];  /* simulate a shift of "error" */
                    goto yystack;
                    }
                yyn = yypact[*yyps];

                /* the current yyps has no shift onn "error", pop stack */

                if( yydebug ) printf( "error recovery pops state %d, uncovers %d\n", *yyps, yyps[-1] );
                --yyps;
                --yypv;
                }

            /* there is no state on the stack with an error shift ... abort */

yyabort:
            return(1);


        case 3:  /* no shift yet; clobber input char */
            if( yydebug ) printf( "error recovery discards char %d\n", yychar );

            if( yychar == 0 ) goto yyabort; /* don't discard EOF, quit */
            yychar = -1;
            goto yynewstate;   /* try again in the same state */

            }

        }

    /* reduction by production yyn */

    if( yydebug ) printf("reduce %d\n",yyn);
    yyps -= yyr2[yyn];
    yypvt = yypv;
    yypv -= yyr2[yyn];
#ifdef UNION
    yyunion(&yyval, &yypv[1]);
#else
    yyval = yypv[1];
#endif
    yym=yyn;
    /* consult goto_table to find next state */
    yyn = yyr1[yyn];
    yyj = yypgo[yyn] + *yyps + 1;
    if( yyj>=YYLAST || yychk[ yystate = yyact[yyj] ] != -yyn ) yystate = yyact[yypgo[yyn]];
    switch(yym)
        {

case 7:
# line 74
{ SaveExprValue( NO_EXP, MAKELONG( 0, NO_EXP ) ); } break;
case 8:
# line 77
{ SaveExprValue( NUM_EXP, yypvt[-0].lval ); } break;
case 9:
# line 83
{ SaveExprValue( NO_EXP, MAKELONG( 0, NO_EXP ) ); } break;
case 10:
# line 86
```

```
{ SaveExprValue( STR_EXP, yypvt[-0].lval ); } break;
case 11:
# line 92
{ SaveExprValue( NO_EXP, MAKELONG( 0, NO_EXP ) ); } break;
case 12:
# line 95
{ SaveExprValue( PNT_EXP, yypvt[-0].lval ); } break;
case 13:
# line 101
{ SaveExprValue( NO_EXP, MAKELONG( 0, NO_EXP ) ); } break;
case 14:
# line 104
{ SaveExprValue( RGN_EXP, yypvt[-0].lval ); } break;
case 15:
# line 110
{ SaveExprValue( NO_EXP, MAKELONG( 0, NO_EXP ) ); } break;
case 16:
# line 113
{ SaveExprValue( ANY_EXP, yypvt[-0].lval ); } break;
case 20:
# line 124
{ yyval.lval = yypvt[-1].lval; } break;
case 21:
# line 127
{ OpPCode( AG_ADD_PCODE, yypvt[-2].lval, yypvt[-0].lval );
          yyval.lval = MAKELONG( NUM_EXP, STACK_L ); } break;
case 22:
# line 131
{ OpPCode( AG_SUB_PCODE, yypvt[-2].lval, yypvt[-0].lval );
          yyval.lval = MAKELONG( NUM_EXP, STACK_L );
          numflag = TRUE; } break;
case 23:
# line 136
{ OpPCode( AG_MUL_PCODE, yypvt[-2].lval, yypvt[-0].lval );
          yyval.lval = MAKELONG( NUM_EXP, STACK_L );
          numflag = TRUE; } break;
case 24:
# line 141
{ OpPCode( AG_DIV_PCODE, yypvt[-2].lval, yypvt[-0].lval );
          yyval.lval = MAKELONG( NUM_EXP, STACK_L );
          numflag = TRUE; } break;
case 25:
# line 146
{ yyval.lval = MakeMinus( yypvt[-0].lval );
          numflag = TRUE; } break;
case 29:
# line 159
{ numflag = TRUE; } break;
case 30:
# line 162
{ strflag = TRUE; } break;
case 39:
# line 194
{ numflag = TRUE;
          yyval.lval = MakeRegion( yypvt[-5].lval, yypvt[-3].lval, yypvt[-1].lval ); } break;
case 40:
# line 198
{ numflag = TRUE;
          yyval.lval = MakeRegion( yypvt[-5].lval, yypvt[-3].lval, yypvt[-1].lval ); } break;
case 41:
# line 205
{ numflag = TRUE;
          yyval.lval = MakePoint( yypvt[-3].lval, yypvt[-1].lval ); } break;
case 42:
# line 209
{ numflag = TRUE;
          yyval.lval = MakePoint( yypvt[-3].lval, yypvt[-1].lval ); } break;
case 43:
# line 217
{ numflag = TRUE; } break;
case 44:
# line 219
{ SaveExprValue( LOG_EXP, yypvt[-0].lval ); } break;
case 45:
# line 225
{ yyval.lval = yypvt[-1].lval; } break;
case 46:
# line 228
{ OutputPCode( AG_AND_PCODE, 0, 0L );
          yyval.lval = MAKELONG( LOG_EXP, STACK_L ); } break;
case 47:
# line 232
{ OutputPCode( AG_OR_PCODE, 0, 0L );
          yyval.lval = MAKELONG( LOG_EXP, STACK_L ); } break;
case 48:
# line 236
{ OutputPCode( AG_NOT_PCODE, 0, 0L );
          yyval.lval = MAKELONG( LOG_EXP, STACK_L ); } break;
case 50:
# line 245
{   RelOpPCode( yypvt[-1].ival, yypvt[-2].lval, yypvt[-0].lval );
          yyval.lval = MAKELONG( LOG_EXP, STACK_L ); } break;
case 51:
# line 252
{ yyval.ival = LT_SYMBOL; } break;
case 52:
# line 255
{ yyval.ival = GT_SYMBOL; } break;
case 53:
# line 258
{ yyval.ival = EQ_SYMBOL;} break;
case 54:
# line 261
{ yyval.ival = LE_SYMBOL; } break;
case 55:
# line 264
{ yyval.ival = GE_SYMBOL; } break;
case 56:
# line 267
{ yyval.ival = NE_SYMBOL; } break;
case 57:
# line 274
{ AddFunction( yypvt[-1].ival ); } break;
case 58:
# line 275
{ yyval.ival = MAKELONG( OutputFunction( ), STACK_L ); } break;
case 61:
# line 281
{ SavePParm( yypvt[-0].lval ); } break;
case 62:
```

```
# line 294
{ SaveParm( yypvt[-0].lval ); } break;/* End of actions */
      }
   goto yystack;  /* stack new state and value */

   }
```

```
#S3771; #O9322 * BARBARA.PF; LP602 * TUE, MAY 17, 1988, 6:26 AM
#S3771; #O9322 * BARBARA.PF; LP602 * TUE, MAY 17, 1988, 6:26 AM
#S3771; #O9322 * BARBARA.PF; LP602 * TUE, MAY 17, 1988, 6:26 AM

#S3771; #O9322 * BARBARA.PF; LP602 * TUE, MAY 17, 1988, 6:26 AM
#S3771; #O9322 * BARBARA.PF; LP602 * TUE, MAY 17, 1988, 6:26 AM
#S3771; #O9322 * BARBARA.PF; LP602 * TUE, MAY 17, 1988, 6:26 AM

#S3771; #O9322 * BARBARA.PF; LP602 * TUE, MAY 17, 1988, 6:26 AM
#S3771; #O9322 * BARBARA.PF; LP602 * TUE, MAY 17, 1988, 6:26 AM
#S3771; #O9322 * BARBARA.PF; LP602 * TUE, MAY 17, 1988, 6:26 AM

#S3771; #O9322 * BARBARA.PF; LP602 * TUE, MAY 17, 1988, 6:26 AM
#S3771; #O9322 * BARBARA.PF; LP602 * TUE, MAY 17, 1988, 6:26 AM
#S3771; #O9322 * BARBARA.PF; LP602 * TUE, MAY 17, 1988, 6:26 AM
```

```
#S3771; #O9323 * BARBARA.PF; LP602 * TUE, MAY 17, 1988, 6:26 AM
#S3771; #O9323 * BARBARA.PF; LP602 * TUE, MAY 17, 1988, 6:26 AM
#S3771; #O9323 * BARBARA.PF; LP602 * TUE, MAY 17, 1988, 6:26 AM
```

```
#S3771; #O9323 * BARBARA.PF; LP602 * TUE, MAY 17, 1988, 6:26 AM
#S3771; #O9323 * BARBARA.PF; LP602 * TUE, MAY 17, 1988, 6:26 AM
#S3771; #O9323 * BARBARA.PF; LP602 * TUE, MAY 17, 1988, 6:26 AM
```

```
#S3771; #O9323 * BARBARA.PF; LP602 * TUE, MAY 17, 1988, 6:26 AM
#S3771; #O9323 * BARBARA.PF; LP602 * TUE, MAY 17, 1988, 6:26 AM
#S3771; #O9323 * BARBARA.PF; LP602 * TUE, MAY 17, 1988, 6:26 AM
```

```
#S3771; #O9323 * BARBARA.PF; LP602 * TUE, MAY 17, 1988, 6:26 AM
#S3771; #O9323 * BARBARA.PF; LP602 * TUE, MAY 17, 1988, 6:26 AM
#S3771; #O9323 * BARBARA.PF; LP602 * TUE, MAY 17, 1988, 6:26 AM
```

```
/*************************************************************************
*                                                                        *
* HPAGPSM1.C - Source file for parser semantic routines                  *
*                                                                        *
**************************************************************************
*                                                                        *
* Agent PCODES Compiler 'C' source file                                  *
* Ver X.09.01  12/15/87                                                  *
*                                                                        *
*                                                                        *
*                                                                        *
*                   COPYRIGHT HEWLETT PACKARD LIMITED                    *
*                                 1986                                   *
*                          ALL RIGHTS RESERVED                           *
*                                                                        *
*                                                                        *
*                                                                        *
*                                                                        *
**************************************************************************
*                                                                        *
*                                                                        *
*                           MODIFICATION LOG                             *
*                                                                        *
*       08/15/87 bp - spun off from hpagpSEM.C                           *
*       12/15/87 bp - modified for new naming conventions                *
*                                                                        *
*                                                                        *
*                                                                        *
*************************************************************************/
/*************************************************************************
*                                                                        *
*                                                                        *
*                                                                        *
*       input:                                                           *
*       output:                                                          *
*       return:                                                          *
*                                                                        *
**************************************************************************
*                                                                        *
*       07/16/87 bp - created                                            *
*                                                                        *
*************************************************************************/
#define NOCOMM
#include "windows.h"
#include "nwomf.h"
#include "ctype.h"
#include "doscall.h"
#include "ctrace.h"

#include "hpagppr0.h"
#include "nwapi.h"
#include "hpag.h"
#include "hpagatrc.h"
#include "hpagpext.h"
```

```
/*************************************************************************
*                                                                        *
*       OutputClassIdPCode - outputs the pcodes to initialize the        *
*               class information array for this task                    *
*               calls OutputPCode to write the instruction               *
*                                                                        *
*       input:  none    - uses globals                                   *
*       output: none                                                     *
*       return: none                                                     *
*                                                                        *
**************************************************************************
*                                                                        *
*       04/13/87 bp - created                                            *
*                                                                        *
*************************************************************************/
OutputClassIdPCode()
{
    int i;
    int labelindex;
    CLASS *classptr;

    AddLabelAddr( 0, &curraddr );

    for ( i = 0; i < next_class; i++ )  {
        classptr = GetClassEntry( i );
        if ( classptr->classid )
            OutputPCode( AG_SETCLASS_PCODE, classptr->classid,
                         MAKELONG(classptr->classname, 0) );
        }

/* output jump to program start */
    AddLabelAddr( (labelindex = AddLabel( 0 )), &startaddr );
    OutputPCode( AG_JUMP_PCODE, labelindex, 0L );
}  /* OutputClassIdPCode */
```

```
/****************************************************************************
*                                                                           *
*       ObjectFocus - emit pcodes to set the current object focus          *
*               calls OutputPCode to write the instruction                  *
*                                                                           *
*       input:  class - Spellings entry for class symbol, if 0, current    *
*                       class will be assumed                               *
*               index - to title entry in String Lit table                  *
*       output: if no class id is assigned, assign one                      *
*       return: none                                                        *
*                                                                           *
*****************************************************************************
*                                                                           *
*       04/14/87 bp - created                                               *
*                                                                           *
****************************************************************************/
ObjectFocus( class, index )
int  class;
long index;
{
    int i;
    CLASS *cls_ptr;
    int classid;

    if ( class == NO_FOCUS )  {
        currfocus = NO_FOCUS;
        return( TRUE );
        }

    if ( !class )  {
        if ( (i = currfocus) == NO_FOCUS )  {
            SetErrMsg( IDS_NOFOCUS );
            return( FALSE );
            }
        else
            cls_ptr = GetClassEntry( i );
        }
    else  {
    /* find ClassInfo entry and get class id */
        for ( i = 0; ; i++ )  {
            cls_ptr = GetClassEntry( i );
            if (  cls_ptr->value == class )
                break;
            }
        if ( !cls_ptr->classid )
        /* assign it */
            cls_ptr->classid = ++next_classid;
        }  /* else */

    classid = cls_ptr->classid;
    OutputPCode( AG_FOCUS_PCODE, classid, index );
    currfocus = i;
    return( TRUE );
}       /* ObjectFocus */
```

```
/****************************************************************************
*                                                                           *
*       SetUpLabel - process the LABEL statement by fixing up the          *
*               address in the label table                                  *
*                                                                           *
*       input:  name    - index of the label in the IDENTIFIER table        *
*       output: label will be added if not found                            *
*       return: TRUE if success else FALSE                                  *
*                                                                           *
*****************************************************************************
*                                                                           *
*       04/15/87 bp - created                                               *
*                                                                           *
****************************************************************************/
BOOL SetupLabel( name )
int name;
{
    int labelindex;
    LABEL *lblptr;

    if ( !(labelindex = GetLabelNum( name, USER_LABEL )) )
        return( FALSE );
    else if ( (lblptr = GetLabelEntry( labelindex ))->address.page )  {
    /* already defined */
        SetErrMsg( IDS_LBLERR2 );
        return( FALSE );
        }
    else  {
        AddLabelAddr( labelindex, &curraddr );
        return( TRUE );
        }
}  /* SetUpLabel */
```

```
/*****************************************************************************
*
*       GoToLabel - generates the jump pcode from a named label
*
*       input:  Pcode id number
*               name    - index of the label in the IDENTIFIER table
*               type of label
*       output: PCode is written to object file. Ascii to Ascii PCode
*               file.  gErrorInfo is updated if name is not valid label
*       return: TRUE if success else FALSE
*
******************************************************************************
*
*       04/18/87 bp - created
*       05/20/87 bp - Pcode id parameter added
*
*****************************************************************************/
GoToLabel( Pcode_id, name, type )
int Pcode_id,
    name,
    type;
{
    int labelindex;

    if ( name )  {
        if ( !(labelindex = GetLabelNum( name, type )) )
            return( FALSE );
        }
    else
        labelindex = 0;

    OutputPCode( Pcode_id, labelindex, 0L );
    return( TRUE );

}  /* GoToLabel */
```

```
/*****************************************************************************
*
*       AddCmdPCodes - adds the commands returned from CDP to the
*                      Object file
*
*       input:  result - CDP.  HIWORD is total length of the commands;
*               LOWORD is global handle containing binary command.
*               classid - index of domain
*       output: command pcode inserted and written to object file
*       return: TRUE if success else FALSE
*
******************************************************************************
*
*       04/22/87 bp - created
*
*****************************************************************************/
BOOL AddCmdPCodes( result, classid )
long result;
int  classid;
{
    HANDLE hCmd;
    int  length;
    register int cmdlen;
    LPSTR parmptr;

    length = HIWORD( result );
    hCmd = LOWORD( result );

    if ( (parmptr = GlobalLock( hCmd )) == 0L )  {
            SetErrMsg( IDS_GMEM );
            return( FALSE );
            }

    while ( length > 0 )  {
        cmdlen = *(LPINT)parmptr;        /* 1st word is length of the command */
        WriteGmdPCode( parmptr, cmdlen, classid );
        parmptr += cmdlen;
        length -= cmdlen;
        }

    GlobalUnlock( hCmd );
    return( TRUE );
}  /* AddCmdPCodes */
```

```
/**********************************************************************
*                                                                     *
*       WriteCmdPCode - add command p-code to a single CDP command    *
*               and write it to the Object file                       *
*                                                                     *
*       input:  cmdptr - long pointer to the CDP command              *
*               length - of the CDP command                           *
*               classid - index of domain                             *
*       output: WritePCode is called                                  *
*       return: none                                                  *
*                                                                     *
***********************************************************************
*                                                                     *
*       05/14/87 bp - created                                         *
*                                                                     *
**********************************************************************/
void WriteCmdPCode( cmdptr, length, classid )
LPSTR cmdptr;
int   length,
      classid;
{
    AG_PCODES *pc_ptr;
    register int cmdlen;
    char *pcodeptr;

    pc_ptr = (AG_PCODES *)gTempBuf;

    if ( cmdlen <= PAGESIZE )  {
        pcodeptr = gTempBuf;
        lstrmove( (LPSTR)pcodeptr, cmdptr, length );
        WritePCode( pc_ptr );
        } /* if */
    else  {
        OutputPCode( AG_COMMANDINIT_PCODE, classid, MAKELONG(length, 0) );
        pc_ptr->idnum = AG_COMMANDCAT_PCODE;

        while ( length > 0 )  {
            cmdlen = ( length > (PAGESIZE - AG_MIN_PCODE) ?
                                (PAGESIZE - AG_MIN_PCODE) : length );
            pc_ptr->length = AG_MIN_PCODE + cmdlen;
            lstrmove( (LPSTR)(pc_ptr->parms), cmdptr, cmdlen );
            length -= cmdlen;
            cmdptr += cmdlen;
            WritePCode( pc_ptr );
            }  /* while */
        }  /* else */
} /* WriteCmdPCode */
```

```
/**********************************************************************
*                                                                     *
*       OnDoPCode - sets up pcodes for ON ERROR etc. commands and calls *
*               OutputPCode                                           *
*                                                                     *
*       input:  id number of the interrupt type                       *
*               name is index of the procedure name in the IDENTIFIER *
*               table                                                 *
*       output: none                                                  *
*       return: TRUE if success else FALSE                            *
*                                                                     *
***********************************************************************
*                                                                     *
*       05/22/87 bp - created                                         *
*                                                                     *
**********************************************************************/
OnDoPCode( interrupt_id, name )
int interrupt_id,
    name;
{
    int labelindex;

    if ( !(labelindex = GetLabelNum( name, USER_LABEL )) )
        return( FALSE );
    else  {
        OutputPCode( AG_ON_DO_PCODE, labelindex, MAKELONG(interrupt_id, 0) );
        return( TRUE );
        }
}  /* OnDoPCode */
```

```
/************************************************************************
*                                                                       *
*       AssignStmt - generates pcodes for an assignment statement       *
*                                                                       *
*       input:  uservar   - token value of the variable                 *
*               low word is index in Spellings table of the identifier  *
*               longindex - value of the expression, type dependent     *
*       output: pcode is written to the temp file                       *
*       return: none                                                    *
*                                                                       *
*************************************************************************
*                                                                       *
*       05/04/87 bp - created                                           *
*       05/27/87 bp - rewritten                                         *
*                                                                       *
************************************************************************/
void AssignStmt( uservar, longindex )
long uservar,
     longindex;
{
    int vartype, pcode1;

    vartype = HIWORD( uservar );

    if ( vartype == USER_VAR )
        pcode1 = AG_POP_PCODE;
    else
        pcode1 = AG_POP_SYSVAR_PCODE;

    PutOnStack( longindex );
    OutputPCode( pcode1, LOWORD(uservar), 0L );
} /* AssignStmt */
```

```
/************************************************************************
*                                                                       *
*       JumpConditional - generates the jump pcode for a conditional   *
*               statement:  IF or WHILE.                                *
*                                                                       *
*       input:  type of statement                                       *
*               name    - index of the label in the IDENTIFIER table   *
*       output: PCode is written to object file, Ascii to Ascii PCode  *
*               file.  gErrorInfo is updated if error                   *
*       return: TRUE if success else FALSE                              *
*                                                                       *
*************************************************************************
*                                                                       *
*       08/15/87 bp - created                                           *
*                                                                       *
************************************************************************/
JumpConditional( stmt_id )
int stmt_id;
{
    int labelindex, pcode_id;

    pcode_id = 0;

/* generate label for jump statement */
    if ( !(labelindex = AddLabel( CONDITIONAL_SYM )) )
        return( FALSE );

    switch ( stmt_id ) {

case IF_SYMBOL:
case INWHILE_SYMBOL:
        pcode_id = AG_JUMP_NOT_PCODE;
        break;

case WHILE_SYMBOL:
    /* put in address since jump is to here from end of statement */
        AddLabelAddr( labelindex, &curraddr );
        break;
        }  /* end switch */

    if ( pcode_id )
        OutputPCode( pcode_id, labelindex, 0L );
    return( TRUE );
}  /* JumpConditional */
```

```
/*****************************************************************************
*                                                                           *
*       FixupJump - generates fixup pcode for a conditional                 *
*               statement:  ELSE, ENDIF, or ENDWHILE.                       *
*                                                                           *
*       input:  type of statement                                           *
*       output: PCode is written to object file, Ascii to Ascii PCode       *
*               file.  gErrorInfo is updated if error                       *
*       return: TRUE if success else FALSE                                  *
*                                                                           *
*****************************************************************************
*                                                                           *
*       08/15/87 bp - created                                               *
*                                                                           *
*****************************************************************************/
FixupJump( stmt_id )
int stmt_id;
{
    int label1, label2;
    LABEL *lblptr;

/* get label for address fixup */
    label1 = GetLastCondLabel( );
    lblptr = GetLabelEntry( label1 );
    lblptr->name = 0;

    if ( stmt_id == ELSE_SYMBOL )  {
    /* generate another label for ENDIF */
        if ( !(label2 = AddLabel(CONDITIONAL_SYM)) )
            return( FALSE );
    /* output jump for end of IF */
        OutputPCode( AG_JUMP_PCODE, label2, 0L );
        }
    else if ( stmt_id == ENDWHILE_SYMBOL )  {
    /* clean up the while label too */
        label2 = GetLastCondLabel();
        lblptr = GetLabelEntry( label2 );
        lblptr->name = 0;
    /* output jump for end of WHILE */
        OutputPCode( AG_JUMP_PCODE, label2, 0L );
        }

    AddLabelAddr( label1, &curraddr );
    return( TRUE );
}  /* FixupJump */
```

```
#S3771; #09323 * BARBARA.PF; LP602 * TUE, MAY 17, 1988, 6:26 AM
#S3771; #09323 * BARBARA.PF; LP602 * TUE, MAY 17, 1988, 6:26 AM
#S3771; #09323 * BARBARA.PF; LP602 * TUE, MAY 17, 1988, 6:26 AM

#S3771; #09323 * BARBARA.PF; LP602 * TUE, MAY 17, 1988, 6:26 AM
#S3771; #09323 * BARBARA.PF; LP602 * TUE, MAY 17, 1988, 6:26 AM
#S3771; #09323 * BARBARA.PF; LP602 * TUE, MAY 17, 1988, 6:26 AM

#S3771; #09323 * BARBARA.PF; LP602 * TUE, MAY 17, 1988, 6:26 AM
#S3771; #09323 * BARBARA.PF; LP602 * TUE, MAY 17, 1988, 6:26 AM
#S3771; #09323 * BARBARA.PF; LP602 * TUE, MAY 17, 1988, 6:26 AM

#S3771; #09323 * BARBARA.PF; LP602 * TUE, MAY 17, 1988, 6:26 AM
#S3771; #09323 * BARBARA.PF; LP602 * TUE, MAY 17, 1988, 6:26 AM
#S3771; #09323 * BARBARA.PF; LP602 * TUE, MAY 17, 1988, 6:26 AM
```

```
#S3771; #O9324 * BARBARA.PF; LP602 * TUE, MAY 17, 1988, 6:27 AM
#S3771; #O9324 * BARBARA.PF; LP602 * TUE, MAY 17, 1988, 6:27 AM
#S3771; #O9324 * BARBARA.PF; LP602 * TUE, MAY 17, 1988, 6:27 AM
```

```
#S3771; #O9324 * BARBARA.PF; LP602 * TUE, MAY 17, 1988, 6:27 AM
#S3771; #O9324 * BARBARA.PF; LP602 * TUE, MAY 17, 1988, 6:27 AM
#S3771; #O9324 * BARBARA.PF; LP602 * TUE, MAY 17, 1988, 6:27 AM
```

```
#S3771; #O9324 * BARBARA.PF; LP602 * TUE, MAY 17, 1988, 6:27 AM
#S3771; #O9324 * BARBARA.PF; LP602 * TUE, MAY 17, 1988, 6:27 AM
#S3771; #O9324 * BARBARA.PF; LP602 * TUE, MAY 17, 1988, 6:27 AM
```

```
#S3771; #O9324 * BARBARA.PF; LP602 * TUE, MAY 17, 1988, 6:27 AM
#S3771; #O9324 * BARBARA.PF; LP602 * TUE, MAY 17, 1988, 6:27 AM
#S3771; #O9324 * BARBARA.PF; LP602 * TUE, MAY 17, 1988, 6:27 AM
```

```
/***********************************************************************
*                                                                      *
* HPAGPSM2.C - Source file for parser semantic routines                *
*                                                                      *
************************************************************************
*                                                                      *
* Agent PCODES Compiler 'C' source file                                *
* Ver X.09.01  12/15/87                                                *
*                                                                      *
*                                                                      *
*                                                                      *
*                 COPYRIGHT HEWLETT PACKARD LIMITED                    *
*                              1986                                    *
*                        ALL RIGHTS RESERVED                           *
*                                                                      *
*                                                                      *
*                                                                      *
************************************************************************
*                                                                      *
*                                                                      *
*                          MODIFICATION LOG                            *
*                                                                      *
*  08/01/87 bp - spun off from hpagpSEM.C                              *
*       12/15/87 bp - modified for new naming conventions              *
*                                                                      *
*                                                                      *
***********************************************************************/
/***********************************************************************
*                                                                      *
*                                                                      *
*                                                                      *
*       input:                                                         *
*       output:                                                        *
*       return:                                                        *
************************************************************************
*                                                                      *
*       08/28/87 bp - created                                          *
*                                                                      *
***********************************************************************/
#define NOCOMM
#include "windows.h"
#include "nwomf.h"
#include "ctype.h"
#include "doscall.h"
#include "ctrace.h"

#include "hpagpord.h"
#include "nwapi.h"
#include "hpag.h"
#include "hpagetrc.h"
#include "hpagpext.h"
```

```
/***********************************************************************
*                                                                      *
*       DefineWindow - Output PCode for the DEFWINDOW command          *
*               NOTE:  may be used to create or modify user windows    *
*                                                                      *
*       input:  name    index of window name in IDENTIFIER table       *
*               style   type of window                                 *
*               region  index of location of the window in RealTable   *
*               title   index of title in StringTable or 0 if no title *
*       output: PCode is written to object file, Ascii to Ascii PCode  *
*               file                                                   *
*       return: TRUE if success else FALSE                             *
*                                                                      *
************************************************************************
*                                                                      *
*       03/23/87 bp - created                                          *
*       08/05/37 bp - updated for stack parameters                     *
*       05/15/88 bp - modified to make stringtable global              *
*                                                                      *
***********************************************************************/
BOOL DefineWindow( name, style, region, title )
int name,
    style;
long region,
     title;
{
    AG_PCODES *pc_ptr;
    int *intptr;
    char *charptr;
    AG_REGION *rgn;
    int len, nand;
    int rtype, rval,
        ttype, tval;
    int stackparms;
    register BOOL rflag = FALSE;
    register BOOL tflag = FALSE;
    long stackparmloc;

    rtype = HIWORD( region );
    rval  = LOWORD( region );
    ttype = HIWORD( title );
    tval  = LOWORD( title );
    stackparms = 0;
    stackparmloc = 0L;

/* remember that stack parms must be in reverse order */
    if ( rtype == STACK_P ) {
        stackparms++;
        LOWORD( stackparmloc ) = 2*sizeof(int);
        rflag = TRUE;
        }

    if ( ttype == STACK_P ) {
/* remember to add one byte to title length for first blank */
        stackparms++;
        stackparmloc = rflag ?
            MAKELONG( LOWORD(stackparmloc), 2*sizeof(int)+1 ) :
            MAKELONG( LOWORD(stackparmloc),
                      2*sizeof(int) + sizeof(AG_REGION) + 1);
        tflag = TRUE;
```

```
        }

    if ( stackparms )
        OutputStackParms( AG_DEFWINDOW_PCODE, stackparms, stackparmloc );

    pc_ptr = (AG_PCODES *)gTempBuf;
    pc_ptr->idnum = AG_DEFWINDOW_PCODE;
    pc_ptr->length = AG_MIN_PCODE;
    charptr = pc_ptr->parms;
    intptr = (int *)charptr;

    if ( !(nwnd = GetWindowNum( name )) )
        return( FALSE );
    else            /* mark window as defined */
        DefUserWnd( nwnd );

/* set up the PCode */
    len = 2*sizeof(int);
    *intptr++ = nwnd;
    *intptr++ = style;

    if ( rflag )  {
        len += sizeof(int);
        *intptr++ = AG_REGION_LIT;
        }
    else  {
        len += sizeof(AG_REGION);
        rgn = GetRegion( region );
        *intptr++ = rgn->x;
        *intptr++ = rgn->y;
        *intptr++ = rgn->width;
        *intptr++ = rgn->height;
        }

    charptr = (char *)intptr;
    if ( tflag )  {
        *charptr++ = ' ';
        len += sizeof(int);
        len++;
        intptr = (int *)charptr;
        *intptr = AG_STR_LIT;
        }
    else  {
        *charptr = '\0';

        if ( tval )  {
            *charptr++ = ' ';   /* setup character to force caption bar */
            len++;
            if ( tval > 0 )
                lstrcpy( (LPSTR)charptr, GetStrLit(title) );
            else
            /* caption bar with no title string */
                *charptr = '\0';
            len += strlen( charptr );
            }
        len++;  /* for null term */
        } /* title not on stack */
    pc_ptr->length += len;

/* and write it */

    return( WritePCode( pc_ptr ) );
}  /* DefineWindow */
```

```
/*************************************************************************
*                                                                        *
*       MakePoint - converts two ints to type POINT and adds it to      *
*               the integer literal table (which is type long)          *
*                                                                        *
*       input:  x and y coordinates of the point                        *
*       output: added to integer table                                  *
*       return: index in integer table                                  *
*                                                                        *
**************************************************************************
*                                                                        *
*       03/20/87 bp - created                                           *
*       08/04/87 bp - modified to handle expressions                    *
*                                                                        *
*************************************************************************/
long MakePoint( x1, y1 )
long x1,
     y1;
{
    int xtype, ytype;
    int xval, yval;
    BOOL exchangeflag;
    POINT pnt;
    long FAR *ptr;

    xval = LOWORD( x1 );
    yval = LOWORD( y1 );
    xtype = HIWORD( x1 );
    ytype = HIWORD( y1 );
    exchangeflag = FALSE;

    if ((xtype != STACK_L) && (ytype != STACK_L) &&
        (xtype != USER_VAR) && (ytype != USER_VAR)) {
        ptr = (long FAR *)&pnt;
        pnt.x = xtype == REAL_L ? Round(xval) : GetInt(xval);
        pnt.y = ytype == REAL_L ? Round(yval) : GetInt(yval);
        return( MAKELONG( FindInt(*ptr), PNT_L) );
        }
    else  {
        PutOnStack(y1);
        exchangeflag = !PutOnStack(x1);
        if ( exchangeflag )
            OutputPCode( AG_EXCHANGE_PCODE, 0, 0L );
        OutputPCode( AG_MAKEPNT_PCODE, 0, 0L );
        return( MAKELONG(PNT_EXP, STACK_L) );
        }
}  /* MakePoint */
```

```
/*************************************************************************
*                                                                        *
*       MakeRegion - converts four ints to type AG_REGION and adds it   *
*               to the real literal table (which is type double)        *
*                                                                        *
*       input:  index of x, y coordinates in the integer literal table  *
*       .       width of the region                                     *
*               height of the region                                    *
*       output: added to real table                                     *
*       return: index in real table, 0 if error                         *
*                                                                        *
**************************************************************************
*                                                                        *
*       03/20/87 bp - created                                           *
*       08/04/87 bp - modified to handle expressions                    *
*                                                                        *
*************************************************************************/
long MakeRegion( point, width, height )
long point;
long  width,
      height;
{
    int wval, hval, pval;
    int wtype, htype, ptype;
    AG_REGION rgn;
    double FAR *ptr;
    POINT *pntptr;

    wval = LOWORD( width );
    wtype = HIWORD( width );
    hval = LOWORD( height );
    htype = HIWORD( height );
    pval = LOWORD( point );
    ptype = HIWORD( point );
    if ((wtype != STACK_L) && (htype != STACK_L) && (ptype != STACK_L) &&
        (wtype != USER_VAR) && (htype != USER_VAR) && (ptype != USER_VAR)) {
        ptr = (double FAR *)&rgn;
        pntptr = ( POINT *)(pIntTable + pval);
        rgn.x = pntptr->x;
        rgn.y = pntptr->y;
        rgn.width = GetInt( wval );
        rgn.height = GetInt( hval );
        return( MAKELONG(FindReal( *ptr ), RGN_L) );
        }

/* need to push values on the stack in correct order */
    if  (ptype == STACK_L) && (wtype == STACK_L) && (htype == STACK_L))  {
        OutputPCode( AG_[illegible]_PCODE, 0, 0L );
        OutputPCode( AG_EXCHANGE_PCODE, 0, 0L );
        OutputPCode( AG_[illegible]_PCODE, 0, 0L );
        OutputPCode( AG_EXCHANGE_PCODE, 0, 0L );
        OutputPCode( AG_[illegible]_PCODE, 0, 0L );
        OutputPCode( AG_EXCHANGE_PCODE, 0, 0L );
        OutputPCode( AG_[illegible]_PCODE, 0, 0L );
            /* if all parms on stack */
    else  {
        if ( ptype == STACK_L )  {
        /* get point on top */
            if ((wtype == STACK_L) || (htype == STACK_L))
```

```
                OutputPCode( AG_EXCHANGE_PCODE, 0, 0L );
        /* pop it to temp variable */
            OutputPCode( AG_POP_PCODE, 0, 0L );
            }
        PutOnStack( height );
        if ( !PutOnStack( width ) )
            OutputPCode( AG_EXCHANGE_PCODE, 0, 0L );
    /* get the point back on */
        if ( ptype == STACK_L )
            OutputPCode( AG_PUSH_PCODE, 0, 0L );
        else
            PutOnStack( point );
        }  /* else, all parms not on stack */

    OutputPCode( AG_MAKERGN_PCODE, 0, 0L );
    return( MAKELONG(RGN_EXP, STACK_L) );

}  /* MakeRegion */
```

```
/*************************************************************************
*                                                                        *
*       MakeMinus - routine checks if value is a literal and if so      *
*               returns negative of it.  If not, emits to pcodes to     *
*               create the negative on the stack.                       *
*                                                                        *
*       input:  yylval form of expression to negate                     *
*       output: OpPcode may be called to emit pcodes                    *
*       return: yylval form of negated expression                       *
*                                                                        *
**************************************************************************
*                                                                        *
*       07/15/87 bp - created                                           *
*                                                                        *
*************************************************************************/
long MakeMinus( term )
long term;
{
    long result;
    register int type, index, newindex;

    type = HIWORD( term );
    index = LOWORD( term );

    if ( type == INT_L ) {
        newindex = FindInt( -GetLong(index) );
        result = newindex ? MAKELONG(newindex, type) : 0L;
        }
    else if ( type == REAL_L )  {
        newindex = FindReal( -GetDouble(index) );
        result = newindex ? MAKELONG(newindex, type) : 0L;
        }
    else  {
        OpPCode( MINUS, term, 0L );
        result = MAKELONG( NUM_EXP, STACK_L );
        }

    return( result );
}  /* MakeMinus */
```

```
/************************************************************************
*                                                                       *
*       SetPCode - outputs the PCode instruction to the Object buffer   *
*                                                                       *
*       input:  index to location in StringLiteralTable of PCode        *
*               instruction as string of ASCII hex characters           *
*       output: written to Object buffer                                *
*       return: TRUE if no error else FALSE                             *
*                                                                       *
*************************************************************************
*                                                                       *
*       03/20/87 bp - created                                           *
*       05/12/88 bp - modified to add doscall routines                  *
*                                                                       *
************************************************************************/
SetPCode( index )
int index;
{
    int len;
    LPSTR pstr;
    static BYTE bytefield;

    len = lstrlen( (pstr = GetStrLit( index )) );
/* output to Ascii PCode file */
    lowrite( fPCodes, pstr, len );
    lowrite( fPCodes, (LPSTR)CRLF, 2 );

    if ( (curraddr.offset + len) >= PAGESIZE )  {
        if ( !WritePage() )
            return( FALSE );
        }

/* translate to binary hex; no checking */
    while ( *pstr )  {
        bytefield = asctohex( pstr );
        pstr += 2;
        AddtoPage( &bytefield, 1 );
        }
    return( TRUE );
}  /* SetPCode */
```

```
/************************************************************************
*                                                                       *
*       SetPCommand - outputs the PCommand instruction to the Object    *
*               buffer.  The PCommand is the length, PCode for command, *
*               and class id prefix for a succeeding PCODE command.     *
*               The PCODE command should immediately follow the         *
*               PCOMMAND command.                                       *
*                                                                       *
*       input:  index to length of PCODE command in num lit table       *
*       output: written to Object buffer                                *
*               uses global gTempBuf                                    *
*       return: TRUE if no error else FALSE                             *
*                                                                       *
*************************************************************************
*                                                                       *
*       02/04/88 bp - created                                           *
*       05/12/88 bp - modified to add doscall routines                  *
*                                                                       *
************************************************************************/
SetPCommand( index )
int index;
{
    AG_PCODES *pc_ptr;
    register int i;
    int *intptr;
    char *pstr, *charptr;
    CLASS *cls_ptr;

    pc_ptr = (AG_PCODES *)gTempBuf;
    pc_ptr->idnum = AG_COMMAND_PCODE;
    pc_ptr->length = AG_MIN_PCODE + sizeof(int) + GetInt( index );
    intptr = (int *)(pc_ptr->parms);

    if ( currfocus == NO_FOCUS )  {
        SetErrMsg( IDS_NOFOCUS );
        return( FALSE );
        }
    else  {
        cls_ptr = GetClassEntry( currfocus );
        *intptr = cls_ptr->classid;
        }

    if ( (curraddr.offset + pc_ptr->length) >= PAGESIZE )  {
        if ( !WritePage() )
            return( FALSE );
        }
    charptr = (char *)pc_ptr;
    AddtoPage( charptr, AG_MIN_PCODE + sizeof(int) );

/* output to Ascii PCode file */
    pstr = filename;
    for ( i=0; i < AG_MIN_PCODE + sizeof(int); i++ )
        hextoasc( *charptr++, (LPSTR)pstr );
        pstr += 2;

    lowrite( fPCodes, (LPSTR)filename, 2*(AG_MIN_PCODE + sizeof(int)) );
    lowrite( fPCodes, (LPSTR)CRLF, 2 );

    return( TRUE );
```

```
}  /* SetPCommand */
```

```
/***********************************************************************
*                                                                      *
*       OutputPCode2 - general routine to output pcodes to the         *
*               Object file.  Used by commands which have too many     *
*               YYLVALs for OutputPCode.                               *
*                                                                      *
*       input:  PCode id number                                        *
*               longparm1, longparm2  are parameter information,       *
*               command dependent                                      *
*       output: instruction is written to the object file buffer       *
*       return: none                                                   *
*                                                                      *
************************************************************************
*                                                                      *
*       06/29/87 bp - created                                          *
*                                                                      *
***********************************************************************/
void OutputPCode2( PCode_id, longparm1, longparm2 )
int  PCode_id;
long longparm1,
     longparm2;
{
    AG_PCODES *pc_ptr;
    int len = 0;
    int type1, index1;
    int type2, index2;
    int numparms = 0;
    BOOL stack1, stack2;
    int *intptr;
    char *charptr;

    index1 = LOWORD( longparm1 );
    stack1 = ( (type1 = HIWORD( longparm1 )) == STACK_L );

    index2 = LOWORD( longparm2 );
    stack2 = ( (type2 = HIWORD( longparm2 )) == STACK_L );

/* output any stack parms */
    intptr = (int *)tfilename;

    if ( stack1 )  {
        *intptr++ = 0;
        numparms++;
        }
    if ( stack2 )  {
        *intptr = sizeof(int);
        numparms++;
        }

    if ( numparms )
        OutputPCode( AG_STACK_PARMS_PCODE, numparms, (LPINT)tfilename );

    pc_ptr = (AG_PCODES *)gTempbuf;
    pc_ptr->idnum = PCode_id;
    pc_ptr->length = AG_MIN_PCODE;
    charptr = pc_ptr->parms;
    intptr = (int *)charptr;
    len = 0;
```

```
    switch ( PCode_id )  {

case AG_BEEP_PCODE:
case AG_SCREEN_PCODE:
/*
    longparm1, longparm2 are yylvals of integer expressions
*/
        *intptr++ = stack1 ? AG_INT_LIT : Convert2Int( longparm1 );
        *intptr++ = stack2 ? AG_INT_LIT : Convert2Int( longparm2 );
        len += 2*sizeof( int );
        break;

default:
        yyerror();
        return;
        break;
        }  /* switch */
    pc_ptr->length += len;
    WritePCode( pc_ptr );

}  /* OutputPCode2 */
```

```
/***********************************************************************
 *                                                                     *
 *      OutputFunction - general routine to output the function pcodes *
 *              to the Object file.  The result will be left on the    *
 *              stack, type is function dependent.  Parameter and      *
 *              function information on this function is popped.       *
 *                                                                     *
 *      input:  none                                                   *
 *      output: instruction is written to the object file buffer,      *
 *              globals referencing function table and parm table will *
 *      return: function type                                          *
 *                                                                     *
 ***********************************************************************
 *                                                                     *
 *      07/07/87 bp - created                                          *
 *                                                                     *
 ***********************************************************************/
OutputFunction( )
{
    register int i, fcttype;
    int len;
    int numparms, fctparms;
    int stackparms = 0;
    AG_PCODES *pc_ptr;
    AG_PCODES *sp_ptr;
    FNCT *fctptr;
    LPFUNCTIONINFO fctinfo;
    long *parmtype;
    int *intptr, *parmptr, *perminfo, *fctlen;
    char *charptr;

    fctptr = GetFunction(curr_function);
    fctinfo = GetFunctionInfo(fctptr->info_index);
    parmtype = GetParm(fctptr->parm_index);
    perminfo = fctinfo->parms;
    numparms = fctptr->numparms;
    fctparms = fctinfo->numparms;

    if ( numparms < fctinfo->reqparms )  {
        SetErrMsg( IDS_BADFCT );
        return( FALSE );
        }

/* get number of parms on the stack and set up stackparm pcode */
    for ( i = 0; i < numparms; i++ )  {
        if ( HIWORD(parmtype[i]) == STACK_L )
            stackparms++;
        }
    if ( len = stackparms ?
                AG_MIN_PCODE + (stackparms + 1)*sizeof(int)) : 0 )  {
        sp_ptr = (AG_PCODES *)gTempBuf;
        sp_ptr->length = len;
        sp_ptr->idnum = AG_STACK_PARMS_PCODE;
        parmptr = (int *)(sp_ptr->parms);
        *parmptr++ = stackparms;
        }

    pc_ptr = (AG_PCODES *)(gTempBuf + len);
```

```
    pc_ptr->idnum = AG_FUNCTION_PCODE;
    pc_ptr->length = AG_MIN_PCODE;
    intptr = (int *)(pc_ptr->parms);
    *intptr++ = fctinfo->classid;
    fctlen = intptr++;                    /* placeholder for function length */
    *intptr++ = fctinfo->idnum;
    *intptr++ = fctinfo->type;
    *intptr++ = numparms;
    len =  5*sizeof(int);
    fctparms--;           /* stop on last parm */

    for ( i = 0; i < numparms; i++, parminfo++ )  {
        charptr = pc_ptr->parms + len;
        if ( !CheckParmType( *parminfo, *parmtype ) )  {
            SetErrMsg( IDS_BADFCT );
            return( FALSE );
            }

        if ( HIWORD(*parmtype) == STACK_L )  {
            *parmptr++ = len;
            intptr = (int *)charptr;
            *intptr = *parminfo;
            len += sizeof(int);
            }
        else
            len += CopyParm( *parminfo, *parmtype, charptr );

        if ( i < fctparms )
            parmtype++;
        }  /* for */

    if ( stackparms )
        WritePCode( sp_ptr );

    pc_ptr->length += len;
    *fctlen = len - sizeof(int);                /* classid word */
    WritePCode( pc_ptr );

/* reset globals numflag and strflag */
    fcttype = ConvertType( fctinfo->type );
    numflag = fcttype == NUM_EXP ? TRUE : fctptr->numflag;
    strflag = fcttype == STR_EXP ? TRUE : fctptr->strflag;

/* clean up function information stuff */
    next_parm = fctptr->parm_index;
    next_function = curr_function--;

/* set return value */
    return( fcttype );

}  /* OutputFunction */
```

```
/*****************************************************************
*                                                                *
*       SetSysVarPCode - general routine to value of a system variable  *
*                                                                *
*       input:  variable id number                               *
*               flag is parameter information, used for SYS_ESCAPE *
*               dataparm is new value of the system variable, type is *
*               variable dependent                               *
*       output: instruction is written to object file buffer     *
*               uses global gTempBuf                             *
*       return: none                                             *
*                                                                *
******************************************************************
*                                                                *
*       02/04/88 bp - created                                    *
*                                                                *
*****************************************************************/
void SetSysVarPCode( VariableId, flag, Dataparm )
int     VariableId,
        flag;
long    Dataparm;
{
    AG_PCODES *pc_ptr;
    int len = 0;
    int type1, index1;
    BOOL stackflag;
    int *intptr;
    char *charptr;

    index1 = LOWORD( Dataparm );
    stackflag = ( (type1 = HIWORD( Dataparm )) == STACK_L );

/* output any stack parms */
    intptr = (int *)tfilename;

    if ( stackflag )  {
        *intptr = ( VariableId == AG_SYSESCAPE_ID ) ?
                        2*sizeof(int) : sizeof(int);
        OutputPCode( AG_STACK_PARMS_PCODE, 1, (LPINT)tfilename );
        }

    pc_ptr = (AG_PCODES *)gTempBuf;
    pc_ptr->idnum = AG_SET_SYSVAR_PCODE;
    pc_ptr->length = AG_MIN_PCODE;
    intptr = (int *)(pc_ptr->parms);
    *intptr++ = VariableId;
    len =  sizeof(int);

    switch ( VariableId )  {

case AG_SYSRATE_ID:
case AG_SYSTIMEOUT_ID:
/*
    Dataparm is a yylval of an integer expression
*/
        *intptr++ = stackflag ? AG_INT_LIT : Convert2Int( Dataparm );
        len += sizeof( int );
        break;
```

```
case AG_SYSESCAPE_ID:
/*
    Dataperm is a yylval of a string expression
    flag contains ALT, CTRL information
*/
        *intptr++ = flag;
        charptr = (char *)intptr;
        len += sizeof(int);
        if ( stackflag )  {
            *intptr = AG_STR_LIT;
            len += sizeof(int);
            }
        else  {
            *charptr = '\0';
            lstrcpy( (LPSTR)charptr, GetStrLit( indexl ) );
            len += strlen( charptr ) + 1;        /* term '\0' */
            } /* type is string literal */
        break;

default:
        yyerror();
        return;
        break;
        }  /* switch */
    pc_ptr->length += len;
    writePCode( pc_ptr );

}  /* SetSysvarPCode */
```

```
#S3771; #O9324 * BARBARA.PF; LP602 * TUE, MAY 17, 1988, 6:27 AM
#S3771; #O9324 * BARBARA.PF; LP602 * TUE, MAY 17, 1988, 6:27 AM
#S3771; #O9324 * BARBARA.PF; LP602 * TUE, MAY 17, 1988, 6:27 AM

#S3771; #O9324 * BARBARA.PF; LP602 * TUE, MAY 17, 1988, 6:27 AM
#S3771; #O9324 * BARBARA.PF; LP602 * TUE, MAY 17, 1988, 6:27 AM
#S3771; #O9324 * BARBARA.PF; LP602 * TUE, MAY 17, 1988, 6:27 AM

#S3771; #O9324 * BARBARA.PF; LP602 * TUE, MAY 17, 1988, 6:27 AM
#S3771; #O9324 * BARBARA.PF; LP602 * TUE, MAY 17, 1988, 6:27 AM
#S3771; #O9324 * BARBARA.PF; LP602 * TUE, MAY 17, 1988, 6:27 AM

#S3771; #O9324 * BARBARA.PF; LP602 * TUE, MAY 17, 1988, 6:27 AM
#S3771; #O9324 * BARBARA.PF; LP602 * TUE, MAY 17, 1988, 6:27 AM
#S3771; #O9324 * BARBARA.PF; LP602 * TUE, MAY 17, 1988, 6:27 AM
```

```
#S3771; #O9325  *  BARBARA.PF; LP602  *  TUE, MAY 17, 1988,  6:27 AM
#S3771; #O9325  *  BARBARA.PF; LP602  *  TUE, MAY 17, 1988,  6:27 AM
#S3771; #O9325  *  BARBARA.PF; LP602  *  TUE, MAY 17, 1988,  6:27 AM

#S3771; #O9325  *  BARBARA.PF; LP602  *  TUE, MAY 17, 1988,  6:27 AM
#S3771; #O9325  *  BARBARA.PF; LP602  *  TUE, MAY 17, 1988,  6:27 AM
#S3771; #O9325  *  BARBARA.PF; LP602  *  TUE, MAY 17, 1988,  6:27 AM

#S3771; #O9325  *  BARBARA.PF; LP602  *  TUE, MAY 17, 1988,  6:27 AM
#S3771; #O9325  *  BARBARA.PF; LP602  *  TUE, MAY 17, 1988,  6:27 AM
#S3771; #O9325  *  BARBARA.PF; LP602  *  TUE, MAY 17, 1988,  6:27 AM

#S3771; #O9325  *  BARBARA.PF; LP602  *  TUE, MAY 17, 1988,  6:27 AM
#S3771; #O9325  *  BARBARA.PF; LP602  *  TUE, MAY 17, 1988,  6:27 AM
#S3771; #O9325  *  BARBARA.PF; LP602  *  TUE, MAY 17, 1988,  6:27 AM
```

```
/**********************************************************************
*                                                                     *
* HPAGPSC2.C - Source file for scanner and associated routines        *
*                                                                     *
***********************************************************************
*                                                                     *
* Agent PCODES Compiler 'C' source file                               *
* Ver X.09.01  12/15/87                                               *
*                                                                     *
*                                                                     *
*                                                                     *
*                                                                     *
*                  COPYRIGHT HEWLETT PACKARD LIMITED                  *
*                               1986                                  *
*                        ALL RIGHTS RESERVED                          *
*                                                                     *
*                                                                     *
*                                                                     *
***********************************************************************
*                                                                     *
*                                                                     *
*                        MODIFICATION LOG                             *
*                                                                     *
*       08/02/87 bp - spun off from hpagpscn.c                        *
*       12/15/87 bp - modified for new naming conventions             *
*                                                                     *
*                                                                     *
**********************************************************************/
/**********************************************************************
*                                                                     *
*                                                                     *
*                                                                     *
*       input:                                                        *
*       output:                                                       *
*       return:                                                       *
*                                                                     *
***********************************************************************
*                                                                     *
*       04/17/88 bp - created                                         *
*                                                                     *
**********************************************************************/
#define NOCOMM
#include "windows.h"
#include "nwomf.h"
#include "ctype.h"
#include "doscall.h"
#include "ctrace.h"

#include "hpagpprd.h"
#include "nwapi.h"
#include "hpag.h"
#include "hpagatrc.h"
#include "hpagpext.h"
```

```
/**********************************************************************
*                                                                     *
*       scanexpr  - is called by yylex if in the expression parser.  It *
*                 updates the expression flag and source buffer state, *
*                 calls yylexi, checks validity of returned token for  *
*                 expressions and returns.                            *
*       input:  none                                                  *
*       output: possible pcodes for expression evaluation may be      *
*               generated.                                            *
*       return: token type                                            *
*                                                                     *
***********************************************************************
*                                                                     *
*       05/27/87 bp - created                                         *
*                                                                     *
**********************************************************************/
int scanexpr()
{
    int token;
    static int parencount;          /* to balance parenthesis */
    static BOOL litflag;            /* don't allow two operands in a row */

    switch ( expressionstate )  {

case 0: /* begin expression parser */
case 4: /* begin another expression before cleanup of last one */
        expressionstate++;
        parencount = 0;
        litflag = TRUE;
        return( expressiontype );
        break;

case 1: /* in expression parser */
    /* fetch the token */
        token = yylexi();
        if ( CheckExprToken( token, &parencount, &litflag ) )
            return( token );
        else  {
            expressionstate++;
            lasttoken = token;
            memcpy( (char *)&lastlval, (char *)&yylval, sizeof(YYSTYPE) );
            return( END_OF_PROG );
            }
        break;
case 2: /* return yyparsexpr token and yylval */
        expressionstate++;
        gErrorflag = TRUE;
        memcpy( (char *)&yylval, (char *)&exprlval, sizeof(YYSTYPE) );
        return( exprtoken );
        break;
case 3: /* cleanup */
        expressionflag = FALSE;
        expressionstate = 0;
        memcpy( (char *)&yylval, (char *)&lastlval, sizeof(YYSTYPE) );
        return( lasttoken );
        break;
case 5: /* cleanup while in another expression */
        expressionstate = 1;
        if ( CheckExprToken( lasttoken, &parencount, &litflag ) ) {
```

```
            memcpy( (char *)&yylval, (char *)&lastlval, sizeof(YYSTYPE) );
            return( lasttoken );
            }
        else  {
            expressionstate++;
            return( END_OF_PROG );
            }
        break;
        }  /* end of switch */
}  /* scanexpr */
```

```
/***********************************************************************
*                                                                      *
*       CheckExprToken - checks value of token to see if it is         *
*               compatible with expression.  Matches '(' and ')'.      *
*                                                                      *
*       input:  token value                                            *
*               current parenthesis count                              *
*               litflag - set to TRUE if token may be an operand       *
*       output: none, parencount and/or litflag may be updated         *
*       return: TRUE if ok else FALSE                                  *
*                                                                      *
************************************************************************
*                                                                      *
*       05/27/87 bp - created                                          *
*                                                                      *
***********************************************************************/
BOOL CheckExprToken( token, parencount, litflag )
int token,
    *parencount,
    *litflag;
{
    if (( ( token == INT_L ) ||
        ( token == REAL_L ) ||
        ( token == STR_L ) ||
        ( token == USER_VAR ) ||
        ( token == FUNCTION ) ||
        ( token == SYS_VAR ) ) &&
        ( *litflag )) {
        *litflag = FALSE;
        return( TRUE );
        }
    else if ((token == ')') && (--(*parencount) >= 0)) {
        *litflag = FALSE;
        return( TRUE );
        }
    else if (
        ( token == '+' ) ||
        ( token == '-' ) ||
        ( token == '*' ) ||
        ( token == '/' ) ||
        ( token == '=' ) ||
        ( token == '<' ) ||
        ( token == '>' ) ||
        ( token == LE_SYM ) ||
        ( token == GE_SYM ) ||
        ( token == NE_SYM ) ||
        ( token == AND_[illegible] ) ||
        ( token == OR_[illegible] ) ||
        ( token == [illegible] ) ) {
        *litflag = TRUE;
        return( TRUE );
        }
    else if ( token == '(' ) {
        (*parencount)++;
        *litflag = TRUE;
        return( TRUE );
        }
    else if ( (token == ',') && *parencount ) {
        *litflag = TRUE;
```

```
        return( TRUE );
        }
    else
        return( FALSE );
} /* CheckExprToken */
```

```
/*****************************************************************
*                                                                *
*       SaveExprValue - at the conclusion of an expression parse, saves *
*               yylval so it can be returned to the parent parser *
*                                                                *
*       input:  expected token type                              *
*               value of parser                                  *
*       output: exprlval is set                                  *
*       return: none                                             *
*                                                                *
******************************************************************
*                                                                *
*       05/27/87 bp - created                                    *
*                                                                *
*****************************************************************/
VOID PASCAL SaveExprValue( tokentype, value )
int tokentype;
long value;
{
    int type;

    type = HIWORD( value );

    if ( (type != USER_VAR) && (type != SYS_VAR) )
        exprlval.lval = value;
    else  {
        PutOnStack( value );
        exprlval.lval = MAKELONG( tokentype, STACK_L );
        }
    exprtoken = tokentype;
} /* SaveExprValue */
```

```
/*************************************************************************
 *                                                                       *
 *      MakeExpression - calls the expression parser from the class      *
 *              independent parser. internal routine called by           *
 *              MakeExpression                                           *
 *                                                                       *
 *      input:  type of expression required, or several types OR'ed      *
 *      output: pcodes to process expression will be generated           *
 *      return: TRUE if success else FALSE                               *
 *                                                                       *
 *************************************************************************
 *                                                                       *
 *      06/02/87 bp - created                                            *
 *                                                                       *
 *************************************************************************/
VOID FAR PASCAL MakeExpression( exprtype )
int exprtype;
{

/* initialize the global variables */
    gErrorflag = FALSE;         /* no messages from expression parser */
    if ( expressionflag )  expressionstate++ ;
    else expressionstate = 0;
    expressionflag = TRUE;
    expressiontype = exprtype;
    numflag = ( (exprtype == NUM_EXP) ||
                (exprtype == PNT_EXP) ||
                (exprtype == RGN_EXP) );
    strflag = (exprtype == STR_EXP);

/* parse the expression */
    if ( (yyparsexpr()) || (numflag && strflag) )
    /* there was an error, so set exprtoken accordingly */
        exprtoken = ERR_EXP;
    gErrorflag = TRUE;
} /* MakeExpression */
```

```
/*************************************************************************
 *                                                                       *
 *      Externalyylex - called by yylex in the class dependent parsers.  *
 *              returns token types for use by dependent parsers.  Note  *
 *              that class dependent keywords will be returned as user   *
 *              symbols.                                                 *
 *                                                                       *
 *      input:  none                                                     *
 *      output: value of token is returned in exttoken                   *
 *              value of yylval is returned in extyylval                 *
 *      return: far pointer to value if a literal                        *
 *                                                                       *
 *************************************************************************
 *                                                                       *
 *      08/18/87 bp - created                                            *
 *      05/16/88 bp - modified to make stringtable global                *
 *                                                                       *
 *************************************************************************/
LPSTR FAR PASCAL Externalyylex( exttoken, extyylval )
LPINT exttoken;
LPINT extyylval;
{
    int token, type, index;
    LPSTR rtnvalue = NULL;

/* call the scanner */
    if ( gEndProgflag )
        *exttoken = token = END_OF_PROG;
    else  {
        token = yylex();
        *exttoken = token == END_OF_PROG ? 0 : token;
        if (!(*exttoken))
            return( rtnvalue );
        }
    type = HIWORD( yylval.lval );
    index = LOWORD( yylval.lval );

    switch ( token )  {

 case INT_L:
 case PNT_L:
 case REAL_L:
 case RGN_L:
 case STR_L:
 case STACK_L:
 case ANY_EXP:
 case NUM_EXP:
 case STR_EXP:
 case RGN_EXP:
 case PNT_EXP:
 case LIST_EXP:
 case NO_EXP:
        lstrmove( (LPSTR)extyylval, (LPSTR)&yylval, sizeof(YYSTYPE) );

        switch ( type ) {
    case INT_L:
    case PNT_L:
            rtnvalue = (LPSTR)(pIntTable + index);
            break;
```

```
    case REAL_L:
    case RGN_L:
            rtnvalue = (LPSTR)(pRealTable + index);
            break;
    case STR_L:
            rtnvalue = GetStrLit(index);
            break;
    default:
            break;
            }  /* end of inner switch */
        break;

case USER_SYMBOL:
case USER_LABEL:
case USER_WINDOW:
        *exttoken = USER_SYMBOL;
case CLASS_SYMBOL:
        rtnvalue = GetStringTable(((pSpellings + yylval.ival)->name));
        break;

case USER_VAR:
case USER_ARRAY:
case SYS_VAR:
        lstrmove( (LPSTR)extyylval, (LPSTR)&yylval, sizeof(YYSTYPE) );
case LINE_END:
        gEndProgflag = TRUE;
        break;
case END_OF_PROG:
        gEndProgflag = FALSE;
        break;

default:
        if ( (pSpellings + yylval.ival)->type == KEYWORD )  {
            *exttoken = USER_SYMBOL;
            rtnvalue = GetStringTable(
                    ((pSpellings + yylval.ival)->name) );
            }
        else  {
            lstrmove( (LPSTR)extyylval, (LPSTR)&yylval, sizeof(YYSTYPE) );
            }
        }  /* end switch */

    return( rtnvalue );
}  /* Externalyylex */
```

```
/***************************************************************************
*                                                                         *
*       MakeToken - calls MakeExpression and sets exprtoken to the type   *
*               of token rather the type of expression                    *
*                                                                         *
*       input:  type of expression required                               *
*       output: if no error, exprtoken is modified                        *
*       return: none                                                      *
*                                                                         *
***************************************************************************
*                                                                         *
*       07/16/87 bp - created                                             *
*                                                                         *
***************************************************************************/
void MakeToken( exprtype )
int exprtype;
{
    MakeExpression( exprtype );

    if ( (exprtoken != ERR_EXP) && (exprtoken != NO_EXP) )
        exprtoken = HIWORD(exprlval.ival);
}  /* MakeToken */
```

```
/*********************************************************************
*                                                                    *
*       GetStringEntry - returns pointer to entry in StringTable     *
*                                                                    *
*       input:  index to StringTable                                 *
*       output: none                                                 *
*       return: long pointer to StringTable entry                    *
*                                                                    *
**********************************************************************
*                                                                    *
*       04/17/88 bp - created                                        *
*       05/18/88 bp - modified to make stringtable global            *
*                                                                    *
*********************************************************************/
LPSTR FAR PASCAL GetStringEntry( index )
int index;
{
    return( GetStringTable( index ) );
} /* GetStringEntry */
```

```
/*********************************************************************
*                                                                    *
*       GetLiteral - find value of literal in CIP literal table for  *
*               CDP parser                                           *
*                                                                    *
*       input:  index - of literal in literal table                  *
*               type  - of literal                                   *
*       output: none                                                 *
*       return: long pointer to literal                              *
*                                                                    *
**********************************************************************
*                                                                    *
*       04/17/88 bp - created                                        *
*       05/18/88 bp - modified to make stringtable global            *
*                                                                    *
*********************************************************************/
LPSTR FAR PASCAL GetLiteral( index, type )
int index;
int type;
{
    switch ( type )  {
case AG_STR_LIT:
        return( GetStrLit( index ) );
        break;
case AG_INT_LIT:
case AG_LONG_LIT:
case AG_POINT_LIT:
        return( (LPSTR)(pIntTable + index) );
        break;
case AG_REAL_LIT:
case AG_DOUBLE_LIT:
case AG_REGION_LIT:
        return( (LPSTR)(pRealTable + index) );
        break;
default:
        return( 0 );
        }
}
/* GetLiteral */
```

```
#S3771; #O9325  *  BARBARA.PF; LP602  *  TUE, MAY 17, 1988,  6:27 AM
#S3771; #O9325  *  BARBARA.PF; LP602  *  TUE, MAY 17, 1988,  6:27 AM
#S3771; #O9325  *  BARBARA.PF; LP602  *  TUE, MAY 17, 1988,  6:27 AM

#S3771; #O9325  *  BARBARA.PF; LP602  *  TUE, MAY 17, 1988,  6:27 AM
#S3771; #O9325  *  BARBARA.PF; LP602  *  TUE, MAY 17, 1988,  6:27 AM
#S3771; #O9325  *  BARBARA.PF; LP602  *  TUE, MAY 17, 1988,  6:27 AM

#S3771; #O9325  *  BARBARA.PF; LP602  *  TUE, MAY 17, 1988,  6:27 AM
#S3771; #O9325  *  BARBARA.PF; LP602  *  TUE, MAY 17, 1988,  6:27 AM
#S3771; #O9325  *  BARBARA.PF; LP602  *  TUE, MAY 17, 1988,  6:27 AM

#S3771; #O9325  *  BARBARA.PF; LP602  *  TUE, MAY 17, 1988,  6:27 AM
#S3771; #O9325  *  BARBARA.PF; LP602  *  TUE, MAY 17, 1988,  6:27 AM
#S3771; #O9325  *  BARBARA.PF; LP602  *  TUE, MAY 17, 1988,  6:27 AM
```

```
#S3771; #O9326 * BARBARA.PF; LP602 * TUE, MAY 17, 1988, 6:27 AM
#S3771; #O9326 * BARBARA.PF; LP602 * TUE, MAY 17, 1988, 6:27 AM
#S3771; #O9326 * BARBARA.PF; LP602 * TUE, MAY 17, 1988, 6:27 AM

#S3771; #O9326 * BARBARA.PF; LP602 * TUE, MAY 17, 1988, 6:27 AM
#S3771; #O9326 * BARBARA.PF; LP602 * TUE, MAY 17, 1988, 6:27 AM
#S3771; #O9326 * BARBARA.PF; LP602 * TUE, MAY 17, 1988, 6:27 AM

#S3771; #O9326 * BARBARA.PF; LP602 * TUE, MAY 17, 1988, 6:27 AM
#S3771; #O9326 * BARBARA.PF; LP602 * TUE, MAY 17, 1988, 6:27 AM
#S3771; #O9326 * BARBARA.PF; LP602 * TUE, MAY 17, 1988, 6:27 AM

#S3771; #O9326 * BARBARA.PF; LP602 * TUE, MAY 17, 1988, 6:27 AM
#S3771; #O9326 * BARBARA.PF; LP602 * TUE, MAY 17, 1988, 6:27 AM
#S3771; #O9326 * BARBARA.PF; LP602 * TUE, MAY 17, 1988, 6:27 AM
```

```
/****************************************************************************
 *                                                                          *
 * HPAGPBF2.C - Source file for buffer managing routines                    *
 *                                                                          *
 ****************************************************************************
 *                                                                          *
 * Agent PCODES Compiler 'C' source file                                    *
 * Ver X.09.01  12/15/87                                                    *
 *                                                                          *
 *                                                                          *
 *                    COPYRIGHT HEWLETT PACKARD LIMITED                     *
 *                                  1986                                    *
 *                          ALL RIGHTS RESERVED                             *
 *                                                                          *
 ****************************************************************************
 *                                                                          *
 *                            MODIFICATION LOG                              *
 *                                                                          *
 *      07/09/87 bp - spun off from AGENTBUF                                *
 *      12/15/87 bp - modified for new naming conventions                   *
 *      05/16/88 bp - modified to make stringtable global                   *
 *                                                                          *
 ****************************************************************************/
/****************************************************************************
 *                                                                          *
 *      input:                                                              *
 *      output:                                                             *
 *      return:                                                             *
 ****************************************************************************
 *                                                                          *
 *      07/09/87 bp - created                                               *
 ****************************************************************************/
#define NOCOMM
#include "windows.h"
#include "nwomf.h"
#include "ctype.h"
#include "doscall.h"
#include "ctrace.h"

#include "hpagpor0.h"
#include "nwapi.h"
#include "hpag.h"
#include "hpagatrc.h"
#include "hpagpext.h"
```

```
/****************************************************************************
 *                                                                          *
 *      PutStrLit - checks if string literal is already in StringTable      *
 *                  and if not, inserts it and adds it to the literal table.*
 *                                                                          *
 *      input:  string literal                                              *
 *      output: none                                                        *
 *      return: index in the string literal table                           *
 *                                                                          *
 ****************************************************************************
 *                                                                          *
 *      03/11/87 bp - created                                               *
 *      05/16/88 bp - modified to make stringtable global                   *
 *                                                                          *
 ****************************************************************************/
int PASCAL PutStrLit( literal )
LPSTR literal;
{
    int i, ii, newsize;
    int *sl_ptr;

    for (       i=0, sl_ptr = pStrlitTable;
                ((i < next_str) && CmpStringTable( *sl_ptr, literal));
                i++, sl_ptr++);

    if ( i >= strlit_size )  {
        newsize = strlit_size + NUM_LITS;
        if ( !ExpandTable( &hStrlitTable, newsize*sizeof(int) ) )
            return( 0 );
        else
            strlit_size = newsize;
        }
    if ( i == next_str )  {
    /* no match */
    /* use temporary variable to assure validity of pStrlitTable */
        if ( ii = PutStringTable( literal ) )  {
            *(pStrlitTable + i) = ii;
            next_str++;
            }
        else i = 0;
        }
    return( i );
} /* PutStrLit */
```

```
/*********************************************************************
*                                                                    *
*       PutIntLit - converts string to integer binary form, checks   *
*               if numeric literal is already in appropriate         *
*               table and if not, adds it.                           *
*                                                                    *
*       input:  string numeric literal                               *
*       output: none                                                 *
*       return: index in the literal table                           *
*                                                                    *
**********************************************************************
*                                                                    *
*       03/11/87 bp - created                                        *
*       03/20/87 bp - spun off from PutNumLit                        *
*                                                                    *
*********************************************************************/
PutIntLit( literal )
char *literal;
{
    long l_int;

    l_int = atol( literal );
    return( FindInt( l_int ) );

} /* PutIntLit */
```

```
/*********************************************************************
*                                                                    *
*       FindInt - checks if long literal is in the integer table and *
*               if not, adds it.                                     *
*                                                                    *
*       input:  long literal                                         *
*       output: none                                                 *
*       return: index in the integer table, 0 if error               *
*                                                                    *
**********************************************************************
*                                                                    *
*       03/11/87 bp - created                                        *
*       03/20/87 bp - spun off from PutNumLit                        *
*                                                                    *
*********************************************************************/
int FAR PASCAL FindInt( long_int )
long long_int;
{
    int i, newsize;
    long *lptr;

    for ( i=0, lptr = pIntTable;
        ((i < next_int) && (long_int != *lptr)); i++, lptr++);

    if ( i >= intlit_size )  {
        newsize = intlit_size + NUM_LITS;
        if ( !ExpandTable( &hIntTable, newsize*sizeof(long) ) )
            return( 0 );
        else
            intlit_size = newsize;
        }
    if (i == next_int)  {
        *(pIntTable + i) = long_int;
        next_int++;
        }
    return( i );
} /* FindInt */
```

```
/*********************************************************************
*                                                                    *
*       PutRealLit - converts string to double binary form, checks   *
*               if numeric literal is already in appropriate         *
*               table and if not, adds it.                           *
*                                                                    *
*       input:  string numeric literal                               *
*       output: none                                                 *
*       return: index in the literal table                           *
*                                                                    *
**********************************************************************
*                                                                    *
*       03/11/87 bp - created                                        *
*       03/20/87 bp - spun off from PutNumLit                        *
*                                                                    *
*********************************************************************/
PutRealLit( literal )
char *literal;
{

    double d_real;

    d_real = atof( literal );
    return( FindReal( d_real) );

} /* PutRealLit */
```

```
/*********************************************************************
*                                                                    *
*       FindReal - checks if real is in table and if not, adds it.   *
*                                                                    *
*       NOTE:   THIS ROUTINE COMPARES THE INPUT VALUE WITH THE VALUES *
*               IN THE REAL LITERAL TABLE ON A WORD BY WORD BASIS RATHER*
*               THAN CALLING THE LIBRARY FP COMPARE ROUTINES SINCE THEY *
*               (APPARENTLY) MAKE SOME SORT OF MAGNITUDE CHECK WHICH *
*               CAUSES SOME REGION VALUES TO BE MARKED EQUAL WHEN IN *
*               FACT THEY ARE NOT!!!                                 *
*                                                                    *
*       input:  double                                               *
*       output: none                                                 *
*       return: index in the literal table, 0 if error               *
*                                                                    *
**********************************************************************
*                                                                    *
*       03/11/87 bp - created                                        *
*       03/20/87 bp - spun off from PutNumLit                        *
*                                                                    *
*********************************************************************/
int FAR PASCAL FindReal( d_real )
double d_real;
{
    register int i, j;
    int newsize;
    double *dptr;
    static double dbl;
    unsigned *u1, *u2;
#define DBLSIZE     sizeof(double)/sizeof(unsigned)

    dptr = pRealTable;
    dptr++;
    dbl = d_real;

    for ( i=1; (i < next_real); i++, dptr++)  {
        u1 = (unsigned *)&dbl;
        u2 = (unsigned *)dptr;
        for ( j=0; (j < DBLSIZE ); j++ ) {
            if ( *u1++ != *u2++ )  break;
            }
        if ( j == DBLSIZE )  break;
        }

    if ( i >= reallit_size )  {
        newsize = reallit_size + NUM_LITS;
        if ( !ExpandTable( &hRealTable, newsize*sizeof(double) ) )
            return( 0 );
        else
            reallit_size = newsize;
        }
    if (i == next_real) {
        *(pRealTable + i) = d_real;
        next_real++;
        }
    return( i );
} /* FindReal */
```

```
/*************************************************************************
*                                                                        *
*       GetWindowNum - given a user window name finds the window.       *
*               adds one if it isn't there                               *
*                                                                        *
*       input:  index of window name in IDENTIFIER buffer                *
*       output: new user window may be added else none                  *
*       return: index of the window in WINDOW buffer                     *
*                                                                        *
**************************************************************************
*                                                                        *
*       03/20/87 bp - created                                            *
*                                                                        *
*************************************************************************/
GetWindowNum( index )
int index;
{
    IDENTIFIER *id_ptr;

    id_ptr = pSpellings + index;

    if (id_ptr->usertype == USER_WINDOW)
        return( id_ptr->uservalue );
    else if (    (!id_ptr->usertype) &&
                 ( (id_ptr->type == USER_SYMBOL) || (index <= Keyword) ) )
        return( AddWindow(index) );
    else    {
    /* error */
        SetErrMsg( IDS_OWERR1 );
        return( FALSE );
        }
}  /* GetWindowNum */
```

```
/*************************************************************************
*                                                                        *
*       AddWindow - adds a user conversational window to the table      *
*                                                                        *
*       input:  index to window name in IDENTIFIER table                 *
*       output: window is added and tables updated                       *
*       return: index of window in window table                          *
*                                                                        *
**************************************************************************
*                                                                        *
*       03/23/87 bp - created                                            *
*                                                                        *
*************************************************************************/
AddWindow( index )
int index;
{
    int newsize;
    WINDOW *pwnd;
    IDENTIFIER *id_ptr;

    if ( next_window >= window_size )   {
        newsize = window_size + NUM_WINDOWS;
        if ( !ExpandTable( &hwindow, newsize*sizeof(WINDOW) ) )
            return( 0 );
        else
            window_size = newsize;
        }

    pwnd = pwindow + next_window;
    pwnd->name = index;

    id_ptr = pSpellings + index;
    id_ptr->usertype = USER_WINDOW;
    id_ptr->uservalue = next_window;

    return( next_window++ );
}  /* AddWindow */
```

```
/**************************************************************************
*                                                                         *
*       AddLabel - adds an entry to the label table                      *
*                                                                         *
*       input:  index   - of label name in IDENTIFIER table if > 0        *
*               type    - of label                                        *
*       output: entry added to labeltable                                 *
*               Address is initialized to undefined, page is set to 0     *
*               and offset is set to index of entry (helps at fixup       *
*               label time in pass 2)                                     *
*       return: index of label in labeltable                              *
*                                                                         *
***************************************************************************
*                                                                         *
*       04/13/87 bp - created                                             *
*                                                                         *
**************************************************************************/
AddLabel ( index, type )
int         index,
            type;
{
    LABEL *newlabel;
    int   newsize;
    IDENTIFIER *id_ptr;

/* check for table overflow */
    if (next_label >= label_size)  {
        newsize = label_size + NUM_LABELS;
        if ( !ExpandTable( &hLabels, newsize*sizeof(LABEL) ) )
            return( FALSE );
        else
            label_size = newsize;
        } /* next_label == label_size */

    newlabel = GetLabelEntry( next_label );
    newlabel->name = index;
    newlabel->address.page = 0;
    newlabel->address.offset = next_label;

    if ( index > 0 )  {
        id_ptr = pSpellings + index;
        id_ptr->usertype = type;
        id_ptr->uservalue = next_label;
        }

    return( next_label++ );
}  /* AddLabel     */
```

```
/**************************************************************************
*                                                                         *
*       AddLabelAddr - fixes up a label entry with a valid address        *
*                                                                         *
*       input:  index   - of label in label table                         *
*               address - pointer to fixup address                        *
*       output: none                                                      *
*       return: none                                                      *
*                                                                         *
*       NOTE:   No checking is done to see if entry already has a valid   *
*               address                                                   *
*                                                                         *
***************************************************************************
*                                                                         *
*       04/13/87 bp - created                                             *
*                                                                         *
**************************************************************************/
AddLabelAddr( index, address )
int         index;
AG_ADDRESS *address;
{
    GetLabelEntry( index )->address.offset = address->offset;
    GetLabelEntry( index )->address.page = address->page;
} /* AddLabelAddr */
```

```
/*****************************************************************************
*                                                                            *
*       GetLabelNum - given a user label name finds the label.               *
*               adds one if it isn't there                                   *
*                                                                            *
*       input:  index of label name in IDENTIFIER buffer                     *
*               type of the label                                            *
*       output: new user label may be added else none                        *
*       return: index of the label in Label buffer, 0 if error               *
*                                                                            *
******************************************************************************
*                                                                            *
*       03/20/87 bp - created                                                *
*                                                                            *
*****************************************************************************/
GetLabelNum( index, type )
int index,
    type;
{
    IDENTIFIER *id_ptr;

    id_ptr = pSpellings + index;

    if (id_ptr->usertype == type)
        return( id_ptr->uservalue );
    else if (   (!id_ptr->usertype) &&
                ( (id_ptr->type == USER_SYMBOL) || (index <= Keyword) ) )
        return( AddLabel(index, type) );
    else  {
    /* error */
        SetErrMsg( IDS_LBLERR1 );
        return( FALSE );
        }
}  /* GetLabelNum */
```

```
/*****************************************************************************
*                                                                            *
*       GetLastCondLabel - finds the index in the label table of the         *
*               most recently entered label with a conditional type          *
*                                                                            *
*       input:  none                                                         *
*       output: none                                                         *
*       return: index of label in labeltable or 0                            *
*                                                                            *
******************************************************************************
*                                                                            *
*       08/18/87 bp - created                                                *
*                                                                            *
*****************************************************************************/
GetLastCondLabel ( )
{
    LABEL *lblptr;
    int   i;

    for ( i = next_label - 1; i > 0; i-- )  {
        lblptr = GetLabelEntry( i );
        if ( lblptr->name == CONDITIONAL_SYM )
            break;
        }

    return( i );
}  /* GetLastCondLabel    */
```

```
/*****************************************************************************
*                                                                            *
*       GetVarNum - given a user or system variable name finds the           *
*               number.  Adds one if it isn't there.                         *
*                                                                            *
*       input:  index of variable name in IDENTIFIER buffer                  *
*       output: new user variable may be added else none                     *
*       return: index of the variable in runtime Var buffer,                 *
*               0 if error                                                   *
*                                                                            *
******************************************************************************
*                                                                            *
*       05/04/87 bp - created                                                *
*                                                                            *
*****************************************************************************/
GetVarNum( index )
int index;
{
    IDENTIFIER *id_ptr;

    id_ptr = pSpellings + index;
    return( id_ptr->value ? id_ptr->value : AddVar(index) );

}  /* GetVarNum */
```

```
/*****************************************************************************
*                                                                            *
*       AddVar - adds an entry to the variable table                         *
*                                                                            *
*       input:  index   - of name in IDENTIFIER table                        *
*       output: entry updated.  If array, entry is added to arraytable       *
*       return: index of variable in runtime variable table                  *
*                                                                            *
******************************************************************************
*                                                                            *
*       05/05/87 bp - created                                                *
*                                                                            *
*****************************************************************************/
AddVar ( index )
int         index;
{
    ARRAY *newarray;
    int   newsize;
    IDENTIFIER *id_ptr;

    id_ptr = pSpellings + index;
    id_ptr->value = ++numvariables;

    if ( id_ptr->type == USER_ARRAY )  {
/* check for table overflow */
        if (next_array >= arraytable_size)  {
            newsize = arraytable_size + NUM_ARRAYS;
            if ( !ExpandTable( &ArrayTable, newsize*sizeof(ARRAY) ) )
                return( FALSE );
            else
                arraytable_size = newsize;
            } /* next_array == arraytable_size */

        newarray = GetArrayEntry( next_array++ );
        newarray->idnum = numvariables;
        newarray->size = 0;
        newarray->offset = 0;
        }  /* type is user array */

    return( numvariables );
}  /* AddVar     */
```

```
/*****************************************************************
*                                                                *
*       AddFunction - adds an entry to the current function table *
*                                                                *
*       input:  index of function in IDENTIFIER table            *
*       output: globals next_function, curr_function are updated, *
*               hFunctionTable size may be increased, entry is   *
*               initialized                                      *
*       return: TRUE if success else FALSE                       *
*                                                                *
******************************************************************
*                                                                *
*       07/07/87 bp - created                                    *
*                                                                *
*****************************************************************/
AddFunction ( index )
int         index;
{
    FNCT *newfunction;
    LPFUNCTIONINFO fctinfo;
    int   newsize, classid, currclass, infoindex, nextclass;

/* check for table overflow */
    if (next_function >= function_size)  {
        newsize = function_size + NUM_FUNCTIONS;
        if ( !ExpandTable( &hFunctionTable, newsize*sizeof(FNCT) ) )
            return( FALSE );
        else
            function_size = newsize;
        } /* next_function == function_size */

    newfunction = GetFunction( next_function );
    newfunction->strflag = strflag;
    newfunction->numflag = numflag;
    newfunction->numparms = 0;
    newfunction->parm_index = next_parm;

    nextclass = infoindex = GetFunctionEntry( index );
    fctinfo = GetFunctionInfo(infoindex);
    classid = fctinfo->classid;
    currclass = (currfocus != NO_FOCUS) ?
                    GetClassEntry(currfocus)->classid : 0;

/* get the current function if collision */
    while ( classid != currclass )  {
        if ( (fctinfo->classid == currclass) || !(fctinfo->classid) )  {
        /* found it; update the information */
            classid = fctinfo->classid;
            infoindex = nextclass;
            }
        if ( fctinfo->nextclass == NO_CLASS )
            break;
        else  {
            nextclass = fctinfo->nextclass;
            fctinfo = GetFunctionInfo(nextclass);
            }
        }  /* while */

    if ( classid && (classid != currclass) )  {
        SetErrMsg( IDS_BADFCT );
        return( FALSE );
        }
    else  {
        newfunction->classid = classid;
        newfunction->info_index = infoindex;
        curr_function = next_function++;
        return( TRUE );
        }
}  /* AddFunction */
```

```
/*************************************************************************
*                                                                        *
*       SaveParm - adds an entry to the current function parameter table*
*                                                                        *
*       input:  yylval of parameter                                      *
*       output: global next_parm is updated, hParmTable size may be      *
*               increased, entry is added                                *
*       return: index of new parm if success else FALSE                  *
*                                                                        *
**************************************************************************
*                                                                        *
*       07/07/87 bp - created                                            *
*                                                                        *
*************************************************************************/
Saveparm ( value )
long    value;
{
    long *newparm;
    int  newsize;
    int  type;
    int  parminfotype;
    FNCT *fctptr;
    FUNCTIONINFO *fctinfo;

/* check for table overflow */
    if (next_parm >= parm_size)  {
        newsize = parm_size + NUM_PARMS;
        if ( !ExpandTable( &hParmTable, newsize*sizeof(long) ) )
            return( FALSE );
        else
            parm_size = newsize;
        } /* next_parm == parm_size */

    newparm = GetParm( next_parm );

/* get the expected type */
    fctptr = GetFunction(curr_function);
    parminfotype = *((fctinfo->parms) + fctptr->numparms);

/*
    add the entry,
    check if need to put the parameter on the stack
*/
    type = HIWORD( value );

    if (type == USER_VAR)  {
        PutOnStack( value );
        *newparm = MAKELONG( ANY_EXP, STACK_L );
        }
    else if (   (type == SYS_VAR) ||
                ( ((type == INT_L) || (type == REAL_L)) &&
                  (parminfotype == AG_NUMERIC_LIT) )    )  {
        PutOnStack( value );
        *newparm = MAKELONG( NUM_EXP, STACK_L );
        }
    else
        *newparm = value;

    fctptr->numparms = fctptr->numparms + 1;

    return( next_parm++ );
}  /* SaveParm */
```

```
#S3771; #O9326 * BARBARA.PF; LP602 * TUE, MAY 17, 1988, 6:27 AM
#S3771; #O9326 * BARBARA.PF; LP602 * TUE, MAY 17, 1988, 6:27 AM
#S3771; #O9326 * BARBARA.PF; LP602 * TUE, MAY 17, 1988, 6:27 AM

#S3771; #O9326 * BARBARA.PF; LP602 * TUE, MAY 17, 1988, 6:27 AM
#S3771; #O9326 * BARBARA.PF; LP602 * TUE, MAY 17, 1988, 6:27 AM
#S3771; #O9326 * BARBARA.PF; LP602 * TUE, MAY 17, 1988, 6:27 AM

#S3771; #O9326 * BARBARA.PF; LP602 * TUE, MAY 17, 1988, 6:27 AM
#S3771; #O9326 * BARBARA.PF; LP602 * TUE, MAY 17, 1988, 6:27 AM
#S3771; #O9326 * BARBARA.PF; LP602 * TUE, MAY 17, 1988, 6:27 AM

#S3771; #O9326 * BARBARA.PF; LP602 * TUE, MAY 17, 1988, 6:27 AM
#S3771; #O9326 * BARBARA.PF; LP602 * TUE, MAY 17, 1988, 6:27 AM
#S3771; #O9326 * BARBARA.PF; LP602 * TUE, MAY 17, 1988, 6:27 AM
```

```
#S3771; #O9327 * BARBARA.PF; LP602 * TUE, MAY 17, 1988, 6:27 AM
#S3771; #O9327 * BARBARA.PF; LP602 * TUE, MAY 17, 1988, 6:27 AM
#S3771; #O9327 * BARBARA.PF; LP602 * TUE, MAY 17, 1988, 6:27 AM
```

```
#S3771; #O9327 * BARBARA.PF; LP602 * TUE, MAY 17, 1988, 6:27 AM
#S3771; #O9327 * BARBARA.PF; LP602 * TUE, MAY 17, 1988, 6:27 AM
#S3771; #O9327 * BARBARA.PF; LP602 * TUE, MAY 17, 1988, 6:27 AM
```

```
#S3771; #O9327 * BARBARA.PF; LP602 * TUE, MAY 17, 1988, 6:27 AM
#S3771; #O9327 * BARBARA.PF; LP602 * TUE, MAY 17, 1988, 6:27 AM
#S3771; #O9327 * BARBARA.PF; LP602 * TUE, MAY 17, 1988, 6:27 AM
```

```
#S3771; #O9327 * BARBARA.PF; LP602 * TUE, MAY 17, 1988, 6:27 AM
#S3771; #O9327 * BARBARA.PF; LP602 * TUE, MAY 17, 1988, 6:27 AM
#S3771; #O9327 * BARBARA.PF; LP602 * TUE, MAY 17, 1988, 6:27 AM
```

```
/**********************************************************************
*                                                                     *
* HPAGPMS2.C - miscellaneous routines for the compiler                *
*                                                                     *
***********************************************************************
*                                                                     *
* Agent PCODES Compiler 'C' source file                               *
* Ver X.05.01  12/15/87                                               *
*                                                                     *
*                                                                     *
*                                                                     *
*                                                                     *
*                  COPYRIGHT HEWLETT PACKARD LIMITED                  *
*                                1988                                 *
*                         ALL RIGHTS RESERVED                         *
*                                                                     *
*                                                                     *
*                                                                     *
*                                                                     *
***********************************************************************
*                                                                     *
*                                                                     *
*                           MODIFICATION LOG                          *
*                                                                     *
*       07/09/87 bp - spun off from hpagpmsc.c                        *
*       12/15/87 bp - modified for new naming conventions             *
*                                                                     *
*                                                                     *
*                                                                     *
**********************************************************************/
/**********************************************************************
*                                                                     *
*                                                                     *
*                                                                     *
*       input:                                                        *
*       output:                                                       *
*       return:                                                       *
*                                                                     *
***********************************************************************
*                                                                     *
*       07/09/87 bp - created                                         *
*                                                                     *
**********************************************************************/
#define NOCOMM
#include "windows.h"
#include "nwomf.h"
#include "ctype.h"
#include "doscall.h"
#include "ctrace.h"
#include "nwutil.h"

#include "hpagpor0.h"
#include "nwapi.h"
#include "hpag.h"
#include "hpagatrc.h"
#include "hpagpext.h"
```

```
/**********************************************************************
*                                                                     *
*       Convert2Int - utility to return an integer value from a numeric *
*               literal yylval input to a semantic routine.           *
*                                                                     *
*       input:  long yylval value                                     *
*       output: none                                                  *
*       return: integer or cast integer value in the lit table        *
*                                                                     *
***********************************************************************
*                                                                     *
*       06/24/87 bp - created                                         *
*                                                                     *
**********************************************************************/
Convert2Int( longparm )
long longparm;
{
     int type, index, value;

     type = HIWORD( longparm );
     index = LOWORD( longparm );

     switch ( type )  {
case INT_L:
          value = GetInt( index );
          break;
case REAL_L:
          value = (int)(.5 + GetDouble( index ));
          break;
          }

     return( value );
} /* Convert2Int */
```

```
/*****************************************************************
*                                                                *
*       asctohex - converts a 2 character ASCII string to a hex byte  *
*                                                                *
*       input:  pointer to ASCII string, not necessarily null    *
*               terminated                                       *
*       output: none                                             *
*       return: value of string in hex                           *
*                                                                *
******************************************************************
*                                                                *
*       03/20/87 bp - created                                    *
*                                                                *
*****************************************************************/
BYTE PASCAL asctohex( str )
LPSTR str;
{
    char chr;
    BYTE val;

    chr = *str++;
    val = chr - ( isdigit(chr) ? '0' : '7' );
    chr = *str;
    val = BASE_HEX*val + (chr - ( isdigit(chr) ? '0' : '7' ));
    return( val );
} /* asctohex */
```

```
/*****************************************************************
*                                                                *
*       hextoasc - converts a hex byte to a 2 character ASCII string  *
*                                                                *
*       input:  hex value to be converted                        *
*               pointer to destination string                    *
*       output: none                                             *
*       return: none                                             *
*                                                                *
******************************************************************
*                                                                *
*       03/24/87 bp - created                                    *
*                                                                *
*****************************************************************/
VOID PASCAL hextoasc( hexbyte, string )
BYTE hexbyte;
LPSTR string;
{
    static char target[4];

    itoa( hexbyte / BASE_HEX, target, BASE_HEX );
    lstrcpy( string, target );
    itoa( hexbyte % BASE_HEX, target, BASE_HEX );
    lstrcat( string, target ;
    AnsiUpper( (LPSTR)string );
} /* hextoasc */
```

```
/***********************************************************************
*                                                                      *
*       PutFunctionInfo - enters the information on a function into    *
*               StringTable                                            *
*                                                                      *
*       input:  source - pointer to buffer containing function         *
*               information excluding the name                         *
*               classid - 0 if CI function                             *
*       output: source is parsed and information entry added to the    *
*               Stringtable.                                           *
*       return: index of Stringtable entry                             *
*                                                                      *
************************************************************************
*                                                                      *
*       07/07/87 bp - created                                          *
*                                                                      *
***********************************************************************/
PutFunctionInfo( source, classid )
char *source;
int  classid;
{
    static FUNCTIONINFO fctn;
    LPFUNCTIONINFO fctptr;
    register int i, index;
    int numparms;
    int *parms;

    fctn.classid = classid;
    fctn.nextclass = NO_CLASS;
    source = scans( source, S_INT, &fctn.idnum );
    source = scans( source, S_INT, &fctn.type );
    source = scans( source, S_INT, &fctn.numparms );
    source = scans( source, S_INT, &fctn.reqparms );
    numparms = fctn.numparms;

    if ( index = AddFunctionEntry( numparms ) )  {
        fctptr = GetFunctionInfo( index );
        lstrmove( (LPSTR)fctptr, (LPSTR)&fctn,
                (sizeof(FUNCTIONINFO) - sizeof(int)) );

        for (i = 0, parms = fctptr->parms; i < numparms; i++, parms++ )
            source = scans( source, S_INT, parms );
        }
    return( index );
}  /* PutFunctionInfo */
```

```
/***********************************************************************
*                                                                      *
*       ConvertType - changes from hoag.h type to expression type      *
*                                                                      *
*       input:  type as defined in hoag.h                              *
*       output: none                                                   *
*       return: compatible expression type                             *
*                                                                      *
************************************************************************
*                                                                      *
*       07/09/87 bp - created                                          *
*                                                                      *
***********************************************************************/
ConvertType( literaltype )
int literaltype;
{
    int expressiontype;

    switch ( literaltype )  {

case AG_STR_LIT:
        expressiontype = STR_EXP;
        break;
case AG_INT_LIT:
case AG_REAL_LIT:
case AG_LONG_LIT:
case AG_DOUBLE_LIT:
case AG_SYSVARIABLE:
case AG_NUMERIC_LIT:
        expressiontype = NUM_EXP;
        break;
case AG_VARIABLE:
case AG_ANY_LIT:
        expressiontype = ANY_EXP;
        break;
case AG_POINT_LIT:
        expressiontype = PNT_EXP;
        break;
case AG_REGION_LIT:
        expressiontype = RGN_EXP;
        break;
default:
        expressiontype = NO_EXP;
        break;
        }  /* end switch */

    return( expressiontype );
}  /* ConvertType */
```

```
/****************************************************************************
*                                                                           *
*       CheckParmType - checks if actual parameter type is compatible       *
*               with expected type                                          *
*                                                                           *
*       input:  parminfo - type as defined in data dictionary and saved     *
*               in the function info entry, npag.h format                   *
*               parmtype - type as determined from parse of task            *
*               language source, parse return format                        *
*       output: none                                                        *
*       return: TRUE if compatible else FALSE                               *
*                                                                           *
*****************************************************************************
*                                                                           *
*       07/10/87 bp - created                                               *
*                                                                           *
****************************************************************************/
CheckParmType( parminfo, parmtype )
int parminfo;
long parmtype;
{
    int type;
    BOOL status = FALSE;


    if ( (type = HIWORD(parmtype)) == STACK_L )
        type = LOWORD(parmtype);

    if ( (type == ANY_EXP) || (type == USER_VAR) || (parminfo == AG_ANY_LIT) )
        return( TRUE );
    else if ( type == NO_EXP )
        return( FALSE );

    switch ( parminfo )  {

case AG_STR_LIT:
        if ( (type == STR_EXP) || (type == STR_L) || !type )
            status = TRUE;
        break;
case AG_INT_LIT:
case AG_REAL_LIT:
case AG_LONG_LIT:
case AG_DOUBLE_LIT:
case AG_NUMERIC_LIT:
        if (    (type == INT_L) || (type == REAL_L) ||
                (type == NUM_EXP) || (type == SYS_VAR) )
            status = TRUE;
        break;
case AG_SYSVARIABLE:
        if ( type == SYS_VAR )
            status = TRUE;
        break;
case AG_POINT_LIT:
        if ( type == PNT_EXP )
            status = TRUE;
        break;
case AG_REGION_LIT:
        if ( type == RGN_EXP )
            status = TRUE;
        break;
default:
        break;
        }  /* end switch */

    return( status );
}  /* CheckParmType */
```

```
/*****************************************************************
*                                                                *
*       CopyParm - inserts a parameter into the parameter string, no *
*               parameter type checking is done.  Numeric conversion of *
*               literals is done if appropriate.                 *
*                                                                *
*       input:  parminfo - type as defined in data dictionary and saved *
*               in the function info entry, hoag.h format        *
*               parmtype - type as determined from parse of task *
*               language source, parse return format             *
*               target - char pointer to target array            *
*       output: parameter will be inserted into beginning of target *
*       return: number of bytes inserted                         *
*                                                                *
******************************************************************
*                                                                *
*       07/10/87 bp - created                                    *
*                                                                *
*****************************************************************/
int CopyParm( parminfo, parmtype, target )
int parminfo;
long parmtype;
char *target;
{
    int type, index;
    register int len;
    int *intptr;
    long *longptr;
    double *dblptr;
    float *realptr;

    type = HIWORD(parmtype);
    index = LOWORD(parmtype);
    intptr = (int *)target;

/* check possibility of multiple types */
    if ( (parminfo == AG_NUMERIC_LIT) || (parminfo == AG_ANY_LIT) )  {
        target += sizeof(int);
        len = sizeof(int);
        }
    else
        len = 0;

    switch ( type )  {

case 0:
        *intptr = AG_STR_LIT;
        if ( (parminfo == AG_ANY_LIT) || ( parminfo == AG_STR_LIT ) )  {
            *target = '\0';
            len += 1;           /* term '\0' */
            }
        break;
case INT_L:
        switch ( parminfo )  {

        case AG_INT_LIT:
            intptr = (int *)target;
            *intptr = GetInt( index );
            len = sizeof( int );
            break;
        case AG_REAL_LIT:
            realptr = (float *)target;
            *realptr = (float)(GetLong( index ));
            len = sizeof( float );
            break;
        case AG_NUMERIC_LIT:
        case AG_ANY_LIT:
            *intptr = AG_LONG_LIT;
        case AG_LONG_LIT:
            longptr = (long *)target;
            *longptr = GetLong( index );
            len += sizeof( long );
            break;
        case AG_DOUBLE_LIT:
            dblptr = (double *)target;
            *dblptr = (double)(GetLong( index ));
            len = sizeof( double );
            break;
            }  /* end inner switch */
        break;
case REAL_L:
        switch ( parminfo )  {

        case AG_INT_LIT:
            intptr = (int *)target;
            *intptr = Round( index );
            len = sizeof( int );
            break;
        case AG_REAL_LIT:
            realptr = (float *)target;
            *realptr = GetReal( index );
            len = sizeof( float );
            break;
        case AG_LONG_LIT:
            longptr = (long *)target;
            *longptr = (long)(GetDouble( index ));
            len = sizeof( long );
            break;
        case AG_NUMERIC_LIT:
        case AG_ANY_LIT:
            *intptr = AG_DOUBLE_LIT;
        case AG_DOUBLE_LIT:
            dblptr = (double *)target;
            *dblptr = GetDouble( index );
            len += sizeof( double );
            break;
            }  /* end inner switch */
        break;
case STR_L:
        *intptr = AG_STR_LIT;
        *target = '\0';
        lstrcpy( (LPSTR)target, GetStrLit(index) );
        len += strlen( target ) + 1;             /* term '\0' */
        break;
case PNT_L:
        *intptr = AG_POINT_LIT;
        longptr = (long *)target;
        *longptr = GetLong( index );
        len += sizeof( long );
```

```
        break;
case RGN_L:
        *intptr = AG_REGION_LIT;
        dblptr = (double *)target;
        *dblptr = GetDouble( index );
        len += sizeof( double );
        break;
case STACK_L:
        intptr = (int *)target;
        *intptr = parminfo;
        len = sizeof(int);
        break;
        }  /* end switch */

    return( len );
}  /* CopyParm */
```

```
/*******************************************************************
*                                                                  *
*       SetErrMsg - puts the message number and linenumber into    *
*               ErrorInfo and updates numerrors                    *
*       input:  error number                                       *
*       output: none                                               *
*       return: none                                               *
*                                                                  *
********************************************************************
*                                                                  *
*       03/11/87 bp - created                                      *
*                                                                  *
*******************************************************************/
VOID PASCAL SetErrMsg( errnum )
int errnum;
{
#ifdef COM1_TRACING
 cprint( "SetErrMsg: Error number = %d",errnum,NULL);
 cprint( "SetErrMsg: Line number = %d",glinenumber,NULL);
#endif
    if ( numerrors++ < MAXERRORS )
        *gErrorInfo++ = MAKELONG( errnum, glinenumber );
    gCurrErrnum = 0;
    if (( errnum == IDS_LMEM ) || ( errnum == IDS_GMEM )
                        || ( errnum == IDS_DLERR ))
        gFatalErrorflag = TRUE;
}  /* SetErrMsg */
```

```
/**********************************************************************
*                                                                     *
*       yyerror - error routine called by yyparse                     *
*                 calls SetErrMsg                                     *
*       input:  string message (ignored)                              *
*       output: none                                                  *
*       return: none                                                  *
*                                                                     *
***********************************************************************
*                                                                     *
*       03/17/87 bp - created                                         *
*                                                                     *
**********************************************************************/
void yyerror(message)
char *message;
{
    if ( gErrorflag )
        SetErrMsg( gCurrErrnum ? gCurrErrnum : IDS_COMPILEERROR );
} /* yyerror */
```

```
/**********************************************************************
*                                                                     *
*       printf  - dummy for yyparse routine                           *
*                                                                     *
*       input:  none                                                  *
*       output: none                                                  *
*       return: none                                                  *
*                                                                     *
***********************************************************************
*                                                                     *
*       04/10/87 bp - created                                         *
*                                                                     *
**********************************************************************/
printf()
{ }
```

```
/**********************************************************************
*                                                                     *
*       FindString - looks for a string in the keyword table and if  *
*               not there, adds it.  Locate with LPSTR parameter      *
*               Uses global tfilename                                 *
*                                                                     *
*       input:  LPSTR to string                                       *
*       output: none                                                  *
*       return: index of string in StringTable                        *
*                                                                     *
***********************************************************************
*                                                                     *
*       04/17/88 bp - created                                         *
*                                                                     *
**********************************************************************/
int FAR PASCAL FindString( Symbol )
LPSTR Symbol;
{
    int keyindex;

    lstrcpy( tfilename, Symbol );

    if ( keyindex = Locate( tfilename ) )
        return( (pSpellings + keyindex)->name );
    else
        return( 0 );
} /*  FindString */
```

```
#S3771; #O9327 * BARBARA.PF; LP602 * TUE, MAY 17, 1988, 6:28 AM
#S3771; #O9327 * BARBARA.PF; LP602 * TUE, MAY 17, 1988, 6:28 AM
#S3771; #O9327 * BARBARA.PF; LP602 * TUE, MAY 17, 1988, 6:28 AM
```

```
#S3771; #O9327 * BARBARA.PF; LP602 * TUE, MAY 17, 1988, 6:28 AM
#S3771; #O9327 * BARBARA.PF; LP602 * TUE, MAY 17, 1988, 6:28 AM
#S3771; #O9327 * BARBARA.PF; LP602 * TUE, MAY 17, 1988, 6:28 AM
```

```
#S3771; #O9327 * BARBARA.PF; LP602 * TUE, MAY 17, 1988, 6:28 AM
#S3771; #O9327 * BARBARA.PF; LP602 * TUE, MAY 17, 1988, 6:28 AM
#S3771; #O9327 * BARBARA.PF; LP602 * TUE, MAY 17, 1988, 6:28 AM
```

```
#S3771, #O9327 * BARBARA.PF; LP602 * TUE, MAY 17, 1988, 6:28 AM
#S3771; #O9327 * BARBARA.PF; LP602 * TUE, MAY 17, 1988, 6:28 AM
#S3771, #O9327 * BARBARA.PF; LP602 * TUE, MAY 17, 1988, 6:28 AM
```

```
#S3771; #O9328 * BARBARA.PF; LP602 * TUE, MAY 17, 1988, 6:28 AM
#S3771; #O9328 * BARBARA.PF; LP602 * TUE, MAY 17, 1988, 6:28 AM
#S3771; #O9328 * BARBARA.PF; LP602 * TUE, MAY 17, 1988, 6:28 AM
```

```
#S3771; #O9328 * BARBARA.PF; LP602 * TUE, MAY 17, 1988, 6:28 AM
#S3771; #O9328 * BARBARA.PF; LP602 * TUE, MAY 17, 1988, 6:28 AM
#S3771; #O9328 * BARBARA.PF; LP602 * TUE, MAY 17, 1988, 6:28 AM
```

```
#S3771; #O9328 * BARBARA.PF; LP602 * TUE, MAY 17, 1988, 6:28 AM
#S3771; #O9328 * BARBARA.PF; LP602 * TUE, MAY 17, 1988, 6:28 AM
#S3771; #O9328 * BARBARA.PF; LP602 * TUE, MAY 17, 1988, 6:28 AM
```

```
#S3771; #O9328 * BARBARA.PF; LP602 * TUE, MAY 17, 1988, 6:28 AM
#S3771; #O9328 * BARBARA.PF; LP602 * TUE, MAY 17, 1988, 6:28 AM
#S3771; #O9328 * BARBARA.PF; LP602 * TUE, MAY 17, 1988, 6:28 AM
```

```
/************************************************************************
*                                                                       *
* HPAGPSM3.C - Source file for parser semantic routines                 *
*                                                                       *
*************************************************************************
*                                                                       *
* Agent PCODES Compiler 'C' source file                                 *
* Ver X.09.01  12/15/87                                                 *
*                                                                       *
*                                                                       *
*                                                                       *
*                    COPYRIGHT HEWLETT PACKARD LIMITED                  *
*                                 1988                                  *
*                          ALL RIGHTS RESERVED                          *
*                                                                       *
*                                                                       *
*                                                                       *
*************************************************************************
*                                                                       *
*                                                                       *
*                           MODIFICATION LOG                            *
*                                                                       *
*       08/12/87 bp - created                                           *
*       12/15/87 bp - modified for new naming conventions               *
*       05/16/88 bp - modified to make stringtable global               *
*                                                                       *
*                                                                       *
************************************************************************/
/************************************************************************
*                                                                       *
*                                                                       *
*       input:                                                          *
*       output:                                                         *
*       return:                                                         *
*                                                                       *
*************************************************************************
*                                                                       *
*       08/12/87 bp - created                                           *
*                                                                       *
************************************************************************/
#define NOCOMM
#include "windows.h"
#include "nwonf.h"
#include "ctype.h"
#include "doscall.h"
#include "ctrace.h"
#include "nwutil.h"

#include "hpagppr0.h"
#include "nwapi.h"
#include "hpag.h"
#include "hpagatrc.h"
#include "hpagpext.h"
```

```
/************************************************************************
*                                                                       *
*       UserInput - general routine to output pcodes for commands using *
*               level I user input.  Used by commands MESSAGE and       *
*               INPUT                                                   *
*                                                                       *
*       input:  PCode id number                                         *
*               PromptParm - prompt string or 0L                        *
*               longparm2  - command dependent                          *
*               ReturnParm - result of user input is returned here      *
*               ButtonText - used for MESSAGE command                   *
*       output: instruction is written to the object file buffer        *
*               may have semantic error if ButtonText is not correct    *
*       return: none                                                    *
*                                                                       *
*************************************************************************
*                                                                       *
*       08/05/87 bp - created                                           *
*       05/16/88 bp - modified to make stringtable global               *
*                                                                       *
************************************************************************/
void UserInput( PCode_id, PromptParm, longparm2, ReturnParm, ButtonText )
int  PCode_id;
long PromptParm,
     longparm2,
     ReturnParm,
     *ButtonText;
{
    register int i, len;
    int stackparms = 0, numuserbuttons;
    int promptype, promptindex;
    int type2, index2;
    BOOL stack1, stack2;
    AG_PCODES *pc_ptr;
    AG_PCODES *sp_ptr;
    int *intptr, *parmptr;
    char *charptr;
    LPSTR strptr;

/* get number of parms on the stack and set up stackparm pcode */
    stack1 = ( (promptype = HIWORD(PromptParm)) == STACK_L );
    promptindex = LOWORD(PromptParm);

    stack2 = ( (type2 = HIWORD(longparm2)) == STACK_L );
    index2 = LOWORD(longparm2);

    if ( PCode_id == AG_MESSAGE_PCODE ) {
        stack2 = FALSE;

        for ( i = 0; ButtonText[i]; i++ ) {
            if ( HIWORD(ButtonText[i]) == STACK_L )
                stackparms++;
            } /* for */
        numuserbuttons = i;

        } /* if AG_MESSAGE_PCODE */

    if (stack1) stackparms++;
    if (stack2) stackparms++;
```

```
    if (len = stackparms ?
              (AG_MIN_PCODE + (stackparms + 1)*sizeof(int)) :
              0) {
        sp_ptr = (AG_PCODES *)gTempBuf;
        sp_ptr->length = len;
        sp_ptr->idnum = AG_STACK_PARMS_PCODE;
        parmptr = (int *)(sp_ptr->parms);
        *parmptr++ = stackparms;
        }

    pc_ptr = (AG_PCODES *)(gTempBuf + len);
    pc_ptr->idnum = PCode_id;
    pc_ptr->length = AG_MIN_PCODE;
    intptr = (int *)(pc_ptr->parms);
    charptr = pc_ptr->parms;
    len = 0;

    if ( stack1 )  {
        *parmptr++ = len;
        *intptr = AG_STR_LIT;
        len += sizeof( int );
        }
    else  {
        if ( prompttype )  {
            strptr = GetStrLit( promptindex );
            lstrcpy( (LPSTR)charptr, strptr );
            }
        else
            *charptr = '\0';
        len += strlen( charptr ) + 1;
        }

    charptr = pc_ptr->parms + len;
    intptr = (int *)charptr;

    if ( PCode_id == AG_INPUT_PCODE )  {
    /* size parameter */
        if ( stack2 )
            *parmptr++ = len;
        *intptr++ = stack2 ? AG_INT_LIT :
                    ( type2 ? Convert2Int( longparm2 ) : 0 );

        *intptr = GetVarNum( LOWORD(ReturnParm) );      /* return variable */
        len += 2*sizeof( int );
        }
    else if ( PCode_id == AG_MESSAGE_PCODE )  {
        *intptr++ = index2;                      /* icon parameter */
        *intptr++ = type2;                       /* style parameter */
        *intptr++ = GetVarNum( LOWORD(ReturnParm) );    /* return variable */
        *intptr++ = numuserbuttons;
        len += 4*sizeof( int );

        for ( i = 0; ButtonText[i]; i++ )  {
            charptr = pc_ptr->parms + len;
            if ( HIWORD(ButtonText[i]) == STACK_L )  {
                *parmptr++ = len;
                intptr = (int *)charptr;
                *intptr = AG_STR_LIT;
                len += sizeof( int );
                }
            else  {
                strptr = GetStrLit( LOWORD(ButtonText[i]) );
                lstrcpy( (LPSTR)charptr, strptr );
                len += strlen( charptr ) + 1;
                }
            }  /* for */
        } /* if AG_MESSAGE_PCODE */

    if ( stackparms )
        WritePCode( sp_ptr );

    pc_ptr->length += len;
    WritePCode( pc_ptr );

} /* UserInput */
```

```
/***********************************************************************
*                                                                      *
*       UserControl - general routine to output pcodes for commands    *
*               creating buttons and editboxes in converstional windows *
*                                                                      *
*       input:  PCode id number                                        *
*               name        index of window in IDENTIFIER table        *
*               controlvar  variable to hold control id info           *
*               longparm    command dependent                          *
*               pointparm   location of the control                    *
*               def_btn     set to 1 if this is a default button       *
*                           set to 2 if this is the escape button      *
*                           else set to 0                              *
*       output: instruction is written to the object file buffer      *
*       return: TRUE if success else FALSE                             *
*                                                                      *
************************************************************************
*                                                                      *
*       08/12/87 bp - created                                          *
*       05/18/88 bp - modified to make stringtable global              *
*                                                                      *
***********************************************************************/
BOOL UserControl( PCode_id, name, controlvar, longparm, pointparm, def_btn )
int  PCode_id;
int  name;
long controlvar,
     longparm,
     pointparm;
int  def_btn;
{
    register int len, len1;
    int stackparms = 0, nwnd;
    int parmtype, parmindex;
    int pointtype, pointindex;
    BOOL stack1, stack2;
    AG_PCODES *pc_ptr;
    AG_PCODES *sp_ptr;
    int *intptr, *parmptr;
    char *charptr;
    LPSTR strptr;
    POINT *pnt;

/* get number of parms on the stack and set up stackparm pcode */
    stack1 = ( (parmtype = HIWORD(longparm)) == STACK_L );
    parmindex = LOWORD(longparm);

    stack2 = ( (pointtype = HIWORD(pointparm)) == STACK_L );
    pointindex = LOWORD(pointparm);

    if (stack1) stackparms++;
    if (stack2) stackparms++;

    if (len = stackparms ?
              (AG_MIN_PCODE + (stackparms + 1)*sizeof(int)) :
              0)  {
        sp_ptr = (AG_PCODES *)gTempBuf;
        sp_ptr->length = len;
        sp_ptr->idnum = AG_STACK_PARMS_PCODE;
        parmptr = (int *)(sp_ptr->parms);
        *parmptr++ = stackparms;
        }

    pc_ptr = (AG_PCODES *)(gTempBuf + len);
    pc_ptr->idnum = PCode_id;
    pc_ptr->length = AG_MIN_PCODE;
    intptr = (int *)(pc_ptr->parms);
    charptr = pc_ptr->parms;
    len = 0;

/* window name */
    if ( !(nwnd = GetWindowNum( name )) )
        return( FALSE );
    else                    /* mark window as defined */
        DefUserWnd( nwnd );
    *intptr++ = nwnd;

/* control variable */
    *intptr++ = GetVarNum( LOWORD(controlvar) );

    len =  2*sizeof(int);

/* process the control location */
    if ( stack2 )  {
        *parmptr++ = len;
        *intptr = AG_POINT_LIT;
        len += sizeof(int);
        }
    else {
        pnt = GetPoint( pointindex );
        *intptr++ = pnt->x;
        *intptr++ = pnt->y;
        len += 2*sizeof(int);
        }

    switch ( PCode_id )  {

case AG_EDITBOX_PCODE:
    /* process the window length */
        if ( stack1 )
            *parmptr++ = len;
        *intptr++ = stack1 ? AG_INT_LIT : Convert2Int( longparm );
        len += sizeof(int);
        break;

case AG_PUSHBUTTON_PCODE:
        charptr = (char *)intptr;
    /* default byte */
        *charptr++ = (char )def_btn;
        intptr = (int *)charptr;
        len++;
    /* and the button text */
        if ( stack1 )  {
            *parmptr++ = len;
            *intptr++ = AG_STR_LIT;
            len += sizeof(int);
            }
        else  {
            strptr = GetStrLit( parmindex );
            lstrcpy( (LPSTR)charptr, strptr );
```

```
            len1 = strlen( charptr ) + 1;        /* null term */
            len += len1;
            charptr += len1;
            intptr = (int *)charptr;
            }
        break;
        }  /* end switch */

    if ( stackparms )
        WritePCode( sp_ptr );

    pc_ptr->length += len;
    WritePCode( pc_ptr );

}  /* UserControl */
```

```
#S3771; #O9328  *  BARBARA.PF; LP602  *  TUE, MAY 17, 1988,  6:28 AM
#S3771; #O9328  *  BARBARA.PF; LP602  *  TUE, MAY 17, 1988,  6:28 AM
#S3771; #O9328  *  BARBARA.PF; LP602  *  TUE, MAY 17, 1988,  6:28 AM

#S3771; #O9328  *  BARBARA.PF; LP602  *  TUE, MAY 17, 1988,  6:28 AM
#S3771; #O9328  *  BARBARA.PF; LP602  *  TUE, MAY 17, 1988,  6:28 AM
#S3771; #O9328  *  BARBARA.PF; LP602  *  TUE, MAY 17, 1988,  6:28 AM

#S3771; #O9328  *  BARBARA.PF; LP602  *  TUE, MAY 17, 1988,  6:28 AM
#S3771; #O9328  *  BARBARA.PF; LP602  *  TUE, MAY 17, 1988,  6:28 AM
#S3771; #O9328  *  BARBARA.PF; LP602  *  TUE, MAY 17, 1988,  6:28 AM

#S3771; #O9328  *  BARBARA.PF; LP602  *  TUE, MAY 17, 1988,  6:28 AM
#S3771; #O9328  *  BARBARA.PF; LP602  *  TUE, MAY 17, 1988,  6:28 AM
#S3771; #O9328  *  BARBARA.PF; LP602  *  TUE, MAY 17, 1988,  6:28 AM
```

```
#S3771; #O9329  *  BARBARA.PF; LP602  *  TUE, MAY 17, 1988,  6:28 AM
#S3771; #O9329  *  BARBARA.PF; LP602  *  TUE, MAY 17, 1988,  6:28 AM
#S3771; #O9329  *  BARBARA.PF; LP602  *  TUE, MAY 17, 1988,  6:28 AM

#S3771; #O9329  *  BARBARA.PF; LP602  *  TUE, MAY 17, 1988,  6:28 AM
#S3771; #O9329  *  BARBARA.PF; LP602  *  TUE, MAY 17, 1988,  6:28 AM
#S3771; #O9329  *  BARBARA.PF; LP602  *  TUE, MAY 17, 1988,  6:28 AM

#S3771; #O9329  *  BARBARA.PF; LP602  *  TUE, MAY 17, 1988,  6:28 AM
#S3771; #O9329  *  BARBARA.PF; LP602  *  TUE, MAY 17, 1988,  6:28 AM
#S3771; #O9329  *  BARBARA.PF; LP602  *  TUE, MAY 17, 1988,  6:28 AM

#S3771; #O9329  *  BARBARA.PF; LP602  *  TUE, MAY 17, 1988,  6:28 AM
#S3771; #O9329  *  BARBARA.PF; LP602  *  TUE, MAY 17, 1988,  6:28 AM
#S3771; #O9329  *  BARBARA.PF; LP602  *  TUE, MAY 17, 1988,  6:28 AM
```

```
/*
 * Created by CSD YACC (IBM PC) from "hpegptmp.Y" */

# line 96

#define UNION 1
typedef union   {
     int  ival;
     long lval;
         } YYSTYPE;
# define AND_ 201
# define OR_ 202
# define NOT_ 203
# define CBT_ 204
# define ABORTRETRYIGNORE_ 205
# define ALT_ 206
# define AT_ 207
# define BEEP_ 208
# define CLASSFOCUS_ 209
# define CLEARWINDOW_ 210
# define CLOSEWINDOW_ 211
# define COM1_ 212
# define COMMAND_ 213
# define CTRL_ 214
# define DEFAULT_ 215
# define DEFINEWINDOW_ 216
# define DO_ 217
# define EDITBOX_ 218
# define ELSE_ 219
# define END_ 220
# define ENDIF_ 221
# define ENDPROC_ 222
# define ENDTASK_ 223
# define ENDWHILE_ 224
# define ERROR_ 225
# define ESCAPE_ 226
# define EXCLAMATION_POINT_ 227
# define EXECUTE_ 228
# define FOCUS_ 229
# define GOTO_ 230
# define HAND_ 231
# define IF_ 232
# define IGNORE_ 233
# define INPUT_ 234
# define LABEL_ 235
# define LENGTH_ 236
# define LOCATE_ 237
# define MESSAGE_ 238
# define OFF_ 239
# define OK_ 240
# define OKCANCEL_ 241
# define ON_ 242
# define OPENWINDOW_ 243
# define OUTPUT_ 244
# define PAUSE_ 245
# define PCODE_ 246
# define PCOMMAND_ 247
# define POPUP_ 248
# define PROCEDURE_ 249
# define PUSHBUTTON_ 250
# define QUESTION_ 251
# define RATE_ 252
# define RETRYCANCEL_ 253
# define RETURN_ 254
# define SCREEN_ 255
# define SET_ 256
# define TASK_ 257
# define TITLEWINDOW_ 258
# define TIMEOUT_ 259
# define TO_ 260
# define USER_ 261
# define WAIT_ 262
# define WHILE_ 263
# define YESNO_ 264
# define YESNOCANCEL_ 265
# define USER_VAR 500
# define USER_ARRAY 510
# define USER_LABEL 520
# define DATA_LABEL 525
# define USER_WINDOW 530
# define CLASS_SYMBOL 540
# define SYS_VAR 550
# define INT_L 400
# define PNT_L 405
# define REAL_L 410
# define RGN_L 415
# define STR_L 420
# define STACK_L 430
# define ANY_EXP 440
# define NUM_EXP 441
# define STR_EXP 442
# define RGN_EXP 443
# define PNT_EXP 444
# define LOG_EXP 445
# define NO_EXP 450
# define USER_SYMBOL 600
# define LINE_END 700
#define yyclearin yychar = -1
#define yyerrok yyerrflag = 0
#ifndef YYMAXDEPTH
#define YYMAXDEPTH 150
#endif
extern YYSTYPE yylval;  /*CSD & DECUS LEX */
YYSTYPE yyval;          /*CSD & DECUS LEX */
# define YYERRCODE 256

#line 387

#define NOCOMM
#include "windows.h"
#include "hwcomm.h"
#include "doscall.h"
#include "ctrace.h"

#ifndef HAVE_APICMDSTRUCT
typedef struct
  {
    WORD len;
    WORD cmd;
    char parms[128];
```

```
   }
APICMDSTRUCT:
#define HAVE_APICMDSTRUCT
#endif

#include "nwapi.h"
#include "hoeg.h"
#include "hoegpext.h"

#define yyunion(i,j)    memcpy( i, j, sizeof(YYSTYPE) )
#define MAX_USERBUTTONS 3

static int i;
static long ButtonText[MAX_USERBUTTONS+1];
static int  defver;
static int  flag;
short yyexca[] ={
-1, 1,
        0, -1,
        -2, 0,
-1, 148,
        700, 222,
        -2, 211,
-1, 154,
        59, 219,
        -2, 224,
        };
# define YYNPROD 226
# define YYLAST 774
short yyact[]={

  45,  78,  46,  72,  47, 209, 178,  79,  48,  49,
  50, 248,  51, 247,  83,  82,  77, 226, 225, 210,
  52,  75,  54, 207,  55,  56,  57,  58, 188,  59,
  60, 167, 165, 158,  61,  73,  62,  63,  64,  65,
 140, 137,  66, 132, 131, 130,  67,  68,  69, 128,
  74, 182, 198, 181,  70,  71,  45,  76,  46,  72,
  47,  98,  94, 284,  48,  49,  50, 136,  51, 300,
 134, 285, 163, 138, 303, 144,  52,  75,  54, 281,
  55,  56,  57,  58, 250,  59,  60, 282, 302, 288,
  61,  73,  62,  63,  64,  65, 301, 287,  66, 278,
 154, 204,  67,  68,  69, 299,  74, 279, 274, 205,
  70,  71,  45,  76,  46,  72,  47, 201, 212, 154,
  48,  49,  50, 187,  51, 314, 202, 194, 266, 313,
 292, 186,  52,  75,  54, 169,  55,  56,  57,  58,
 267,  59,  60, 170, 154, 261,  61,  73,  62,  63,
  64,  65, 148, 244,  66, 144, 178, 154,  67,  68,
  69, 215,  74, 129, 142, 276,  70,  71,  45,  76,
  46,  72,  47, 271, 243, 229,  48,  49,  50, 220,
  51, 211, 175, 157, 155, 126, 107, 108,  52,  75,
  54, 283,  55,  56,  57,  58, 280,  59,  60,  10,
 230,   8,  61,  73,  62,  63,  64,  65,  81, 149,
  66,   4, 241, 223,  67,  68,  69, 222,  74, 124,
 218, 231,  70,  71,  45,  76,  46,  72,  47, 143,
 309, 146,  48,  49,  50, 160,  51, 224, 159,   9,
 256, 310, 297, 275,  52,  75,  54, 295,  55,  56,
  57,  58, 103,  59,  60, 296, 242, 269,  61,  73,
  62,  63,  64,  65, 104, 101,  66, 298, 153, 152,
  67,  68,  69, 172,  74, 253, 254, 185,  70,  71,
 100,  45,  76,  46,  72,  47,   5,  84, 255,  48,

  49,  50,  44,  51, 193, 227, 259, 197, 102, 257,
 258,  52,  75,  54, 236,  55,  56,  57,  58, 151,
  59,  60, 237, 103, 150,  61,  73,  62,  63,  64,
  65,   7, 260,  66, 173, 104, 113,  67,  68,  69,
  80,  74, 192, 147, 105,  70,  71, 233, 239, 168,
 119, 118, 117, 305, 304, 307, 306, 294,  44, 265,
 111, 264, 114, 277, 263, 234, 262, 162, 235, 115,
 161, 199, 110, 106, 191, 120, 291, 272, 135, 145,
  97, 189, 219,  81,  96,  95, 248, 139, 206, 116,
 270, 245, 184,  93,  92, 183, 216, 214, 133,  91,
  53, 308, 293, 228, 109, 289, 213,  90,  89, 268,
 180,  88,  87,  86,  44, 179,  85, 125, 238,  43,
  42,  41,  40,  39,  38,  37,  81,  36,  35,  34,
  33, 198, 185, 190,  32,  31,  30,  29,  28,  27,
  26,  25,  24,  23,  22,  21,  20,  19,  81,  18,
  17,  16,  15,  14,  13,  11, 174, 208, 177, 251,
 123, 171, 122, 121,   6,   3,  78,   2,   1, 252,
  44, 221, 217, 249, 196, 195, 286, 232, 203, 200,
 273, 112, 290,  99, 166, 164, 141, 158, 240, 127,
   0,   0,   0,   0,   0,   0,   0,   0,   0,   0,
  81,   0,  12,   0,   0,   0,   0, 112,   0,   0,
   0, 311,   0,   0,   0,   0,   0,   0,   0,   0,
   0,   0,   0,   0,   0,   0,  44,   0,   0,   0,
   0,   0,   0,   0,   0,   0,   0,   0,   0,   0,
   0,   0,   0,   0,   0,   0,   0,   0,   0,   0,
   0,   0,   0,   0,   0,   0,   0,   0,  12,   0,
   0,   0,   0,   0,   0,   0,   0,   0,   0,   0,
   0,   0,   0,   0,   0,   0,   0,   0,   0,   0,
   0,   0,   0,  44,   0,   0,   0,   0,   0,   0,
   0,   0,   0,   0,   0,   0,   0,   0,   0,   0,
   0,   0,   0,   0,   0,   0,   0,   0,   0,   0,
   0,   0,   0,   0,  12,   0,   0,   0,   0,   0,
   0,   0,   0,   0,   0,   0,   0,   0,   0,   0,
   0,   0,   0,   0,   0,   0,   0,   0,   0,   0,
   0,   0,   0,   0,   0,   0,   0,   0,   0,   0,
   0,   0,   0,   0,   0,   0,   0,   0,   0,   0,
   0,   0,   0,   0,   0,   0,   0,   0,   0,   0,
  12,   0,   0,   0,   0,   0,   0,   0,   0,   0,
   0,   0,   0,   0,   0,   0,   0,   0,   0,   0,
   0,   0,   0,   0,   0,   0,   0,   0,   0,   0,
   0,   0,   0,   0,   0,   0,   0,   0,   0,   0,
   0,   0,   0,   0,   0,   0,   0,   0,   0,   0,
   0,   0,   0,   0,   0,   0,  12,   0,   0,   0,
   0,   0,   0,   0,   0,   0,   0,   0,   0,   0,
   0,   0,   0,   0,   0,   0,   0,   0,   0,   0,
   0,   0,   0,   0,   0,   0,   0,   0,   0,   0,
   0,   0,   0,   0,   0,   0,   0,   0,   0,   0,
   0,   0,   0,   0,   0,   0,   0,   0,   0,   0,
   0,   0,   0,  12 };
short yypact[]={

 -46,-1000,-1000,  15,-684,-482 -1000,-1000,  15,-685,
-1000,-685,-1000,-1000,-1000 -1000,-1000 -1000,-1000,-1000,
-1000,-1000,-1000,-1000,-1000,-1000,-1000,-1000,-1000,-1000,
-1000,-1000,-1000,-1000,-1000,-1000,-1000,-1000,-1000,-1000,
-1000,-1000,-1000,-1000, 226,-1000,-1000,-1000,-1000,-1000,
-1000,-1000,-1000,-1000,-1000,-1000,-1000,-438,-1000,-1000,
-439,  39,-1000,-1000,-234,-213,-1000,-1000,-1000, 100,
-1000,-1000,-1000,-1000,-1000,-1000,-1000,-1000, -30,-1000,
-1000,-1000,-1000,-1000,-1000,-256,-651,-279,-555,-556,
```

```
-557,-172,-559,-372,-1000,-560,-288,-1000,-1000,  14,
-1000,-1000,-1000,-1000,-1000,-298,-257,-1000,-1000,-567,
-258,   -4,-1000,-1000,-1000,-1000,-373,-558,-569,-307,
-693,-1000,  -40,-694,-1000,-284,-1000,-1000,-1000,-1000,
-1000,-1000,-447,-1000,-489,-1000,-1000,-1000,-1000,-319,
-1000,-1000,-572,-1000,-1000,-319,-1000,-1000, 235,-1000,
-1000,-1000,-323,-1000,-1000,-1000,-448,-1000,-1000,-1000,
-1000,-324,-341,-1000,-1000,-1000,-1000,-1000,-1000,-1000,
-577,-1000,-1000,  -40,-695,-1000,-1000,-581,-1000,-250,
-325,-1000,-1000,-281,   73,  -18,-1000,-1000,-1000,-262,
 -14,-582,-583,-1000,-1000,-285,-1000, 238,-1000,-266,
-1000,-1000,  -39,-1000,-1000,   98,   73,-1000,-1000,-1000,
-1000,-1000,    8,-267,-289,-1000,-208,-1000,-1000,-366,
-1000,   35,-1000,-1000,-1000,-1000,-1000,-1000,-297,-1000,
-1000,-1000,-1000,-1000,-1000,-1000,-1000,-1000,  -98,-302,
-1000,-1000,-1000,   50,-1000,-1000,-1000,-1000,-268,-1000,
-1000,-1000,-1000,-1000,-1000,-1000,-1000,-1000,-1000,-1000,
-342,   38,-276,-343,-363,-379,-1000,-1000,-353,-1000,
  73,-1000,-312,-1000, 235,-1000,-1000,-1000,-1000,   41,
-1000,-1000,   28,-1000,-1000,   81,-1000,-1000,-1000,-339,
-152,-354,-1000,-370,-1000,-1000,-1000,-1000,-1000,-1000,
-1000,-1000,-1000,   15,-363,-379,-313,-317,-1000,-1000,
-1000,-1000,-1000,-1000,-1000 };
short yypgo[]={

   0, 479, 478, 477, 476, 475, 474, 473, 280, 471,
 469, 468, 467, 466, 463, 229, 277, 462, 461, 459,
 458, 457, 286, 456, 455, 454, 321, 201, 453, 452,
 451, 273, 450, 448, 446, 199, 445, 444, 443, 442,
 441, 440, 439, 437, 436, 435, 434, 433, 432, 431,
 430, 429, 428, 427, 426, 425, 424, 420, 419, 418,
 417, 415, 414, 413, 412, 411, 410, 409, 407, 406,
 405, 403, 402, 401, 400, 399, 398, 397, 396, 395,
 394, 393, 392, 391, 390, 389, 388, 387, 385, 384,
 383, 382, 381, 380, 379, 378, 377, 376, 375, 374,
 372, 371, 370, 369, 367, 366, 364, 363, 362, 361,
 360, 357, 356, 355, 354, 353, 351, 196, 349, 191,
 347, 346, 345, 344, 343, 342, 341, 340, 339, 338,
 334, 333, 332, 322, 209, 314, 109, 289, 297, 268 };
short yyr1[]={

   0,  20,  21,  24,  25,  25,  26,  23,  23,  28,
  30,  30,  29,  22,  22,  33,  32,  31,  34,  27,
  27,  35,  35,  36,  36,  36,  38,  36,  36,  36,
  36,  36,  36,  36,  36,  36,  38,  36,  36,  38,
  36,  36,  38,  36,  36,  36,  36,  36,  38,  36,
  36,  36,  38,  36,  68,  37,  69,  70,  38,  71,
  39,   1,   1,  72,  40,  73,  74,  75,  41,   2,
   2,  13,  13,  76,  42,  77,  78,  79,  43,  80,
  81,  82,  59,  83,  83,  83,  44,  45,  85,  46,
  84,  84,  87,  86,  88,  86,  86,  89,  47,  90,
  91,  48,  93,  92,  92,  94,  95,  64,  49,  96,
  50,  16,  16,  17,  97,  17,  98,  51,  99,  52,
   4,   4, 100,   4,  14,  14, 101,  15,  53, 103,
 102,  18,  18,  18,  18,  19,  19,  19,  19,  19,
  19, 104,  19, 105, 105, 106,  54,   7,   7,   7,
   9,   9,   8,   8,  57,  58, 107,  56,  60, 108,
 109,  61,  62, 110,  62, 111,  62,  10,  10, 112,
  10,  11,  11,  12,  12, 114, 113, 116, 113, 118,
 113, 115, 115, 117, 121, 117, 119, 122, 119, 123,
 120, 124, 120,   3,   3,  63, 125,  65,   5,   5,
 126,  66,   6,   6, 127,  67, 128, 129, 128, 130,
  55, 132, 133, 131, 131, 134, 134, 135, 135, 138,
 137, 137, 136, 136, 139, 139 };
short yyr2[]={

   0,   4,   2,   2,   1,   2,   2,   0,   2,   2,
   1,   2,   2,   0,   2,   0,   3,   2,   1,   1,
   2,   2,   1,   1,   1,   1,   1,   1,   1,   1,
   1,   1,   1,   1,   1,   1,   1,   1,   1,   1,
   1,   1,   1,   1,   1,   1,   1,   1,   1,   1,
   1,   1,   1,   1,   0,   4,   0,   0,   5,   0,
   3,   0,   1,   0,   3,   0,   0,   0,   8,   1,
   1,   1,   1,   0,   3,   0,   0,   0,   9,   0,
   0,   0,  10,   0,   1,   1,   1,   1,   0,   3,
   1,   1,   0,   4,   0,   3,   1,   0,   3,   0,
   0,   8,   0,   4,   1,   0,   0,   8,   1,   0,
   5,   1,   1,   0,   0,   3,   0,   3,   0,   3,
   1,   1,   0,   4,   1,   1,   0,   3,   2,   0,
   5,   0,   1,   1,   1,   1,   1,   1,   1,   1,
   1,   0,   4,   1,   2,   0,   5,   1,   1,   1,
   1,   1,   1,   1,   2,   2,   0,   3,   1,   0,
   0,   5,   3,   0,   4,   0,   4,   1,   2,   0,
   4,   1,   2,   1,   1,   0,   3,   0,   3,   0,
   3,   1,   2,   1,   0,   4,   1,   0,   4,   0,
   3,   0,   3,   1,   1,   1,   0,   3,   0,   1,
   0,   3,   0,   1,   0,   3,   1,   0,   4,   0,
   3,   0,   0,   5,   1,   1,   1,   2,   2,   0,
   3,   2,   1,   1,   1,   2 };
short yychk[]={

-1000, -20, -21, -24, 257, -22, -25, -26, -27, 223,
 -35, -36, 700, -37, -38, -39, -40, -41, -42, -43,
 -44, -45, -46, -47, -48, -49, -50, -51, -52, -53,
 -54, -55, -56, -57, -58, -59, -60, -61, -62, -63,
 -64, -65, -66, -67, 500, 208, 210, 212, 216, 217,
 218, 220, 228, -34, 230, 232, 233,-234, 235, 237,
 238, 242, 244, 245, 246, 247, 250, 254, 255, 258,
 262, 263, 311, 243, 258, 229, 209, 700, -23, 700,
 -26, -35, 700, 700,  41, -69, -71, -72, -73, -75,
 -77, -85, -89, -90, 500, -98, -99,-102, 500,  -7,
  -3, 226, 259, 213, 225,-130,-107, 420, 400, -80,
-108,  -8,  -9, 226, 252, 259, -94,-125,-126,-127,
 -22, -28, -29, -32, 249, -68, 441,  -1, 600, 442,
 600, 500, 500, 426, 242, 540, 239, 500, 445, -96,
 600,  -4, 450, -15, 441,-103, 217,-131, 450,-134,
-135,-135,-137,-139, 442, 441, 500, 441,  -3, 242,
 239,-113,-111, 445,  -5, 500,  -6, 500,-128, 442,
 450, -30, -31, -27, -34, 222, 700, -33, 440, -70,
 -74, 500, 540, -88, -91, -16, 450, 442, 500,-101,
 -15,-106,-102,  53, 450,-127,-133,-133, 500,-109,
 [illegible]
 [illegible]
 [illegible]
 [illegible]
  -2, 234, 248, 441, 442, [illegible], 113, [illegible], -37, -14,
 450, -16, -19, 240, 241, 253, 205, 284, 265, 261,
-132, 442,-112,-114,-116,-113, 224, 442, -75, 207,
 -41, 441,-104,-134, 450, 237, 441,-115, 442, 450,
-117, 442, 450,-113, 442, 450, -13, 450, 442, -79,
```

```
 -27,-105, 442, -82,-120, 206, 214, 214, 208, 444,
 221, 450, 442, 444,-123,-124,-121,-122, -83, 215,
 226,-117,-119, 442, 442 };
short yydef[]={

   0,  -2,  13,   0,   0,   7,   2,   4,   0,   0,
  19,   0,  22,  23,  24,  25,  26,  27,  28,  29,
  30,  31,  32,  33,  34,  35,  36,  37,  38,  39,
  40,  41,  42,  43,  44,  45,  46,  47,  48,  49,
  50,  51,  52,  53,   0,  56,  59,  63,  65,  73,
  75,  86,  87,  88,  97,  99, 108,   0, 116, 118,
   0,   0, 209, 158,   0,   0,  79, 158, 159,   0,
 195, 105, 196, 200, 204,  90,  91,   3,  13,  14,
   5,  20,   6,  21,  54,   0,  61,   0,   0,   0,
   0,   0,   0,   0, 109,   0,   0, 128, 129,   0,
 147, 148, 149, 152, 153,   0,   0, 154, 155,   0,
   0,   0, 163, 165, 150, 151,   0, 198, 202,   0,
   1,   8,   0,   0,  15,   0,  57,  60,  62,  64,
  66,  74,   0,  89,   0,  94,  96,  98, 100,   0,
 117, 119, 120, 121, 126,   0, 145, 210,  -2, 214,
 215, 216,   0, 223,  -2, 157,   0, 160, 162, 193,
 194,   0,   0, 106, 197, 199, 201, 203, 205, 206,
   0,   9,  10,   0,   0,  18,  12,   0,  55,   0,
   0,  76,  92,   0,   0, 113, 111, 112, 122,   0,
 131,   0,   0, 217, 218, 221, 225,   0,  80,   0,
 164, 167,   0, 168, 171,   0,   0, 207,  11,  17,
  16,  58,   0,   0,   0,  95,   0, 110, 114,   0,
 127,   0, 132, 133, 134, 146, 212, 220,   0, 181,
 158, 169, 172, 173, 174, 175, 177, 179,   0,   0,
  67,  69,  70,   0,  93, 101, 102, 104,   0, 123,
 124, 125, 130, 135, 136, 137, 138, 139, 140, 141,
   0,   0,   0,   0,   0,   0, 107, 208,   0,  77,
   0, 115,   0, 213, 222,  81, 170, 176, 181,   0,
 178, 183,   0, 180, 186,   0,  68,  71,  72,   0,
   0,   0, 143,   0, 182, 189, 191, 184, 187,  78,
 103, 142, 144,  83,   0,   0,   0,   0,  82,  84,
  85, 190, 192, 185, 188 };
# define YYFLAG -1000
# define YYERROR goto yyerrlab
# define YYACCEPT return(0)
# define YYABORT return(1)

/*      parser for yacc output  */

int yydebug = 0; /* 1 for debugging */
YYSTYPE yyv[YYMAXDEPTH]; /* where the values are stored */
int yychar = -1; /* current input token number */
int yynerrs = 0;  /* number of errors */
short yyerrflag = 0;  /* error recovery flag */

yyparse()
   {

   short yys[YYMAXDEPTH];
   short yyj, yym;
   register YYSTYPE *yypvt;
   register short yystate, *yyps, yyn;
   register YYSTYPE *yypv;
   register short *yyxi;

   yystate = 0;
   yychar = -1;
   yynerrs = 0;
   yyerrflag = 0;
   yyps= &yys[-1];
   yypv= &yyv[-1];

yystack:    /* put a state and value onto the stack */

   if( yydebug  ) printf( "state %d, char 0%o\n", yystate, yychar );
   if( ++yyps> &yys[YYMAXDEPTH] )
      {
      yyerror( "yacc stack overflow" );
      return(1);
      }
   *yyps = yystate;
   ++yypv;
#ifdef UNION
   yyunion(yypv, &yyval);
#else
   *yypv = yyval;
#endif
yynewstate:

   yyn = yypact[yystate];

   if( yyn<= YYFLAG ) goto yydefault; /* simple state */

   if( yychar<0 ) if( (yychar=yylex())<0 ) yychar=0;
   if( (yyn += yychar)<0 || yyn >= YYLAST ) goto yydefault;

   if( yychk[ yyn=yyact[ yyn ] ] == yychar )
      {
      /* valid shift */
      yychar = -1;
#ifdef UNION
          yyunion(&yyval, &yylval);
#else
      yyval = yylval;
#endif
      yystate = yyn;
      if( yyerrflag > 0 ) --yyerrflag;
      goto yystack;
      }
yydefault:
   /* default state action */

   if( (yyn=yydef[yystate]) == -2 )
      {
      if( yychar<0 ) if( (yychar=yylex())<0 ) yychar = 0;
      /* look through exception table */

      for( yyxi=yyexca; (*yyxi!= (-1)) || (yyxi[1]!=yystate) ; yyxi += 2 ) ; /* VOID */

      for(yyxi+=2; *yyxi >= 0; yyxi+=2){

         if( *yyxi == yychar ) break;
         }
      if( (yyn = yyxi[1]) < 0 ) return(0);   /* accept */
      }
```

```
  if( yyn == 0 )
     {
     /* error */
     /* error ... attempt to resume parsing */

     switch( yyerrflag )
        {

     case 0:   /* brand new error */

        yyerror( "syntax error" );
yyerrlab:
        ++yynerrs;

     case 1:
     case 2: /* incompletely recovered error ... try again */

        yyerrflag = 3;

        /* find a state where "error" is a legal shift action */

        while ( yyps >= yys )
           {
           yyn = yypact[*yyps] + YYERRCODE;
           if( yyn>= 0 && yyn < YYLAST && yychk[yyact[yyn]] == YYERRCODE )
              {
              yystate = yyact[yyn];  /* simulate a shift of "error" */
              goto yystack;
              }
           yyn = yypact[*yyps];

           /* the current yyps has no shift onn "error", pop stack */

           if( yydebug ) printf( "error recovery pops state %d, uncovers %d\n", *yyps, yyps[-1] );
           --yyps;
           --yypv;
           }

        /* there is no state on the stack with an error shift ... abort */

yyabort:
        return(1);


     case 3:  /* no shift yet; clobber input char */
        if( yydebug ) printf( "error recovery discards char %d\n", yychar );

        if( yychar == 0 ) goto yyabort; /* don't discard EOF, quit */
        yychar = -1;
        goto yynewstate;   /* try again in the same state */

        }

     }

  /* reduction by production yyn */

  if( yydebug ) printf("reduce %d\n",yyn);
  yyps -= yyr2[yyn];
  yypvt = yypv;
  yypv -= yyr2[yyn];
#ifdef UNION
  yyunion(&yyval, &yypv[1]);
#else
  yyval = yypv[1];
#endif
  yym=yyn;
  /* consult goto table to find next state */
  yyn = yyr1[yyn];
  yyj = yypgo[yyn] + *yyps + 1;
  if( yyj>=YYLAST || yychk( yystate = yyact[yyj] ] != -yyn ) yystate = yyact[yypgo[yyn]];
  switch(yym)
     {

case 6:
# line 132
{ OutputPCode( AG_END_PCODE, 0, 0L ); } break;
case 15:
# line 173
{ LabelFlag = TRUE; } break;
case 16:
# line 175
{ SetupLabel( yypvt[-0].ival ); } break;
case 18:
# line 187
{ OutputPCode( AG_RETURN_PCODE, 0, 0L ); } break;
case 21:
# line 202
{ CDcmdflag = TRUE;
                gCurrErrnum = 0;  } break;
case 22:
# line 206
{ CDcmdflag = TRUE;
                gCurrErrnum = 0;  } break;
case 54:
# line 280
{ MakeExpression( ANY_EXP ); } break;
case 55:
# line 282
{ AssignStmt( yypvt[-2].ival, yypvt[-0].ival ); } break;
case 56:
# line 288
{ MakeExpression( NUM_EXP ); } break;
case 57:
# line 291
{ MakeExpression( NUM_EXP ); } break;
case 58:
# line 293
{ OutputPCode2( AG_BEEP_PCODE, yypvt[-2].ival, yypvt[-0].ival ); } break;
case 59:
# line 300
{ LaceFlag = TRUE; } break;
case 60:
# line 302
{ OutputPCode( AG_WINDOWCLEAR_PCODE, yypvt[-0].ival, 0L ); } break;
case 61:
# line 309
{ yyval.ival = 0; } break;
case 63:
```

```
# line 318
{ MakeExpression( STR_EXP ); } break;
case 64:
# line 320
{ OutputPCode( AG_COM1_PCODE, 0, yypvt[-0].lval ); } break;
case 65:
# line 327
{ LabelFlag = TRUE; } break;
case 66:
# line 329
{ LabelFlag = FALSE;
            MakeExpression( RGN_EXP ); } break;
case 67:
# line 332
{ MakeExpression( STR_EXP ); } break;
case 68:
# line 334
{ DefineWindow( yypvt[-5].ival, yypvt[-2].ival, yypvt[-3].lval, yypvt[-0].lval ); } break;
case 69:
# line 341
{ yyval.ival = AG_CBT_WND; } break;
case 70:
# line 344
{ yyval.ival = AG_POP_WND; } break;
case 71:
# line 351
{ yyval.lval = 0L; } break;
case 72:
# line 354
{ yyval.lval = ((HIWORD(yypvt[-0].lval) != STR_L) || (LOWORD(yypvt[-0].lval))) ?
               yypvt[-0].lval :
               MAKELONG(-1, 0); } break;
case 73:
# line 363
{ LabelFlag = TRUE; } break;
case 74:
# line 365
{ GoToLabel( AG_DO_PCODE, yypvt[-0].ival, USER_LABEL ); } break;
case 75:
# line 372
{ LabelFlag = TRUE; } break;
case 76:
# line 374
{ LabelFlag = FALSE;
            MakeExpression( NUM_EXP ); } break;
case 77:
# line 377
{ MakeExpression( PNT_EXP ); } break;
case 78:
# line 379
{ UserControl( AG_EDITBOX_PCODE, yypvt[-6].ival, yypvt[-5].lval, yypvt[-3].lval, yypvt[-0].lval, FALSE ); } break;
case 79:
# line 386
{ LabelFlag = TRUE; } break;
case 80:
# line 388
{ LabelFlag = FALSE;
            MakeExpression( STR_EXP ); } break;
case 81:
# line 391
```

```
{ MakeExpression( PNT_EXP ); } break;
case 82:
# line 392
{ UserControl( AG_PUSHBUTTON_PCODE, yypvt[-7].ival, yypvt[-6].lval, yypvt[-4].lval, yypvt[-1].lval, defvar ); } break;
case 83:
# line 399
{ defvar = 0; } break;
case 84:
# line 402
{ defvar = AG_DEFBUTTON; } break;
case 85:
# line 405
{ defvar = AG_ESCBUTTON; } break;
case 86:
# line 412
{ OutputPCode( AG_END_PCODE, 0, 0L ); } break;
case 87:
# line 419
{ OutputPCode( AG_EXECUTE_PCODE, 0, 0L ); } break;
case 88:
# line 428
{ gClassFlag = TRUE; } break;
case 92:
# line 440
{ gClassFlag = FALSE;
            MakeExpression( STR_EXP ); } break;
case 93:
# line 442
{ ObjectFocus( yypvt[-2].ival, yypvt[-0].lval ); } break;
case 94:
# line 446
{ gClassFlag = FALSE;
            MakeExpression( STR_EXP ); } break;
case 95:
# line 449
{ ObjectFocus( yypvt[-2].ival, yypvt[-0].lval ); } break;
case 96:
# line 452
{ ObjectFocus( NO_FOCUS, 0L ); } break;
case 97:
# line 458
{ LabelFlag = TRUE; } break;
case 98:
# line 460
{ GoToLabel( AG_JUMP_PCODE, yypvt[-0].ival, USER_LABEL ); } break;
case 99:
# line 467
{ MakeExpression( LOG_EXP ); } break;
case 100:
# line 469
{ JumpConditional( IF_SYMBOL ); } break;
case 102:
# line 475
{ FixupJump( ELSE_SYMBOL ); } break;
case 103:
# line 478
{ FixupJump( ENDIF-SYMBOL ); } break;
case 104:
# line 482
{ FixupJump( ENDIF_SYMBOL ); } break;
```

```
case 105:
# line 489
{ JumpConditional( WHILE_SYMBOL );
        MakeExpression( LOG_EXP ); } break;
case 106:
# line 492
{ JumpConditional( INWHILE_SYMBOL ); } break;
case 107:
# line 494
{ FixupJump( ENDWHILE_SYMBOL ); } break;
case 108:
# line 501
{ OutputPCode( AG_IGNORE_PCODE, 0, 0L ); } break;
case 109:
# line 508
{ MakeExpression( STR_EXP ); } break;
case 110:
# line 510
{ UserInput( AG_INPUT_PCODE, yypvt[-1].lval, yypvt[-0].lval, yypvt[-3].lval ); } break;
case 111:
# line 518
{ yyval.lval = 0L; } break;
case 112:
# line 519
{ yyval.lval = yypvt[-0].lval; } break;
case 113:
# line 525
{ yyval.lval = 0L; } break;
case 114:
# line 528
{ MakeExpression( NUM_EXP ); } break;
case 115:
# line 530
{ yyval.lval = yypvt[-0].lval; } break;
case 116:
# line 537
{ LabelFlag = TRUE; } break;
case 117:
# line 539
{ SetupLabel( yypvt[-0].ival ); } break;
case 118:
# line 546
{ LabelFlag = TRUE;
        MakeExpression( NUM_EXP ); } break;
case 120:
# line 554
{ OutputPCode( AG_LOCATE_PCODE, 0, 0L ); } break;
case 121:
# line 557
{ OutputPCode( AG_LOCATE_PCODE, 0, yypvt[-0].lval ); } break;
case 122:
# line 560
{ MakeExpression( NUM_EXP ); } break;
case 123:
# line 562
{ OutputPCode( AG_LOCATE_PCODE, yypvt[-2].ival, yypvt[-0].lval ); } break;
case 124:
# line 568
{ yyval.lval = 0L; } break;
case 126:
# line 576
{ MakeExpression( NUM_EXP ); } break;
case 127:
# line 578
{ yyval.lval = MakePoint( yypvt[-2].lval, yypvt[-0].lval ); } break;
case 129:
# line 590
{ MakeExpression( STR_EXP );
        ButtonText[i] = 0L;
        i = 0; } break;
case 130:
# line 594
{ UserInput(    AG_MESSAGE_PCODE, yypvt[-2].lval,
                MAKELONG(yypvt[-1].lval, yypvt[-0].lval),
                yypvt[-4].lval, ButtonText ); } break;
case 131:
# line 602
{ yyval.lval = 0; } break;
case 132:
# line 605
{ yyval.lval = MB_ICONHAND; } break;
case 133:
# line 608
{ yyval.lval = MB_ICONEXCLAMATION; } break;
case 134:
# line 611
{ yyval.lval = MB_ICONQUESTION; } break;
case 135:
# line 617
{ yyval.lval = MB_OK; } break;
case 136:
# line 620
{ yyval.lval = MB_OKCANCEL; } break;
case 137:
# line 623
{ yyval.lval = MB_RETRYCANCEL; } break;
case 138:
# line 626
{ yyval.lval = MB_ABORTRETRYIGNORE; } break;
case 139:
# line 629
{ yyval.lval = MB_YESNO; } break;
case 140:
# line 632
{ yyval.lval = MB_YESNOCANCEL; } break;
case 141:
# line 635
{ yyval.lval = AG_USERBUTTON;
        MakeExpression( STR_EXP ); } break;
case 142:
# line 639
{ ButtonText[i] = 0L; } break;
case 143:
# line 644
{ if ( i < MAX_USERBUTTONS )
            ButtonText[i++] = yypvt[-0].lval;
        MakeExpression( STR_EXP ); } break;
case 144:
# line 649
{ if ( i < MAX_USERBUTTONS )
```

```
                ButtonText[i++] = yypvt[-0].ival;
          MakeExpression( STR_EXP ); } break;
case 145:
# line 658
{ LabelFlag = TRUE; } break;
case 146:
# line 660
{ OnDoPCode( yypvt[-3].ival, yypvt[-0].ival ); } break;
case 148:
# line 669
{ yyval.ival = AG_SYSESCAPE_ID; } break;
case 149:
# line 672
{ yyval.ival = AG_SYSTIMEOUT_ID; } break;
case 150:
# line 678
{ yyval.ival = defvar = AG_SYSRATE_ID; } break;
case 151:
# line 681
{ yyval.ival = defvar = AG_SYSTIMEOUT_ID; } break;
case 152:
# line 687
{ yyval.ival = AG_SYSCOMMAND_ID; } break;
case 153:
# line 690
{ yyval.ival = AG_SYSERROR_ID; } break;
case 154:
# line 698
{ SetPCode( yypvt[-0].ival ); } break;
case 155:
# line 703
{ SetPCommand( yypvt[-0].ival ); } break;
case 156:
# line 710
{ MakeExpression( NUM_EXP ); } break;
case 157:
# line 712
{ OutputPCode( AG_PAUSE_PCODE, 0, yypvt[-0].ival ); } break;
case 158:
# line 719
{ OutputPCode( AG_RETURN_PCODE, 0, 0L ); } break;
case 159:
# line 726
{ MakeExpression( NUM_EXP ); } break;
case 160:
# line 728
{ MakeExpression( NUM_EXP ); } break;
case 161:
# line 730
{ OutputPCode2( AG_SCREEN_PCODE, yypvt[-2].ival, yypvt[-0].ival ); } break;
case 162:
# line 737
{ OutputPCode( AG_SET_INTERRUPT_PCODE, yypvt[-1].ival, MAKELONG(yypvt[-0].ival, 0) ); } break;
case 163:
# line 740
{ MakeExpression( NUM_EXP ); } break;
case 164:
# line 742
{ OutputPCode( AG_SET_INTERRUPT_PCODE, yypvt[-2].ival, MAKELONG(yypvt[-0].ival, 0) ); } break;
case 165:
# line 745
{ flag = 0;
          MakeExpression( STR_EXP ); } break;
case 166:
# line 748
{ OutputPCode(  AG_SET_INTERRUPT_PCODE, AG_SYSESCAPE_ID,
                        MAKELONG(yypvt[-0].ival, 0) ); } break;
case 167:
# line 755
{ SetSysVarPcode( defvar, 0, yypvt[-0].ival );
          yyval.ival = TRUE; } break;
case 168:
# line 759
{ yyval.ival = FALSE; } break;
case 169:
# line 762
{ MakeExpression( NUM_EXP ); } break;
case 170:
# line 764
{ SetSysVarPcode( defvar, 0, yypvt[-0].ival );
          yyval.ival = TRUE; } break;
case 171:
# line 772
{ SetSysVarPcode( AG_SYSESCAPE_ID, 0, yypvt[-0].ival );
          yyval.ival = TRUE; } break;
case 172:
# line 778
{ yyval.ival = yypvt[-0].ival; } break;
case 173:
# line 782
{ yyval.ival = FALSE; } break;
case 174:
# line 785
{ yyval.ival = TRUE; } break;
case 175:
# line 791
{ MakeExpression( STR_EXP ); } break;
case 177:
# line 795
{ MakeExpression( STR_EXP );
          flag = flag | AG_ALTKEY; } break;
case 179:
# line 800
{ MakeExpression( STR_EXP );
          flag = flag | AG_CTRLKEY; } break;
case 181:
# line 808
{ SetSysvarPcode( AG_SYSESCAPE_ID, flag, yypvt[-0].ival ); } break;
case 183:
# line 816
{ SetSysvarPcode( AG_SYSESCAPE_ID, flag, yypvt[-0].ival ); } break;
case 184:
# line 819
{ MakeExpression( STR_EXP );
          flag = flag | AG_CTRLKEY; } break;
case 185:
# line 822
{ SetSysvarPcode( AG_SYSESCAPE_ID, flag, yypvt[-0].ival ); } break;
case 186:
# line 828
```

```
{ SetSysVarPcode( AG_SYSESCAPE_ID, flag, yypvt[-0].lval ); } break;
case 187:
# line 831
{ MakeExpression( STR_EXP );
          flag = flag | AG_ALTKEY; } break;
case 188:
# line 834
{ SetSysVarPcode( AG_SYSESCAPE_ID, flag, yypvt[-0].lval ); } break;
case 189:
# line 840
{ MakeExpression( STR_EXP );
          flag = flag | AG_ALTKEY; } break;
case 191:
# line 845
{ MakeExpression( STR_EXP );
          flag = flag | AG_CTRLKEY; } break;
case 193:
# line 854
{ yyval.ival = TRUE; } break;
case 194:
# line 857
{ yyval.ival = FALSE; } break;
case 195:
# line 864
{ OutputPCode( AG_WAIT_PCODE, 0, 0L ); } break;
case 196:
# line 871
{ LabelFlag = TRUE; } break;
case 197:
# line 873
{ OutputPCode( AG_WINDOWCLOSE_PCODE, yypvt[-0].ival, 0L ); } break;
case 198:
# line 880
{ yyval.ival = 0; } break;
case 200:
# line 889
{ LabelFlag = TRUE; } break;
case 201:
# line 891
{ OutputPCode( AG_WINDOWOPEN_PCODE, yypvt[-0].ival, 0L ); } break;
case 202:
# line 898
{ yyval.ival = 0; } break;
case 204:
# line 907
{ LabelFlag = TRUE;
          MakeExpression( STR_EXP ); } break;
case 206:
# line 915
{ OutputPCode( AG_WINDOWTITLE_PCODE, 0, yypvt[-0].lval ); } break;
case 207:
# line 918
{ MakeExpression( STR_EXP ); } break;
case 208:
# line 920
{ OutputPCode( AG_WINDOWTITLE_PCODE, yypvt[-2].ival, yypvt[-0].lval ); } break;
case 209:
# line 927
{ MakeExpression( STR_EXP ); } break;
case 211:
# line 934
{ LabelFlag = TRUE; } break;
case 212:
# line 938
{ OutputPCode( AG_LOCATE_PCODE, yypvt[-0].ival, 0L );
          LabelFlag = FALSE;
          MakeExpression( STR_EXP ); } break;
case 217:
# line 954
{  } break;
case 219:
# line 962
{ OutputPCode( AG_OUTPUT_PCODE, FALSE, yypvt[-0].lval ); } break;
case 220:
# line 964
{ MakeExpression( STR_EXP ); } break;
case 222:
# line 972
{ OutputPCode( AG_OUTPUT_PCODE, TRUE, 0L ); } break;
case 223:
# line 975
{ OutputPCode( AG_OUTPUT_PCODE, TRUE, 0L ); } break;
case 224:
# line 981
{ OutputPCode( AG_OUTPUT_PCODE, FALSE, yypvt[-0].lval ); } break;/* End of actions */
      }
   goto yystack;  /* stack new state and value */

   }
```

```
#S3771; #O9329 * BARBARA.PF; LP602 * TUE, MAY 17, 1988, 6:28 AM
#S3771; #O9329 * BARBARA.PF; LP602 * TUE, MAY 17, 1988, 6:28 AM
#S3771; #O9329 * BARBARA.PF; LP602 * TUE, MAY 17, 1988, 6:28 AM
```

```
#S3771; #O9329 * BARBARA.PF; LP602 * TUE, MAY 17, 1988, 6:28 AM
#S3771; #O9329 * BARBARA.PF; LP602 * TUE, MAY 17, 1988, 6:28 AM
#S3771; #O9329 * BARBARA.PF; LP602 * TUE, MAY 17, 1988, 6:28 AM
```

```
#S3771; #O9329 * BARBARA.PF; LP602 * TUE, MAY 17, 1988, 6:28 AM
#S3771; #O9329 * BARBARA.PF; LP602 * TUE, MAY 17, 1988, 6:28 AM
#S3771; #O9329 * BARBARA.PF; LP602 * TUE, MAY 17, 1988, 6:28 AM
```

```
#S3771, #O9329 * BARBARA.PF; LP602 * TUE, MAY 17, 1988, 6:28 AM
#S3771, #O9329 * BARBARA.PF; LP602 * TUE, MAY 17, 1988, 6:28 AM
#S3771, #O9329 * BARBARA.PF; LP602 * TUE, MAY 17, 1988, 6:28 AM
```

```
#S3771; #09330 * BARBARA.PF; LP602 * TUE, MAY 17, 1988, 6:28 AM
#S3771; #09330 * BARBARA.PF; LP602 * TUE, MAY 17, 1988, 6:28 AM
#S3771; #09330 * BARBARA.PF; LP602 * TUE, MAY 17, 1988, 6:28 AM
```

```
#S3771; #09330 * BARBARA.PF; LP602 * TUE, MAY 17, 1988, 6:28 AM
#S3771; #09330 * BARBARA.PF; LP602 * TUE, MAY 17, 1988, 6:28 AM
#S3771; #09330 * BARBARA.PF; LP602 * TUE, MAY 17, 1988, 6:28 AM
```

```
#S3771; #09330 * BARBARA.PF; LP602 * TUE, MAY 17, 1988, 6:28 AM
#S3771; #09330 * BARBARA.PF; LP602 * TUE, MAY 17, 1988, 6:28 AM
#S3771; #09330 * BARBARA.PF; LP602 * TUE, MAY 17, 1988, 6:28 AM
```

```
#S3771; #09330 * BARBARA.PF; LP602 * TUE, MAY 17, 1988, 6:28 AM
#S3771; #09330 * BARBARA.PF; LP602 * TUE, MAY 17, 1988, 6:28 AM
#S3771; #09330 * BARBARA.PF; LP602 * TUE, MAY 17, 1988, 6:28 AM
```

```
%token  <ival>  AND_                       201
%token  <ival>  OR_                        202
%token  <ival>  NOT_                       203
%token  <ival>  CBT_                       204
%token  <ival>  ABORTRETRYIGNORE_          205
%token  <ival>  ALT_                       206
%token  <ival>  AT_                        207
%token  <ival>  BEEP_                      208
%token  <ival>  CLASSFOCUS_                209
%token  <ival>  CLEARWINDOW_               210
%token  <ival>  CLOSEWINDOW_               211
%token  <ival>  COM1_                      212
%token  <ival>  COMMAND_                   213
%token  <ival>  CTRL_                      214
%token  <ival>  DEFAULT_                   215
%token  <ival>  DEFINEWINDOW_              216
%token  <ival>  DO_                        217
%token  <ival>  EDITBOX_                   218
%token  <ival>  ELSE_                      219
%token  <ival>  END_                       220
%token  <ival>  ENDIF_                     221
%token  <ival>  ENDPROC_                   222
%token  <ival>  ENDTASK_                   223
%token  <ival>  ENDWHILE_                  224
%token  <ival>  ERROR_                     225
%token  <ival>  ESCAPE_                    226
%token  <ival>  EXCLAMATION_POINT_         227
%token  <ival>  EXECUTE_                   228
%token  <ival>  FOCUS_                     229
%token  <ival>  GOTO_                      230
%token  <ival>  HAND_                      231
%token  <ival>  IF_                        232
%token  <ival>  IGNORE_                    233
%token  <ival>  INPUT_                     234
%token  <ival>  LABEL_                     235
%token  <ival>  LENGTH_                    236
%token  <ival>  LOCATE_                    237
%token  <ival>  MESSAGE_                   238
%token  <ival>  OFF_                       239
%token  <ival>  OK_                        240
%token  <ival>  OKCANCEL_                  241
%token  <ival>  ON_                        242
%token  <ival>  OPENWINDOW_                243
%token  <ival>  OUTPUT_                    244
%token  <ival>  PAUSE_                     245
%token  <ival>  PCODE_                     246
%token  <ival>  PCOMMAND_                  247
%token  <ival>  POPUP_                     248
%token  <ival>  PROCEDURE_                 249
%token  <ival>  PUSHBUTTON_                250
%token  <ival>  QUESTION_                  251
%token  <ival>  RATE_                      252
%token  <ival>  RETRYCANCEL_               253
%token  <ival>  RETURN_                    254
%token  <ival>  SCREEN_                    255
%token  <ival>  SET_                       256
%token  <ival>  TASK_                      257
%token  <ival>  TITLEWINDOW_               258
%token  <ival>  TIMEOUT_                   259
%token  <ival>  TO_                        260
```

```
%token  <ival>  USER_                      261
%token  <ival>  WAIT_                      262
%token  <ival>  WHILE_                     263
%token  <ival>  YESNO_                     264
%token  <ival>  YESNOCANCEL_               265
%token <lval>       USER_VAR           500
%token <lval>       USER_ARRAY         510
%token <lval>       USER_LABEL         520
%token <lval>       DATA_LABEL         525
%token <lval>       USER_WINDOW        530
%token <lval>       CLASS_SYMBOL       540
%token <lval>       SYS_VAR            560
%token <lval>       INT_L              400
%token <lval>       PNT_L              405
%token <lval>       REAL_L             410
%token <lval>       RGN_L              415
%token <lval>       STR_L              420
%token <lval>       STACK_L            430
%token <lval>       ANY_EXP            440
%token <lval>       NUM_EXP            441
%token <lval>       STR_EXP            442
%token <lval>       RGN_EXP            443
%token <lval>       PNT_EXP            444
%token <lval>       LOG_EXP            445
%token <lval>       NO_EXP             450
%token <lval>       USER_SYMBOL        600
%token <lval>       LINE_END           700

%type <ival>    clear_parms  wnd_style  on_off
%type <ival>    loc_parms  wndclose_parms  wndopen_parms
%type <ival>    intr_parm  intr_fct  intr_var
%type <ival>    intr_var_parm  escape_parm  esc_parm1
%type <ival>    defwnd_str loc_parm2  pnt_parm
%type <lval>    prompt_parms len_parms  icon_parms  style_parms

%union  {
     int  ival;
     long lval;
     }

%%

program:

        task_sect  empty_lines  proc_sect  empty_lines
     ;

task_sect:

        task_line  body
     ;

task_line:

     TASK_  LINE_END
     ;
```

```
body:
        endtask_line
    |   lines endtask_line
    ;

endtask_line:
    ENDTASK   LINE_END
        { OutputPCode( AG_END_PCODE, 0 ); }
    ;

proc_sect:
        /* empty */
    |   proc_sect  proc
    ;

proc:
        proc_line  proc_body
    ;

proc_body:
        endproc_line
    |   lines endproc_line
    ;

proc_line:
    proc_stmt  LINE_END
    ;

empty_lines:
    /* empty */
    |
    empty_lines  LINE_END

proc_stmt:
    PROCEDURE
        { LabelFlag = TRUE; }
    USER_SYMBOL
        { SetupLabel( $3 ); }
    ;

endproc_line:
    endproc_stmt  LINE_END
    ;

endproc_stmt:
    ENDPROC
        { OutputPCode( AG_RETURN_PCODE, 0 ); }
    ;

lines:
        line
    |   lines line
    ;

line:
        stmt  LINE_END
            { CDcmdflag = TRUE;
              gCurrErrnum = 0;  }
    |   LINE_END
            { CDcmdflag = TRUE;
              gCurrErrnum = 0;  }
    ;

stmt:
        assign_stmt
    |   beep_stmt
    |   clear_stmt
    |   comi_stmt
    |   defwnd_stmt
    |   do_stmt
    |   editbox_stmt
    |   end_stmt
    |   exec_stmt
    |   focus_stmt
    |   goto_stmt
    |   if_stmt
    |   ignore_stmt
    |   input_stmt
```

```
    |   label_stmt
    |   loc_stmt
    |   msg_stmt
    |   on_do_stmt
    |   output_stmt
    |   pause_stmt
    |   pcode_stmt
    |   pcommand_stmt
    |   pushbutton_stmt
    |   return_stmt
    |   screen_stmt
    |   set_stmt
    |   wait_stmt
    |   while_stmt
    |   wndclose_stmt
    |   wndopen_stmt
    |   wndtitle_stmt
    ;

assign_stmt:
    USER_VAR  '='
        { MakeExpression( ANY_EXP ); }
    ANY_EXP
        { AssignStmt( $1, $4 ); }
    ;

beep_stmt:
    BEEP
        { MakeExpression( NUM_EXP ); }
    NUM_EXP
        { MakeExpression( NUM_EXP ); }
    NUM_EXP
        { OutputPCode2( AG_BEEP_PCODE, $3, $5 ); }
    ;

clear_stmt:
    CLEARWINDOW
        { LabelFlag = TRUE; }
    clear_parms
        { OutputPCode( AG_WINDOWCLEAR_PCODE, $3 ); }
    ;

clear_parms:
    /* empty */
        { $$ = 0; }
    |
    USER_SYMBOL
    ;

com1_stmt:
    COM1
        { MakeExpression( STR_EXP ); }
    STR_EXP
        { OutputPCode( AG_COM1_PCODE, 0, $3 ); }
    ;

defwnd_stmt:
    DEFINEWINDOW
        { LabelFlag = TRUE; }
    USER_SYMBOL
        { LabelFlag = FALSE;
          MakeExpression( RGN_EXP ); }
    RGN_EXP  wnd_style
        { MakeExpression( STR_EXP ); }
    defwnd_str
        { DefineWindow( $3, $6, $5, $8 ); }
    ;

wnd_style:
    CBT
        { $$ = AG_CBT_WND; }
    |
    POPUP
        { $$ = AG_POP_WND; }
    ;

defwnd_str:
    NO_EXP
        { $$ = 0L; }
    |
    STR_EXP
        { $$ = ((HIWORD($1) != STR_L) || (LOWORD($1))) ?
                $1 :
                MAKELONG(-1, 0); }
    ;

do_stmt:
```

```
    DO_
        { LabelFlag = TRUE; }
    USER_SYMBOL
        { GoToLabel( AG_DO_PCODE, $3, USER_LABEL ); }
    ;

editbox_stmt:

    EDITBOX_
        { LabelFlag = TRUE; }
    USER_SYMBOL  USER_VAR
        { LabelFlag = FALSE;
          MakeExpression( NUM_EXP ); }
    NUM_EXP   AT_
        { MakeExpression( PNT_EXP ); }
    PNT_EXP
        { UserControl( AG_EDITBOX_PCODE, $3, $4, $8, $9, FALSE ); }
    ;

pushbutton_stmt:

    PUSHBUTTON_
        { LabelFlag = TRUE; }
    USER_SYMBOL  USER_VAR
        { LabelFlag = FALSE;
          MakeExpression( STR_EXP ); }
    STR_EXP   AT_
        { MakeExpression( PNT_EXP ); }
    PNT_EXP   def_parm
        { UserControl( AG_PUSHBUTTON_PCODE, $3, $4, $8, $9, defvar ); }
    ;

def_parm:

    /* empty */
        { defvar = 0; }
    |
    DEFAULT_
        { defvar = AG_DEFBUTTON; }
    |
    ESCAPE_
        { defvar = AG_ESCBUTTON; }
    ;

end_stmt:

    END_
        { OutputPCode( AG_END_PCODE, 0 ); }
    ;

exec_stmt:

    EXECUTE_
        { OutputPCode( AG_EXECUTE_PCODE, 0 ); }
    ;
```

```
focus_stmt:

    focus_verb   focus_parms
    ;

focus_verb:

    FOCUS_
    |
    CLASSFOCUS_
    ;

focus_parms:

    ON_   CLASS_SYMBOL
        { MakeExpression( STR_EXP ); }
    STR_EXP
        { ObjectFocus( $2, $4 ); }
    |
    CLASS_SYMBOL
        { MakeExpression( STR_EXP ); }
    STR_EXP
        { ObjectFocus( $1, $3 ); }
    |
    OFF_
        { ObjectFocus( NO_FOCUS, 0L ); }
    ;

goto_stmt:
    GOTO_
        { LabelFlag = TRUE; }
    USER_SYMBOL
        { GoToLabel( AG_JUMP_PCODE, $3, USER_LABEL ); }
    ;

if_stmt:

    IF_
        { MakeExpression( LOG_EXP ); }
    LOG_EXP
        { JumpConditional( IF_SYMBOL ); }
    lines  else_stmt
    ;

else_stmt:

    ELSE_
        { FixupJump( ELSE_SYMBOL ); }
    lines  ENDIF_
        { FixupJump( ENDIF_SYMBOL ); }
    |
    ENDIF_
        { FixupJump( ENDIF_SYMBOL ); }
    ;
```

```
while_stmt:

    WHILE_
        { JumpConditional( WHILE_SYMBOL );
          MakeExpression( LOG_EXP ); }
    LOG_EXP
        { JumpConditional( INWHILE_SYMBOL ); }
    lines  ENDWHILE
        { FixupJump( ENDWHILE_SYMBOL ); }
    ;


ignore_stmt:

    IGNORE
        { OutputPCode( AG_IGNORE_PCODE, 0 ); }
    ;


input_stmt:

    INPUT_  USER_VAR
        { MakeExpression( STR_EXP ); }
    prompt_parms  len_parms
        { UserInput( AG_INPUT_PCODE, $4, $5, $2 ); }
    ;

prompt_parms:

    NO_EXP
        { $$ = 0L; }
    |
    STR_EXP
        { $$ = $1; }
    ;

len_parms:

    /* empty */
        { $$ = 0L; }
    |
    LENGTH
        { MakeExpression( NUM_EXP ); }
    NUM_EXP
        { $$ = $3; }
    ;


label_stmt:
    LABEL
        { LabelFlag = TRUE; }
    USER_SYMBOL
        { SetupLabel( $3 ); }
    ;


loc_stmt:

    LOCATE
        { LabelFlag = TRUE;
          MakeExpression( NUM_EXP ); }
    loc_parms
    ;

loc_parms:

    NO_EXP
        { OutputPCode( AG_LOCATE_PCODE, 0, 0L ); }
    |
    pnt_parm
        { OutputPCode( AG_LOCATE_PCODE, 0, $1 ); }
    |
    NO_EXP USER_SYMBOL
        { MakeExpression( NUM_EXP ); }
    loc_parm2
        { OutputPCode( AG_LOCATE_PCODE, $2, $4 ); }
    ;

loc_parm2:

    NO_EXP
        { $$ = 0L; }
    |
    pnt_parm
    ;

pnt_parm:

    NUM_EXP
        { MakeExpression( NUM_EXP ); }
    NUM_EXP
        { $$ = MakePoint( $1, $3 ); }
    ;


msg_stmt:

    MESSAGE_  msg_parms
    ;

msg_parms:

    USER_VAR
        { MakeExpression( STR_EXP );
          ButtonText[i] = 0L;
          i = 0; }
    prompt_parms  icon_parms  style_parms
        { UserInput(    AG_MESSAGE_PCODE, $3,
                        MAKELONG($7, $5),
                        $1, ButtonText ); }


icon_parms:

    /* empty */
        { $$ = 0; }
    |
    HAND_
```

```
        { $$ = MB_ICONHAND; }
    |
    EXCLAMATION_POINT
        { $$ = MB_ICONEXCLAMATION; }
    |
    QUESTION_
        { $$ = MB_ICONQUESTION; }
    ;

style_parms:

    OK_
        { $$ = MB_OK; }
    |
    OKCANCEL_
        { $$ = MB_OKCANCEL; }
    |
    RETRYCANCEL_
        { $$ = MB_RETRYCANCEL; }
    |
    ABORTRETRYIGNORE_
        { $$ = MB_ABORTRETRYIGNORE; }
    |
    YESNO_
        { $$ = MB_YESNO; }
    |
    YESNOCANCEL_
        { $$ = MB_YESNOCANCEL; }
    |
    USER_
        { $$ = AG_USERBUTTON;
          MakeExpression( STR_EXP ); }
    button_text  NO_EXP
        { ButtonText[i] = 0L; }
    ;

button_text:

    STR_EXP
        { if ( i < MAX_USERBUTTONS )
                ButtonText[i++] = $1;
          MakeExpression( STR_EXP ); }
    |
    button_text  STR_EXP
        { if ( i < MAX_USERBUTTONS )
                ButtonText[i++] = $2;
          MakeExpression( STR_EXP ); }
    ;

on_do_stmt:

    ON_  intr_parm  DO_
        { LabelFlag = TRUE; }
    USER_SYMBOL
        { OnDoPCode( $2, $5 ); }
    ;

intr_parm:

    intr_fct
    |
    ESCAPE_
        { $$ = AG_SYSESCAPE_ID; }
    |
    TIMEOUT_
        { $$ = AG_SYSTIMEOUT_ID; }
    ;

intr_var:

    RATE_
        { $$ = defvar = AG_SYSRATE_ID; }
    |
    TIMEOUT_
        { $$ = defvar = AG_SYSTIMEOUT_ID; }
    ;

intr_fct:

    COMMAND_
        { $$ = AG_SYSCOMMAND_ID; }
    |
    ERROR_
        { $$ = AG_SYSERROR_ID; }
    ;

pcode_stmt:

    PCODE_  STR_L
        { SetPCode( $2 ); }
    ;

pcommand_stmt:

    PCOMMAND_  INT_L
        { SetPCommand( $2 ); }
    ;

pause_stmt:

    PAUSE_
        { MakeExpression( NUM_EXP ); }
    NUM_EXP
        { OutputPCode( AG_PAUSE_PCODE, 0, $3 ); }
    ;

return_stmt:

    RETURN_
        { OutputPCode( AG_RETURN_PCODE, 0 ); }
    ;

screen_stmt:
```

```
    SCREEN_
        { MakeExpression( NUM_EXP ); }
    NUM_EXP
        { MakeExpression( NUM_EXP ); }
    NUM_EXP
        { OutputPCode2( AG_SCREEN_PCODE, $3, $5 ); }
    ;

set_stmt:

    SET_  intr_fct  on_off
        { OutputPCode( AG_SET_INTERRUPT_PCODE, $2, MAKELONG($3, 0) ); }
    |
    SET_  intr_var
        { MakeExpression( NUM_EXP ); }
    intr_var_parm
        { OutputPCode( AG_SET_INTERRUPT_PCODE, $2, MAKELONG($4, 0) ); }
    |
    SET_  ESCAPE_
        { flag = 0;
          MakeExpression( STR_EXP ); }
    escape_parm
        { OutputPCode(  AG_SET_INTERRUPT_PCODE, AG_SYSESCAPE_ID,
                        MAKELONG($4, 0) ); }
    ;

intr_var_parm:

    NUM_EXP
        { SetSysVarPcode( defvar, 0, $1 );
          $$ = TRUE; }
    |
    NO_EXP  OFF_
        { $$ = FALSE; }
    |
    NO_EXP  TO_
        { MakeExpression( NUM_EXP ); }
    NUM_EXP
        { SetSysVarPcode( defvar, 0, $4 );
          $$ = TRUE; }
    ;

escape_parm:

    STR_EXP
        { SetSysVarPcode( AG_SYSESCAPE_ID, 0, $1 );
          $$ = TRUE; }
    |
    NO_EXP  esc_parm1
        { $$ = $2; }
    ;

esc_parm1:

    OFF_
        { $$ = FALSE; }
    |
    esc_parm2
        { $$ = TRUE; }
    ;

esc_parm2:

    TO_
        { MakeExpression( STR_EXP ); }
    to_parm
    |
    ALT_
        { MakeExpression( STR_EXP );
          flag = flag | AG_ALTKEY; }
    alt_parm
    |
    CTRL_
        { MakeExpression( STR_EXP );
          flag = flag | AG_CTRLKEY; }
    ctrl_parm
    ;

to_parm:

    STR_EXP
        { SetSysVarPcode( AG_SYSESCAPE_ID, flag, $1 ); }
    |
    NO_EXP  alt_ctrl
    ;

alt_parm:

    STR_EXP
        { SetSysVarPcode( AG_SYSESCAPE_ID, flag, $1 ); }
    |
    NO_EXP  CTRL_
        { MakeExpression( STR_EXP );
          flag = flag | AG_CTRLKEY; }
    STR_EXP
        { SetSysVarPcode( AG_SYSESCAPE_ID, flag, $4 ); }
    ;

ctrl_parm:

    STR_EXP
        { SetSysVarPcode( AG_SYSESCAPE_ID, flag, $1 ); }
    |
    NO_EXP  ALT_
        { MakeExpression( STR_EXP );
          flag = flag | AG_ALTKEY; }
    STR_EXP
        { SetSysVarPcode( AG_SYSESCAPE_ID, flag, $4 ); }
    ;

alt_ctrl:

    ALT_
        { MakeExpression( STR_EXP );
          flag = flag | AG_ALTKEY; }
    alt_parm
    |
    CTRL_
```

```
        { MakeExpression( STR_EXP );
          flag = flag | AG_CTRLKEY; }
    ctrl_parm
    ;

on_off:

    ON_
       { $$ = TRUE; }
    |
    OFF_
       { $$ = FALSE; }
    ;

wait_stmt:

    WAIT
       { OutputPCode( AG_WAIT_PCODE, 0 ); }
    ;

wndclose_stmt:

    CLOSEWINDOW
         { LabelFlag = TRUE; }
    wndclose_parms
         { OutputPCode( AG_WINDOWCLOSE_PCODE, $3 ); }
    ;

wndclose_parms:

    /* empty */
         { $$ = 0; }
    |
    USER_SYMBOL
    ;

wndopen_stmt:

    OPENWINDOW
         { LabelFlag = TRUE; }
    wndopen_parms
         { OutputPCode( AG_WINDOWOPEN_PCODE, $3 ); }
    ;

wndopen_parms:

    /* empty */
         { $$ = 0; }
    |
    USER_SYMBOL
    ;

wndtitle_stmt:

    TITLEWINDOW
         { LabelFlag = TRUE;
           MakeExpression( STR_EXP ); }
    wndtitle_expr
    ;

wndtitle_expr:

    STR_EXP
         { OutputPCode( AG_WINDOWTITLE_PCODE, 0, $1 ); }
    |
    NO_EXP  USER_SYMBOL
         { MakeExpression( STR_EXP ); }
    STR_EXP
         { OutputPCode( AG_WINDOWTITLE_PCODE, $2, $4 ); }
    ;

output_stmt:

    OUTPUT
         { MakeExpression( STR_EXP ); }
    output_parms
    ;

output_parms:

    NO_EXP
         { LabelFlag = TRUE; }
    USER_SYMBOL
         { OutputPCode( AG_LOCATE_PCODE, $3, 0L );
           LabelFlag = FALSE;
           MakeExpression( STR_EXP ); }
    output_string
    |
    output_string
    ;

output_string:

    out_expr
    |
    outln_expr
    ;

out_expr:

    NO_EXP  ...
         { ... }
    |
    out_str  NO_EXP
    ;

out_str:

    STR_EXP
         { OutputPCode( AG_OUTPUT_PCODE, FALSE, $1 ); }
    ...
         { MakeExpression( STR_EXP ); }
```

```
    |
    out_str  out_str
    ;

outln_expr:

    NO_EXP
        { OutputPCode( AG_OUTPUT_PCODE, TRUE, 0L ); }
    |
    outln_str
        { OutputPCode( AG_OUTPUT_PCODE, TRUE, 0L ); }
    ;

outln_str:

    STR_EXP
        { OutputPCode( AG_OUTPUT_PCODE, FALSE, $1 ); }
    |
    out_str  outln_str
    ;


%%
#define NOCOMM
#include "windows.h"
#include "nwomf.h"
#include "stdio.h"

#ifndef HAVE_APICMDSTRUCT
typedef struct
  {
    WORD len;
    WORD cmd;
    char parms[128];
  }
APICMDSTRUCT;
#define HAVE_APICMDSTRUCT
#endif

#include "nwapi.h"
#include "hoag.h"
#include "hoagpext.h"

#define yyunion(i,j)    memcpy( i, j, sizeof(YYSTYPE) )
#define MAX_USERBUTTONS 3

static int i;
static long ButtonText[MAX_USERBUTTONS+1];
static int  defver;
static int  flag;
```

```
#S3771; #O9330 * BARBARA.PF; LP602 * TUE, MAY 17, 1988, 6:29 AM
#S3771; #O9330 * BARBARA.PF; LP602 * TUE, MAY 17, 1988, 6:29 AM
#S3771; #O9330 * BARBARA.PF; LP602 * TUE, MAY 17, 1988, 6:29 AM

#S3771; #O9330 * BARBARA.PF; LP602 * TUE, MAY 17, 1988, 6:29 AM
#S3771; #O9330 * BARBARA.PF; LP602 * TUE, MAY 17, 1988, 6:29 AM
#S3771; #O9330 * BARBARA.PF; LP602 * TUE, MAY 17, 1988, 6:29 AM

#S3771; #O9330 * BARBARA.PF; LP602 * TUE, MAY 17, 1988, 6:29 AM
#S3771; #O9330 * BARBARA.PF; LP602 * TUE, MAY 17, 1988, 6:29 AM
#S3771; #O9330 * BARBARA.PF; LP602 * TUE, MAY 17, 1988, 6:29 AM

#S3771, #O9330 * BARBARA.PF; LP602 * TUE, MAY 17, 1988, 6:29 AM
#S3771, #O9330 * BARBARA.PF; LP602 * TUE, MAY 17, 1988, 6:29 AM
#S3771, #O9330 * BARBARA.PF; LP602 * TUE, MAY 17, 1988, 6:29 AM
```

```
#S3771; #O9331 * BARBARA.PF; LP602 * TUE, MAY 17, 1988, 6:29 AM
#S3771; #O9331 * BARBARA.PF; LP602 * TUE, MAY 17, 1988, 6:29 AM
#S3771; #O9331 * BARBARA.PF; LP602 * TUE, MAY 17, 1988, 6:29 AM
```

```
#S3771; #O9331 * BARBARA.PF; LP602 * TUE, MAY 17, 1988, 6:29 AM
#S3771; #O9331 * BARBARA.PF; LP602 * TUE, MAY 17, 1988, 6:29 AM
#S3771; #O9331 * BARBARA.PF; LP602 * TUE, MAY 17, 1988, 6:29 AM
```

```
#S3771; #O9331 * BARBARA.PF; LP602 * TUE, MAY 17, 1988, 6:29 AM
#S3771; #O9331 * BARBARA.PF; LP602 * TUE, MAY 17, 1988, 6:29 AM
#S3771; #O9331 * BARBARA.PF; LP602 * TUE, MAY 17, 1988, 6:29 AM
```

```
#S3771; #O9331 * BARBARA.PF; LP602 * TUE, MAY 17, 1988, 6:29 AM
#S3771; #O9331 * BARBARA.PF; LP602 * TUE, MAY 17, 1988, 6:29 AM
#S3771; #O9331 * BARBARA.PF; LP602 * TUE, MAY 17, 1988, 6:29 AM
```

```
%token <ival>        AND_          201
%token <ival>        OR_           202
%token <ival>        NOT_          203
%token <lval>        USER_VAR      500
%token <lval>        USER_ARRAY    510
%token <lval>        FUNCTION      550
%token <lval>        SYS_VAR       560
%token <lval>        INT_L         400
%token <lval>        PNT_L         405
%token <lval>        REAL_L        410
%token <lval>        RGN_L         415
%token <lval>        STR_L         420
%token <lval>        STACK_L       430
%token <lval>        ANY_EXP       440
%token <lval>        NUM_EXP       441
%token <lval>        STR_EXP       442
%token <lval>        RGN_EXP       443
%token <lval>        PNT_EXP       444
%token <lval>        LOG_EXP       445
%token <lval>        NO_EXP        450
%token <ival>        LE_SYM        451
%token <ival>        GE_SYM        452
%token <lval>        NE_SYM        453
%token <lval>        LINE_END      700

%type <lval>      pnt_expr  rgn_expr  any_exp  expr  log_expr  parms  fnct
%type <lval>      num_term  rgn_term  pnt_term  str_term  term  log_term
%type <ival>      '<' '>' '=' LE_SYM GE_SYM NE_SYM  rel_op
%union  {
     int  ival;
     long lval;
         }

%left  OR
%left  AND_
%left  NOT_
%left  '<' '>' '=' LE_SYM GE_SYM NE_SYM
%left  '+' '-'
%left  '*' '/'
%left  UMINUS

%%

expression:

     number_expr

     |

     string_expr

     |

     point_expr

     |

     region_expr

     |

     any_expr

     |

     logical_expr
     ;

number_expr:

     NUM_EXP
          { SaveExprValue( NO_EXP, MAKELONG( 0, NO_EXP ) ); }
     |
     NUM_EXP  expr
          { SaveExprValue( NUM_EXP, $2 ); }
     ;

string_expr:

     STR_EXP
          { SaveExprValue( NO_EXP, MAKELONG( 0, NO_EXP ) ); }
     |
     STR_EXP  expr
          { SaveExprValue( STR_EXP, $2 ); }
     ;

point_expr:

     PNT_EXP
          { SaveExprValue( NO_EXP, MAKELONG( 0, NO_EXP ) ); }
     |
     PNT_EXP  pnt_expr
          { SaveExprValue( PNT_EXP, $2 ); }
     ;

region_expr:

     RGN_EXP
          { SaveExprValue( NO_EXP, MAKELONG( 0, NO_EXP ) ); }
     |
     RGN_EXP  rgn_expr
          { SaveExprValue( RGN_EXP, $2 ); }
     ;

any_expr:

     ANY_EXP
          { SaveExprValue( NO_EXP, MAKELONG( 0, NO_EXP ) ); }
     |
     ANY_EXP  any_exp
          { SaveExprValue( ANY_EXP, $2 ); }
     ;

any_exp:

     expr  |  rgn_term  |  pnt_term
     ;
```

```
expr:

    '(' expr ')'
        { $$ = $2; }
    |
    expr '+' expr
        { OpPCode( AG_ADD_PCODE, $1, $3 );
          $$ = MAKELONG( NUM_EXP, STACK_L ); }
    |
    expr '-' expr
        { OpPCode( AG_SUB_PCODE, $1, $3 );
          $$ = MAKELONG( NUM_EXP, STACK_L );
          numflag = TRUE; }
    |
    expr '*' expr
        { OpPCode( AG_MUL_PCODE, $1, $3 );
          $$ = MAKELONG( NUM_EXP, STACK_L );
          numflag = TRUE; }
    |
    expr '/' expr
        { OpPCode( AG_DIV_PCODE, $1, $3 );
          $$ = MAKELONG( NUM_EXP, STACK_L );
          numflag = TRUE; }
    |
    '-'  expr   %prec  UMINUS
        { $$ = MakeMinus( $2 );
          numflag = TRUE; }
    |
    term
    |
    USER_VAR
    |
    fnct
    ;

term:

    num_term
        { numflag = TRUE; }
    |
    str_term
        { strflag = TRUE; }
    ;

str_term:

    STR_L
    ;

num_term:

    INT_L | REAL_L | SYS_VAR
    ;


pnt_expr:

    pnt_term
    |
    USER_VAR
    ;


rgn_expr:

    rgn_term
    |
    USER_VAR
    ;

rgn_term:
    '(' pnt_term  ','  expr  ','  expr ')'
        { numflag = TRUE;
          $$ = MakeRegion( $2, $4, $6 ); }
    |
    '(' USER_VAR   ','  expr  ','  expr ')'
        { numflag = TRUE;
          $$ = MakeRegion( $2, $4, $6 ); }
    ;

pnt_term:
    '(' expr ',' expr ')'
        { numflag = TRUE;
          $$ = MakePoint( $2, $4 ); }
    |
    '(' USER_VAR ',' expr ')'
        { numflag = TRUE;
          $$ = MakePoint( $2, $4 ); }
    ;

logical_expr:

    LOG_EXP
        { numflag = TRUE; }
    log_expr
        { SaveExprValue( LOG_EXP, $3 ); }
    ;

log_expr:

    '(' log_expr ')'
        { $$ = $2; }
    |
    log_expr  AND_  log_expr
        { OutputPCode( AG_AND_PCODE, 0, 0L );
          $$ = MAKELONG( LOG_EXP, STACK_L ); }
    |
    log_expr  OR_  log_expr
        { OutputPCode( AG_OR_PCODE, 0, 0L );
          $$ = MAKELONG( LOG_EXP, STACK_L ); }
    |
    NOT_  log_expr
        { OutputPCode( AG_NOT_PCODE, 0, 0L );
          $$ = MAKELONG( LOG_EXP, STACK_L ); }
    |
    log_term
    ;
```

```
log_term:

    expr  rel_op  expr
        {  RelOpCode( $2, $1, $3 );
           $$ = MAKELONG( LOG_EXP, STACK_L ); }
    ;

rel_op:

    '<'
        { $$ = LT_SYMBOL; }
    |
    '>'
        { $$ = GT_SYMBOL; }
    |
    '='
        { $$ = EQ_SYMBOL;}
    |
    LE_SYM
        { $$ = LE_SYMBOL; }
    |
    GE_SYM
        { $$ = GE_SYMBOL; }
    |
    NE_SYM
        { $$ = NE_SYMBOL; }
    ;


fnct:

    FUNCTION  '('
        { AddFunction( $1 ); }
    parmlist  ')'
        { $$ = MAKELONG( OutputFunction( ), STACK_L ); }
    ;


parmlist:

    /* empty */
    |
    parms
    ;


parms:

    any_exp
        { SaveParm( $1 ); }
    |
    parms  ','  any_exp
        { SaveParm( $3 ); }
    ;


%%
#define NOCOMM
#include "windows.h"
#include "nwomf.h"
#include "doscall.h"
#include "ctrace.h"

#ifndef HAVE_APICMDSTRUCT
typedef struct
  {
    WORD len;
    WORD cmd;
    char parms[128];
  }
APICMDSTRUCT;
#define HAVE_APICMDSTRUCT
#endif

#include "nwapi.h"
#include "hoag.h"
#include "hoagpext.h"

#define yyunion(i,j)    memcpy( i, j, sizeof(YYSTYPE) )
```

```
#S3771; #O9331  *  BARBARA.PF; LP602  *  TUE, MAY 17, 1988,  6:29 AM
#S3771; #O9331  *  BARBARA.PF; LP602  *  TUE, MAY 17, 1988,  6:29 AM
#S3771; #O9331  *  BARBARA.PF; LP602  *  TUE, MAY 17, 1988,  6:29 AM

#S3771; #O9331  *  BARBARA.PF; LP602  *  TUE, MAY 17, 1988,  6:29 AM
#S3771; #O9331  *  BARBARA.PF; LP602  *  TUE, MAY 17, 1988,  6:29 AM
#S3771; #O9331  *  BARBARA.PF; LP602  *  TUE, MAY 17, 1988,  6:29 AM

#S3771; #O9331  *  BARBARA.PF; LP602  *  TUE, MAY 17, 1988,  6:29 AM
#S3771; #O9331  *  BARBARA.PF; LP602  *  TUE, MAY 17, 1988,  6:29 AM
#S3771; #O9331  *  BARBARA.PF; LP602  *  TUE, MAY 17, 1988,  6:29 AM

#S3771; #O9331  *  BARBARA.PF; LP602  *  TUE, MAY 17, 1988,  6:29 AM
#S3771; #O9331  *  BARBARA.PF; LP602  *  TUE, MAY 17, 1988,  6:29 AM
#S3771; #O9331  *  BARBARA.PF; LP602  *  TUE, MAY 17, 1988,  6:29 AM
```

```
#S3771, #O9332 * BARBARA.PF; LP602 * TUE, MAY 17, 1988, 6:29 AM
#S3771; #O9332 * BARBARA.PF; LP602 * TUE, MAY 17, 1988, 6:29 AM
#S3771; #O9332 * BARBARA.PF; LP602 * TUE, MAY 17, 1988, 6:29 AM
```

```
#S3771; #O9332 * BARBARA.PF; LP602 * TUE, MAY 17, 1988, 6:29 AM
#S3771; #O9332 * BARBARA.PF; LP602 * TUE, MAY 17, 1988, 6:29 AM
#S3771; #O9332 * BARBARA.PF; LP602 * TUE, MAY 17, 1988, 6:29 AM
```

```
#S3771; #O9332 * BARBARA.PF; LP602 * TUE, MAY 17, 1988, 6:29 AM
#S3771; #O9332 * BARBARA.PF; LP602 * TUE, MAY 17, 1988, 6:29 AM
#S3771; #O9332 * BARBARA.PF; LP602 * TUE, MAY 17, 1988; 6:29 AM
```

```
#S3771; #O9332 * BARBARA.PF; LP602 * TUE, MAY 17, 1988, 6:29 AM
#S3771; #O9332 * BARBARA.PF; LP602 * TUE, MAY 17, 1988, 6:29 AM
#S3771; #O9332 * BARBARA.PF; LP602 * TUE, MAY 17, 1988, 6:29 AM
```

```
%token  <ival>  AND_                    201
%token  <ival>  OR_                     202
%token  <ival>  NOT_                    203
%token  <ival>  CBT_                    204
%token  <ival>  ABORTRETRYIGNORE_       205
%token  <ival>  ALT_                    206
%token  <ival>  AT_                     207
%token  <ival>  BEEP                    208
%token  <ival>  CLASSFOCUS_             209
%token  <ival>  CLEARWINDOW_            210
%token  <ival>  CLOSEWINDOW_            211
%token  <ival>  COM1                    212
%token  <ival>  COMMAND_                213
%token  <ival>  CTRL                    214
%token  <ival>  DEFAULT                 215
%token  <ival>  DEFINEWINDOW_           216
%token  <ival>  DO                      217
%token  <ival>  EDITBOX_                218
%token  <ival>  ELSE_                   219
%token  <ival>  END                     220
%token  <ival>  ENDIF                   221
%token  <ival>  ENDPROC_                222
%token  <ival>  ENDTASK_                223
%token  <ival>  ENDWHILE_               224
%token  <ival>  ERROR                   225
%token  <ival>  ESCAPE                  226
%token  <ival>  EXCLAMATION_POINT_      227
%token  <ival>  EXECUTE_                228
%token  <ival>  FOCUS_                  229
%token  <ival>  GOTO_                   230
%token  <ival>  HAND_                   231
%token  <ival>  IF                      232
%token  <ival>  IGNORE_                 233
%token  <ival>  INPUT_                  234
%token  <ival>  LABEL_                  235
%token  <ival>  LENGTH_                 236
%token  <ival>  LOCATE_                 237
%token  <ival>  MESSAGE_                238
%token  <ival>  OFF_                    239
%token  <ival>  OK                      240
%token  <ival>  OKCANCEL_               241
%token  <ival>  ON                      242
%token  <ival>  OPENWINDOW_             243
%token  <ival>  OUTPUT_                 244
%token  <ival>  PAUSE_                  245
%token  <ival>  PCODE_                  246
%token  <ival>  PCOMMAND_               247
%token  <ival>  POPUP                   248
%token  <ival>  PROCEDURE               249
%token  <ival>  PUSHBUTTON_             250
%token  <ival>  QUESTION_               251
%token  <ival>  RATE                    252
%token  <ival>  RETRYCANCEL_            253
%token  <ival>  RETURN                  254
%token  <ival>  SCREEN_                 255
%token  <ival>  SET                     256
%token  <ival>  TASK                    257
%token  <ival>  TITLEWINDOW_            258
%token  <ival>  TIMEOUT_                259
%token  <ival>  TO_                     260
%token  <ival>  USER_                   261
%token  <ival>  WAIT_                   262
%token  <ival>  WHILE_                  263
%token  <ival>  YESNO_                  264
%token  <ival>  YESNOCANCEL_            265
%token <ival>         USER_VAR          500
%token <ival>         USER_ARRAY        510
%token <ival>         USER_LABEL        520
%token <ival>         DATA_LABEL        525
%token <ival>         USER_WINDOW       530
%token <ival>         CLASS_SYMBOL      540
%token <ival>         SYS_VAR           560
%token <ival>         INT_L             400
%token <ival>         PNT_L             405
%token <ival>         REAL_L            410
%token <ival>         RGN_L             415
%token <ival>         STR_L             420
%token <ival>         STACK_L           430
%token <ival>         ANY_EXP           440
%token <ival>         NUM_EXP           441
%token <ival>         STR_EXP           442
%token <ival>         RGN_EXP           443
%token <ival>         PNT_EXP           444
%token <ival>         LOG_EXP           445
%token <ival>         NO_EXP            450
%token <ival>         USER_SYMBOL       600
%token <ival>         LINE_END          700

%type <ival>    clear_parms  wnd_style  on_off
%type <ival>    loc_parms  wndclose_parms  wndopen_parms
%type <ival>    intr_parm  intr_ict  intr_var
%type <ival>    intr_var_parm  escape_parm  esc_parm1
%type <ival>    defwnd_str loc_parm2  pnt_parm
%type <ival>    prompt_parms len_parms  icon_parms  style_parms

%union  {
    int  ival:
    long lval:
       }

%%

program:

        task_sect  empty_lines  proc_sect  empty_lines
    ;


task_sect:

        task_line  body
    ;


task_line:

    TASK_   LINE_END
    ;
```

```
body:
        endtask_line
    |   lines endtask_line
    ;

endtask_line:
    ENDTASK   LINE_END
        { OutputPCode( AG_END_PCODE, 0, 0L ); }
    ;

proc_sect:
        /* empty */
    |   proc_sect  proc
    ;

proc:
        proc_line  proc_body
    ;

proc_body:
        endproc_line
    |   lines endproc_line
    ;

proc_line:
    proc_stmt  LINE_END
    ;

empty_lines:
    /* empty */
    |
    empty_lines  LINE_END

proc_stmt:
    PROCEDURE
        { LabelFlag = TRUE; }
    USER_SYMBOL
        { SetupLabel( $3 ); }
    ;

endproc_line:
    endproc_stmt  LINE_END
    ;

endproc_stmt:
    ENDPROC
        { OutputPCode( AG_RETURN_PCODE, 0, 0L ); }
    ;

lines:
        line
    |   lines line
    ;

line:
        stmt  LINE_END
            { CDcmdflag = TRUE;
              gCurrErrNum = 0;  }
    |   LINE_END
            { CDcmdflag = TRUE;
              gCurrErrNum = 0;  }
    ;

stmt:
        assign_stmt
    |   beep_stmt
    |   clear_stmt
    |   coml_stmt
    |   defwnd_stmt
    |   do_stmt
    |   editbox_stmt
    |   end_stmt
    |   exec_stmt
    |   focus_stmt
    |   goto_stmt
    |   if_stmt
    |   ignore_stmt
    |   input_stmt
```

```
        |   label_stmt
        |   loc_stmt
        |   msg_stmt
        |   on_do_stmt
        |   output_stmt
        |   pause_stmt
        |   pcode_stmt
        |   pcommand_stmt
        |   pushbutton_stmt
        |   return_stmt
        |   screen_stmt
        |   set_stmt
        |   wait_stmt
        |   while_stmt
        |   wndclose_stmt
        |   wndopen_stmt
        |   wndtitle_stmt
        ;

assign_stmt:
        USER_VAR  '='
            { MakeExpression( ANY_EXP ); }
        ANY_EXP
            { AssignStmt( $1, $4 ); }
        ;

beep_stmt:
        BEEP
            { MakeExpression( NUM_EXP ); }
        NUM_EXP
            { MakeExpression( NUM_EXP ); }
        NUM_EXP
            { OutputPCode2( AG_BEEP_PCODE, $3, $5 ); }
        ;

clear_stmt:
        CLEARWINDOW
            { LabelFlag = TRUE; }
        clear_parms
            { OutputPCode( AG_WINDOWCLEAR_PCODE, $3, 0L ); }
        ;

clear_parms:
        /* empty */
            { $$ = 0; }
        |
        USER_SYMBOL
        ;

com1_stmt:
        COM1
            { MakeExpression( STR_EXP ); }
        STR_EXP
            { OutputPCode( AG_COM1_PCODE, 0, $3 ); }
        ;

defwnd_stmt:
        DEFINEWINDOW
            { LabelFlag = TRUE; }
        USER_SYMBOL
            { LabelFlag = FALSE;
            MakeExpression( RGN_EXP ); }
        RGN_EXP  wnd_style
            { MakeExpression( STR_EXP ); }
        defwnd_str
            { DefineWindow( $3, $6, $5, $8 ); }
        ;

wnd_style:
        CBT
            { $$ = AG_CBT_WND; }
        |
        POPUP
            { $$ = AG_POP_WND; }
        ;

defwnd_str:
        NO_EXP
            { $$ = 0L; }
        |
        STR_EXP
            { $$ = ((HIWORD($1) != STR_[illegible]) || LOWORD($1)) ?
                    $1 :
                    MAKELONG(-1, 0)); }
        ;

do_stmt:
```

```
    DO_
        { LabelFlag = TRUE; }
    USER_SYMBOL
        { GoToLabel( AG_DO_PCODE, $3, USER_LABEL ); }
    ;

editbox_stmt:

    EDITBOX_
        { LabelFlag = TRUE; }
    USER_SYMBOL  USER_VAR
        { LabelFlag = FALSE;
          MakeExpression( NUM_EXP ); }
    NUM_EXP   AT_
        { MakeExpression( PNT_EXP ); }
    PNT_EXP
        { UserControl( AG_EDITBOX_PCODE, $3, $4, $6, $9, FALSE ); }
    ;

pushbutton_stmt:

    PUSHBUTTON_
        { LabelFlag = TRUE; }
    USER_SYMBOL  USER_VAR
        { LabelFlag = FALSE;
          MakeExpression( STR_EXP ); }
    STR_EXP   AT_
        { MakeExpression( PNT_EXP ); }
    PNT_EXP   def_parm
        { UserControl( AG_PUSHBUTTON_PCODE, $3, $4, $6, $8, defvar ); }
    ;

def_parm:

    /* empty */
        { defvar = 0; }
    |
    DEFAULT_
        { defvar = AG_DEFBUTTON; }
    |
    ESCAPE_
        { defvar = AG_ESCBUTTON; }
    ;

end_stmt:

    END_
        { OutputPCode( AG_END_PCODE, 0, 0L ); }
    ;

exec_stmt:

    EXECUTE_
        { OutputPCode( AG_EXECUTE_PCODE, 0, 0L ); }
    ;
```

```
focus_stmt:

    focus_verb
        { gClassFlag = TRUE; }
    focus_parms
    ;

focus_verb:

    FOCUS_
    |
    CLASSFOCUS_
    ;

focus_parms:

    ON_   CLASS_SYMBOL
        { gClassFlag = FALSE;
          MakeExpression( STR_EXP ); }
    STR_EXP
        { ObjectFocus( $2, $4 ); }
    |
    CLASS_SYMBOL
        { gClassFlag = FALSE;
          MakeExpression( STR_EXP ); }
    STR_EXP
        { ObjectFocus( $1, $3 ); }
    |
    OFF_
        { ObjectFocus( NO_FOCUS, 0L ); }
    ;

goto_stmt:
    GOTO_
        { LabelFlag = TRUE; }
    USER_SYMBOL
        { GoToLabel( AG_JUMP_PCODE, $3, USER_LABEL ); }
    ;

if_stmt:

    IF_
        { MakeExpression( LOG_EXP ); }
    LOG_EXP
        { JumpConditional( IF_SYMBOL ); }
    lines  else_stmt
    ;

else_stmt:

    ELSE_
        { FixupJump( ELSE_SYMBOL ); }
    lines  ENDIF_
        { FixupJump( ENDIF_SYMBOL ); }
    |
```

```
    ENDIF_
        { FixupJump( ENDIF_SYMBOL ); }
    ;

while_stmt:

    WHILE_
        { JumpConditional( WHILE_SYMBOL );
          MakeExpression( LOG_EXP ); }
    LOG_EXP
        { JumpConditional( INWHILE_SYMBOL ); }
    lines  ENDWHILE_
        { FixupJump( ENDWHILE_SYMBOL ); }
    ;

ignore_stmt:

    IGNORE_
        { OutputPCode( AG_IGNORE_PCODE, 0, 0L ); }
    ;

input_stmt:

    INPUT_  USER_VAR
        { MakeExpression( STR_EXP ); }
    prompt_parms  len_parms
        { UserInput( AG_INPUT_PCODE, $4, $5, $2 ); }
    ;

prompt_parms:

    NO_EXP
        { $$ = 0L; }
    |
    STR_EXP
        { $$ = $1; }
    ;

len_parms:

    /* empty */
        { $$ = 0L; }
    |
    LENGTH_
        { MakeExpression( NUM_EXP ); }
    NUM_EXP
        { $$ = $3; }
    ;

label_stmt:
    LABEL_
        { LabelFlag = TRUE; }
    USER_SYMBOL
        { SetupLabel( $3 ); }
    ;

loc_stmt:

    LOCATE_
        { LabelFlag = TRUE;
          MakeExpression( NUM_EXP ); }
    loc_parms
    ;

loc_parms:

    NO_EXP
        { OutputPCode( AG_LOCATE_PCODE, 0, 0L ); }
    |
    pnt_parm
        { OutputPCode( AG_LOCATE_PCODE, 0, $1 ); }
    |
    NO_EXP USER_SYMBOL
        { MakeExpression( NUM_EXP ); }
    loc_parm2
        { OutputPCode( AG_LOCATE_PCODE, $2, $4 ); }
    ;

loc_parm2:

    NO_EXP
        { $$ = 0L; }
    |
    pnt_parm
    ;

pnt_parm:

    NUM_EXP
        { MakeExpression( NUM_EXP ); }
    NUM_EXP
        { $$ = MakePoint( $1, $3 ); }
    ;

msg_stmt:

    MESSAGE_  msg_parms
    ;

msg_parms:

    USER_VAR
        { MakeExpression( STR_EXP );
          ButtonText[1] = 0L;
          i = 1; }
    prompt_parms  icon_parms  style_parms
        { UserInput(  AG_MESSAGE_PCODE, $2,
                      MAKELONG($4, $5),
                      $1, ButtonText ); }
    ;

icon_parms:
```

```
    /* empty */
        { $$ = 0; }
    |
    HAND
        { $$ = MB_ICONHAND; }
    |
    EXCLAMATION_POINT
        { $$ = MB_ICONEXCLAMATION; }
    |
    QUESTION
        { $$ = MB_ICONQUESTION; }
    ;

style_parms:

    OK_
        { $$ = MB_OK; }
    |
    OKCANCEL_
        { $$ = MB_OKCANCEL; }
    |
    RETRYCANCEL_
        { $$ = MB_RETRYCANCEL; }
    |
    ABORTRETRYIGNORE_
        { $$ = MB_ABORTRETRYIGNORE; }
    |
    YESNO_
        { $$ = MB_YESNO; }
    |
    YESNOCANCEL_
        { $$ = MB_YESNOCANCEL; }
    |
    USER_
        { $$ = AG_USERBUTTON;
          MakeExpression( STR_EXP ); }
    button_text NO_EXP
        { ButtonText[i] = 0L; }
    ;

button_text:

    STR_EXP
        { if ( i < MAX_USERBUTTONS )
                  ButtonText[i++] = $1;
          MakeExpression( STR_EXP ); }
    |
    button_text STR_EXP
        { if ( i < MAX_USERBUTTONS )
                  ButtonText[i++] = $2;
          MakeExpression( STR_EXP ); }
    ;

on_do_stmt:

    ON_ intr_parm DO
        { LabelFlag = TRUE; }
    USER_SYMBOL
        { OnDoPCode( $2, $5 ); }
    ;

intr_parm:

    intr_fct
    |
    ESCAPE
        { $$ = AG_SYSESCAPE_ID; }
    |
    TIMEOUT
        { $$ = AG_SYSTIMEOUT_ID; }
    ;

intr_var:

    RATE
        { $$ = defvar = AG_SYSRATE_ID; }
    |
    TIMEOUT
        { $$ = defvar = AG_SYSTIMEOUT_ID; }
    ;

intr_fct:

    COMMAND
        { $$ = AG_SYSCOMMAND_ID; }
    |
    ERROR
        { $$ = AG_SYSERROR_ID; }
    ;

pcode_stmt:

    PCODE_ STR_L
        { SetPCode( $2 ); }
    ;

pcommand_stmt:

    PCOMMAND_ INT_L
        { SetPCommand( $2 ); }
    ;

pause_stmt:

    PAUSE_
        { MakeExpression( NUM_EXP ); }
    NUM_EXP
        { OutputPCode( AG_PAUSE_PCODE, 0, $3 ); }
    ;

return_stmt:

    RETURN
        { OutputPCode( AG_RETURN_PCODE, 0, 0L ); }
    ;
```

```
screen_stmt:

    SCREEN_
        { MakeExpression( NUM_EXP ); }
    NUM_EXP
        { MakeExpression( NUM_EXP ); }
    NUM_EXP
        { OutputPCode2( AG_SCREEN_PCODE, $3, $5 ); }
    ;

set_stmt:

    SET_  intr_fct  on_off
        { OutputPCode( AG_SET_INTERRUPT_PCODE, $2, MAKELONG($3, 0) ); }
    |
    SET_  intr_var
        { MakeExpression( NUM_EXP ); }
    intr_var_parm
        { OutputPCode( AG_SET_INTERRUPT_PCODE, $2, MAKELONG($4, 0) ); }
    |
    SET_  ESCAPE_
        { flag = 0;
          MakeExpression( STR_EXP ); }
    escape_parm
        { OutputPCode(  AG_SET_INTERRUPT_PCODE, AG_SYSESCAPE_ID,
                        MAKELONG($4, 0) ); }
    ;

intr_var_parm:

    NUM_EXP
        { SetSysVarPcode( defvar, 0, $1 );
          $$ = TRUE; }
    |
    NO_EXP  OFF_
        { $$ = FALSE; }
    |
    NO_EXP  TO_
        { MakeExpression( NUM_EXP ); }
    NUM_EXP
        { SetSysVarPcode( defvar, 0, $4 );
          $$ = TRUE; }
    ;

escape_parm:

    STR_EXP
        { SetSysVarPcode( AG_SYSESCAPE_ID, 0, $1 );
          $$ = TRUE; }
    |
    NO_EXP  esc_parm1
        { $$ = $2; }
    ;

esc_parm1:

    OFF_
        { $$ = FALSE; }
    |
    esc_parm2
        { $$ = TRUE; }
    ;

esc_parm2:

    TO_
        { MakeExpression( STR_EXP ); }
    to_parm
    |
    ALT_
        { MakeExpression( STR_EXP );
          flag = flag | AG_ALTKEY; }
    alt_parm
    |
    CTRL_
        { MakeExpression( STR_EXP );
          flag = flag | AG_CTRLKEY; }
    ctrl_parm
    ;

to_parm:

    STR_EXP
        { SetSysVarPcode( AG_SYSESCAPE_ID, flag, $1 ); }
    |
    NO_EXP  alt_ctrl
    ;

alt_parm:

    STR_EXP
        { SetSysVarPcode( AG_SYSESCAPE_ID, flag, $1 ); }
    |
    NO_EXP  CTRL_
        { MakeExpression( STR_EXP );
          flag = flag | AG_CTRLKEY; }
    STR_EXP
        { SetSysVarPcode( AG_SYSESCAPE_ID, flag, $4 ); }
    ;

ctrl_parm:

    STR_EXP
        { SetSysVarPcode( AG_SYSESCAPE_ID, flag, $1 ); }
    |
    NO_EXP  ALT_
        { MakeExpression( STR_EXP );
          flag = flag | AG_ALTKEY; }
    STR_EXP
        { SetSysVarPcode( AG_SYSESCAPE_ID, flag, $4 ); }
    ;

alt_ctrl:

    ALT_
        { MakeExpression( STR_EXP );
```

```
        flag = flag | AG_ALTKEY; }
    alt_perm
    |
    CTRL
        { MakeExpression( STR_EXP );
        flag = flag | AG_CTRLKEY; }
    ctrl_perm
    ;

on_off:

    ON
        { $$ = TRUE; }
    |
    OFF
        { $$ = FALSE; }
    ;

wait_stmt:

    WAIT
        { OutputPCode( AG_WAIT_PCODE, 0, 0L ); }
    ;

wndclose_stmt:

    CLOSEWINDOW
        { LabelFlag = TRUE; }
    wndclose_parms
        { OutputPCode( AG_WINDOWCLOSE_PCODE, $3, 0L ); }
    ;

wndclose_parms:

    /* empty */
        { $$ = 0; }
    |
    USER_SYMBOL
    ;

wndopen_stmt:

    OPENWINDOW
        { LabelFlag = TRUE; }
    wndopen_parms
        { OutputPCode( AG_WINDOWOPEN_PCODE, $3, 0L ); }
    ;

wndopen_parms:

    /* empty */
        { $$ = 0; }
    |
    USER_SYMBOL
    ;

wndtitle_stmt:

    TITLEWINDOW
        { LabelFlag = TRUE;
          MakeExpression( STR_EXP ); }
    wndtitle_expr
    ;

wndtitle_expr:

    STR_EXP
        { OutputPCode( AG_WINDOWTITLE_PCODE, 0, $1 ); }
    |
    NO_EXP  USER_SYMBOL
        { MakeExpression( STR_EXP ); }
    STR_EXP
        { OutputPCode( AG_WINDOWTITLE_PCODE, $2, $4 ); }
    ;

output_stmt:

    OUTPUT
        { MakeExpression( STR_EXP ); }
    output_parms
    ;

output_parms:

    NO_EXP
        { LabelFlag = TRUE; }
    USER_SYMBOL
        { OutputPCode( AG_LOCATE_PCODE, $3, 0L );
          LabelFlag = FALSE;
          MakeExpression( STR_EXP ); }
    output_string
    |
    output_string
    ;

output_strine:

    out_expr
    |
    outln_expr
    ;

out_expr:

    NO_EXP

    out_str NO_EXP
    ;

out_str:
```

```
    STR_EXP
        { OutputPCode( AG_OUTPUT_PCODE, FALSE, $1 ); }
    ';'
        { MakeExpression( STR_EXP ); }
    |
    out_str  out_str
    ;

outln_expr:

    NO_EXP
        { OutputPCode( AG_OUTPUT_PCODE, TRUE, 0L ); }
    |
    outln_str
        { OutputPCode( AG_OUTPUT_PCODE, TRUE, 0L ); }
    ;

outln_str:

    STR_EXP
        { OutputPCode( AG_OUTPUT_PCODE, FALSE, $1 ); }
    |
    out_str  outln_str
    ;


%%
#define NOCOMM
#include "windows.h"
#include "nwomf.h"
#include "doscall.h"
#include "ctrace.h"

#ifndef HAVE_APICMDSTRUCT
typedef struct
  {
    WORD len;
    WORD cmd;
    char parms[128];
  }
APICMDSTRUCT;
#define HAVE_APICMDSTRUCT
#endif

#include "nwapi.h"
#include "hoag.h"
#include "hoagpext.h"

#define yyunion(i,j)    memcpy( i, j, sizeof(YYSTYPE) )
#define MAX_USERBUTTONS 3

static int i;
static long ButtonText[MAX_USERBUTTONS+1];
static int  defvar;
static int  flag;
```

```
#S3771; #O9332 * BARBARA.PF; LP602 * TUE, MAY 17, 1988, 6:29 AM
#S3771; #O9332 * BARBARA.PF; LP602 * TUE, MAY 17, 1988, 6:29 AM
#S3771; #O9332 * BARBARA.PF; LP602 * TUE, MAY 17, 1988, 6:29 AM
```

```
#S3771; #O9332 * BARBARA.PF; LP602 * TUE, MAY 17, 1988, 6:29 AM
#S3771; #O9332 * BARBARA.PF; LP602 * TUE, MAY 17, 1988, 6:29 AM
#S3771; #O9332 * BARBARA.PF; LP602 * TUE, MAY 17, 1988, 6:29 AM
```

```
#S3771; #O9332 * BARBARA.PF; LP602 * TUE, MAY 17, 1988, 6:29 AM
#S3771; #O9332 * BARBARA.PF; LP602 * TUE, MAY 17, 1988, 6:29 AM
#S3771; #O9332 * BARBARA.PF; LP602 * TUE, MAY 17, 1988, 6:29 AM
```

```
#S3771; #O9332 * BARBARA.PF; LP602 * TUE, MAY 17, 1988, 6:29 AM
#S3771; #O9332 * BARBARA.PF; LP602 * TUE, MAY 17, 1988, 6:29 AM
#S3771; #O9332 * BARBARA.PF; LP602 * TUE, MAY 17, 1988, 6:29 AM
```

```
HPAGPMSC.C
        FormPath
        InitScanFlags
        PutClassInfo
        GetClassNameString
        CheckClassSymbol
        FetchClassIndex
        FetchClassInfo
        InitClass
        AddClassInfoField
        scans
        ExtractPropInfo
        for
        while
        FormPath

HPAGPSCN.C
        isident
        isspecial
        GetChar
        getline
        yylex1
        Locate
        yylex

HPAGPFIL.C
        deletetempfile
        OpenFiles
        loOpen
        loWrite
        ReadFile
        fillbuf
        cleanup1
        cleanup2
        deletetempfile
        WritePCode
        AddtoPage
        WritePage
        WriteAscPCode

HPAGPCI0.C
        InitSpellings
        DoPass2
        CompileScript
        main

HPAGPBUF.C
        ExpandStringTable
        InitTables
        LockTables
        UnlockTables
        FreeTables
        ExpandTable
        PutStringTable
        ExpandStringTable
        CmpStringTable
        GetStringTable
        AddFunctionEntry

HPAGPPS2.C
        InitPass2
        WriteHeader
        WriteCode
        fixuplabel
        WriteTables

HPAGPSEM.C
        OutputPCode
        OutputStackParms
        OpPCode
        RelOpPCode
        PutOnStack

HPAGPCMD.C
        ParseAppCmd
        InitAppCmdLib
        InitCmdBuf
        RestoreCmdBuf
        FreeCDLibs
        FreeCDParser
        UpdateAccessCount
        SwapOutCDP

HPAGPSM1.C
        OutputClassIdPCode
        ObjectFocus
        SetupLabel
        GoToLabel
        AddCmdPCodes
        WriteCmdPCode
        OnDoPCode
        AssignStmt
        JumpConditional
        FixupJump

HPAGPSM2.C
        DefineWindow
        MakePoint
        MakeRegion
        MakeMinus
        SetPCode
        SetPCommand
        OutputPCode2
        OutputFunction
        SetSysVarPCode

HPAGPSC2.C
        scanexpr
        CheckExprToken
        SaveExprValue
        MakeExpression
        Externalyylex
        MakeToken
        GetStringEntry
        GetLiteral

HPAGPBF2.C
        PutStrLit
        PutIntLit
```

```
     FindInt
     PutRealLit
     FindReal
     GetWindowNum
     AddWindow
     AddLabel
     AddLabelAddr
     GetLabelNum
     GetLastCondLabel
     GetVarNum
     AddVar
     AddFunction
     Saveparm

HPAGPMS2.C
     Convert2Int
     asctohex
     hextoasc
     PutFunctionInfo
     ConvertType
     CheckParmType
     CopyParm
     SetErrMsg
     yyerror
     printf
     FindString

HPAGPSM3.C
     UserInput
     UserControl
```

| Name | Filename | Line Number | Type |
|---|---|---|---|
| AddClassInfoField | HPAGPMSC.C | 558 | int |
| AddCmdPCodes | HPAGPSM1.C | 236 | BOOL |
| AddFunctionEntry | HPAGPBUF.C | 559 | int |
| AddFunction | HPAGPBF2.C | 553 | |
| AddLabelAddr | HPAGPBF2.C | 395 | |
| AddLabel | HPAGPBF2.C | 346 | |
| AddVar | HPAGPBF2.C | 508 | |
| AddWindow | HPAGPBF2.C | 303 | |
| AddtoPage | HPAGPFIL.C | 480 | |
| AssignStmt | HPAGPSM1.C | 381 | void |
| CheckClassSymbol | HPAGPMSC.C | 320 | int |
| CheckExprToken | HPAGPSC2.C | 144 | BOOL |
| CheckParmType | HPAGPMS2.C | 284 | |
| CmdStringTable | HPAGPBUF.C | 500 | int |
| CompileScript | HPAGPCI0.C | 211 | int FAR PASCAL |
| Convert2Int | HPAGPMS2.C | 72 | |
| ConvertType | HPAGPMS2.C | 209 | |
| CopyParm | HPAGPMS2.C | 335 | int |
| DefineWindow | HPAGPSM2.C | 77 | BOOL |
| DoPass2 | HPAGPCI0.C | 178 | void |
| ExpandStringTable | HPAGPBUF.C | 461 | STATIC BOOL NEAR PASCAL |
| ExpandStringTable | HPAGPBUF.C | 58 | STATIC BOOL NEAR PASCAL |
| ExpandTable | HPAGPBUF.C | 380 | BOOL |
| Externalyylex | HPAGPSC2.C | 283 | LPSTR FAR PASCAL |
| ExtractPropInfo | HPAGPMSC.C | 707 | STATIC BOOL NEAR PASCAL |
| FetchClassIndex | HPAGPMSC.C | 357 | void FAR PASCAL |
| FetchClassInfo | HPAGPMSC.C | 393 | void FAR PASCAL |
| FindInt | HPAGPBF2.C | 145 | int FAR PASCAL |
| FindReal | HPAGPBF2.C | 218 | int FAR PASCAL |
| FindString | HPAGPMS2.C | 535 | int FAR PASCAL |
| FixupJump | HPAGPSM1.C | 440 | |
| FormPath | HPAGPMSC.C | 768 | STATIC BOOL NEAR PASCAL |
| FormPath | HPAGPMSC.C | 59 | STATIC BOOL NEAR PASCAL |
| FreeCDLibs | HPAGPCMD.C | 308 | VOID |
| FreeCDParser | HPAGPCMD.C | 333 | void |
| FreeTables | HPAGPBUF.C | 321 | void |
| GetChar | HPAGPSCN.C | 130 | char |
| GetClassNameString | HPAGPMSC.C | 273 | void FAR PASCAL |
| GetLabelNum | HPAGPBF2.C | 419 | |
| GetLastCondLabel | HPAGPBF2.C | 454 | |
| GetLiteral | HPAGPSC2.C | 431 | LPSTR FAR PASCAL |
| GetStringEntry | HPAGPSC2.C | 408 | LPSTR FAR PASCAL |
| GetStringTable | HPAGPBUF.C | 529 | LPSTR PASCAL |
| GetVarNum | HPAGPBF2.C | 484 | |
| GetWindowNum | HPAGPBF2.C | 270 | |
| GotoLabel | HPAGPSM1.C | 230 | |
| InitAddCmdLib | HPAGPCMD.C | 151 | BOOL |
| InitClass | HPAGPMSC.C | 440 | BOOL |
| InitCmdBuf | HPAGPCMD.C | 245 | void |
| InitPass2 | HPAGPCI0.C | 74 | |
| InitScanFlags | HPAGPSCN.C | 76 | void |
| InitSpellings | HPAGPCI0.C | 75 | BOOL |
| InitTables | HPAGPBUF.C | 75 | BOOL |
| JumpConditional | HPAGPSM1.C | 395 | |
| Locate | HPAGPSCN.C | 477 | int |
| LockTables | HPAGPBUF.C | 179 | |
| TakeExpression | HPAGPSC2.C | 242 | VOID FAR PASCAL |

| | | | |
|---|---|---|---|
| MakeMinus | HPAGPSM2.C | 323 | long |
| MakePoint | HPAGPSM2.C | 195 | long |
| MakeRegion | HPAGPSM2.C | 246 | long |
| MakeToken | HPAGPSC2.C | 384 | void |
| ObjectFocus | HPAGPSM1.C | 109 | |
| OnDoPCode | HPAGPSM1.C | 330 | |
| OpPCode | HPAGPSEM.C | 368 | BOOL |
| OpenFiles | HPAGPFIL.C | 77 | BOOL PASCAL |
| OutputClassIdPCode | HPAGPSM1.C | 72 | |
| OutputFunction | HPAGPSM2.C | 552 | |
| OutputPCode2 | HPAGPSM2.C | 470 | void |
| OutputPCode | HPAGPSEM.C | 80 | void |
| OutputStackParms | HPAGPSEM.C | 297 | void |
| ParseAppCmd | HPAGPCMD.C | 73 | BOOL |
| PutClassInfo | HPAGPMSC.C | 144 | BOOL |
| PutFunctionInfo | HPAGPMS2.C | 166 | |
| PutIntLit | HPAGPBF2.C | 119 | |
| PutOnStack | HPAGPSEM.C | 456 | |
| PutRealLit | HPAGPBF2.C | 185 | |
| PutStrLit | HPAGPBF2.C | 73 | int PASCAL |
| PutStringTable | HPAGPBUF.C | 426 | int PASCAL |
| ReadFile | HPAGPFIL.C | 233 | char * |
| RelOpPCode | HPAGPSEM.C | 422 | BOOL |
| RestoreCmdBuf | HPAGPCMD.C | 274 | void |
| SaveExprValue | HPAGPSC2.C | 209 | VOID PASCAL |
| Saveparm | HPAGPBF2.C | 623 | |
| SetErrMsg | HPAGPMS2.C | 488 | VOID PASCAL |
| SetPCode | HPAGPSM2.C | 384 | |
| SetPCommand | HPAGPSM2.C | 410 | |
| SetSysvarPCode | HPAGPSM2.C | 664 | void |
| SetupLabel | HPAGPSM1.C | 163 | BOOL |
| SwapOutCDP | HPAGPCMD.C | 408 | BOOL |
| UnlockTables | HPAGPBUF.C | 281 | void |
| UpdateAccessCount | HPAGPCMD.C | 380 | void |
| UserControl | HPAGPSM3.C | 218 | BOOL |
| UserInput | HPAGPSM3.C | 80 | void |
| WriteAscPCode | HPAGPFIL.C | 537 | |
| WriteCmdPCode | HPAGPSM1.C | 281 | void |
| WriteCode | HPAGPPS2.C | 210 | BOOL |
| WriteHeader | HPAGPPS2.C | 188 | BOOL |
| WritePCode | HPAGPFIL.C | 448 | |
| WritePage | HPAGPFIL.C | 505 | BOOL |
| WriteTables | HPAGPPS2.C | 293 | |
| asctohex | HPAGPMS2.C | 107 | BYTE PASCAL |
| cleanup1 | HPAGPFIL.C | 350 | |
| cleanup2 | HPAGPFIL.C | 376 | |
| deletetempfile | HPAGPFIL.C | 400 | STATIC BOOL PASCAL |
| deletetempfile | HPAGPFIL.C | 57 | STATIC BOOL PASCAL |
| fillbuf | HPAGPFIL.C | 312 | int |
| fixuplabel | HPAGPPS2.C | 257 | |
| for | HPAGPMSC.C | 719 | |
| getline | HPAGPSCN.C | 188 | BOOL |
| hextoasc | HPAGPMS2.C | 135 | VOID PASCAL |
| isident | HPAGPSCN.C | 78 | BOOL |
| isspecial | HPAGPSCN.C | 90 | BOOL |
| lpOpen | HPAGPFIL.C | 185 | int |
| lpWrite | HPAGPFIL.C | 199 | BOOL PASCAL |
| main | HPAGPCIO.C | 285 | BOOL PASCAL |
| printf | HPAGPMS2.C | 518 | |
| scanexpr | HPAGPSC2.C | 73 | int |
| scans | HPAGPMSC.C | 832 | char * |
| while | HPAGPMSC.C | 728 | |
| yyerror | HPAGPMS2.C | 495 | void |
| yylex1 | HPAGPSCN.C | 208 | int |
| yylex | HPAGPSCN.C | 572 | int |

```
#S3771; #O9334  *  BARBARA.PF; LP602  *  TUE, MAY 17, 1988,  6:29 AM
#S3771; #O9334  *  BARBARA.PF; LP602  *  TUE, MAY 17, 1988,  6:29 AM
#S3771; #O9334  *  BARBARA.PF; LP602  *  TUE, MAY 17, 1988,  6:29 AM

#S3771; #O9334  *  BARBARA.PF; LP602  *  TUE, MAY 17, 1988,  6:29 AM
#S3771; #O9334  *  BARBARA.PF; LP602  *  TUE, MAY 17, 1988,  6:29 AM
#S3771; #O9334  *  BARBARA.PF; LP602  *  TUE, MAY 17, 1988,  6:29 AM

#S3771; #O9334  *  BARBARA.PF; LP602  *  TUE, MAY 17, 1988,  6:29 AM
#S3771; #O9334  *  BARBARA.PF; LP602  *  TUE, MAY 17, 1988,  6:29 AM
#S3771; #O9334  *  BARBARA.PF; LP602  *  TUE, MAY 17, 1988,  6:29 AM

#S3771; #O9334  *  BARBARA.PF; LP602  *  TUE, MAY 17, 1988,  6:29 AM
#S3771; #O9334  *  BARBARA.PF; LP602  *  TUE, MAY 17, 1988,  6:29 AM
#S3771; #O9334  *  BARBARA.PF; LP602  *  TUE, MAY 17, 1988,  6:29 AM
```

```
#S3771; #09335  *  BARBARA.PF; LP602  *  TUE, MAY 17, 1988,  6:29 AM
#S3771; #09335  *  BARBARA.PF; LP602  *  TUE, MAY 17, 1988,  6:29 AM
#S3771; #09335  *  BARBARA.PF; LP602  *  TUE, MAY 17, 1988,  6:29 AM

#S3771; #09335  *  BARBARA.PF; LP602  *  TUE, MAY 17, 1988,  6:29 AM
#S3771; #09335  *  BARBARA.PF; LP602  *  TUE, MAY 17, 1988,  6:29 AM
#S3771; #09335  *  BARBARA.PF; LP602  *  TUE, MAY 17, 1988,  6:29 AM

#S3771; #09335  *  BARBARA.PF; LP602  *  TUE, MAY 17, 1988,  6:29 AM
#S3771; #09335  *  BARBARA.PF; LP602  *  TUE, MAY 17, 1988,  6:29 AM
#S3771; #09335  *  BARBARA.PF; LP602  *  TUE, MAY 17, 1988,  6:29 AM

#S3771; #09335  *  BARBARA.PF; LP602  *  TUE, MAY 17, 1988,  6:29 AM
#S3771; #09335  *  BARBARA.PF; LP602  *  TUE, MAY 17, 1988,  6:29 AM
#S3771; #09335  *  BARBARA.PF; LP602  *  TUE, MAY 17, 1988,  6:29 AM
```

```
Processing module HPAGPCI0.OBJ
Processing module HPAGPSCN.OBJ
Processing module HPAGPFIL.OBJ
Processing module HPAGPMSC.OBJ
Processing module HPAGPBUF.OBJ
Processing module HPAGPPS2.OBJ
Processing module HPAGPPRS.OBJ
Processing module HPAGPSEM.OBJ
Processing module HPAGPCMO.OBJ
Processing module HPAGPEXP.OBJ
Processing module HPAGPSM1.OBJ
Processing module HPAGPSM2.OBJ
Processing module HPAGPSC2.OBJ
Processing module HPAGPBF2.OBJ
Processing module HPAGPMS2.OBJ
Processing module HPAGPSM3.OBJ
```

```
** CROSS REFERENCE

                          PUBLIC  SYMBOLS
     symbol               Modules referenced

ASCTOHEX             HPAGPSM2.C      -HPAGPMS2.C
COMPILESCRIPT       -HPAGPCI0.C
DELETETEMPFILE      -HPAGPFIL.C
EXTERNALYYLEX       -HPAGPSC2.C
EXTRACTPROPINFO     -HPAGPMSC.C
FETCHCLASSINDEX     -HPAGPMSC.C
FETCHCLASSINFO      -HPAGPMSC.C
FINDINT              HPAGPSEM.C       HPAGPSM2.C     -HPAGPBF2.C
FINDREAL             HPAGPSM2.C      -HPAGPBF2.C
FINDSTRING          -HPAGPMS2.C
FORMPATH            -HPAGPMSC.C
GETCLASSNAMESTRI    -HPAGPMSC.C
GETLITERAL          -HPAGPSC2.C
GETSTRINGENTRY      -HPAGPSC2.C
HEXTOASC             HPAGPFIL.C       HPAGPSM2.C     -HPAGPMS2.C
LPWRITE             -HPAGPFIL.C       HPAGPPS2.C      HPAGPSM2.C
MAIN                -HPAGPCI0.C
MAKEEXPRESSION       HPAGPPRS.C      -HPAGPSC2.C
OPENFILES            HPAGPCI0.C      -HPAGPFIL.C
SAVEEXPRVALUE        HPAGPEXP.C      -HPAGPSC2.C
SETERRMSG            HPAGPFIL.C       HPAGPMSC.C      HPAGPBUF.C      HPAGPPS2.C      HPAGPCMO.C
                     HPAGPSM1.C       HPAGPSM2.C      HPAGPBF2.C     -HPAGPMS2.C
_ADDCLASSINFOFIE    -HPAGPMSC.C
_ADDCMDOPCODES       HPAGPCMO.C      -HPAGPSM1.C
_ADDFUNCTION         HPAGPEXP.C      -HPAGPBF2.C
_ADDFUNCTIONENTR    -HPAGPBF2.C       HPAGPMS2.C
_ADDLABEL            HPAGPMSC.C       HPAGPSM1.C     -HPAGPBF2.C
_ADDLABELADDR        HPAGPPS2.C       HPAGPSM1.C     -HPAGPBF2.C
_ADDTOPAGE          -HPAGPFIL.C       HPAGPSM2.C
_ADDVAR             -HPAGPBF2.C
_ADDWINDOW          -HPAGPBF2.C
_ASSIGNSTMT          HPAGPPRS.C      -HPAGPSM1.C
_CHECKCLASSSYMBO     HPAGPSCN.C      -HPAGPMSC.C
_CHECKEXPRTOKEN     -HPAGPSC2.C
_CHECKPARMTYPE       HPAGPSM2.C      -HPAGPMS2.C
_CLEANUP1            HPAGPCI0.C      -HPAGPFIL.C
_CLEANUP2            HPAGPCI0.C      -HPAGPFIL.C
_CMPSTRINGTABLE      HPAGPSCN.C       HPAGPMSC.C     -HPAGPBUF.C      HPAGPCMO.C      HPAGPBF2.C
_CONVERT2INT         HPAGPSM2.C      -HPAGPMS2.C      HPAGPSM3.C
_CONVERTTYPE         HPAGPSM2.C      -HPAGPMS2.C
_COPYPARM            HPAGPSM2.C      -HPAGPMS2.C
_DEFINEWINDOW        HPAGPPRS.C      -HPAGPSM2.C
_DOPASS2            -HPAGPCI0.C
_EXPANDTABLE        -HPAGPSCN.C      -HPAGPMSC.C     -HPAGPBUF.C     -HPAGPBF2.C
_FILLBUF            -HPAGPSCN.C      -HPAGPFIL.C      HPAGPPS2.C     -HPAGPCMO.C
_FIXUPJUMP          -HPAGPPRS.C      -HPAGPSM1.C
_FIXUPLABEL         -HPAGPPS2.C
_FREECOLLISS        -HPAGPFIL.C      -HPAGPCMO.C
_FREECCPARSER       -HPAGPCMO.C
_FREETABLES         -HPAGPFIL.C      -HPAGPBUF.C
_GETCHAR            -HPAGPSCN.C
_GETLABELNUM        -HPAGPSM1.C      -HPAGPBF2.C
_GETLASTCONDLABE    -HPAGPSM1.C      -HPAGPBF2.C
_GETLINE            -HPAGPSCN.C
_GETVARNUM          -HPAGPSEM.C      -HPAGPBF2.C      HPAGPSM3.C
```

| | | | | | |
|---|---|---|---|---|---|
| _GETWINDOWNUM | HPAGPSEM.C | HPAGPSM2.C | -HPAGPBF2.C | HPAGPSM3.C | |
| _GOTOLABEL | HPAGPPRS.C | -HPAGPSM1.C | | | |
| _INITAPPCMDLIB | -HPAGPCMD.C | | | | |
| _INITCLASS | -HPAGPMSC.C | | | | |
| _INITCMDBUF | -HPAGPCMD.C | | | | |
| _INITPASS2 | HPAGPCIO.C | -HPAGPPS2.C | | | |
| _INITSCANFLAGS | HPAGPCIO.C | -HPAGPMSC.C | | | |
| _INITSPELLINGS | -HPAGPCIO.C | | | | |
| _INITTABLES | HPAGPCIO.C | -HPAGPBUF.C | | | |
| _ISIDENT | -HPAGPSCN.C | | | | |
| _ISSPECIAL | -HPAGPSCN.C | | | | |
| _JUMPCONDITIONAL | HPAGPPRS.C | -HPAGPSM1.C | | | |
| _LOCATE | HPAGPCIO.C | -HPAGPSCN.C | HPAGPMSC.C | HPAGPMS2.C | |
| _LOCKTABLES | -HPAGPBUF.C | | | | |
| _LPOPEN | -HPAGPFIL.C | HPAGPPS2.C | | | |
| _MAKEMINUS | HPAGPEXP.C | -HPAGPSM2.C | | | |
| _MAKEPOINT | HPAGPPRS.C | HPAGPEXP.C | -HPAGPSM2.C | | |
| _MAKEREGION | HPAGPEXP.C | -HPAGPSM2.C | | | |
| _MAKETOKEN | -HPAGPSC2.C | | | | |
| _OBJECTFOCUS | HPAGPPRS.C | -HPAGPSM1.C | | | |
| _ONDOPCODE | HPAGPPRS.C | -HPAGPSM1.C | | | |
| _OPPCODE | -HPAGPSEM.C | HPAGPEXP.C | HPAGPSM2.C | | |
| _OUTPUTCLASSIDPC | HPAGPPS2.C | -HPAGPSM1.C | | | |
| _OUTPUTFUNCTION | HPAGPEXP.C | -HPAGPSM2.C | | | |
| _OUTPUTPCODE | HPAGPMSC.C | HPAGPPRS.C | -HPAGPSEM.C | HPAGPEXP.C | HPAGPSM1.C |
| | HPAGPSM2.C | | | | |
| _OUTPUTPCODE2 | HPAGPPRS.C | -HPAGPSM2.C | | | |
| _OUTPUTSTACKPARM | -HPAGPSEM.C | HPAGPSM2.C | | | |
| _PARSEAPPCMD | HPAGPSCN.C | -HPAGPCMD.C | | | |
| _PRINTF | HPAGPPRS.C | HPAGPEXP.C | -HPAGPMS2.C | | |
| _PUTCLASSINFO | HPAGPCIO.C | -HPAGPMSC.C | | | |
| _PUTFUNCTIONINFO | HPAGPCIO.C | -HPAGPMS2.C | | | |
| _PUTINTLIT | HPAGPSCN.C | -HPAGPBF2.C | | | |
| _PUTONSTACK | -HPAGPSEM.C | HPAGPSM1.C | HPAGPSM2.C | HPAGPSC2.C | HPAGPBF2.C |
| _PUTREALLIT | HPAGPSCN.C | -HPAGPBF2.C | | | |
| _PUTSTRINGTABLE | -HPAGPBUF.C | HPAGPBF2.C | | | |
| _PUTSTRLIT | HPAGPSEM.C | -HPAGPBF2.C | | | |
| _READFILE | HPAGPCIO.C | -HPAGPFIL.C | | | |
| _RELOPPCODE | -HPAGPSEM.C | HPAGPEXP.C | | | |
| _RESTORECMDBUF | -HPAGPCMD.C | | | | |
| _SAVEPARM | HPAGPEXP.C | -HPAGPBF2.C | | | |
| _SCANEXPR | HPAGPSCN.C | -HPAGPSC2.C | | | |
| _SCANS | -HPAGPMSC.C | HPAGPMS2.C | | | |
| _SETPCODE | HPAGPPRS.C | -HPAGPSM2.C | | | |
| _SETPCOMMAND | HPAGPPRS.C | -HPAGPSM2.C | | | |
| _SETSYSVARPCODE | HPAGPPRS.C | -HPAGPSM2.C | | | |
| _SETUPLABEL | HPAGPPRS.C | -HPAGPSM1.C | | | |
| _SWAPOUTCDP | -HPAGPCMD.C | | | | |
| _UNLOCKTABLES | -HPAGPBUF.C | | | | |
| _UPDATEACCESSCOU | -HPAGPCMD.C | | | | |
| _USERCONTROL | HPAGPPRS.C | -HPAGPSM3.C | | | |
| _USERINPUT | HPAGPPRS.C | -HPAGPSM3.C | | | |
| _WRITEASCPCODE | -HPAGPFIL.C | | | | |
| _WRITECMDPCODE | -HPAGPSM1.C | | | | |
| _WRITECODE | HPAGPCIO.C | -HPAGPPS2.C | | | |
| _WRITEHEADER | HPAGPCIO.C | -HPAGPPS2.C | | | |
| _WRITEPAGE | -HPAGPFIL.C | HPAGPPS2.C | HPAGPSM2.C | | |
| _WRITEPCODE | -HPAGPFIL.C | HPAGPSEM.C | HPAGPSM1.C | HPAGPSM2.C | HPAGPSM3.C |
| _WRITETABLES | HPAGPCIO.C | -HPAGPPS2.C | | | |
| _YYACT | -HPAGPPRS.C | | | | |
| _YYCHAR | -HPAGPPRS.C | | | | |
| _YYCHK | -HPAGPPRS.C | | | | |
| _YYDEBUG | -HPAGPPRS.C | | | | |
| _YYDEF | -HPAGPPRS.C | | | | |
| _YYERRFLAG | -HPAGPPRS.C | | | | |
| _YYERROR | HPAGPPRS.C | HPAGPEXP.C | HPAGPSM2.C | -HPAGPMS2.C | |
| _YYEXCA | -HPAGPPRS.C | | | | |
| _YYLEX | -HPAGPSCN.C | HPAGPPRS.C | HPAGPEXP.C | HPAGPSC2.C | |
| _YYLEX1 | -HPAGPSCN.C | HPAGPSC2.C | | | |
| _YYNERRS | -HPAGPPRS.C | | | | |
| _YYPACT | -HPAGPPRS.C | | | | |
| _YYPARSE | HPAGPCIO.C | -HPAGPPRS.C | | | |
| _YYPARSEXPR | -HPAGPEXP.C | HPAGPSC2.C | | | |
| _YYPGO | -HPAGPPRS.C | | | | |
| _YYR1 | -HPAGPPRS.C | | | | |
| _YYR2 | -HPAGPPRS.C | | | | |

UNRESOLVED EXTERNAL REFERENCES

| symbol | Modules referenced | | | |
|---|---|---|---|---|
| ANSIUPPER | HPAGPSCN.C | HPAGPMS2.C | | |
| COMFORMAT | HPAGPMSC.C | HPAGPCMD.C | HPAGPMS2.C | |
| FREELIBRARY | HPAGPCMD.C | | | |
| GETPROCADDRESS | HPAGPCMD.C | | | |
| GETSTRINGTABLE | HPAGPMSC.C | HPAGPSC2.C | | |
| GLOBALALLOC | HPAGPFIL.C | HPAGPMSC.C | HPAGPPS2.C | |
| GLOBALFLAGS | HPAGPMSC.C | | | |
| GLOBALFREE | HPAGPFIL.C | HPAGPMSC.C | HPAGPPS2.C | |
| GLOBALLOCK | HPAGPFIL.C | HPAGPMSC.C | HPAGPPS2.C | HPAGPSM1.C |
| GLOBALUNLOCK | HPAGPFIL.C | HPAGPMSC.C | HPAGPPS2.C | HPAGPSM1.C |
| LOADLIBRARY | HPAGPCMD.C | | | |
| LOADSTRING | HPAGPCIO.C | HPAGPFIL.C | HPAGPPS2.C | |
| LOCALALLOC | HPAGPFIL.C | HPAGPBUF.C | | |
| LOCALFREE | HPAGPCIO.C | HPAGPFIL.C | HPAGPBUF.C | |
| LOCALINIT | HPAGPCIO.C | | | |
| LOCALLOCK | HPAGPFIL.C | HPAGPBUF.C | | |
| LOCALREALLOC | HPAGPBUF.C | | | |
| LOCALUNLOCK | HPAGPCIO.C | HPAGPFIL.C | HPAGPBUF.C | |
| LOCKSEGMENT | HPAGPCMD.C | | | |
| LSTRCAT | HPAGPMSC.C | | | |
| LSTRCMP | HPAGPMSC.C | | | |
| LSTRCPY | HPAGPFIL.C | HPAGPMSC.C | HPAGPPS2.C | HPAGPMS2.C |
| LSTRLEN | HPAGPFIL.C | HPAGPMSC.C | HPAGPPS2.C | |
| LSTRMOVE | HPAGPSM1.C | HPAGPSC2.C | | |
| OMF_ENUMCLASSES | HPAGPMSC.C | | | |
| OMF_FREEPROPERTI | HPAGPMSC.C | | | |
| OMF_GETOMFDIRECT | HPAGPMSC.C | | | |
| OMF_GETPROPERTIE | HPAGPMSC.C | | | |
| OMF_READPROPERTY | HPAGPMSC.C | | | |
| PUTSTRINGTABLE | HPAGPSCN.C | HPAGPMSC.C | | |
| PUTSTRLIT | [illegible] | | | |
| UNLOCKSEGMENT | HPAGPCMD.C | | | |
| _ABS | [illegible] | | | |
| _ARRAYFLAG | [illegible] | HPAGPMSC.C | | |
| _ARRAYSIZE | [illegible] | [illegible] | | |
| _ARRAYTABLE_SIZE | [illegible] | HPAGPBF2.C | | |
| _ATOF | [illegible] | | | |
| _ATOI | HPAGPMSC.C | | | |
| _ATOL | HPAGPBF2.C | | | |
| _CBTCLASS | HPAGPSCN.C | HPAGPMSC.C | | |

| | | | | | |
|---|---|---|---|---|---|
| _CDCMDFLAG | HPAGPSCN.C | HPAGPMSC.C | HPAGPPRS.C | HPAGPCMD.C | |
| _CDPCOUNT | HPAGPMSC.C | HPAGPCMD.C | | | |
| _CFILEBUF | HPAGPSCN.C | HPAGPFIL.C | HPAGPCMD.C | | |
| _CLASS_SIZE | HPAGPMSC.C | HPAGPBUF.C | | | |
| _CONTINUEFLAG | HPAGPSCN.C | HPAGPMSC.C | | | |
| _CSOURCELINE | HPAGPMSC.C | | | | |
| _CURRADDR | HPAGPFIL.C | HPAGPMSC.C | HPAGPPS2.C | HPAGPSM1.C | HPAGPSM2.C |
| _CURRFOCUS | HPAGPSCN.C | HPAGPMSC.C | HPAGPSM1.C | HPAGPSM2.C | HPAGPBF2.C |
| _CURR_FUNCTION | HPAGPMSC.C | HPAGPSM2.C | HPAGPBF2.C | | |
| _DOSCALL | HPAGPFIL.C | HPAGPPS2.C | HPAGPCMD.C | | |
| _DSDOSCALL | HPAGPFIL.C | | | | |
| _EXPRESSIONFLAG | HPAGPSCN.C | HPAGPMSC.C | HPAGPSC2.C | | |
| _EXPRESSIONSTATE | HPAGPSC2.C | | | | |
| _EXPRESSIONTYPE | HPAGPSC2.C | | | | |
| _EXPRLVAL | HPAGPSC2.C | | | | |
| _EXPRTOKEN | HPAGPSC2.C | | | | |
| _FOBJECT | HPAGPFIL.C | HPAGPPS2.C | | | |
| _FPCODES | HPAGPFIL.C | HPAGPPS2.C | HPAGPSM2.C | | |
| _FSOURCE | HPAGPSCN.C | HPAGPFIL.C | HPAGPPS2.C | HPAGPCMD.C | |
| _FTEMP | HPAGPFIL.C | HPAGPPS2.C | | | |
| _FUNCTION_SIZE | HPAGPBUF.C | HPAGPBF2.C | | | |
| _GBUFPTR | HPAGPSCN.C | HPAGPFIL.C | HPAGPPS2.C | HPAGPCMD.C | |
| _GCHARPTR | HPAGPSCN.C | | | | |
| _GCLASSFLAG | HPAGPSCN.C | HPAGPMSC.C | HPAGPPRS.C | | |
| _GCURRBUFSTATE | HPAGPSCN.C | HPAGPFIL.C | HPAGPCMD.C | | |
| _GCURRERRNUM | HPAGPMSC.C | HPAGPPRS.C | HPAGPCMD.C | HPAGPMS2.C | |
| _GENDPROGFLAG | HPAGPCMD.C | HPAGPSC2.C | | | |
| _GERRORFLAG | HPAGPMSC.C | HPAGPSC2.C | HPAGPMS2.C | | |
| _GERRORINFO | HPAGPMS2.C | | | | |
| _GFATALERRORFLAG | HPAGPSCN.C | HPAGPMSC.C | HPAGPCMD.C | HPAGPMS2.C | |
| _GLASTKEYWORD | HPAGPSCN.C | | | | |
| _GLINENUMBER | HPAGPSCN.C | HPAGPPS2.C | HPAGPCMD.C | HPAGPMS2.C | |
| _GPCODEBUF | HPAGPFIL.C | HPAGPMSC.C | | | |
| _GPCODEPTR | HPAGPFIL.C | HPAGPMSC.C | | | |
| _GSOURCEPTR | HPAGPSCN.C | HPAGPMSC.C | | | |
| _GTEMPBUF | HPAGPMSC.C | HPAGPPS2.C | HPAGPSEM.C | HPAGPSM1.C | HPAGPSM2.C |
| | HPAGPSM3.C | | | | |
| _HARRAYTABLE | HPAGPBUF.C | HPAGPBF2.C | | | |
| _HASH | HPAGPSCN.C | HPAGPMSC.C | | | |
| _HASH_PTR | HPAGPMSC.C | | | | |
| _HCLASSINFO | HPAGPMSC.C | HPAGPBUF.C | | | |
| _HFUNCTIONTABLE | HPAGPBUF.C | HPAGPBF2.C | | | |
| _HINST | HPAGPCMD.C | | | | |
| _HINTTABLE | HPAGPBUF.C | HPAGPBF2.C | | | |
| _HLABELS | HPAGPBUF.C | HPAGPBF2.C | | | |
| _HLIBINST | HPAGPFIL.C | HPAGPPS2.C | | | |
| _HOMF | HPAGPMSC.C | | | | |
| _HPARMTABLE | HPAGPBUF.C | HPAGPBF2.C | | | |
| _HREALTABLE | HPAGPBUF.C | HPAGPBF2.C | | | |
| _HSPELLINGS | HPAGPSCN.C | HPAGPBUF.C | | | |
| _HSTRINGTABLE | HPAGPMSC.C | HPAGPBUF.C | HPAGPBF2.C | | |
| _HSTRLITTABLE | HPAGPBUF.C | HPAGPBF2.C | | | |
| _HWINDOW | HPAGPBUF.C | HPAGPBF2.C | | | |
| _INTLIT_SIZE | HPAGPBUF.C | HPAGPBF2.C | | | |
| _ITOA | HPAGPFIL.C | HPAGPMS2.C | | | |
| _KEYWORD | HPAGPSCN.C | HPAGPMSC.C | HPAGPBF2.C | | |
| _LABELFLAG | HPAGPSCN.C | HPAGPMSC.C | HPAGPPRS.C | HPAGPCMD.C | |
| _LABEL_SIZE | HPAGPBUF.C | HPAGPBF2.C | | | |
| _LASTLVAL | HPAGPSC2.C | | | | |
| _LASTTOKEN | HPAGPSC2.C | | | | |
| _MEMCPY | HPAGPFIL.C | HPAGPPRS.C | HPAGPSEM.C | HPAGPEXP.C | HPAGPSC2.C |
| | HPAGPMS2.C | | | | |
| _MEMSET | HPAGPFIL.C | HPAGPMSC.C | HPAGPPS2.C | | |
| _NEWCHARFLAG | HPAGPSCN.C | HPAGPMSC.C | HPAGPCMD.C | | |
| _NEWLINE | HPAGPSCN.C | HPAGPMSC.C | HPAGPCMD.C | | |
| _NEXT_ARRAY | HPAGPPS2.C | HPAGPBF2.C | | | |
| _NEXT_CLASS | HPAGPMSC.C | HPAGPPS2.C | HPAGPCMD.C | HPAGPSM1.C | |
| _NEXT_CLASSID | HPAGPMSC.C | HPAGPPS2.C | HPAGPSM1.C | | |
| _NEXT_FUNCTION | HPAGPMSC.C | HPAGPSM2.C | HPAGPBF2.C | | |
| _NEXT_INT | HPAGPMSC.C | HPAGPBF2.C | | | |
| _NEXT_LABEL | HPAGPMSC.C | HPAGPPS2.C | HPAGPBF2.C | | |
| _NEXT_PARM | HPAGPMSC.C | HPAGPSM2.C | HPAGPBF2.C | | |
| _NEXT_REAL | HPAGPMSC.C | HPAGPBF2.C | | | |
| _NEXT_SPELLING | HPAGPSCN.C | HPAGPMSC.C | | | |
| _NEXT_STR | HPAGPMSC.C | HPAGPBF2.C | | | |
| _NEXT_WINDOW | HPAGPMSC.C | HPAGPPS2.C | HPAGPBF2.C | | |
| _NLFLAG | HPAGPSCN.C | HPAGPMSC.C | HPAGPCMD.C | | |
| _NUMERRORS | HPAGPMS2.C | | | | |
| _NUMFLAG | HPAGPEXP.C | HPAGPSM2.C | HPAGPSC2.C | HPAGPBF2.C | |
| _NUMVARIABLES | HPAGPMSC.C | HPAGPPS2.C | HPAGPBF2.C | | |
| _PARM_SIZE | HPAGPBUF.C | HPAGPBF2.C | | | |
| _PARRAYTABLE | HPAGPBUF.C | HPAGPPS2.C | HPAGPBF2.C | | |
| _PCLASSINFO | HPAGPMSC.C | HPAGPBUF.C | HPAGPCMD.C | HPAGPSM1.C | HPAGPSM2.C |
| | HPAGPBF2.C | | | | |
| _PFUNCTIONTABLE | HPAGPBUF.C | HPAGPSM2.C | HPAGPBF2.C | | |
| _PINTTABLE | HPAGPBUF.C | HPAGPSEM.C | HPAGPSM2.C | HPAGPSC2.C | HPAGPBF2.C |
| | HPAGPMS2.C | HPAGPSM3.C | | | |
| _PLABELS | HPAGPBUF.C | HPAGPPS2.C | HPAGPSEM.C | HPAGPSM1.C | HPAGPBF2.C |
| _PPARMTABLE | HPAGPBUF.C | HPAGPSM2.C | HPAGPBF2.C | | |
| _PREALTABLE | HPAGPBUF.C | HPAGPSEM.C | HPAGPSM2.C | HPAGPSC2.C | HPAGPBF2.C |
| | HPAGPMS2.C | | | | |
| _PSPELLINGS | HPAGPSCN.C | HPAGPMSC.C | HPAGPBUF.C | HPAGPSC2.C | HPAGPBF2.C |
| | HPAGPMS2.C | | | | |
| _PSTRINGTABLE | HPAGPBUF.C | HPAGPSEM.C | HPAGPCMD.C | HPAGPSM2.C | HPAGPBF2.C |
| | HPAGPMS2.C | HPAGPSM3.C | | | |
| _PSTRLITTABLE | HPAGPBUF.C | HPAGPSEM.C | HPAGPSM2.C | HPAGPSC2.C | HPAGPBF2.C |
| | HPAGPMS2.C | HPAGPSM3.C | | | |
| _PWINDOW | HPAGPBUF.C | HPAGPPS2.C | HPAGPSM2.C | HPAGPBF2.C | HPAGPSM3.C |
| _REALLIT_SIZE | HPAGPBUF.C | HPAGPBF2.C | | | |
| _SPELL_SIZE | HPAGPSCN.C | HPAGPBUF.C | | | |
| _STARTADDR | HPAGPMSC.C | HPAGPPS2.C | HPAGPSM1.C | | |
| _STRCAT | HPAGPFIL.C | HPAGPSEM.C | | | |
| _STRCHR | HPAGPMSC.C | | | | |
| _STRCMP | HPAGPCIO.C | HPAGPBUF.C | | | |
| _STRCPY | HPAGPFIL.C | HPAGPMSC.C | HPAGPBUF.C | HPAGPPS2.C | HPAGPSEM.C |
| | HPAGPSM2.C | HPAGPMS2.C | HPAGPSM3.C | | |
| _STRCSPN | HPAGPMSC.C | | | | |
| _STRFLAG | HPAGPEXP.C | HPAGPSM2.C | HPAGPSC2.C | HPAGPBF2.C | |
| _STRLEN | HPAGPSCN.C | HPAGPFIL.C | HPAGPBUF.C | HPAGPSEM.C | HPAGPSM2.C |
| | HPAGPMS2.C | HPAGPSM3.C | | | |
| _STRLIT_SIZE | HPAGPBUF.C | HPAGPBF2.C | | | |
| [illegible] | [illegible] | | | | |
| [illegible] | [illegible] | HPAGPBUF.C | HPAGPBF2.C | | |
| [illegible] | [illegible] | HPAGPBF2.C | | | |
| [illegible]FILENAME | [illegible] | HPAGPMSC.C | HPAGPPS2.C | HPAGPSEM.C | HPAGPSM2.C |
| | [illegible] | | | | |
| _TOKEN | HPAGPSCN.C | | | | |
| _WINDOW_SIZE | HPAGPBUF.C | HPAGPBF2.C | | | |
| _YYLVAL | HPAGPSCN.C | HPAGPPRS.C | HPAGPEXP.C | HPAGPSC2.C | |
| __ACRTUSED | HPAGPCIO.C | HPAGPSCN.C | HPAGPFIL.C | HPAGPMSC.C | HPAGPBUF.C |

```
                HPAGPPS2.C      HPAGPPRS.C      HPAGPSEM.C      HPAGPCMD.C      HPAGPEXP.C
                HPAGPSM1.C      HPAGPSM2.C      HPAGPSC2.C      HPAGPBF2.C      HPAGPMS2.C
                HPAGPSM3.C
__CTYPE         HPAGPCI0.C      HPAGPSCN.C      HPAGPMS2.C
__FADDO         HPAGPSM2.C      HPAGPMS2.C
__FCHS          HPAGPSM2.C
__FLDO          HPAGPSEM.C      HPAGPSM2.C      HPAGPMS2.C
__FLDL          HPAGPMS2.C
__FLTUSED       HPAGPSEM.C      HPAGPSM2.C      HPAGPBF2.C      HPAGPMS2.C
__FSTDP         HPAGPMS2.C
__FSTSP         HPAGPSEM.C      HPAGPMS2.C
__FTOL          HPAGPSM2.C      HPAGPMS2.C
__SSTOP         HPAGPSM2.C
```

Appendix F

© Hewlett-Packard Company

```
#S3771; #O9335  *  BARBARA.PF; LP602  *  TUE, MAY 17, 1988,  6:30 AM
#S3771; #O9335  *  BARBARA.PF; LP602  *  TUE, MAY 17, 1988,  6:30 AM
#S3771; #O9335  *  BARBARA.PF; LP602  *  TUE, MAY 17, 1988,  6:30 AM

#S3771; #O9335  *  BARBARA.PF; LP602  *  TUE, MAY 17, 1988,  6:30 AM
#S3771; #O9335  *  BARBARA.PF; LP602  *  TUE, MAY 17, 1988,  6:30 AM
#S3771; #O9335  *  BARBARA.PF; LP602  *  TUE, MAY 17, 1988,  6:30 AM

#S3771; #O9335  *  BARBARA.PF; LP602  *  TUE, MAY 17, 1988,  6:30 AM
#S3771; #O9335  *  BARBARA.PF; LP602  *  TUE, MAY 17, 1988,  6:30 AM
#S3771; #O9335  *  BARBARA.PF; LP602  *  TUE, MAY 17, 1988,  6:30 AM

#S3771; #O9335  *  BARBARA.PF; LP602  *  TUE, MAY 17, 1988,  6:30 AM
#S3771; #O9335  *  BARBARA.PF; LP602  *  TUE, MAY 17, 1988,  6:30 AM
#S3771; #O9335  *  BARBARA.PF; LP602  *  TUE, MAY 17, 1988,  6:30 AM
```

We claim:

1. In a computing system having a plurality of applications and a primary executing program, a modular compiler comprising:

a class independent parser for parsing program code which includes commands to be executed by the primary executing program;

a plurality of class dependent parsers, each class dependent parser for parsing program code which includes commands to be executed by one application from the plurality of applications, each class dependent parser being added to the modular compiler and logically coupled to the class independent parser when an application for which that class dependent parser parses program code which includes commands to be executed by the application is added to the computing system, and each class dependent parser being removed from the modulator compiler when the application is removed from the computing system.

2. A modulator compiler as in claim 1 additionally comprising:

a scanner, logically coupled to the class independent parser, which scans a source file containing code and delivers tokens to the class independent parser and each class dependent parser in the plurality of class dependent parsers; and, an expression parser, logically coupled to the class independent parser and called by the class independent parser and each class dependent parser added to the modular compiler, which parses expressions and returns expression tokens to the scanner.

3. In a computing system having a plurality of applications and a primary executing program, a modular compiler comprising:

a class independent parser for parsing program code which includes commands to be executed by the primary executing program;

first scanner routine, logically coupled to the class independent parser, which returns a token to the class independent parser when the first scanner routine is called by the class independent parser;

a plurality of class dependent parsers, logically coupled to the first scanner routine, called by the first scanner routine, each class dependent parser parsing a different set of commands;

a plurality of scanner routines, one scanner routine from the plurality of scanner routines being called by a class dependent parser from the plurality of class dependent parsers so that each class dependent parser, is logically coupled to and calls its own scanner routine, and the called scanner routine returns a token to a calling class dependent parser; and, an input stream processor, logically coupled to and called by the first scanner routine and each scanner routine from the plurality of scanner routines, which returns a token to the scanner routine calling the input stream processor.

4. A modular compiler as in claim 3 additionally comprising:

an expression parser, logically coupled to and called by the class independent parser and each of the class dependent parsers, which parses expressions.

5. A modular compiler as in claim 3, wherein the first scanner routine includes a focus means for determining which one out of the class dependent parsers and the input stream processor to call.

6. A modular compiler as in claim 3, wherein the first scanner routine includes means for calling the input stream processor and returning the token received from the input stream processor to the class independent parser upon one of the class dependent parsers returning an error.

7. In a computing system, a method for compiling program code into commands to be executed by a primary executing program and a plurality of applications, each application executing a different set of commands, the method comprising the steps performed by a computer of:

(a) parsing program code which contains commands to be executed by the primary executing program using a class independent parser; and (b) parsing program code which contains commands to be executed by an application with a class dependent parser which parses commands for that application.

8. In a computing system, a method for generating code using a class independent parser, at least one class dependent parser, a class independent scanner routine for the class independent parser and a class dependent scanner routine for each class dependent parser, the method comprising the steps performed by a computer of:

(a) calling the class independent scanner routine from the independent parser;

(b) when a first class dependent parser has precedence performing the following substeps:

(b.1) calling from the class independent scanner routine the first class dependent parser;

(b.2) at least once calling from the first class dependent parser a first class dependent scanner for the first class dependant parser;

(b.3) returning from the first class dependent scanner to the first class dependent parser a token every time the first class dependent parser calls the first class dependent scanner;

(b.4) attempting with the first class dependent parser to parse tokens received from the first class dependent parser;

(b.5) returning from the first class dependent parser to the class independent scanner routine an error when the first class dependent parser is unable to parse a token received from the first class dependent scanner;

(c) returning a token from the class independent scanner routine to the class independent parser.

9. A method as in claim 8 wherein substep (b.4) includes the following substep:

(b.4.a) calling semantic routines to generate application dependent commands embedded within code when the first class dependent parser recognizes the tokens received from the first class dependent scanner, the commands to be extracted by a primary executing program and forwarded to an application for execution.

10. A method as in claim 9 additionally comprising the following step:

(d) when the independent parser recognizes the token from the scanner, calling semantic routines to generate code for execution by the agent.

* * * * *

UNITED STATES PATENT AND TRADEMARK OFFICE

CERTIFICATE OF CORRECTION

PATENT NO. : 4,914,585

DATED : April 3, 1990

INVENTOR(S) : Barbara B. Packard et al.

It is certified that error appears in the above-identified patent and that said Letters Patent is hereby corrected as shown below:

Column 4, line 17 "recorder also 108 generates" should read --recorder also generates--.

Column 5, line 51 "tast" should read --test--; line 62 "raceived" should read --received--.

Column 6, line 18 "cursor 20" should read --cursor 200--; line 21 "place cursor 20" should read --place cursor 200--.

Column 8, line 12 "API$_{13}$INTER" should read --API_INTER--; line 64 "form." should read --form,--.

Column 9, lines 31-32 "API$_{_INTERROGATE_}$MSG" should read --API_INTERROGATE_MSG--.

Column 10, line 7 "Make expression ()" should read --MakeExpression ()--; line 20 "cass" should read --class--; line 29 "Make expression ()" should read --MakeExpression ()--; line 62 "nor" should read --not--.

UNITED STATES PATENT AND TRADEMARK OFFICE
CERTIFICATE OF CORRECTION

PATENT NO. : 4,914,585

DATED : April 3, 1990

INVENTOR(S) : Barbara B. Packard et al.

It is certified that error appears in the above-identified patent and that said Letters Patent is hereby corrected as shown below:

Column 11, line 4 "as long is" should read --as long as--.

Column 993, line 18-19 "modulator compiler" should read --modular compiler--; line 21 "modulator compiler" should read --modular compiler--.

Signed and Sealed this

Fourth Day of May, 1993

Attest:

MICHAEL K. KIRK

Attesting Officer

*Acting Commissioner of Patents and Trademarks*